US005475802A

United States Patent [19]

Wescott et al.

[11] Patent Number: 5,475,802

[45] Date of Patent: Dec. 12, 1995

[54] SELECTIVE POLYGON MAP DISPLAY METHOD

[75] Inventors: Thomas F. Wescott; Lawrence E. McCleary, both of San Diego, Calif.; David A. Nation, Hanover, Md.

[73] Assignee: United States of America as represented by the Secretary of the Navy, Washington, D.C.

[21] Appl. No.: 243,650

[22] Filed: May 12, 1994

Related U.S. Application Data

[63] Continuation of Ser. No. 473,258, Jan. 31, 1990, Pat. No. 5,341,463.

[51] Int. Cl.[6] ........ G06F 3/14

[52] U.S. Cl. ........ 395/129; 395/123

[58] Field of Search ........ 395/133, 129, 395/125, 130, 131, 123, 134, 135, 138

[56] References Cited

U.S. PATENT DOCUMENTS

| | | |
|---|---|---|
| 3,866,229 | 2/1975 | Hammack . |
| 4,646,076 | 2/1987 | Wiedenman . |
| 4,791,582 | 12/1988 | Ueda et al. . |
| 4,807,157 | 2/1989 | Fukushima et al. . |
| 4,807,158 | 2/1989 | Blanton et al. . |

OTHER PUBLICATIONS

Robinson et al., "Elements of Cartography", John Wiley & Sons, 1969.

Richards et al., "Map Projections", North–Holland Publishing Company, 1972.

Gerald et al., "Applied Numerical Analysis", Wheatley, Addison Wesley Publishing Co., 1972.

Pavlidis, "Algorithms for Graphics and Image Processing", Computer Science Press, 1982.

"CAM Cartographic Automatic Mapping Program Documentation", 7th Ed., CIA Doc., CPAS 86–10001, 1986.

Douglas et al., "Algorithms for the Reduction of the Number of Points Required to Represent a Digitized Line or Its Caricature", The Canadian Cartographer, vol. 10, No. 2, Dec. 1973.

*Primary Examiner*—Heather R. Herndon
*Assistant Examiner*—Cliff Nguyen Vo
*Attorney, Agent, or Firm*—Harvey Fendelman; Thomas Glenn Keough

[57] ABSTRACT

Signal transformations of inputted data brought about by 58 new subroutines in combination with other subroutines to display world maps or other display items with the unique capability of performing the following functions in complete generality. (1) Arbitrary selection of map center and coverage, including global displays, (2) filling of all land and lake areas defined by polygons composed of an arbitrary number of vertices, (3) clipping of map features and overlays at map boundaries and poles, (4) selection from any of nineteen currently implemented map projections with provision to install any other projection topologically similar to an oblique conic, (5) calculation of latitude/longitude for any point on a map without the need for inverse mapping equations, and (6) an efficient method of plotting polyline segments along great circles. These are a number of feature functions provided by this inventive concept.

The software could potentially be used with any digital global geographic data base, such as World Data Bank II (WDBII), a geographic information system or other data base where polylines are used to depict linear and/or areal features. Polygon (region filled) maps and other display items can be constructed from any data base from which closed polygons can be extracted directly, or constructed via additional processing.

64 Claims, 39 Drawing Sheets

(A)

CONVERSION OF GEOGRAPHIC (L,L) POLYLINES TO MAP (X,Y) BY EVALUATING MAP EQUATIONS (B)

CONVERSION OF A MAP LOCATION TO (L,L) BY ITERATIVE SOLUTION OF MAP EQUATIONS

SELECTIVE POLYGON MAP DISPLAY METHOD

STATEMENT OF GOVERNMENT INTEREST

The invention described herein may be manufactured and used by or for the Government of the United States of America for governmental purposes without the payment of any royalties thereon or therefor. This is a continuation of application Ser. No. 07/473,258, filed Jan. 31, 1990, now U.S. Pat. No. 5,341,463.

BACKGROUND OF THE INVENTION

The ability to generate special purpose maps easily by computer from geographic data bases is having a profound effect on cartography. Computer generated maps offer many advantages over Using traditional paper maps, such as being able to customize the area, scale, projection, features shown, etc. Users can rid displays of the incidental features (clutter) usually present on printed maps. They have a new found freedom to select the most suitable from a wide variety of projections without being concerned with custom drafting and reproduction costs.

The earliest computer generated maps resembled line drawings, where regions are depicted by their outline. With the use of line maps, however, there is sometimes confusion about which side of a shoreline is land or water, particularly at large scales. A polygon based map proves the option of portraying regions by shading or color. Although more difficult to produce, polygon maps are much easier to interpret, and are generally more pleasing to work with. Another limitation of early soft copy map portrayals was the controlling means lacked a total flexibility for selecting regions of the world, local or global. Most early mapping systems included only a limited number of familiar projections and did not provide correct clipping of features and overlays.

Thus, a continuing need exists in the state of the art for a versatile and reliable apparatus and method to display world maps from digital data, as well as to present user specific overlay data that are totally adaptable with regard to center point and area coverage. The need exists in the state of the art for a versatile and reliable apparatus and method that may be adapted to any one of a large number of map projections and have the capability to display land, water, or other areal features as color filled regions with lakes, rivers, roads, railroads, and other boundaries and to enable a user to pick any point on the currently displayed map and retrieve its geographic location.

SUMMARY OF THE INVENTION

The present invention is directed to providing a method and means for producing arbitrary displays of data such as world maps and other displays from a source of data from which closed polygons can be extracted to give a generalized display of, for example, world features. The data is received by a computer operated on by subroutines to effect geometric signal transformations that provide the capabilities for arbitrary selection of map center and coverage, filling of all land and lake areas defined by polygons, clipping of map features and overlays at map boundaries and singularities, e.g., poles, selection from any of a number of available data sources having the provision to install other projections topologically similar to an oblique conic, and the calculation of latitude and longitude for any point on a map without the need for inverse mapping equations, to provide an efficient method of plotting polyline segments along great circles.

An object of the invention is to provide a method and apparatus to effect geometric signal transformations for displaying information with complete generality capabilities.

Another object is to provide a method and apparatus to effect signal transformations for displaying information having an arbitrary selection of center and coverage.

Another object is to provide a method and apparatus to effect signal transformations for displaying information that fills all designated areas defined by polygons composed of an arbitrary number of vertices.

Another object is to provide a method and apparatus to effect signal transformations for displaying information having the capability for clipping designated features and overlays at boundaries and singularities, e.g., poles.

Another object is to provide a method and apparatus to effect signal transformations for displaying information from a selection from existing projections with a provision to install any other projection topologically similar to a general oblique conic.

Another object is to provide a method and apparatus to effect signal transformations for displaying information which avoid the need for inverse mapping equations in the arriving at latitude/longitude designations for any point on a map.

Another object is to provide a method and apparatus to effect signal transformations for displaying information which provide an efficient method of plotting polyline segments along great circles.

An object of the invention is to provide a method and apparatus to effect signal transformations for displaying maps with complete generality capabilities.

Another object is to provide a method and apparatus to effect signal transformations for displaying maps having an arbitrary selection of map center and coverage, including global displays.

Another object is to provide a method and apparatus to effect signal transformations for displaying maps filling all land and lake areas defined by polygons composed of an arbitrary number of vertices.

Another object is to provide a method and apparatus to effect signal transformations for displaying maps in which polygon (region filled) maps can be constructed from any data base where closed polygons can be extracted directly, or constructed via additional processing.

Another object is to provide a method and apparatus to effect signal transformations for displaying maps having the capability for clipping map features and overlays at map boundaries and singularities, e.g., poles.

Another object is to provide a method and apparatus to effect signal transformations for displaying maps from a selection from any of nineteen currently implemented map projections with a provision to install any other projection topologically similar to a general oblique conic.

Another object is to provide a method and apparatus to effect signal transformations for displaying maps using any digital global geographic data base or geographic information system where polylines are used to depict linear and/or areal features.

Another object is to provide a method and apparatus to effect signal transformations for displaying maps which avoid the need for inverse mapping equations in the arriving at latitude/longitude designations for any point on a map.

Another object is to provide a method and apparatus to effect signal transformations for displaying maps which provide an efficient method of plotting polyline segments along great circles.

Another object is to provide a method and apparatus to effect signal transformations for displaying maps having software written in a standard computer language which can be easily transported to different computer systems.

These and other objects of the invention will become more readily apparent from the ensuing specification and claims when taken in conjunction with the appended drawings.

DESCRIPTION OF THE PREFERRED EMBODIMENT

The advancement to the state of the art herein described has a unique capability to effect signal transformations for constructing displays such as maps that present to viewers a heretofore unrealizable portrayal of features. Digital data is used to represent polylines that depict linear and areal features or, in other words, polygon (region filled) maps are constructable from any data base from which closed polygons can be extracted directly, or constructed via additional processing. It is apparent to those versed in this art that this apparatus and method can accommodate other data sources with the constraights to be elaborated on below, to effect signal transformations and thereby provide a variety of displays.

Figure 1:
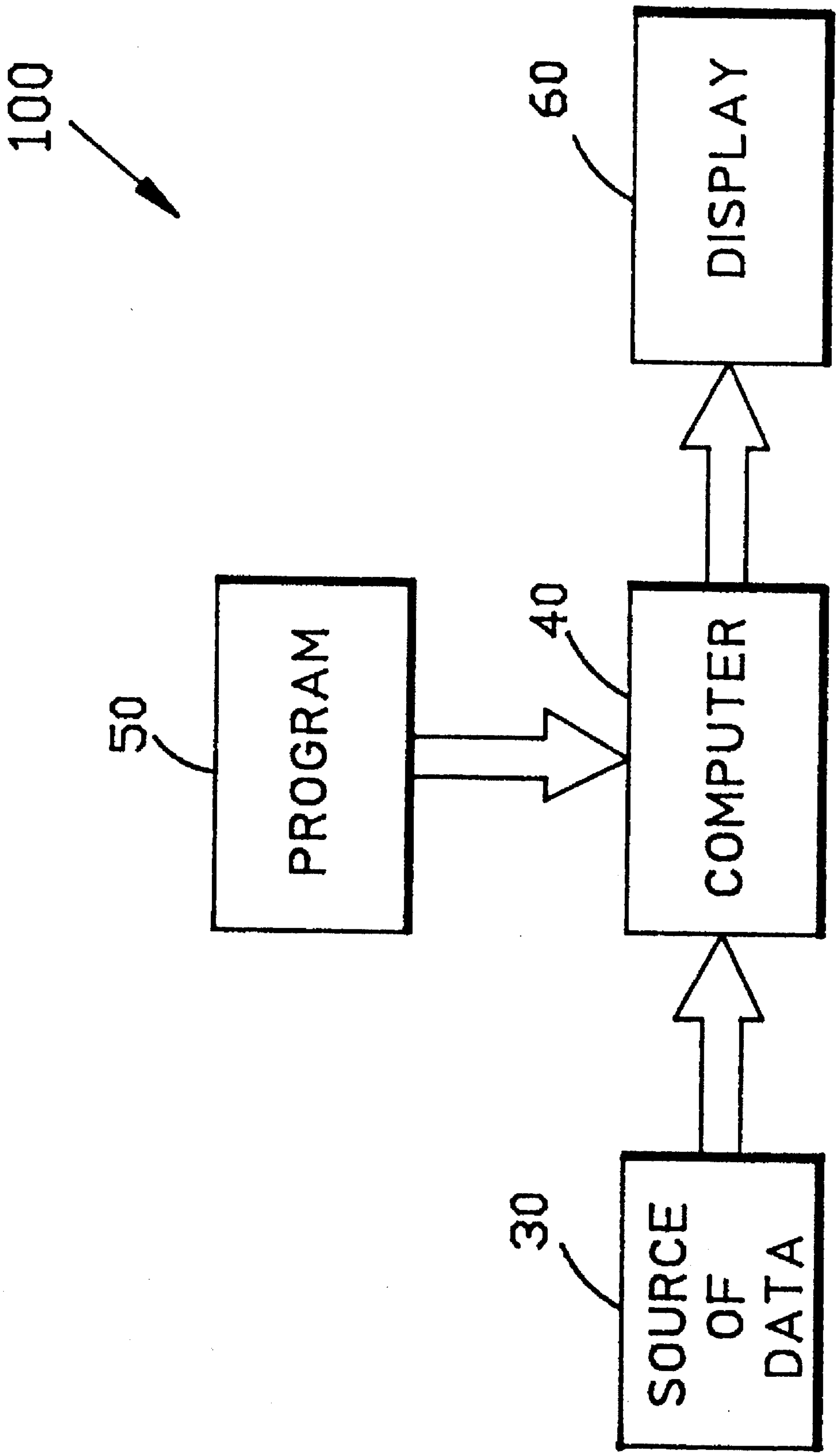
FIG. 1 is a schematic representation of the display system.

Referring to FIG. 1 a display system 100 draws data from a data source 30 in which digital data represents polylines that are used to depict linear and/or areas features. For example, this source of data could be what is commonly known as the world Data Bank II, a 1:3,000,000 to 1:4,000,000 scale worldwide vector data base which includes coastlines, islands, lakes, rivers, international boundaries, internal boundaries, roads, and railroads. Five additional levels of resolution have been produced by applying a thinning algorithm to the data base in order to minimize the time required to generate maps at smaller scales. Any digital global geographic data base or geographic information system could be used where polylines are used to depict linear and/or areal features. Polygon (region filled) maps or other displays of interest could be constructed from any data base where closed polygons can be extracted directly, or constructed via additional processing.

This data is fed to a computer 40, for example, a Digital

Equipment Corporation VAX computer under the VMS operating system using the Precision Visuals Incorporated DI-3000 graphics package. This computer is operated on by the operating instruction of an appropriate software program 50 written in ANSI standard Fortran 77 using graphic primitives based on Core.

The Digital Equipment Corporation's VAX has been identified as the operating unit. It is within the capabilities of this concept to utilize Sun3 and Sun4 work stations running under UNIX using either DI-3000 or a DI-3000 interface based on SunCore. In addition, since it has been discovered that the software also can be run on other systems using Fortran and a Core graphics interface, it is apparent to one skilled in the art to which this invention pertains, that the subroutines to be discussed in detail below could be adapted to any scientific computer language and any versatile graphic interface.

In other words, special versions of the World Data .Bank II which have been modified to accommodate the efficient display of arbitrary world areas could be accommodated. In such a case, the computer program is compiled and linked on a particular system. Upon program execution, menus and help files are accessed as the user selects the various options required to define a map display.

The operating instruction of program 50 consists of 58 software subroutines which allow unique new capabilities in the display of world maps. These subroutines reside in a large program which includes approximately 400 additional subroutines which provide the normal capabilities required for interaction between the user and a display 60 which may be a part of the computer screen, remote terminals or may be associated with hard copy readouts for the display of the desired information.

Program 50 is contained in its entirety in the Appendix, in which the files are listed in alphabetical order and within each file the subroutines are listed in alphabetical order. The file CARMAPTH contains the new 58 subroutines that functionally cooperate with the other subroutines of the complete program. Here, it must be pointed out that all of the subroutines are loaded together and must functionally cooperate together to realize the capabilities of this inventive concept. The CARMAPTH file subroutines are the subroutines referred to in the ensuing description to provide a sufficient insight of the salient features of the invention.

Display 60 is a computer display which is needed to show all the menus including, feature menus, for appropriate actuation of the computer so that the desired displays are presented. A hard copy display device optionally may be used and perhaps is preferred where permanent records, handouts and the like are to be used by an interested audience or when, for example, it is desired to disseminate the displays to an expanded audience.

Before getting into the details of the operative interrelationship of the constituents of this inventive concept, a brief look at the capabilities and versatilities of this concept is in order.

Figure 2:
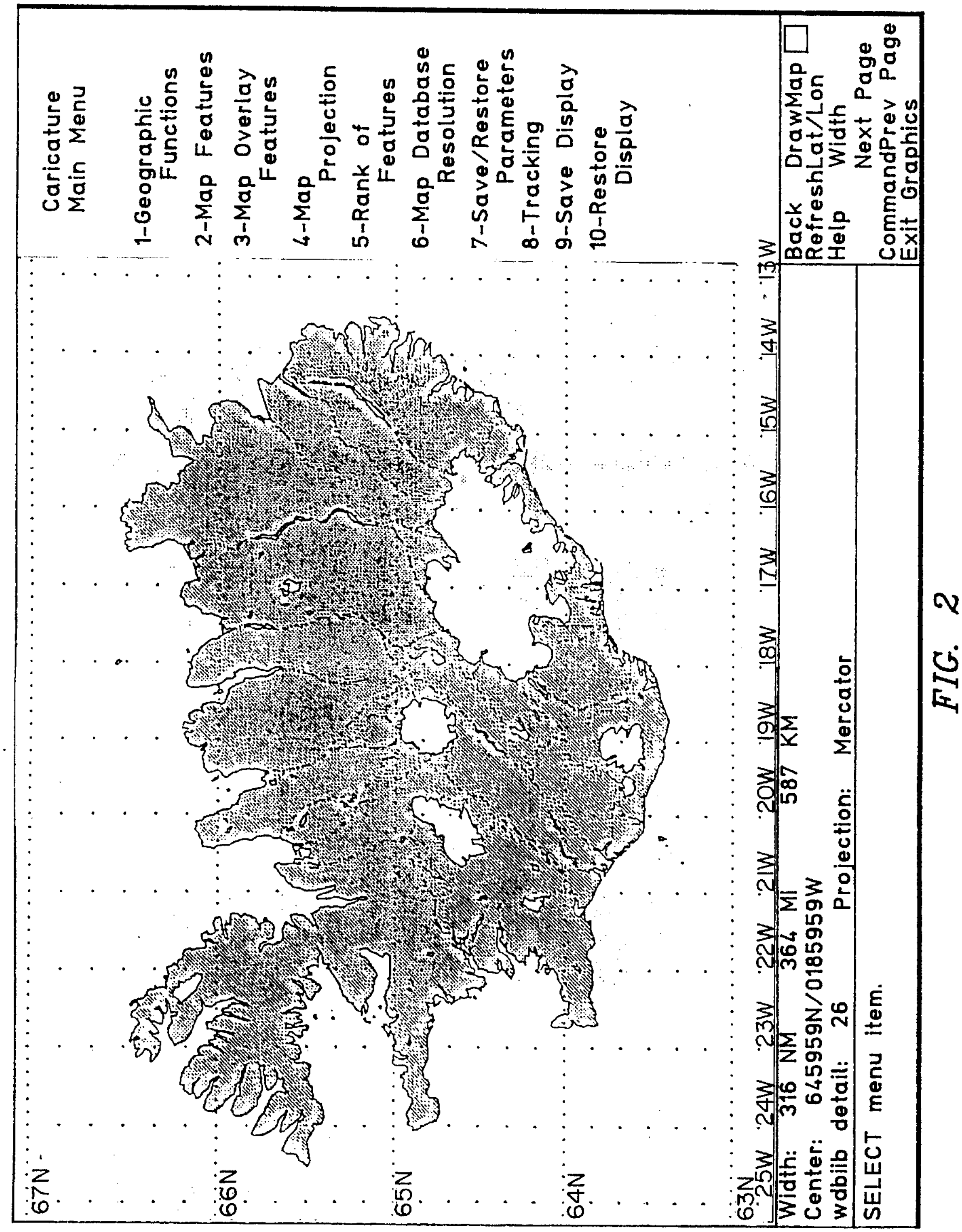
FIG. 2 illustrates a display status when the program has been executed.

FIG. 2 shows the display status when the program has been executed and the subroutine INITIA is brought into operation. The figure illustrates a full screen display subdivided into windows for the map display, map parameters, keyboard input and control items to be selected by a pick device such as a mouse that has selected the "DrawMap" item near the lower right. In the map area shown is a Mercator projection of Iceland with land in one color, while open ocean, lakes, and glaciers are another, and rivers shown in a third color. It is to be understood that this drawing and the other drawings do not show these colors but represent the different colors by-differently tertured appearances. The 10 other items about the "DrawMap" item refer to additional menus which can be selected, for example, the "Back" item refers to a method for returning to the previous menu and the "Lat/Lon" item provides the capability to determine the latitude and longitude of any location selected on the screen from the map area.

Figure 3:
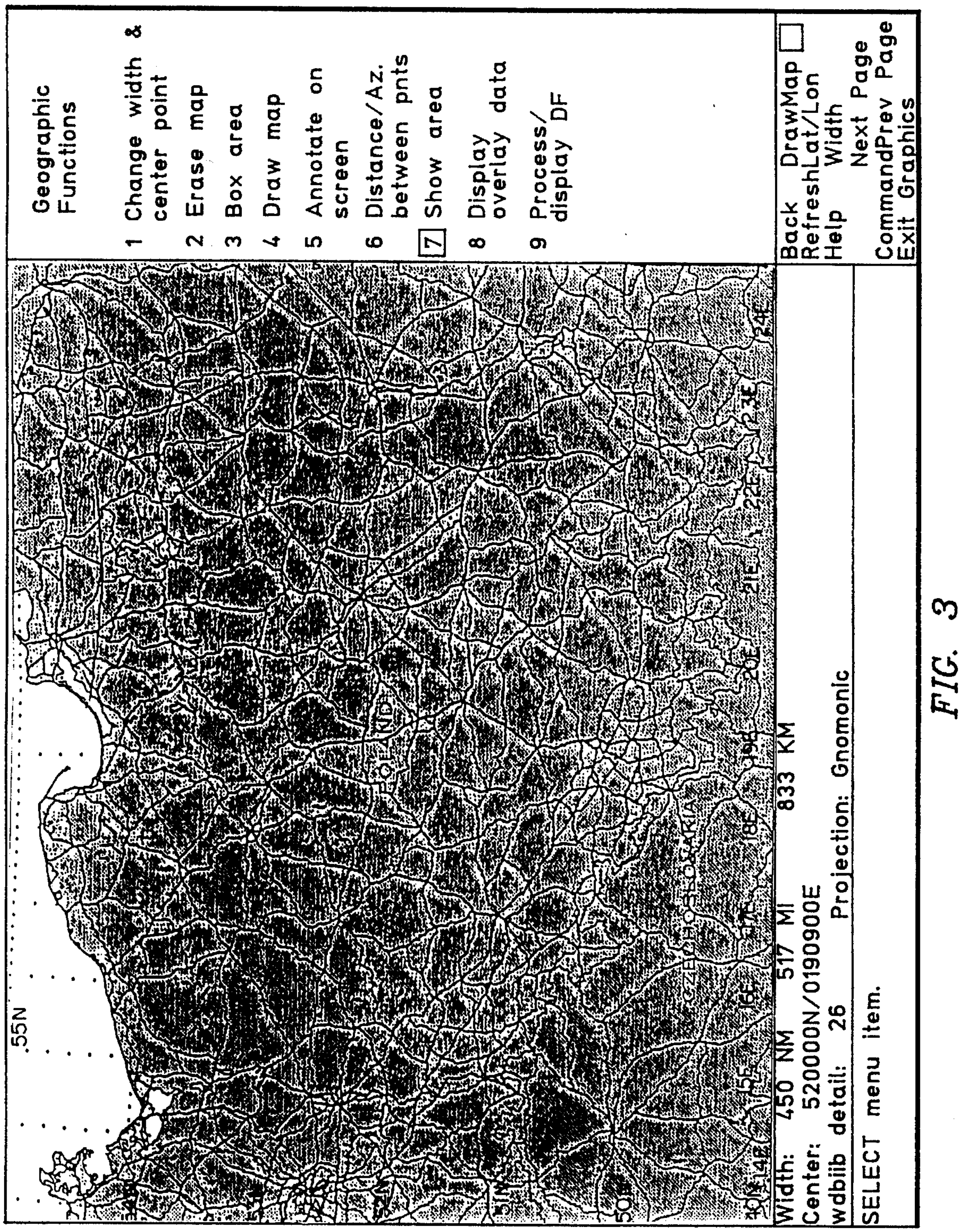
FIG. 3 is an example of a display of the Show Command Feature menu.

FIG. 3 provides an example of the display when the "Show area" command within the Geographic Functions menu is initiated. This feature accesses a file defining geographical areas for oceans, seas, countries, etc. In this instance Poland is the requested area. The map projection is Gnomonic and the features selected include, land fill in orange, international boundaries in red and roads in blue. Other options include the capability to redefine the map area, annotate, compute distance and azimuth between two points, and load a particular file of track data.

Figure 4:
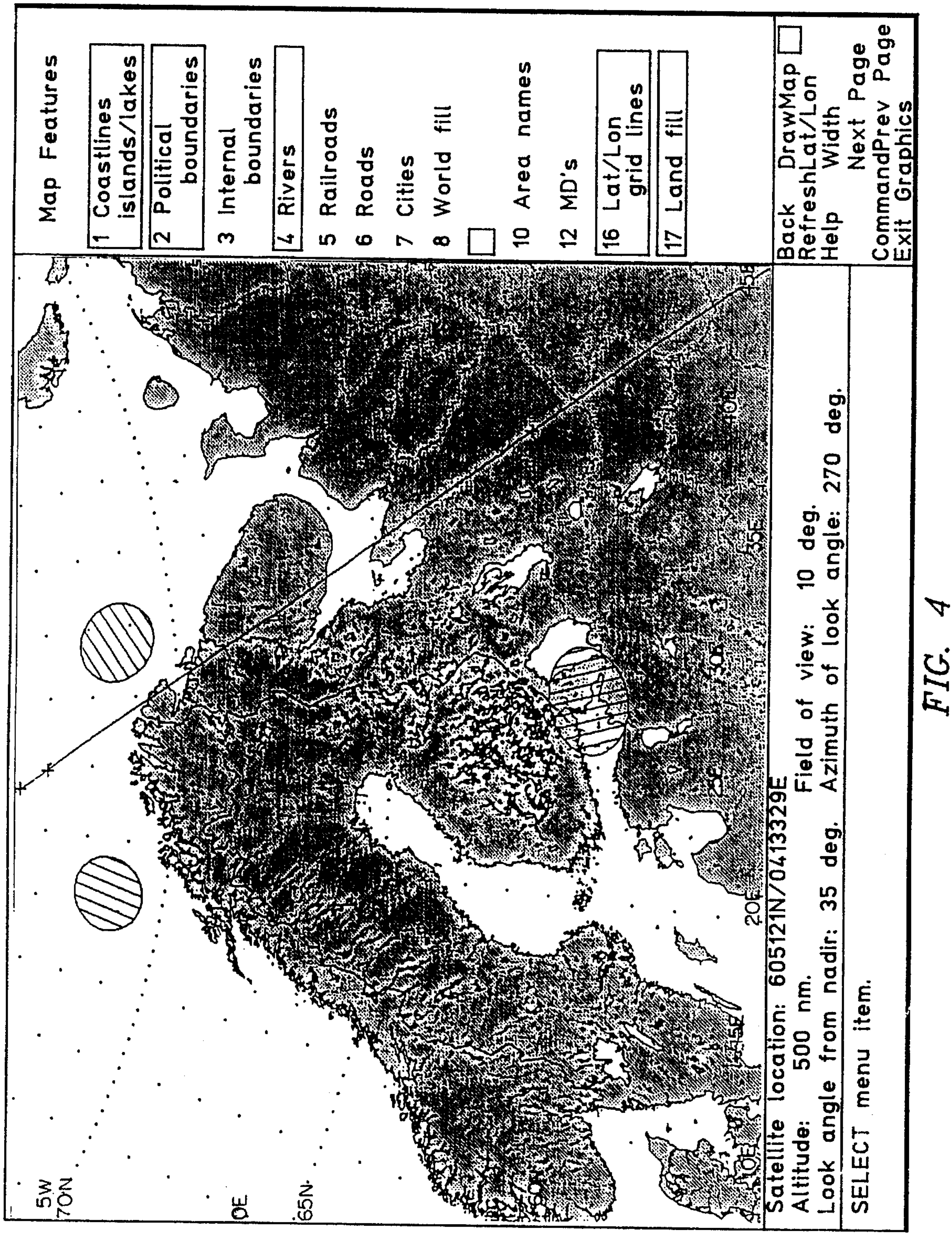
FIG. 4 depicts a stereographic projection covering area between two seas.

Another feature of display system 100 provided by program 50 is that the Map Features menu has individual items that can be toggled on and off. FIG. 4 shows a stereographic projection covering an area from the Baltic Sea to the Barents Sea. As in most of the figures, both the feature designated as category 1 (coastlines, islands and lakes) as well as the item designated category 17 (land fill) are turned on, although they can be set individually. In other words, if 1 is on and 17 is off, the land areas would be shown only as outlines. Political boundaries are on, rivers are shown in green, and Latitude/Longitude grid lines are shown in black. Also shown here is the capability to display the great circle path of an object such as a satellite as well as the footprint on the earth from various locations. In this case, three hypothetical cross-hatched areas are displayed where each is a function of the altitude, field of view, look angle from nadir and the azimuth of the look angle. These parameters are set from the Map Overlay Features menu.

Figure 5:
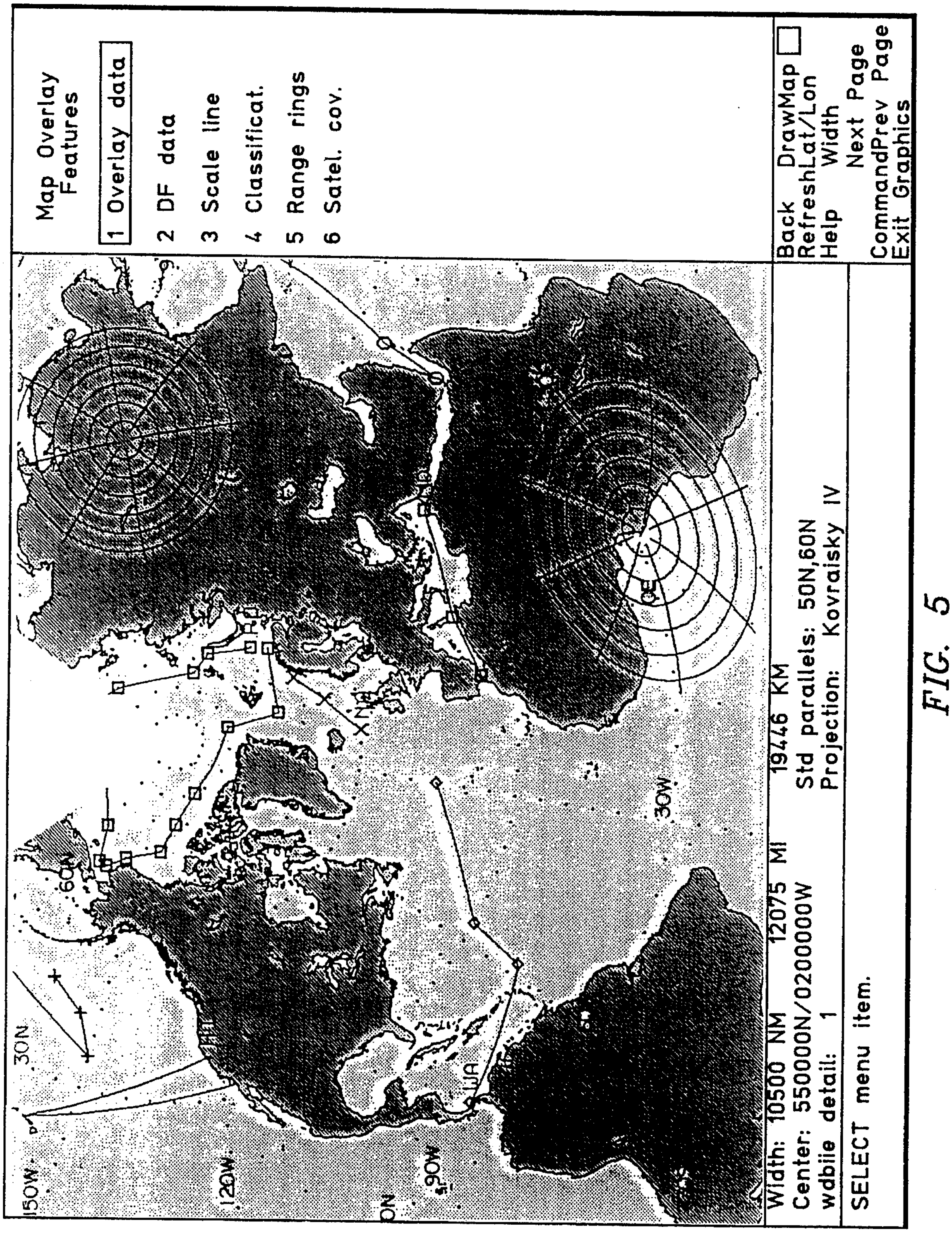
FIG. 5 displays hypothetical tracks as overlay data with range rings.
Figure 6:
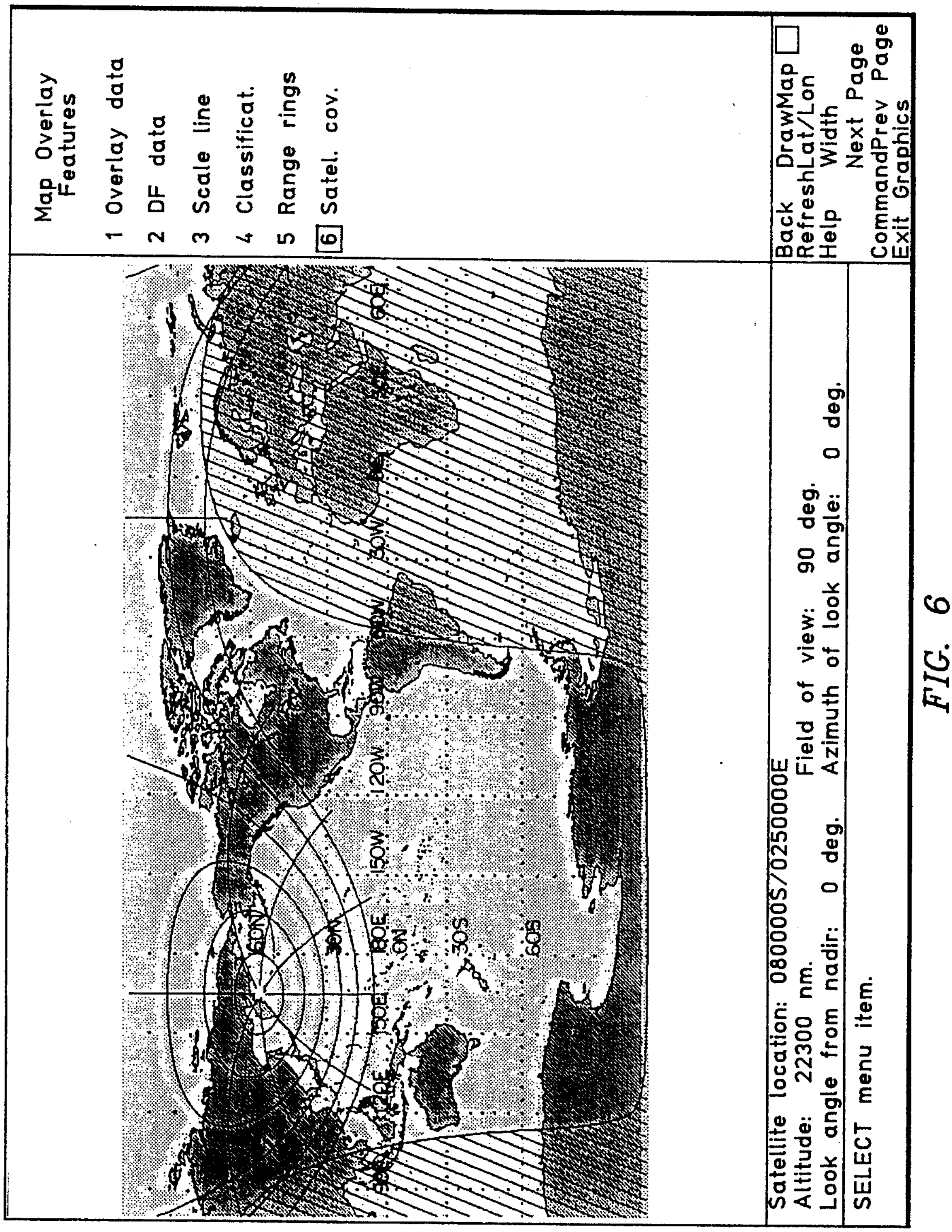
FIG. 6 provides a Miller projection of the world with polyline and polygon clipping at the poles.

Hypothetical tracks are displayed as overlay data in FIG. 5. Range rings also are displayed to illustrate distortion present in this equidistant conic projection, the Kavraisky IV. Normally, the projection would be used to map a smaller region. However, this extreme scale is selected to show the location of a straight interuption line and the mapping of a pole to an arc. Both the interruption and the pole combine to form a keyhole shaped boundary which graphically describes the conic method of rendering the entire world map onto a flat piece of paper. FIG. 6 is a Miller projection of the world which demonstrates polyline and polygon clipping at the poles as well the interruption line. This capability is provided by turning on category 6, Satel. Cov. in the Map Overlay Features menu.

Figure 7:
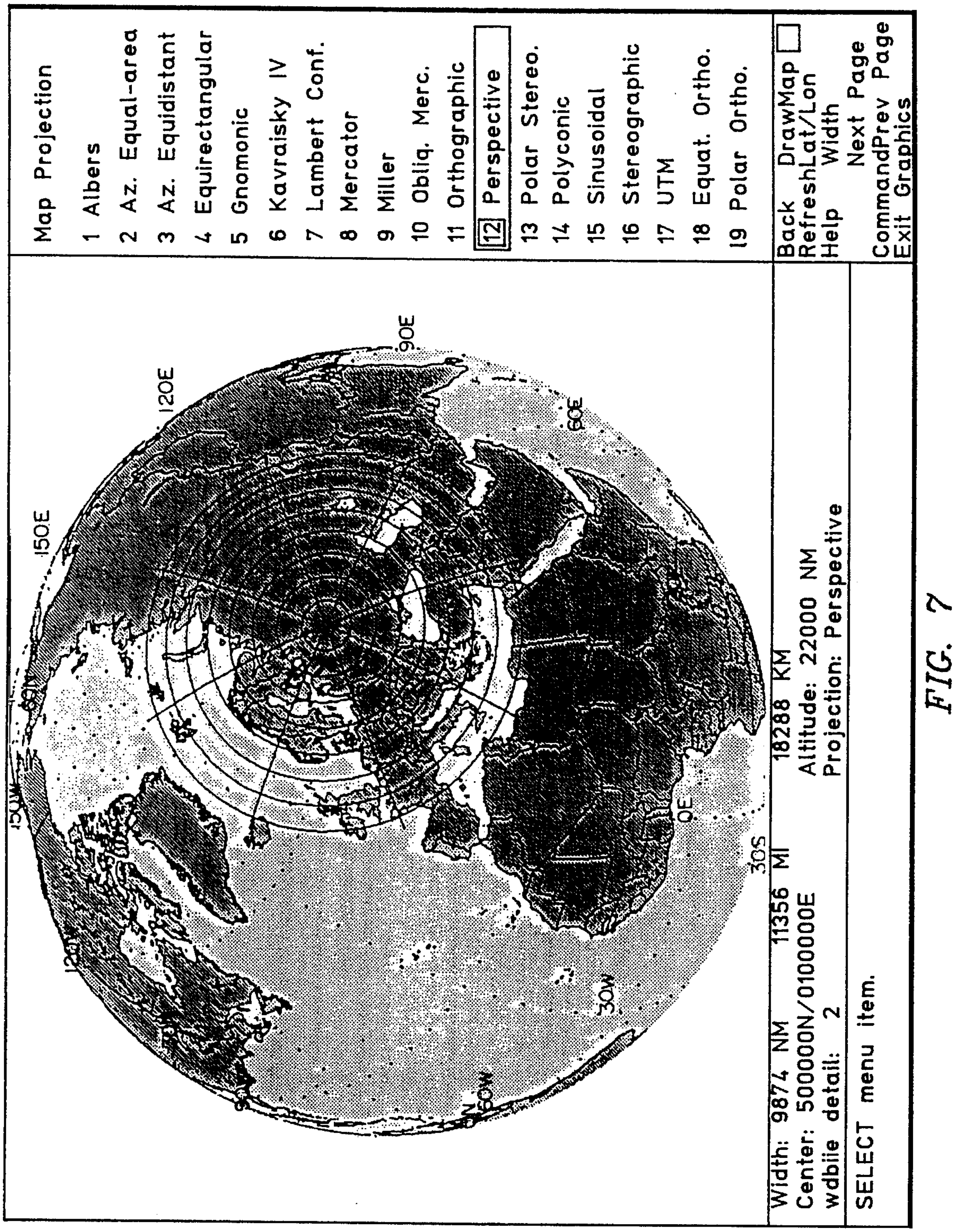
FIG. 7 shows a perspective view of the world with range rings.

FIG. 7 gives an observer a more recognizable view of the earth, that is, a perspective view which has been calculated from a distance of 22,000 nautical miles. Range rings are shown in increments of 200 nautical miles. This capability is at a viewer's fingertips when the category 12 Perspective is turned on in the Map Projection Features menu. With this inventive concept any of the 19 available map projections may be selected by a user and presented for any chosen center point and scale on the earth.

Figure 8:
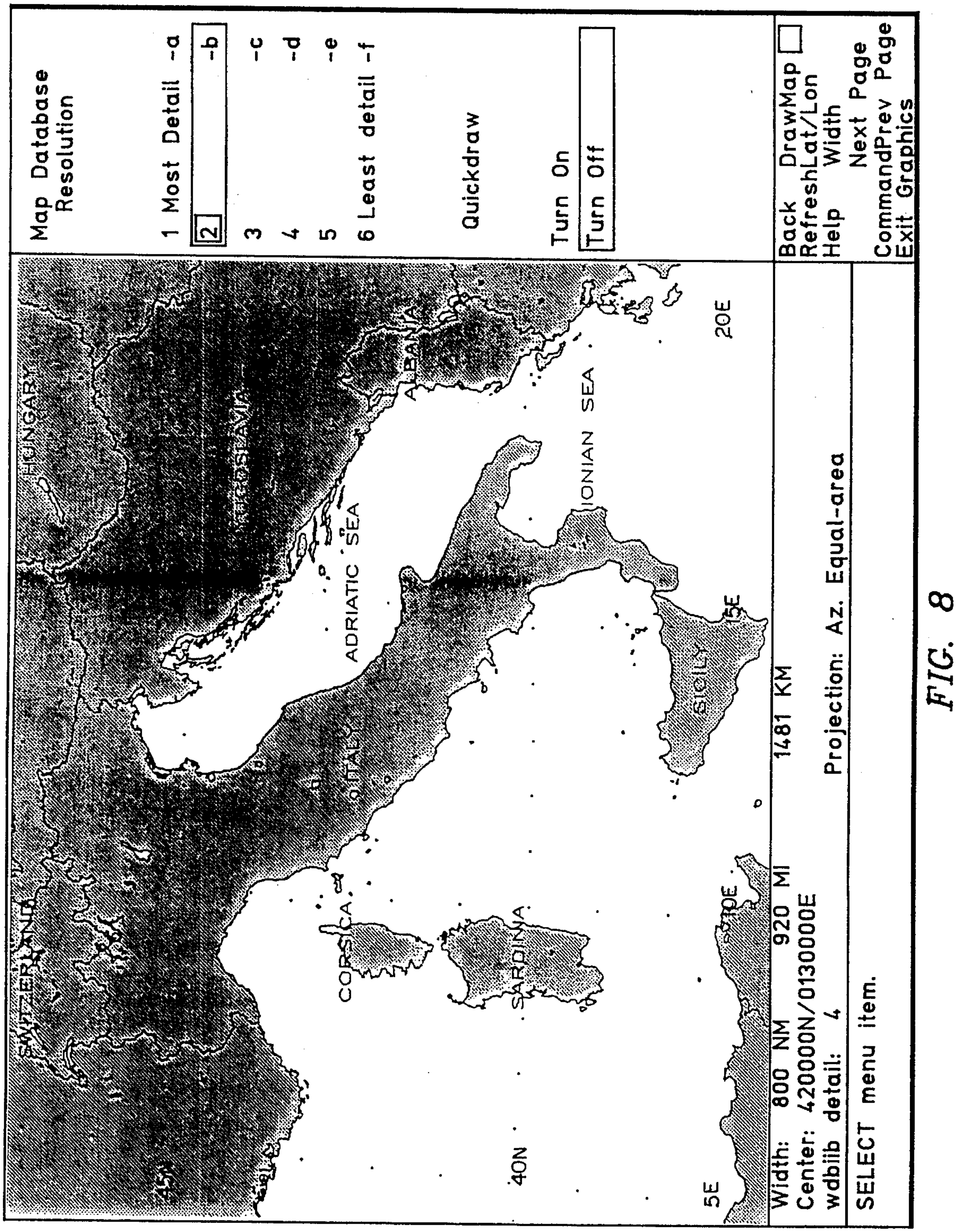
FIG. 8 depicts a selectable resolution level for improved display speed.

The Map Data Base Resolution Feature menu, shown in FIG. 8, allows the selection of various levels of resolution of data extracted from the World Data Bank II. In this particular example of the capabilities of display system 100, item 1 (level a) is the original resolution, while levels b through f have been thinned to provide lower resolution versions. Level b (an 85% data reduction from level a), shown here for Italy, is adequate to display the region at this scale.

Figure 9:
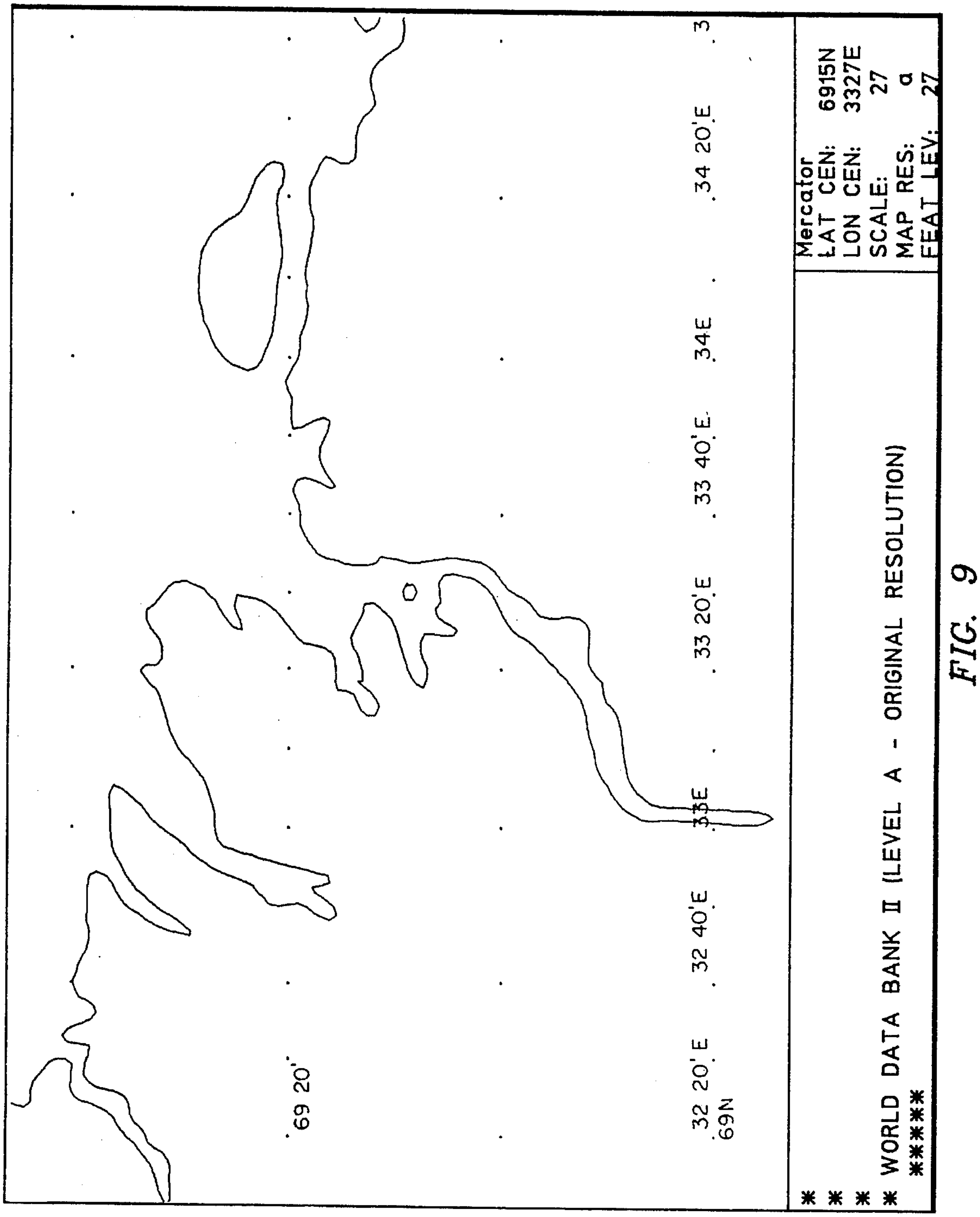
FIG. 9 shows another level of resolution that could be selected for a different display speed. to the level FIG. 8.
Figure 10:
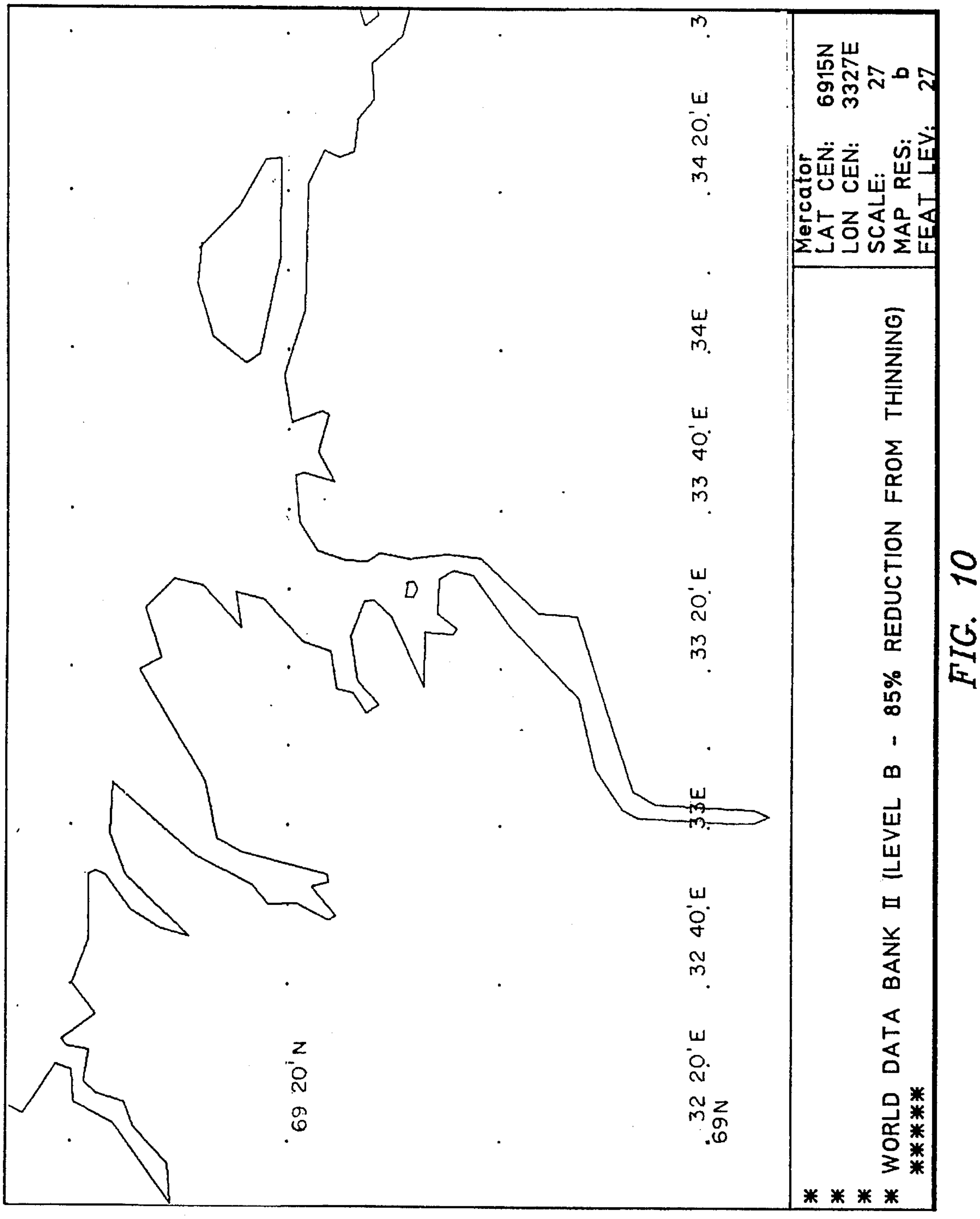
FIG. 10 is yet another level of resolution for comparison to the level of FIG. 8.

The thinned data results in a corresponding improvement in display speed. When the Quickdraw toggle of computer 40 is turned on, the resolution drops two levels, resulting in a faster draw. A limitation of displaying at the lower level is that the map falls short of standard accuracy specifications. Level f is adequate for a 360-degree Mercator map of the world, while the other levels fall into use at intermediate map scales. The Douglas-Peucker algorithm has proven very effective for producing these thinned versions of the data base. The graphic portrayals of FIGS. 9 and 10 are included to demonstrate the effectiveness of varying the resolution level by comparing levels a and b for a particular area of interest. Particularly in the case of the display of FIG. 10, such a resolution level may be entirely adequate for some display purposes whereas that of FIG. 9 or higher might be preferred for other data presentations.

Figure 11:
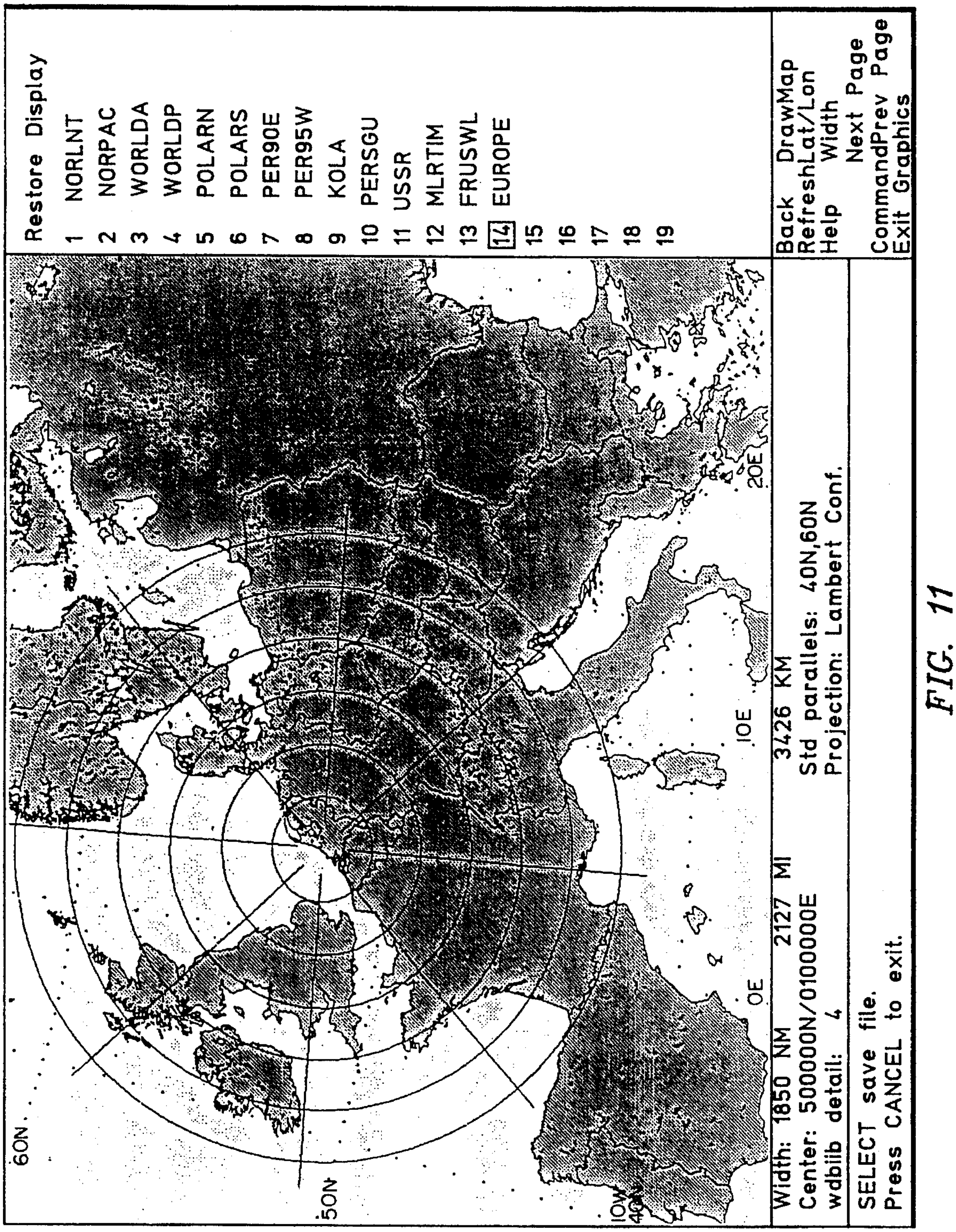
FIG. 11 shows the Restore Display Feature menu that can be used to recall previously defined maps.
Figure 12:
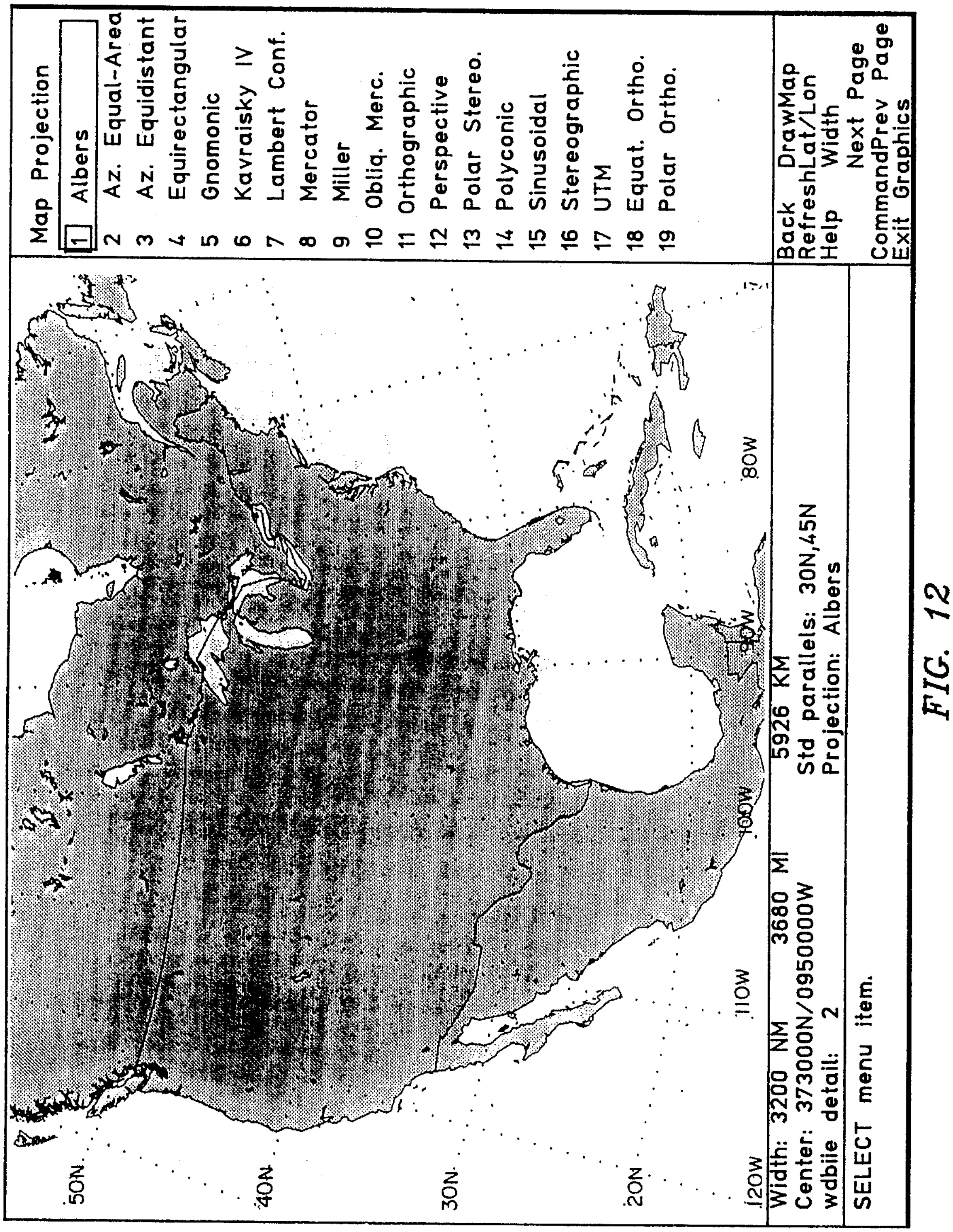
FIG. 12 shows a Map Projection Feature menu with map using Albers projection.
Figure 13:
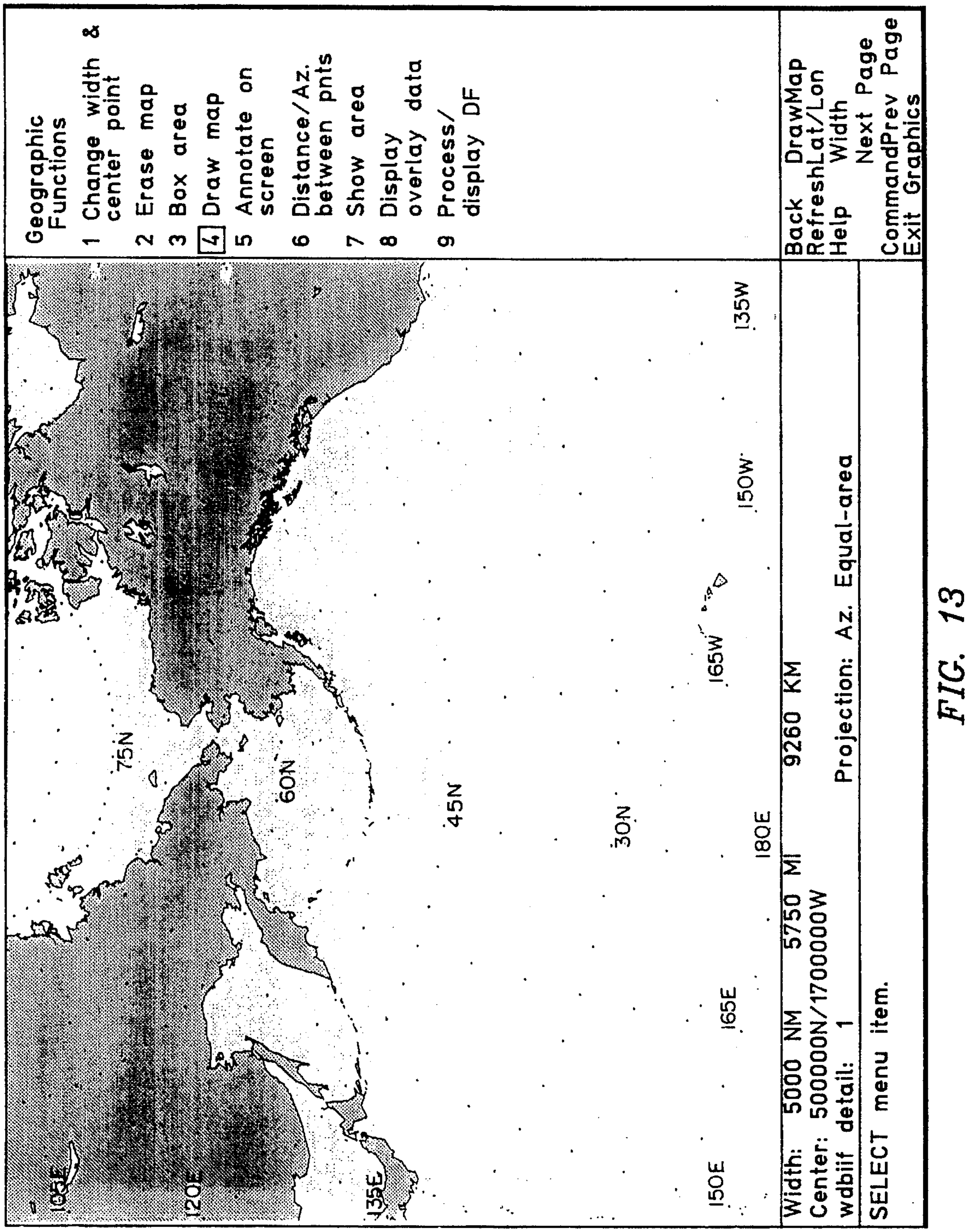
FIG. 13 shows a Geographic Functions Feature menu With Azimuthal Equl-area projection.
Figure 14:
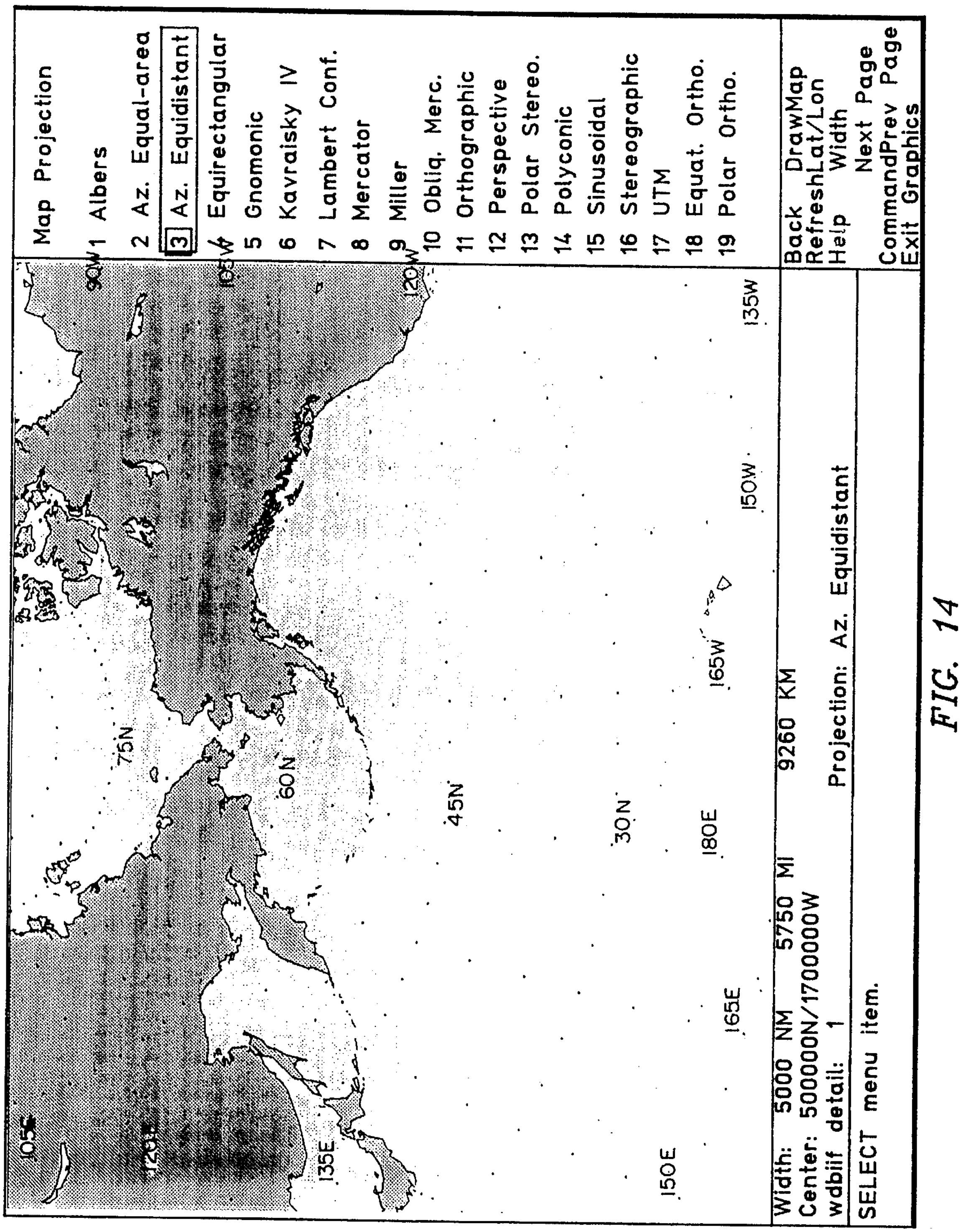
FIG. 14 shows an Azimuthal Equidistant projection.
Figure 15:
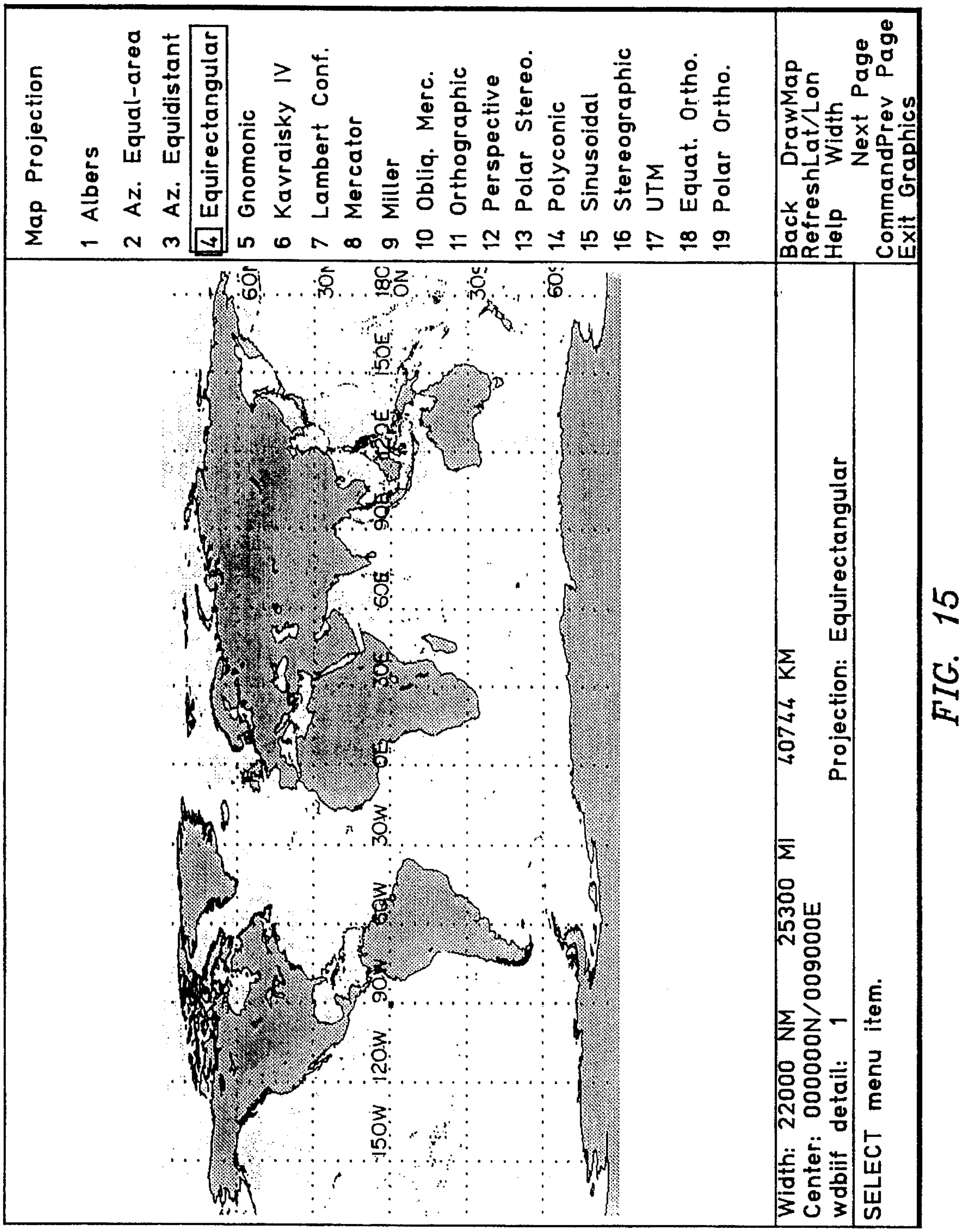
FIG. 15 shows an equirectangular map of the world.
Figure 16:
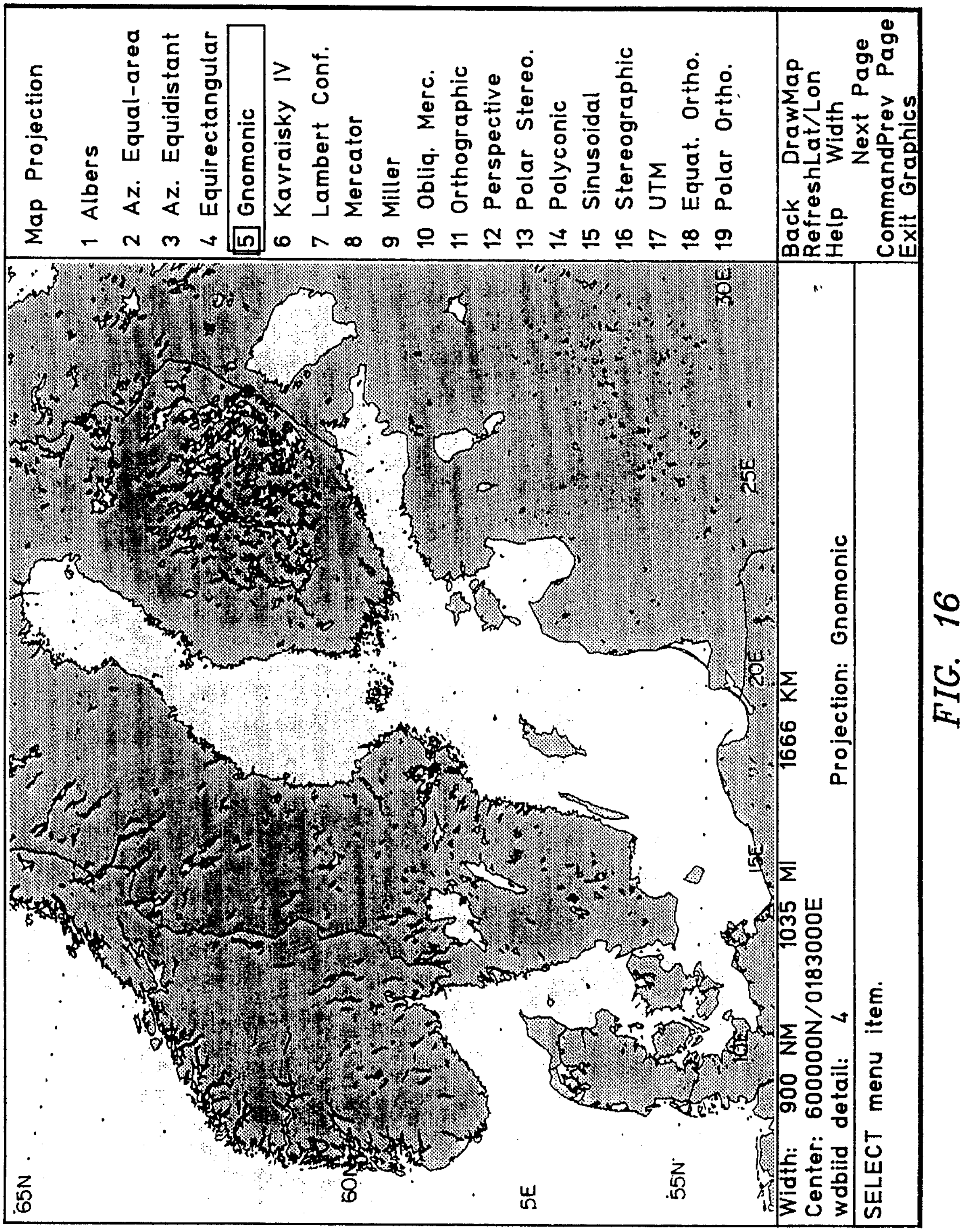
FIG. 16 shows a Gnomonic projection of Baltic Sea region.
Figure 17:
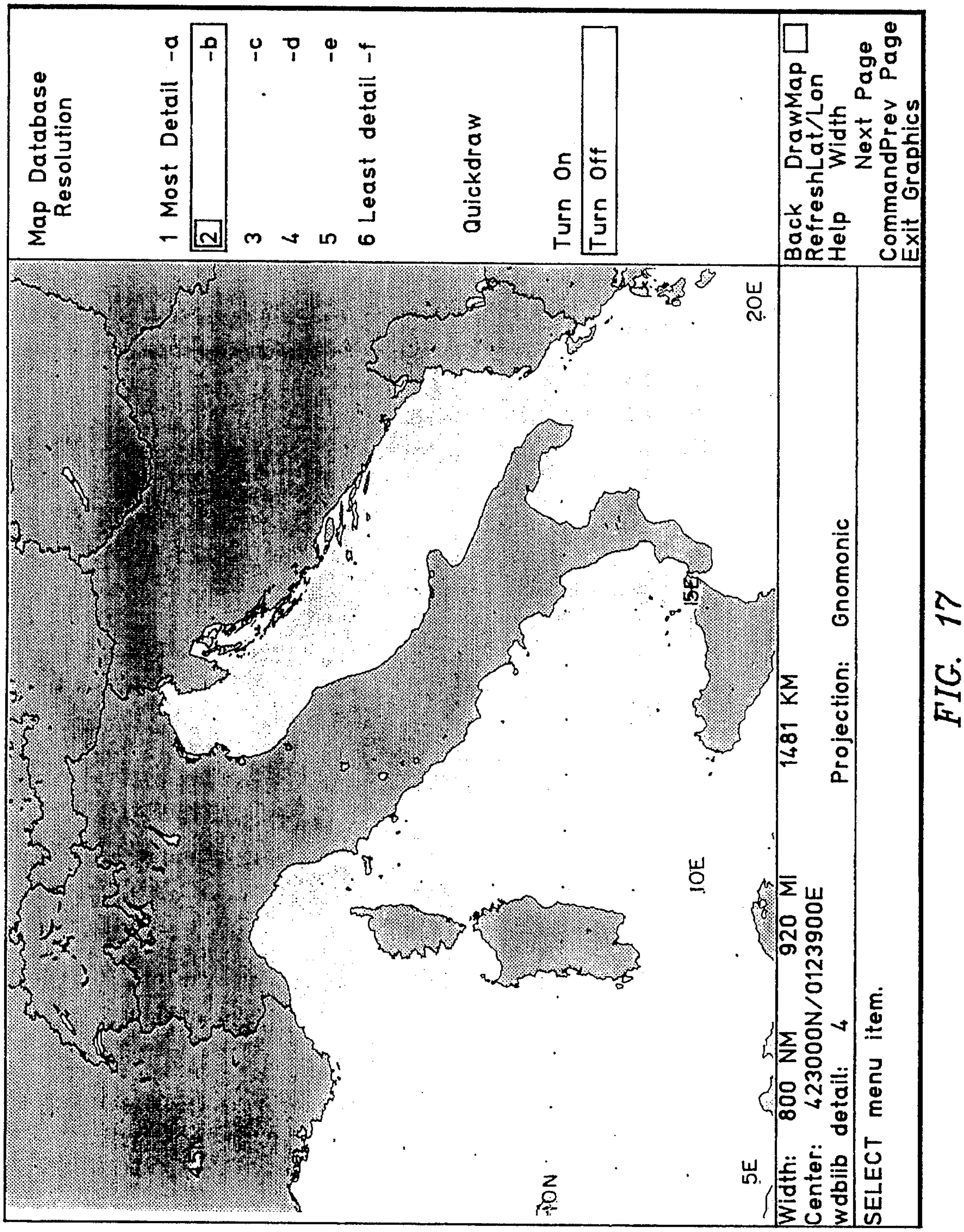
FIG. 17 shows a Map Database Resolution menu using level b with Quickdraw/Option turned off.
Figure 18:
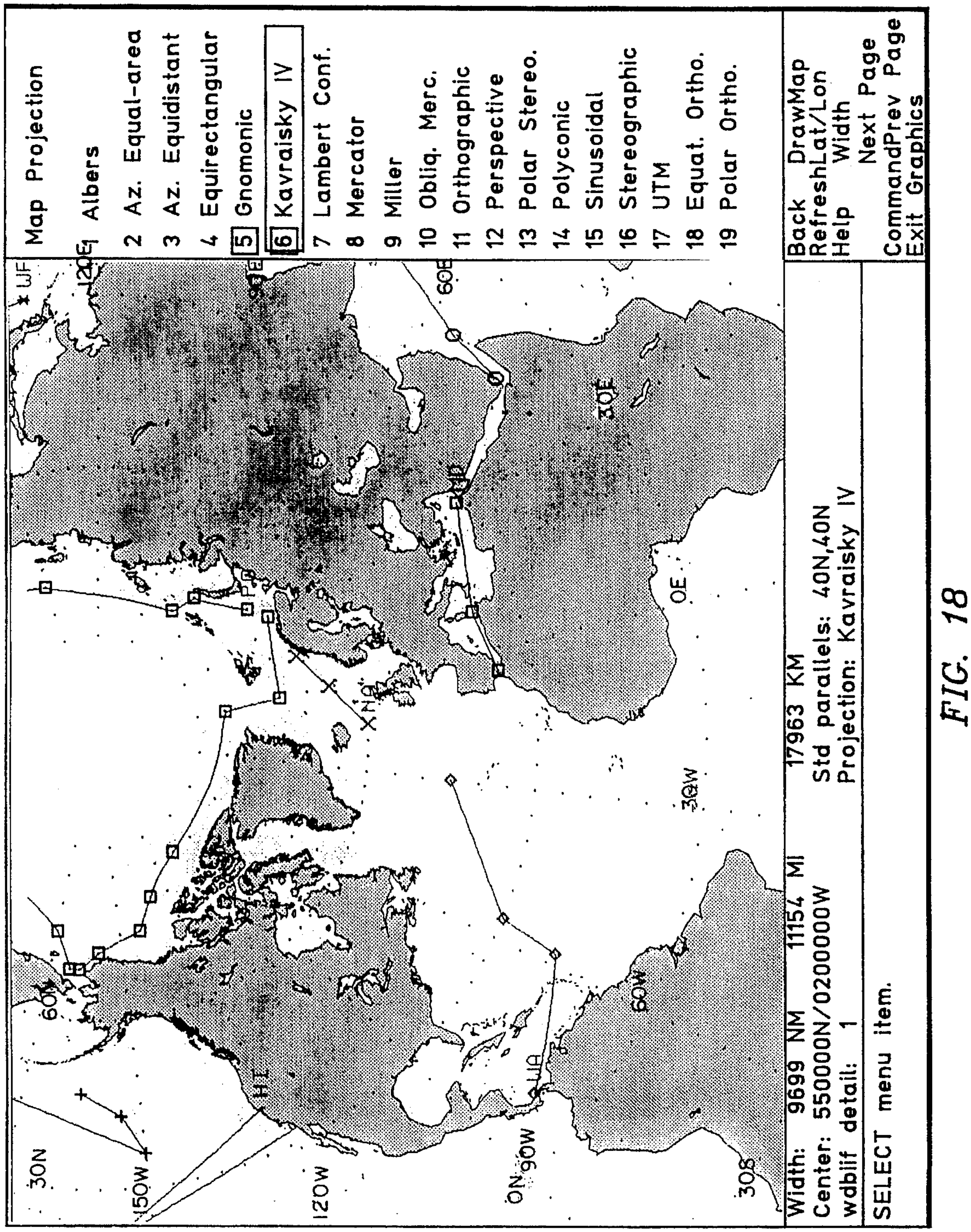
FIG. 18 shows a Kavraisky IV projection with sample tracks illustrating breakline clipping.
Figure 19:
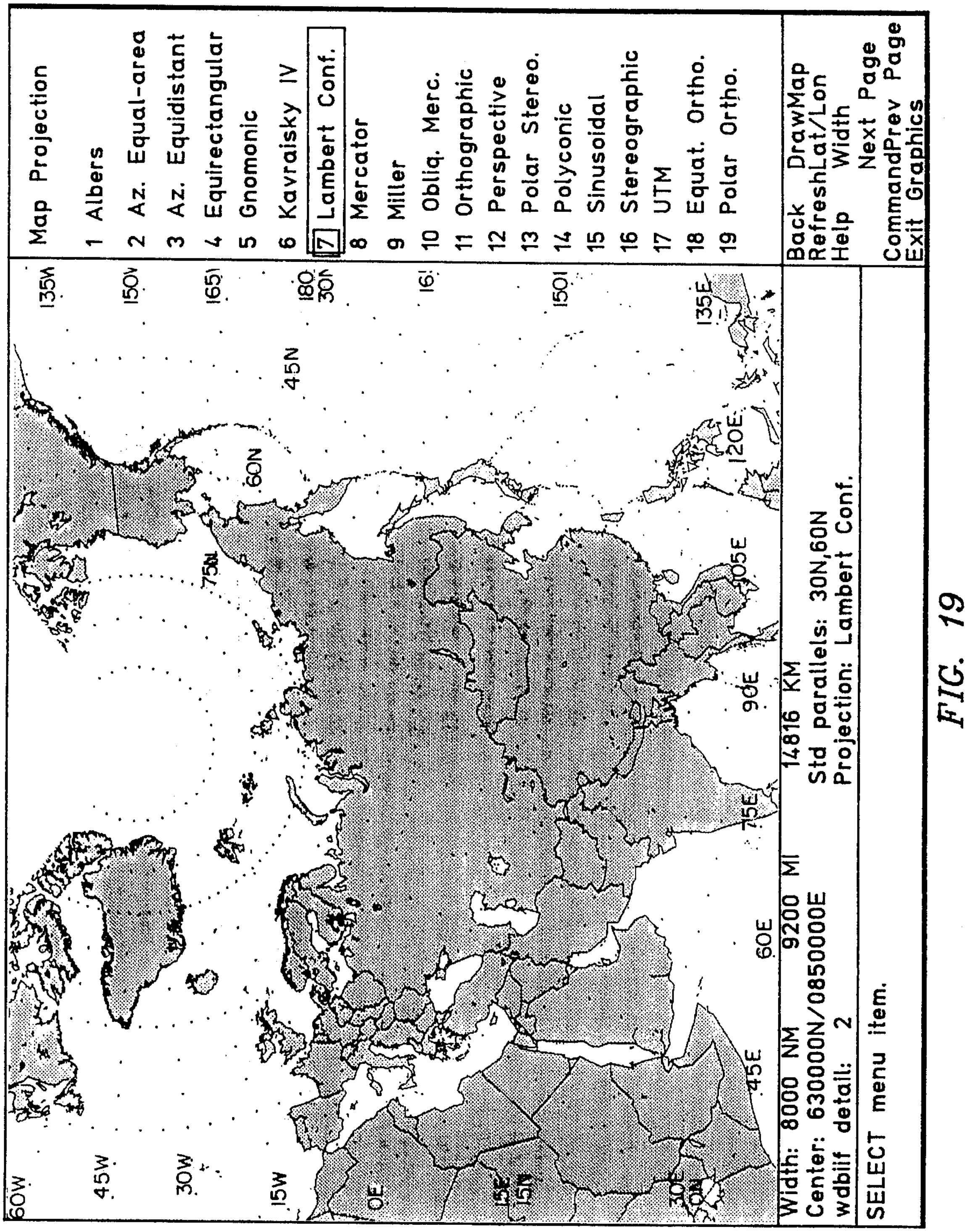
FIG. 19 hows a Lambert Conformal projection of Asia using selected standard parallels.
Figure 20:
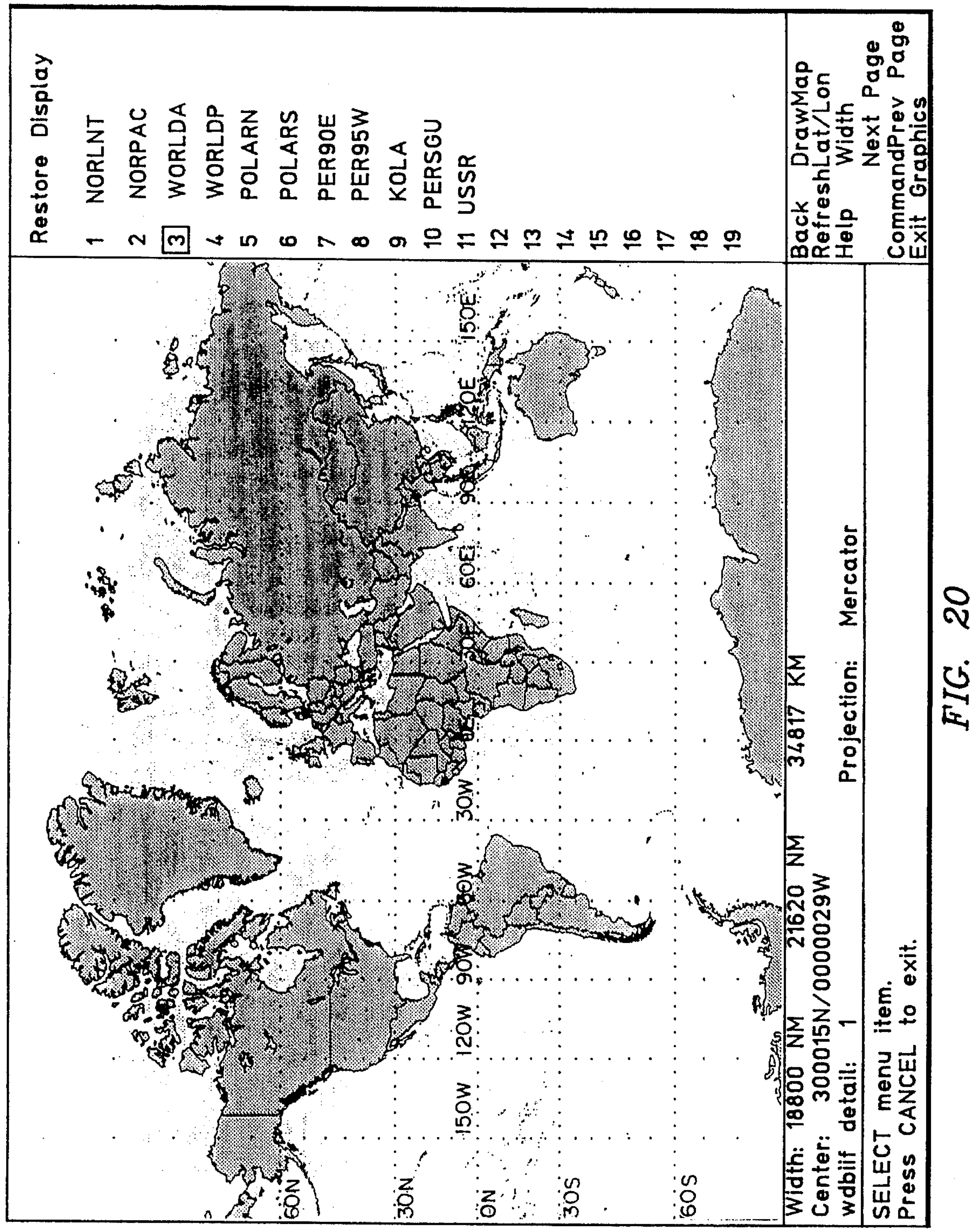
FIG. 20 shows a Restore Display menu using Mercator projection centered near the Meridian of Greenwich.
Figure 21:
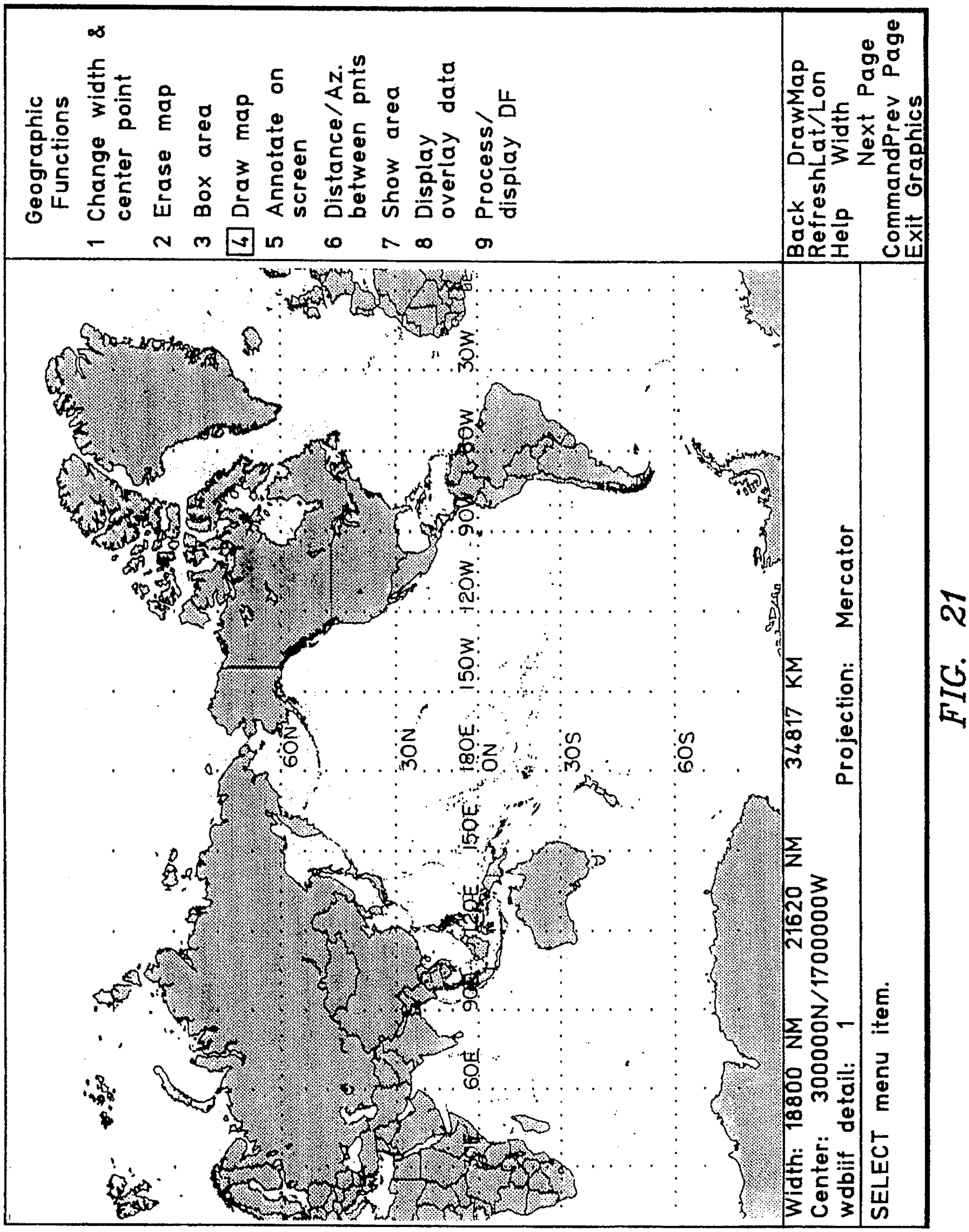
FIG. 21 shows a Mercator projection centered near the International Date Line.
Figure 22:
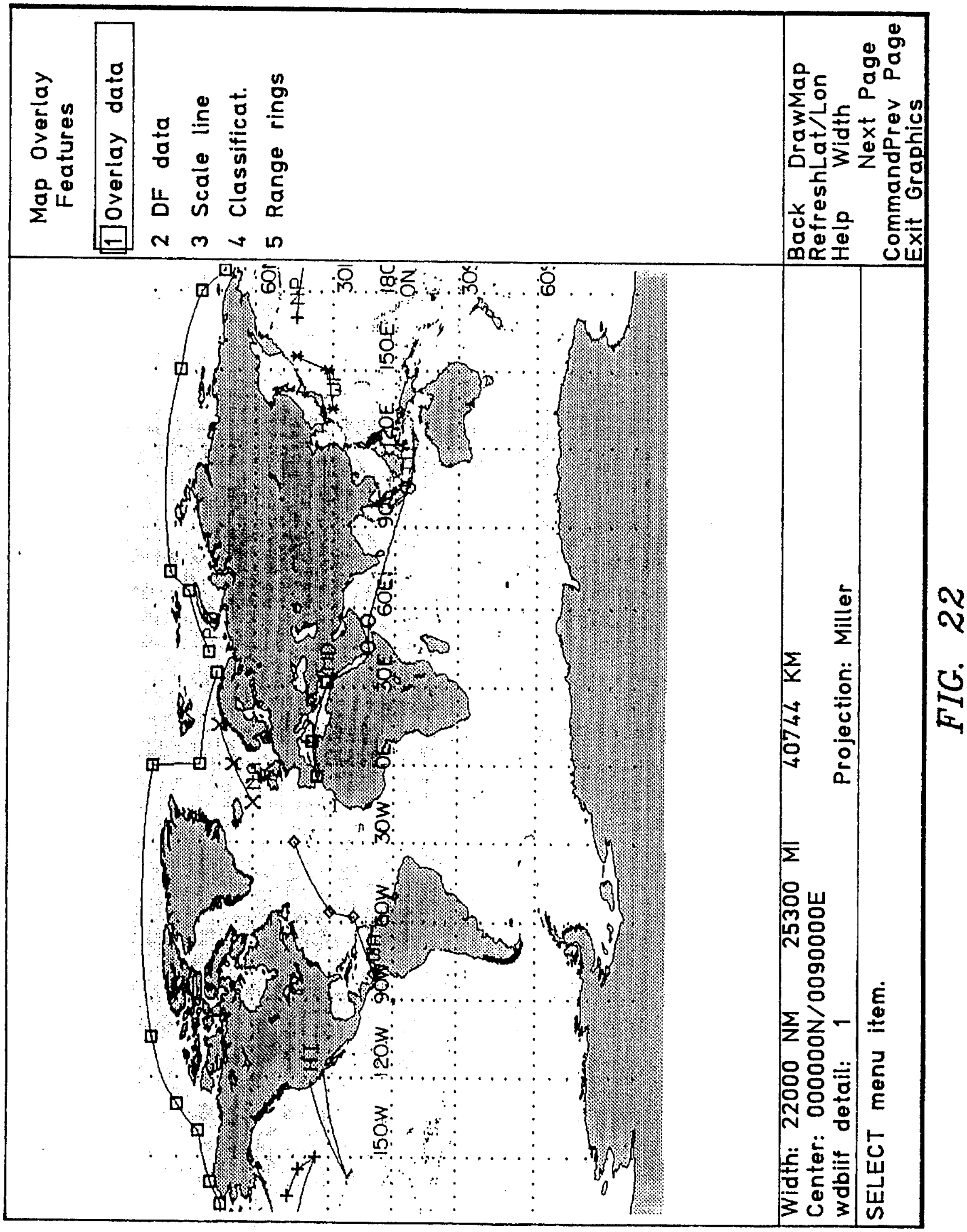
FIG. 22 shows a Map Overlay Features menu with overlay data using Miller projection.
Figure 23:
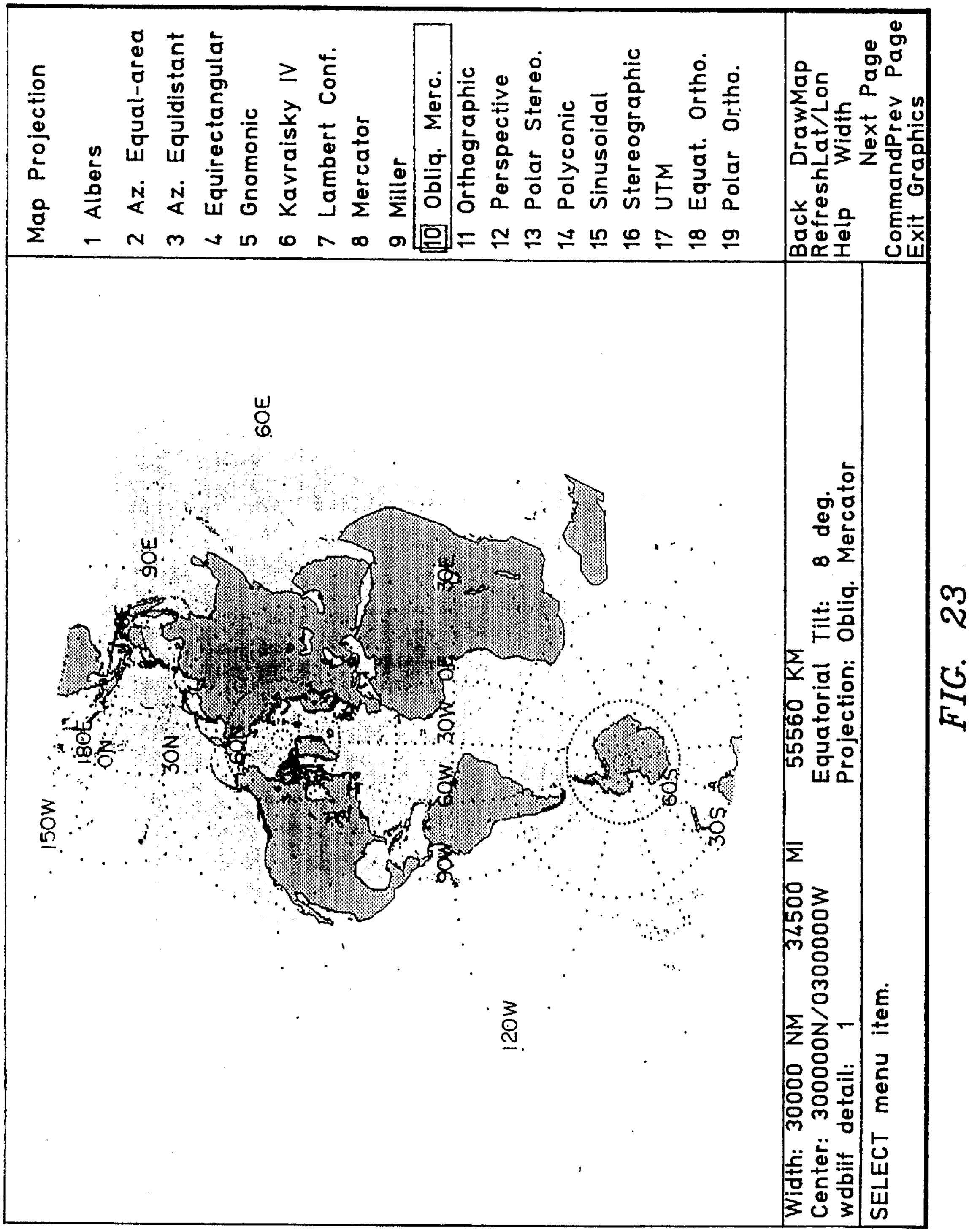
FIG. 23 shows an oblique Mercator projection with an arbitrary equatorial tilt angle.
Figure 24:
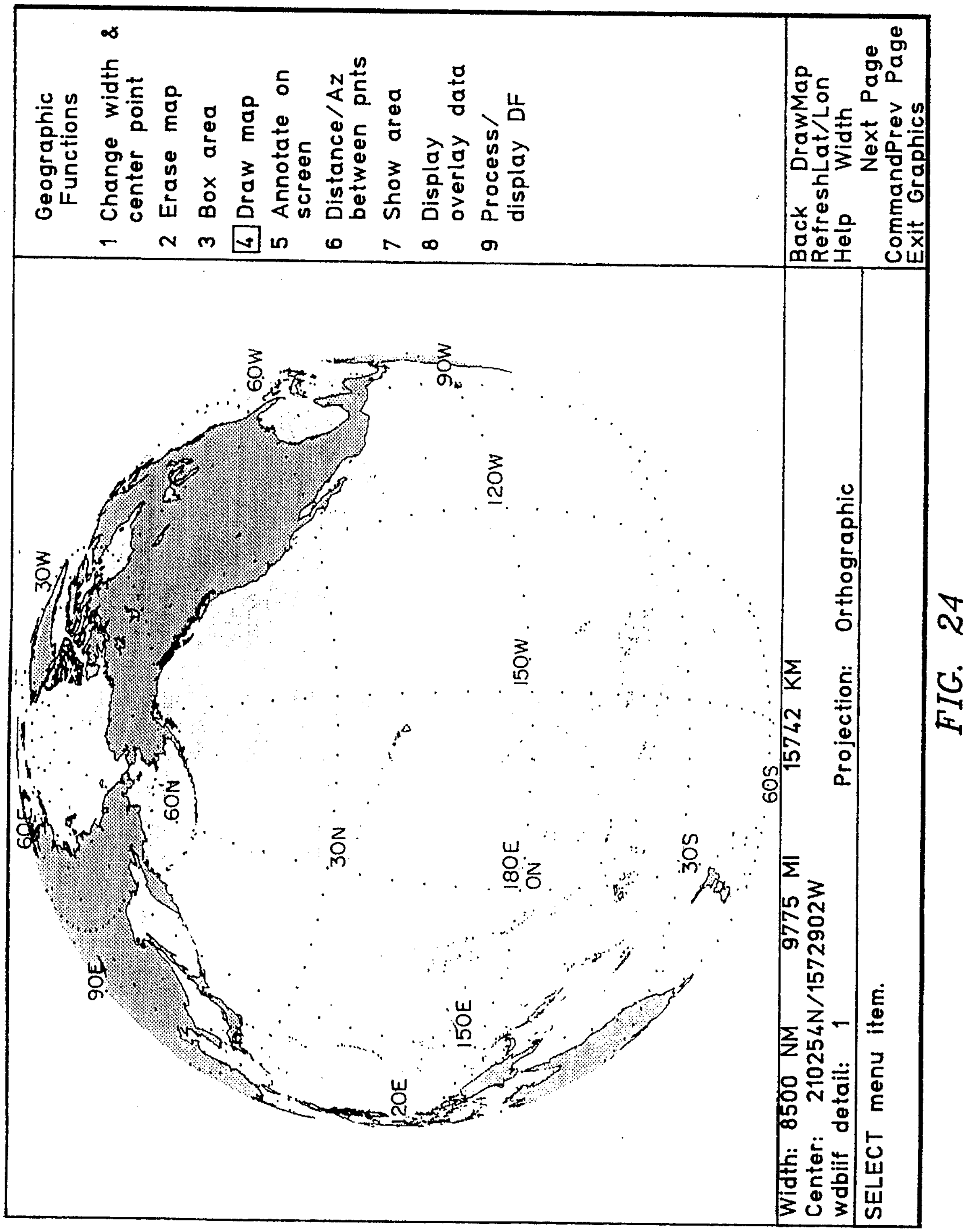
FIG. 24 shows an orthographic projection centered on the Hawaiian Islands.
Figure 25:
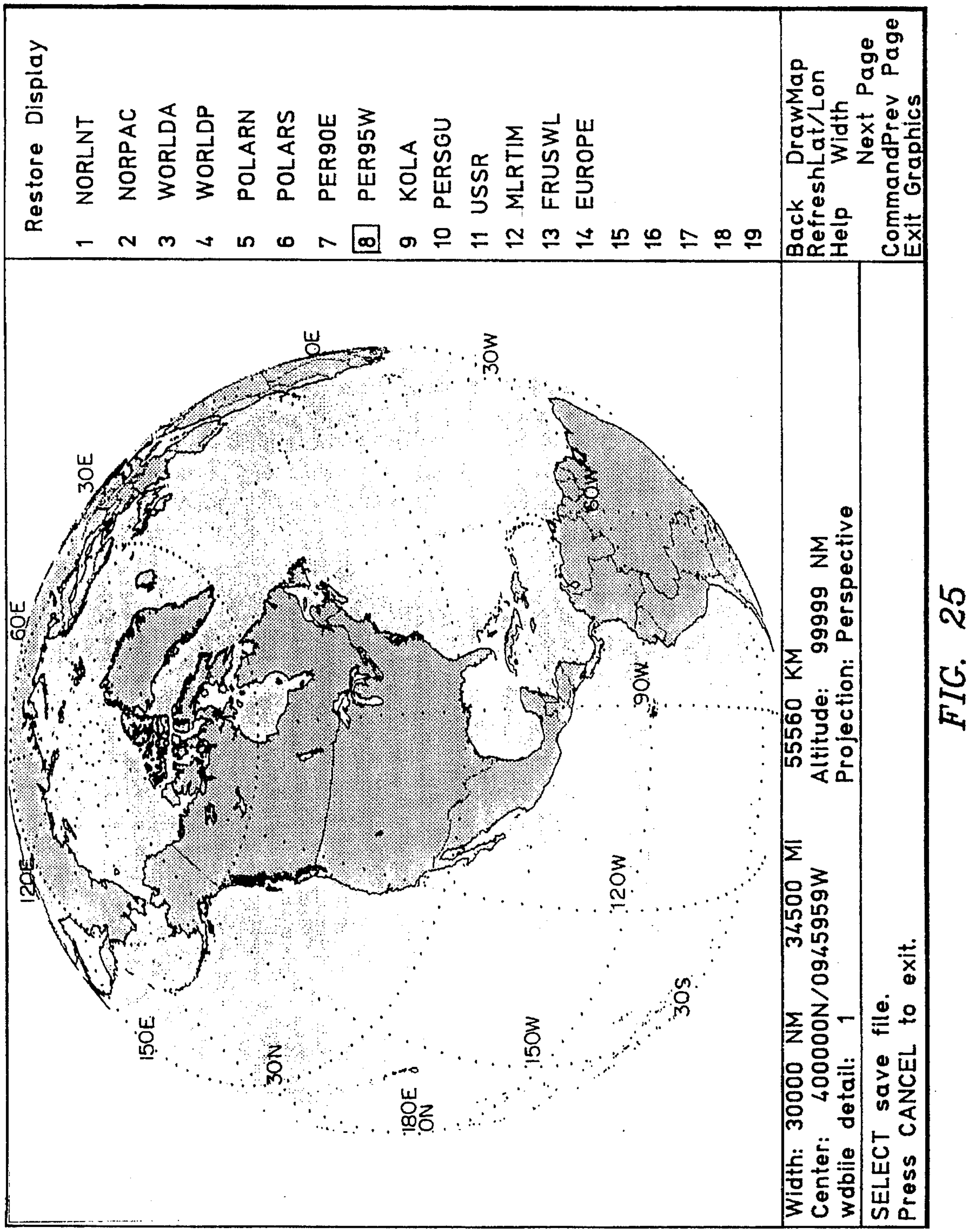
FIG. 25 shows a very high altitude perspective view above the United States.
Figure 26:
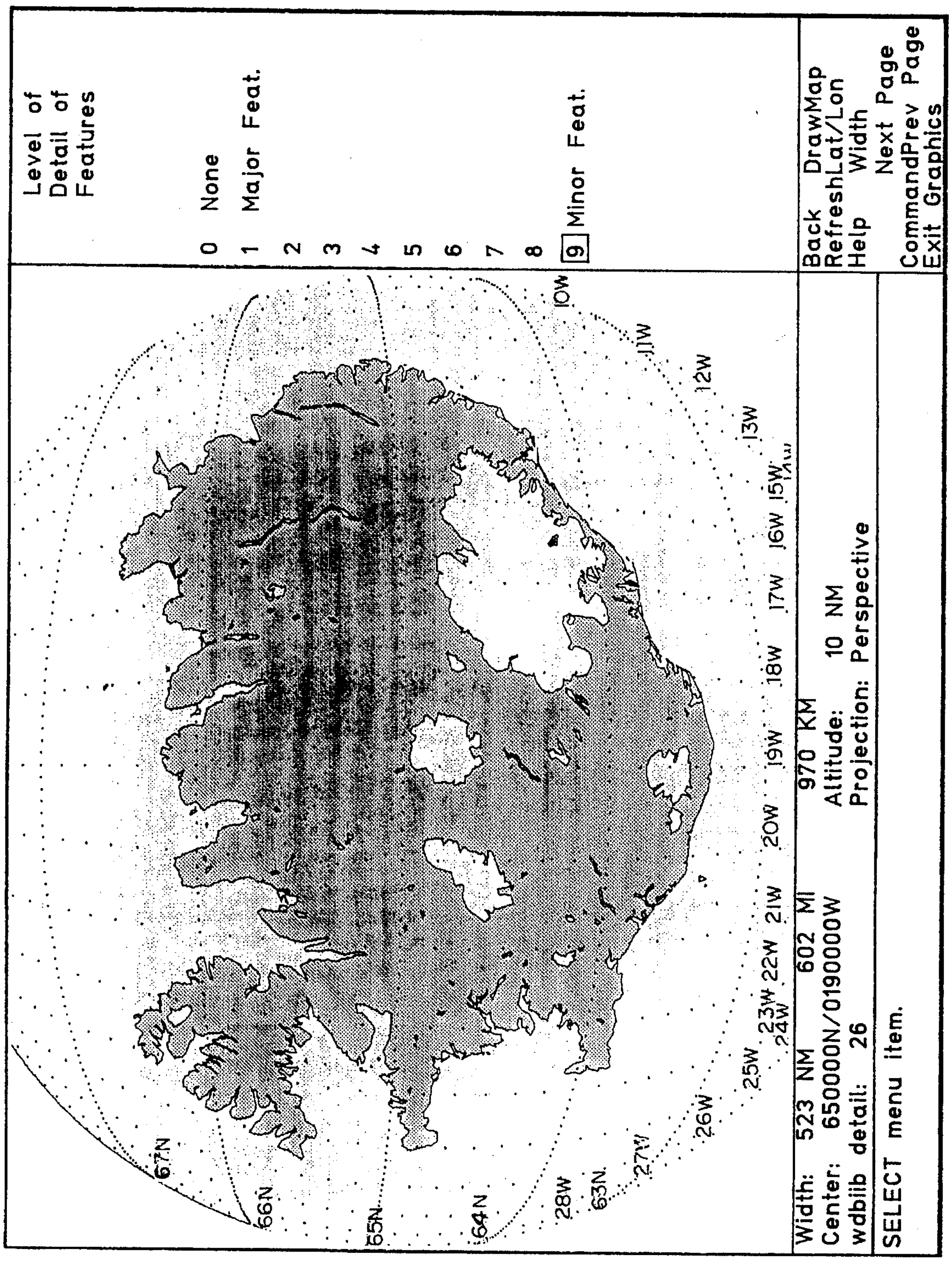
FIG. 26 shows a Level of Detail of Features menu with low altitude perspective view of Iceland.
Figure 27:
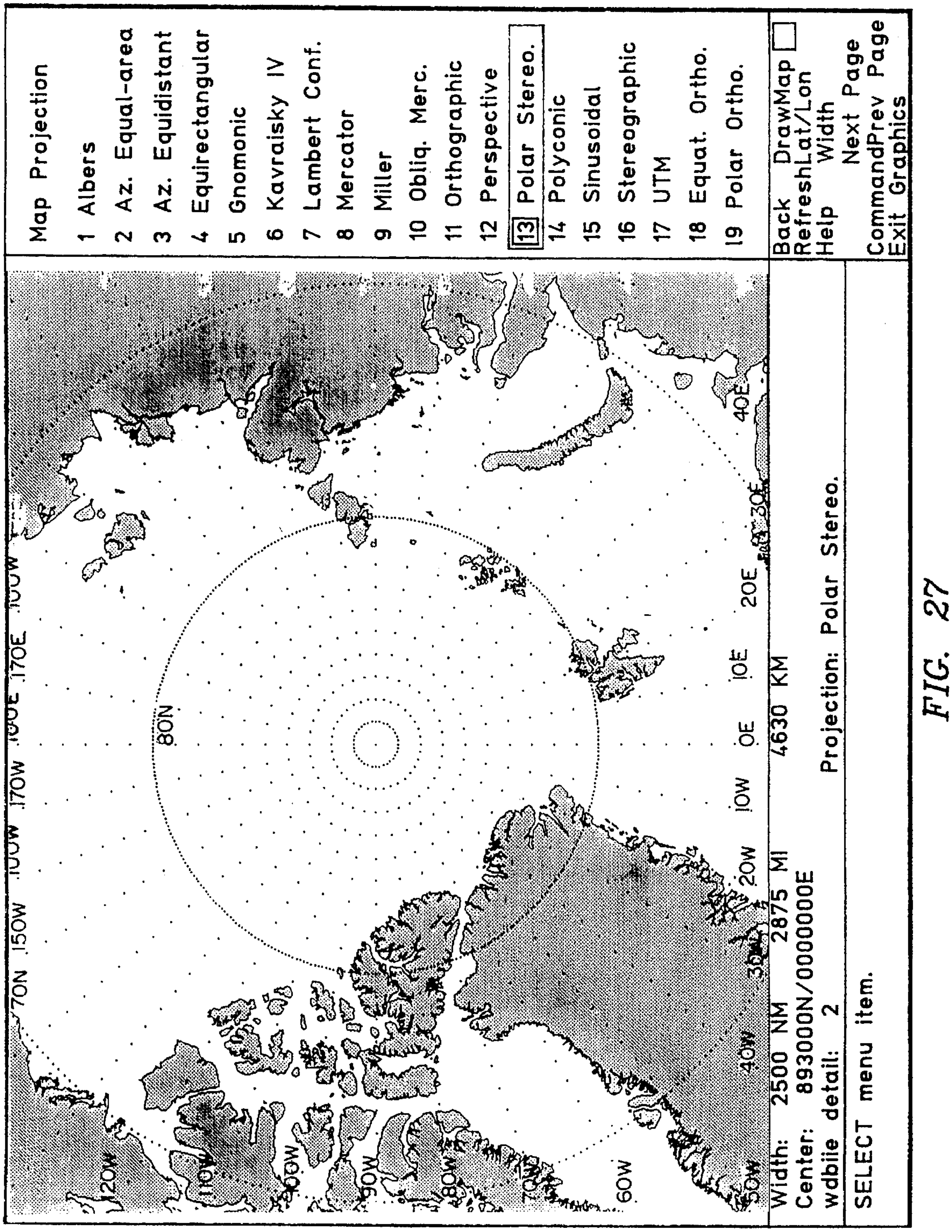
FIG. 27 shows a polar stereographic display centered near the North Pole.
Figure 28:
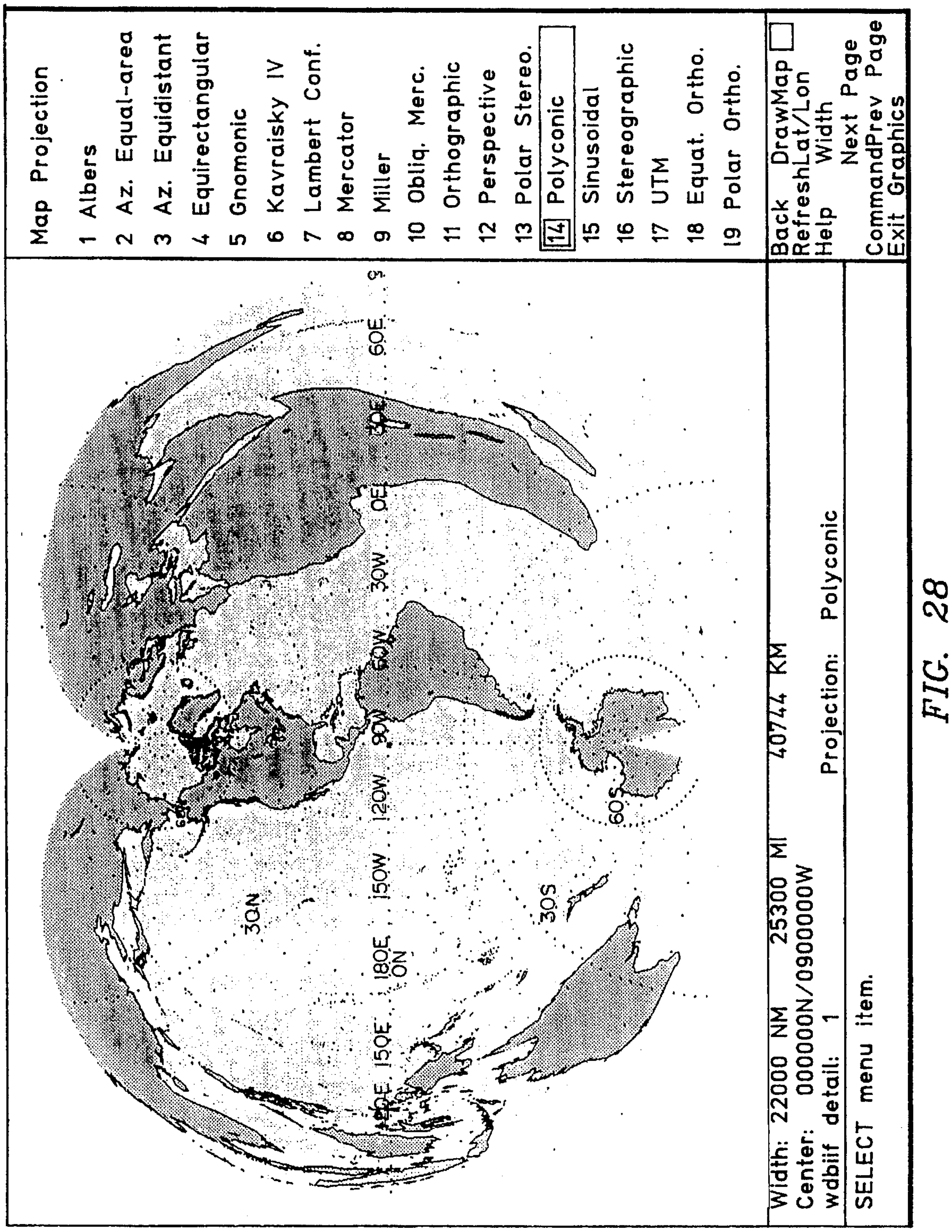
FIG. 28 shows a polyconic projection of entire world.
Figure 29:
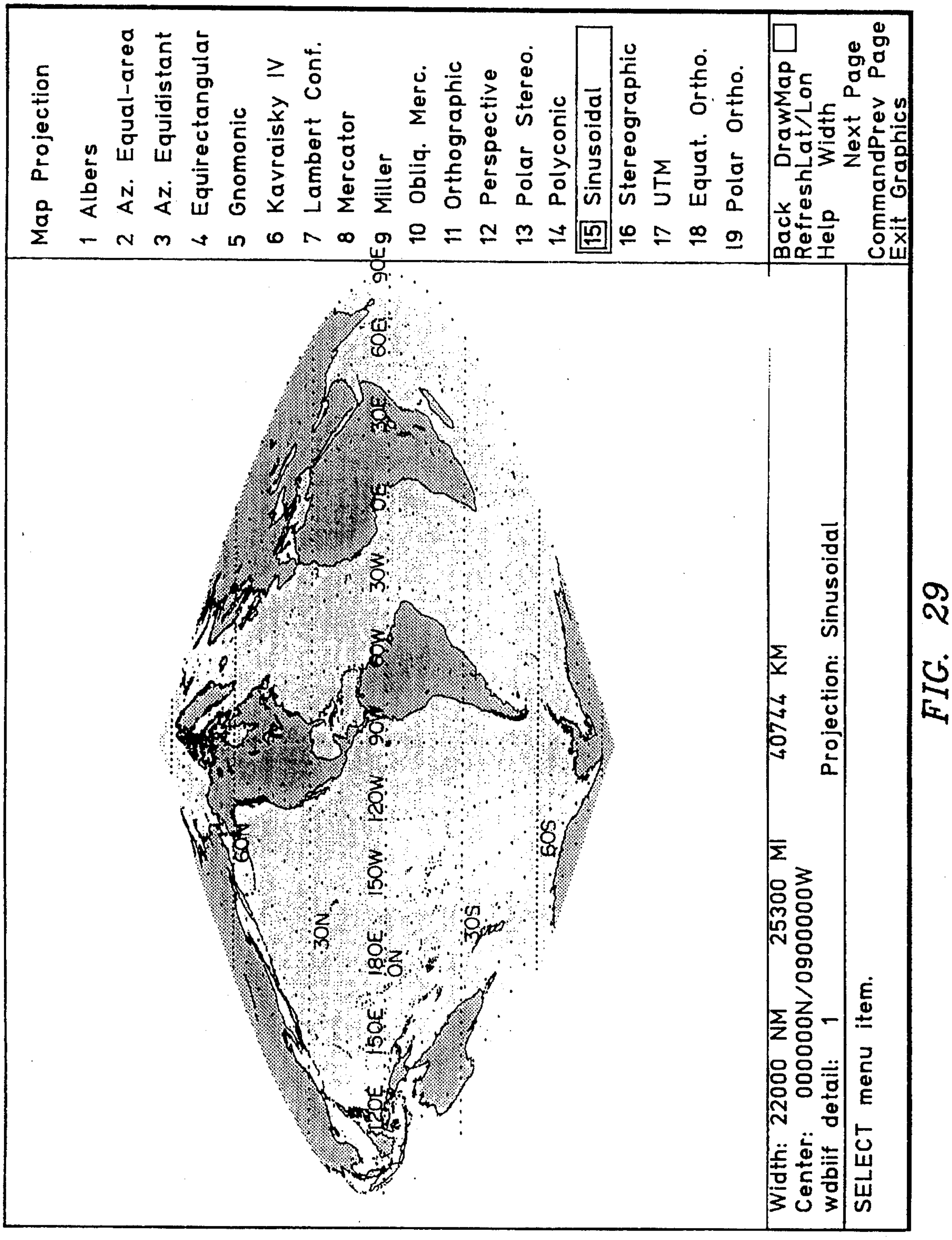
FIG. 29 shows a sinusoidal projection of entire world.
Figure 30:
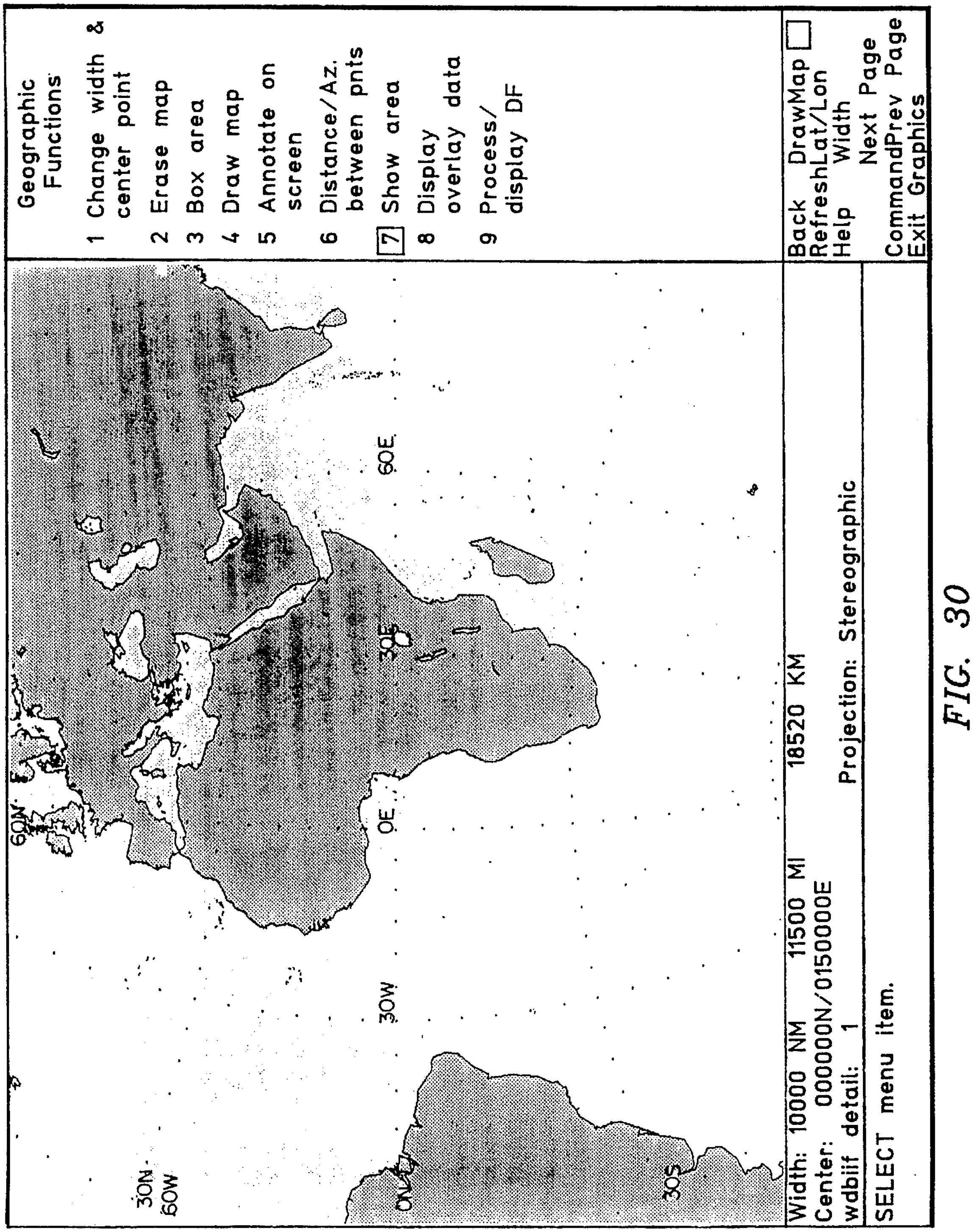
FIG. 30 shows a stereographic projection centered on Africa.
Figure 31:
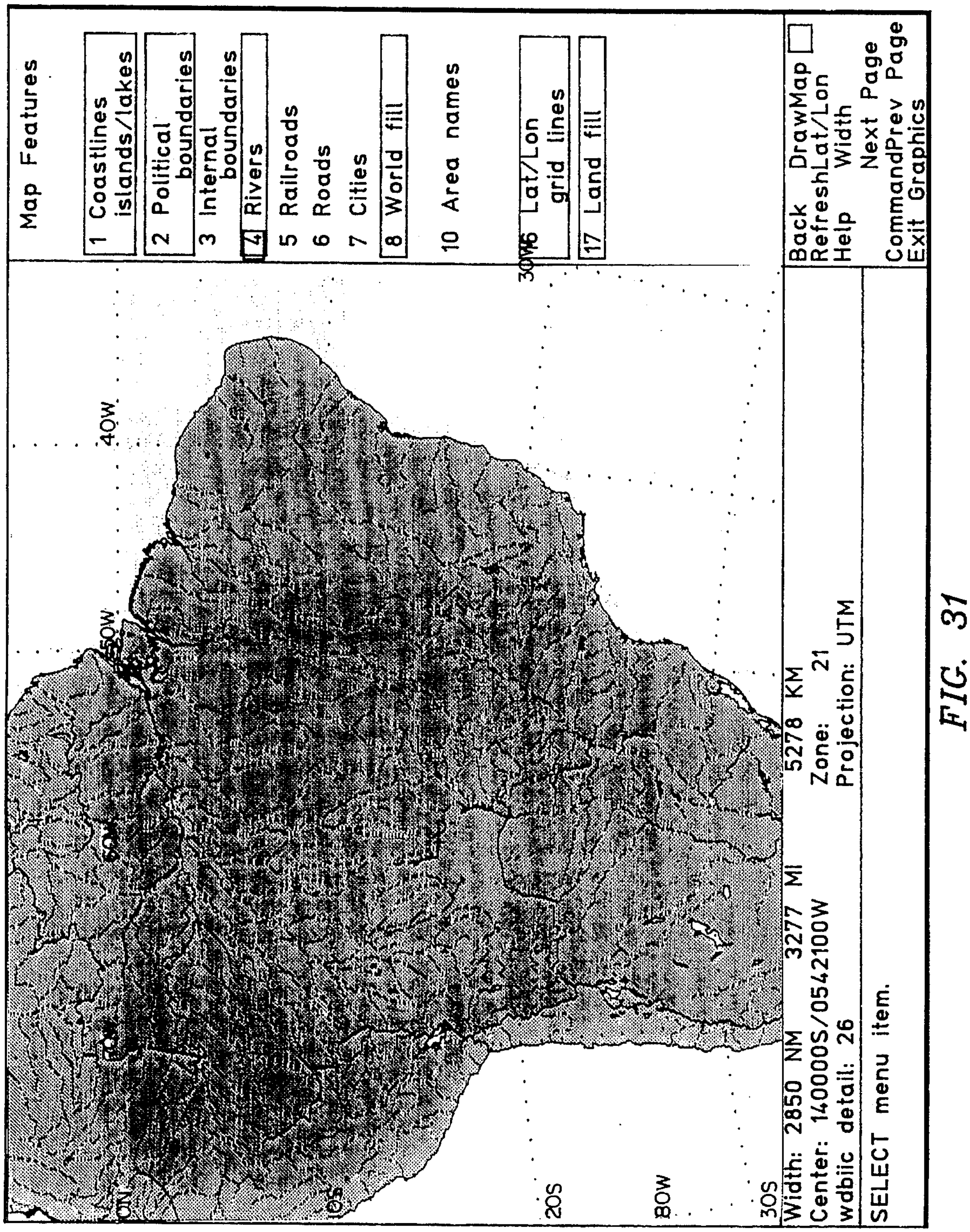
FIG. 31 shows a Map Features menu with Universal Transverse Mercator (UTM) projection showing a portion of South America with pollitical boundaries and rivers.
Figure 32:
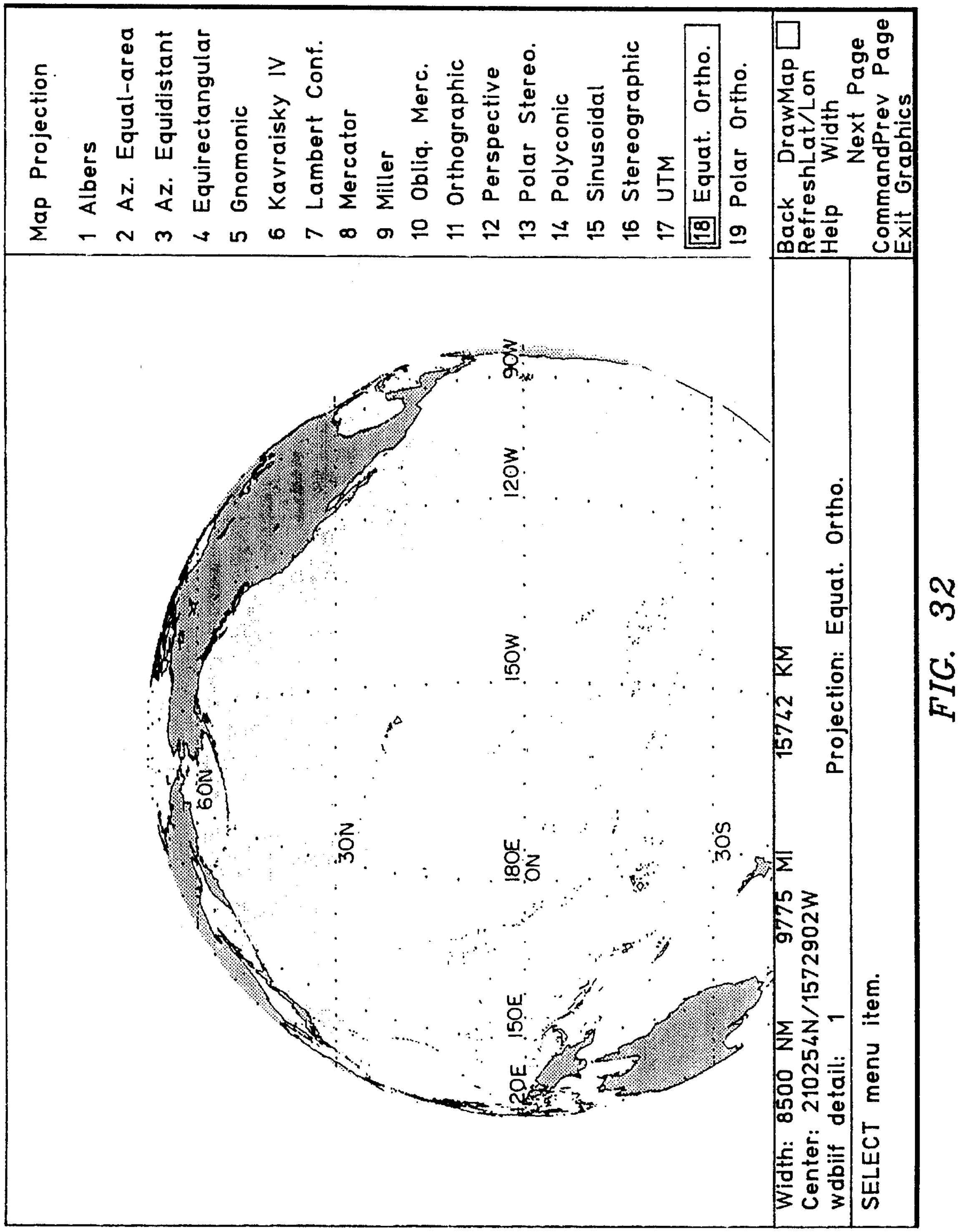
FIG. 32 shows an equatorial orthographic projection centered on Hawaii.
Figure 33:
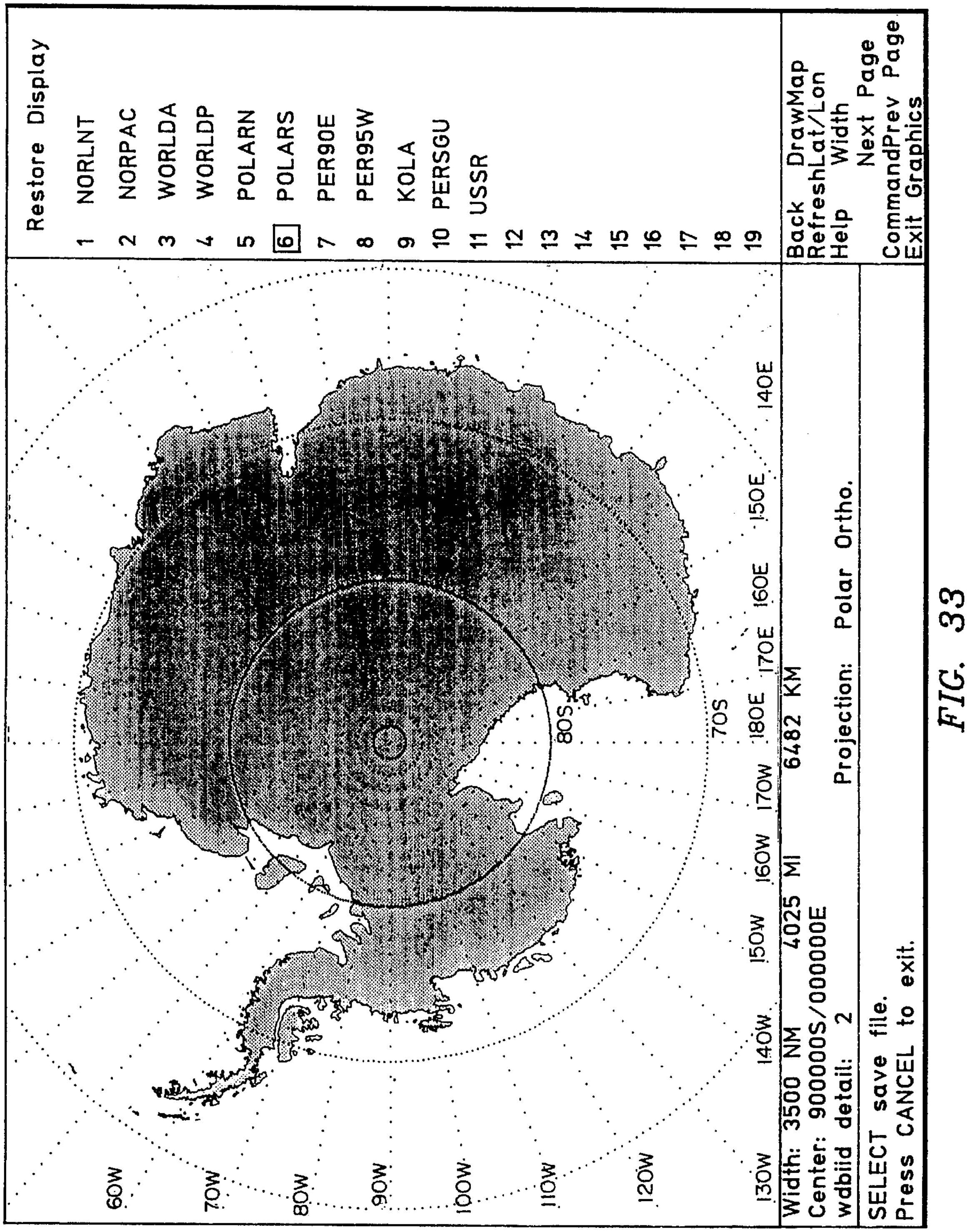
FIG. 33 shows a polar orthographic projection centered at the South Pole.

The Restore Display Feature menu is shown in FIG. 11. This feature allows the user to recall maps which previously have been defined and saved in the Save Display Feature menu. In the example, a Lambert Conformal map of Europe with preselected center point and standard parallels has been drawn. The range ring overlay has 100 nautical mile increments and is centered at The Hague.

The foregoing examples are only illustrative of some of the capabilities of display system 100. Some other possible capabilities are shown in FIGS. 12 through 33. These enumerated examples are not to be interpreted as being limiting, however. Polygon (region filled) maps or other desired displays can be constructed from any data base where closed polygons can be constructed directly, or constructed via additional processing. In other words, the concept of this invention could be applied wherever polylines are used to depict linear and/or areal features. Furthermore, its use is not limited solely to geographical data bases or geographical information. Other data banks, including celestial but not limited thereto, also could be portrayed in a variety of formats, as will be apparent to one skilled in the art to which this invention pertains in accordance with the teachings of this invention.

Displaying world maps requires graphic routines more complex than those commonly used in Cartesian geometry. For example, testing a point for inclusion in a polygonal area is fairly straightforward in plane geometry. However, On a sphere an analogous question comes up which asks, is the point within the smaller of the two regions defined by a spherical polygon Techniques which allow a visualization on the surface of a sphere versus a plane often require significantly more calculation. If applications covering more than a small geographic region is considered or if tracking objects which have a global range is involved, virtually all geometric manipulation and testing must be done with spherical geometry. Heretofore, conventional soft copy mapping systems have not completely provided this capability since they have been developed from less than a global perspective.

The library of subroutines to be elaborated on below are associated with spherical geometry and polygons. They provide spherical graphic subroutines that are analogous to the familiar two-dimensional drawing and clipping algorithms for both polylines and polygons. The drawing subroutines gracefully handle the singularities, discontinuities, and distortions that are found to occur when mapping the world onto a plane. These subroutines combine to provide projection independent graphics (with some reasonable constraints).

Figure 34:
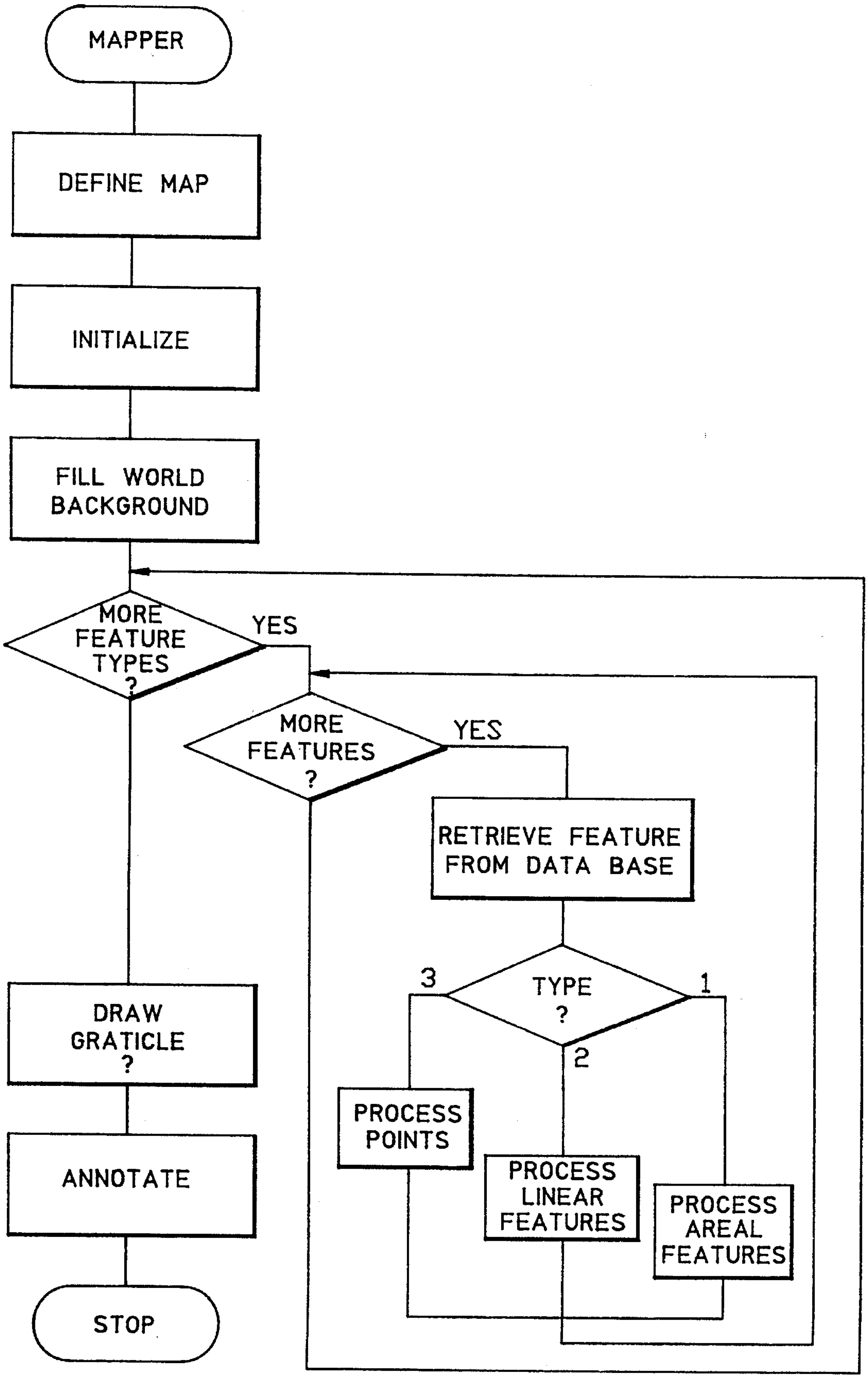
FIG. 34 is a representation of the map drawing process.

Referring now to FIG. 34, the process of generating a map display is set forth in a schematical representation. Specific maps to be displayed are defined by a set of parameters including projection, geographic location of viewport center, geographic location of projection center, scale at center, categories of features displayed, minimum feature size, and vector resolution. Changes in the definition are made by menu item selection and toggling, or by interactive area selection from another map. Coordinates can also be inputted numerically. Once defined, parameter sets can be stored to facilitate future use of the map.

As mentioned before, the CARMAPTH file subroutines in the program listings of the Appendix are the identified subroutines that effect discrete signal transformations of the data in the following description. By these signal transformations the salient features of the invention provide a heretofore unattainable capability.

The entire program is loaded and, after definition of the specific maps by the desired parameters, an initialization is performed by subroutine BLSET which sets up clipping conditions for the map edges. The subroutine INITIA computes any constants and offsets associated with the currently designated projection. The subroutine LIMIT2 calculates the geographic limits of the display. If the "world fill" option has been selected, a fill color, generally blue for water, is used to display a background for the viewable geographical region and is created by subroutine D2OUTL. This geographical region may be bounded by viewport limits, the map geographic limits, or in some projections, a horizon.

Feature categories such as islands, roads, etc., are toggled on and off by the user and the data are accessed by index tables to display them in a proper overwrite sequence with lakes containing islands, and with linear or point features after areal ones. Point features are written directly by placing a point or other marker directly on the display. Linear features are subjected to clipping at the map edges in accordance with the subroutine BLPLIN and plotted in great circle line segments by the coaction of the subroutine LL2GC. Areal features are drawn by converting data base polylines into closed polygonal areas and is accomplished by subroutine DMAPII, removing any projection singularities that may lie inside the areas is accomplished by the operation of subroutine BLSING, and clipping at the map edges is attributed to subroutine BLPLGN.

Upon completion of all the selected features, a map graticle is superimposed and a legend box is displayed such as, for example, those shown next to the map display area on each of the preceding figures.

The conversion of geographic and display coordinates is performed by the subroutines which contain a basic set of polyline mapping routines, one for each of the projections which apply specific map transformations in accordance with the subroutines PXALBR, PXAZED, PXAZEA, PXEQRE, PXGNOM, PXKAVR, PXLAMC, PXMERC, PXMILL, PXOBLM, PXORTH, PXOREQ, PXORPO, PXPERS, PXPOLY, PXPOST, PXSINU, PXSTER, PXUTMZ AND PXVDGN depending on what map projection is desired. It is to be noted that the subroutine PXVDGN is unused presently to allow capability expansion. All of these subroutines have a similar structure facilitating projection additions or modifications. A typical subroutine maps latitude/longitude from a unit spheroid onto a plane of projection, then applies a two-dimensional viewing transformation so that the area displayed can be scaled, offset and rotate with respect to the projection center. Data such as center location, geographic span, standard parallels and reasonable default values for unspecified parameters are placed in storage common to all the projection routines. These data are used when the user switches between any of the projections, resulting in a presentation of approximately the same geographic area. In the event an input point cannot be mapped uniquely onto the plane of projection or if it lies over a perspective viewing horizon, an invalid flag is set to allow exception processing.

Subroutine LLPLXY allows projection independent conversion of geographic polylines to display coordinates for the currently specified projection. It is simply a case. statement which selects the coordinate conversion subroutine containing the mapping equations for the specific projection. The basic idea is to isolate projection specific mathematics to this subroutine level, allowing higher level graphic routines to call it in a projection independent manner. This makes installation of a new projection very simple since all that is required is to add a new case statement along with its associated conversion subroutine, such as, PXALBR et seq.

The calculation of the geographic coordinates which correspond to any point on the display is performed by an iterative method that is independent of projection. This capability by the operation of subroutine XY2LL is of major importance in soft-copy mapping and can be troublesome to achieve since not all projections have simple inverse transformations. A two-dimensional iterative (Newton-Raphson) method is used to avoid the complexity of maintaining a complete set of inverse mapping equations. The iterative technique is essential to convert from screen coordinates to latitude/longitude coordinates. The Newton-Raphson method is accomplished by subroutine XPGENR and makes use of the mapping equations that are invoked for latitude and longitude to display conversion. For many projections there is no closed solution form.

Figure 35:
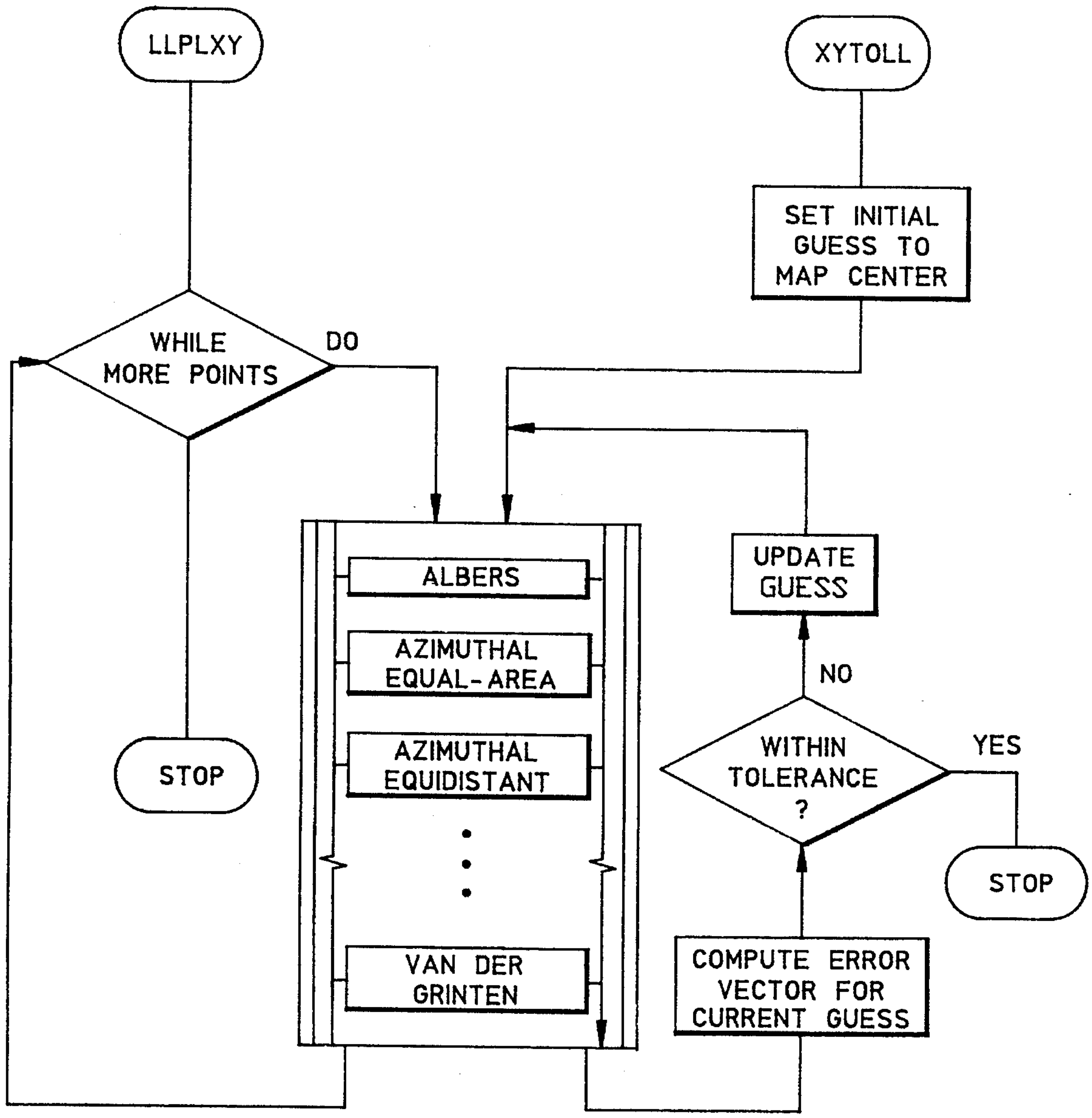
FIG. 35 represents the use of a common library of mapping equations to provide projection independent conversion to and from map locations.

The following special boundary conditions are set up to ensure that the iteration does not wander outside of the valid map domain and to increase the probability of convergence. First, perturbation direction for calculating partial derivatives is set up so that it is always away from the nearest pole. Secondly, iteration is not allowed to wander all the way to a pole, but can get close enough to return a satisfactory solution should one lie near or at a pole. Thirdly, the maximum arc distance for any single iteration is 10 degrees. In practice an average of 12 iterations is required to locate points. However, efficiency is not important since the routine mainly is used for single point measurements. This method works well on all projections tested except for azimuthal equidistant and azimuthal equal-area, both of which have extreme angular distortion near their singular antipodal points and require either additional constraints or a closed solution form which is provided by the subroutines XPAZEA and XPAZED. The coordinate conversions are illustrated schematically in FIG. 35.

Projection independent, feature plotting on a generalized map is accomplished as a consequence of robust graphic algorithms. These algorithms result from considering the various boundary conditions of a generalized conic projection. Map projections historically have been divided into three major categories with each having distinctive appearances.

These are, first, azimuthal, where any position is plotted radially from a central point; second, cylindrical, where points are projected from a central axis onto the cylinder which is then developed onto a plane and, third, conic, where points are projected from a central axis onto a cone and similarly developed onto a plane.

Actually, oblique conic projections, where the central axis can be positioned on any diameter of the spheroid, are sufficiently general to include all three of the categories named in the preceding paragraph. When the central angle of the cone reaches 90 degrees, azimuthal projections centered at the apex are generated. At the other extreme where the cone angle is 0 degrees, the cylindrical projections are generated.

When generating graphic displays for an oblique conic, there are boundary cases which must be handled with special processing. These boundary cases are: first, the line along which the cone is separated (the interruption line) to allow development of the conic surface onto the mapping plane and where all areal and lineal features must be clipped, and second, the points on the great circle of the interruption where the axis of the cone intersects the earth spheroid (the oblique poles). The oblique poles may or may not be mapped in a one-to-one fashion, and polar singularities are common. Other points along the interruption usually are mapped one-to-two defining two of the map boundaries. Having the immediately foregoing in mind, plotting techniques have been developed for a generalized map which includes, but is not limited to, oblique conics. Also included are mappings where the great circle of the interruption is reproduced as a curve. The map projections handled by this inventive concept are all those where discontinuities may occur only along a single great circle interruption, and where singularities, or one-to-many mappings, may only occur at two diametrically opposed points on that interruption. FIGS. **36*a* and 37*a*** display the interruption line and singularities of an Oblique Mercator map.

The clipping of features on the generalized map is performed in accordance with the following. During the initialization of a new map, points defining the interruption line are set up in accordance with the specified subroutine BLSET. The interruption is always passed through the point 90 degrees from an oblique pole and on the opposite side of the spheroid to the mathematical map center. The line is oriented along the great circle which lies in the same plane as the axis of the cone (tilt angle). The points at the end of the clip line are not placed exactly at the poles, but are displaced a very small distance toward the midpoint allowing calculation in projections where the poles are singular.

For mathematical simplicity, all analyses involving the interruption are done in rectangular plane coordinates superpositioned on a stereographic projection of the spheroid centered on the interruption line, midway between the two oblique poles. This stereographic projection has several well-known and attractive properties. These are, all points on the spheroid except the one diametrically opposed to the projection center have a one-to-one mapping. Another property is that the map contains no discontinuities and there are no angular distortions. Any great circle passing through the projection center, hence the great circle on the interruption is mapped to a straight line. In order to clip features to both boundaries of the developed cone, two separate clip lines are used. They are set up in the interruption centered stereographic projection and area parallel to the interruption, but displaced a small distance to each side of it. Map features which intersect the interruption are clipped at each of these straight lines.

With respect to polygon clipping, any polygon which has the possibility of intersecting the interruption must be clipped and the resulting polygon segments plotted individually. Clipping at the interruption involves three steps: first, any areal features are transformed into the interruption centered stereographic projection by operation of the subroutine BL2XY, next, conventional planar polygon clipping is applied to each of the straightened clip lines as a consequence of the subroutine BLPLGN, and finally, the transformation is inverted, taking the resulting multiple feature segments back to spherical coordinates via the subroutine BL2LL. Each segment finally is converted to display coordinates by the operation of subroutine LLPLXY and plotted.

Figure 36A:
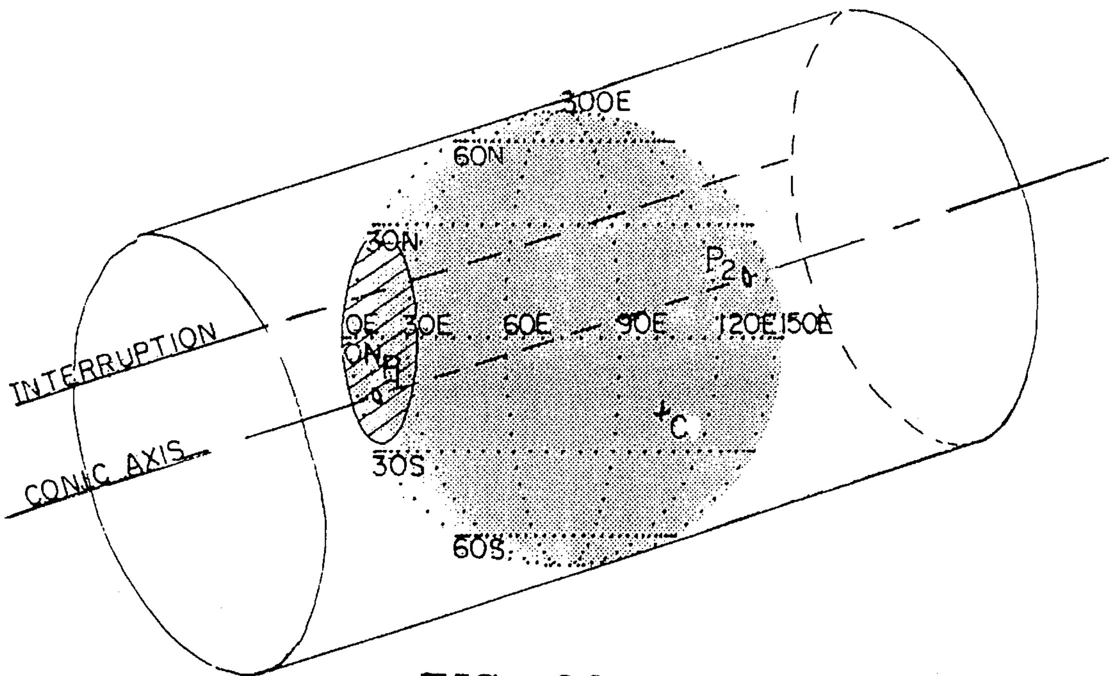
FIG. 36*a* and 36*b* show clipping features of map boundaries and poles.
Figure 36B:
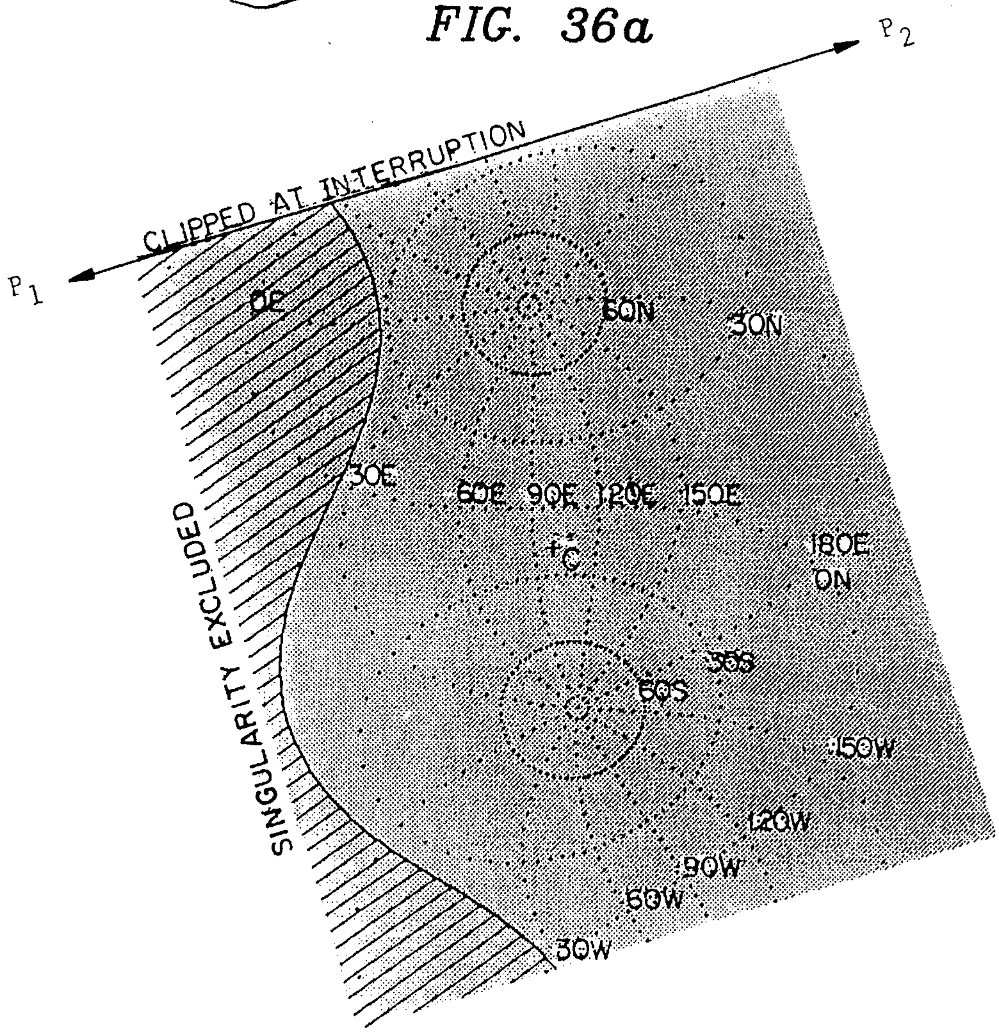
Figure 37A:
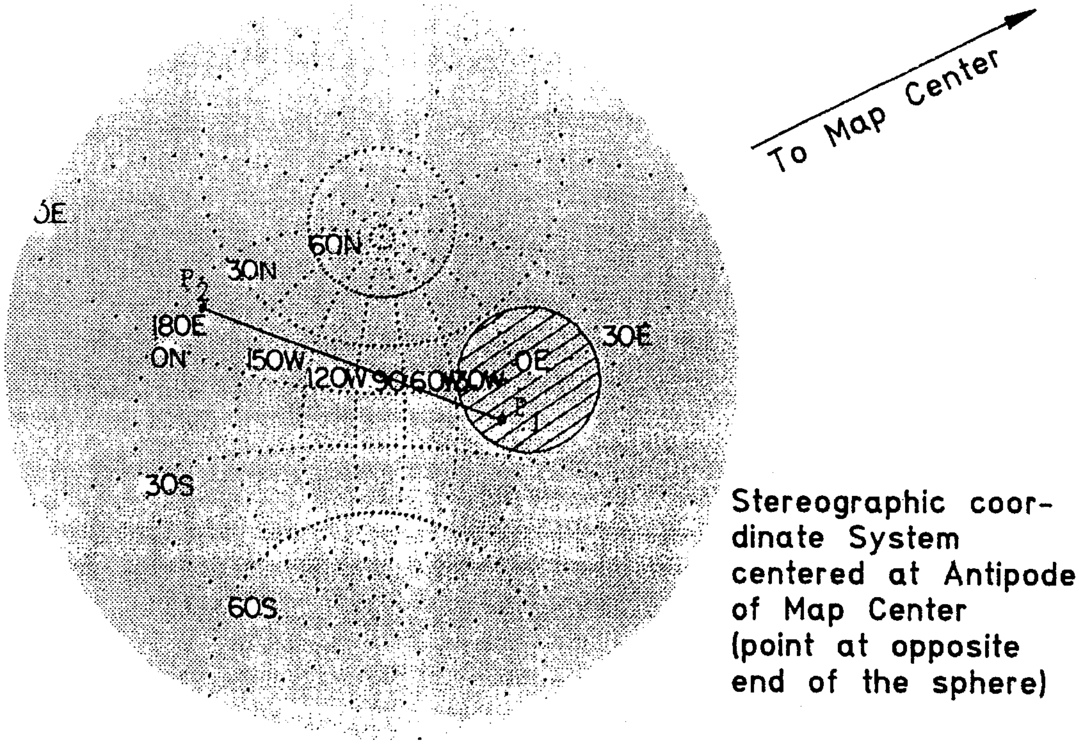
FIG. 37*a* and 37*b* show a keyhole-shaped area cut from a polygon to exclude a singularity.
Figure 37B:
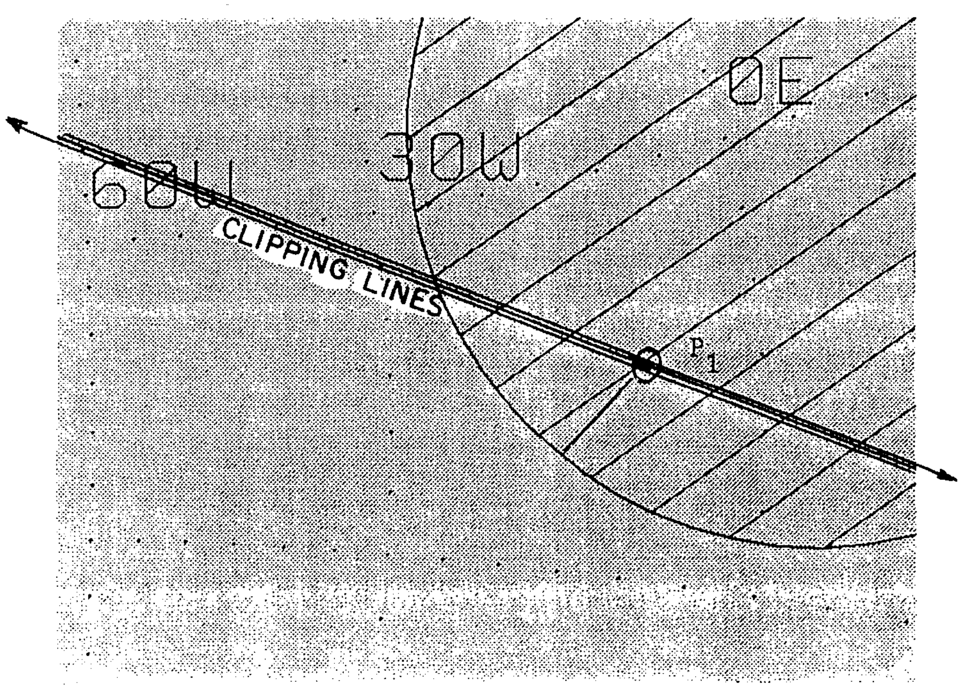

Areal features have the additional problem of possibly containing unplottable points. Region filling or hatching of a polygon containing an oblique pole or antipole is accomplished by excluding the possible singularity or singularities from the interior region. This is done by appending polyline segments, tracing a path inside the polygon along the interruption to the proximity of the included pole, circling around the pole at a radial distance just large enough to allow point calculation, and then retracing the interruption back to the original polygon edge (by the operation of subroutine BLSING). The total geographic area cut from the feature by this process is negligible. All points remaining inside the modified polygonal area are insured a one-to-one mapping to a large number of common map projections. When the outline of the appended region is mapped into the final projection, it coincides with the exterior map boundary, both at the interruption and at the poles. FIGS. 36*a* and *b* and 37*a* and *b* are representative depictions of the steps performed in polygon clipping.

With respect to polyline clipping, linear features such as platform tracks are always clipped at the interruption. Again, the method is to perform clipping in a coordinate system where the interruption is a straight line. Should the output polyline pass close by a singularity, a very small gap is inserted to avoid it by the subroutine BLPLIN.

Figure 38:
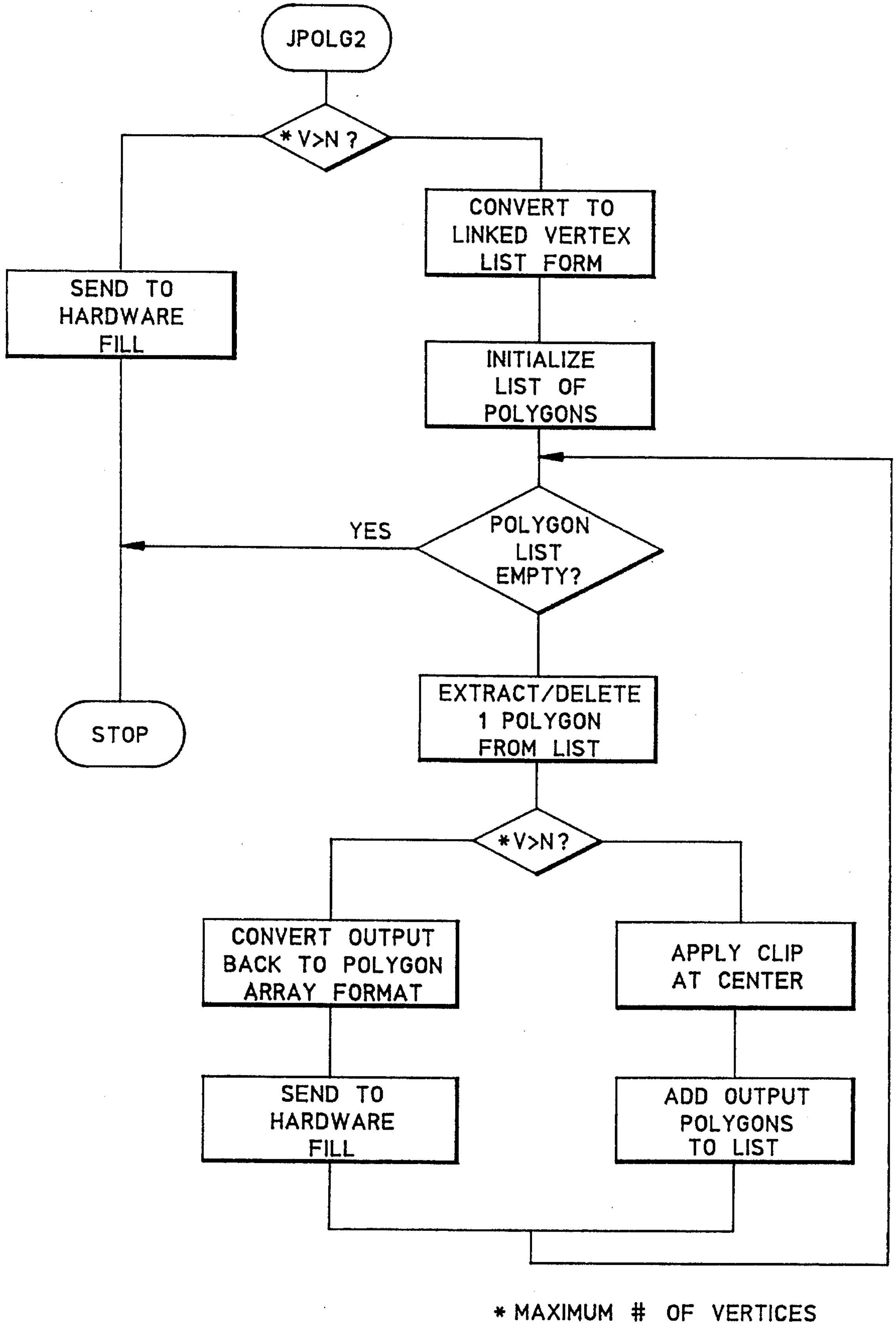
FIG. 38 represents the using of hardware fill-on polygons of any size.

The display system also possesses the capability for circumventing polygon vertex limits. High resolution geographic data bases also pose a problem associated with polygon length. While most of the polylines in any data base will be quite short, fractal-like shorelines can sometimes have thousands of vertices. Most modern graphic display terminals have special purpose hardware for rapid filling of polygons, but they also have a relatively low limit on the maximum number of vertices in any individual polygon. In at least one popular display system, the limit is only 66 vertices, totally unsuitable for map accuracy depiction of natural geographic features. In order to exploit the very desirable hardware filling capability of this inventive concept, a binary polygon dissector subrouting JPOLG2 is included which is transparently invoked whenever an attempt is made to fill polygons exceeding a system specific limit. Large polygons are clipped in an iterative manner on the display plane until all resulting subsections are sufficiently reduced. The subroutine associated with this operation is characterized in FIG. 38.

Another feature of the display system is its great circle polyline plotting capability. Polyline is a wellestablished graphics term that refers to a connected sequence of line segments. Very detailed and high density data, such as a shoreline, can be transformed into map coordinates and directly plotted using straight line segments. On the other hand, it is necessary to display polylimae segments as great circles with features, such as country boundaries or graphic overlays, where there is a significant distance between sequential points. Great circle plotting becomes particularly important when the polyline passes through a map region possessing high geometric distortion.

Figure 39:
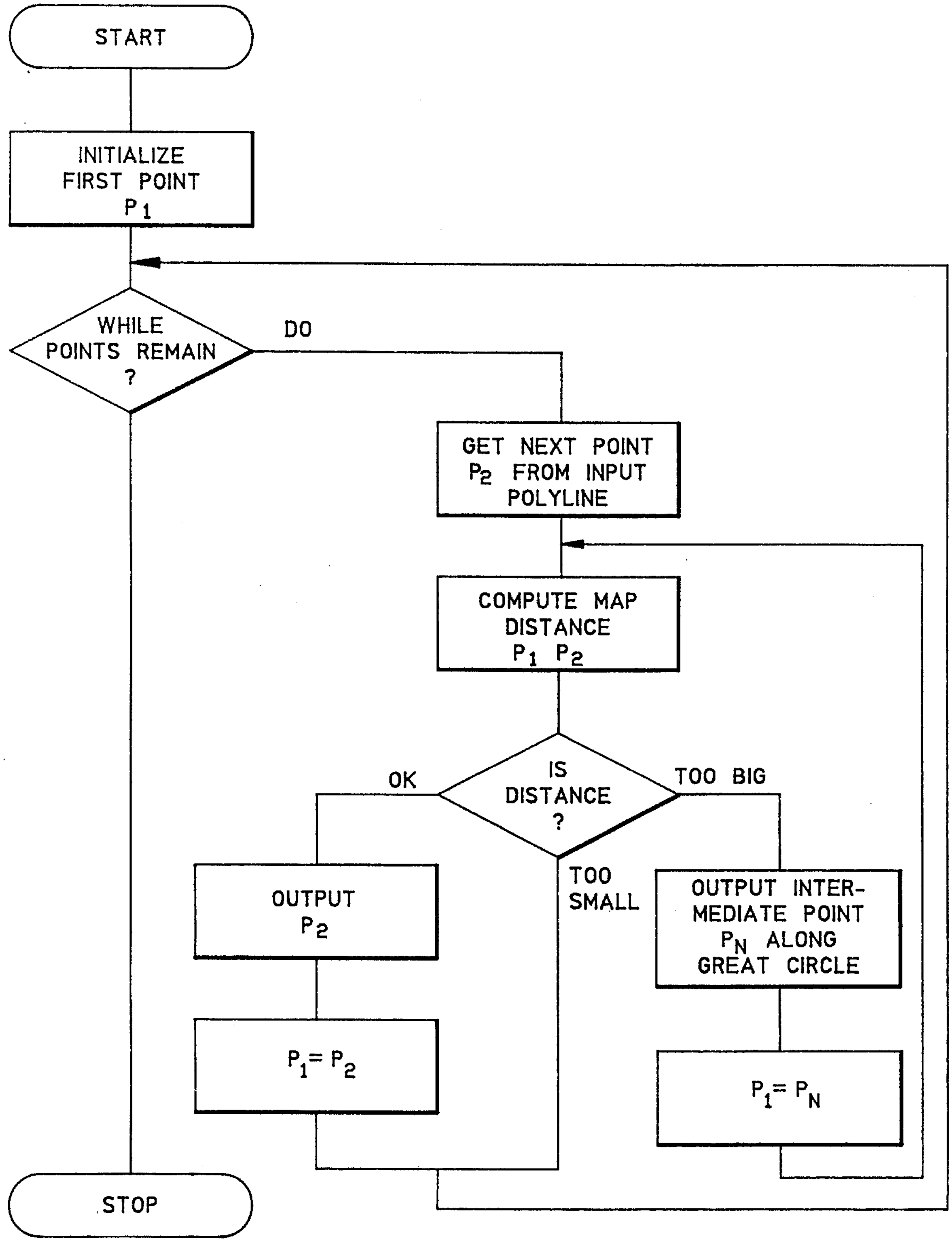
FIG. 39 shows projection independent plotting of great circle polylines.

Polylines can be conditioned so as to accurately map with great circular segments by adding intermediate points at regular map intervals along the bearing between adjacent input vertices. Subroutine LL2GC of program 50 in computer 40 performs this task, transforming the character of the data from source 30 by recomputing geographic polyline vertices based on differential map distances in the currently selected projection. Thus, this signal transformation ensures smoothly plotted great circle segments. It also eliminates any segments which project to lengths below map resolution that would otherwise add nothing to the display quality. The output polyline may contain fewer or more vertices than the input, but for any projection, the number will approximate the minimum required to exceed specified map accuracy, see FIG. 39.

One of the problems associated with working any mapping data base is to reconstruct or aggregate polylines into closed polygonal regions. Modern geographic information systems are designed with this sort of retrieval in mind so reconstruction should be fairly easy. World Data Bank II, on the other hand, was digitized many years ago and was designed for use with pen plotters to produce line maps. Closed areas were not a consideration. Coastal shorelines were stored as fragments having no particular direction, and with end points that do not exactly coincide with those of matching fragments. In a few rare instances, the shoreline even crosses itself. With this lack of constraints on digitization, devising a signal transformation algorithm that constructs closed polygons would be very difficult. The solution chosen was to make an auxiliary file having the same format as WDBII and in it, store point sets which, when appended to the original shoreline polylines, result in closed polygons. These polygons overlap geographically, fully covering the land masses of the world. A transformation in subroutine DMAPII has been included to control the WDBII reconstruction process, retrieving data from both files. It can generate either outlined, color filled or filled and outlined land areas. When displaying filled areas the appended point file was used, and when outlining areas, only the original data are plotted.

The signal transformations of data provided by subroutines which are set forth in the Appendix and referred to above, are herebelow grouped together by functionality. These subroutines all are found in the CARMAPTH file. An Index at the end of the Appendix is included to aid a reader in finding the location of the details of the subroutines in the Appendix. The subroutines which are associated with geographic coordinate comparisons are LIMIT2, EAST1, CK4ALL, and CK4ANY and assure the establishing of geographic coordinate relationships. The subroutines for great circle calculations are DA2LL, LL2DA, and LL2GC and assure the transforming to a great circle polyline format. The subroutines for background and overlays are D2OUTL, FTPRNT and RNGRIN and assure the selecting of background and overlay features. The subroutines for spatial tests on great circle polygons are SPGTST, SPGINT, SPGRAD, PINSPG, and SPGCVX and assure the determining from the inputted data, spatial relationships between spherical polygons. The subroutines for interruption line processing are BL2LL, BL2XY, BLPLGN, BLHATC, HATCH, BLPLIN, BLSET, BLCHK, and BLSING and assure the processing to provide clipping and singularity removal at the map interruption lines to allow the display of curved surface features in a flat plane. The polygon clipping subroutines are CLIPLG and JPOLG2 and assure the clipping of polygons by lines so that portions can be displayed as separate areas. The subroutines for projecting geographic coordinates onto maps are LLTOXY, LLPLXY, and PXALBR, PXAZED, PXAZEA, PXEQRE, PXGNOM, PXKAVR, PXLAMC, PXMERC, PXMILL, PXOBLM, PXORTH, PXOREQ, PXORPO, PXPERS, PXPOLY, PXPOST, PXSINU, PXSTER, PXUTMZ AND PXVDGN and assure the projecting of geographical coordinates onto a defined map display. The subroutines for calculating inverse of projections are XYTOLL, XPSTER, XPAZED, XPAZEA, XPGNOM, XPGENR, NRSYST, and NRFCN and assure the providing of the inverse transformations to latitude/ longitude which is the inverse of geographic to display coordinates.

Obviously, many modifications and variations of the present invention are possible in the light of the above teachings. It is therefore to.be understood that within the scope of the appended claims, the invention may be practiced otherwise than as specifically described.

Jul 20 12:40 1989 car: .f Page 1

```
C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ADCLOS
C
C FUNCTIONAL DESCRIPTION:       .
C
C CALLED BY:                    OPENIN
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      SUBROUTINE adclos

      INTEGER   sunit,lunit,punit
      PARAMETER (punit = 67)
      PARAMETER (lunit = 68)
      PARAMETER (sunit = 69)

      CLOSE(sunit,IOSTAT=ierr)
      CLOSE(lunit,IOSTAT=ierr)
      CLOSE(punit,IOSTAT=ierr)

      RETURN
      END

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ADDTRK
C
C FUNCTIONAL DESCRIPTION:       .
C
C CALLED BY:                    DATPOL
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine addtrk (datrec)

c this routine adds a data record to the on-line array of data records
c programmer: avw

        integer         arrpos
        integer         bgnpos
        integer         endpos
        integer         holdsg
        integer         lctrak
        integer         ltypov (16)
        integer         newloc
        integer         numrcs
        integer         segnam
        integer         srchdx
        integer         tfaddx
        integer         tfadtm
        integer         tkoset
        integer         tnewst
```

```
Jul 20 12:40 1989  car   .f Page 2

        integer           toldst
        integer           trkndx (1000)

        character*5       alert
        character*2       pddg
        character*2       repnum
        character*2       series
        character*9       newdtg
        character*9       tfddtg
        character*9       tnewtm
        character*9       toldtm

        character*160     datrec
        character*160     trkrec (1000)

        logical  trackn
        logical  alflag
        logical           ltonov (16)
        logical           rankt (26, 16)
        logical           segact (1000)
        logical           spprsd (1000)
        logical           timflg
        logical           visibl

        common /trkdbc/   trackn
        common /maptoo/   ltypov, ltonov, rankt
        common /numrcs/   numrcs
        common /segact/   segact
        common /spprsd/   spprsd
        common /tarbou/   tnewst, toldst
        common /tfadez/   tfaddx, tfadtm
        common /tfddtg/   tfddtg
        common /timpos/   bgnpos, endpos
        common /tkoset/   tkoset
        common /trcbou/   tnewtm, toldtm
        common /trkndx/   trkndx
        common /trkrec/   trkrec

        data lctrak       /3/

        if (trackn) then
           print *, 'enter addtrk:'
           print *, '   tfaddx = ', tfaddx
        end if

        newdtg = datrec(bgnpos:endpos)

c check that new data record is not older than oldest on-line record

        call cmptim (newdtg, toldtm, timflg)

        if (timflg) then

c increment index number

           tnewst = mod (tnewst, numrcs) + 1
```

```
Jul 20 12:40 1989  car   .f Page 3


c if segment currently exists, delete segment
c otherwise, take next number in sequence and add offset

          if (trkndx(tnewst) .ne. 0) then
             segnam = trkndx(tnewst) + tkoset
             if (segact(trkndx(tnewst))) then
                call jpurge (segnam)
                segact(trkndx(tnewst)) = .false.
             end if
          else
             segnam = tnewst + tkoset
             trkndx(tnewst) = tnewst
          end if

c add data to data record array

          trkrec(trkndx(tnewst)) = datrec

c search backwards from newest data to place record by time

          srchdx = tnewst - 1
          if (srchdx .eq. 0) then
             srchdx = numrcs
          end if
   10     continue
          if (trkndx(srchdx) .eq. 0) then
             timflg = .true.
          else
             call cmptim (newdtg,
     +             trkrec(trkndx(srchdx))(bgnpos:endpos), timflg)
          end if
          if (timflg) then
             newloc = mod (srchdx, numrcs) + 1
             if (newloc .ne. tnewst) then
                holdsg = trkndx(tnewst)
                arrpos = tnewst
   20           continue
                arrpos = arrpos - 1
                if (arrpos .eq. 0) then
                   arrpos = numrcs
                end if
                trkndx(mod(arrpos,numrcs)+1) = trkndx(arrpos)
                if (arrpos .ne. newloc) then
                   go to 20
                else
                   trkndx(arrpos) = holdsg
                end if
             end if
          else
             srchdx = srchdx - 1
             if (srchdx .eq. 0) then
                srchdx = numrcs
             end if
             go to 10
          end if
```

```
c
c          compare time in new record with fade time to see if
c          this plot should be plotted
c
           call cmptim (newdtg, tfddtg, visibl)
c
c          if so, and if tracking is turned on, create a new retained
c          segment for this plot and display it on current map.
c
           if (visibl) then
              if (ltonov(lctrak)) then
c
c***              plot the data on the screen
c
                  call seghnd (segnam, datrec)
c
c                check for alert field being active, if so, display warning
c                window on screen
c
                 read (datrec, 50, err=200) alert,pddg,series,repnum
   50            format (30x, a5, a2,a2,a2)

                 alflag = .false.
                 do 60 i = 1,5
                    if (alert(i:i) .ne. ' ') then
                        alflag = .true.
                    endif
  60             continue
c
c                   freeze tracking without warning messages.
c
cas                 if (alflag) then
cas                     call warning(alert, pddg, series, repnum)
cas                  endif

                  segact(trkndx(newloc)) = .true.

              else
c
c                 if tracking not on, then mark this entry in the
c                 segact (segment active) array as false.
c
                  segact(trkndx(newloc)) = .false.

              end if

              if (tfaddx .eq. 0) then
                 tfaddx = newloc
              else if ((newloc .eq. tfaddx-1) .or. (newloc .eq. numrcs
     +              .and. tfaddx .eq. 1)) then
                 tfaddx = newloc
              end if

           else
```

```
Jul 20 12:40 1989  car:  .f Page 6

c  Restrictions:              N/A
c
c  Abnormal Return Conditions: N/A
c
c  Location:
c
c  Programmer        Date of Last Change       Reason for Change
C  L. McCleary       Jan 1988                separate amp & sys - ampvpt
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine ampvpt
c
c      this subroutines sets the amplification area viewport
c
       common /comavp/ xllavp,yllavp,xuravp,yuravp
c
       call jvport (xllavp,xuravp,yllavp,yuravp)
c
       return
       end

C++*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:  ampwin
c
c  Functional Description:
c       this subroutines sets the amplification area window
c
c  Input Files/Parameters:
C       qaxmn,qaymn                The amplification min x,y point
c       qaxmx,qaymx                The amplification max x,y point
c
c  Output Files/Parameters:
c
c  Subroutines/Functions Called:
c       Note: Subroutines preceded by a "j" are explained in the DI-3000 manual.
c
c  Called By:                   DRWAMP
c
c  Local Variables:             N/A
c
c  Restrictions:                N/A
c
c  Abnormal Return Conditions: N/A
c
c  Location:
c
c  Programmer        Date of Last Change       Reason for Change
C  L. McCleary       Jan 1988                separate amp & sys - ampwin
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine ampwin
c
c      this subroutines sets the amplification area window
```

```
Jul 20 12:40 1989  car   .f Page 7

c
        common/ampwdo/qaxmn,qaymn,qaxmx,qaymx
        real qaxmn,qaymn,qaxmx,qaymx
c
        call jwindo (qaxmn,qaxmx,qaymn,qaymx)
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     ANNOTA
C
C FUNCTIONAL DESCRIPTION:        .
C
C CALLED BY:                     FANNOT
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine annota (string,len)

c       this subroutine does the annotate function

        INTEGER QFB(26),QMB(4)
        COMMON /BUTONS/ QFB,QMB
        LOGICAL VALID,ERROR,RFLAG
        COMMON /B1/ QCANCL,QEXT2M,QRETRN,QSTMNU,QNEXTM
        INTEGER QNEXTM
        LOGICAL QCANCL,QEXT2M,QRETRN,QSTMNU
        INTEGER QCRMNU
        COMMON /B6/ QCRMNU
        integer button
        logical outonce, outwice
        integer segno
        character*(*) string
        common /comgvp/ xllgvp,yllgvp,xurgvp,yurgvp
        common /comgra/ xllgra,yllgra,xurgra,yurgra,ibcgra,iocgra
        common /ctext/ igrtxt,isytxt,iantxt
        data cursax,cursay / 0.,0. /

        ERROR = .FALSE.
        RFLAG = .FALSE.
        MYSEGN = QCRMNU
c       --flags for annotation output
        outonce = .false.
        outwice = .false.
        call gravpt
        call geowin
        call getseg(segno)

 100    call jconwv (cursax,cursay,0.,vx,vy)
        call jpecho (1,2,1,vx,vy)
        call locgeo(button,x,y,valid)
        cursax = x
```

Jul 20 12:40 1989 car .f Page 8

```
        cursay = y

        IF (BUTTON.NE.QMB(1)) THEN
            CALL CHECK(BUTTON,MYSEGN,ERROR,RFLAG)
            IF (ERROR) THEN
                CALL MESG(2)
                CALL PAWS
            ENDIF
        ENDIF
        if (button.eq.qmb(1) .or. button.eq.qmb(3)) THEN
             if (outonce) then
                call jpurge(segno)
                outwice = .true.
             endif
             outonce = .true.
             call jropen(segno)
             CALL XCOLOR (iantxt)
             call jsize (7.,7.)
             call jjust (2,1)
             CALL JFONT(1)
             CALL JGAP(0.)
             CALL JPATH(1)
             CALL JBASE(1.,0.,0.)
             CALL JPLANE(0.,1.,0.)
             call jmove (x,y)
             CALL jhstrg (string(1:len))
             call jrclos
        ENDIF
        if (button .eq. qmb(1)) goto 100

c       -- refresh screen if "ghosts" present due to repositioning string
        if (outwice) call redraw
c          1.7 call to store the text in hldf
        call stotxt( segno,x,y,iantxt,string )

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   APARCS
C
C FUNCTIONAL DESCRIPTION:      .
C
C CALLED BY:                   DRWICN
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

       subroutine aparcs(iarray,writef)

c      This routine redraws arcs or writes the changed points to
c        the .conv file.  The routine getarc is called to restore
c        the arc arrays.  Chgpts applies the previously set
c        scalefactor and offsets to the points.  If the write flag
```

Jul 20 12:40 1989 car .f Page 9

```
c        is false, the three points along the arc are loaded into
c        arrays and calarc is called to calculate the parameters
c        needed to draw the arc.  Putarc is then called to draw
c        the arc. This drawing is done in the redraw for the Icon
c        Editor and the drawing of icons by the prototype (geticn
c        and drwicn routines).
c        If the write flag is set, the routine is being called by the
c        conversion routines of the Icon Editor and the changed
c        points are writted to the .conv file for use by the Icon
c        Editor.
c    VARIABLES:
c        writef- flag set when .conv file being written to
c        common block ifls- logical unit numbers for files being accessed
c        iarray- array passed from calling routine
c        numarc- number of arcs to be drawn
c        xsaveX/ysaveX- arrays to hold points for redrawing arcs
c   CALLS:      getarc chgpts calarc putarc savarc
c   PROGRAMMER:  Nancy Detrich, A215, March, 1984
C------  MODIFIED BY A692 FOR COMPLETION


       logical writef
       common/ifls/newifl,oldifl
       integer newifl,oldifl
       integer iarray(*),numarc
       real xsave1(12),ysave1(12),xsave2(12),ysave2(12)
       real xsave3(12),ysave3(12)
       real xsave(3),ysave(3)
        common /chgit/mirflg,xscale,yscale,xoffst,yoffst,rotang
        real xscale,yscale,rotang
        integer xoffst,yoffst,mirflg

c       this routine calls getarc to have the arrays restored and then
c       redraws the arcs that were stored in the savefile

        call getarc(iarray,xsave1,ysave1,xsave2,ysave2,xsave3,ysave3,
     +       numarc)
c       apply scalefactor/offsets to points of arrays
c        call chgpts(xsave1,numarc,0)
c        call chgpts(ysave1,numarc,1)
c        call chgpts(xsave2,numarc,0)
c        call chgpts(ysave2,numarc,1)
c        call chgpts(xsave3,numarc,0)
c        call chgpts(ysave3,numarc,1)

        if (.not.writef) then
          do 100 i = 1,numarc
c           load the xsave and ysave arrays to use calarc rtn
c             to calculate arc parameters and then draw the arcs
            xsave(1) = xsave1(i)
            ysave(1) = ysave1(i)
            xsave(2) = xsave2(i)
            ysave(2) = ysave2(i)
            xsave(3) = xsave3(i)
            ysave(3) = ysave3(i)
```

Jul 20 12:40 1989 car .f Page 10

```
            call rotpts(xsave,ysave,3)
            call calarc(xsave,ysave,a0,a1,a2,centrx,centry,rad)
c --- changed by Dirk
c --- find center first, change center and outer points, and
c     find angles
            call chgpts(centrx,1,0)
            call chgpts(centry,1,1)
            call chgpts(xsave,1,0)
            call chgpts(ysave,1,1)
            if (mirflg .eq. 0) then
                 a0 = - a0 + sign(180.0,a0)
                 a1 = - a1 + sign(180.0,a1)
                 a2 = - a2 + sign(180.0,a2)
            else if (mirflg .eq. 1) then
                 a0 = -a0
                 a1 = -a1
                 a2 = -a2
            endif

            rad=sqrt((xsave(1)-centrx)**2+(ysave(1)-centry)**2)
            call putarc(a0,a1,a2,centrx,centry,rad)
 100      continue

        else
c         call routine to write changed arc points to new file
c ----- changed by Dirk Butson
c ----- changing points before calling calarc was
c       creating problems
          call rotpts(xsave1,ysave1,numarc)
          call chgpts(xsave1,numarc,0)
          call chgpts(ysave1,numarc,1)
          call rotpts(xsave2,ysave2,numarc)
          call chgpts(xsave2,numarc,0)
          call chgpts(ysave2,numarc,1)
          call rotpts(xsave3,ysave3,numarc)
          call chgpts(xsave3,numarc,0)
          call chgpts(ysave3,numarc,1)
          call savarc(xsave1,ysave1,xsave2,ysave2,
     +        xsave3,ysave3,numarc,newifl)
        endif
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    APCIRC
C
C FUNCTIONAL DESCRIPTION:       .
C
C CALLED BY:                    DRWICN
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine apcirc(iarray,writef)
```

Jul 20 12:40 1989 car .f Page 11

```
c       This routine either redraws the circles that have been
c         saved in a file or writes out the changed coordinates
c         to a new file (Icon Editor conversion routines).
c         Getcir is called to load the center points and the
c         radius of the circles into the respective arrays.
c         Chgpts is then called to change the points using the
c         scalefactors and offsets set by a previous routine.
c         If the write flag is not set, the circles are drawn.
c         If the write flag is set, the savcir routine is called
c         to write the points to the .conv file (newifl).
c     VARIABLES:
c        writef- flag to control writing to the .conv file
c        iarray- holds first line read in by calling routine
c        numcir- number of circles to be drawn
c        radius/xcentr/ycentr- arrays to hold radius and center points
c        common block ifls- logical unit numbers for files being accessed
c   CALLS:     getcir chgpts savcir
c   PROGRAMMER:  Nancy Detrich, A215, March, 1984


        logical writef
        integer iarray(*),numcir
        real radius(24),xcentr(24),ycentr(24)
        common/ifls/newifl,oldifl
        integer newifl,oldifl

c       this routine calls getcir to have the arrays restored and then
c       redraws the circles that were stored in the savefile
        numcir = iarray(2)

        call getcir(iarray,radius,xcentr,ycentr)
        call rotpts(xcentr,ycentr,1)
        call chgpts(xcentr,numcir,0)
        call chgpts(ycentr,numcir,1)
c       scale the radius--no offsets
        call chgpts(radius,numcir,2)
        if (.not.writef) then
          do 100 i = 1,numcir
            call jpintr(0)
c           draw circle--(x center,y center,z center,radius,nsegs(0=default))
            call jcircl(xcentr(i),ycentr(i),0.,radius(i),0)
 100      continue
        else
c         write the changed points to the .conv file
          call savcir(2,numcir,radius,xcentr,ycentr,newifl)
        endif
        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    APFILL
C
C FUNCTIONAL DESCRIPTION:        .
C
```

```
Jul 20 12:40 1989  car‹  .f Page 12

C CALLED BY:                     DRWICN
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine apfill(iarray,writef,protcl)

c       This routine calls jfills to do a seed fill at the points
c        loaded into the x and y arrays.
c        Getpts is called to load the x and y arrays with the
c        points to be used.  The chgpts routine is called to
c        apply the scalefactors and offsets to the points as
c        necessary based on the values previously set in the
c        chgit common area.
c        This routine may be called from multiple places in the
c        Icon Editor and the prototype.
c        If the write flag is false, it may be a call from either
c        the fill routine for the Icon Editor or the icon fill
c        for the prototype.  A value of 0 is passed in the prototype
c        color parameter if the Icon Editor is calling this routine
c        and the index in the icncol array is passed to the jfills
c        routine.  If there is a non-zero value in the protcl
c        parameter, that value is passed as the color index value
c        for jfills.  If the write flag is true, the routine is
c        being called by the conversion routines of the Icon Editor
c        and the changed points are to be written to the savefile
c        with an op-code of 4 or 10, based on the value read in
c        array position 1.
c        If the op-code is a 4, it is a regular fill point.
c        If the op-code is 10, it is an icon fill point being
c        assigned via the getfil routine or to be drawn
c        during the drawing of an icon.
c     VARIABLES:
c        protcl- index value to be used for prototype color
c        saveop- the op-code read in and saved if writing is required
c        writef- write flag to control writing to the .conv file
c        iarray- array passed from calling routine (first record)
c        xarray,yarray- arrays holding x and y values of fill points
c        common block ifls- logical unit numbers for files being accessed
c        common block icccol- holds current color
c        common block inccol- array of colors
c    CALLS:      chgpts save getpts jfills
c    PROGRAMMER:  Nancy Detrich, A215, March, 1984


        integer protcl,saveop
        logical writef
        integer iarray(*)
        real xarray(34),yarray(34)
        common/ifls/newifl,oldifl
        integer newifl,oldifl
        dimension icncol (10)
        common /icncol/icncol
        common /icccol/icccol
```

Jul 20 12:40 1989 car .f Page 13

```
c       save off the 'op code' in the first position to be used
c         if it needs to be written out -- op code will be 4
c         if it is a regular fill point, and 10 if it is an
c         icon fill point
        saveop = iarray(1)

c       call to routine to return number of points and the restored
c         x and y arrays with the coordinates
        call getpts(iarray,numpts,xarray,yarray)
        call rotpts(xarray,yarray,numpts)
        call chgpts(xarray,numpts,0)
        call chgpts(yarray,numpts,1)

        if (.not.writef) then
c        check that the icon is allowed to be filled
c          (even though user may have requested it)
         if (numpts .ne. 0) then
c         fill the areas around the seed point
          do 100 i = 1,numpts
            if (protcl .eq. 0) then
c             being called from icon editor routines, use current
c                 color
              call jfills (icncol(icccol),xarray(i),yarray(i),
     +        .true.)
            else
c             being filled by prototype routine, use color
c                requested by prototype
              call jfills (protcl,xarray(i),yarray(i),.true.)
            endif
 100      continue
         endif
        else
c         call routine to write changed points to new file
          call save(saveop,numpts,xarray,yarray,newifl)
        endif

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      APLINE
C
C FUNCTIONAL DESCRIPTION:         .
C
C CALLED BY:                      DRWICN
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine apline(iarray,writef)

c       This routine is used by the Icon Editor redraw and convert
c        routines and the prototype. This routine draws a connected
c        line which has been saved in a file.
```

Jul 20 12:40 1989 car. .f Page 14

```
c       Getpts is called to load the points in the x and y arrays.
c       The arrays are passed to the chgpts routine to change the
c       points by the scalefactors and offsets previously set.
c       The redraw line routine is then called to draw the line if
c       a redraw is to occur for the Icon Editor or the prototype,
c       or the changed points are written to another file (.conv)
c       if the writef has been set by an Icon Editor conversion
c       routine.
c   VARIABLES:
c       writef- flag set if the changed points are to be written
c           to a file
c       iarray- array passed from calling routine-- holds number
c           of points in the line and the first 12 coordinates
c       npts- number of points in the connected line
c       xarray/yarray- hold x and y coordinates for all the points
c           of the line
c       common block ifls- logical unit numbers for files being accessed
c  CALLS:     getpts chgpts redrln save
c  PROGRAMMER:  Nancy Detrich, A215, March, 1984


      logical writef
      integer iarray(*)
      integer npts
      real xarray(38),yarray(38)
      common/ifls/newifl,oldifl
      integer newifl,oldifl

c     fill the x and y arrays with the coordinates in
c       a REAL format (for DI-3000)
      call getpts(iarray,npts,xarray,yarray)

c     call routine to change the values in the array by
c        the correct offset value indicated by the last
c        parameter
      call rotpts(xarray,yarray,npts)
      call chgpts(xarray,npts,0)
      call chgpts(yarray,npts,1)
      if (.not.writef) then
        call redrln(xarray,yarray,npts)
      else
c       write out the arrays of points to the new file
        call save(1,npts,xarray,yarray,newifl)
      endif

      return
      end

C+*+*+*+*+*+*+*+*+*+*+*+*+*+*+*+*+*+*+*+*+*+*+*+*+*+*+*+*+*+*+*+*+*|*+*+*+*+
C UNIT NAME:                    APMARK
C
C FUNCTIONAL DESCRIPTION:
C
C CALLED BY:                    DRWICN
C
```

Jul 20 12:40 1989 carε .f Page 15

```
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine apmark(iarray,writef)

c       This routine draws markers at the points loaded in the
c        x and y arrays by the getpts routine.  The marker type
c        is in the last position of the x array.
c        The chgpts routine is called to apply the scalefactor
c        and offset, if necessary to the points in the x and
c        y arrays before the markers are drawn by the redrmk routine.
c        If the write flag is set, the routine is being called
c        by the conversion routines of the Icon Editor and
c        the changed points are written to the .conv file for
c        use by the prototype.
c     VARIABLES:
c        iarray- array passed from calling routine
c        xarray/yarray- coordinates for markers
c        count- number of points loaded in the x and y arrays
c           (xarray(count) has the marker type in it, and yarray(count)
c           is meaningless)
c        writef- flag set if .conv file is to be written to
c        common block ifls- logical unit numbers for files being accessed
c    CALLS:      getpts chgpts redrmk save
c    PROGRAMMER:  Nancy Detrich, A215, March, 1984


        logical writef
        integer iarray(*),count
        real xarray(38),yarray(38)
        common/ifls/newifl,oldifl
        integer newifl,oldifl

        call getpts(iarray,count,xarray,yarray)
        call rotpts(xarray,yarray,count-1)
        call chgpts(xarray,count-1,0)
        call chgpts(yarray,count-1,1)

        if(.not.writef) then
c         marker type is stored in the last position of the x array
          mkrtyp = xarray(count)
c         draws specified marker at array of points given
          call redrmk(mkrtyp,count-1,xarray,yarray)
        else
c         call routine to write changed points to .conv file
          call save(5,count,xarray,yarray,newifl)

        endif
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      APRECT
C
```

```
Jul 20 12:40 1989  car·   .f Page 16

C FUNCTIONAL DESCRIPTION:          .
C
C CALLED BY:                       DRWICN
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine aprect(iarray,writef)

c       This routine redraws a rectangle that was stored in a file.
c        The getpts routine loads the x and yarrays and the
c        chgpts routine is called to change the points using
c        the scalefactors and offsets previously set.
c        If the write flag has not been set, the rectangle is drawn.
c        If it has been set, the changed points are written
c        to the .conv file.
c     VARIABLES:
c        writef- set to have changed points written to a file (.conv)
c        iarray- holds points of record previously read in
c        numpts- number of points to be loaded
c        xarray/yarray- points to be used for drawing rectangle
c        common block ifls- logical unit numbers for files being accessed
c        start- point number to start at when redrawing (not implemented)
c   CALLS:      getpts chgpts redrct save
c   PROGRAMMER:  Nancy Detrich, A215, March, 1984


        common/ifls/newifl,oldifl
        integer newifl,oldifl
        logical writef
        integer iarray(*),numpts,i,start
        real xarray(4),yarray(4)

        numpts = iarray(2)
        call getpts(iarray,numpts,xarray,yarray)
        call rotpts(xarray,yarray,numpts)
        call chgpts(xarray,numpts,0)
        call chgpts(yarray,numpts,1)
        if (.not.writef) then
          start=1
          do 100 i = 1,numpts/4
            call redrct(xarray,yarray,start)
            start = start + 4
 100      continue
        else
c         call routine to write the changed points to a file
          call save(3,4,xarray,yarray,newifl)
        endif

        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       APSMOO
```

Jul 20 12:40 1989 car: .f Page 17

```
C
C FUNCTIONAL DESCRIPTION:
C
C CALLED BY:                  DRWICN
C
C PROGRAMMER:                 DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine apsmoo(iarray,writef)

c     This routine redraws the smoothed lines stored in the
c       savefile or converts the points and writes the converted
c       points to a .conv file, as indicated by the write flag.
c       Getpts is called to load the x and y arrays with the
c       points to be used to recreate the smoothed line.  Chgpts
c       is then called to apply the scalefactor and offset
c       previously set.
c       If the write flag is false, the icbez routine is called
c       to convert the points into coordinates for the curve.
c       The redraw line routine is the called to draw the curve.
c       If the write flag is set, the changed points are written
c       to the .conv file for use by the prototype.
c     VARIABLES:
c       iarray- array passed from calling routine
c       xc/yc- calculated points returned from icbez
c       npts- number of points returned from icbez
c       xp/yp- input points gotten from the savefile
c       npol- number of points on the line given by the user
c       writef- flag set to have the points written to the .conv file
c       common block ifls- logical unit numbers for files being accessed
c   CALLS:     getpts chgpts icbez redrln save
c   PROGRAMMER:  Nancy Detrich, A215, March, 1984


      logical writef
      common/ifls/newifl,oldifl
      integer newifl,oldifl
      integer iarray(*)
      integer npts,npol
      real xp(34),yp(34),xc(34),yc(34)

      call getpts(iarray,npol,xp,yp)
      call rotpts(xp,yp,npol)
      call chgpts(xp,npol,0)
      call chgpts(yp,npol,1)

      if(.not.writef) then
c       calculate the points for the curve and draw it
        call icbez(npol,xp,yp,xc,yc,npts)
        call redrln(xc,yc,npts)
      else
c       write out the changed points to the <filename>.conv file
        call save(6,npol,xp,yp,newifl)
      endif
      return
```

```
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      APTEXT
C
C FUNCTIONAL DESCRIPTION:         .
C
C CALLED BY:                      DRWICN
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine aptext(iarray,writef,retstr,nchars)

c     this routine is used to read in the necessary parameters
c        and either display the text when called by the
c        icon editor (drawic) or write out records to the
c        converted file if the file is being converted
c        (also called by drawic).  This routine is also
c        called by drwicn in the prototype routines to
c        draw the text when symbols are being created.
c   VARIABLES:
c        iarray- array passed from calling routine
c        writef- flag set when .conv file being written to
c        common block ifls- logical unit numbers for files being accessed
c        x/y- coordinate for text placement--will be sent to chgtxt
c        height- height of text--will be scaled by chgtxt
c        size- size selection made by user (icsize)
c        style- font selection made by user (icfont)
c        retstr- text string to be displayed
c        nchars- number of characters in retstr
c  CALLS:     chgtxt readch dwtext savtxt
c  PROGRAMMER:  Nancy Detrich, A215, March, 1984


      common/ifls/newifl,oldifl
      integer newifl,oldifl
      logical writef
      integer iarray(*)
      integer x,y ,height,size,style,nchars
      character*(*) retstr

c     get text parameters
      size = iarray(2)
      height = (iarray(3))
      style = iarray(4)
      nchars = iarray(5)
      x = (iarray(6))
      y = (iarray(7))

c      print*,'size,height,style,nchars,x,y,retstr'
c      print*,size,height,style,nchars,x,y,retstr(1:nchars)

c     apply scalefactor to height and scale and offsets to x and y
```

```
      call chgtxt(height,x,y)

c      print*,'after chgtxt',height,x,y,writef

      if (.not.writef) then
c       display the text
        call jjust(2,1)
        call jmove(REAL(x),REAL(y))
        call jsize(REAL(height)/2.0,REAL(height))
        call dwtext(style,nchars,retstr)
      else
c       write parameters out to '.conv' file (newifl)
        call savtxt(size,height,style,nchars,retstr,
     +         x,y,newifl)
      endif
      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  arc
c
c  Functional Description:
c       this subroutines draws an arc
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:
c
c  Local Variables: N/A
c
c  Restrictions: N/A
c
c  Abnormal Return Conditions:  N/A
c
c  Location:     /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
      subroutine arc (x0,y0,radius,nseg,a0,a1)
c
c     draw arc
c
      data pi/3.1415927/
c     arb is an arbitrary factor limiting the size of default vectors
c     llimit is the lower limit of nnseg
c     max is the upper limit of nnseg
      data llimit,max /10,1000/
      data arb /100./
```

```
c
c       print*,'arc -- enter',x0,y0,radius,nseg
        dtor = pi/180.
        curang = a0
        nnseg = nseg

c       if # segments is < 2 then set to default.
        if (nnseg .lt. 2) then
            nnseg = ( a1 - a0 ) * radius / arb
            if (nnseg .lt. llimit) nnseg = llimit
            if (nnseg .gt. max) nnseg = max
        endif

c       size of angle increment is inscribed angle divided by # segments.
        rincr = ( a1 - a0 ) / float( nnseg )

c       radius used is absolute value of radius passed.
        rad = abs( radius )

c       move to the first point.
        call jmove( x0 + rad * cos( a0*dtor ),
     +              y0 + rad * sin( a0*dtor ))
c
        do 100 i = 1, nnseg-1
            curang = curang + rincr
            x = x0 + rad * cos( curang*dtor )
            y = y0 + rad * sin( curang*dtor )
            call jdraw( x, y )
  100   continue
        call jdraw( x0 + rad * cos( a1*dtor ),
     +              y0 + rad * sin( a1*dtor ))

c       print*,'arc -- exit ',x,y,radius,curang,nnseg

        return
        end

C+*+*+*+*+*+*+*+*+*+*+*+*+*+*+*+*+*+*+*+*+*+*+*+*+*+*+*+*+*+*+*+*+*+*|*+*+*+*+
C UNIT NAME: areafl
C
C FUNCTIONAL DESCRIPTION:  fill areas on a map with different colors
C
C INPUT FILES/PARAMETERS:
C
C GLOBAL VARIABLES :
C
C OUTPUT FILES/PARAMETERS:  NONE.
C
C SUBROUTINES/FUNCTIONS CALLED : NONE.
C
C CALLED BY:                        DMAPII
C
C LOCAL VARIABLES:
C
C RESTRICTIONS: NONE.
```

```
C
C ABNORMAL RETURN CONDITIONS:   NONE.
C
C LOCATION:
C
C PROGRAMMER:                   DATE OF LAST CHANGE     REASON FOR CHANGE
C
C     JERRY FENERTY                                     DOCUMENT AND MODIFY
C                                                       FOR A21 PROTOTYPE.
C      MODIFIED BY JERRY FENERTY 8/13/85 -- FINAL COMPLETION
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine areafl

c       fill areas on a map with different colors

        logical renew

        INTEGER QNMPTS,QSHADE(60)
        REAL QLATT(60),QLONN(60)
        COMMON /FILLS/ QNMPTS,QLATT,QLONN,QSHADE

        INTEGER SEGNO,FIRSEG
        COMMON /SEGNO/ SEGNO,FIRSEG

        LOGICAL INTERR
        COMMON /INTERR/INTERR

        LOGICAL map
        common /mapdbc/ map

        IF (map) PRINT*,'IN DMAPII QNMPTS IS ',QNMPTS

clj --- renew keeps track of whether or not the screen
clj --- must be saved before doing the next fill
        renew = .true.

        DO 230 I=1,QNMPTS

           CALL GETSEG(ISEG)
           SEGNO = ISEG
           CALL GLTYPE(QSHADE(I),0)
           INTERR = .FALSE.
           CALL FILLPT(QSHADE(I),QLATT(I),QLONN(I),renew)

  230   CONTINUE

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    AREANF
C
C FUNCTIONAL DESCRIPTION:
```

```
Jul 20 12:40 1989  cara  .f Page 22

C
C CALLED BY:                    STATEC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine areanf
c
c     this subroutine is the area not found state interpreter (20)
c
      common /states/ nextst
      logical eol,eoc
      common /comnds/ lenl,indxw,lenw,eol,eoc
      character * 80 comlin
      common /comlin/ comlin
      character * 105 errlin
c
      errlin = 'Area name not found : ' //
     +  comlin(indxw:indxw + lenw - 1)
      lenlin = 22 + lenw
      call cerror(lenlin,errlin)
      nextst = 1
c
      return
      end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ARRW
C
C FUNCTIONAL DESCRIPTION:       .
C
C CALLED BY:                    SETCOL
C
c Author: Ellen Jenkins, R531, September 30, 1982
C
C PROGRAMMER:                   DATE OF LAST CHANGE     REASON FOR CHANGE
c L McCleary    Jan 1988             fix value annotate - arrw
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine arrw (xcor,ycor,intcol,xsrang,yrange,value)
c
c Purpose: draw small arrows indicating where on scale current choice is
c          located, and print integer value of current choice under arrow
c
c Access: call arrw
c
c Algorithm: draw arrow at x,y coordinates returned by positioning cursor
c            and convert integer value to ascii character(s) and print value
c            under arrow,with characters centered under arrow
c
c Calls: dbitoa
c
      character *3 xname
```

Jul 20 12:40 1989 car .f Page 23

```
      tval = value + 0.5
      ivalue = tval
      inum = ivalue
      call jopen
      call xcolor (intcol)
      call jmove(xcor-.01*xsrang,ycor-.035*yrange)
      call jdraw(xcor,ycor-.015*yrange)
      call jdraw(xcor+.01*xsrang,ycor-.035*yrange)
      call jjust (2,1)
      if (xcor.ge.xsrang) call jjust (3,1)
      call jmove (xcor,ycor-.055*yrange)
c      read (inum,1500,err=190) xname
      write (xname,1500,err=190) inum
 1500 format(i3)
      call jsize (5.0,2.5)
      if (ivalue.lt.10) then
c         call jlstrg (xname(1:1))
         call jlstrg (xname(3:3))
      else
         if (ivalue.lt.100) then
c             call jlstrg (xname(1:2))
            call jlstrg (xname(2:3))
         else
            call jlstrg (xname(1:3))
         endif
      endif
  190 continue
      call jclose
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   ascint
c
c  Functional Description:
c       this subroutine converts an ascii string to integer (+ or -)
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                   CREATM, FCHSCA, REPLAY
c
c  Local Variables: N/A
c
c  Restrictions: N/A
c
c  Abnormal Return Conditions:  N/A
c
c  Location:      /a21/dave
c
c  Programmer        Date of Last Change       Reason for Change
```

Jul 20 12:40 1989 car< .f Page 24

```
C  L. MCCLEARY       JUL 1988              NEGATIVE INTS - ASCINT
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine ascint (ch,int,len,ierror)
c
       character*(*) ch
C      character c
c
c      print*,'ASCINT -- enter ch,len = ',ch,len
       ierror = 0
C      c = ch(1:1)
C      if (c.ne.'1'.and.c.ne.'2'.and.c.ne.'3'.and.c.ne.'4'.and.
C    +     c.ne.'5'.and.c.ne.'6'.and.c.ne.'7'.and.c.ne.'8'.and.c.ne.'9'
C    +     .and.c.ne.'0') then
C          ierror = 3
C      endif
C      read(ch(1:len),10100,err=181,end=182) int
C10100 format(i80)
       M=INDEX(CH(1:LEN),'-')
       I=1
       DO 100 J=M+1,LEN
               IF(INDEX('0123456789',CH(J:J)).EQ.0) I=0
 100   CONTINUE
       IF(M.EQ.LEN) I=0
       IF(I.EQ.0) THEN
               IERROR=3
C              PRINT *,'NON-NUMERIC VALUE ENTERED'
       ELSE
               READ(CH(M+1:LEN),10100,ERR=181,END=182) INT
10100          FORMAT(I80)
               IF(M.GT.0) INT=-INT
       ENDIF
       go to 190
  181      continue
c           print*,'Error in conversion to integer'
           ierror = 1
           go to 190
  182      continue
c           print*,'End of file on conversion to integer'
           ierror = 2
  190  continue
c      print*,'ASCINT -- exit int,ierror = ',int,ierror
c
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   asclog
c
c  Functional Description:
c       convert t's and f's in a character string to a logical array
c
c  Input Files/Parameters:
c
```

```
c  Output Files/Parameters: N/A
c
c  Subroutines/Functions Called:
c      Note: Subroutines preceded by a "j" are explained in the DI-3000 manual.
c
c  Called By:                      RBOUND, RPARAM
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine asclog (logarr,len,chastr)

c      convert t's and f's in a character string to a logical array
c
       logical logarr(*)
       character*(*) chastr
c
       do 110 i=1,len
           if (chastr(i:i).eq.'t') then
               logarr(i) = .true.
           else
               logarr(i) = .false.
           endif
  110  continue
c
       return
       end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     BOXCLR
C
C FUNCTIONAL DESCRIPTION:        .
C
C CALLED BY:                     INIPIC, RESCON
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

       subroutine boxclr

c      draw a filled rectangle to erase the bitmap

       common/scratr/qbox,qbkgrd
       integer qbox,qbkgrd
```

```
Jul 20 12:40 1989  carɛ   .f Page 26

        data xlow,xhigh,ylow,yhigh/0.,1.,0.,1./

        call jwindo (xlow,xhigh,ylow,yhigh)
        call jopen
        call xcolor (qbox)
        call xpidex (qbkgrd,0)
        call jpintr (1)
        call jrect (xlow,ylow,xhigh,yhigh)
        call jclose

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    BOXVPT
c
c  Functional Description:
c       this subroutines sets the construction box area viewport
c
c  Input Files/Parameters:
C       xllbvp
C         lbvp
C       xurbvp
C       yurbvp
c
c  Output Files/Parameters: N/A
c
c  Subroutines/Functions Called:
c      Note: Subroutines preceded by a "j" are explained in the DI-3000 manual.
c
c  Called By:    MAKBOX
c
c  Local Variables: N/A
c
c  Restrictions: N/A
c
c  Abnormal Return Conditions:  N/A
c
c  Location:      Apollo       /a21/dave
c
c  Programmer          Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine boxvpt
c
c       this subroutines sets the construction box area viewport
c
        common /combvp/ xllbvp,yllbvp,xurbvp,yurbvp
c
        call jvport (xllbvp,xurbvp,yllbvp,yurbvp)
c       print*,'boxvpt -- ',xllbvp,yllbvp,xurbvp,yurbvp
c
        return
        end
```

Jul 20 12:40 1989 car? .f Page 27

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      BSTMAP
C
C FUNCTIONAL DESCRIPTION:         .
C
C CALLED BY:                      READML
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine bstmap(flatlon,blatlon,numb,mapcho,mflen)
c
c  this subroutine checks each saved map to determine which is the best fit
c  for the given fixlat/fixlon to be displayed closest to the center point.
c
      logical sys
      common /sysdbc/ sys
      character*16 flatlon,blatlon(30)
      character*(*) mapcho
      integer mflen
      integer*2 i,numb,sitmax,notsit
      integer*2 idummy
      character*50 filenm
      character*60 desfile
      integer*4 ierror
      integer*4 len
      real rarray(4)
      integer iarray(7)
      real rlat,rlon,blat,blon
      real x,y,bx,by
      real smalrad
      logical onmap,siton
      logical novali
      integer savecnt
      character*1 choice
      character*1 lowcase(10)
      character*50 defpth
      common /defpth/ defpth
      common /lendef/ lendef
c     map parameters
      logical lton(16),dotem
      integer ipgrid(4),ltyptb(16)
      common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT

      data ifl /9/
      data irdwr /1/
      data filenm /' '/
      data lowcase/'a','b','c','d','e','f','g','h','i','j'/

      savecnt = 0
      choice = '0'
```

```
      mapcho = ' '
      if (sys) then
          print*,'bstmap -- enter-lat/lon ',flatlon
      endif
      filenm(1:lendef+4) = defpth(1:lendef) // 'save'
      filenm(lendef+6:lendef+9) = '.prm'
c
c-----convert lat/lon to radians
c
      len = 16
      call lltord(flatlon,len,rlat,rlon,ierror)
      if (sys) then
          print*,'bstmap -- rlat/rlon ',rlat,rlon
      endif
      novali = .true.

c-----read in the # of files saved on this system

      desfile = defpth(1:lendef) // 'default.des'
      len = lendef + 11
      call openit(desfile,len,ifl,irdwr,ierror)
      if(ierror .eq. 0) then
          read(ifl,30) savecnt
 30       format(i3)
          call closit(ifl)
      endif
c
c-----loop to find which center pt is min distance from fixlat/fixlon in radians
c
      do 100 i= 1,savecnt
          if(i .lt. 10) then
              filenm(lendef+5:lendef+5) = char(i+48)
          else
              filenm(lendef+5:lendef+5) = lowcase(i-9)
          endif
          len = lendef + 9
c
c   open .prm file for the saved map and read in map info
c
          call openit(filenm,len,ifl,irdwr,ierror)
          if(ierror .eq. 0) then
              read(ifl,*) idummy
              len = 4
              call readre(ifl, rarray, len, ierror)
              XC = rarray(1)
              YC = rarray(2)
              XRAD = rarray(3)
              YRAD = rarray(4)
              call readre(ifl, rarray, len, ierror)
              XRNM = rarray(1)
              CLAT = rarray(2)
              CLON = rarray(3)

        ORHALT = rarray(4)
              len = 7
              call readin(ifl,iarray,len,ierror)
```

Jul 20 12:40 1989 car .f Page 29

```
              ITPROJ = iarray(6)
              IRES = iarray(7)
c
c  initialize this saved map for lltoxy calculations
c
              call initia(XC,YC,CLAT,CLON,XRAD,YRAD,ITPROJ,IRES,XRNM,
     +                ORHALT)
              if (sys) then
                   print*,'bstmap -- before lltoxy rlat/rlon ',rlat,rlon
              endif
              call lltoxy(rlat,rlon,x,y)
              if (sys) then
                   print*,'bstmap -- x,y before clipxy ',x,y
              endif
              call clipxy(x,y,onmap)
              if (sys) then
                   print*,'bstmap -- x= ',x,' y= ',y,' VALID= ',onmap
              endif
              if(onmap)then
                if(numb .gt.0)then
                  siton = .true.
                  sitmax = numb * .25
                  notsit = 0
                  do 50 j=1,numb
                        len = 16
                        call lltord(blatlon(j),len,blat,blon,ierror)
                        call lltoxy(blat,blon,bx,by)
                        call clipxy(bx,by,siton)
                        if(.not. siton)then
                                notsit = notsit + 1
                                if(notsit .gt. sitmax)goto 60
                        else
c                                print*,'bstmap -- site on map'
                        endif
 50               continue
                endif
                if(novali) then
                      smalrad = xrnm
                      choice = filenm(lendef+5:lendef+5)
                else
                      if(xrnm .lt. smalrad)then
                           smalrad=xrnm
                           choice = filenm(lendef+5:lendef+5)
                      endif
                endif
                if (sys) then
                     print*,'bstmap -- in onmap loop choice ',choice
                endif
                novali = .false.
              endif
 60           continue
              call closit(ifl)
          endif
 100  continue
c
c  if no map had this fixlat/fixlon on its display area, default to world map
```

```
c
      if(novali) then
          print*,'bstmap -- in not valid'
          mflen = 7
          mapcho(1:mflen) = 'default'
      else
c          print*,'bstmap -- in valid'
          mflen = 5
          mapcho(1:mflen) = filenm(lendef+1:lendef+4) // choice
      endif
c      print*,'bstmap is ',mapcho
c      print*,'bstmap -- exit'
      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    buttn
c
c  Functional Description:       Subroutine to get button input
c
c  Input Files/Parameters:
c      General Gobals
c        qdsdev        device       integer   DI-3000 variable
c        qpydev        device       integer   DI-3000 variable
c        qecho         device       integer   DI-3000 variable
c
c  Output Files/Parameters:      N/A
c
c  Subroutines/Functions Called:
c      Note: Subroutines preceded by a "j" are explained in the DI-3000 manual.
c
c  Called By:                    DISP5, HELP, PAWS, TKINFO
c
c  Local Variables:
c
c  Restrictions:
c
c  Abnormal Return Conditions:  N/A
c
c  Location:      /a21/dave
c
c  Programmer         Date of Last Change       Reason for Change
c     bam              October 27, 1983
c
c  Work still to be done:
c
C-*-*-*-*-*-*-*-*-*-*-*-*-*-*-*-*-*-*-*-*-*-*-*-*-*-*-*-*-*-*-*-*-*-*-*|*-*-*-*-

        subroutine buttn(button)

c       calls jbuttn function

        integer qdsdev,qpydev,qecho,qlecho
        common /device/ qdsdev,qpydev,qecho,qlecho
```

```
        integer button
        logical sys,rdkey,savkey
        common /sysdbc/ sys
        common /rkdbc/ rdkey
        common /svkdbc/ savkey
        logical eofkey
        integer keylun,newlun
        common /keylun/ keylun,newlun,eofkey
        character*6 commnd
        logical timout
        integer*2 time
        common /timout/ timout,time

        if (sys) print*,'buttn -- enter'

c       call enall
  100   continue
        if ((rdkey).and.(.not.eofkey)) then
            call kpause (eofkey)
            read (keylun,*,end=192,err=191) commnd,button
            if (commnd(1:6).ne.'jbuttn') then
                print*,'buttn -- incompatible commnd in ',
     +          'read_keys file  ',commnd,button
c               *** exit on error
                go to 199
            endif
        else

  125      continue

c       check for new data coming in or a click (1 min) occuring
c       since last poll.
c
           call datpol
c
c          check for keyboard interrupt
c
           call jbuttn(qdsdev,qpydev,qecho,button)
           if (timout) then
              go to 125
           end if
        endif

        go to 199
  191   continue
            print*,'buttn -- error on read of save key file',
     +      '  ',keylun,button
            go to 199
  192   continue
            print*,'buttn -- premature end of read key file.'
            eofkey = .true.
            go to 100
c           **** go back and get the function interactively on end of file
  199   continue
        if (savkey) then
            write (newlun,*,err=135) '''jbuttn''',button
```

Jul 20 12:40 1989 car< .f Page 32

```
      endif
      go to 140
135   continue
         print*,'buttn -- error on write to save key file',
     +      '  ',newlun,button
140   continue
c     call soverl
      if (sys) print*,'buttn -- exit',button

      return
      end

C+*+*+*+*+*+*+*+*+*+*+*+*+*+*+*+*+*+*+*+*+*+*+*+*+*+*+*+*+*+*+*+*+*+*+*+*+*+*+*+|*+*+*+*+
C UNIT NAME:                   CALARC
C
C FUNCTIONAL DESCRIPTION:      .
C
C CALLED BY:                   APARCS
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine calarc(xsave,ysave,a0,a1,a2,centrx,centry,rad)

c     This routine calculates the parameters needed for
c       drawing an arc based on three points along the arc.
c   VARIABLES:
c     xsave/ysave- points on the arcs
c     a0,a1,a2- angles used in drawing arcs
c     centrx,centry- center points of arc
c     rad- radius of arc
c  PROGRAMMER:  Nancy Detrich, A215, March, 1984
C------  MODIFIED BY A692 FOR COMPLETION


      real xsave(*),ysave(*)
      real a1,a0,a2,centrx,centry,slope1,slope2
      real xend1,yend1,xmid,ymid,xend2,yend2
      real mid2x,mid2y,num2,rad
      real mid1x,mid1y,num1


c     setting passed parameters to the names used in previously
c      written code
      xend1 = xsave(1)
      yend1 = ysave(1)
      xmid  = xsave(2)
      ymid  = ysave(2)
      xend2 = xsave(3)
      yend2 = ysave(3)

c     COMPUTATIONS
```

```
c       slope of line perpendicular to line between first end point and
c       intermediate point

        i = 0
        n = 0
        m = 0

        if(ymid .ne. yend1) then
          slope1 = (xend1-xmid)/(ymid-yend1)
          mid1x = (xend1+xmid)/2.
          mid1y = (yend1+ymid)/2.
          num1 = mid1y-(mid1x*slope1)
          m = 1
        else
          centrx = (xend1+xmid)/2.
        endif

c       slope of line perpendicular to line between second end point and
c       intermediate point

        if (ymid .ne. yend2) then
          slope2 = (xend2-xmid)/(ymid-yend2)
          mid2x = (xend2+xmid)/2.
          mid2y = (yend2+ymid)/2.
          num2 = mid2y-(mid2x*slope2)
          n = 1
        else
          centrx = (xend2+xmid)/2.
        endif

c       have constructed two perpendicular bisectors which intersect at
c       the center of the circle on whose circumference lie the three
c       selected points

c       find center of circle
        if (n .eq. m) then
          if (slope1 .ne. slope2) then
            centrx = (num2-num1)/(slope1-slope2)
            centry = slope2*centrx+num2
          else
            i = 1
          endif
        else
          if (n .eq. 1) then
            centry = slope2 * centrx + num2
          else
            centry = slope1 * centrx + num1
          endif
        endif

        if (i .eq. 1) goto 60

c       compute radius
        rad = sqrt((xend1-centrx)**2+(yend1-centry)**2)

c       compute the angles
```

```
      a0 = (180./3.1415927)*atan2(yend1-centry,xend1-centrx)
      a1 = (180./3.1415927)*atan2(yend2-centry,xend2-centrx)
      a2 = (180./3.1415927)*atan2(ymid-centry,xmid-centrx)

60    continue
      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    calavp
c
c  Functional Description:
c       calculate amplification area viewport parameters
c
c  Input Files/Parameters:
c
c  Output Files/Parameters: N/A
c
c  Subroutines/Functions Called:
c
c  Called By:                    FMAIN
c
c  Local Variables: N/A
c
c  Restrictions: N/A
c
c  Abnormal Return Conditions:  N/A
c
c  Location:
c
c  Programmer        Date of Last Change       Reason for Change
C  L. McCleary       Jan 1988               separate amp & sys - calavp
c
C-*-*-*-*-*-*-*-*-*-*-*-*-*-*-*-*-*-*-*-*-*-*-*-*-*-*-*-*-*-*-*-*-*-*-*|*-*-*-*-
c
      subroutine calavp
c
c     calculate amplification area viewport parameters
c
      common /comscr/ xllscr,yllscr,xurscr,yurscr
      common /comamp/xllamp,yllamp,xuramp,yuramp,ibcamp,iocamp,incamp
      common /comavp/ xllavp,yllavp,xuravp,yuravp
      common /aspect/ xaspec,yaspec,xvlow,xvhigh,yvlow,yvhigh
c
      xllavp = xvlow+(xvhigh-xvlow)*(xllamp-xllscr)/(xurscr-xllscr)
      xuravp = xvlow+(xvhigh-xvlow)*(xuramp-xllscr)/(xurscr-xllscr)
      yllavp = yvlow+(yvhigh-yvlow)*(yllamp-yllscr)/(yurscr-yllscr)
      yuravp = yvlow+(yvhigh-yvlow)*(yuramp-yllscr)/(yurscr-yllscr)
c      print*,'Amplification viewport',xllavp,xuravp,yllavp,yuravp
c       print*,'XLLAMP,XURAMP,..',xllAMP,xurAMP,yllAMP,yurAMP
c       print*,'XLLAVP,XURAVP,..',xllavp,xuravp,yllavp,yuravp
c
      return
      end
```

Jul 20 12:40 1989 car< .f Page 35

```
C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      calbvp
c
c  Functional Description:
c       calculate construction box area viewport parameters
c
c  Input Files/Parameters:
c
c  Output Files/Parameters: N/A
c
c  Subroutines/Functions Called:
c
c  Called By:                      FMAIN
c
c  Local Variables: N/A
c
c  Restrictions: N/A
c
c  Abnormal Return Conditions:  N/A
c
c  Location:      Apollo      /a21/dave
c
c  Programmer          Date of Last Change       Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
      subroutine calbvp
c
c     calculate construction box area viewport parameters
c
      common /comscr/ xllscr,yllscr,xurscr,yurscr
      common /combox/xllbox,yllbox,xurbox,yurbox,ibcbox,iocbox,incbox
      common /combvp/ xllbvp,yllbvp,xurbvp,yurbvp
      common /aspect/ xaspec,yaspec,xvlow,xvhigh,yvlow,yvhigh
c
c     print*,' comgra,comscr : ',xllscr,yllscr,xurscr,yurscr
      xllbvp = xvlow+(xvhigh-xvlow)*(xllbox-xllscr)/(xurscr-xllscr)
      xurbvp = xvlow+(xvhigh-xvlow)*(xurbox-xllscr)/(xurscr-xllscr)
      yllbvp = yvlow+(yvhigh-yvlow)*(yllbox-yllscr)/(yurscr-yllscr)
      yurbvp = yvlow+(yvhigh-yvlow)*(yurbox-yllscr)/(yurscr-yllscr)
c     print*,'Box viewport',xllbvp,xurbvp,yllbvp,yurbvp
c     print*,'    ',xllbox,xurbox,yllbox,yurbox
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      CALCPR
C
C FUNCTIONAL DESCRIPTION:          .
C
C CALLED BY:                       STATEC
C
C PROGRAMMER:                      DATE OF LAST CHANGE     REASON FOR CHANGE
```

Jul 20 12:40 1989 car< .f Page 36

```
C  S. LAMB                       FEB 88              COMMAND FIX - CALCPR
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine calcpr
c
c       this subroutine is the calculate area parameters state interpreter (11)
c
        common /states/ nextst
        logical isarea
        logical wordis,iseoc
        real sparms(4)
        real mparms(4)
        common /mparms/ mparms
c
        do 90 i=1,4
             sparms(i) = mparms(i)
   90   continue
        initls = nextst
c       do until nextst not = initial state
  100   continue
            call getwrd
            if (wordis('AND')) then
c * ** *** **** ***** ****** ******* not understood
                nextst = 15
            else if (iseoc()) then
                nextst = 3
            else if (isarea()) then
                if (mparms(1).lt.sparms(1)) sparms(1) = mparms(1)
                if (mparms(2).gt.sparms(2)) sparms(2) = mparms(2)
                if (mparms(3).lt.sparms(3)) sparms(3) = mparms(3)
                if (mparms(4).gt.sparms(4)) sparms(4) = mparms(4)
            else
                call putwrd
                nextst = 3
            endif
        if (nextst.eq.initls) go to 100
c       *** this assumes the next state is 3 or you want to change map params.
        call calmap (sparms)
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    calcvp
c
c  Functional Description:
c       calculate system message area viewport parameters
c
c  Input Files/Parameters:
c
c  Output Files/Parameters: N/A
c
c  Subroutines/Functions Called:
c
```

Jul 20 12:40 1989 car: .f Page 37

```
c  Called By:                    FMAIN
c
c  Local Variables: N/A
c
c  Restrictions: N/A
c
c  Abnormal Return Conditions:  N/A
c
c  Location:      Apollo       /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-
c
      subroutine calcvp
c
c     calculate system message area viewport parameters
c
      common /comscr/ xllscr,yllscr,xurscr,yurscr
      common /comsys/xllsys,yllsys,xursys,yursys,ibcsys,iocsys,incsys
      common /comcvp/ xllcvp,yllcvp,xurcvp,yurcvp
      common /aspect/ xaspec,yaspec,xvlow,xvhigh,yvlow,yvhigh
c
      xllcvp = xvlow+(xvhigh-xvlow)*(xllsys-xllscr)/(xurscr-xllscr)
      xurcvp = xvlow+(xvhigh-xvlow)*(xursys-xllscr)/(xurscr-xllscr)
      yllcvp = yvlow+(yvhigh-yvlow)*(yllsys-yllscr)/(yurscr-yllscr)
      yurcvp = yvlow+(yvhigh-yvlow)*(yursys-yllscr)/(yurscr-yllscr)
c      print*,'System viewport',xllcvp,xurcvp,yllcvp,yurcvp
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    calgvp
c
c  Functional Description:
c       calculate graphics viewport parameters
c
c  Input Files/Parameters:
c
c  Output Files/Parameters: N/A
c
c  Subroutines/Functions Called:
c
c  Called By:                    FMAIN, RBOUND
c
c  Local Variables: N/A
c
c  Restrictions: N/A
c
c  Abnormal Return Conditions:  N/A
c
c  Location:      Apollo       /a21/dave
c
c  Programmer        Date of Last Change       Reason for Change
```

Jul 20 12:40 1989 car: .f Page 38

```
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine calgvp
c
c     calculate graphics viewport parameters
c
      common /comscr/ xllscr,yllscr,xurscr,yurscr
      common /comgra/xllgra,yllgra,xurgra,yurgra,ibcgra,iocgra
      common /comgvp/ xllgvp,yllgvp,xurgvp,yurgvp
      common /gphwdo/xllgeo,yllgeo,xurgeo,yurgeo
      common /aspect/ xaspec,yaspec,xvlow,xvhigh,yvlow,yvhigh
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
c
c     print*,' comgra,comscr : ',xllscr,yllscr,xurscr,yurscr,
c    + xllgra,yllgra,xurgra,yurgra
c     print*,'Graphics viewport',xllgvp,xurgvp,yllgvp,yurgvp
      xllgvp = xvlow+(xvhigh-xvlow)*(xllgra-xllscr)/(xurscr-xllscr)
      xurgvp = xvlow+(xvhigh-xvlow)*(xurgra-xllscr)/(xurscr-xllscr)
      yllgvp = yvlow+(yvhigh-yvlow)*(yllgra-yllscr)/(yurscr-yllscr)
      yurgvp = yvlow+(yvhigh-yvlow)*(yurgra-yllscr)/(yurscr-yllscr)
c     print*,'Graphics viewport',xllgvp,xurgvp,yllgvp,yurgvp
      yrad = xrad * (yurgvp - yllgvp) / (xurgvp - xllgvp)
      yc = yrad
      xllgeo = -xrad
      xurgeo = xrad
      yllgeo = -yrad
      yurgeo = yrad
c     print*,'Calgvp -- New yrad = ',yrad,xllgvp,xurgvp,yllgvp,yurgvp
c
      return
      end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    calkvp
c
c  Functional Description:
c       calculate key area viewport parameters
c
c  Input Files/Parameters:
c
c  Output Files/Parameters: N/A
c
c  Subroutines/Functions Called:
c
c  Called By:                    FMAIN
c
c  Local Variables: N/A
c
c  Restrictions: N/A
c
```

Jul 20 12:40 1989 car .f Page 39

```
c  Abnormal Return Conditions:  N/A
c
c  Location:          Apollo       /a21/dave
c
c  Programmer          Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine calkvp
c
c       calculate key area viewport parameters
c
        common /comscr/ xllscr,yllscr,xurscr,yurscr
        common /comkey/xllkey,yllkey,xurkey,yurkey,ibckey,iockey,inckey
        common /comkvp/ xllkvp,yllkvp,xurkvp,yurkvp
        common /aspect/ xaspec,yaspec,xvlow,xvhigh,yvlow,yvhigh
c
        xllkvp = xvlow+(xvhigh-xvlow)*(xllkey-xllscr)/(xurscr-xllscr)
        xurkvp = xvlow+(xvhigh-xvlow)*(xurkey-xllscr)/(xurscr-xllscr)
        yllkvp = yvlow+(yvhigh-yvlow)*(yllkey-yllscr)/(yurscr-yllscr)
        yurkvp = yvlow+(yvhigh-yvlow)*(yurkey-yllscr)/(yurscr-yllscr)
c       print*,'key viewport',xllkvp,xurkvp,yllkvp,yurkvp
c
        return
        end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: CALMAP
C
C FUNCTIONAL DESCRIPTION:  CALCULATES MAP PARAMETERS
C
C INPUT FILES/PARAMETERS:
C
C        MPARMS                REAL(4)      MIN LAT,MAX LAT,MIN LON, MAX LON.
C
C GLOBAL VARIABLES :
C
C        QITPRO                INTEGER      CURRENT PROJECTION.
C        QCLAT                 REAL         LATITUDE AT CENTER OF MAP.
C        QCLON                 REAL         LONGITUDE AT CENTER OF MAP.
C
C OUTPUT FILES/PARAMETERS:  NONE.
C
C SUBROUTINES/FUNCTIONS CALLED : NONE.
C
C CALLED BY:                   CALCPR, FSHOWA, FDFPRO
C
C LOCAL VARIABLES:
C
C        RMINLA                REAL         MINIMUM LATITUDE.
C        RMAXLA                REAL         MAXIMUM LATITUDE.
C        RMINLO                REAL         MINIMUM LONGITUDE.
C        RMAXLO                REAL         MAXIMUM LONGITUDE.
C        CM2RAD                REAL         CONVERTS MINUTES TO RADIANS.
C        RADLAT                REAL         LATITUDE DIFFERENCE.
```

Jul 20 12:40 1989 cara .f Page 40

```
C        RADLON              REAL        LONGITUDE DIFFERENCE.
C        R1                  REAL        COSINE MINLAT.
C        R2                  REAL        COSINE MINLON.
C        RRAD                REAL        RADIUS OF MAP.
C
C RESTRICTIONS: NONE.
C
C ABNORMAL RETURN CONDITIONS:   NONE.
C
C LOCATION:                     /a21/gjf/MAPADD.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE CALMAP (MPARMS)

C       CALCULATES A MAP CENTER POINT AND SCALE FROM GEOGRAPHIC LIMITS

        REAL MPARMS(4)

        COMMON /PIE/ PIE,TPIE,PIO2,PIO4
        LOGICAL QLTON(16),QDOTEM
        INTEGER QPGRID(4),QTYPTB(16)
        INTEGER QLEVEL,QITPRO,QIRES,QLUNDA,QLUNIN,QLUNLI
        COMMON /MAP/ QXRNM,QXC,QYC,QLEVEL,QCLAT,QCLON,QXRAD,QYRAD,
     +      QITPRO,
     +      QIRES,QTYPTB,QLUNDA,QLUNIN,QLUNLI,QLTON,QPGRID,QDOTEM,
     +      QORHAL

        logical olhldf
        common /ohfdbc/ olhldf

C       CONVERT MINUTES TO RADIANS BY MULTIPLYING BY CM2RAD

        DATA CM2RAD/2.908882087E-4/

        RMINLA = MPARMS(1)
        RMAXLA = MPARMS(2)
        RMINLO = MPARMS(3)
        RMAXLO = MPARMS(4)

        RADLON = (RMAXLO-RMINLO)/2.
        RADLAT = (RMAXLA-RMINLA)/2.

        QCLAT = RMINLA + RADLAT
        QCLON = RMINLO + RADLON

C       COMPENSATE FOR SHORTER DISTANCES BETWEEN MERIDIANS AT HIGHER LATS

        RADLON = RADLON * COS (QCLAT)
```

```
C           COMPENSATE FOR MERCATOR STRETCHING IN Y DIRECTION
c           PRINT*,'RADLAT,RADLON : ',RADLAT,RADLON

        IF (olhldf) THEN
            R1 = COS(RMAXLA)
            R2 = COS(RMINLA)
            IF(R2.LT.R1) R1 = R2
            IF (R1.LT..3) R1 = .3
            R2 = RADLAT / R1
            RADLAT = RADLAT + (R2 - RADLAT)/2
            PRINT*,'RADLAT,R2,R1 = ',RADLAT,R2,R1
        endif

c           corrects for windows wrapped around the date line
            if (rminlo.gt.rmaxlo) then
              if (qclon.ge.0.) then
                qclon = qclon - pie
              else
                qclon = qclon + pie
              endif
            endif


        RRAD = RADLON

        IF (RADLAT.GT.RADLON) RRAD = RADLAT

        XRNMNW = (RRAD*1.25)/CM2RAD

        CALL CHSCAL (XRNMNW)

        RETURN
        END

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  calmvp
c
c  Functional Description:
c       calculate menu area viewport parameters
c
c  Input Files/Parameters:
c
c  Output Files/Parameters: N/A
c
c  Subroutines/Functions Called:
c
c  Called By:                  FMAIN
c
c  Local Variables: N/A
c
c  Restrictions: N/A
c
c  Abnormal Return Conditions:  N/A
```

```
Jul 20 12:40 1989  car:   .f Page 42

c
c  Location:      Apollo       /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine calmvp
c
c       calculate menu area viewport parameters
c
        common /comscr/ xllscr,yllscr,xurscr,yurscr
        common /commen/xllmen,yllmen,xurmen,yurmen,ibcmen,iocmen,incmen
        common /commvp/ xllmvp,yllmvp,xurmvp,yurmvp
        common /aspect/ xaspec,yaspec,xvlow,xvhigh,yvlow,yvhigh
c
        xllmvp = xvlow+(xvhigh-xvlow)*(xllmen-xllscr)/(xurscr-xllscr)
        xurmvp = xvlow+(xvhigh-xvlow)*(xurmen-xllscr)/(xurscr-xllscr)
        yllmvp = yvlow+(yvhigh-yvlow)*(yllmen-yllscr)/(yurscr-yllscr)
        yurmvp = yvlow+(yvhigh-yvlow)*(yurmen-yllscr)/(yurscr-yllscr)
c       print*,'Menu viewport',xllmvp,xurmvp,yllmvp,yurmvp
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        CERROR
C
C FUNCTIONAL DESCRIPTION:           .
C
C CALLED BY:                        AREANF, DISCEN, DISPRO, DISSCA, NOTUND
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine cerror (len,msg)
c
c       this subroutine puts an error message to the system area for commands
c
        call drwamp (msg,1)
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: CHAWDB
C
C FUNCTIONAL DESCRIPTION:  CHANGES WORLD DATA BANK.
C
C INPUT FILES/PARAMETERS:
C
C         LENWDB                   INTEGER     LENGTH OF WDB STRING.
C         WDB                      CHAR*(*)    NEW WDBII.
```

Jul 20 12:40 1989 car: .f Page 43

```
C
C GLOBAL VARIABLES :
C
C       QLUNDA                INTEGER     LOGICAL UNIT NUMBER FOR WDBII DATA
C                                         FILE.
C       QLUNIN                INTEGER     LOGICAL UNIT NUMBER FOR WDBII
C                                         INDEX FILE.
C       QLUNLI                INTEGER     LOGICAL UNIT NUMBER FOR WDBII LINE
C                                         INDEX FILE.
C       LENMAP                INTEGER     LENGTH OF MAP PATHNAME.
C       MAPATH                CHAR*50     WDBII FILE PATHNAMES.
C       IERWDB                INTEGER     WDBIIx OPEN ERROR FLAG
C
C OUTPUT FILES/PARAMETERS:  NONE.
C
C SUBROUTINES/FUNCTIONS CALLED :
C
C       OPENIN                OPENS WDBII FILES.
C       CLOSEI                CLOSES WDBII FILES.
C
C CALLED BY:                    CHSCAL, DECDET, INCDET, RPARAM, RSLCON
C
C LOCAL VARIABLES:
C
C       FIRSTM                LOGICAL     INDICATES FIRST TIME FILES ARE OPENED.
C       WDBFUL                CHAR*50     WDBII FILE FULL PATHNAME.
C       IERROR                INTEGER     ERROR CONDITION.
C
C RESTRICTIONS: NONE.
C
C ABNORMAL RETURN CONDITIONS:   NONE.
C
C LOCATION:                     /a21/gjf/MAPSRC.FTN
C
C PROGRAMMER:                   DATE OF LAST CHANGE      REASON FOR CHANGE
C
C     DAVE NATION                                        ORIGINAL CODE.
C     JERRY FENERTY                                      DOCUMENT AND MODIFY
C                                                        FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE CHAWDB (LENWDB,WDB)

C       THIS SUBROUTINE CHANGES THE VERSION OF THE WDBII FILE

        character*50 mapath
        common /mapath/ mapath
        common /lenmap/ lenmap
        LOGICAL FIRSTM
        CHARACTER*(*) WDB
        CHARACTER*100 WDBFUL
        COMMON /CERWDB/ IERWDB
        LOGICAL map
        common /mapdbc/ map
```

Jul 20 12:40 1989 cara .f Page 44

```
      LOGICAL QLTON(16),QDOTEM
      INTEGER QPGRID(4),QTYPTB(16)
      INTEGER QLEVEL,QITPRO,QIRES,QLUNDA,QLUNIN,QLUNLI


      COMMON /MAP/ QXRNM,QXC,QYC,QLEVEL,QCLAT,QCLON,QXRAD,QYRAD,
   +      QITPRO,
   +      QIRES,QTYPTB,QLUNDA,QLUNIN,QLUNLI,QLTON,QPGRID,QDOTEM,
   +      QORHAL

      DATA FIRSTM/.TRUE./

      IF (FIRSTM) THEN
          FIRSTM = .FALSE.
      ELSE
          CALL CLOSEI (QLUNDA,QLUNIN,QLUNLI)
      ENDIF

      IF (LENMAP.GT.0) THEN
          WDBFUL = MAPATH(1:LENMAP) // WDB(1:LENWDB)
          LENFUL = LENWDB + LENMAP
      else
          wdbful = wdb(1:lenwdb)
          lenful = lenwdb
      ENDIF
      IF (map) then
          print*,'mapath = ',mapath(1:lenmap),lenmap
          print*,'CHAWDB OPENING ',wdbful(1:lenful),lenful
      endif
      CALL OPENIN (QLUNDA,QLUNIN,QLUNLI,LENFUL,WDBFUL,IERROR)

      IERWDB = IERROR

      RETURN
      END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     CHDATE
C
C FUNCTIONAL DESCRIPTION:        .
C
C CALLED BY:                     DIFTIM, FADCHG, FADTIM
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

     subroutine chdate(year,day,hour,min,dtg)

c
c  this subroutine takes a julian dtg in integer and converts
c  it to a character*9 string in format yydddhhmm
c
     integer year
     integer day
```

Jul 20 12:40 1989 care .f Page 45

```
      integer hour
      integer min
      character*9 dtg

      dtg(1:1) = char (mod ((year/10), 10) + 48)
      dtg(2:2) = char ((year - (year/10) * 10) + 48)
      dtg(3:3) = char ((day / 100) + 48)
      dtg(4:4) = char (mod ((day/10), 10) + 48)
      dtg(5:5) = char ((day - (day/10) * 10) + 48)
      dtg(6:6) = char (mod ((hour/10), 10) + 48)
      dtg(7:7) = char ((hour - (hour/10) * 10) + 48)
      dtg(8:8) = char (mod ((min/10), 10) + 48)
      dtg(9:9) = char ((min - (min/10)*10)+48)
c     print*,'in chdate: ',dtg
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     check
C
C FUNCTIONAL DESCRIPTION:        check which function button has been hit
C
C INPUT FILES/PARAMETERS:
C     Menu control globals
C       qcancl       bl        logical  cancel flag
C       qext2m       bl        logical  exit to main menu flag
C       qretrn       bl        logical  return to previous action/menu
C
C     General globals
C       qfb          butons    integer  array of values for function buttons
C       qmb          butons    integer  array of values for the mouse buttons
C
C
C
C OUTPUT FILES/PARAMETERS:
C
C     error                    logical  true if an error is detected by
C                                       check
C     rflag                    logical  true if exiting the calling menu
C
C SUBROUTINES/FUNCTIONS CALLED
C
C     helper                   display the appropriate help file
C     llshow                   display the lat/long of a point on the screen
C     printr                   prints current screen image
C     prompt                   displays a message on the screen and
C                              gets input from the user
C     redraw                   clear the screen and redraw it from segment
C                              storage
C     scrdia                   display the diameter of the current map
C     tmpstr                   temporary store the graphic
C
C
C CALLED BY:                     BOXARE, COLBAK, DETCON, LLSHOW, MMCON,
C                                OFFST,  PROCON, PRTMEN, RECDIS,
```

Jul 20 12:40 1989 care .f Page 46

```
C                               RESCON, RSLCON, SAVDIS, TRKCON, TXWRIT,
C                               CLASS,  FTRCON, GEOCON, OVRCON
C
C LOCAL VARIABLES:
C
C     button                  integer  button passed to check
C     cmenu                   integer  menu id of routine calling check
C
C RESTRICTIONS:
C
C
C ABNORMAL RETURN CONDITIONS:   n/a
C
C LOCATION:                     /u2/say/TEXT/source/check.f
C
C PROGRAMMER:                   DATE OF LAST CHANGE     REASON FOR CHANGE
C
C     SAYates                   10/27/83         initial entry
C     RPSmith                   11/20/87         add dist/az arc to mrkseg
C     L. McCleary               Jan 1988         sep amp & sys - check
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine check(button,cmenu,error,rflag)
c
c*****routine to determine which function button was used
c
c*****definition and declaration of common blocks
c
      common/b1/qcancl,qext2m,qretrn,qstmnu,qnextm
      integer     qnextm
      logical     qcancl,qext2m,qretrn,qstmnu
c
      common/butons/qfb,qmb
      integer     qfb(26),qmb(4)

        common /msgold/ msgold,msgonm

        common/ampprm/ampseg,ampsgb
        integer ampseg,ampsgb
c ----- updated 7/31/87 CSL
        common /amfrst/ amfrst
        logical amfrst

        integer dstsg1,dstsg2,dstsg3
        logical dstfst
        common/mrkseg/dstsg1,dstsg2,dstsg3,dstfst

        common/llseg/llsgmt,llfrst
        integer llsgmt
        logical llfrst

      common/picks/qsegid,qpick,qmodfl
      integer     qsegid,qpick
      logical     qmodfl
```

```
      logical sys
      common /sysdbc/ sys
c
c*****declaration of local variables

      integer     cmenu,button
      logical     rflag,error
      logical     found

      if (sys) print*,'check -- enter ',button,cmenu

      qretrn = .false.
      rflag = .false.
      error = .false.

         call subchk (button,cmenu,error,rflag)
         if (error) then
             error = .false.
c*****       help
c             if(button .eq. qfb(23) .or. button .eq. qmb(3)) then
             if(button .eq. qfb(23) .or. button .eq. qmb(2)) then
                call helper (cmenu)
c*****       print
             else if(button .eq. qfb(24)) then
                 call prtmen
c*****       display latitude and longitude
             else if(button .eq. qfb(17)) then
                 call llshow
c*****       display diameter of map
             else if(button .eq. qfb(18)) then
                 call scrdia
c*****       Command Mode
             else if(button .eq. 85) then
                 call commnd
c*****       Draw Current Map
             else if(button .eq. 86) then
                 call drwmap
c*****       Delete the amplification segment
             else if(button.eq.ampseg.and.button.ne.0) then
                 call jpurge(ampseg)
                 call jvisbl(ampsgb,0)
                 call jvisbl(ampsgb,1)
                 amfrst = .true.
                 if(.not. llfrst) then
                    call jpurge(llsgmt)
c ----- updated 7/31/87 CSL
                    llfrst = .true.
                 endif
                 if(.not. dstfst)then
                    call jpurge(dstsg1)
                    call jpurge(dstsg2)
                    call jpurge(dstsg3)
c ----- updated 7/31/87 CSL
                    dstfst = .true.
                 end if
             else
```

```
Jul 20 12:40 1989  carε  .f Page 48

c*****          tracking data plot interrogation
                call findtk(button,found)
                if (.not. found) then
                     error = .true.
                endif
            endif
            call mesg(1)
            if (qcancl.or.qext2m) rflag = .true.
            if (sys) print*,'check -- exit ', error, rflag
        endif

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: checka
C
C FUNCTIONAL DESCRIPTION:  CHECKS A RECTANGULAR GEOGRAPHIC AREA FOR
C      INTERSECTION WITH VIEWPORT DISPLAY AREA
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                    NO LONGER USED BY CARICATURE
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE CHECKA (CHINV,ALLINV,SOMEON,ALIMIT)

C CHECKS A RECTANGULAR GEOGRAPHIC AREA FOR
C      INTERSECTION WITH VIEWPORT DISPLAY AREA

        LOGICAL CHINV,ALLINV,SOMEON,ISON,ISINV
        DIMENSION ALIMIT(4),RLA(4),RLO(4),X(4)
        COMMON /VIEWP/ XRAD,YRAD,IXNP,IYNP,XC,YC
        RLA(1)=ALIMIT(1)
```

Jul 20 12:40 1989 car: .f Page 49

```
        RLA(2)=ALIMIT(2)
        RLA(3)=ALIMIT(1)
        RLA(4)=ALIMIT(2)
        RLO(1)=ALIMIT(3)
        RLO(2)=ALIMIT(3)
        RLO(3)=ALIMIT(4)
        RLO(4)=ALIMIT(4)

        IXT=0
        IYT=0
        VCNT=0
        SOMEON=.FALSE.

        DO 620 K=1,4

            ISINV=.FALSE.

            IF (CHINV) THEN
                CALL INVTES (RLA(K),RLO(K),ISINV)
            ENDIF

            IF (.NOT.ISINV) THEN
                VCNT=VCNT+1
                CALL LLTOXY(RLA(K),RLO(K),X(K),Y)
                CALL CLIPXY(X(K),Y,ISON)
c       ******************
c       the following statement is necessary to get this subroutine
c       to work on the apollo for some reason (any dummy statement
c       would do)
C        i = i                              Apollo fix - checka
c       ******************
                IF(ISON) THEN
                    SOMEON=.TRUE.
                ELSE
                    IXT=IXT+IXNP
                    IYT=IYT+IYNP
                ENDIF
            ENDIF
  620   CONTINUE

C       THIS STATEMENT NECESSARY FOR RECTANGULAR PROJECTIONS AT BREAK POINT
C       IF(X(1).GT.X(3)) SOMEON=.FALSE.
C                                 THIS STATEMENT CAN BE TAKEN OUT FOR INSURANCE
C                                 THAT INVISIBILITY IS CHECKED ALL THE TIME

        IF(VCNT.EQ.4) CHINV=.FALSE.
        IF(VCNT.EQ.0) THEN
            ALLINV=.TRUE.
        ELSE
            IF (.NOT.SOMEON.and.x(1).le.(x(3)+xrad*2)) THEN
                IF (ABS(IXT).LT.VCNT.AND.ABS(IYT).LT.VCNT)
     +          THEN
                    SOMEON=.TRUE.
                ENDIF
            ENDIF
        ENDIF
```

Jul 20 12:40 1989 car: .f Page 50

```
  690   CONTINUE

        RETURN
        END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        CHECKB
C
C FUNCTIONAL DESCRIPTION:           .
c -   Description: Checks whether any portion of a segment lies within the
c -                viewport for a LAMBERT Conformal map projection.
C
C CALLED BY:                        NO LONGER USED BY CARICATURE
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE checkb(someon,alimit)

        LOGICAL   someon,ison
        DIMENSION alimit(4),rla(4),rlo(4)

        rla(1) = alimit(1)
        rla(2) = alimit(2)
        rla(3) = alimit(1)
        rla(4) = alimit(2)
        rlo(1) = alimit(3)
        rlo(2) = alimit(3)
        rlo(3) = alimit(4)
        rlo(4) = alimit(4)

        someon=.FALSE.
        DO 620 k=1,4
           CALL lltoxy(rla(k),rlo(k),x,y)
           CALL clipxy(x,y,ison)
           IF (ison) someon = .TRUE.
  620   CONTINUE

        RETURN
        END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        CHECKM
C
C FUNCTIONAL DESCRIPTION:           .
C -            CHECKS RECTANGULAR AREA FOR INTERSECTION
C -            WITH VIEWPORT (MERCATOR & EQUIRECTANGULAR).
C
C CALLED BY:                        NO LONGER USED BY CARICATURE
C
C PROGRAMMER:                       DATE OF LAST CHANGE     REASON FOR CHANGE
c -   L MCCLEARY                                            ORIGINAL CODE
C
```

```
C-*-*-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE CHECKM(PRLAT,PRLON,RLAT,RLON,ISGOOD,isinv)
      LOGICAL ISGOOD
      LOGICAL INVALI
      LOGICAL ISINV
      REAL PRLAT,PRLON,RLAT,RLON
      COMMON/INVALI/INVALI
      COMMON/PIE/PIE,TPIE,PIO2,PIO4
C
      IF (ABS(PRLON).GT.PIE) PRLON = PRLON - SIGN(TPIE,PRLON)
      CALL INVTES(PRLAT,PRLON,ISINV)
      CALL LLTOXY(PRLAT,PRLON,PX,PY)
      IF (ABS(RLON).GT.PIE)  RLON = RLON - SIGN(TPIE,RLON)
      CALL INVTES(RLAT,RLON,ISINV)
      CALL LLTOXY(RLAT,RLON,X,Y)
C
      ISGOOD=.FALSE.
      IF(.NOT.INVALI.AND..NOT.ISINV) ISGOOD=.TRUE.
      CALL INVTS2(RLAT,RLON,X,Y,PRLON,PX,ISGOOD)
C
      RETURN
      END

C+*+*+*+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CHGIND
C
C FUNCTIONAL DESCRIPTION:       .
C
C CALLED BY:                    SETFAD
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine chgind(faddtg,longer,indx)
c
c     this subroutine will add or delete tracks from the
c     current display list and the screen based upon the
c     new fade time input by the user in faddtg.
c
      logical done
      logical longer

      character*9 faddtg
      character*9 olddtg

      integer chkind
      integer indx
      integer lctrak

      integer tnewst
      integer toldst
      common /tarbou/ tnewst, toldst
      integer bgnpos
```

Jul 20 12:40 1989 car: .f Page 52

```
      integer endpos
      common /timpos/ bgnpos,endpos
      character*160  trkrec (1000)
      common /trkrec/ trkrec
      integer trkndx (1000)
      common /trkndx/ trkndx
      integer tfaddx
      integer tfadtm
      common /tfadez/ tfaddx, tfadtm
      integer numrcs
      common /numrcs/ numrcs
      integer ltypov(16)
      logical ltonov(16),rankt(26,16)
      common /maptoo/ ltypov,ltonov,rankt
      integer tkoset
      common /tkoset/ tkoset
      logical segact (1000)
      common /segact/ segact
      logical spprsd (1000)
      common /spprsd/ spprsd
      logical trackn
      common /trkdbc/ trackn

      data lctrak /3/
c
c     when longer is true then the fade time has been increased and therefore
c     the fade index (pointing to earliest displayed track) will decrease
c     to possibly include more tracks on the display

      if (trackn) then
         print *, 'enter chgind'
         print *, '    longer = ', longer
         print *, '    faddtg = ', faddtg
      end if

      done = .false.


      if (longer) then
c
c         Increasing the fade time...
c         when index is 0, nothing is visible;
c         start at tnewst (newest time on list)  and check up
c         the list for a track to become visible.
c
          if (trackn) then
             print *, '    indx = ', indx
          end if

          if ( indx .ne. 0) then
              chkind = indx
          else
              chkind = tnewst
          endif
c
c         check each time on list until end of list
```

```
c
 10       if (done) go to 20
c
c            get the dtg for this track
c
             olddtg(1:9) = trkrec(trkndx(chkind))(bgnpos:endpos)

c            compare it against the new faddtg
c
c            done is true if fade dtg is later than dtg of this record

             if (faddtg .ne. olddtg) then
                 call cmptim(faddtg, olddtg, done)
             endif
             if (.not. done) then
c
c                 if not yet done, then add this record to current display
c                 check to see if this record is suppressed
c
                  if (.not. spprsd(trkndx(chkind))) then
c
c                    if not suppressed, see if this segment
c                    is already active.  If so, make this
c                    segment(track) visible if tracking is on; else
c                    create a new segment.
c
                     if (segact(trkndx(chkind))) then
                        if (ltonov(lctrak)) then
                           call jvisbl (trkndx(chkind)+tkoset, 1)
                        endif
                     else
                        call seghnd (trkndx(chkind)+tkoset,
     +                        trkrec(trkndx(chkind)))
                        segact(trkndx(chkind)) = .true.
                     end if
                  end if
c
c                 when we get to end of current active
c                 tracks, we are done searching.c
c
                  if(chkind .eq. toldst) then
                      done = .true.
                  endif
c
c                 go to next oldest track
c
                  chkind = chkind - 1
                  if (chkind .eq. 0) then
                      if (trkndx(numrcs) .ne. 0) then
                          chkind = numrcs
                      else
                          chkind = 1
                          done = .true.
                      endif
                  endif
             endif
```

Jul 20 12:40 1989 carε .f Page 54

```
          go to 10
 20       continue
          indx = chkind
c
c     decreasing the fade time...
c     see if there are any tracks to be deleted from list and display
c
      else
          if (indx .ne. 0) then
 30            if(done) go to 40

                 olddtg(1:9) = trkrec(trkndx(indx))(bgnpos:endpos)

c                done is true if this tracks dtg is later than
c                current fade dtg.

                 call cmptim(olddtg, faddtg, done)
c
c                if not yet done, and this track is an
c                active segment, make the segment invisible
c
                 if (.not. done) then
                      if (segact(trkndx(indx))) then
                          if (trackn) then
                             print *, 'indx = ', indx
                             print *, 'segment = ', trkndx(indx)+tkoset
                          end if
                          call jvisbl (trkndx(indx)+tkoset, 0)
                      end if
c
c                     if this is top of list, then we are done
c
                      if(indx .eq. tnewst) then
                          done = .true.
                          indx = 0
                      else
c
c                         else, get next position on list
c
                          indx = mod(indx,numrcs) + 1
                      endif
                 endif
              go to 30
 40           continue
          endif
      endif

      if (trackn) then
         print *, 'exit chgind'
         print *, '   indx = ', indx
      end if

      return
      end
```

Jul 20 12:40 1989 car< .f Page 55

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CHGPTS
C
C FUNCTIONAL DESCRIPTION:       .
C
C CALLED BY:                    APARCS, APCIRC, APFILL, APLINE, APMARK,
C                               APRECT, APSMOO
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine chgpts(array,npts,type)

c       this routine changes the array of points passed to
c          it by multiplying the point by a scalefactor
c          which has been set by a previous routine and
c          subtracting an offset value which has also
c          been preset and is set based on the 'type'
c          of array which has been passed-- 0 = x array,
c          1 = yarray, and 2 = neither, so an offset is
c          not applied to the passed array (ie, the radius of
c          a circle).
c          The points are "mirrored" about the 0-axis if the
c          mirror flag is set--0 = x points are to be mirrored,
c          1= y points are to be mirrored, 2 = points are not mirrored
c    VARIABLES:
c        array-points to be converted
c        npts- number of points in the array
c        type- type of array being passed-- 0=xarray, 1=yarray,
c            2= neither x or y
c        offset- the offset which will be set and applied to the
c            array
c        scale- the scale factor which will be set and applied
c            to the array
c        mirflg- integer flag to control the mirroring
c        xscale- the scalefactor to be applied to an x array
c        yscale- the scalefactor to be applied to a y array
c        xoffst- the offset to be applied to an x array
c        yoffst- the offset to be applied to a y array
c   CALLS:     mirrit mrcntr
c   PROGRAMMER:  Nancy Detrich, A215, March, 1984
C------  MODIFIED BY A692 FOR COMPLETION
c   Modified by David W. Swim, T3333, 5 AUG 1986


      real offset,scale,array(*)
      integer npts,type
      common /icon/ qicnum,qicseg,qiconx,qicony,qicszx,
     + qicszy,qicrot,qicmir,qictyp,qconnx,qconny,qiconn
      integer qicnum(6),qicseg,qicmir,qictyp,qiconn
      real qiconx,qicony,qicszx,qicszy,qicrot
      real qconnx,qconny
      common /chgit/ mirflg,xscale,yscale,xoffst,yoffst,rotang
      real xscale,yscale,rotang
```

```
Jul 20 12:40 1989  car&   .f Page 56

      integer xoffst,yoffst,mirflg

c     IF TYPE = 0, PASSED ARRAY IS X ARRAY; IF 1, THEN Y ARRAY;
c      IF 2, THEN NEITHER (OFFSET SET TO ZERO)

      if(type .eq. 0)then
          scale = xscale
          offset = real(xoffst) - 1.2
      else if(type .eq. 1) then
          scale = yscale
          offset = real(yoffst) - 1.3
      else if (type.eq.2) then
          scale = xscale
          offset = 0.0
      endif

c     MULTIPLY ARRAY POINTS BY SCALE FACTOR & ADD OFFSET

      do 10 i=1,npts
          array(i) = array(i) * (scale) - offset
10    continue

c     ROTATE AN ICON
      if ((mirflg.eq.0).and.(type.eq.0)) then
c         mirror the X ARRAY
          if(qicnum(1).eq.22) goto 250
          if(qicnum(1).eq.143) goto 250
          if(qicnum(1).eq.144) goto 250
          if((qicnum(1).ge.152).and.(qicnum(1).le.195)) goto 250
          if((qicnum(1).ge.260).and.(qicnum(1).le.270)) goto 250
          call mirrit(array,npts,scale)
          goto 270
250       continue

c    Mrcntr is called when the icon is not a military symbol.
c    Military symbols are positioned by lower left while
c    other icons are positioned by center point.

          call mrcntr(array,npts,scale)

270       continue
      else if ((mirflg.eq.1).and.(type.eq.1)) then
c         mirror the Y ARRAY
          if(qicnum(1).eq.22) goto 260
          if(qicnum(1).eq.143) goto 260
          if(qicnum(1).eq.144) goto 260
          if((qicnum(1).ge.152).and.(qicnum(1).le.195)) goto 260
          if((qicnum(1).ge.260).and.(qicnum(1).le.270)) goto 260
          call mirrit(array,npts,scale)
          goto 280
260       continue
          call mrcntr(array,npts,scale)
280       continue
      endif
         return
         end
```

Jul 20 12:40 1989 car: .f Page 57

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CHGTXT
C
C FUNCTIONAL DESCRIPTION:       .
C
C CALLED BY:                    APTEXT
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine chgtxt(height,x,y)

c        this routine is similar to the chgpts routine used
c          by all the other 'ap' routines, but is used for
c          the special case of text.  The points are converted
c          by the offset and scalefactor, and the height
c          is adjusted proportional to the scalefactor.
c          The common block variables were  set by the
c          routine calling either drawic or drwicn which
c          call this routine for redrawing all text.
c      VARIABLES:
c         height- height of the text to be displayed
c         x/y- coordinate for placement of the text--is processed
c           the same way chgpts handles all other coordinates
c         common block chgit- parameters set for changing points
c             in a file (mirror,scalefactors and offsets)
c      ***only one scale factor is needed for this routine, and
c             it is passed in the xscale
c    CALLS:      none
c    PROGRAMMER:  Nancy Detrich, A215, March, 1984


        integer height,x,y
        common /chgit/mirflg,xscale,yscale,xoffst,yoffst,rotang
        real xscale,yscale,rotang
        integer xoffst,yoffst,mirflg

c       multiply the height by the scalefactor
        height = height * xscale
C ***   INSERTED BY GJF, CAN'T IMAGE WHY A HEIGHT OF ZERO WOULD EVER
C ***                    BE DESIRED -- FOR ECHELON MENU.
        if (height.lt.1) height = 1
c       change the coordinates the same way coordinates are
c          changed in chgpts
        x = (REAL(x)) * xscale - xoffst
        y = (REAL(y)) * xscale - yoffst
c
        if (mirflg.eq.0) then
           x=INT((REAL(-x))+(190./(2.6/xscale))+.05)
        else if (mirflg.eq.1) then
           y=INT((REAL(-y))+(190./(2.6/xscale))+.05)
        endif
c
```

```
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CHKCLK
C
C FUNCTIONAL DESCRIPTION:       .
C
C CALLED BY:                    TIMCHK
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine chkclk(click,curdtg)
c
c determine if a minute or more has gone by on the system clock
c
      logical click
      character*9 curdtg
c
c
      integer*2 oldtim(6)
      integer*2 newtim(6)
      common /ctimes/ oldtim, newtim
      data oldtim(1) /0/
      data oldtim(2) /0/
      data oldtim(3) /0/
      data oldtim(4) /0/
      data oldtim(5) /0/
      data oldtim(6) /0/

c     check click and get current time in yydddhhmm format

      call diftim(click, curdtg)

      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CHKSIZ
C
C FUNCTIONAL DESCRIPTION:       .
C
C CALLED BY:
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine chksiz

c       check the size of the current retained segment and create a
c       new one if necessary
```

```
        COMMON /COUNTS/ ICNTGP,ICNTDV,icntpl
        COMMON /LTYPE/ LTYPE

        logical vax,map
        common /vaxdbc/ vax
        common /mapdbc/ map

        logical bitmod
        common /bitmod/ bitmod

        if (.not.bitmod) then
c           *** Apollo core has problems if icntdv gets in the range of 5700
            if (vax) then
                maxicn = 50000
            else
                maxicn = 5000
            endif
            if (icntdv.gt.maxicn) then
                icntdv = 0
                CALL FLUSHB
                CALL JRCLOS
ccc             CALL MESG(268)
                CALL GEOWIN
                CALL GRAVPT
                call getseg(newseg)
                IF (map) PRINT*,'IN chksiz OPENING SEGMENT # ',newseg
                CALL JROPEN(newseg)
                CALL XCOLOR (LTYPE)
            endif
        endif

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      CHLEVL
C
C FUNCTIONAL DESCRIPTION:         .
C
C CALLED BY:                      CHSCAL, DETCON, RPARAM
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine chlevl (lev)
c
c       change level of detail variable and rank table
c
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
```

Jul 20 12:40 1989 cara .f Page 60

```
     +      ORHALT
        dimension ltypov(16)
        logical ltonov(16),rankt(26,16)
        common /maptoo/ ltypov,ltonov,rankt
c
        if (lev.eq.0) lev = 1
        level = lev
        do 305 j=1,16
            do 303 i=1,26
c               set sub-rank values for railroads and roads
                if ((j.eq.5.or.j.eq.6).and.i.gt.10) then
                    rankt(i,j) = rankt(i-10,j)
                else
                    if (level.ge.i) then
                        rankt(i,j) = .true.
                    else
                        rankt(i,j) = .false.
                    endif
                endif
  303       continue
c
c           when setlev is true then that
  305   continue
c       make sure standard guage railroads are turned on
        rankt(12,5) = .true.
c       turn on double line rivers
        rankt(5,4) = .true.
c       turn on lines of separation on land
        rankt(3,2) = .true.
c       turn on indefinite political boundaries
        rankt(2,2) = .true.
c
        return
        end

C+*+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: CHRLEN
C
C FUNCTIONAL DESCRIPTION:  NAMLIM OPENS NAME LIMITS FILE AND CALLS PLTNAM.
C
C INPUT FILES/PARAMETERS:
C
C        STRING                  CHAR*(*)     CHARACTER STRING.
C
C GLOBAL VARIABLES : NONE.
C
C OUTPUT FILES/PARAMETERS:
C
C        CHRLEN                  INTEGER      NON-BLANK LENGTH OF STRING.
C
C SUBROUTINES/FUNCTIONS CALLED :
C
C        LEN                     RETURNS DECLARED LENGTH OF STRING.
C
C CALLED BY: PLTNAM.
```

Jul 20 12:40 1989 cara .f Page 61

```
C
C LOCAL VARIABLES:
C
C        LN                    INTEGER     DECLARED LENGTH OF STRING.
C        IL                    INTEGER     NON-BLANK LENGTH OF STRING.
C
C RESTRICTIONS: NONE.
C
C ABNORMAL RETURN CONDITIONS:   NONE.
C
C LOCATION:                     /a21/gjf/MAPSRC.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*|*-*-*-*-

        FUNCTION CHRLEN (STRING)

C       THIS FUNCTION FINDS THE NON-BLANK LENGTH OF STRING

        INTEGER CHRLEN
        CHARACTER*(*) STRING

        LN=LEN(STRING)
        IL=0

        DO 110 I=1,LN

            IF(STRING(I:I).NE.' ') IL=I

  110   CONTINUE

        CHRLEN=IL

        RETURN
        END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: CHSCAL
C
C FUNCTIONAL DESCRIPTION:  CHANGES MAP SCALE.
C
C INPUT FILES/PARAMETERS:
C
C        XRNMNW                REAL        NAUTICAL MILE RADIUS.
C
C GLOBAL VARIABLES :
C
C        QFNTAB                INTEGER(17) INDEX TO WHICH WDBII TO BE USED.
C        QCURWD                CHAR*6      CURRENT WDBII.
C        QLEVL                 INTEGER(16) MAP FEATURE LEVELS.
```

```
Jul 20 12:40 1989  cara  .f Page 62

C       QXRNM                    REAL        NAUTICAL MILE RADIUS.
C       QLEVEL                   INTEGER     OVERALL LEVEL OF FEATURES.
C       QPGRID                   INTEGER(4)  DISTANCE BETWEEN GRID LINES AND
C                                            RESOLUTION OF GRID LINES.
C       QLTON                    LOGICAL(16) INDICATES WHETHER FEATURE IS
C                                            TURNED ON.
C
C OUTPUT FILES/PARAMETERS:  NONE.
C
C SUBROUTINES/FUNCTIONS CALLED :
C
C       CHAWDB                   CHANGES WDBII VERSION.
C
C CALLED BY:                       BOXARE, CALMAP, DECSCA, FCHSCA, INCSCA
C
C LOCAL VARIABLES:
C
C       FNLTR                    INTEGER(9)  WDBII DATA BASES.
C       SCALE                    INTEGER(17) MAP SCALE LEVEL TABLE.
C       LEVTAB                   INTEGER(17) DETAIL LEVELS TABLE.
C       ISTPTB                   INTEGER(17) DISTANCE BETWEEN LAT/LONG VALUES.
C       INCTAB                   INTEGER(17) RESOLUTION OF LINES.
C       MAXSCT                   INTEGER     LENGTH OF SCALE VALUE TABLE.
C       NAML                     INTEGER     LENGTH OF WDBII NAME.
C       SCPNTR                   INTEGER     INDEX INTO SCALE TABLE.
C       INDDB                    INTEGER     INDEX INTO WDBII LETTER TABLE.
C
C RESTRICTIONS: NONE.
C
C ABNORMAL RETURN CONDITIONS:    NONE.
C
C LOCATION:                        /a21/gjf/MAPADD.FTN
C
C PROGRAMMER:                      DATE OF LAST CHANGE     REASON FOR CHANGE
C
C     DAVE NATION                                          ORIGINAL CODE.
C     JERRY FENERTY                                        DOCUMENT AND MODIFY
C                                                          FOR A21 PROTOTYPE.
C     David Nation                 86-12-4                 Move tables to
C                                                          common and init in
C                                                          inicom
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE CHSCAL (XRNMNW)

C       THIS SUBROUTINE ALLOWS THE CHANGING OF MAP SCALE

        CHARACTER FNLTR(9),B
        COMMON /chscle/ scale,levtab,istptb,inctab
        DIMENSION SCALE(17)
        INTEGER LEVTAB(17),ISTPTB(17),INCTAB(17)
        INTEGER QFNTAB(17),SCPNTR
        COMMON /FNTAB/ QFNTAB
        CHARACTER*6 QCURWD
        COMMON /CURWDB/ QCURWD
```

Jul 20 12:40 1989 cara .f Page 63

```
C       MAP PARAMETERS

        logical map
        common /mapdbc/ map

        logical quickd
        common /quickd/ quickd
        INTEGER QLEVL(16)
        COMMON /LEVLS/ QLEVL
        dimension ltypov(16)
        logical ltonov(16),rankt(26,16)
        common /maptoo/ ltypov,ltonov,rankt

        LOGICAL QLTON(16),QDOTEM
        INTEGER QPGRID(4),QTYPTB(16)
        INTEGER QLEVEL,QITPRO,QIRES,QLUNDA,QLUNIN,QLUNLI
        COMMON /MAP/ QXRNM,QXC,QYC,QLEVEL,QCLAT,QCLON,QXRAD,QYRAD,
     +    QITPRO,
     +    QIRES,QTYPTB,QLUNDA,QLUNIN,QLUNLI,QLTON,QPGRID,QDOTEM,
     +    QORHAL

        DATA FNLTR/'a','b','c','d','e','f','g','h','x'/
        DATA MAXSCT/17/
        DATA NAML/6/

        IF (map) then
            print*,'chscal -- enter ',xrnmnw,qlevl,qpgrid,'  ',
     +      qcurwd,'  ',qlton
        endif
        QXRNM = XRNMNW
        J=0

C       LOOP

  525       J=J+1

            IF (J.GE.MAXSCT.OR.QXRNM.LE.SCALE(J)) GO TO 527

            GO TO 525

C       ENDLOOP

  527   SCPNTR=J

C       SCALE CHANGE PARAMETER PROCESSING
C         TO REDUCE CLUTTER

  300   CONTINUE

        QLEVEL=LEVTAB(SCPNTR)
        IF (map) print*,'in chscal setting level to',qlevel
             DO 110 I=1,16

                IF (QLTON(I)) THEN
```

```
                    QLEVL(I) = QLEVEL
                ELSE
                    QLEVL(I) = 0
                ENDIF
 110          CONTINUE
c
c       set the new ranks for each feature
c
        call chlevl(LEVTAB(SCPNTR))

        QPGRID(1)=ISTPTB(SCPNTR)
        QPGRID(2)=ISTPTB(SCPNTR)
        QPGRID(3)=INCTAB(SCPNTR)
        QPGRID(4)=INCTAB(SCPNTR)

        INDDB=QFNTAB(SCPNTR)

        IF (quickd) THEN
           INDDB = INDDB + 2
           IF (INDDB .GT. 6) INDDB = 6
        ENDIF

C       THIS SUBROUTINE SETS THE WDBII LEVEL

        B=FNLTR(INDDB)

        IF (B.NE.QCURWD(6:6)) THEN
           IF (map) PRINT*,'CHANGING WDB FROM ',QCURWD,'TO ',B
           QCURWD(6:6) = B
           CALL CHAWDB (NAML,QCURWD)
        ENDIF

        IF (QXRNM.GE.2900) THEN
             DO 312 I=2,6
                QLTON(I)=.FALSE.
  312   CONTINUE

        QLTON(11) = .FALSE.
        QLTON(12) = .FALSE.

        ENDIF

        IF (map) then
            print*,'chscal -- exit ',xrnmnw,qlevl,qpgrid,'  ',
     +      qcurwd,'  ',qlton
        endif

        RETURN
        END
```

Jul 20 12:40 1989 car: .f Page 65

```
C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    circle
c
c  Functional Description:
c       this subroutines draws a circle
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-
c
       subroutine circle (x0,y0,radius,nseg)
c
c      draw circle
c
       real cxarra (101), cyarra(101),angle,delta

       logical map
       common /mapdbc/ map

       data pi/3.1415927/
c      arb is an arbitrary factor limiting the size of default vectors
c      llimit is the lower limit of nnseg
c      max is the upper limit of nnseg
       data llimit,max /10,100/
       data arb /100./
c
       if (map) print*,'circle -- enter',x0,y0,radius,nseg
       numseg = nseg
       IF (numseg .LT. 3) THEN
           numseg = 360. * radius / arb
       ENDIF
       if (numseg .lt. llimit) numseg = llimit
       if (numseg .gt. max) numseg = max
C
c    define increment of angle
c
       delta = 2. * 3.141596 / float(numseg)
c    determine points around the circle using formula
c    x = xc + r*cos(angle)
```

Jul 20 12:40 1989 car: .f Page 66

```
c     y = yc + r*sin(angle)
c
        do 10 i = 1,numseg
            angle = FLOAT(i-1)*delta
            cxarra(i) = x0 + radius * cos( angle )
            cyarra(i) = y0 + radius * sin( angle )
   10   continue
c
c       make sure polygon is closed on Apollo
        cxarra(numseg+1) = cxarra(1)
        cyarra(numseg+1) = cyarra(1)
C
        call jmove (cxarra(1),cyarra(1))
        call jpolgn (cxarra,cyarra,numseg+1)
        call jpoly (cxarra,cyarra,numseg+1)

        if (map)
     +      print*,'circle -- exit ',i,temp,x,y,aseg,curang,
     +      radius,numseg
        RETURN
        END

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                       clenup
c
c  Functional Description:
c       this subroutine cleans up any system dependent things
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                       FMAIN
c
c  Local Variables: N/A
c
c  Restrictions: N/A
c
c  Abnormal Return Conditions:  N/A
c
c  Location:       /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine clenup

c       this subroutine cleans up any system dependent things

        integer qdsdev,qpydev,qecho,qlecho
        common /device/ qdsdev,qpydev,qecho,qlecho
```

```
Jul 20 12:40 1989  carε  .f Page 67

        logical rdkey,savkey
        common /rkdbc/ rdkey
        common /svkdbc/ savkey
        logical eofkey
        integer keylun,newlun
        common /keylun/ keylun,newlun,eofkey
        character*6 commnd

        CALL JDEVOF (qdsdev)
        CALL JDEND  (qdsdev)
        CALL JEND
        if (rdkey) then
            if (.not.eofkey) then
                call kpause (eofkey)
                read (keylun,*,end=192,err=191) commnd
                if (commnd(1:4).ne.'jend') then
                    print*,'clenup -- incompatible command in',
     +              ' read_keys file  ',commnd
                endif
            endif
            close (keylun)
        endif
        go to 199
  191   continue
            print*,'clenup -- error on read of save key file',
     +      '  ',keylun
            go to 199
  192   continue
            print*,'clenup -- premature end of read key file.'
            eofkey = .true.
  199   continue
        if (savkey) then
            write (newlun,*,err=135) '''jend'''
            close (newlun)
        endif
        go to 140
  135   continue
            print*,'clenup -- error on write to save key file',
     +      '  ',newlun
  140   continue

        return
        end

C+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: CLOSEI
C
C FUNCTIONAL DESCRIPTION:  CLOSEES CURRENT WDBII FILES.
C
C INPUT FILES/PARAMETERS:
C
C       LUNDAT                INTEGER     LOGICAL UNIT NUMBER FOR WDBII DATA
C                                         FILE.
C       LUNIND                INTEGER     LOGICAL UNIT NUMBER FOR WDBII INDE
C                                         FILE.
```

```
C        LUNLIN                INTEGER     LOGICAL UNIT NUMBER FOR WDBII LINE
C                                          INDEX FILE.
C
C GLOBAL VARIABLES : NONE.
C
C OUTPUT FILES/PARAMETERS:  NONE.
C
C SUBROUTINES/FUNCTIONS CALLED : NONE.
C
C CALLED BY: CHAWDB.
C
C LOCAL VARIABLES: NONE.
C
C RESTRICTIONS: NONE.
C
C ABNORMAL RETURN CONDITIONS:   NONE.
C
C LOCATION:                      /a21/gjf/L3REA.FTN
C
C PROGRAMMER:                    DATE OF LAST CHANGE     REASON FOR CHANGE
C
C     DAVE NATION                                        ORIGINAL CODE.
C     JERRY FENERTY                                      DOCUMENTATION AND MO
C                                                        FOR A21 PROTOTYPE.
C     DANIEL BERKICH (SAIC) NOSC                         Read both forms of
C                                                        Data base.
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE closei(lundat,lunind,lunlin)

      CLOSE (UNIT=lundat)
      CLOSE (UNIT=lunind)
      CLOSE (UNIT=lunlin)

      RETURN
      END

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CLOSES
C
C FUNCTIONAL DESCRIPTION:       .
C
C CALLED BY:                    STATEC
C
C PROGRAMMER:                   DATE OF LAST CHANGE     REASON FOR CHANGE
c  S. Lamb                    Feb 1988                  command fix - closes
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine closes
c
c       this subroutine is the close state interpreter (29)
c
        common /states/ nextst
```

```
Jul 20 12:40 1989  car   .f Page 68

C        LUNLIN                INTEGER     LOGICAL UNIT NUMBER FOR WDBII LINE
C                                          INDEX FILE.
C
C GLOBAL VARIABLES : NONE.
C
C OUTPUT FILES/PARAMETERS:  NONE.
C
C SUBROUTINES/FUNCTIONS CALLED : NONE.
C
C CALLED BY: CHAWDB.
C
C LOCAL VARIABLES: NONE.
C
C RESTRICTIONS: NONE.
C
C ABNORMAL RETURN CONDITIONS:   NONE.
C
C LOCATION:                     /a21/gjf/L3REA.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENTATION AND MO
C                                                       FOR A21 PROTOTYPE.
C     DANIEL BERKICH (SAIC) NOSC                        Read both forms of
C                                                       Data base.
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE closei(lundat,lunind,lunlin)

      CLOSE (UNIT=lundat)
      CLOSE (UNIT=lunind)
      CLOSE (UNIT=lunlin)

      RETURN
      END


C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CLOSES
C
C FUNCTIONAL DESCRIPTION:       .
C
C CALLED BY:                    STATEC
C
C PROGRAMMER:                   DATE OF LAST CHANGE     REASON FOR CHANGE
c  S. Lamb                     Feb 1988                 command fix - closes
C
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine closes
c
c       this subroutine is the close state interpreter (29)
c
        common /states/ nextst
```

Jul 20 12:40 1989 car ·.f Page 70

```
c       xllbvp,yllbvp,xurbvp,yurbvp
c       nsg,ioc,ibc
c
c  Output Files/Parameters:
c
c  Subroutines/Functions Called:
c       Note: Subroutines preceded by a "j" are explained in the DI-3000 manual.
c       enall
c
c  Called By:                    MAKBOX
c
c  Local Variables:
c
c  Restrictions:     n/a
c
c  Abnormal Return Conditions: n/a
c
c  Location:    /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine clrbvp (nsg,ioc,ibc)
c
c       this subroutine can be used to initialize the constr. box.
c       The viewport is assumed to have been set previously
c
        logical aed
        common /aeddbc/ aed
c
        common /combvp/ xllbvp,yllbvp,xurbvp,yurbvp
c
        xinc = xurbvp - xllbvp
        yinc = yurbvp - yllbvp
        if (xinc.ge.yinc) then
            xur = xllbvp + yinc
            yur = yurbvp
        else
            xur = xurbvp
            yur = yllbvp + xinc
        endif
c        print*,'clrbvp -- ',xllbvp,xurbvp,yllbvp,yurbvp,xur,yur
c        print*,'clrbvp -- ',ioc
        call enall
        call jwindo (xllbvp,xurbvp,yllbvp,yurbvp)
        call jdvisb (0)
        call jropen (nsg)
        call xcolor (ioc)
        call xpidex (ibc,0)
c       added by gre to take into account an AED 512
        if (aed) then
             call jpintr (1)
        else
             call jpintr (0)
        endif
```

```
        call jrect (xllbvp,yllbvp,xurbvp,yurbvp)
        call jmove (xllbvp,yur)
        call jdraw (xur,yur)
        call jdraw (xur,yllbvp)

        call jrclos
        call jdetec(nsg,0)
        call jsgpri(nsg,1)
        call jdvisb (1)
c        call soverl
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   CLRCOM
c
c  Functional Description:
c       this subroutine clears the communications area
c
c  Input Files/Parameters:
C       nsgsys                          communications area segment number
c
c  Output Files/Parameters:
c
c  Subroutines/Functions Called:
c       Note: Subroutines preceded by a "j" are explained in the DI-3000 manual.
c       enall
c       comwin
c       comvpt
c       soverl
c
c  Called By:                    CRMESG, DISP5, DISTAN, HELP,
C                                MESG, MESSAG, SCRDIA, GMCLOS
c
c  Local Variables:       n/a
c
c  Restrictions:               n/a
c
c  Abnormal Return Conditions: n/a
c
c  Location:    /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
        subroutine clrcom
c
c       this subroutine clears the communications area
c
        common /arsegs/ nsgmen,nsggra,nsgsys,nsgmsg,nsgmap,nsgful
c
        call enall
        call jvisbl (nsgsys,0)
```

Jul 20 12:40 1989 cara f Page 72

```
        call jvisbl (nsgsys,1)
        call soverl
        call comvpt
        call comwin
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   CLRFUL
c
c  Functional Description:
c
c  Input Files/Parameters:
C       nsgful                          full screen segment number
c       xllscr,yllscr                   lower left x,y point
c       xurscr,yurscr                   upper right x,y point
c       xvlow,yvlow                     veiwport lower x,y point
c       xvhigh,yvhigh                   veiwport upper x,y point
c
c  Output Files/Parameters:
c
c  Subroutines/Functions Called:
c       Note: Subroutines preceded by a "j" are explained in the DI-3000 manual.
c       enall
c       soverl
c
c  Called By:                   INTSCN
c
c  Local Variables:              n/a
c
c  Restrictions:                n/a
c
c  Abnormal Return Conditions: n/a
c
c  Location:    /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine clrful
c
c       this subroutine clears the full screen area and puts it in a
c       retained segment
c
        common /aspect/ xaspec,yaspec,xvlow,xvhigh,yvlow,yvhigh
        common /comscr/ xllscr,yllscr,xurscr,yurscr
        common /arsegs/ nsgmen,nsggra,nsgsys,nsgmsg,nsgmap,nsgful
c
        call enall
c                               {added by dabutson}
        call jvisbl (nsgful,0)
        call jvisbl (nsgful,1)
c       call jvisbl (nsgful,0)
```

```
        call soverl
        call jvport (xvlow,xvhigh,yvlow,yvhigh)
        call jwindo (xllscr,xurscr,yllscr,yurscr)
c
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:  CLRGRA
c
c  Functional Description:
c  this subroutine clears the graphics area and puts it in a retained segment
c
c  Input Files/Parameters:
C       nsggra
c
c  Output Files/Parameters:
c
c  Subroutines/Functions Called:
c       Note: Subroutines preceded by a "j" are explained in the DI-3000 manual.
c       enall
c       soverl
c       gravpt
c       geowin
c
c  Called By:                    DRAWIT, INIPIC
c
c  Local Variables:     n/a
c
c  Restrictions:                n/a
c
c  Abnormal Return Conditions: n/a
c
c  Location:    /a21/dave
c
c  Programmer        Date of Last Change       Reason for Change
c  L. McCleary       Jan 1988               sep amp & sys - clrgra
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine clrgra
c
c       this subroutine clears the graphics area and puts it in a retained segme
c
        logical batch
        common /batdbc/ batch
        common /arsegs/ nsgmen,nsggra,nsgsys,nsgmsg,nsgmap,nsgful
        common /logseg/ nsglog
c
        call enall
c        if (batch) then
c                                    {added by dabutson}
            call jvisbl (nsggra,0)
            call jvisbl (nsggra,1)
c           call jvisbl (nsggra,0)
```

Jul 20 12:40 1989 carε .f Page 74

```
c                                       {added by dabutson}
c           call jvisbl (nsglog,0)
c           call jvisbl (nsglog,1)
c        end if
       call soverl
       call gravpt
       call geowin
c
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      Clrhil
c
c  Functional Description:         Clears all hilites
c                                  from menu
c
c  Input Files/Parameters:
c
c  Output Files/Parameters:
c
c
c  Subroutines/Functions Called:
c
c        jxxxxx  - di3000 subroutines
c
c  Called By:
c        drawm   - draws new menus
c
c  Local Variables:
c
c    seg   - integer       -  possible segment numbers for hilited menu items
c    array - integer(19)   -  array return from jisgmt.  first element,
c                             0 - no segment by given name
c                             1 - a segment exist with given name
c
c  Restrictions:                   N/A
c
c  Abnormal Return Conditions:  N/A
c
c  Location:
c
c  Programmer          Date of Last Change        Reason for Change
c
c    Dirk Butson          1/7/85
c
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine clrhil

c     clears all hilights from menu area

      integer seg,array(19)
      logical sys
      common /sysdbc/ sys
```

Jul 20 12:40 1989 car: .f Page 75

```
      if (sys)  print*,' In Clrhil '

c --- purge all segments which are on
      do 10 i = 1,43
         seg = i + 1019
         call jisgmt(seg,array)
         if(array(1) .eq. 1) call jpurge(seg)
         seg = i + 31100
         call jisgmt(seg,array)
         if(array(1) .eq. 1) call jpurge(seg)
   10 continue
      if (sys) print*,' Leaving Clrhil '
      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   CLRMEN
c
c  Functional Description:
c       this subroutine clears the menu area
c
c  Input Files/Parameters:
C       nsgbox,nsgsho,nsgcrm
C       nsgmen,nsggra,nsgsys,nsgmsg,nsgmap,nsgful,nsgkey
c       nsgcrm -- segment number of current menu background box
c       inewmn -- new menu backgound box : 0 -- use full menu box
c                                          1 -- use short menu box
c
c  Output Files/Parameters:
c
c  Subroutines/Functions Called:
c       Note: Subroutines preceded by a "j" are explained in the DI-3000 manual.
c       enall
c       soverl
c       menvpt
c       menwin
c
c  Called By:                  DRAWM
c
c  Local Variables:
c       nsg
c
c  Restrictions:               n/a
c
c  Abnormal Return Conditions:    n/a
c
c  Location:    /a21/dave
c
c  Programmer        Date of Last Change       Reason for Change
c  L. McCleary       Jan 1988               sep amp & sys - clrmen
c
C-*-*-*-*-*-*-*-*-*-*-*-*-*-*-*-*-*-*-*-*-*-*-*-*-*-*-*-*-*-*-*-*-*-*-*-*|*-*-*-*-
c
       subroutine clrmen
c
```

Jul 20 12:40 1989 car: .f Page 76

```
c       this subroutine clears the menu area
c
        logical batch
        common /batdbc/ batch

        common /arsegs/ nsgmen,nsggra,nsgsys,nsgmsg,nsgmap,nsgful
        common /boxseg/ nsgbox,nsgsho,nsgcrm
        common /inewmn/ inewmn
c
c       nsgcrm -- segment number of current menu background box
c       inewmn -- new menu backgound box : 0 -- use full menu box
c                                          1 -- use short menu box
c
        if (inewmn.eq.0) then
           nsg = nsgmen
        else
           nsg = nsgsho
        endif
c        call enall
c        if (batch) then
c                                    {added by dabutson}
           call jvisbl (nsg,0)
           call jvisbl (nsg,1)
c          call jvisbl (nsg,0)
c        end if
c        call soverl
        nsgcrm = nsg
        call menvpt
        call menwin
c
        return
        end

C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    clrmsg
c
c  Functional Description:
c       clear message area (make current message invisible)
c
c  Input Files/Parameters:
c
c  Output Files/Parameters: N/A
c
c  Subroutines/Functions Called:
c       Note: Subroutines preceded by a "j" are explained in the DI-3000 manual.
c
c  Called By:                    HELP, MESSAG, TKINFO, TXWRIT
c
c  Local Variables: N/A
c
c  Restrictions: N/A
c
c  Abnormal Return Conditions:  N/A
c
c  Location:      Apollo       /a21/dave
```

Jul 20 12:40 1989 care .f Page 77

```
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine clrmsg
c
c      clear message area (make current message invisible)
c
       logical sys
       common /sysdbc/ sys
       common /msgold/ msgold,msgonm
       common /msgoff/ msgoff
c
       if (sys) print*,'clrmsg -- enter ',msgno,msgold
       if (msgonm .gt. 0) then
          call jvisbl(msgonm + msgoff,0)
       else if (msgonm .eq. 0) then
          call jpurge (msgoff)
       endif
       msgold = -1
       msgonm = -1
c
       return
       end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       CLRSTR
C
C FUNCTIONAL DESCRIPTION:          MODULE TO CLEAR THE TEXT ARRAY
C
C INPUT FILES/PARAMETERS:          NONE
C
C OUTPUT FILES/PARAMETERS:
C
C                      COMMON
C      VARIABLE        BLOCK      TYPE       DESCRIPTION
C
C       QSTRNG        TXTSTR    CHAR      CHARACTER ARRAY, 4 LONG
C       QACTUL        MAXCHR    INTEGER   LENGTH OF CORRESPONDING QSTRNG
C       QTXPOS        TXTPOS    REAL      THE WORLD X POSITION OF TEXT STRING
C       QTYPOS        TXTPOS    REAL      THE WORLD Y POSITION OF TEXT STRING
C       QHLAT         HLDPRM    REAL      THE LATITUDE POSITION OF TEXT STRING
C       QHLONG        HLDPRM    REAL      THE LONGITUDE POSITION OF TEXT STRING
C       QXPOS         CHRATR    INTEGER   THE VIRTUAL X POSITION OF TEXT STRING
C       QYPOS         CHRATR    INTEGER   THE VIRTUAL Y POSITION OF TEXT STRING
C
C SUBROUTINES/FUNCTIONS CALLED  NONE
C
C CALLED BY:                      INIPIC
C
C LOCAL VARIABLES:
C
C       I       INTEGER          INDEX OF QSTRNG (FROM 1 TO 4)
C
```

Jul 20 12:40 1989 carε .f Page 78

```
C RESTRICTIONS:                NONE
C
C
C ABNORMAL RETURN CONDITIONS:   N/A
C
C LOCATION:                     /U2/SAY/TEXT/SOURCE/CLRSTR.F
C
C PROGRAMMER:                   DATE OF LAST CHANGE     REASON FOR CHANGE
C
C     SAYATES                          1/17/84          INITIAL ENTRY
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE CLRSTR
C
C  CLEARS OUT A TEXT STRING AND ALL VALUES ASSOCIATED WITH IT (ie POSITIONS)
C
C*****ROUTINE TO CLEAR THE TEXT ARRAY
C
C*****DEFINITION AND DECLARATION OF COMMON BLOCKS
C
      COMMON/CHRATR/QVERT,QXBASE,QYBASE,QXPLAN,QYPLAN,
     +              QHJUST,QVJUST,QCRPTH,QXSIZE,QYSIZE,
     +              QXPOS,QYPOS,QFNUM,QSDIAM
      INTEGER     QVERT,QHJUST,QVJUST,QCRPTH,
     +            QFNUM,QXPOS(4),QYPOS(4)
      REAL        QXBASE,QYBASE,QXPLAN,QYPLAN,
     +            QXSIZE,QYSIZE,QSDIAM
C
      COMMON/HLDPRM/QHXSIZ,QHYSIZ,QHLAT,QHLONG
      INTEGER       QHXSIZ,QHYSIZ
      REAL          QHLAT(4),QHLONG(4)
C
      COMMON/TXTPOS/QTXPOS,QTYPOS
      REAL      QTXPOS(4),QTYPOS(4)
C
      COMMON/TXTSTR/QSTRNG
      CHARACTER*50 QSTRNG(4)
C
      COMMON/MAXCHR/QMXCHR,QACTUL
      INTEGER     QMXCHR,QACTUL(4)
C
      logical sys
      common /sysdbc/ sys
C
C*****DECLARATION OF LOCAL VARIABLES
      INTEGER I
C
C****BLANK OUT QSTRNG AND SET THEIR LENGTHS TO 0
C
      if (sys) print*,'enter clrstr'

      DO 100 I = 1,4
         QSTRNG(I) = ' '
         QACTUL(I) = 0
         QTXPOS(I) = -99.
```

```
         QTYPOS(I) = -99.
         QHLAT(I) = -99.
         QHLONG(I) = -99.
         QXPOS(I) = -99
         QYPOS(I) = -99
 100  CONTINUE

      if (sys) print*,'leave clrstr'
C
      RETURN
      END

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   clrvpt
c
c  Functional Description:
c       this subroutine can be used to initialize an area to a certain
c       color.  The veiwport is assumed to have been set previously
c
c  Input Files/Parameters:
c       nsg,ioc,ibc
c
c  Output Files/Parameters:
c
c  Subroutines/Functions Called:
c       Note: Subroutines preceded by a "j" are explained in the DI-3000 manual.
c       enall
c       dvisb
c
c  Called By: makful,makcom,makgra,makkey,makmen,maksho
c
c  Local Variables:
c       xlow,xhigh,ylow,yhigh
c
c  Restrictions:                N/A
c
c  Abnormal Return Conditions: N/A
c
c  Location:    /a21/dave
c
c  Programmer         Date of Last Change       Reason for Change
c  L McCleary         Jan 1988                sep amp & sys - clrvpt
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine clrvpt (nsg,ioc,ibc)
c
c      this subroutine can be used to initialize an area to a certain color.
c      The veiwport is assumed to have been set previously
c
       logical aed
       common /aeddbc/ aed
c
       data xlow,xhigh,ylow,yhigh/0.,1.,0.,1./
c
```

Jul 20 12:40 1989 car. .f Page 80

```
c       print*,'clrvpt -- ',nsg,ioc,ibc
        call enall
        call jwindo (xlow,xhigh,ylow,yhigh)
        call jdvisb (0)
        call jropen (nsg)
        call xcolor (ioc)
        call xpidex (ibc,0)
c       added by gre to take into account an AED 512
        if (aed) then
             call jpintr (1)
        else
c             call jpintr (0)
             call jpintr (1)
        endif
        call jrect (xlow,ylow,xhigh,yhigh)
        call jrclos
        call jdetec (nsg,0)
c        call jsgpri(nsg,1)
        call jsgpri(nsg,0)
        call jdvisb (1)
        call soverl
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     CMDMAI
C
C FUNCTIONAL DESCRIPTION:        .
C
C CALLED BY:                     STATEC
C
C PROGRAMMER:                    DATE OF LAST CHANGE     REASON FOR CHANGE
c  S. Lamb                      Feb 1988                command fix - cmdmai
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine cmdmai
c
c       this subroutine is the initial command mode interpreter (1)
c
        common /states/ nextst
        logical sketch,majorf,minorf
        common /statel/ sketch,majorf,minorf
        logical firstm
        logical wordis,iseoc
        logical isfeat,isproj,isincr,isdecr,iscoor
        logical isblan
c
c       print*,'cmdmai -- enter'
        firstm = .true.
        sketch = .false.
        majorf = .false.
        minorf = .false.
        initls = nextst
```

Jul 20 12:40 1989 car: .f Page 81

```
c       do until nextst not = initial state
  100   continue
            call getwrd
            if (iseoc()) then
                if (isblan()) then
                    nextst = 0
                else
                    call getcmd
                endif
            else if (wordis('DRAW').or.wordis('DISPLAY')
     +          .or.wordis('SHOW')) then
                nextst = 2
            else if (wordis('SET').or.wordis('POINT').or.
     +          wordis('AND').or.wordis('THEN').or.wordis('CHANGE'))
     +          then
c * ** *** **** ***** ****** not understood / implem.
                nextst = 15
            else if (wordis('SKETCH')) then
                sketch = .true.
                nextst = 2
            else if (wordis('MAJOR').or.wordis('LARGE')) then
                majorf = .true.
                nextst = 9
            else if (wordis('MINOR').or.wordis('SMALL')) then
                minorf = .true.
                nextst = 10
            else if (wordis('WHAT').or.wordis('CURRENT')) then
                nextst = 4
            else if (wordis('PROJECTION')) then
                nextst = 12
            else if (wordis('SCALE')) then
                nextst = 16
            else if (wordis('CENTER')) then
                nextst = 18
            else if (wordis('MORE')) then
                nextst = 21
            else if (wordis('LESS')) then
                nextst = 22
            else if (wordis('ERASE').or.wordis('CLEAR')) then
                nextst = 25
            else if (wordis('TURN')) then
                nextst = 26
            else if (wordis('EXIT').or.wordis('QUIT').or.
     +          wordis('RETURN').or.wordis('X')) then
                nextst = 0
            else if (wordis('EXECUTE').or.wordis('INTERPRET').or.
     +          wordis('COMMAND').or.wordis('FILE')) then
                nextst = 27
            else if (wordis('SAVE').or.wordis('STORE')) then
                nextst = 28
            else if (wordis('CLOSE').or.wordis('STOP').or.
     +          wordis('END')) then
                nextst = 29
            else if (wordis('REMOVE')) then
                nextst = 30
            else if (iscoor()) then
```

Jul 20 12:40 1989 car: .f Page 82

```
              nextst = 19
          else if (isproj()) then
              nextst = 13
          else if (isfeat()) then
              nextst = 8
          else if (isincr()) then
              nextst = 23
          else if (isdecr()) then
              nextst = 24
          else
              nextst = 15
          endif
          firstm = .false.
      if (nextst.eq.initls) go to 100
c     print*,'cmdmai -- exit'
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CMPTIM
C
C FUNCTIONAL DESCRIPTION:       .
C
C CALLED BY:                    ADDTRK, CHGIND, TIMCHK
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine cmptim (dtg1, dtg2, flag)

c this routine checks whether the first dtg is subsequent in time to or
c the same time as the second dtg
c    if so, return true
c    otherwise, return false
c programmer: avw

      integer          day1
      integer          day2
      integer          hr1
      integer          hr2
      integer          mn1
      integer          mn2
      integer          yr1
      integer          yr2

      character*9      dtg1
      character*9      dtg2

      logical          flag

      flag = .false.

      read (dtg1, 10, err=900) yr1, day1, hr1, mn1
```

Jul 20 12:40 1989 care .f Page 84

```
      SAZI = SIGN(1.0,AZI)
      SLAT = SIGN(1.0,LAT)
      COSAZI = COS(AZI)
      SCAZI = SIGN(1.0,COSAZI)
      COSLAT = COS(LAT)
      SINAZI = SQRT(1-COSAZI**2)
C --- I is inclination of great circle to equator
      COSI = SINAZI*COSLAT
      SINI = SQRT(1-COSI**2)
C --- L0 is difference in longitude from intersection of great circle
C --- with equator to DF station
      IF (ABS(SINI).LT.0.001) THEN
C ------- If track along equator, say intersection occurs at station
          COSL0 = 1.0
      ELSE
          COSL0 = COSAZI/SINI
      END IF
C --- F0 is distance in radians from intersection of great circle
C --- with equator to DF station
      COSF0 = COSL0*COSLAT
      L0 = SAZI*ACOS(COSL0)
C --- Longitude of intersection of great circle with equator (depending
C --- on direction of bearing)
      LNP = LON + L0
      LNM = LON - L0
      F0 = SLAT*ACOS(COSF0)
C --- Initialize distance along great circle from equator to next point
C --- in bearing
      F = F0


      return
      end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    CNVTVW
c
c  Functional Description:       CNVTVW converts virtual coordinates to world
c                                coordinates without checking that points are
c                                in the current viewport set.
c
c  Input Files/Parameters:
c    numpts   integer    number of points in arrays virtx and virty.
c    virtx    real       array of virtual x points.
c    virty    real       array of virtual y points.
c
c  Output Files/Parameters:
c    wrldx    real       array of world x points.
c    wrldy    real       array of world y points.
c
c  Local Variables:
c   cntr        integer    loop counter.
c   vxpt1       real       virtual x point inside viewport.
c   vxpt2       real       virtual x point displaced 0.01 x units
c                          from vxpt1.
```

```
c   vypt1        real       virtual y point inside viewport.
c   vypt2        real       virtual y point displaced 0.01 y units
c                           from vypt1.
c   wxdist       real       x distance between wxpt1 and wxpt2.
c   wydist       real       y distance between wypt1 and wypt2.
c   wxpt1        real       world coordinate equivalent of virtual
c                           point vx1pt.
c   wxpt2        real       world coordinate equivalent of virtual
c                           point vx2pt.
c   wypt1        real       world coordinate equivalent of virtual
c                           point vy1pt.
c   wypt2        real       world coordinate equivalent of virtual
c                           point vy2pt.
c   zeroz        real       unused world z coordinate.
c
c  Subroutines/Functions Called:
c       All subroutine names preceeded by a "j" are DI3000 subroutines.
c       For more information see the DI3000 Users Guide.
c
C CALLED BY:                      NO LONGER USED BY CARICATURE
c
c  Restrictions: The current viewport must contain the point (1.0, 1.0, 1.0)
c                and a world coordinate point (0.1, 0.1) virtual units
c                larger than the original world point.
c
c  Abnormal Return Conditions:  N/A
c
c  Location:  //dsp80/a21/bap/linlib.ftn
c
c  Programmer: Brian A. Pelletier
c
C-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE CNVTVW(virtx, virty, wrldx, wrldy, numpts)

        real virtx(*), wrldx(*), virty(*), wrldy(*)
        real vxpt1, vypt1, vxpt2, vypt2, zeroz
        real wxpt1, wypt1, wxpt2, wypt2, wxdist, wydist
        integer numpts, cntr

c       print *, 'enter cnvtvw'

        zeroz = 1.0
c
c Assuming the viewport contains the point (1.0, 1.0, 1.0)
c convert this world point to a virtual point.  Adding a small
c virtual amount to this point and converting back to world
c coordinates gives a conversion factor in both the x and y
c directions to work with.
c
        call jconwv(1.0, 1.0, 1.0, vxpt1, vypt1)
        vxpt2 = vxpt1 + 0.01
        vypt2 = vypt1 + 0.01
        call jconvw(vxpt1, vypt1, wxpt1, wypt1, zeroz)
        call jconvw(vxpt2, vypt2, wxpt2, wypt2, zeroz)
c
```

```
c The ratio of one virtual unit to one world unit is compute by
c taking the difference of the two world coordinates divided
c by th difference of the virtual coordinates.'
c
       wxdist = (wxpt2 - wxpt1) / (vxpt2 - vxpt1)
       wydist = (wypt2 - wypt1) / (vypt2 - vypt1)
c
c In computing a world coordinte given a virtual subtract the
c original virtual coordinate from the point, multiply by the
c world conversion fatcor and add the original world coordinate.
c
       do 10 cntr = 1,numpts
         wrldx(cntr) = (virtx(cntr) - vxpt1) * wxdist + wxpt1
         wrldy(cntr) = (virty(cntr) - vypt1) * wydist + wypt1
c         print *, 'wrldx, wrldy, virtx, virty [', cntr, ' ]'
c         print *, wrldx(cntr), wrldy(cntr), virtx(cntr), virty(cntr)
10     continue

c      print *, 'exit cnvtvw'

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:              colbak
c
c  FUNCTIONAL DESCRIPTION:   This subroutine provides a means of
c                            selecting the background color for
c                            the display area.  There are 8
c                            background colors from which to
c                            choose, all of which fit nicely in
c                            one menu area.
c
c  INPUT FILES/PARAMETERS:
c
c      Menu Control Globals
c
c      qcrmnu        b6        integer    value of the current menu
c      xllmvp        commvp    real       menu viewport parameter
c      yllmvp        commvp    real       menu viewport parameter
c      xurmvp        commvp    real       menu viewport parameter
c      yurmvp        commvp    real       menu viewport parameter
c
c
c  OUTPUT FILES/PARAMETERS:
c
c      Screen Attributes Globals
c
c      qbkgrd        scratr    integer    value for background color
c
c
c  SUBROUTINES/FUNCTIONS CALLED:
c
c      check                      checks the value of the button re-
c                                 turned from a pick or locate
```

```
c       hilite                      highlights menu choices by drawing
c                                   a box around them
c       mesg                        displays messages in the communica-
c                                   tions area
c       mpick                       routine to pick from the menu
c
c       Note: Any subroutines preceded by a "j" are explained in the DI-3000
c             manual.
c
c
c   CALLED BY:                      FCFILL
c
c       Any routine needing to change the background color.
c
c   LOCAL VARIABLES:
c
c       ibuttn      integer    value of button pressed
c       ichoic      integer    pickid of menu item selected
c       error       logical    indicates error during menu selection
c       rflag       logical    set if 'cancel', 'exit' or 'return' picked
c       table       integer    table of positions of menu items in the menu
c       mysegn      integer    my menu segment number
c       pos         integer    relative position in the menu of the color
c                              box to be highlighted
c       index       integer    8 long array to hold color indexes
c       found       logical    used in searching for color indexes to
c                              indicate when found
c
c
c   RESTRICTIONS:
c
c       Depending upon the code which surrounds the call to this routine,
c       it can be used to change the background color immediately (as the
c       color is selected) or to change the background color only upon
c       returning from this routine.
c
c   LOCATION:       YODA        /u1/a21/clj/colbak.f
c
c   PROGRAMMER   DATE OF LAST CHANGE       REASON FOR CHANGE
c      CLJ           11/21/83                initial entry
c      CLJ           12/12/83                real colors chosen
c      CLJ            1/23/84                change to common "scratr"
c      CLJ            2/03/84                automatic/delayed modes
c   David W. Swim    07/14/86                Fuss with prgm...
c   L McCleary       Jan 1988            bkgrd investigation - colbak
c
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine colbak

c     select a background color

      integer mysegn,ibuttn,ichoic
      integer pos,table(37),index(8)
      logical error,rflag,found
      common /b6/ qcrmnu
```

Jul 20 12:40 1989 car .f Page 88

```
      integer qcrmnu
      common /commvp/ xllmvp,yllmvp,xurmvp,yurmvp
      common /scratr/ qbox,qbkgrd
      integer qbox,qbkgrd
      data table /0,0,0,0,0,0,1,1,1,0,2,2,2,0,3,3,3,0,4,4,4,0,
     +            5,5,5,0,6,6,6,0,7,7,7,0,8,8,8/
      data index /0,1,2,3,4,5,6,7/

      rflag = .false.

c --- "mysegn" is my menu segment number.  We will always be at
c --- the background  color menu (i.e. "qcrmnu = 29")

      mysegn = qcrmnu
      call jvport (xllmvp,xurmvp,yllmvp,yurmvp)
      call jwindo (0.,17.,1.,43.)

c --- Put up a message saying "Select color box.".
      call mesg (70)

c --- "qbkgrd" is the background color
c --- Highlight the current background color (i.e. draw a yellow box
c --- around the color).
c --- "pos" is the relative position in the menu of the current
c --- background color.  That is, if the color to be highlighted is
c --- the third one in the color index array, then "pos" is set to 3.
c --- NOTE: The 8 background color indexes are in the array "index".

      found = .false.
      pos = 0
   50 continue
      if (pos.lt.8) then
       if (found) go to 80
         pos = pos + 1
         if (qbkgrd.eq.index(pos)) then
            found = .true.
         endif
         go to 50
      endif
   80  continue

c --- The first parameter to the hilite routine is a toggle
c --- (.true. = highlight & .false. = remove highlight).
c --- The third parameter to the hilite routine is the box width.
c --- For the width parameter, 1 = whole, 2 = left quarter,
c --- 3 = right quarter, 4 = left half, & 5 = right half.
c --- The color boxes are given in the "left quarter" column.
c --- The fourth parameter is the length of the highlight table
c --- and the fifth parameter is the table itself.
      call hilite (.true.,pos,2,37,table)

  100 continue
         call mpick (ichoic,mysegn,ibuttn)
         call jvport (xllmvp,xurmvp,yllmvp,yurmvp)
         call jwindo (0.,17.,1.,43.)
```

```
c ------ The pickid of the color box selected is stored in "ichoic".
c ------ The pickids of the 8 color boxes range from 101 to 108.
         if (ichoic.gt.100) then
c --------- The relative "position" of the color box to be
c --------- blacked out is "pos" (i.e. we want
c --------- to remove the highlighting from the
c --------- former current color box)
            call hilite (.false.,pos,2,37,table)
c --------- The new "qbkgrd" must now be taken from the array of
c --------- background color indexes.  Subtracting 100 from "ichoic"
c --------- gives the position in the "index" array where the new
c --------- "qbkgrd" can be found.
            pos = ichoic - 100
c            qbkgrd = index(pos)
            if (found) qbkgrd = index(pos)
c --------- Hilite new backgrd color & set rflag for ret to call.
            call hilite (.true.,pos,2,37,table)
            rflag = .true.
         else
c --------- Check for function buttons.
            call check (ibuttn,mysegn,error,rflag)
            if(error) then
                call mesg(2)
                call paws
            endif
         endif
      if (.not.(rflag)) go to 100
      return
      end

C+*+*+*+*+*+*+*+*+*+*+*+*+*+*+*+*+*+*+*+*+*+*+*+*+*+*+*+*+*+*+*+*+*|*+*+*+*+
C UNIT NAME:                    COMMND
C
C FUNCTIONAL DESCRIPTION:       .
C
C CALLED BY:                    CHECK
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*|*-*-*-*-

        subroutine commnd
c
c       this subroutine initiates the command function
c       called from menust
c
        call statec
c
        return
        end

C+*+*+*+*+*+*+*+*+*+*+*+*+*+*+*+*+*+*+*+*+*+*+*+*+*+*+*+*+*+*+*+*+*|*+*+*+*+
c  UNIT NAME:    COMVPT
c
```

Jul 20 12:40 1989 car< .f Page 90

```
c  Functional Description:
c       this subroutines sets the communications area viewport
c
c  Input Files/Parameters:
c       xllcvp,yllcvp                    The lower left X,Y point
c       xurcvp,yurcvp                    The upper right X,Y point
c
c  Output Files/Parameters:
c
c  Subroutines/Functions Called:
c       Note: Subroutines preceded by a "j" are explained in the DI-3000 manual.
c
c  Called By:                      CLRCOM, DRWAMP, MAKCOM, MESGJF
C                                  PROMPT, SETFAD, TKINFO
c
c  Local Variables:               N/A
c
c  Restrictions:                  N/A
c
c  Abnormal Return Conditions: N/A
c
c  Location:     /a21/dave
c
c  Programmer          Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine comvpt
c
c      this subroutines sets the communications area viewport
c
       common /comcvp/ xllcvp,yllcvp,xurcvp,yurcvp
c
       call jvport (xllcvp,xurcvp,yllcvp,yurcvp)
c
       return
       end


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:  COMWIN
c
c  Functional Description:
c       this subroutines sets the communications area window
c
c  Input Files/Parameters:
C       qcxmn,qcymn                 The communications min x,y point
c       qcxmx,qcymx                 The communications max x,y point
c
c  Output Files/Parameters:
c
c  Subroutines/Functions Called:
c       Note: Subroutines preceded by a "j" are explained in the DI-3000 manual.
c
c  Called By:                      CLRCOM, DRWAMP, PROMPT, SETFAD, TKINFO
c
```

```
Jul 20 12:40 1989  cara   .f Page 91

c  Local Variables:            N/A
c
c  Restrictions:               N/A
c
c  Abnormal Return Conditions: N/A
c
c  Location:   /a21/dave
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
        subroutine comwin
c
c       this subroutines sets the communications area window
c
        common/comwdo/qcxmn,qcymn,qcxmx,qcymx
        real qcxmn,qcymn,qcxmx,qcymx
c
        call jwindo (qcxmn,qcxmx,qcymn,qcymx)
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      CONVFAD
C
C FUNCTIONAL DESCRIPTION:         .
C
C CALLED BY:                      SETFAD
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine convfad(newfad,temptm,ilen,error)

      integer*4 colndx
      integer*4 error
      integer*4 hoyrs
      integer*4 ilen
      integer*4 minute
      integer*4 MAXHRS
      integer*4 MAXMIN
      integer*4 temptm

      character   colon
      character*5 newfad
c
c
c     if a new fade time is input, reset fade dtg and fade index (tfaddx)
c
      if(ilen .gt. 0) then
c
c         read the new fade time.  If an error occurs, it is due to either
```

Jul 20 12:40 1989 car .f Page 92

```
c         bad user input or a time out return from jkeybs.  In either case
c         we want to exit routine and pop back to menu controller.
c
          hours = 0
          minute = 0
          if (ilen .lt. 5) then
               colndx = index(newfad,':')
c
c***           pick up the what is hoped to be the correct meaning of the fade
c***
c***           if a colon is found, all to left of colon is hours, right is min.
c
               if (colndx .gt. 0) then
                    if (colndx-1 .ge. 1) then
                        read(newfad(1:colndx-1),10,err=100,end=35) hours
 10                     format(i2)
                    endif
                    read(newfad(colndx+1:ilen),10,err=100,end=35) minute
c
c***           if no colon, if len is 3, 1 slot for hours, 2 for minutes
c***                        if len is 2, 0 slots for hours, 2 for minutes
c***                        if len is 1, 0 slots for hours, 1 for minutes
c
               else if (ilen .eq. 3) then
                     read(newfad(1:1),10,err=100) hours
                     read(newfad(2:3),10,err=100) minute
               else if (ilen .eq. 2) then
                     hours = 0
                     read(newfad(1:2),10,err=100) minute
               else
                     hours = 0
                     read(newfad(1:1),10,err=100) minute
               endif
          else
               read(newfad,30,err=100,end=35) hours,colon,minute
 30            format(i2,a1,i2)
               if (colon .ne. ':') then
                   read(newfad,40,err=100) minute
 40                format(2x,i2)
               endif
          endif

 35       continue
c
c         if the 3rd character in the user input fade time is not a color
c         then assume that he forgot to put the colon between the hours
c         and minutes
c
c
c         check for maximum inputs exceeded, and adjust if necessary
c
          if (hours .gt. MAXHRS) then
                hours = MAXHRS
          endif
          if (minute .gt. MAXMIN) then
                minute = MAXMIN
```

```
          endif
          temptm = hours * 60 + minute
          goto 200
100       error = 1
          call mesg(1242)
          call paws
      else
          error = 1
          call mesg(1242)
          call paws
      endif
200   return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      CONVHW
c
c  Functional Description:         Utility subroutine to convert integer points
c                                  in hldf to real (x,y) points in the previous
c                                  window defined.
c
c  Input Files/Parameters:
c    intx       integer            array of x points
c    inty       integer            array of y points
c    num        integer            number of points in x and y array
c
c  Output Files/Parameters:
c    posx       real               array of x points
c    posy       real               array of y points
c
C CALLED BY:                       NO LONGER USED BY CARICATURE
c
c  Local Variables:
c
c  Restrictions: Previous window and viewport set should be the graphics
c                display area.
c
c  Subroutine/Functions Called: N/A
c
c  Abnormal Return Conditions: N/A
c
c Programmer: Brian A. Pelletier   (old algorithm version 12)
c             Dirk Butson
c
c This subroutine takes integer points (from hldf) and converts
c them to world coordinates relative to the window
c
c Should map position on screen to 00000-65535
c
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine convhw(intx,inty,posx,posy,num)

c ------ convert virtual integers to real position
```

```
      common/gphwdo/qgxmin,qgymin,qgxmax,qgymax
      real        qgxmin,qgymin,qgxmax,qgymax
c
      integer num
      integer intx(num),inty(num)
      real posx(num),posy(num)

c ----- map 00000-65535  ==> dimension of window

        do 10 i = 1,num
         posx(i) = qgxmin + intx(i)*(qgxmax-qgxmin)/65535
         posy(i) = qgymin + inty(i)*(qgymax-qgymin)/65535
 10    continue

      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    CONVWH
c
c  Functional Description:        Utility subroutine to convert (x,y) points in
c                                 the display area to hldf integer points in
c                                 the range of 65535 X 65535.
c
c  Input Files/Parameters:
c    posx       real              array of x points
c    posy       real              array of y points
c    num        integer           number of points in x and y array
c
c  Output Files/Parameters:
c    intx       integer           array of x points
c    inty       integer           array of y points
c
c  Called By:                     INIONE, STORCL
c
c  Local Variables:
c
c  Restrictions: All points must be in graphics display area and will be
c                converted to last window coordinates and viewport set.
c
c  Subroutine/Functions Called: N/A
c
c  Abnormal Return Conditions: N/A
c
c Programmer: Brian A. Pelletier   (old algorithm version 12)
c             Dirk Butson
c
c This subroutine converts world x and y coordinates to integer
c virtuals 65535 X 65535.
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine convwh(posx,posy,intx,inty,num)

c ------ convert virtual integers to real position
```

Jul 20 12:40 1989 car<? .f Page 95

```
      common/gphwdo/qgxmin,qgymin,qgxmax,qgymax
      real          qgxmin,qgymin,qgxmax,qgymax
c
      integer num
      integer intx(num),inty(num)
      real posx(num),posy(num)

c -----  map world coordinates ===> 00000-65535

        do 10 i = 1,num
          intx(i) = 65535 * (posx(i)-qgxmin) / (qgxmax-qgxmin)
          inty(i) = 65535 * (posy(i)-qgymin) / (qgymax-qgymin)
 10     continue

      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                            copyfl
c
c  Functional Description:  Copies contents of one file to another.
c
c  Input Files/Parameters:
c     Parameters:
c       Name    Type    Description
c       ----    ----    -----------
c       old     ch*50   Name of file to be copied from.
c       new     ch*50   Name of file to be copied to.
c       oldsta  ch*6    Indicates what to do with file copied from.
c
c  Output Files/Parameters:     N/A
c
c  Subroutines/Functions Called:
c       Name    Description
c       ----    -----------
c       mesg    Outputs message to commmunications area of the screen.
c       paws    Halts program to allow message to be viewed.
c
c  Called By:
c       Name    Description
c       ----    -----------
c       rename  Renames a file.
c
c
c  Local Variables:
c       Name    Type    Description
c       ----    ----    -----------
c       lunhld  integer Logical unit # to assign to file to be copied from.
c       lunbck  integer Logical unit # to assign to file to copy to.
c       dskerr  logical Flag to indicate that disk error has occured.
c       field1  ch*50   String var. for name field of current line of file.
c       field2  ch*60   String var. for description field of current file line.
c
c  Restrictions:                N/A
```

Jul 20 12:40 1989 carε .f Page 96

```
c
c  Abnormal Return Conditions:  N/A
c
c  Location:
c
c       Programmer       Date of Last Change      Reason for Change
c       ----------       -------------------      -----------------
c       sfw              8-Nov-1984               Restructuring and documentation.
c      L. McCleary       Jan 1988        fix VAX compile diag - copyfl
c                                        not used by Caricature-copyfl
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine copyfl(old, new, oldsta, ierr )

        integer ierr
        character *50 old, new, field1
        character *60 field2
        character *6 oldsta

        logical dskerr

        data lunhld,lunbck/18,16/

c       Set disk error flag to false.
        dskerr = .false.
        ierr = 0

c       Open old and new files. Jump to error handling section on disk
c       access error

        open (lunhld,file=old,status='old',err=200)
        rewind(lunhld)

        open (lunbck,file=new,status='new',err=300)
        rewind(lunbck)

c       Jump to read/write section.
        goto 10

c       Error on attempt to open existing file.
200     continue

c       "System error on attempt to open existing file.  Consult system
c        administrator.  Press any key to continue."
c         Write out error message and exit routine.
          call mesg(44)
          call paws
          dskerr = .true.

c         Output error message to program monitor window for system
c         adminsitrator to analyze.
          print*,'Disk access error in routine COPYIT.'
          print*,'Trying to open file ',old,' .'
          print*,'Logical unit number was ',lunhld,' .'
          print*,'IERROR number returned was ',ierror,' .'
```

```
          ierr =  1
          goto 100

c       Error on attempt to open new file.
300     continue

c       "System error on attempt to open new file.  Consult system
c        administrator.  Press any key to continue."
c         Write out error message and exit routine.
          call mesg(45)
          call paws
          dskerr = .true.

c         Output error message to program monitor window for system
c         adminsitrator to analyze.
          print*,'Disk access error in routine COPYIT.'
          print*,'Trying to open file ',new,' .'
          print*,'Logical unit number was ',lunbck,' .'
          print*,'IERROR number returned was ',ierror,' .'
          ierr = 1

          goto 100


c       Read/write section. Jump to routine exit if End Of File.
10      continue

            read(lunhld,50,end=100) field1, field2
            write(lunbck,50) field1, field2
50          format(A50, A60)

c       Reiterate if not End Of File.
        goto 10

100     continue

c       Close new file.
        close (lunbck)

c       Close old file. If parameter 'oldsta' = 'delete' then copy was a rename
c       so we delete the old file.
        if ( oldsta.eq.'delete'.and.(.not.( dskerr ))) then
           close( lunhld,status='DELETE' )
        else
           close( lunhld )
        endif


        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                        creatm
c
c  Functional Description:
```

Jul 20 12:40 1989 car< .f Page 98

```
c       this subroutine displays a menu from a data file
c
c  Input Files/Parameters:
c
c  Output Files/Parameters: N/A
c
c  Subroutines/Functions Called:
c       Note: Subroutines preceded by a "j" are explained in the DI-3000 manual.
c
c  Called By:                   DRAWM, KEYS
c
c  Local Variables: N/A
c
c  Restrictions: N/A
c
c  Abnormal Return Conditions:  N/A
c
c  Location:     Apollo      /a21/dave
c
c  Programmer        Date of Last Change      Reason for Change
c  avw               30 May 1985              Handle linestyle menu as
c                                             special case
c  L McCleary        Jan 1988                 sep amp & sys - creatm
c  S. Lamb           Feb 1988                 detec chg - creatm
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine creatm (menun,ierror)
c
c       this subroutine displays a menu from a data file
c
        common /commen/xllmen,yllmen,xurmen,yurmen,ibcmen,iocmen,incmen
        character*40 textst
        character*50 filenm
        character*30 fname
        character*50 menpth
        common /menpth/ menpth
        common /lenmen/ lenmen
        logical opensg
        character cchar
        character*80 msg
        character*26 flettr
        data flettr /'abcdefghijklmnopqrstuvwxyz'/
c       numinc is range of menu numbers in each file
c       maxnum is number of menu files
        data numinc,maxnum /25,15/
        data lunmen/9/
        data fname/'file'/,lname/4/

        call seticn(xconv,yconv)
c       print*,'creatm -- enter ',menun
        opensg = .false.
        ierror = 0
        indlet = menun / numinc + 1
        if (indlet.lt.1) indlet = 1
        if (indlet.gt.maxnum) indlet = maxnum
```

Jul 20 12:40 1989 cara .f Page 99

```
        filenm = menpth(1:lenmen) // fname(1:lname) //
     +  flettr(indlet:indlet) // '.men'
        lennam = lenmen + lname + 5
c       print*,'  before open ',filenm(1:lennam)
        call openit(filenm,lennam,lunmen,0,ierror)
        if (ierror.ne.0) go to 191
        call jdvisb (1)
        call jropen (menun)
        call xcolor (iocmen)
        call xpidex (ibcmen,0)
        call jpintr (1)
c        call jrect (xllmen,yllmen,xurmen,yurmen)
        opensg = .true.
        call jjust (1,1)
C        call xsize (1.1,1.1)
Cc        call xsize (.75,1.)
        call xsize (.75,1.)
c       loop until the correct menu records are located
  100   continue
            read (lunmen,10110,end=193,err=192) cchar,msg
10110       format (a1,a80)
c           print*,'line read - cchar: ',cchar,msg
c           *** skip comment lines
            if (cchar.eq.'C'.or.cchar.eq.'c') go to 100
            if (cchar.eq.'M'.or.cchar.eq.'m') then
                read (msg,1150,end=193,err=192) msgnum
 1150           format (i5)
                if (msgnum.eq.menun) go to 115
            endif
        go to 100
  115   continue
c       print*,'menu found ',menun
        i=0
c       loop until no more data lines (blank first char)
  120   continue
            read (lunmen,10110,end=130,err=192) cchar,msg
c           *** skip comment lines
            if (cchar.eq.'C'.or.cchar.eq.'c')
     +      go to 120
            if (cchar.eq.' ') then
                read (msg,10120,err=192) idpick,icolor,
     +          icol2,itype,row,col,scalef,len,textst
10120           format (4i4,3f7.0,i4,2x,a40)
c               print*,'creatm -- ',idpick,icolor,icol2,itype,row,
c    +          col,scalef,len,textst(1:14),yrow
                call fudgex (col)
                call jpkid (idpick)
                yrow = yurmen - row
                if (itype.eq.1) then
                    call xcolor (icolor)
                    call jmove (col,yrow)
                    call mytext (len,textst)
c ------------- for color menus (21-29), call specialized routine
c ------------- 'dricon' to draw color boxes
                elseif ((menun .gt. 20) .and. (menun .lt. 30)) then
                    call xcolor (icolor)
```

Jul 20 12:40 1989 car: .f Page 100

```
                    call jmove (col,yrow)
                    call dricon (len,textst,icol2,scalef)
c ------------- for linestyle menu (186), call specialized routine
c ------------- 'drlnmn' to draw actual linestyles
                else
     +          if (menun .eq. 186) then
                    call xcolor (icolor)
                    call jmove (col, yrow)
                    call drlnmn (icol2)
                elseif (itype.eq.2) then
                    scalex=(scalef * xconv)
                    scaley=(scalef * yconv)
                    call ascint(textst(1:len),icon,len,ierror)
c        print*,'before geticn scalex =',scalex,'scaley=',scaley
                    call geticn(icolor,icol2,scalex,scaley,col,yrow,
     +                          icon,2,0.0)
c        print*,'after geticn textst(1:len)=',textst(1:len)

                else
                    print*,'Creatm -- Unknown menu item type',itype
                endif
            else
                go to 130
            endif
        go to 120
  130   continue
        go to 200
  190       continue
            print*,' Menu number conversion error ',menun
            ierror = 211
            go to 200
  191       continue
            print*,' Couldn''t open file ',filenm
            ierror = 212
            go to 200
  192       continue
            print*,' Error in menu file read ',filenm
            ierror = 213
            go to 200
  193       continue
            print*,' Premature end of menu file ',filenm,menun
            ierror = 214
            go to 200
  200   continue
c        if (opensg) call jrclos
        if (opensg)  then
           call jrclos
           call jdetec(menun, 1)
        endif
        call closit (lunmen)
c
c       print*,'MENU -- exit'
c
        return
        end
```

Jul 20 12:40 1989 car. .f Page 101

```
C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  crmesg
c
c  Functional Description:
c       create message retained segment from message file
c
c  Input Files/Parameters:
c
c  Output Files/Parameters: N/A
c
c  Subroutines/Functions Called:
c       Note: Subroutines preceded by a "j" are explained in the DI-3000 manual.
c
c  Called By:                  MESG
c
c  Local Variables: N/A
c
c  Restrictions: N/A
c
c  Abnormal Return Conditions:  N/A
c
c  Location:      Apollo       /a21/dave
c
c  Programmer        Date of Last Change       Reason for Change
c  L. McCleary       Jan 1988                  sep amp & sys - crmesg
c
C-*-*-*-*-*-*-*-*-*-*-*-*-*-*-*-*-*-*-*-*-*-*-*-*-*-*-*-*-*-*-*-*-*-*-*-*|*-*-*-*-

      subroutine crmesg(msgno)
c
c     create message retained segment from message file
c
      logical needmv

      character*50 menpth
      common /menpth/ menpth
      common /lenmen/ lenmen
      common/comwdo/qcxmn,qcymn,qcxmx,qcymx
      real qcxmn,qcymn,qcxmx,qcymx
      common /arsegs/ nsgmen,nsggra,nsgsys,nsgmsg,nsgmap,nsgful
      common /comsys/xllsys,yllsys,xursys,yursys,ibcsys,iocsys,incsys
      character cchar
      common /msgoff/ msgoff
      logical aed
      common /aeddbc/ aed
      character *80 msg
      integer msgno,lenmsg
      character*80 filenm
      character*30 fname
      character*26 flettr
      data flettr /'abcdefghijklmnopqrstuvwxyz'/
c     numinc is range of message numbers in each file
c     maxnum is number of message files
      data numinc,maxnum /50,26/
      data fname/'file'/,lname/4/
```

```
        data icolcm/16/
        data ifl/9/
c
C        PRINT *,'CRMESG ---ENTER',MSGNO
clj ------- "needmv" (need move) is set to true if a
clj ------- message really is being displayed.
            needmv = .false.

c           set file name default depending on system

            filenm = ' '

            call jdvisb (1)
            call clrcom
            call jwindo(qcxmn,qcxmx,qcymn,qcymx)
            call jropen (msgno + msgoff)
            call xcolor (iocsys)
            call xpidex (ibcsys,0)
            call jpintr (1)
            call jrect (qcxmn,qcymn,qcxmx,qcymx)
            call jjust (1,1)
            call xsize (1.,1.)
            call xcolor (icolcm)
c
            indlet = msgno / numinc + 1
            if (indlet.lt.1) indlet = 1
            if (indlet.gt.maxnum) indlet = maxnum
            filenm = menpth(1:lenmen) // fname(1:lname) //
     +      flettr(indlet:indlet) // '.msg'
            lennam = lenmen + lname + 5
            call openit(filenm,lennam,ifl,0,ierror)
            if (ierror.ne.0) go to 181
c           Loop though message file looking for message
  100       continue
                read (ifl,1100,end=183,err=182) cchar,msg
 1100           format (a1,a80)
c               print*,'line read - cchar: ',cchar,msg
c               *** skip comment lines
                if (cchar.eq.'C'.or.cchar.eq.'c') go to 100
                if (cchar.eq.'M'.or.cchar.eq.'m') then
                    read (msg,1150,end=183,err=182) msgnum
 1150               format (i5)
                    if (msgnum.eq.msgno) then
                        i=0
c                       loop until no more data lines (blank first char)
  120                   continue
                            read (ifl,1100,end=183,err=182) cchar,msg
c                           *** skip comment lines
                            if (cchar.eq.'C'.or.cchar.eq.'c')
     +                      go to 120
                            if (cchar.eq.'m'.or.cchar.eq.'M') go to 130
                            call length (msg,80,lenmsg)
                            i = i + 1
                            if (lenmsg.gt.0) then
                                call displ(msg, lenmsg, i)
clj --------------------------- "needmv" (need move) means that we
```

```
Jul 20 12:40 1989  carε  .f Page 103

clj ---------------------------- must move to the lower right corner
clj ---------------------------- of the communications area.
                                 needmv = .true.
                             endif
                         go to 120
  130                    continue

clj -------------------- The following if-then was added so that the whole
clj -------------------- communication area is cleared out after displaying
clj -------------------- a message.  This was needed to eliminate typed-in
clj -------------------- text which used to hang around too long.
                         if (needmv) then
                            call jmove(qcxmx - 1.,qcymn + 1.)
                            call j1strg(' ')
                            needmv = .false.
                         endif

c                        position after last line for prompt subroutine
c                         ypos = qcymx - i - 1.3
                         ypos = qcymx - i - 1.0
                         if (ypos.lt.qcymn) ypos = qcymn
                         call jconwv(qcxmn+1.,ypos,z,vx,vy)
c                        added by gre to take into account problems with AED's
                         if (aed) call jmove(qcxmn+1,ypos)
                         call jpecho(1,4,1,vx,vy)
c                        exit after message found
                         go to 180
                     endif
                 endif
             go to 100
  180        continue
             go to 190
  181        continue
                 print*,'open error on message file ',msgno,ierror
                 call jmove(qcxmn+1.,qcymx-1.)
                 call j1strg('open error on message file - '//
     +                       'press any key to continue')
                 go to 190
  182        continue
                 print*,'read error on message file ',msgno
                 go to 190
  183        continue
                 print*,'end of file - message not found :',msgno
                 call jmove(qcxmn+1.,qcymx-1.)
                 call j1strg('message not found - '//
     +                       'press any key to continue')
  190        continue
             call jrclos
             call closit (ifl)
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CURBOX
```

Jul 20 12:40 1989 carә .f Page 104

```
C
C FUNCTIONAL DESCRIPTION:        .
C
C CALLED BY:                     PLTDAT
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine curbox(lat,lon,posit,exist,timbuf)

c this routine draws a box aroud the most recent position
c for a given track.  (programmer: jit)

        logical exist
        character ewi
        character nsi
        character*7 lat
        character*8 lon
        character*9 timbuf
        integer posit
        integer segnum
        integer*4 exlat
        integer*4 exlon
        integer trkcol
        real dx
        real dy
        real plat
        real plon
        real x
        real y

c posit- element position of track in actmrk table
c trklst- list of all current track numbers in the system
c mrkcnt- count of number of tracks in the system currently.
c actmrk- list of markers that are currently active on the system.
c exist- logical value is true if track previously existed,
c        and false if it is a new track.

        character*2 actmrk(260)
        integer mrkcnt
        integer trklst(260)
        integer curseg(260)
        character*9 boxdtg(260)
        logical boxvis(260)
        common /actmrk/ trklst,mrkcnt,actmrk,curseg,
     +                 boxdtg,boxvis

        data trkcol /224/

c         seperate lat/lon from nsi/ewi indicators

          read(lat,10) exlat,nsi
 10       format(i6,a1)
          read(lon,20) exlon,ewi
 20       format(i7,a1)
```

```
          call lltor(exlat,exlon,nsi,ewi,plat,plon)

c***        if dtg from this plot is greater than plot that
c***        is currently plotted for that track, erase
c***        current box and draw new box.

c jit          print *, 'timbuf is ', timbuf
c jit          print *, 'boxdtg(posit) is ', boxdtg(posit)

          if (timbuf .ge. boxdtg(posit)) then

             if (.not.exist) then
               boxvis(posit) = .true.
               call getseg(segnum)
               curseg(posit) = segnum
             else
               segnum = curseg(posit)
               call jpurge(segnum)
               boxvis(posit) = .true.
             endif
c
c   only draw the box if that segment is visible at
c   the current time.
c
             if (boxvis(posit)) then
                call jropen(segnum)
                call lltoxy(plat,plon,x,y)
                call jmove(x,y)
                call jrmove(-4.,-3.)
                dx = 8.
                dy = 9.
                call jpintr(0)
                call xcolor(trkcol)
                call jrrect(dx,dy)
                call jrclos
             endif

          endif


          return
          end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     CVITOC
C
C FUNCTIONAL DESCRIPTION:        .
C
C CALLED BY:                     SETFAD
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

Jul 20 12:40 1989 carε .f Page 106

```
      subroutine cvitoc(ival,cstr)

c     convert integer value to character string
c     char_str must be sufficiently long to hold the integer value

      character*(*) cstr

      integer digits
      integer i
      integer itmp1
      integer itmp2
      integer ival
      integer lngth

      lngth = len(cstr)
      cstr = '00000'
      itmp1 = ival

      digits = 1
      if (ival .gt. 9) digits = 2
      if (ival .gt. 99) digits = 3
      if (ival .gt. 999) digits = 4
      if (ival .gt. 9999) digits = 5

      if (digits .eq. 1) then
         cstr(lngth:lngth) = char(ival+48)
         return
      else
         if (lngth .lt. digits) then
            digits = lngth
         end if
         itmp2 = itmp1
         do 100 i = 1, digits
            itmp2 = itmp1 / 10
            cstr(lngth-i+1:lngth-i+1) = char(itmp1 - itmp2 * 10
     +            + 48)
            itmp1 = itmp2
100      continue
      end if

      return
      end
```

Jul 20 15:30 1989 car‹ sun.f Page 1

```
C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ADDOPN
C
C FUNCTIONAL DESCRIPTION:       .
c -   Description: open up the change file
C
C CALLED BY:                    OPENIN
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      SUBROUTINE addopn(cnamel,cname,ios)

      INTEGER   sunit,lunit,punit
      PARAMETER (punit = 67)
      PARAMETER (lunit = 68)
      PARAMETER (sunit = 69)

      LOGICAL         filply,opnply
      COMMON /polycb/ filply,opnply

      INTEGER  cnamel
      CHARACTER*(*) cname
      CHARACTER*100 datafi,indexf,lindex

      INTEGER   ios

      INTEGER nlinde,lenlin
      COMMON /LWDBII/ NLINDE,LENLIN,icntli
      INTEGER nindex,lenind
      COMMON /IWDBII/ NINDEX,LENIND
      INTEGER ndatar,lendat
      COMMON /DWDBII/ NDATAR,LENDAT
      integer lenmap
      common /lenmap/lenmap


      IF (lenmap.GT.0) THEN
         datafi = cname(1:cnamel - 1) // 'p.da3'
         indexf = cname(1:cnamel - 1) // 'p.in3'
         lindex = cname(1:cnamel - 1) // 'p.li3'
      ENDIF
C
C        VAX OPEN STATEMENTS
c
c      OPEN(UNIT=punit,FILE=datafi,FORM='unformatted',STATUS='old',
c     +     RECORDTYPE='fixed',RECL=lendat*ndatar,
c     +     ORGANIZATION='sequential',ACCESS='direct',
c     +     ERR=190,IOSTAT=ios,READONLY)
c      OPEN(UNIT=lunit,FILE=indexf,FORM='unformatted',STATUS='old',
c     +     RECORDTYPE='fixed',RECL=lenind*nindex/2,
c     +     ORGANIZATION='sequential',ACCESS='direct',
c     +     ERR=190,IOSTAT=ios,READONLY)
c      OPEN(UNIT=sunit,FILE=lindex,FORM='unformatted',STATUS='old',
c     +     RECORDTYPE='fixed',RECL=lenlin*nlinde/2,
```

Jul 20 15:30 1989 care sun.f Page 2

```
c      +     ORGANIZATION='sequential',ACCESS='direct',
c      +      ERR=190,IOSTAT=ios,READONLY)

c
c          Apollo open statements
c
      OPEN(UNIT=punit,FILE=datafi,FORM='UNFORMATTED',
     +      STATUS='OLD',RECL=lendat*ndatar*4,
     +      ACCESS='DIRECT',
     +      ERR=190,IOSTAT=ios)
      OPEN(UNIT=lunit,FILE=indexf,FORM='UNFORMATTED',
     +      STATUS='OLD',RECL=lenind*nindex*2,
     +      ACCESS='DIRECT',
     +      ERR=190,IOSTAT=ios)
      OPEN(UNIT=sunit,FILE=lindex,FORM='UNFORMATTED',
     +      STATUS='OLD',RECL=lenlin*nlinde*2,
     +      ACCESS='DIRECT',
     +      ERR=190,IOSTAT=ios)

      opnply = .TRUE.
      RETURN
  190 CONTINUE
      opnply = .FALSE.
C      if (index(idebug,'polygon').ne.0)
C     +  PRINT *,'Polygon Fill not available for resolution ... ',
C     +           cname(cnamel:cnamel),ios

      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CHEKML
C
C FUNCTIONAL DESCRIPTION:        .
C
C CALLED BY:                    INMAIL, OPMAIL
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine chekml(respon)
c
c this subroutine gets a record from the mailbox and copies it into a ch. string
c

      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   chint
c
c  Functional Description:
```

Jul 20 15:30 1989 cara sun.f Page 3

```
c       this subroutine checks whether a key has been pressed on the keyboard
c       If it has, an interrupt flag is set and the
c       key is returned
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                    DMAPII, FILLIT, LLGRID, PLTCIT,
C                                PLTNAM, PROCOV
c
c  Local Variables: N/A
c
c  Restrictions: N/A
c
c  Abnormal Return Conditions:  N/A
c
c  Location:      /gl
c
c  Programmer        Date of Last Change       Reason for Change
c
c  Ed Swing              05/20/1987            fix for OS 9.5
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine chint (interr,key)
c
c       this subroutine checks whether a key has been pressed on the keyboard
c       If it has, an interrupt flag is set and the
c       key is returned
c
c       this is an Apollo specific subroutine, a similiar subroutine must
c       be written for other systems
c
c       Apollo Operating System 9.5 required we use a gpr call instead
c       of a smd call.
c
        logical interr
        character*1 key
        integer qdsdev,qpydev,qecho,qlecho
        common /device/ qdsdev,qpydev,qecho,qlecho
c
        call jchint(qpydev,interr)

        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CHKDAT
C
C FUNCTIONAL DESCRIPTION:       .
C
```

```
Jul 20 15:30 1989  carε  ɜun.f Page 4

C CALLED BY:                      DATPOL
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine chkdat(datain, newdat)
c
c  check for data on the line to be read by mapgrf for traking
c

      character*160 datain
      logical newdat

         newdat = .false.

         return
         end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      EXECOM
C
C FUNCTIONAL DESCRIPTION:         EXECUTES A DM COMMND
C
C INPUT FILES/PARAMETERS:
C
C    VARIABLE            TYPE          DESCRIPTION
C
C     COMMND           CHAR*(*)     DISPLAY MANAGER COMMND TO EXECUTE
C     ERRFIL            CHAR*(*)     FILE TO DISPLAY ERROR MESSAGES
C     STDFIL            CHAR*(*)     FILE TO DISPLAY STANDARD MESSAGES
C     FILE              CHAR*(*)     FILE TO PUT COMMND IN TO BE EXECUTED
C     STREAM_$STDIN     INTEGER      STANDARD INPUT STREAM ID
C
C OUTPUT FILES/PARAMETERS:        NONE
C
C SUBROUTINES/FUNCTIONS CALLED
C
C     PAD_$XX             APOLLO SUBROUTINE
C     ERROR_SUB           PRINTS ERROR STATUS
C
C CALLED BY:                    PRINTR
C
C LOCAL VARIABLES:
C
C    VARIABLE             TYPE        DESCRIPTION
C
C    BUFFER             CHAR*128      HOLDS THE PRINT COMMND
C    CMDNAM             CHAR*128      HOLDS THE DM COMMND
C    FORM               CHAR*3        CHARACTER REPRESENTATION OF LENGTH
C                                     OF BUFFER COMMND
C    FULFRM             CHAR*6        FORMAT USED TO WRITE COMMND TO
C                                     FILE
C    MAXCOM             INTEGER       MAX LENGTH OF COMMND LINE
C    LENBUF             INTEGER       ACTUAL LENGTH OF BUFFER LINE
```

Jul 20 15:30 1989 cara ~un.f Page 5

```
C    LENCMD              INTEGER       LENGTH OF DM COMMND
C    LUNAME              INTEGER       LOGICAL UNIT NUMBER
C    STATUS              INTEGER*4     RETURNS STATUS CODE OF GMF CALL
C
C RESTRICTIONS:          APOLLO  DEPENDENT SUBROUTINE
C
C
C ABNORMAL RETURN CONDITIONS:   N/A
C
C
C PROGRAMMER:                   DATE OF LAST CHANGE     REASON FOR CHANGE
C
C     DIRK BUTSON
C
C-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE EXECOM(COMMND,FILNAM,OPTIONS
     +                 ,ERRFIL,STDFIL,FILNM)
C
C EXECUTES A DM COMMND (EX. PRFC, PRF, OR DATE)
C

      CHARACTER*(*) COMMND
      CHARACTER*(*) FILNAM
      CHARACTER*(*) OPTIONS
      CHARACTER*(*) ERRFIL
      CHARACTER*(*) STDFIL
      CHARACTER*(*) FILNM
      INTEGER*2 MAXCOM, LUNAME

      DATA MAXCOM /256/
      DATA MAXBUF /256/
      DATA LUNAME /20/


200   CONTINUE
      RETURN
      END


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GETARG
C
C FUNCTIONAL DESCRIPTION:       .
C
C CALLED BY:                    GETFNM
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine getarg (lenarg,argume)

c       get a file name from the command line (or default) for read_keys

        character*80 argume,argument
```

```
Jul 20 15:30 1989  care  sun.f Page 6

        data argument/'                                                  '/

        lenarg = 0

        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GETTIM
C
C FUNCTIONAL DESCRIPTION:       .
C
C CALLED BY:                    DIFTIM, FADCHG
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine gettim(newtim)

c     this subroutine gets local time and puts it in a yyddmmhhmmss format

      integer*2  newtim(6)

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GMCIRC
C
C FUNCTIONAL DESCRIPTION:       .
C
C CALLED BY:
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine gmcirc (x,y,radius)

c       write graphics metafile circle

        logical gmactv
        common /gmactv/ gmactv
        logical fill
        data fill/.false./

        return
        end

C+*+*+*+*+*+*+*+*+*+*+*+*+*+*+*+*+*+*+*+*+*+*+*+*+*+*+*+*+*+*+*+*+*+*+*+*|*+*+*+*+
```

Jul 20 15:30 1989 cara sun.f Page 7

```
C UNIT NAME:                    GMCLOS
C
C FUNCTIONAL DESCRIPTION:       .
C
C CALLED BY:
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine gmclos

c       close graphics metafile

        integer*4 npoly,maxpnt,nptot
        common /gmstat/ npoly,maxpnt,nptot
        character*72 line
        data line/'Metafile number of output lines is       '/

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GMOPEN
C
C FUNCTIONAL DESCRIPTION:       . .
C
C CALLED BY:
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine gmopen (filen,len,ierror)

c       Open Graphics Metafile Resource metafile

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GMPOLY
C
C FUNCTIONAL DESCRIPTION:       .
C
C CALLED BY:
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine gmpoly (x,y,n)

c       write graphics metafile polyline
```

Jul 20 15:30 1989 car: sun.f Page 8

```
        common /gmpos/ gmxpos,gmypos
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    INIGM
C
C FUNCTIONAL DESCRIPTION:       .
C
C CALLED BY:                    FMAIN
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine inigm

c       initializat graphics metafile resource

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    INITBW
C
C FUNCTIONAL DESCRIPTION:       INITIALIZES THE LINE PRINTER
C                               FOR HARDCOPY PRINT OF B/W SCREEN
C
C INPUT FILES/PARAMETERS:
C                          SIZEX,SIZEY,NOPLNE,FILE)
C  SIZEX              INTEGER*2   SIZE OF SCREEN IN X-DIRECTION (PIXELS)
C  SIZEY              INTEGER*2   SIZE OF SCREEN IN Y-DIRECTION (PIXELS)
C  FILNM               CHAR*(*)

C OUTPUT FILES/PARAMETERS:      NONE
C
C SUBROUTINES/FUNCTIONS CALLED
C
C     GMF_$XX              APOLLO GRAPHIC METAFILE SUBROUTINES
C     ERROR_SUB            PRINTS ERROR STATUS
C
C CALLED BY:                  PRINTR
C
C LOCAL VARIABLES:
C
C    VARIABLE              TYPE       DESCRIPTION
C
C    LNWID              INTEGER       OFFSET BETWEEN ROWS OF BITMAP
C    MSTRID             INTEGER       NAME OF BITMAP PICTURE IS BEING COPIED TO
C    MAPDSC             INTEGER*4     NAME OF BITMAP CONTAINING PICTURE
C    SIZE               INTEGER(2)    SIZE OF SCREEN IN PIXELS
C    STATUS             INTEGER*4     RETURNS STATUS CODE OF GMF CALL
C    STRPTR             INTEGER*4     BEGINNING LOCATION OF PICTURE
```

```
C
C RESTRICTIONS:          APOLLO  DEPENDENT SUBROUTINE
C
C
C ABNORMAL RETURN CONDITIONS:   N/A
C
C
C PROGRAMMER:                      DATE OF LAST CHANGE     REASON FOR CHANGE
C
C     DANATION                                               NSAGRF
C     DABUTSON                          12/12/84             IMPLEMENTED IN
C                                                            A21PROTOTYPE
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE INITBW(SIZEX,SIZEY,FILNM)
C
C THIS SUBROUTINE INITIALIZES THE LINE PRINTER FOR HARDCOPY PRINT OF SCREEN
C
      RETURN
      END


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       INTCOL
C
C FUNCTIONAL DESCRIPTION:          COPIES N PLANES OF SCREEN
C                                  INTO A SUPPLIED FILE
C
C INPUT FILES/PARAMETERS:
C
C  SIZEX        LENGTH OF PICTURE IN PIXELS
C  SIZEY        HEIGHT OF PICTURE IN PIXELS
C  NOPLNE       NUMBER OF PLANES TO STORE IN BITMAP FILE
C  FILNM         PATHNAME OF BITMAP FILE TO BE STORED
C
C OUTPUT FILES/PARAMETERS:         NONE
C
C SUBROUTINES/FUNCTIONS CALLED
C
C    GPR_$XXXX      APOLLO GRAPHIC PRIMITIVE SUBROUTINES
C    ERROR_$XX      APOLLO ERROR SUBROUTINES
C
C CALLED BY:
C
C    APOLLO         DETERMINES TYPE OF APOLLO DISPLAY
C
C LOCAL VARIABLES:
C
C    STATUS    INT4        STATUS OF LAST APOLLO SUBROUTINE CALL
C    MAPDSC    INT4        DISPLAY BITMAP
C    SIZE      INT2(2)     DIMENSIONS OF DISPLAY BITMAP IN PIXELS
C    VRSION    INT2(2)     NEEDED ARRAY FOR APOLLO CALL
C    WINDOW    INT2(2)     DESIRED WINDOW SIZE OF DISPLAY BITMAP TO STORE
C    SCREEN    INT2(2,2)   DESIRED WINDOW COORDINATES
C    START     INT2(2)     UPPER RIGHT CORNER OF WINDOW
```

Jul 20 15:30 1989 cara sun.f Page 10

```
C     HDRS        INT4(4)     NEEDED VARIABLE FOR APOLLO CALL
C     ATRIBS      INT4        ATTRIBUTES OF CURRENT BITMAP
C     FILEBM      INT4        BITMAP FILE INDENTIFIER
C     CREATD      LOGICAL     FLAG TO FILE WAS OPENED O'KAY
C
C RESTRICTIONS:          APOLLO  DEPENDENT SUBROUTINE
C
C
C ABNORMAL RETURN CONDITIONS:    N/A
C
C
C PROGRAMMER:                    DATE OF LAST CHANGE     REASON FOR CHANGE
C
C      DABUTSON                       12/12/84            IMPLEMENTED IN
C                                                         A21PROTOTYPE
C
C      G. N. LEO                      24 JUN '85          TO UNLOCK BITMAP
C                                                         SO THAT IT WILL
C                                                         PRINT WITHOUT
C                                                         HAVING TO EXIT
C                                                         CELEBRATION.
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE INTCOL(SIZEX,SIZEY,NOPLNE,FILNM)
C
C INITIALIZES THE LINE PRINTER FOR HARDCOPY PRINT OF COLOR NODE
C
      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     KPAUSE
C
C FUNCTIONAL DESCRIPTION:        .
C
C CALLED BY:                     BUTTN, CLENUP, INIGRA, KEYBD, KEYBS
C                                LOCAT, PICK
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine kpause (eofkey)

c       pause during save_keys file playback and potentially read a key
c       this routine is very Apollo dependent, a user on another
c       hardware type may have to rework this logic
c       however, it should compile the way that it is
c
c       Change to gpr call for keyboard input due to 9.5 Operating system

        return
        end
```

Jul 20 15:30 1989 carr sun.f Page 11

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: OPENIN
C
C FUNCTIONAL DESCRIPTION:  OPENS WDBII DATA FILES.
C
C INPUT FILES/PARAMETERS:
C
C       LUNDAT                INTEGER     LOGICAL UNIT NUMBER FOR WDBII DATA
C                                         FILE.
C       LUNIND                INTEGER     LOGICAL UNIT NUMBER FOR WDBII INDE
C                                         FILE.
C       LUNLIN                INTEGER     LOGICAL UNIT NUMBER FOR WDBII LINE
C                                         INDEX FILE.
C       NAML                  INTEGER     LENGTH OF WDBII DEFAULT FILE.
C       INB                   CHAR*6      WDBII DEFAULT FILE.
C
C GLOBAL VARIABLES :
C
C       ISECS                 INTEGER*4   SECONDS IN 180 MINUTES.
C       IMINS                 INTEGER     MINUTES IN 180 DEGREES.
C       C                     REAL        CONVERTS MINUTES TO RADIANS.
C       CS                    REAL        CONVERTS SECONDS TO RADIANS.
C       ICNTLI                INTEGER     CURRENT LINE INDEX RECORD.
C
C OUTPUT FILES/PARAMETERS:  NONE.
C
C SUBROUTINES/FUNCTIONS CALLED : NONE.
C
C CALLED BY: CHAWDB.
C
C LOCAL VARIABLES:
C
C       DATAFI                CHAR*30     WDBII DAT FILE NAME.
C       INDEXF                CHAR*30     WDBII INDEX FILE NAME.
C       LINDEX                CHAR*30     WDBII LINE INDEX FILE NAME.
C
C RESTRICTIONS: NONE.
C
C ABNORMAL RETURN CONDITIONS:   NONE.
C
C LOCATION:                     /a21/gjf/L3REA.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENTATION AND MO
C                                                       FOR A21 PROTOTYPE.
C     DANIEL BERKICH (SAIC) NOSC                        Read both forms of
C                                                       Data base.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE openin(lundat,lunind,lunlin,naml,inb,ios)
```

Jul 20 15:30 1989 carε sun.f Page 12

```
      INTEGER   nlinde,lenlin,icntli
      COMMON    /lwdbii/ nlinde,lenlin,icntli
      INTEGER   nindex,lenind
      COMMON    /iwdbii/ nindex,lenind
      INTEGER   ndatar,lendat
      COMMON    /dwdbii/ ndatar,lendat
      INTEGER   isecs,imins
      REAL      c,cs
      COMMON    /c/ c,isecs,cs,imins
      INTEGER   lundat,lunind,lunlin,naml,ios
      CHARACTER inb*(*)
      INTEGER   csblk,clblk,cpblk
      LOGICAL   va
      common /inopen/ csblk,clblk,cpblk,va
      INTEGER*2 i2(2)
      INTEGER   i4
      EQUIVALENCE (i2,i4)
      INTEGER    two8
      PARAMETER (two8 = 2**8)

      LOGICAL   filply,opnply
      COMMON    /polycb/ filply,opnply
      logical   forma
      common /fmadbc/ forma

      CHARACTER*100 pfile,lfile,sfile
      CHARACTER ptyp*4,ltyp*4,styp*4
      PARAMETER (ptyp='.da3')
      PARAMETER (ltyp='.in3')
      PARAMETER (styp='.li3')

      DATA      filply /.TRUE./
      DATA nlinde/32/,lenlin/8/
      DATA nindex/32/,lenind/8/,icurlb/-1/
      DATA lendat/2/,ndatar/64/,icurpb/-1/

      cs = c/60.
      ICNTLI=0
      csblk = 0
      clblk = 0
      cpblk = 0
      pfile = inb(1:naml) // ptyp
      lfile = inb(1:naml) // ltyp
      sfile = inb(1:naml) // styp

      va = .FALSE.
      CALL adclos
      CALL addopn(naml,inb,ios)
      if ((inb(naml:naml).eq.'a').and. (forma)) then
        va = .true.
        opnply = .false.
      endif

c         OPEN(UNIT=lundat,FILE=pfile
c     +      ,FORM='UNFORMATTED',STATUS='OLD'
c     +      ,ACCESS='DIRECT',IOSTAT=ios,ERR=181
```

Jul 20 15:30 1989 car< sun.f Page 13

```
c     +       ,RECORDTYPE='fixed',RECL=lendat*ndatar,READONLY)
c           OPEN(UNIT=lunind,FILE=lfile
c     +       ,FORM='UNFORMATTED',STATUS='OLD'
c     +       ,ACCESS='DIRECT',IOSTAT=ios,ERR=182
c     +       ,RECORDTYPE='fixed',RECL=lenind*nindex/2,READONLY)
c           OPEN(UNIT=lunlin,FILE=sfile
c     +       ,FORM='UNFORMATTED',STATUS='OLD'
c     +       ,ACCESS='direct',IOSTAT=ios,ERR=183
c     +       ,RECORDTYPE='fixed',RECL=lenlin*nlinde/2,READONLY)

          OPEN(UNIT=lundat,FILE=pfile
     +       ,FORM='UNFORMATTED',STATUS='OLD'
     +       ,ACCESS='DIRECT',IOSTAT=ios,ERR=181
     +       ,RECL=lendat*ndatar*4)
          OPEN(UNIT=lunind,FILE=lfile
     +       ,FORM='UNFORMATTED',STATUS='OLD'
     +       ,ACCESS='DIRECT',IOSTAT=ios,ERR=182
     +       ,RECL=lenind*nindex*2)
          OPEN(UNIT=lunlin,FILE=sfile
     +       ,FORM='UNFORMATTED',STATUS='OLD'
     +       ,ACCESS='direct',IOSTAT=ios,ERR=183
     +       ,RECL=lenlin*nlinde*2)

      RETURN
  900 FORMAT(x,'Open Error ',i3,' on - ',/,x,a)
  181 CONTINUE
      PRINT 900,ios,pfile
      RETURN
  182 CONTINUE
      PRINT 900,ios,lfile
      RETURN
  183 CONTINUE
      PRINT 900,ios,sfile
      RETURN
      END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    OPMAIL
C
C FUNCTIONAL DESCRIPTION:       .
C
C CALLED BY:                    INMAIL
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine opmail(respon)
c
c this subroutine opens a mailbox as a client for ten channels
c
      return
      end
```

Jul 20 15:30 1989 cars sun.f Page 14

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PLOTGC
C
C FUNCTIONAL DESCRIPTION:       .
C
C CALLED BY:
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine plotgc
        return
        end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PRINT
C
C FUNCTIONAL DESCRIPTION:       DETERMINES TYPE OF APOLLO DISPLAY
C                               AND WHICH PRINTER TO PRINT TO
C
C INPUT FILES/PARAMETERS:
C
C       GPR_$              APOLLO VARIABLES CAN BE FOUND IN THE
C                          /SYS/INS/GPR.INS.FTN FILE
C
C OUTPUT FILES/PARAMETERS:      NONE
C
C SUBROUTINES/FUNCTIONS CALLED
C       GPR_$INQ_CONFIG    APOLLO SUPPLIED ROUTINE TO DETERMINE
C                          CONFIGURATION OF DISPLAY
C       INT2               DOMAIN FORTRAN FUNCTION TO CONVERT NUMBER
C                          TO INTEGER*2 FORMAT
C       INTCOL             COPIES THREE PLANES OF A COLOR
C                          NODE INTO A BITMAP FILE
C       INITBW             COPIES ONE PLANE INTO A GMF FILE
C       MAPPTR             EXECUTES THE COMMAND TO PRINT
C                          THE FILE CREATED BY EITHER OF THE TWO
C                          INITIALIZATION ROUTINES
C
C CALLED BY:                  PRINTR
C
C LOCAL VARIABLES:
C
C        CONFIG            RETURNED FROM GPR ROUTINE INDICATING TYPE
C                          OF NODE
C        STATUS            RETURNED FROM GPR ROUTINE TO INDICATE ERROR
C                          IN CALL
C
C RESTRICTIONS:        APOLLO  DEPENDENT SUBROUTINE
C
C     WRITTEN FOR THE CURRENT DEVICE DRIVER OF THE ACT II PRINTER
C     IF CHANGES TO DEVICE DRIVER WILL NEED TO CHANGE SOME PARAMETERS
C     BEING PASSED TO INTCOL AND/OR EXECOM
C
```

Jul 20 15:30 1989 care sun.f Page 15

```
C ABNORMAL RETURN CONDITIONS:    N/A
C
C
C PROGRAMMER:                    DATE OF LAST CHANGE     REASON FOR CHANGE
C
C     DABUTSON                       12/12/84             INITIAL ENTRY
C     RKDISBR                        14/04/87             adapted for print menu
C
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE PRINT
      END


C+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PRINTR
C
C FUNCTIONAL DESCRIPTION:        PRINTS THE CONTENTS OF THE SCREEN
C                                ON THE GRAPHIC DEVICE OR ALLOWS USER
C                                TO TAKE A PICTURE OF FULL SCREEN
C                                WITH MATRIX CAMERA
C
C INPUT FILES/PARAMETERS:
C
C      QCHANG          CHANGE         LOGICAL  FLAG TO INIDICATE A CHANGE HAS
C                                              BEEN MADE TO THE PICTURE
C      QNAME           FLNAME         CHAR*50  NAME OF CURRENT PICTURE
C
C OUTPUT FILES/PARAMETERS:       NONE
C
C
C SUBROUTINES/FUNCTIONS CALLED
C
C     INIPIC          INITIALIZE VARIABLES FOR DRAWING NEW PICTURE
C     INTCOL          INITIALIZES B/W PRINTER
C     INTSCN          INITIALIZES SCREEN
C     HLDF            RETRIEVES FILE FOR DISPLAY (CURRENT PICTURE)
C     MAPCOL          PRINTS SCREEN IMAGE OF COLOR NODE
C     MESG            DISPLAYS MESG
C     RPLSCN          REPLACES SCREEN TO ORIGINAL SIZE
c     CALCMP          REDRAWS MAP WHILE CREATING CALCOMP PLOTTER FILE
C
C CALLED BY:          FMAIN, PRTMEN
C
C LOCAL VARIABLES:
C
C     VARIABLE                TYPE        DESCRIPTION
C
C      OCHANG                LOGICAL      SAVE QCHANG
C      SVNAM                CHAR*50      SAVE CURRENT FILE NAME
C
C RESTRICTIONS:
C
C
C ABNORMAL RETURN CONDITIONS:    N/A
C
```

```
C
C PROGRAMMER:                    DATE OF LAST CHANGE     REASON FOR CHANGE
C
C     DABUTSON                      11/13/84              INITIAL ENTRY
C     RKDISBR                       14/04/87              adapted for print menu
C                                                         and calcomp plots
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
        SUBROUTINE PRINTR

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     RECDAT
C
C FUNCTIONAL DESCRIPTION:        .
C
C CALLED BY:                     FMAIN, RECDIS, RESCON
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine recdat (savnam,lennam)

c       this subroutine restores the named screen
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     REPLAY
C
C FUNCTIONAL DESCRIPTION:        .
C
C CALLED BY:                     TRKCON
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine replay (delay)

c this routine blanks out the currently visible tracks and 'replays'
c them in time sequence
c programmer: avw
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     SAVDAT
C
```

Jul 20 15:30 1989 care sun.f Page 17

```
C FUNCTIONAL DESCRIPTION:          .
C
C CALLED BY:                       RESCON, SAVDIS
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine savdat (savnam,lennam)

c       this subroutine saves the current screen in save_name.image
        character*100 savnam
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       SNDMAIL
C
C FUNCTIONAL DESCRIPTION:          .
C
C CALLED BY:
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine sndmail
c
      return
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       TERMGM
C
C FUNCTIONAL DESCRIPTION:          .
C
C CALLED BY:                       FMAIN
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine termgm

c       terminate graphics metafile system
      return
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       TRKINI
C
C FUNCTIONAL DESCRIPTION:          .
C
```

Jul 20 13:31 1989 carc .f Page 1

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: darcos
C
C FUNCTIONAL DESCRIPTION:  Substitute for dacos function
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                  DATE OF LAST CHANGE     REASON FOR CHANGE
C
C     DAVE NATION                                      ORIGINAL CODE.
C     JERRY FENERTY                                    DOCUMENT AND MODIFY
C                                                      FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        REAL*8 FUNCTION DARCOS(X)

c       Substitute for dacos function

        COMMON /PIE/ PIE,TPIE,PIO2,PIO4
        REAL*8 X,Y,q,a,b
        IF(DABS(X) .GT. 1.0D+0) then
            X=DSIGN(1.0D+0,X)
        endif
        a = 1.0D+0
        b = x*x
        q = a - b
        Y=DSQRT(DABS(q))
        DARCOS=DATAN2(Y,X)
        IF (DARCOS .LT. 0.) DARCOS = DARCOS + PIE
        RETURN
        END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: darsin
C
C FUNCTIONAL DESCRIPTION:  perform the double prec. arcsin w/ this routine
C
C INPUT FILES/PARAMETERS:
```

```
Jul 20 13:31 1989  carc  .f Page 2

C
C GLOBAL VARIABLES : NONE.
C
C OUTPUT FILES/PARAMETERS:  NONE.
C
C SUBROUTINES/FUNCTIONS CALLED :
C
C CALLED BY:
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                    DATE OF LAST CHANGE     REASON FOR CHANGE
C
C     DAVE NATION                                        ORIGINAL CODE.
C     JERRY FENERTY                                      DOCUMENT AND MODIFY
C                                                        FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        REAL*8 FUNCTION DARSIN (X)

c --- perform the double prec. arcsin w/ this routine
c --- the system routine doesn't work on the dn300.

        real*8 x,y,z,x2

        IF(DABS(X) .GT. 1.0D+0) then
           X=DSIGN(1.0D+0,X)
        endif

        x2 = x * x
        y = DABS(1.0D+0 - x2)
        z = DSQRT(y)
        DARSIN = DATAN2(x,z)
        return
        end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: datoll
C
C FUNCTIONAL DESCRIPTION:  CONVERTS DISTANCE/AZIMUTH FROM THE CENTER OF
C       PROJECTION TO LAT/LON
C
C INPUT FILES/PARAMETERS:
C
C GLOBAL VARIABLES : NONE.
C
C OUTPUT FILES/PARAMETERS:  NONE.
C
```

Jul 20 13:31 1989 carc .f Page 3

```
C SUBROUTINES/FUNCTIONS CALLED :
C
C CALLED BY:                       NO LONGER USED BY CARICATURE
C
C LOCAL VARIABLES: NONE.
C
C RESTRICTIONS: NONE.
C
C ABNORMAL RETURN CONDITIONS:    NONE.
C
C LOCATION:
C
C PROGRAMMER:                      DATE OF LAST CHANGE     REASON FOR CHANGE
C
C     DAVE NATION                                          ORIGINAL CODE.
C     JERRY FENERTY                                        DOCUMENT AND MODIFY
C                                                          FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE DATOLL(CLAT,CLON,ER,AZ,PLAT,PLON)

C       CONVERTS DISTANCE/AZIMUTH FROM THE CENTER OF PROJECTION TO LAT/LON

        COMMON /PIE/ PIE,TPIE,PIO2,PIO4
        COMMON /CONST/ MAXVAL,RMPV,C,R,ERNM

C         SET CONSTANTS

          SIN1 = SIN(CLAT)
          COS1 = COS(CLAT)

C         DETERMINE SIN OF PLAT

          SIN2 = COS(AZ)*COS1*SIN(ER)+SIN1*COS(ER)

C         COMPUTE PLAT

          PLAT = ASIN(SIN2)
C
          COS2 = COS(PLAT)

C         COMPUTE DELTA LON

          IF(ABS(COS1) .LT. RMPV) THEN
                 DLON = PIE - AZ
                 GO TO 100
          ENDIF

          IF(ABS(COS2) .LT. RMPV) THEN
                 DLON = 0.
                 GO TO 100
          ENDIF
          COSDLO = (COS(ER)-SIN1*SIN2)/(COS1*COS2)
          IF(ABS(COSDLO) .GT. 1.0) THEN
                 DLON = 0.
```

```
Jul 20 13:31 1989  carc   .f Page 4

          ELSE
                 DLON = ACOS(COSDLO)*SIGN(1.0,AZ)
          ENDIF

C         COMPUTE PLON

100       CONTINUE
          PLON = DLON+CLON
          IF(ABS(PLON) .GT. PIE) PLON = PLON - SIGN(TPIE,PLON)

          RETURN
          END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DATPOL
C
C FUNCTIONAL DESCRIPTION:       .
C
C CALLED BY:                    BUTTN, KEYBD, KEYBS, LOCAT, PICK
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine datpol
c
c
c     this subroutine 1st checks the comm line for
c     new data coming in.  If data is present in the
c     queue, ADDTRK adds this new track to the display
c     list and displays it.
c     2nd, the system clock is checked to see if 1 min.
c     has gone by since last check.  If so, a fade
c     routine is called to delete any tracks that are
c     no longer within the fade time.
c
        logical newdat
        character*160 datain
        integer latbeg
        integer latend
        integer lonbeg
        integer lonend
        character*7 lablnk
        character*8 loblnk
        data latbeg,latend /3,9/
        data lonbeg,lonend /10,17/
        data lablnk /'       '/
        data loblnk /'        '/


c
c          check for data line interrupt
c
  125      continue
           newdat = .false.
```

Jul 20 13:31 1989 car‹ .f Page 5

```
          call CHKDAT(datain,newdat)
          if(newdat) then
c
c            don't call ADDTRK if lat or lon are blank
c
             if (datain(latbeg:latend) .ne. lablnk .and.
     +           datain(lonbeg:lonend) .ne. loblnk) then
                 call ADDTRK(datain)
             endif
             goto 125
          endif

c         check for time clock interrupt and turn off visibility
c         on any tracks that are pass fade time
c         (click true on each minute elapsed)
c
          call TIMCHK
c
          return
          end


C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     ddcval
c
c  Functional Description:
c       this function converts produces a single rgb value from hls
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:     hlsrgb
c
c  Local Variables: N/A
c
c  Restrictions: N/A
c
c  Abnormal Return Conditions:  N/A
c
c  Location:       /a21/dave
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
       real function ddcval (val1, val2, rhue)
c
c      this function converts produces a single rgb value from hls
c
       hue = rhue
       if (hue .lt. 0.0) hue = hue + 360.
       if (hue .lt. 60.) then
```

Jul 20 13:31 1989 carc .f Page 6

```
            ddcval = val1 + (val2 - val1) * hue / 60.
        else if (hue .lt. 180.) then
            ddcval = val2
        else if (hue .lt. 240.) then
            ddcval = val1 + (val2 - val1) * (240. - hue) / 60.
        else
            ddcval = val1
        endif
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DECDET
C
C FUNCTIONAL DESCRIPTION:        .
C
C CALLED BY:                     STATEC
C
C PROGRAMMER:                    DATE OF LAST CHANGE     REASON FOR CHANGE
c  S. Lamb                 Feb 1988                 command fix - decdet
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine decdet
c
c       this subroutine is the decrease detail state interpreter (22)
c
        common /states/ nextst
        character*6 curwdb
        common /curwdb/ curwdb
        integer detail(6)
        common /detail/detail
        character postfix(6)
        integer current
        integer i
        integer next
        logical wordis,iseoc

        data postfix/'a','b','c','d','e','f'/
c
        initls = nextst
c       do until nextst not = initial state
  100   continue
            call getwrd
c * ** *** **** ***** ****** ******* change check order, etc.
            if (wordis('SCALE')) then
                nextst = 24
            else if (wordis('DETAIL').or.wordis('MAP') .or.
     +               iseoc()) then
c  ***          decrease detail
                do 110 i=1,6
                    if(curwdb(6:6).eq.postfix(i)) then
                        current = i
                    endif
```

Jul 20 13:31 1989 carc .f Page 7

```
  110           continue
                next = current + 1
  120           continue
                if(next .lt. 7 .and. detail(next) .ne. 1) then
                        next = next + 1
                        goto 120
                else
                        continue
                endif
                if(next.lt.7) then
                        curwdb(6:6) = postfix(next)
                        call chawdb(6,curwdb)
                        nextst = 3
                else
c                        call drwamp(' ',1)                  - decdet
c ----- updated 7/31/87 CSL                                 - decdet
                        call drwamp('Least detail already in use ',1)
                        nextst = 1
                endif
            else
c  ***          decrease detail
                do 130 i=1,6
                    if(curwdb(6:6).eq.postfix(i)) then
                        current = i
                    endif
  130           continue
                next = current + 1
  140           continue
                if(next .lt. 7 .and. detail(next) .ne. 1) then
                        next = next + 1
                        goto 140
                else
                        continue
                endif
                if(next.lt.7) then
                        curwdb(6:6) = postfix(next)
                        call chawdb(6,curwdb)
                        nextst = 3
                else
c                        call drwamp(' ',1)                  - decdet
c ----- updated 7/31/87 CSL                                 - decdet
                        call drwamp('Least detail already in use ',1)
                        nextst = 1
                endif
                call putwrd
            endif
        if (nextst.eq.initls) go to 100
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DECSCA
C
C FUNCTIONAL DESCRIPTION:
```

```
Jul 20 13:31 1989  carc  .f Page 8

C
C CALLED BY:                        STATEC
C
C PROGRAMMER:                       DATE OF LAST CHANGE     REASON FOR CHANGE
c  S. Lamb                    Feb 1988                command fix - decsca
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine decsca
c
c       this subroutine is the decrease scale state interpreter (24)
c
        common /states/ nextst
        logical wordis,iseoc
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
c
        initls = nextst
c       do until nextst not = initial state
  100   continue
            call getwrd
c * ** *** **** ***** ****** ******* change check order, etc.
            if (wordis('DETAIL')) then
                nextst = 22
            else if (wordis('SCALE').or.wordis('MAP')
     +               .or. iseoc()) then
c               decrease scale
                xrnmn = xrnm * 2. / 3.
                call chscal (xrnmn)
                nextst = 3
            else
c               decrease scale
                xrnmn = xrnm * 2. / 3.
                call chscal (xrnmn)
                call putwrd
                nextst = 3
            endif
        if (nextst.eq.initls) go to 100
c
        return
        end


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                       defkeys
c
c  Functional Description:
c       define default keys
c
c  Input Files/Parameters:
c
c  Output Files/Parameters: N/A
```

Jul 20 13:31 1989 carc .f Page 9

```
c
c  Subroutines/Functions Called:
c
c  Called By:                    FMAIN
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988                vax keys fix - defkeys
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine defkeys

       logical vax
       common /vaxdbc/ vax
       integer qfb(26),qmb(4),vaxqfb(26),vaxqmb(4),apqfb(26),apqmb(4)
       common /butons/ qfb,qmb
c*******VAX function key definitions
c       data vaxqfb/2,7,51,52,5,6,55,56,57,65,66,67,68,69,70,71,
c     +  76,83,4,75,81,77,3,80,84,8/
       data vaxqfb/2,7,51,52,5,6,55,56,57,65,66,67,68,69,70,71,
     +  76,83,4,75,81,77,2,80,84,8/
C     PICK,LEAVE(R),HELP,___
c       data vaxqmb/32,82,72,90/
C     PICK,HELP,LEAVE(R)___
       data vaxqmb/32,72,82,90/
c*******
c*******Apollo function key definitions
c       data apqfb/2,7,51,52,5,6,55,56,57,65,66,67,68,69,70,71,
c     +  76,83,4,75,81,77,3,80,84,8/
       data apqfb/1,7,51,52,5,6,55,56,57,65,66,67,68,69,70,71,
     +  76,83,4,75,81,77,2,80,84,8/
       data apqmb/1,2,3,4/
c*******


        if(vax) then
          do 20 i = 1,26
            qfb(i) = vaxqfb(i)
 20       continue
          do 30 i = 1,4
            qmb(i) = vaxqmb(i)
 30       continue
        else
          do 40 i = 1,26
            qfb(i)= apqfb(i)
 40       continue
          do 50 i = 1,4
            qmb(i) = apqmb(i)
```

Jul 20 13:31 1989 card .f Page 10

```
 50       continue
        endif

        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DGRID
C
C FUNCTIONAL DESCRIPTION:       .
C
C CALLED BY:                    DMAPII
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine dgrid (ipgrid,vmaxla,vminla,vmaxlo,vminlo,dotem,
     +  itproj)

c       call CARICATURE grid display subroutine

        call llgrid (ipgrid,vmaxla,vminla,vmaxlo,vminlo,dotem,itproj)

        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DIFTIM
C
C FUNCTIONAL DESCRIPTION:       .
C
C CALLED BY:                    CHKCLK
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine diftim(click,curdtg)
c
c this subroutines determines if a minute has gone off
c of the system clock since last call to getime.
c%include '/sys/ins/time.ins.ftn'

      logical click
c
c     curdtg is in yydddhhmm format- w/ ddd being julian date
c
      character*9 curdtg
      integer arsize
      integer yr
      integer mon
      integer day
      integer hour
```

Jul 20 13:31 1989 carc .f Page 11

```
      integer min
      integer juldat
      integer*2 oldtim(6)
      integer*2 newtim(6)
      common /ctimes/ oldtim,newtim
      integer yrsub
      integer monsub
      integer daysub
      integer hrsub
      integer minsub
      logical trackn
      common /trkdbc/ trackn

      data arsize /6/
      data yrsub  /1/
      data monsub /2/
      data daysub /3/
      data hrsub  /4/
      data minsub /5/

c
c get local time, then convert to yymmddhhmmss format
c dcode(5) is the minute slot.  check for a minute gone by
c if so, put new dcoded time into current decoded time.
c
c     print*,'diftim enter'

c     get current local time

      call gettim(newtim)

      click = .false.

      if (trackn) then
         print*,'oldtim/newtim= ',oldtim,newtim
      end if
      if ((newtim(yrsub) .gt. oldtim(yrsub)) .or.
     +          ((newtim(yrsub) .lt. oldtim(yrsub)) .and.
     +          (newtim(yrsub)-oldtim(yrsub) .ge. 99))) then
           click = .true.
           do 10 i=1,arsize
                 oldtim(i) = newtim(i)
 10        continue
      else if (newtim(yrsub) .eq. newtim(yrsub)) then
           if (newtim(monsub) .gt. oldtim(monsub)) then
              click = .true.
              do 20 i=1,arsize
                    oldtim(i) = newtim(i)
 20           continue
           else if (newtim(monsub) .eq. oldtim(monsub)) then
              if (newtim(daysub) .gt. oldtim(daysub)) then
                 click = .true.
                 do 30 i=1,arsize
                       oldtim(i) = newtim(i)
 30              continue
              else if (newtim(daysub) .eq. oldtim(daysub)) then
```

Jul 20 13:31 1989 car( .f Page 12

```
                 if (newtim(hrsub) .gt. oldtim(hrsub)) then
                    click = .true.
                    do 40 i=1,arsize
                          oldtim(i) = newtim(i)
 40                 continue
                 else if (newtim(hrsub) .eq. oldtim(hrsub)) then
                    if (newtim(minsub) .gt. oldtim(minsub)) then
                       click = .true.
                       do 50 i=1,arsize
                             oldtim(i) = newtim(i)
 50                    continue
                    endif
                 endif
              endif
           endif
      endif
c
c     get julian date in integer format from yr/mon/day
c

      yr =   oldtim(yrsub)
      mon =  oldtim(monsub)
      day =  oldtim(daysub)
      hour = oldtim(hrsub)
      min  = oldtim(minsub)
      call julian(yr,mon,day,juldat)
c
c     express curdtg in character format as yydddhhmm
c
      call chdate (yr,juldat,hour,min,curdtg)
      if (trackn) then
         print*,'curdtg= ',curdtg
      end if

      return
      end

C+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DISCEN
C
C FUNCTIONAL DESCRIPTION:       .
C
C CALLED BY:                    STATEC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine discen
c
c       this subroutine is the display center point state interpreter (7)
c
        common /states/ nextst
c       map parameters
        logical lton(16),dotem
```

Jul 20 13:31 1989 car( .f Page 13

```
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
      character * 105 errlin
      character*20 geostr
c
c     print*,'discen -- display current center point ',clat,clon
      call fmtgeo (clat,clon,geostr)
      errlin = 'Current center point is : ' // geostr
      call cerror(46,errlin)
      nextst = 1
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DISP1
C
C FUNCTIONAL DESCRIPTION:       .
C
C CALLED BY:
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine displ(msg, lenmsg, lineno)
c
c     display a single line in the communications area
c
      integer lenmsg, lineno
      character*(*) msg
      real qcxmn,qcymn,qcxmx,qcymx
      common/comwdo/qcxmn,qcymn,qcxmx,qcymx
      logical vax
      common /vaxdbc/ vax

      if (lenmsg .gt. 0) then
        if (vax) then
          call jmove(qcxmn+1,(qcymx-lineno+.1))
        else
          call jmove(qcxmn+1,(qcymx-lineno+.4))
        endif
        call jlstrg (msg(1:lenmsg))
      endif
      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   disp5
c
c  Functional Description:
c       display maxlin lines in sys area
```

```
c
c  Input Files/Parameters:
c
c  Output Files/Parameters: N/A
c
c  Subroutines/Functions Called:
c
c  Called By: help
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988                separate amp & sys - disp5
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine disp5(ifl,eof,eom)
c
c      subroutine to display requested maxlin lines of help msg
c
       logical frame
       common /frmdbc/ frame
       common /comwdo/ qcxmn,qcymn,qcxmx,qcymx
       logical eof,eom
       real qcxmn,qcymn,qcxmx,qcymx
       character cchar
       character*80 msg
       integer lenmsg
       integer qfb(26),qmb(4)
       common /butons/ qfb,qmb
       common /cmxlin/maxlin
c       data max/5/
       data icolcm/16/

c      set window and retained segment
c      print*,'in disp5'
c      if end of file, give error message
       if (eof) then
c          no msg for given #
           eom=.true.
           call mesg (195)
           call BUTTN(IBUT)
C  THE CALL TO PAWS WAS COMMENTED OUT DUE TO THE FACT THAT
C  A USER HITTING THE HELP KEY IN RESPONSE TO PAWS WOULD
C  CAUSE RECURSION SINCE PAWS WILL CALL HELP AGAIN.  -- GJF
c            call paws
           if (ibut.eq.qfb(23)) then
               call clrcom
               call mesg(47)
               call BUTTN(IBUT)
```

```
            endif
        else
            i=0
            call clrcom
            if (frame) then
c*******        temporarily do a jframe to make sure the area is clear
                call jframe
            endif
            call jwindo(qcxmn,qcxmx,qcymn,qcymx)
            call jopen
            call xsize(1.,1.)
            call xcolor(icolcm)
c           display up to maxlin lines of msg
100         continue
                read(ifl,1000,end=125,err=120)cchar,msg
1000            format(a1,a80)
                if (cchar.eq.'C'.or.cchar.eq.'c') go to 100
                if (cchar.eq.'M'.or.cchar.eq.'m') then
                    eom = .true.
                    go to 110
                endif
                i=i+1
c               print*,'disp=',msg
                call length(msg,80,lenmsg)
                call displ(msg, lenmsg, i)
c            if (i.ne.max) go to 100
            if (i.ne.maxlin) go to 100
110         continue
            go to 130
120         continue
                print*,'read error on message file'
                go to 130
125         continue
                eof=.true.
130         continue
            call jclose
        endif
c       print*,'end disp5'
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DISPRO
C
C FUNCTIONAL DESCRIPTION:        .
C
C CALLED BY:                     STATEC
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine dispro
c
c       this subroutine is the display projection state interpreter (5)
```

Jul 20 13:31 1989 car( .f Page 16

```
c
        common /states/ nextst
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        character * 105 errlin
        character*23 proj(7)
        integer lenpro(7)
        data lenpro/8,23,18,12,11,15,8/
        data proj/'Gnomonic',
     +            'Orthographic Equatorial',
     +            'Orthographic Polar',
     +            'Orthographic',
     +            'Perspective',
     +            'Equirectangular',
     +            'Mercator'/
c
c       print*,'dispro -- display current projection ',itproj
        errlin = 'Current projection is : ' // proj(itproj)
        lenlin = 24 + lenpro(itproj)
        call cerror(lenlin,errlin)
        nextst = 1
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      DISSCA
C
C FUNCTIONAL DESCRIPTION:         .
C
C CALLED BY:                      STATEC
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine dissca
c
c       this subroutine is the display scale state interpreter (6)
c
        common /states/ nextst
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        character * 105 errlin
        character * 7 chasca
c
c       print*,'dissca -- display current scale ',xrnm
```

Jul 20 13:31 1989 carc .f Page 17

```
        write (chasca,1100,err=190) xrnm
 1100   format (f7.0)
            errlin = 'Current scale is : ' // chasca
            lenlin = 26
            if (itproj.eq.6.or.itproj.eq.7) then
                errlin = errlin(1:lenlin) // ' minutes.'
                lenlin = lenlin + 9
            else if (itproj.eq.5) then
                errlin = errlin(1:lenlin) //
     +          ' nautical miles altitude.'
                lenlin = lenlin + 25
            else
                errlin = errlin(1:lenlin) //
     +          ' nautical miles at center.'
                lenlin = lenlin + 26
            endif
            call cerror(lenlin,errlin)
  190   continue
        nextst = 1
c
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DISTXT
C
C FUNCTIONAL DESCRIPTION:        .
C
C CALLED BY:                     TXWRIT
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine distxt(txtseg,txline,page,lpp,lcnt)
c
c       this subroutine displays the textual data
c       for one page of data in the txline array
c
        integer txtseg
        integer lpp
        integer lcnt
        integer page
        character*80 blanks
        character*80 txline(*),line
        real y
        integer frstln
        integer lstlin
        integer*4 nchars

        blanks = ' '
        nchars = 80

c       First line # is set equal to first line in current page.
```

Jul 20 13:31 1989 carc .f Page 18

```
      frstln = (page - 1) * lpp + 1
c     Last line # is set to frstln + lpp - 1 or qlast, whichever is less.
      if(( frstln + lpp - 1).lt.lcnt ) then
           lstlin = frstln + lpp - 1
      else
           lstlin = lcnt
      endif

      y = 160.
      call jropen(txtseg)
      call jsize(5.,5.)
c
c     this is gold text on a color node
c
      call xcolor(16)
      do 100 i= frstln, lstlin
           line = txline(i)
           call jmove(-180.,y)
           call j1strg(line(1:nchars))
           y = y - 10.
 100  continue
      call jrclos
      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    doverl
c
c  Functional Description:
c       draw overlay features on map background
c
c  Input Files/Parameters:
c
c  Output Files/Parameters: N/A
c
c  Subroutines/Functions Called:
c
c  Called By: mapper
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988             separate amp & sys - doverl
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine doverl (ltypov,ltonov)
```

Jul 20 13:31 1989 carc .f Page 19

```
c       draw overlay features on map background
c
c       ltypov  This is a table of 16 variables containing an integer
c               value representing line type for overlay features.
c               The categories are as follows:
c                    1    Overlay data feature
c                    2    Direction finding feature
c                    3    Tracking data feature
c                    4    Gazeteer
c                    5
c                    6
c       ltonov  Table of 16 logical values.  Determines whether the
c               line types referenced by ltypov are to be displayed
c
        integer secnds
        logical ltonov(16)
        dimension ltypov(16)
        character*80 ovfnam
        common /ovfnam/ ovfnam
        common /lenovf/ lenovf

c**   seg numbers for overlay and df
        integer ovseg, dfseg
        common /OVSEGS/ ovseg, dfseg
        logical BEGTRK
        integer trakfd
        common /TRACK/ trakfd,BEGTRK
        INTEGER SEGNO,FIRSEG
        COMMON /SEGNO/ SEGNO,FIRSEG
        common /gphwdo/xllgeo,yllgeo,xurgeo,yurgeo
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        common /vmaxmn/ VMAXLA,VMINLA,VMAXLO,VMINLO


        data lcover/1/,lcdf/2/,lctrak/3/,lcgaz/4/
        DATA LSCALE/15/
        data secnds /0/

        IF (LTON(LSCALE)) THEN
            LTYPE=LTYPTB(LSCALE)
            call mesg(265)
            call gravpt
            call geowin
            call xcolor(ltype)
            CALL SCLRET
        ENDIF
        if (ltonov(lcover)) then
            ltype=ltypov(lcover)
            call mesg(250)
            call gravpt
```

```
            call geowin
            call getseg(ovseg)
            call jropen(ovseg)
            call xcolor(ltype)
            call pltovp(xrnm,ovfnam,lenovf)
            call jrclos
        endif
        if (ltonov(lcdf)) then
            ltype=ltypov(lcdf)
            call mesg(1210)
            call gravpt
            call geowin
            call getseg(dfseg)
            call jropen(dfseg)
            call xcolor(ltype)
            call pltovp (xrnm,'df.dat',6)
c            call jrclos
        endif

c       print*,'doverl -- ',xllgeo,yllgeo,xurgeo,yurgeo

        if (ltonov(lctrak)) then
            call jrclos
            call gravpt
            call geowin
            call replay (secnds)
        endif
c       if (ltonov(lcgaz)) then
c           LTYPE=ltypov(lcgaz)
c           call gltype(ltype,lcgaz)
c           call pltgaz (xrnm,.true.,.false.)
c       endif
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: drawel
C
C FUNCTIONAL DESCRIPTION:  THIS SUBROUTINE DRAWS THE ELLIPSE OF 95% CONFIDENCE.
C
C INPUT FILES/PARAMETERS:
C
C GLOBAL VARIABLES :             noelpl  - draw ellipse plus flag
C
C OUTPUT FILES/PARAMETERS:  NONE.
C
C SUBROUTINES/FUNCTIONS CALLED :
C
C CALLED BY:                     PLOTOV
C
C LOCAL VARIABLES: NONE.
C
C RESTRICTIONS: NONE.
C
C ABNORMAL RETURN CONDITIONS:   NONE.
```

Jul 20 13:31 1989 card f Page 21

```
C
C LOCATION:
C
C PROGRAMMER:                    DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE DRAWEL(BPELAT,BPELON,SMA,SMI,AZIMTH)

C ----- THIS SUBROUTINE DRAWS THE ELLIPSE OF 95% CONFIDENCE.

      LOGICAL INVAL,INVIS,NEWONS,NEWSEQ

      REAL MAXANG

      logical noelpl
      common /noelpl/ noelpl

      DATA DTR/.01745329/
      DATA EARTHR/3443.922/
      DATA PI/3.14159/

      MAXANG = MIN(PI/6.,PI/6.*25.*SMI/SMA)

      AZ = AZIMTH*DTR

      NEWSEQ = .TRUE.

      SINLAT = SIN(BPELAT)
      COSLAT = COS(BPELAT)
      AB = SMA*SMI
      A2 = SMA*SMA
      B2 = SMI*SMI

      DELTA = AB*2.0*PI/60

      O = 0.0
   10 CONTINUE

      SINO = SIN(O)
      COSO = COS(O)

      RNM = AB / SQRT(A2*SINO*SINO + B2*COSO*COSO)
      R = RNM / EARTHR

      SINR = SIN(R)
      COSR = COS(R)

      V = ASIN(COSR*SINLAT + SINR*COSLAT*COS(AZ+O))
      U = BPELON + ASIN(SIN(AZ+O)*SINR/COS(V))

      INVAL = .FALSE.
```

Jul 20 13:31 1989 carc .f Page 22

```
        CALL LLINXY (V,U,X,Y,INVAL,INVIS,NEWONS)
        IF (INVIS) THEN
           NEWSEQ = .TRUE.
        ELSE
           IF (NEWSEQ) THEN
              CALL JMOVE (X,Y)
           ELSE
              CALL JDRAW (X,Y)
           ENDIF
           NEWSEQ = .FALSE.
        ENDIF

        IF (O.LT.2.0*PI) THEN
           DELO = DELTA / RNM / RNM
           DELO = MIN(MAXANG,DELO)
           O = O + DELO
           GO TO 10
        ENDIF

        INVAL = .FALSE.
        CALL LLINXY (BPELAT,BPELON,X,Y,INVAL,INVIS,NEWONS)
c        IF (.NOT.(INVIS)) THEN
        if ((.not.invis) .and. (.not.noelpl)) then
           XX = X - 3.0
           YY = Y
           CALL JMOVE (XX,YY)
           XX = X + 3.0
           CALL JDRAW (XX,YY)
           XX = X
           YY = Y + 3.0
           CALL JMOVE (XX,YY)
           YY = Y - 3.0
           CALL JDRAW (XX,YY)
        ENDIF

        CALL FLUSHB

        RETURN
        END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      DRAWF
C
C FUNCTIONAL DESCRIPTION:         .
C
C CALLED BY:                      DRWFTR, FDFPRO, FTRCON, OVRCON
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE DRAWF(IFTR)

C       DRAWS A SPECIFIC MAP FEATURE
```

Jul 20 13:31 1989 car( '.f Page 23

```
      LOGICAL QLTON(16),QDOTEM
      INTEGER QPGRID(4),QTYPTB(16)
      INTEGER QLEVEL,QITPRO,QIRES,QLUNDA,QLUNIN,QLUNLI
      REAL QXRNM,QXC,QYC,QCLAT,QCLON,QXRAD,QYRAD,QORHAL
      COMMON /MAP/ QXRNM,QXC,QYC,QLEVEL,QCLAT,QCLON,QXRAD,QYRAD,
   +      QITPRO,
   +      QIRES,QTYPTB,QLUNDA,QLUNIN,QLUNLI,QLTON,QPGRID,QDOTEM,
   +      QORHAL

      INTEGER QNMPTS,QSHADE(60)
      REAL QLATT(60),QLONN(60)
      COMMON /FILLS/ QNMPTS,QLATT,QLONN,QSHADE
      LOGICAL LTON(16)
      logical ltovsv(16)
      dimension ltypov(16)
      logical ltonov(16),rankt(26,16)
      logical pflag
      COMMON /maptoo/ ltypov,ltonov,rankt
      logical map
      common /mapdbc/ map

      logical issegm
      INTEGER SEGNO,FIRSEG
      COMMON /SEGNO/ SEGNO,FIRSEG
      INTEGER CNAME,PBOUND
      INTEGER FPTS

c** featrs is common to pltnam routine for drwing
c** area names without redrawing any boundries.

      logical featrs(16), indrwf
      COMMON /pltftr/ featrs, indrwf
      logical filply,opnply
      common /polycb/ filply,opnply

      DATA CNAME/10/,PBOUND/2/
      DATA INDRWF /.TRUE./

          if (issegm(iftr+firseg)) then
             IF (map)
   +           PRINT*,'IN DRAWF PURGING',FIRSEG+IFTR
             CALL JPURGE(FIRSEG+IFTR)
      ENDIF

      DO 50 I=1,16

         LTON(I) = QLTON(I)
         featrs(i) = QLTON(I)
         ltovsv(i) = ltonov(i)
         QLTON(I) = .FALSE.
         ltonov(i) = .false.

 50   CONTINUE

c**   temporarily turn off poly flag
```

```
        pflag = filply
        filply = .false.

        IF (IFTR .LE. 16) THEN
             QLTON(IFTR) = .TRUE.
        ELSE
             LTONOV(IFTR - 20) = .TRUE.
        ENDIF

C**     IF POLITICAL BOUNDARIES ARE BEING TURNED ON AND
C**     COUNTRY NAMES ARE ON, COUNTRY NAMES WILL BE
C**     DRAWN INSTEAD OF CONTINENT NAMES.

c        IF ((IFTR.EQ.PBOUND).AND.(LTON(CNAME))) THEN
c           IF (.NOT.(LTON(PBOUND))) THEN
c            CALL JPURGE(FIRSEG + CNAME)
c            QLTON(CNAME) = .TRUE.
c           ENDIF
c        ENDIF

C**     COUNTRY NAMES WILL ONLY BE DRAWN IF POLITICAL
C**     BOUNDARIES ARE TURNED ON.  IF POLITICAL BOUNDARIES
C**     ARE NOT ON, JUST CONTINENT NAMES WILL BE DRAWN.

c        IF ((IFTR.EQ.CNAME).AND.(LTON(PBOUND))) THEN
c            CALL JPURGE(FIRSEG + PBOUND)
c            QLTON(PBOUND) = .TRUE.
c        ENDIF

        FPTS = QNMPTS
        QNMPTS = 0
        if (issegm(firseg)) then
            call jpurge(firseg)
        endif

        CALL MAPPER (.true.)

        DO 20 I=1,16

           QLTON(I) = LTON(I)
           ltonov(i) = ltovsv(i)

  20    CONTINUE

c**     turn poly flag back on

        filply = pflag

        QNMPTS = FPTS
        IF (IFTR .LE. 16) THEN
             QLTON(IFTR) = .TRUE.
        ELSE
             LTONOV(IFTR - 20) = .TRUE.
        ENDIF
        RETURN
        END
```

Jul 20 13:31 1989 card f Page 25

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DRAWFT
C
C FUNCTIONAL DESCRIPTION:       .
C
C CALLED BY:                    STATEC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine drawft
c
c       this subroutine is the draw feature state interpreter (8)
c
        common /states/ nextst
        common /indpar/ indpro,indftr
c
        call drwftr (indftr)
        nextst = 1
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DRAWIT
C
C FUNCTIONAL DESCRIPTION:       .
C
C CALLED BY:                    DRWMAP
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE DRAWIT

C       THIS SUBROUTINE ERASES THE MAP AREA AND CALLS MAPPER

        CALL CLRGRA
        CALL MAPPER (.true.)
        CALL MAPOVR

        RETURN
        END

C+*+*+*+*+*+*+*+*+*+*+*+*+*+*+*+*+*+*+*+*+*+*+*+*+*+*+*+*+*+*+*+*+*+*+*|*+*+*+*+
C* UNIT NAME:                   drawm
C*
C* FUNCTIONAL DESCRIPTION:
C*
C*      This subroutine creates a menu segment from a segment file
```

```
Jul 20 13:31 1989  car   .f Page 26

C*     and/or displays that/a segment in the menu area.
C*
C*
C* INPUT FILES/PARAMETERS:
C*
C*     Global Variables
C*       qcrmnu           integer; contains the current menu number
C*       qdarry     logical array; contains flags which show if a
C*                                 particular menu segment has been
C*                                 created
C*       qmxary           integer; contains the size of the qdarry array
C*       qmnum            integer; contains the number of the current
C*                                 menu on the screen when the drawm
C*                                 subroutine is called
C*       qoldm            integer; contains the number of the previous
C*                                 menu displayed
C*
C* OUTPUT FILES/PARAMETERS:
C*
C*       values in the global variables described above
C*
C*     Screen change
C*
C*       menus will be displayed and erased by this routine
C*
C* RESTRICTIONS:
C*
C*       The value in the variable qcrmnu must be within the range of
C*     the array qdarry.
C*
C* SUBROUTINES CALLED:
C*
C*       creatm          subroutine; creates menu segments
C*
C*       mesg            subroutine; places an appropriate message
C*                                   in the communications area
C*
C* CALLED BY:                    FCFILL, PRTMEN, RESCON, RPLSCN, SUBCAL
C                                INIPIC
C*
C* LOCAL VARIABLES:
C*
C*       no local variables
C*
C* ABNORMAL RETURN CONDITIONS:
C*
C*       A system error will occur if the value in the variable qcrmnu
C*       is not within the range of the array qdarry.
C*
C* LOCATION:
C*
C*       /u2/vcn/a21proto/drawm
C*
C* PROGRAMMER:              DATE OF LAST CHANGE:    REASON FOR CHANGE:
C*
C*  VCNewton                  15 August 1983         initial entry
```

Jul 20 13:31 1989 carc .f Page 27

```
C*  L. McCleary             Jan 1988          sep amp & seg - drawm
C*
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      Subroutine DRAWM (menun,ierror)

C     This subroutine creates a menu segment or makes it visible

         Integer qcrmnu,qmxary,qmnum,qoldm
         Integer qdarry(500)
         Common /b3/ qdarry,qmnum,qoldm
         Common /b6/ qcrmnu
         Common /b8/ qmxary

         ierror = 0
C        (**Ensure qcrmnu value falls within the range of the array**)
C        (**qdarry                                                 **)
c         print*,'DRAWM -- enter  menun,qcrmnu,qmxary = ',menun,qcrmnu,
c     +   qmxary
         mensav = qcrmnu
         If(menun .eq. 0)menun = 1
         If ((menun .gt. 0) .and. (menun .le. qmxary)) then
C           (**Ensure a menu is displayed before turning**)
C           (**visibility off                           **)
            If (qcrmnu .gt. 0) Call JVISBL(qcrmnu,0)
c           print*,'after visible',qcrmnu

c           (**Erase menu area**)
C           call clrmen

C****** ERASE ALL HIGHLIGHTS FROM LAST MENU
C****** SINCE HIGHLIGHTS ARE NOW RETAINED SEGMENTS

            CALL CLRHIL

c           (**Erase menu area**)
            call clrmen

            If (qdarry(menun) .eq. 0) then
C              (**Create menu segment from file**)
               Call CREATM(menun,ierror)
               if (ierror.eq.0) then
C                 (**Set qdarry location to true to show a segment for**)
C                 (**that menu has been created                       **)
                  qdarry(menun)=1
               else
C                 (**If a problem was found with the new menu file,**)
C                 (**retain the old menu                           **)
                  call JVISBL(qcrmnu,1)
               endif
            Else
C              (**Display new menu if new menu's segment was already**)
C              (**created                                           **)
               Call JVISBL(menun,1)
            Endif
         Else
```

Jul 20 13:31 1989 car ɾ.f Page 28

```
            ierror = 215
            print*,'Menu number',menun,' is outside range of array : ',
     +      qmxary
C           (**Execute system error process**)
            call mesg(ierror)
            call paws
         Endif
         if (ierror.eq.0) qcrmnu = menun
c         print*,'DRAWM -- exit ierror = ',ierror
      End


C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      DRAWST
C
C FUNCTIONAL DESCRIPTION:         .
C
C CALLED BY:                      STATEC
C
C PROGRAMMER:                     DATE OF LAST CHANGE     REASON FOR CHANGE
c  S. Lamb                      Feb 1988                command fix - drawst
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine drawst
c
c       this subroutine is the draw state interpreter (2)
c
        common /states/ nextst
        logical sketch,majorf,minorf
        common /statel/ sketch,majorf,minorf
        logical wordis,iseoc
        logical isfeat,isincr,isdecr,isarea,iscoor
c
        initls = nextst
c       do until nextst not = initial state
  100   continue
            call getwrd
            if (iseoc()) then
                nextst = 3
            else if (wordis('CURRENT').or.wordis('THE').or.
     +          wordis('ME').or.wordis('MAP')) then
c * ** *** **** ***** ****** ******* draw current map
                nextst = 3
            else if (wordis('MAJOR').or.wordis('LARGE')) then
                majorf = .true.
                nextst = 9
            else if (wordis('MINOR').or.wordis('SMALL')) then
                minorf = .true.
                nextst = 10
            else if (wordis('WHAT').or.wordis('CURRENT')) then
                nextst = 4
            else if (wordis('PROJECTION')) then
                nextst = 5
            else if (wordis('SCALE')) then
                nextst = 6
```

```
            else if (wordis('CENTER')) then
                nextst = 7
            else if (iscoor()) then
                nextst = 19
            else if (isfeat()) then
                nextst = 8
            else if (wordis('MORE')) then
                nextst = 21
            else if (wordis('LESS')) then
                nextst = 22
            else if (isincr()) then
                nextst = 23
            else if (isdecr()) then
                nextst = 24
            else if (isarea()) then
                nextst = 11
            else
                nextst = 20
            endif
        if (nextst.eq.initls) go to 100
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DRCMAP
C
C FUNCTIONAL DESCRIPTION:        .
C
C CALLED BY:                     STATEC
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine drcmap
c
c       this subroutine is the draw current map state interpreter (3)
c
        common /states/ nextst
        logical sketch,majorf,minorf
        common /statel/ sketch,majorf,minorf
c
        call drwmap
        nextst = 1
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    dricon
c
c  Functional Description:
c       this subroutine draws the icon named in the text string textst
```

Jul 20 13:31 1989 car( .f Page 30

```
c       with the scale in scalef (1.0 is normal).
c       This subroutine has been temporarily coded for drawing
c       only filled RECTANGLES.
c
c  Input Files/Parameters:
c       icol2 is the interior color index number
c       len is the length of textst
c
c  Output Files/Parameters: N/A
c
c  Subroutines/Functions Called:
c      Note: Subroutines preceded by a "j" are explained in the DI-3000 manual.
c
c  Called By:                     CREATM
c
c  Local Variables: N/A
c
c  Restrictions: N/A
c
c  Abnormal Return Conditions:  N/A
c
c  Location:      /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine dricon (len,textst,icol2,scalef)

c       this subroutine draws the icon named in the text string textst

        character*(*) textst

c       print*,'dricon -- enter ',len,textst(1:len),'  ',icol2,scalef

        call jpintr (1)
        call xpidex (icol2,0)
        call jrrect (3.,3.)

        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     drlnmn
c
c  Functional Description:
c       This subroutine draws the line indicated by the device-dependent
c       linestyle in the linestyle menu.
c       This routine is a special case.
c
c  Input Files/Parameters:
c       icol2 is the device-dependent linestyle
c
c  Output Files/Parameters: N/A
```

```
c
c  Subroutines/Functions Called:
c      Note: Subroutines preceded by a "j" are explained in the DI-3000 manual.
c
c  Called By: creatm
c
c  Local Variables: N/A
c
c  Restrictions: N/A
c
c  Abnormal Return Conditions:  N/A
c
c  Location:
c
c  Programmer         Date of Last Change       Reason for Change
c
c    avw              30 May 1985               Initial entry
c
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine drlnmn (lstyl)

c       this subroutine draws the line indicated by lstyl

        integer           lstyl

c       print *, 'drlnmn -- enter - lstyl = ', lstyl

        call jlstyl (lstyl - 1)
        call jrdraw (7.5, 0.)
        call jlstyl (0)

        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: droutl
C
C FUNCTIONAL DESCRIPTION:  THIS SUBROUTINE DRAWS THE EARTH OUTLINE FOR
C                                  ORTHOGRAPHIC PROJECTIONS
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                       NO LONGER USED BY CARICATURE
C
C LOCAL VARIABLES: NONE.
C
C RESTRICTIONS: NONE.
```

Jul 20 13:31 1989 car .f Page 32

```
C
C ABNORMAL RETURN CONDITIONS:   NONE.
C
C LOCATION:
C
C PROGRAMMER:                  DATE OF LAST CHANGE     REASON FOR CHANGE
C
C     DAVE NATION                                      ORIGINAL CODE.
C     JERRY FENERTY                                    DOCUMENT AND MODIFY
C                                                      FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE DROUTL(ITPRO,LONINC,LATINC,CLO,CLA)

C       THIS SUBROUTINE DRAWS THE EARTH OUTLINE FOR ORTHOGRAPHIC PROJECTIONS

        COMMON /PROJT/ IGNOMN,IORTEQ,IORTPO,IORTHO,IPERSP
        COMMON /PROJT2/ IEQREC,IMERCA,ILAMCN
        COMMON /VIEWP/ XRAD,YRAD,IXNP,IYNP,XC,YC
        COMMON /CONST/ MAXVAL,RMPV,C,R,ERNM
        COMMON /PIE/ PIE,TPIE,PIO2,PIO4
        common /comgra/xllgra,yllgra,xurgra,yurgra,ibcgra,iocgra,incgra

C ----- POLYGON INTERIOR STYLE = FILLED
        CALL JPINTR (1)

C ----- POLYGON EDGE STYLE = SAME AS INTERIOR
        CALL JPEDGE (1)

        IF (ITPRO.EQ.IGNOMN) THEN
            CX1 = -XRAD
            CY1 = -YRAD
            CX2 = XRAD
            CY2 = YRAD
            GO TO 785
        ENDIF
        IF (ITPRO.EQ.IORTPO) THEN
            if (cla .ge. 0.0) then
              CALL LLTOXY(PIO2,0.,CX,CY)
            else
              CALL LLTOXY(-PIO2,0.,CX,CY)
            endif
            CALL LLTOXY(0.,0.,RX,RY)
            GO TO 760
        ENDIF
        IF (ITPRO.EQ.IORTEQ) THEN
            CALL LLTOXY(0.,CLO,CX,CY)
            CALL LLTOXY(PIO2,0.,RX,RY)
            GO TO 760
        ENDIF
        IF (ITPRO.EQ.IORTHO) THEN
            CX = 0.
            CY = 0.
            IF (CLA.GT.0) THEN
                RCLA = CLA - PIO2
```

```
            ELSE
                RCLA = CLA + PIO2
            ENDIF
            CALL LLTOXY(RCLA,CLO,RX,RY)
            GO TO 760
        ENDIF
        IF (ITPRO.EQ.IPERSP) THEN
            CX = 0.
            CY = 0.
            RX = XRAD
            RY = 0.
            GO TO 760
        ENDIF
        IF (ITPRO.EQ.IEQREC) THEN
            APXPI = PIE - .01
            CALL LLTOXY(89.*60.*C,CLO-APXPI,CX1,CY1)
            CALL LLTOXY(-89.*60.*C,CLO+APXPI,CX2,CY2)
            GO TO 785
        ENDIF
        IF (ITPRO.EQ.IMERCA) THEN
            APXPI = PIE - .01
            CALL LLTOXY(89.*60.*C,CLO-APXPI,CX1,CY1)
            CALL LLTOXY(-89.*60.*C,CLO+APXPI,CX2,CY2)
            GO TO 785
        ENDIF
        if (itpro.eq.ilamcn) then
            apxpi = pie - .001
            call lltoxy(pio2,clo+apxpi,cx1,cy1)
            call lltoxy(-pio2,clo+apxpi,cx2,cy2)
            call lltoxy(-pio2,clo-apxpi,cx3,cy3)
            call lltoxy(pio2,clo-apxpi,cx4,cy4)
            go to 788
        endif
        GO TO 790

cccccccccccccccccccccccccccccccccccccccccccccccccccccccccccccccccccccccc
C               EXIT HERE TO DRAW A CIRCLE
  760       CONTINUE
                RAD=SQRT((CX-RX)**2+(CY-RY)**2)
                RCX=CX
                RCY=CY
c               add fudge factor, the circle needs to be a little larger
                RAD = RAD + 0.5
                CALL JCIRCL(RCX,RCY,0.,RAD,0)
cccccccccccccccccccccccccccccccccccccccccccccccccccccccccccccccccccccccc

        GO TO 790
  785   CONTINUE
C                       DRAW RECTANGLE
        CALL JRECT (CX1, CY1, CX2, CY2)
        go to 790

  788   continue
c         draw wedge
        call jrect (-xrad, -yrad, xrad, yrad)
        call xcolor(iocgra)
```

```
        call jmove(cx1,cy1)
        call jdraw(cx2,cy2)
        call jdraw(cx3,cy3)
        call jdraw(cx4,cy4)

  790   CONTINUE
c       draw box around graphics area in case circle has erased it
        call xcolor (iocgra)
        call jmove (xrad,yrad)
        call jdraw (xrad,-yrad)
        call jdraw (-xrad,-yrad)
        call jdraw (-xrad,yrad)
        call jdraw (xrad,yrad)

        RETURN
        END

C+*+*+*+*+*+*+*+*+*+*+*+*+*+*+*+*+*+*+*+*+*+*+*+*+*+*+*+*+*+*+*+*+*|*+*+*+*+
c  UNIT NAME:                  drwamp
c
c  Functional Description:
c       draw amplification area
c
c  Input Files/Parameters:
c
c  Output Files/Parameters: N/A
c
c  Subroutines/Functions Called:
c
c  Called By:                  CERROR, DECDET, DISTAN, INCDET,
C                              MESSAG, PLTOVP, SCRDIA, GMCLOS
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988               separate amp & sys - drwamp
c  S. Lamb         Feb 1988               detec chg - drwamp
c
C-*-*-*-*-*-*-*-*-*-*-*-*-*-*-*-*-*-*-*-*-*-*-*-*-*-*-*-*-*-*-*-*-*-*|*-*-*-*-
c
      subroutine drwamp(amptxt,ampcnt)
c
c*** This routine draws the amplification area for messages
c*** to be displayed
        integer ampcnt
        character*72 amptxt(4),line

c        common/comwdo/qcxmn,qcymn,qcxmx,qcymx
c        real qcxmn,qcymn,qcxmx,qcymx
```

```
      common/ampwdo/qaxmn,qaymn,qaxmx,qaymx
      real qaxmn,qaymn,qaxmx,qaymx

      common /comcvp/ xllcvp,yllcvp,xurcvp,yurcvp
      common /compic/xllpic,yllpic,xurpic,yurpic
      common /comamp/xllamp,yllamp,xuramp,yuramp,ibcamp,iocamp,incamp
      common /amfrst/ amfrst
      logical amfrst
      real xpos,ypos
      common/ampprm/ampseg,ampsgb
      integer ampseg,ampsgb
      integer dstsg1,dstsg2,dstsg3
      logical dstfst
      common/mrkseg/dstsg1,dstsg2,dstsg3,dstfst
      logical square
      common /sqrdbc/ square
      common/oneflg/oneflg
      logical oneflg

c      print*,'drwamp ---enter',amptxt(1)

C     call comvpt
C     call comwin
      call ampvpt
      call ampwin

c      xllpic=qcxmn+13.
c      yllpic=qcymn+.5
c      xurpic=qcxmx-13.
c      yurpic=qcymx-3.
      xllpic=qaxmn
      yllpic=qaymn
      xurpic=qaxmx
      yurpic=qaymx
c
c      print*,'xllpic ---',xllpic
c      print*,'yllpic ---',yllpic
c      print*,'xurpic ---',xurpic
c      print*,'yurpic ---',yurpic

      if (.not. amfrst)call jpurge(ampseg)

      if(amfrst)then
c          print*,'drwamp --- amfrst being set to false'
          amfrst = .false.
          call getseg(ampseg)
          call getseg(ampsgb)
c
          call jropen(ampsgb)
          call jpkid(0)
          call jpintr (1)
          call xpidex(ibcamp,0)
c
c      print*,'drwamp ampseg-- ',ampseg
c
          if(oneflg)then
```

Jul 20 13:31 1989 car ;.f Page 36

```
                    call enall
                    call xcolor(3)
            else
c                    call xcolor(24)
                    call xcolor(iocamp)
            endif
c
            call jrect(xllpic,yllpic,xurpic,yurpic)
            call jrclos
        else
            call jvisbl(ampsgb,0)
            call jvisbl(ampsgb,1)
        endif
c
        call jropen(ampseg)
        call jpkid(1)
        if (ampcnt.eq.0) go to 100
        if(oneflg)then
                call enall
                call xcolor(3)
        else
c                call xcolor(24)
                call xcolor(iocamp)
        endif
        call jfont(1)
        IF (.not. square) call jsize(2.,2.)
        CALL XSIZE(1.0,1.0)
        call jbase(1.0,0.0,0.0)
        call jplane(0.0,1.0,0.0)
        call jpath(1)
        call jjust(1,1)
c
        xpos = xllpic + 1.
c        ypos = yurpic - (yurpic - yllpic)/(ampcnt+1.)
        ypos = yurpic - 1.0

c        print*,'xpos ---',xpos
c        print*,'ypos ---',ypos

        call lngth(amptxt(1),72,length)
c        print*,'length of amptxt1 ',length
        call jmove(xpos,ypos)
c
        line = amptxt(1)
        call jlstrg(line(1:length))
c
        if(ampcnt .gt. 1) call putamp(amptxt,ampcnt)
        if(.not.(oneflg))call soverl
c
c        print*,'drwamp --- exit'

  100   continue
        call jrclos
        call jdetec(ampseg, 1)
        return
        end
```

Jul 20 13:31 1989 car ·.f Page 37

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DRWFTR
C
C FUNCTIONAL DESCRIPTION:       .
C
C CALLED BY:                    DRAWFT, ERASES, REMOVF
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine drwftr (if)
        call drawf (if)
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DRWICN
C
C FUNCTIONAL DESCRIPTION:       .
C
C CALLED BY:                    GETICN
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine drwicn(filcol,outcol)

c       This routine is the same as the drawic routine used by the
c         Icon Editor, except for option 10 which is the fill
c         option for the entire icon.  Each line of the opened
c         file is read and the appropriate routine is called based
c         on the contents of the first position.  The array read
c         in is passed to the routine and that routine will read
c         any other lines which are needed for that line, etc.
c         to be drawn, so that this routine will always read the
c         first line of the next item to be drawn.
c       VARIABLES:
c        iarray- array to hold the points read in from the file
c        filcol - index of color to be used for fill
c        outcol- index of outline color--used for regular fills
c   CALLS:     apline apcirc aprect apfill apmark apsmoo aptext aparcs
c   PROGRAMMER:  Nancy Detrich, A215, March, 1984

      integer iarray(26,100)
      character*40 ictarr(100)
      common /iconda/ lenica,iarray,ictarr
      integer filcol,outcol
      logical sys,fill
      common /sysdbc/ sys
      common /fildbc/ fill
```

```
Jul 20 13:31 1989  car(   .f Page 38

      if (sys) then
         print*,'DRWICN -- enter ',lenica
      endif

      if (lenica.gt.0) then
       do 120 i=1,lenica

c        iarray(i,1) holds the code indicating how the coordinates
c          are to be interpreted--call appropriate routine and
c          pass iarray and a flag to indicate if a line is to be
c          written out to the '.conv' file

         if      (iarray(1,i).eq.1) then
           call apline  (iarray(1,i),.false.)
         else if (iarray(1,i).eq.2) then
           call apcirc  (iarray(1,i),.false.)
         else if (iarray(1,i).eq.3) then
           call aprect  (iarray(1,i),.false.)
         else if (iarray(1,i).eq.4) then
           if (fill) then
               call apfill  (iarray(1,i),.false.,outcol)
           endif
         else if (iarray(1,i).eq.5) then
           call apmark  (iarray(1,i),.false.)
         else if (iarray(1,i).eq.6) then
           call apsmoo  (iarray(1,i),.false.)
         else if (iarray(1,i).eq.7) then
           call aptext  (iarray(1,i),.false.,ictarr(i),nchars)
         else if (iarray(1,i).eq.8) then
           call aparcs  (iarray(1,i),.false.)
         else if (iarray(1,i).eq.9) then
           call xcolor(iarray(2,i))
         else if (iarray(1,i).eq.10) then
c         check that a fill is to be performed
          if (filcol .ne. 0) then
c           for the prototype, call xcolor
            if (fill) then
                call apfill(iarray(1,i),.false.,filcol)
            endif
          endif
         else
c           ignore unidentified lines
         endif
  120  continue
      endif
      if (sys) then
         print*,'DRWICN -- exit '
      endif

      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DRWLOB
C
```

```
Jul 20 13:31 1989  carc  .f Page 39

C FUNCTIONAL DESCRIPTION:          .
C
C CALLED BY:                       PLOTOV
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine drwlob (blat,blon,bazi,digrph,xrnm,itproj,iacept)
c
c       this subroutine draws a line of bearing on the current map
c
        character*2 digrph
        integer iacept

c ----- rlenth = length of 90 degrees in radians
        data rlenth/1.5708/

c ----- ernm = radius of earth in nautical miles
        data ernm/3440.34/

c ----- steps = no. of increments of bearing to put in half
c ----- a screen width
        data steps/20/

c ----- xrnm = radius of map in nautical miles

c       print*,'drwlob -- enter ',xrnm,blat,blon,bazi
c
        if (iacept.eq.1) then
            steps = 20.
        else
            steps = 60.
        endif

c ----- calculate length of increments in radians
        rinc = xrnm / (ernm*steps)

        call plotit(blat,blon,digrph,bazi,rlenth,rinc,xrnm,
     +              itproj,iacept)

c       print*,'drwlob -- Exit'
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       DRWMAP
C
C FUNCTIONAL DESCRIPTION:          .
C
C CALLED BY:                       CHECK, DRCMAP, FCHSCA, FMAIN, FSHOWA,
C                                  HLDF,  PROCON, RECDIS, RESCON,FDFPRO, GEOCON
C
C PROGRAMMER:                      DATE OF LAST CHANGE     REASON FOR CHANGE
```

Jul 20 13:31 1989 card f Page 40

```
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine drwmap

c       this subroutine draws the current map

        logical qmapup
        common /mapup/qmapup

        logical sys
        common /sysdbc/ sys

        call eramap
        qmapup = .true.
        call segmap
        if (sys)  print*,'drwmap ',iseg
        call drawit

        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   DSPFLN
C
C FUNCTIONAL DESCRIPTION:      .
C
C CALLED BY:
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine dspfln( name )

clj --- The real version of this file is used in CELEBRATION.  It displays,
clj --- in the communications area, the name of the picture which is currently
clj --- being viewed.

        character *50 name

        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   DWTEXT
C
C FUNCTIONAL DESCRIPTION:      .
C
C CALLED BY:                   APTEXT
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
```

Jul 20 13:31 1989 carc .f Page 41

```
        subroutine dwtext(style,nchars,retstr)
c       this routine sets the font and calls the DI-3000 routine to
c        draw the text in the quality desired based on the
c        style passed by the calling routine.
c    VARIABLES:
c       retstr- text string to be displayed
c       nchars- number of characters in the text string
c       style- indicates the font selected by the user
c   PROGRAMMER:  Nancy Detrich, A215, March, 1984

        character*80 retstr
        integer style,nchars

        if (style .eq. 1) then
          call jfont(1)
          call j3strg(retstr(1:nchars))
        elseif (style .eq. 2) then
          call jfont(2)
          call j3strg(retstr(1:nchars))
        elseif (style .eq. 3) then
          call jfont(5)
          call jhstrg(retstr(1:nchars))
        elseif (style .eq. 4) then
          call jfont(6)
          call jhstrg(retstr(1:nchars))
        elseif (style .eq. 5) then
          call jfont(7)
          call jhstrg(retstr(1:nchars))
        endif

        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      echps
c
c  Functional Description:
c       set keyboard echo position
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                      MESGJF
c
c  Local Variables: N/A
c
c  Restrictions: N/A
c
c  Abnormal Return Conditions:  N/A
```

Jul 20 13:31 1989 carc .f Page 42

```
c
c  Location:       /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine echps (xpos,ypos)
c
c      set keyboard echo position
c
       call jconwv(xpos,ypos,z,vx,vy)
       call jpecho(1,4,1,vx,vy)
c
       return
       end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    ENALL
c
c  Functional Description:       Utility to set write mask to the viewing
c                                planes.  Sets mask for all planes.
c
c  Input Files/Parameters:       N/A
c
c  Output Files/Parameters:      N/A
c
c  Called By:                    CLRBVP, CLRCOM, CLRFUL, CLRGRA, CLRVPT,
C                                DRWAMP, FCFILL, GLTYPE, INIPIC
C                                MAPPER, RECDIS, RESCON
c
c  Local Variables:
c    code        integer         escape code number
c    ilist       integer         array of integer parameters
c    ninteg      integer         number of integer parameters
c    nreal       integer         number of real paramenters
c    rlist       real            array of real parameters
c
c  Restrictions:                 N/A
c
c  Subroutines/Functions Called:         N/A
c
c  Abnormal Return Conditions:           N/A
c
c  Location:                             /ul/a21/bap/sbakovr.f
c
c  Programmer: Brian A. Pelletier
c
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE ENALL

c     set write mask to the viewing planes.  Sets mask for all planes.

        integer code, ninteg, nreal, ilist(1)
```

Jul 20 13:31 1989 car( .f Page 43

```
        real rlist(1)
        data code, ninteg, nreal/5127, 1, 0/
        data ilist(1)/255/
        call jescap(code, ninteg, nreal, ilist, rlist)
      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    eramap
c
c  Functional Description:
c       clear amplification area
c
c  Input Files/Parameters:
c
c  Output Files/Parameters: N/A
c
c  Subroutines/Functions Called:
c
c  Called By:                    DRWAMP, ERASEM, RECDIS, RESCON, RPLSCN,
C                                GEOCON
c
c  Local Variables: N/A
c
c  Restrictions: N/A
c
c  Abnormal Return Conditions:   N/A
c
c  Location:
c
c  Programmer      Date of Last Change     Reason for Change
C  L. McCleary     Jan 1988                separate amp & sys - eramap
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine eramap

c       erase map

        logical lton(16),dotem,savprt
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        common /qprint/ qprint
        logical qprint
        logical savgrd
        data lcgrid /16/

c       since inipic turns grids off for celebration purposes,
c       mapgraph wants to save the current state of grids.

        savgrd = lton(lcgrid)
        savprt = qprint
        call inipic
```

```
        lton(lcgrid) = savgrd
        qprint = savprt
        call eratrk
        call drwamp(' ',0)

        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ERASEM
C
C FUNCTIONAL DESCRIPTION:       .
C
C CALLED BY:                    STATEC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine erasem
c
c       this subroutine is the erase map state interpreter (14)
c
        common /states/ nextst
c
        call eramap
        call legend (.true.)
        nextst = 1
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ERASES
C
C FUNCTIONAL DESCRIPTION:       .
C
C CALLED BY:                    STATEC
C
C PROGRAMMER:                   DATE OF LAST CHANGE     REASON FOR CHANGE
c  S. Lamb                    Feb 1988                  command fix - erases
C
C-*-*-*-*-*-*-*-*-*-*-*-*-*-*-*-*-*-*-*-*-*-*-*-*-*-*-*-*-*-*-*-*-*-*-*-*|*-*-*-*-
c
        subroutine erases
c
c       this subroutine is the erase state interpreter (25)
c
        common /states/ nextst
        logical wordis,iseoc
        common /indpar/ indpro,indftr
        logical isfeat
c
        initls = nextst
```

Jul 20 13:31 1989 card .f Page 45

```
c       do until nextst not = initial state
  100   continue
            call getwrd
            if (wordis('MAP').or.wordis('THE').or.wordis('CURRENT')
     +          .or.wordis('EVERYTHING') .or. iseoc()) then
c * ** *** **** ***** ****** ******* erase map
                nextst = 14
            else if (isfeat()) then
c               change feature's color to background color
                call drwftr (indftr)
c               change color back
                nextst = 1
            else
                call putwrd
                nextst = 14
            endif
        if (nextst.eq.initls) go to 100
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         ERATRK
C
C FUNCTIONAL DESCRIPTION:            .
C
C CALLED BY:                         ERAMAP
C
C PROGRAMMER:                        DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine eratrk

c this routine purges the tracking segments currently active
c programmer: avw

        integer*4    i
        integer*4    numrcs
        integer*4    tkoset
        integer*4    trkndx (1000)

        logical      trackn
        logical      segact (1000)

        common /trkdbc/   trackn
        common /numrcs/   numrcs
        common /segact/   segact
        common /tkoset/   tkoset
        common /trkndx/   trkndx

        if (trackn)  print *, 'enter eratrk'

        do 10 i = 1, numrcs
           if (segact(i)) then
```

Jul 20 13:31 1989 carr .f Page 46

```
              call jpurge (trkndx(i)+tkoset)
              segact(i) = .false.
           end if
   10   continue
c
        if (trackn) print *, 'exit eratrk'

        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    EXECUT
C
C FUNCTIONAL DESCRIPTION:       .
C
C CALLED BY:                    STATEC
C
C PROGRAMMER:                   DATE OF LAST CHANGE     REASON FOR CHANGE
c  S. Lamb                    Feb 1988                 command fix - execut
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine execut
c
c       this subroutine is the execute state interpreter (27)
c
        common /states/ nextst
        logical eol,eoc
        common /comnds/ lenl,indxw,lenw,eol,eoc
        logical wordis,iseoc
c
        initls = nextst
c       do until nextst not = initial state
  100   continue
            call getwrd
            if (wordis('COMMAND').or.wordis('FILE').or.wordis(':'))
     +          then
c * ** *** **** ***** ****** ******* not understood / implem
                nextst = 15
            else if (iseoc()) then
c               prompt for filename
                nextst = 1
            else
c               put word into filename
                nextst = 1
            endif
        if (nextst.eq.initls) go to 100
        if (lenfn.gt.0) then
c           open file using default path
c           if error, putwrd, msg
c           else cmdfil = .true.
        endif
c
        return
        end
```

Jul 20 13:31 1989 carc .f Page 47

```
C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    FACT
c
c  Functional Description:       Function to return the factorial of an
c                                integer.
c
c  Input Files/Parameters:
c        n                           integer   number to be calculated
c
c  Output Files/Parameters:      N/A
c        fact                        real      factorial
c
c  Subroutines/Functions Called: N/A
c
c  Called By:  ICBEZ
c
c  Local Variables:
c        n                           integer   number to be calculated
c
c  Restrictions:                 N/A
c
c  Abnormal Return Conditions:   N/A
c
c  Location:      stepc03       /w3/ssb/prototype/arrows/fact.f
c
c  Programmer          Date of Last Change       Reason for Change
c     ssb                  10/31/83                initial entry
c     ssb                   3/06/84                completion
c
C-*-*-*-*-*-*-*-*-*-*-*-*-*-*-*-*-*-*-*-*-*-*-*-*-*-*-*-*-*-*-*-*-*-*-*|*-*-*-*-

       real function fact(n)

c      Function to return the factorial of an integer.

c     ************************************************************
c     * this function uses real numbers rather than integers in
c     * order to avoid overflow for larger values -- limit is 33!
c     ************************************************************
      if (n.lt.0) then
c        print *,'ERROR--input to factorial is negative--n=',n
        fact=1.
      else
        if (n.eq.0) then
          fact=1.
        else
          fact=1.
          do 5 i=1,n
            fact=fact*i
 5        continue
        endif
      endif
      return
      end
```

Jul 20 13:31 1989 carc .f Page 48

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     FADBOX
C
C FUNCTIONAL DESCRIPTION:        .
C
C CALLED BY:                     SETFAD, TIMCHK
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

       subroutine fadbox(dtg)

c     this routine controls visibility of the boxes when the fade time
c     is changed (jit).

      character*9 dtg
      integer segnum

      integer trkndx(1000)
      character*160  trkrec(1000)
      logical spprsd(1000)
      integer lctrak

      character*2 actmrk(260)
      integer mrkcnt
      integer trklst(260)
      integer curseg(260)
      character*9 boxdtg(260)
      logical boxvis(260)

      integer ltypov(16)
      logical ltonov(16), rankt(26,16)

      common /actmrk/ trklst,mrkcnt,actmrk,curseg,
     +                boxdtg,boxvis
      common /trkndx/ trkndx
      common /trkrec/ trkrec
      common /spprsd/ spprsd
      common /maptoo/ ltypov, ltonov, rankt

      data lctrak /3/

      do 10 i = 1, mrkcnt
         segnum = curseg(i)
c
c        if box in position i of the array is older than the dtg for
c        the oldest possible non-faded box, then make that box invisible.
c
         if (boxdtg(i) .lt. dtg) then
           if (boxvis(i)) then
                call jvisbl(segnum,0)
             boxvis(i) = .false.
           endif
```

```
         else
c
c           if the box at this position has a more recent dtg than the dtg
c           for the oldest possible non-faded box then make that box visible
c           as long as the plot with that box is not suppressed.
c
            if (.not. boxvis(i)) then
               j = 1
 100           if (trkrec(trkndx(j))(22:30) .eq. boxdtg(i)) goto 110
               j = j + 1
               goto 100
 110           continue
               if (.not. spprsd(trkndx(j))) then
                  if (ltonov(lctrak)) then
                     call jvisbl(segnum,1)
                  endif
                  boxvis(i) = .true.
               endif
            endif

         endif

  10  continue

      return

      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   FADCHG
C
C FUNCTIONAL DESCRIPTION:      .
C
C CALLED BY:                   SETFAD, TRKINI
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine fadchg (dtg)

c
c     this subroutine sets the fade dtg and the fade index based
c     upon the fade time given
c

      character*9 dtg
      character*9 curdtg
      integer*2 newtim(6)
      integer yrsub
      integer monsub
      integer daysub
      integer hrsub
      integer minsub
      integer juldat
```

```
Jul 20 13:31 1989  carc  .f Page 50

      integer yr, mon, day
      integer hour, min

      data yrsub  /1/
      data monsub /2/
      data daysub /3/
      data hrsub  /4/
      data minsub /5/

c
c***  newtim is returned in int(6) format where
c***  year =  newtim(1)
c***  month = newtim(2)
c***  day   = newtim(3)
c***  hour  = newtim(4)
c***  minute= newtim(5)
c***  newtim(6) = seconds (not used)
c
      call gettim(newtim)
      yr =   newtim(yrsub)
      mon =  newtim(monsub)
      day =  newtim(daysub)
      hour = newtim(hrsub)
      min  = newtim(minsub)
c
c***  convert yr/mon/day to julian date
c
      call julian(yr,mon,day,juldat)
c
c***  express curdtg in character format as yydddhhmm
c
      call chdate (yr,juldat,hour,min,curdtg)
c
c***  reset fade dtg global based upon new fade time in minutes -tfadtm
c
      call fadtim(curdtg,dtg)

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    FADTIM
C
C FUNCTIONAL DESCRIPTION:       .
C
C CALLED BY:                    FADCHG, TIMCHK
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine fadtim(curdtg, lasdtg)
c
c  calculate the oldest dtg that a track can have and still be displayed
c  dtg is in yydddhhmm format
```

Jul 20 13:31 1989 carc .f Page 51

```
c  this is done by subtracting the current fade time (tfadtm) from the
c  current clock time (curdtg).
c  RESTRICTION:  fade time is expressed in hh:mm and cannot exceed 36:00
c
      character*9 curdtg
      character*9 lasdtg
      integer curyr, curday, curhr, curmin
      integer lasyr, lasday, lashr, lasmin
      integer cnthr
      integer cntday
      integer tfaddx
      integer tfadtm
      common /tfadez/ tfaddx, tfadtm

      read(curdtg,10,err=100) curyr, curday, curhr, curmin
 10   format(i2,i3,i2,i2)

c     initialize all date variables to current date/time

      lasyr = curyr
      lasday = curday
      lashr = curhr
      lasmin = curmin

c     find last minute for display list

      lasmin = curmin - tfadtm
      if (lasmin .lt. 0 .or. tfadtm .ge. 60) then
          if (mod(abs(lasmin),60) .eq. 0) then
               lasmin = 0
          else
               lasmin = 60 - mod(abs(lasmin),60)
          endif

c         next, find last hour for display list if diff

          cnthr = tfadtm / 60
cc          if (mod(tfadtm,60) .ne. 0) then
cc               cnthr = cnthr + 1
cc          endif
          if (lasmin .gt. curmin) then
               cnthr = cnthr + 1
          endif
          lashr = lashr - cnthr
          if (lashr .lt. 0) then
               if(mod(abs(lashr),24) .eq. 0) then
                  lashr = 0
               else
                  lashr = 24 - mod(abs(lashr),24)
               endif

c              third find the julian day of the year if diff

               cntday = tfadtm / 1440
               if (mod(tfadtm,1440) .ne. 0) then
                  cntday = cntday + 1
```

```
              endif
              lasday = curday - cntday
              if (lasday .lt. 1) then

c                fourth, set the year if different

                 lasyr = curyr - 1
                 if ((mod(lasyr,4) .eq. 0) .and.
     +              ((mod(lasyr,100) .ne. 0) .or.
     +               (mod(lasyr,400) .eq. 0))) then
                     lasday = 366
                 else
                     lasday = 365
                 endif
              endif
          endif
      endif

c     express lasdtg in character format

      call chdate(lasyr,lasday,lashr,lasmin,lasdtg)
      goto 200
 100  print*,'error in fadtim read'
 200  continue

      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      FANNOT
C
C FUNCTIONAL DESCRIPTION:         .
C
C CALLED BY:                      GEOCON
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine fannot

c       annotote function
        character * 80 retstr

        irchar = 80
        retstr = '                                       '
        CALL PROMPT(1206,retstr,80,irchar)
        if (irchar.gt.0) then
           call mesg(1207)
           call annota (retstr,irchar)
        endif

        return
        end
```

Jul 20 13:31 1989 carc .f Page 53

```
C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   FCFILL
c
c  Functional Description:
c       Color area fill function
c
c  Input Files/Parameters:
c
c  Output Files/Parameters:
c
c  Subroutines/Functions Called:
c      mesg                     displays messages in the communica-
c                                tions area
C
C  CALLED BY:                   GEOCON
c
c  Programmer         Date of Last Change       Reason for Change
c  L McCleary         Jan 1988             check for CANCEL - fcfill
c  L McCleary         Jan 1988          bkgrd investigation - fcfill
c
C-*-*-*-*-*-*-*-*-*-*-*-*-*-*-*-*-*-*-*-*-*-*-*-*-*-*-*-*-*-*-*-*-*-*-*|*-*-*-*-

        subroutine fcfill

c       Color area fill function

        common /b1/ qcancl,qext2m,qretrn,qstmnu,qnextm
        integer qnextm,hltab(34),ihllen
        logical qcancl,qext2m,qretrn,qstmnu
        common /b5/ qexitg
        logical qexitg
        logical bxclr
        common /bxcdbc/ bxclr
        common /defpth/ defpth
        character*50 defpth
        common /lendef/ lendef
        logical renew
        common /scratr/ qbox,qbkgrd
        integer qbox,qbkgrd
        integer button,icol

        integer qfb(26),qmb(4)
        common /butons/ qfb,qmb
        logical qlton(16),qdotem
        integer qpgrid(4),qtyptb(16)
        integer qlevel,qitpro,qires,qlunda,qlunin,qlunli
        real qxrnm,qxc,qyc,qclat,qclon,qxrad,qyrad,qorhal
        common /map/ qxrnm,qxc,qyc,qlevel,qclat,QCLON,QXRAD,QYRAD,
     +     qitpro,qires,qtyptb,qlunda,qlunin,qlunli,qlton,qpgrid,
     +     qdotem,qorhal

        data ihllen /34/

                if (bxclr) call enall
                qretrn = .false.
```

```
                qext2m = .false.
                qcancl = .false.
c                qbkgrd = qtyptb(8)
                call drawm(29,ierror)
                if (bxclr) call soverl
20              continue
                    call colbak
                if (.not.(qcancl.or.qext2m.or.qretrn)) goto 20
                qretrn = .false.
                if (bxclr) call enall
                call drawm(2,ierror)
                if (bxclr) call soverl
                call hilite(.true.,ichoic,1,ihllen,hltab)
                call mesg (1232)
                renew = .true.
                icol = qbkgrd
30              continue
                    call locat(button,vx,vy)
c                    if (button.eq.8) goto 40
                    if (button.eq.8.or.button.eq.qmb(3)) goto 40
                    call enall
                    call jfillv(5126,icol,vx,vy,renew)
                    call soverl
                    if (renew) renew = .false.
                goto 30
40              continue

        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: fdrawv
C
C FUNCTIONAL DESCRIPTION:  DRAWS A VECTOR FROM THE CURRENT GRAPHICS CURSOR
C                                LOCATION TO (X, Y)
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                     FLUSHB, FPOSIT, PLOTIT, PROCPO
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                    DATE OF LAST CHANGE     REASON FOR CHANGE
```

Jul 20 13:31 1989 carc .f Page 55

```
C
C     DAVE NATION                                       ORIGINAL CODE.
C     JERRY FENERTY                                     DOCUMENT AND MODIFY
C                                                       FOR A21 PROTOTYPE.
C     Edward Swing              10--86                  Fixed wrap-around lines
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE FDRAWV (X,Y)

C     DRAWS A VECTOR FROM THE CURRENT GRAPHICS CURSOR LOCATION TO (X,Y)

      COMMON /PIE/ PIE,TPIE,PIO2,PIO4
      common /gmpos/ gmxpos,gmypos
      LOGICAL PSLAST
      COMMON /PSLAST/ PSLAST,XPOS,YPOS
      LOGICAL SAVEXY,xgto,xpgto
      COMMON /STMSGS/ XPREV,YPREV,IRESSQ,XSAV,YSAV,SAVEXY
      COMMON /VIEWP/ XRAD,YRAD,IXNP,IYNP,XC,YC
c     map parameters
      logical lton(16),dotem
      integer ipgrid(4),ltyptb(16)
      common /map/ XRNM,XCA,YCA,LEVEL,CLAT,CLON,XRADA,YRADA,ITPROJ,
     +     IRES,LTYPTB,LUNDAT,LUNIND,LUNLIN,LTON,IPGRID,DOTEM,
     +     ORHALT
c     the next declarations added for polyline processing
      real xpoly(500),ypoly(500)
      real tmplat,tmplon, dellat,dellon
      common /poly/ xpoly,ypoly
      common /inpoly/inpoly
      COMMON /PROJT/ IGNOMN,IORTEQ,IORTPO,IORTHO,IPERSP
      COMMON /PROJT2/ IEQREC,IMERCA,ILAMCN
      COMMON /COUNTS/ ICNTGP,ICNTDV,icntpl
      real epsilon,circum
      real dxr,dpxr, tmpx,tmpprvx
      data epsilon /0.001/
      data mxpoly/500/

      SAVEXY=.FALSE.
      XVEC=X-XPREV
      YVEC=Y-YPREV
C     THIS CODE IS NECESSARY TO RESOLVE THE LONG VECTOR PROBLEM WITH
C     RECTANGULAR PROJECTIONS

      call sgn(x,xgto)
      call sgn(xprev,xpgto)
      IF (xgto.neqv.xpgto) then
        if ((itproj.eq.ieqrec).or.(itproj.eq.imerca)
     +                 .or.(xvec.gt.xrad)) then
          call xytoll(x,y,trlat,trlon)
          call xytoll(xprev,yprev,prvlat,prvlon)
          dxr=abs(trlon-clon)
          dpxr=abs(prvlon-clon)
          if (dxr.gt.pie) then
              dxr = tpie - dxr
          endif
```

Jul 20 13:31 1989 carc .f Page 56

```
            if (dpxr.gt.pie) then
                dpxr = tpie - dpxr
            endif
c     This code checks if the line is larger than halfway around the globe
c     If so, this section draws the opposite line segment - the shorter one
            if (dxr+dpxr.gt.pie) then
                call lltoxy(0.,0.,tmplat,tmplon)
                call lltoxy(.1,.1,dellat,dellon)
                dellon = abs(dellon - tmplon)
                circum = dellon*tpie/.1
                if (x.gt.0.) then
                  tmpx = x - circum
                  tmpprvx = xprev + circum
                else
                  tmpx = x + circum
                  tmpprvx = xprev - circum
                endif
                if (pslast) then
                  pslast = .false.
                else
                  icntdv = icntdv + 1
                  inpoly = inpoly + 1
                  xpoly (inpoly) = tmpx
                  ypoly (inpoly) = y
                endif
                call flpoly
                call jmove(x,y)
                icntgp = icntgp + 1
                gmxpos = xpos
                gmypos = ypos
            endif
          elseif ((yvec.gt.yrad).or.(xvec.gt.xrad)) then
            call fposit(x,y)
          endif
        endif
        IF (PSLAST) THEN
            PSLAST = .FALSE.
c           move to new location before continuing to draw
c           flush the polyline buffer and place new starting
c           coordinates into the arrays
            call flpoly
            CALL JMOVE (XPOS,YPOS)
            icntgp = icntgp + 1
            gmxpos = xpos
            gmypos = ypos
        endif
        IF(XVEC*XVEC+YVEC*YVEC.LE.IRESSQ) THEN
            XSAV=X
            YSAV=Y
            SAVEXY=.TRUE.
        ELSE
            icntdv = icntdv + 1
c           place values into polyline buffers
            inpoly = inpoly + 1
            xpoly (inpoly) = x
            ypoly (inpoly) = y
```

Jul 20 13:31 1989 carc .f Page 57

```
          if ( inpoly .eq. mxpoly ) then
              call flpoly
              gmxpos = x
              gmypos = y
          endif
          XPREV=X
          YPREV=Y
      ENDIF

      RETURN
      END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: FILLIT
C
C FUNCTIONAL DESCRIPTION:  FILLS BODIES OF WATER ON THE CURRENT MAP.
C
C INPUT FILES/PARAMETERS:
C
C       ICOL                  INTEGER     COLOR.
C       XRNM                  REAL        NAUTICAL MILE RADIUS.
C       LEVEL                 INTEGER     LEVEL OF DETAIL OF WATER
C                                         FEATURES.
C
C GLOBAL VARIABLES :
C
C       LENMAP                INTEGER     LENGTH OF FILL PATHNAME.
C       MAPATH                CHAR*50     MAP DATA PATHNAME.
C
C OUTPUT FILES/PARAMETERS:  NONE.
C
C SUBROUTINES/FUNCTIONS CALLED :
C
C       INVTES                TESTS LAT/LONG PAIR FOR INVISIBILITY.
C       FILLPT                COLORS POINT X,Y.
C
C CALLED BY: DMAPII.
C
C LOCAL VARIABLES:
C
C       ISINV                 LOGICAL     INDICATES INVISIBILITY.
C       IFL                   INTEGER     LOGICAL UNIT NUMBER FOR
C                                         FILL FILE.
C       CHATMP                CHAR*50     FULL PATHNAME.
C       XRV                   REAL        XRNM*.8
C       RLAT                  REAL        LATITUDE OF FILL POINT.
C       RLON                  REAL        LONGITUDE OF FILL POINT.
C       XRN                   REAL        DIAMETER OF BODY OF WATER.
C       ITYP                  INTEGER     TYPE OF BODY OF WATER.
C       LEVL                  INTEGER     LEVEL OF DETAIL.
C       renew                 logical     indicates whether this is the first
C                                         point in a series
C
C RESTRICTIONS: NONE.
C
```

Jul 20 13:31 1989 card f Page 58

```
C ABNORMAL RETURN CONDITIONS:   NONE.
C
C LOCATION:                     /a21/gjf/MAPSRC.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C     Dave Nation               5/6/85                  Change fill path name
C                                                       from defpth to mapath
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE FILLIT (ICOL,XRNM,LEVEL)

C     THIS SUBROUTINE READS THE FILL FILE AND FILLS BODIES OF WATER
C     ON THE CURRENT MAP

C     INPUT PARAMETERS:
C       ICOL - COLOR INDEX VALUE TO USE AS FILL COLOR
C       XRNM - 1/2 THE WIDTH OF THE CURRENTLY DISPLAYED MAP IN
C               NAUTICAL MILES (X RADIUS)
C       LEVEL - CURRENT LEVEL OF DETAIL FOR INCLUSION OF GEOGRAPHIC
C               FEATURES (1=LEAST DETAIL, 15=MOST DETAIL)

C     SUBROUTINES CALLED:
C       INVTES - TESTS A LAT/LON PAIR FOR INVISIBILITY (ON OPPOSITE
C                SIDE OF GLOBE) FOR CIRCULAR PROJECTIONS
C       FILLPT - FILLS USING A SELECTED LAT/LON PAIR WITH COLOR ICOL


      logical renew
      CHARACTER*50 CHATMP
      character*50 mapath
      common /mapath/ mapath
      common /lenmap/ lenmap
      LOGICAL ISINV
      logical interr
      common /interr/ interr
      character ch
      DATA IFL/15/

      if(lenmap .gt. 0) then
          chatmp = mapath(1:lenmap) // 'FILL.dat'
      else
          chatmp = 'FILL.dat'
      endif
C
      OPEN(UNIT=IFL,FILE=CHATMP(1:LENMAP+8),err=181,
     +                             STATUS='UNKNOWN')
C
      REWIND(IFL)
      XRV = XRNM*.8
      renew = .true.
  100 CONTINUE
```

Jul 20 13:31 1989 carc .f Page 59

```
            call chint (interr,ch)
            if (interr) go to 190
            READ (IFL,10100,END=190,ERR=180) RLAT,RLON,XRN,ITYP,LEVL
     +          ,ITPRO
10100       FORMAT(2F11.7,F10.0,3I5)
            CALL INVTES (RLAT,RLON,ISINV)
            IF (.NOT.ISINV) THEN
                IF (LEVL.LE.LEVEL) THEN
                    IF (XRN.GE.XRV) THEN
                        CALL FILLPT (ICOL,RLAT,RLON,renew)
                    ENDIF
                ENDIF
            ENDIF
            GO TO 100
  180   CONTINUE
c           PRINT*,'ERROR ON READ OF FILL FILE'
            go to 190
  181   continue
c            print*,'Open error on fill file ',chatmp
  190   CONTINUE
        CLOSE (IFL)

        RETURN
        END


C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     FILLPT
C
C FUNCTIONAL DESCRIPTION:        .
C
C CALLED BY:                     AREAFL, FILLIT
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE FILLPT (ICOL,RLAT,RLON,renew)

C       THIS SUBROUTINE CONVERTS A CANDIDATE LAT/LON TO X/Y AND CALLS THE
C           PRIMITIVE FILL FUNCTION IF THE POINT IS ON THE SCREEN

C       INPUT PARAMETERS:
C         ICOL - COLOR INDEX VALUE TO USE AS FILL COLOR
C         RLAT - LATITUDE OF POINT TO BE FILLED IN RADIANS
C         RLON - LONGITUDE OF POINT TO BE FILLED IN RADIANS

C       SUBROUTINES CALLED:
C         LLTOXY - CONVERT LAT/LON PAIR TO X/Y USING CURRENT PROJECTION
C         CLIPXY - FIND OUT WHETHER X/Y IS WITHIN THE CURRENT SCREEN BOUNDARY
C         JFILLM - PRIMITIVE HARDWARE FILL FUNCTION AT X/Y WITH COLOR ICOL
C                  (A STANDARD ESCAPE FUNCTION WITH THE AED512 DI-3000 DRIVER)

        logical renew
        LOGICAL NEWONS
        LOGICAL INVALI
```

Jul 20 13:31 1989 card .f Page 60

```
      COMMON /INVALI/ INVALI
      logical map
      common /mapdbc/ map

      INVALI = .FALSE.
      CALL LLTOXY(RLAT,RLON,X,Y)
      if (map) print*,'fillpt -- ',rlat,rlon,x,y,invali,renew
      IF (.NOT.INVALI) THEN
          CALL CLIPXY (X,Y,NEWONS)
          IF (NEWONS) THEN
               if (map) print*,'fillpt -- ',x,y
               CALL JFILLM (ICOL,X,Y,renew)
               if (renew) renew = .false.
          ENDIF
      ENDIF

      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   FINDTK
C
C FUNCTIONAL DESCRIPTION:      .
C
C CALLED BY:                   CHECK
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine findtk(segnam,found)

c
c     this subroutine finds and displays a track that matches the segment
c     segnam.  This routine is called from CHECK which is used for interrogation
c     from any menu.  So if user PICKS on a track at any time other than while
c     in the interrogate menu option, this routine will be called.

      logical endlst
      logical found

      integer*4 chkndx
      integer*4 chkseg
      integer*4 lctrak
      integer*4 segnam

      integer*4 ltypov (16)
      logical ltonov (16)
      logical rankt (26, 16)
      common /maptoo/ ltypov, ltonov, rankt
      integer*4 tkoset
      common /tkoset/ tkoset
      integer*4 trkndx(1000)
      common /trkndx/ trkndx
      integer*4 tfaddx
```

```
      integer*4 tfadtm
      common /tfadez/ tfaddx, tfadtm
      integer*4 tnewst
      integer*4 toldst
      common /tarbou/ tnewst, toldst
      integer*4 numrcs
      common /numrcs/ numrcs

      data lctrak  /3/


      found = .false.
      if (ltonov(lctrak)) then

c          chkndx = mod(tfaddx,numrcs) - 1
c         prevent indexing trkndx by 0
          if (tfadddx .gt. 0) then
             chkndx = mod(tfaddx,numrcs) - 1
          else
             chkndx = 0
          endif
c
          found = .false.
          endlst = .false.
c
c         search list until a segment match is found
c         or the end of the list is reached
c
 100      if (found .or. endlst) goto 110
                chkndx = mod(chkndx,numrcs) + 1
                chkseg = trkndx(chkndx) + tkoset
                if (chkseg .eq. segnam) then
                       found = .true.
                else
                       if (chkndx .eq. tnewst) then
                              endlst = .true.
                       endif
                endif
           goto 100
 110       continue
c
c          if match is found, then print information related
c          to that particular track in the communications area
c
           if (found) then
                 call tkinfo(chkndx,chkseg)
           endif
       endif

       return
       end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: flpoly
C
```

Jul 20 13:31 1989 carc .f Page 62

```
C FUNCTIONAL DESCRIPTION:  this subroutine flushes the polyline buffer
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                    FDRAWV, FLUSHB
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine flpoly

c       this subroutine flushes the polyline buffer

        real xpoly(500),ypoly(500)
        common /poly/ xpoly,ypoly
        common /inpoly/inpoly
        COMMON /COUNTS/ ICNTGP,ICNTDV,icntpl

        if ( inpoly .gt. 0 ) then
            call jpoly (xpoly,ypoly,inpoly)
            icntpl = icntpl + 1
            inpoly =  0
        end if

        return
        end


C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: FLUSHB
C
C FUNCTIONAL DESCRIPTION:  FLUSHES GRAPHICS BUFFER.
C
C INPUT FILES/PARAMETERS:  NONE.
C
C GLOBAL VARIABLES :
C
```

Jul 20 13:31 1989 carc .f Page 63

```
C        XSAV                     REAL        SAVED X COORDINATE.
C        YSAV                     REAL        SAVED Y COORDINATE.
C        SAVEXY                   LOGICAL     INDICATES IF POINT WAS SAVED.
C        IRESSQ                   REAL        RESOLUTION OF LINES.
C
C OUTPUT FILES/PARAMETERS:  NONE.
C
C SUBROUTINES/FUNCTIONS CALLED : NONE.
C
C CALLED BY:                        CHKSIZ, DMAPII, DRAWEL, DROUTL, GLTYPE,
C                                   GTEXT,  LLGRID, MAPPER, PLOTIT,
C                                   PLTOVP
C
C LOCAL VARIABLES:
C
C        IRESSV                   REAL        RESOLUTION OF LINES.
C
C RESTRICTIONS: NONE.
C
C ABNORMAL RETURN CONDITIONS:   NONE.
C
C LOCATION:                         /a21/gjf/MAPSRC.FTN
C
C PROGRAMMER:                       DATE OF LAST CHANGE     REASON FOR CHANGE
C
C     DAVE NATION                                           ORIGINAL CODE.
C     JERRY FENERTY                                         DOCUMENT AND MODIFY
C                                                           FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE FLUSHB

C     THIS SUBROUTINE FLUSHES THE GRAPHICS BUFFER

      LOGICAL SAVEXY
      COMMON /STMSGS/ XPREV,YPREV,IRESSQ,XSAV,YSAV,SAVEXY

C ***** VERY SHORT VECTORS HAVE BEEN DISABLED COMPLETELY
C ***** THIS CAN CAUSE HOLES IN LINES AND ELIMINATE SMALL ISLANDS
C ***** TO REENABLE, PUT THE FOLLOWING IF BLOCK BACK IN

      IF (SAVEXY) THEN
          IRESSV=IRESSQ
          IRESSQ=0
          CALL FDRAWV(XSAV,YSAV)
          IRESSQ=IRESSV
      ENDIF

      call flpoly
      CALL JUPDAT

      RETURN
      END
```

Jul 20 13:31 1989 carc .f Page 64

```
C+*+*+*+*+*+*+*+*+*+*+*+*+*+*+*+*+*+*+*+*+*+*+*+*+*+*+*+*+*+*+*+*+*|*+*+*+*+
C UNIT NAME:                    FMTGEO
C
C FUNCTIONAL DESCRIPTION:       .
C
C CALLED BY:                    DISCEN
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*|*-*-*-*-

        subroutine fmtgeo (flat,flon,geostr)
c
c       format geo coordinate for ascii display
c
        character nsi,ewi
        real*8 rdlat,rdlon
        integer*4 iilat,iilon
        real*8 rlat,rlon
        character*20 geostr
        real*8 dtor,stor
        common /dtor/ dtor,stor
c
        rlat = flat
        rlon = flon
        if (rlat.gt.1.58.or.rlat.lt.-1.58
     +  .or.rlon.gt.3.15.or.rlon.lt.-3.15) then
c           print*,'Invalid Geo value : ',rlon,rlat
            iegeo = 1
        else
            iegeo = 0
        endif
        geostr = ' '
        if (iegeo.gt.0) then
            write (geostr,1200) iegeo
 1200       format('GEO conv. error ',i2,2x)
        else
            rdlat = abs(rlat) / dtor
            rdlat = (rdlat * 3600. + .5) / 3600.
            idlat = rdlat
            imlat = (rdlat - idlat) * 60.
            islat = (rdlat - idlat - imlat / 60.) * 3600.
            iilat = islat + imlat * 100 + idlat * 10000
            nsi = 'N'
            if (rlat.lt.0) nsi = 'S'
            rdlon = abs(rlon) / dtor
            rdlon = (rdlon * 3600. + .5) / 3600.
            idlon = rdlon
            imlon = (rdlon - idlon) * 60.
            islon = (rdlon - idlon - imlon / 60.) * 3600.
            iilon = islon + imlon * 100 + idlon * 10000
            ewi = 'E'
            if (rlon.lt.0) ewi = 'W'
            write (geostr,1500) iilat,nsi,iilon,ewi
 1500       format(i6,a1,i7,a1)
        endif
```

Jul 20 13:31 1989 card .f Page 65

```
c       print*,'fmtgeo -- exit ',rlat,rlon,'  ',geostr
c
        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     FNDHLP
C
C FUNCTIONAL DESCRIPTION:        .
C
C CALLED BY:                     HELP
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine fndhlp(ifl,helpno,eof,eom)
c
c       subroutine to find the numbered help message
c
        logical eof,eom
        character cchar
        character*80 msg
        integer msgnum,helpno

c       print*,'in fndhlp'
        eof=.false.
        eom=.false.
300     continue
        read(ifl,1300,end=320,err=310)cchar,msg
1300    format(a1,a80)
        if (cchar.eq.'C'.or.cchar.eq.'c') go to 300
        if (cchar.eq.'M'.or.cchar.eq.'m') then
                read(msg,1350,end=320,err=310)msgnum
1350            format(i5)
                if (msgnum.eq.helpno) go to 330
        endif
        go to 300
310     continue
        print*,'read error on message file',msgnum
        go to 330
320     continue
        eof=.true.
c       print*,'end of file'
330     continue
c       print*,'end fndhlp'
        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: FORMT
C
C FUNCTIONAL DESCRIPTION:  FORMATS LAT/LONG (RADIANS) INTO A CHARACTER
C                          STRING OF TYPE DDMMSSN/DDDMMSSE.
```

Jul 20 13:31 1989 carr .f Page 66

```
C
C INPUT FILES/PARAMETERS:
C
C       RLAT                    REAL        LATITUDE.
C       RLON                    REAL        LONGITUDE.
C       IEGEO                   INTEGER     ERROR CONDITION.
C
C GLOBAL VARIABLES : NONE.
C
C OUTPUT FILES/PARAMETERS:
C
C       GEOSTR                  CHAR*20     STRING WHICH HOLDS DDMMSSN/DDDMMSS
C
C SUBROUTINES/FUNCTIONS CALLED : NONE.
C
C CALLED BY:                    LLSHOW, SCRDIA
C
C LOCAL VARIABLES:
C
C       NSI                     CHARACTER   NORTH/SOUTH INDICATOR.
C       EWI                     CHARACTER   EAST/WEST INDICATOR.
C       SLASH                   CHARACTER   /.
C       RDLAT                   REAL*8      DEGREES LATITUDE.
C       RDLON                   REAL*8      DEGRESS LONGITUDE
C       IILAT                   INTEGER     DDMMSS LATITUDE.
C       IDLAT                   INTEGER     DEGREES LATITUDE.
C       IMLAT                   INTEGER     MINUTES LATITUDE.
C       ISLAT                   INTEGER     SECONDS LATITUDE.
C       IILON                   INTEGER     DDDMMSS LONGITUDE.
C       IDLON                   INTEGER     DEGREES LONGITUDE.
C       IMLON                   INTEGER     MINUTES LONGITUDE.
C       ISLON                   INTEGER     SECOND LONGITUDE.
C       DTOR                    REAL        DEGREES TO RADIANS CONVERSION.
C
C RESTRICTIONS: NONE.
C
C ABNORMAL RETURN CONDITIONS:   NONE.
C
C LOCATION:                     /a21/gjf/A21GEO.FTN
C
C PROGRAMMER:                   DATE OF LAST CHANGE     REASON FOR CHANGE
C
C    DAVE NATION                                        ORIGINAL CODE.
C    JERRY FENERTY                                      DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE FORMT (RLAT,RLON,IEGEO,GEOSTR)

C     FORMAT GEO COORDINATE FOR ASCII DISPLAY

      CHARACTER NSI,EWI,SLASH
      REAL*8 RDLAT,RDLON
      INTEGER*4 IILAT,IILON
```

Jul 20 13:31 1989 carc .f Page 67

```
C  COMMENTED OUT BECAUSE LLSHOW CALLS FORMT WITH REAL.

C         REAL*8 RLAT,RLON

        CHARACTER*(*) GEOSTR

        GEOSTR = ' '
        DTOR = DATAN (1.0D0)
        DTOR = DTOR / 45.D0

        IF (IEGEO.GT.0) THEN

            WRITE (GEOSTR,1200) IEGEO
 1200       FORMAT('GEO CONV. ERROR ',I2,2X)

        ELSE

C  BREAK DOWN LAT/LONG INTO DEGREES, MINUTES AND SECONDS AND LOAD THEM
C  INTO STRING.

            RDLAT = ABS(RLAT) / DTOR
            RDLAT = (RDLAT * 3600. + .5) / 3600.
            IDLAT = RDLAT
            IMLAT = (RDLAT - IDLAT) * 60.
            ISLAT = (RDLAT - IDLAT - IMLAT / 60.) * 3600.
            IILAT = ISLAT + IMLAT * 100 + IDLAT * 10000
            NSI = 'N'

            IF (RLAT.LT.0) NSI = 'S'

            RDLON = ABS(RLON) / DTOR
            RDLON = (RDLON * 3600. + .5) / 3600.
            IDLON = RDLON
            IMLON = (RDLON - IDLON) * 60.
            ISLON = (RDLON - IDLON - IMLON / 60.) * 3600.
            IILON = ISLON + IMLON * 100 + IDLON * 10000
            EWI = 'E'

            IF (RLON.LT.0) EWI = 'W'

            SLASH = '/'
            WRITE (GEOSTR,1500) IILAT,NSI,SLASH,IILON,EWI
 1500       FORMAT(I6,A1,A1,I7,A1)

C  FOLLOWING CODE PUT IN TO ELIMINATE BLANKS.

            IZERO = 0
            DO 30 I=1,16
               IF (GEOSTR(I:I).EQ.' ') THEN
                   WRITE(GEOSTR(I:I),1300) IZERO
 1300              FORMAT(I1)
               ENDIF
  30        CONTINUE

        ENDIF
```

Jul 20 13:31 1989 carc .f Page 68

```
      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  foverl
c
c  Functional Description:
c       display overlay data
c
c  Input Files/Parameters:
c
c  Output Files/Parameters: N/A
c
c  Subroutines/Functions Called:
c
c  Called By: geocon
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988             separate amp & sys - foverl
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine foverl
c
c     display overlay data function
c
      character*80 ovfnam
      common /ovfnam/ ovfnam
      integer lenovf
      common /lenovf/ lenovf
      integer ovseg, dfseg
      COMMON /OVSEGS/ ovseg, dfseg

c     map parameters
      logical lton(16),dotem
      integer ipgrid(4),ltyptb(16)
      common /map/ XRNM,XC,YC,LEVEL,CLAT,CLON,XRAD,YRAD,ITPROJ,
     +     IRES,LTYPTB,LUNDAT,LUNIND,LUNLIN,LTON,IPGRID,DOTEM,
     +     ORHALT
      dimension ltypov(16)
      logical ltonov(16),rankt(26,16)
      common /maptoo/ ltypov,ltonov,rankt

      data maxlen /40/
      data lcover/21/
c
```

Jul 20 13:31 1989 card' f Page 69

```
c       display overlay data
c
c        print *,'foverl - enter'
         CALL PROMPT (1208,ovfnam,MAXLEN,lenovf)
         if (lenovf.gt.0) then
            call mesg(250)
            ltonov(lcover-20) = .true.
c            call jrclos
            call getseg(ovseg)
            call geowin
            call gravpt
            call jropen(ovseg)
            ltype = ltypov(lcover-20)
            call xcolor(ltype)
            call pltovp(xrnm,ovfnam,lenovf)
            call jrclos
        endif
        return
        end

C+*+*+*+*+*+*+*+*+*+*+*+*+*+*+*+*+*+*+*+*+*+*+*+*+*+*+*+*+*+*+*+*+*+*+*+*+*+*+|*+*+*+*+
C UNIT NAME: FPOINT
C
C FUNCTIONAL DESCRIPTION:  DRAWS POINT AT X,Y.
C
C INPUT FILES/PARAMETERS:
C
C       X                    REAL        X COORDINATE.
C       Y                    REAL        Y COORDINATE.
C
C GLOBAL VARIABLES :
C
C       SEGNO                INTEGER     CURRENT MAP SEGMENT NUMBER.
C       LTYPE                INTEGER     CURRENT LINE TYPE.
C
C OUTPUT FILES/PARAMETERS:  NONE.
C
C SUBROUTINES/FUNCTIONS CALLED : NONE.
C
C CALLED BY:                   GRDLAT, GRDLON, PLOTIT
C
C LOCAL VARIABLES: NONE.
C
C RESTRICTIONS: NONE.
C
C ABNORMAL RETURN CONDITIONS:   NONE.
C
C LOCATION:                    /a21/gjf/MAPSRC.FTN
C
C PROGRAMMER:                  DATE OF LAST CHANGE     REASON FOR CHANGE
C
C    DAVE NATION                                       ORIGINAL CODE.
C    JERRY FENERTY                                     DOCUMENT AND MODIFY
C                                                      FOR A21 PROTOTYPE.
C
```

Jul 20 13:31 1989 carc .f Page 70

```
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE FPOINT(X,Y)

C     THIS SUBROUTINE DRAWS A POINT AT CURSOR POSITION X, Y

      CALL JMARK (X,Y)

      RETURN
      END

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: FPOSIT
C
C FUNCTIONAL DESCRIPTION:  POSITIONS POINT AT X,Y.
C
C INPUT FILES/PARAMETERS:
C
C       X                    REAL        X COORDINATE.
C       Y                    REAL        Y COORDINATE.
C
C GLOBAL VARIABLES :
C
C       XSAV                 REAL        SAVED X COORDINATE.
C       YSAV                 REAL        SAVED Y COORDINATE.
C       SAVEXY               LOGICAL     INDICATES IF POINT WAS SAVED.
C       IRESSQ               REAL        RESOLUTION OF LINES.
C       XPREV                REAL        PREVIOUS X COORDINATE.
C       YPREV                REAL        PREVIOUS Y COORDINATE.
C       XPOS                 REAL        CURRENT X COORDINATE.
C       YPOS                 REAL        CURRENT Y COORDINATE.
C       PSLAST               LOGICAL     INDICATES WHETHER XPOS,YPOS WAS LAST
C                                        POINT POSITIONED.
C
C
C OUTPUT FILES/PARAMETERS:  NONE.
C
C SUBROUTINES/FUNCTIONS CALLED : NONE.
C
C CALLED BY:                   FDRAWV, PLOTIT, PROCPO
C
C LOCAL VARIABLES:
C
C       IRESSV               REAL        RESOLUTION OF LINES.
C
C RESTRICTIONS: NONE.
C
C ABNORMAL RETURN CONDITIONS:  NONE.
C
C LOCATION:                    /a21/gjf/MAPSRC.FTN
C
C PROGRAMMER:                  DATE OF LAST CHANGE     REASON FOR CHANGE
C
C     DAVE NATION                                      ORIGINAL CODE.
C     JERRY FENERTY                                    DOCUMENT AND MODIFY
```

```
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE FPOSIT (X,Y)

C       THIS SUBROUTINE POSITIONS THE GRAPHICS CURSOR AT X/Y POSITION X,Y

        LOGICAL PSLAST
        COMMON /PSLAST/ PSLAST,XPOS,YPOS
        LOGICAL SAVEXY
        COMMON /STMSGS/ XPREV,YPREV,IRESSQ,XSAV,YSAV,SAVEXY

C ***** VERY SHORT VECTORS HAVE BEEN DISABLED COMPLETELY
C ***** THIS CAN CAUSE HOLES IN LINES AND ELIMINATE SMALL ISLANDS
C ***** TO REENABLE, PUT THE FOLLOWING IF BLOCK BACK IN

        IF (SAVEXY) THEN
            IRESSV=IRESSQ
            IRESSQ=0
            CALL FDRAWV(XSAV,YSAV)
            IRESSQ=IRESSV

        ENDIF

        XPREV = X
        YPREV = Y

        XPOS = X
        YPOS = Y
        PSLAST = .TRUE.

        RETURN
        END

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     FSHOWA
C
C FUNCTIONAL DESCRIPTION:        .
C
C CALLED BY:                     GEOCON
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine fshowa

c       show area menu function

        logical found
        character * 25 retstr, tmpstr
        common /mapdat/ mdraw,ovdraw
        logical mdraw,ovdraw
        logical map
```

```
        common /mapdbc/ map
        INTEGER QNMPTS,QSHADE(60)
        REAL QLATT(60),QLONN(60)
        COMMON /FILLS/ QNMPTS,QLATT,QLONN,QSHADE

        CHARACTER*3 QLABEL
        COMMON /LABEL/ QLABEL
        CHARACTER TYPEC
        common /bounds/ parms
        real parms(4)
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
c
c               show area by name
                QNMPTS = 0
  170           continue
                irchar = 25
                retstr = '                         '
                CALL PROMPT(270,retstr,25,irchar)
                IF (map) print*,'name -- ',retstr(1:irchar),irchar
                tmpstr = retstr
                if (irchar.gt.0) then
                    call mesg (271)
                    call shownm (retstr,irchar,parms,found,TYPEC)
                    IF (map) print*,'name2 -- ',retstr(1:irchar),irchar
                    if (found) then
c
c                       typec values :
c                           ' ' - country
c                           'S' - state
c                           'C' - Continent
c                           'W' - body of water
c
c                       lton values :
c                            (2) - political bound.
c                            (3) - internal bound.
c
                        if (typec.eq.' ') then
                            lton(2) = .true.
                            lton(3) = .false.
                        else if (typec.eq. 'S' .or. typec.eq. 's') then
                            lton(2) = .true.
                            lton(3) = .true.
                        else if (typec.eq. 'C' .or. typec.eq. 'c') then
                            lton(3) = .false.
                        endif
                        call calmap (parms)
                        qlabel = 'GEO'
                        call drwmap
                    else
                        call mesg (273)
c***                    go after another name if not found
```

Jul 20 13:31 1989 card .f Page 73

```
                        go to 170
                    endif
                endif
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    FUDGEX
C
C FUNCTIONAL DESCRIPTION:       .
C
C CALLED BY:                    CREATM
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine fudgex (xval)

c       fudge the x coordinate in menu files to fit with the square
c       coordinate system

        common /commen/xllmen,yllmen,xurmen,yurmen,ibcmen,iocmen,incmen
        logical sys
        common /sysdbc/ sys

c       fudge factor indicates chosen x coordinate system logical width
        data fudgef/20./

        xnval = xval * (xurmen - xllmen) / fudgef

        if (sys) print*,'fudgex -- ',xval,xnval,fudgef,xurmen,xllmen

        xval = xnval

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   GEOWIN
c
c  Functional Description:
c       this subroutines sets the geographics area window
c
c  Input Files/Parameters:
C       xllgeo,yllgeo               The lower left X,Y point
C       xurgeo,yurgeo               The upper right X,Y point
c
c  Output Files/Parameters:
c
c  Subroutines/Functions Called:
c       Note: Subroutines preceded by a "j" are explained in the DI-3000 manual.
c
```

```
c  Called By:                    ANNOTA, BOXARE, CHKSIZ, CLRGRA, DOVERL,
C                                FOVERL, GLTYPE, LLSHOW, MAPPER
C                                OFFST,  SEGHND, TKINFO, TXWRIT,
C                                DSPCLS, STORCL
c
c  Local Variables:             N/A
c
c  Restrictions:                N/A
c
c  Abnormal Return Conditions: N/A
c
c  Location:   /a21/dave
c
C  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine geowin
c
c      this subroutines sets the geographics area window
c
       common /gphwdo/xllgeo,yllgeo,xurgeo,yurgeo
c
       call jwindo (xllgeo,xurgeo,yllgeo,yurgeo)
c
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GETARC
C
C FUNCTIONAL DESCRIPTION:       .
C
C CALLED BY:                    APARCS
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

       subroutine getarc(iarray,xsave1,ysave1,xsave2,ysave2,xsave3,
     +       ysave3,numarc)

c      This routine loads the points from iarray into the appropriate
c        arrays so the same routines used to create the arcs
c        may be used for redrawing.  The points for the first
c        4 arcs are in iarray previously read.  If more than three
c        arcs are to be drawn, the next record in the file is read
c        in.  Arcs 5 to 8 are in the second "record."  The points
c        of the last 4 arcs are in the last "record" which may
c        be read in.
c     VARIABLES:
c        xsaveX/ysaveX- arrays to be loaded with points of the arcs.
c        iarray- array passed from calling routine
c        common block ifls- logical unit numbers for files being accessed
c        numarc- number of arcs to get points for (stored in iarray(2))
```

```
c   CALLS:      reademi
c   PROGRAMMER:  Nancy Detrich, A215, March, 1984
C------  MODIFIED BY A692 FOR COMPLETION


        real xsave1(*),ysave1(*),xsave2(*),ysave2(*)
        real xsave3(*),ysave3(*)
        integer iarray(*),numarc
        common/ifls/newifl,oldifl
        integer newifl, oldifl

        numarc = iarray(2)

        j = 3
        do 100 i = 1, numarc
          xsave1(i) = REAL(iarray(j))
          ysave1(i) = REAL(iarray(j+1))
          xsave2(i) = REAL(iarray(j+2))
          ysave2(i) = REAL(iarray(j+3))
          xsave3(i) = REAL(iarray(j+4))
          ysave3(i) = REAL(iarray(j+5))
c         increment counter beyond the 5 just read in iarray
          j = j + 6

          if ((i.eq.4 .or. i.eq.8).and.i.ne.numpts) then
c           must read next record before able to continue loading arrays
            call readem (oldifl,iarray,26,ierror)
            j = 1
          endif
  100   continue
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   GETCIR
C
C FUNCTIONAL DESCRIPTION:       .
C
C CALLED BY:                    APCIRC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine getcir(iarray,radius,xcentr,ycentr)

c       this routine loads the radius and x and y coordinate arrays
c       of the circles written to the savefile.  If necessary, multiple
c       records are read in to restore the arrays (limited to dimensions
c       set in apcirc for the arrays being restored).
c    VARIABLES:
c       iarray- record already read in by drwicn or drawic routine
c       radius,xcentr,ycentr- arrays to be loaded and passed back
c         to the calling routine
```

Jul 20 13:31 1989 carc .f Page 76

```
c       numcir- number of circles saved in file
c       maxlen- maximum number of "points" stored in one record
c       common block ifls- logical unit numbers for files being accessed
c   CALLS:      readem
c   PROGRAMMER:  Nancy Detrich, A215, March, 1984

        integer iarray(*)
        real radius(*),xcentr(*),ycentr(*)
        integer numcir,maxlen
        common/ifls/newifl,oldifl
        integer newifl,oldifl
        data maxlen/26/

        numcir = iarray(2)
        j = 3
        do 100 i= 1,numcir
          radius(i) = FLOAT(iarray(j))
          xcentr(i) = FLOAT(iarray(j+1))
          ycentr(i) = FLOAT(iarray(j+2))
          j = j+3
c         eight circles are stored in each record-- read the next one
          if(MOD(i,8) .eq. 0) then
            call readem(oldifl,iarray,maxlen,ierror)
            j = 1
          endif
 100    continue
        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   getcmd
c
c  Functional Description:
c       get next command
c
c  Input Files/Parameters:
c
c  Output Files/Parameters: N/A
c
c  Subroutines/Functions Called:
c
c  Called By:                   CMDMAI, STATEC
c
c  Local Variables: N/A
c
c  Restrictions: N/A
c
c  Abnormal Return Conditions:  N/A
c
c  Location:
c
c  Programmer       Date of Last Change     Reason for Change
C  L. McCleary      Jan 1988                delete call xcolor - getcmd
c
```

Jul 20 13:31 1989 car ·.f Page 77

```
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine getcmd
c
c       this subroutine gets a command line
c
        logical eol,eoc
        common /comnds/ lenl,indxw,lenw,eol,eoc
        character * 80 comlin
        common /comlin/ comlin
        common /oldwrd/ indxwo,lenwo
        common /colorm/ nonsel,iselec
c
c       lenl -- length of command line
c       indxw -- index in command line of current word
c       lenw -- length of current word
c       indxwo -- index in command line of previous word in line
c       lenwo -- length of previous word in line
c       eol -- indicates end of command line (no more words)
c       eoc -- indicates end of current command (a delimiter)
c       comlin -- command line that is input
c
c       print*,'getcmd -- enter'
c        call xcolor (nonsel)
        call prompt(1246,comlin,80,irchar)
        lenl = irchar
        if (irchar.gt.0) then
            call tocaps (comlin,lenl)
            eol = .false.
            eoc = .false.
            indxw = 1
            lenw = 0
            indxwo = 0
            lenwo = 0
        else
c ----- updated 7/31/87 CSL
            eol = .true.
            eoc = .true.
            indxw = 0
        endif
c       print*,'getcmd -- exit ',lenl,'  ',comlin(1:lenl)
c
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    getfnm
c
c  Functional Description:
c       get a file name from the command line (or default) for read_keys
c
c  Input Files/Parameters:
c
c  Output Files/Parameters: N/A
c
```

```
c  Subroutines/Functions Called:
c      Note: Subroutines preceded by a "j" are explained in the DI-3000 manual.
c
c  Called By:                     INIGRA
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine getfnm (lennam,filnam)

c       get a file name from the command line (or default) for read_keys

        character*80 filnam
        character*80 argume

        call getarg (lenarg,argume)
c       print*,'getfnm -- ',lenarg,'  ',argume(1:lenarg)
        if (lenarg.gt.0) then
            lennam = lenarg
            if (lennam.gt.80) lennam = 80
            filnam(1:lennam) = argume(1:lennam)
        else
            lennam = 9
            filnam(1:lennam) = 'read_keys'
        endif

        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       GETICN
C
C FUNCTIONAL DESCRIPTION:          .
C
C CALLED BY:                       CREATM, PLOTOV
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine geticn(outcol,filcol,scalex,scaley,x,y,icnnam,
     +           miror,rot)

c      this routine is called by the prototype whenever
c       an icon is to be drawn.  The viewport and window must
c       be set prior to the call, and this routine uses the
```

```
c       x and y values to place the icon and the scale to
c       to size the icon--the points are changed by the
c       chgpts routine before the draws in the 'ap' routines.
c       A segment must also be open for the icon to be put in.
c       The icon is drawn in the color outcol and filled
c       with the color filcol (it is not filled if filcol = 0).
c       This routine calls drwicn which reads the requested
c       icon file and calls other routines (apline,apcirc,etc.)
c       which actually have the moves and draws for the icons.
c       A scalefactor of 1 will give an icon with points in
c       the range from 0 to 100 in world coordinates.
c     VARIABLES:
c       outcol- index of outline color
c       filcol- index of fill color
c       miror -integer flag to indicate if the points are to be mirrored
c            0= mirror the x array, 1= mirror the y array,
c            2= do not mirror the points
c       scalex- scalefactor to be used on the x coordinates
c       scaley- scalefactor to be used on the y coordinates
c       x/y- the coordinates to be used to position the icon
c          (will be place in the chgit common area as offsets
c       icnnam- name of the icon to be drawn
c       common block device- selected display device for pausing
c       common block chgit- parameters set for changing points
c            in a file (mirror,scalefactors and offsets)
c   CALLS:    loadic drwicn
c   PROGRAMMER:  Nancy Detrich, A215, March, 1984
C------  MODIFIED BY A692 FOR COMPLETION
c   Modified by M. Bloom, T333 June 1987 to position icons by
c         center point rather than lower left corner.

        integer outcol,filcol,miror
        real scalex,scaley,x,y
        integer qdsdev,qpydev,qecho,qlecho
        common /device/ qdsdev,qpydev,qecho,qlecho
        common /chgit/ mirflg,xscale,yscale,xoffst,yoffst,rotang
        real xscale,yscale,rotang
        integer xoffst,yoffst,mirflg
        integer icnnam
        logical sys
        common /sysdbc/ sys
        common /icold/ icold
        real rot

c ---- initialize rotation angle
        data icold /-1/

        if (sys) print*,'GETICN -- enter',icnnam,icold
        if (icnnam.ne.icold) then
            icold = icnnam
c           load current icon into tables
            call loadic (icnnam)
        endif
c       set parameters in common area to be used by chgpts
c         routine for drawing the icon in the right place
c         and scaled appropriately
```

Jul 20 13:31 1989 car( .f Page 80

```
      mirflg = miror
      rotang = rot

      xscale = scalex
      yscale = scaley

c     must negate points here to accommodate the chgpts routine
clj      xoffst = -(INT(x + 0.5))
clj      yoffst = -(INT(y + 0.5))

c  THE FOLLOWING MAKES AN X AND Y OFFSET FOR THE ICON.
c  THE -100 WAS ADDED FOR POSITIONING THE ICONS BY THE
c  CENTER POINT RATHER THAN THE LOWER LEFT.

      if (miror.eq.2) then
         xoffst = -(INT(x + 0.5))
         yoffst = -(INT(y + 0.5))
      elseif (miror.eq.1) then
         xoffst = -(INT(x + 0.5))
         yoffst = (INT(y + 0.5)) - 100
      else
         xoffst = (INT(x + 0.5)) - 100
         yoffst = -(INT(y + 0.5))
      endif


c     set scale factor to 1 if 0 was sent so an icon may be seen
      if (scafac .eq. 0.) scafac = 1.

c     set the color for the prototype
      call xcolor(outcol)

c     draw the icon and fill it with the appropriate color
      call drwicn(filcol,outcol)

      if (sys) print*,'GETICN -- exit'

      return
      end

C+*+*+*+*+*+*+*+*+*+*+*+*+*+*+*+*+*+*+*+*+*+*+*+*+*+*+*+*+*+*+*+*+*|*+*+*+*+
C UNIT NAME: GETLL
C
C FUNCTIONAL DESCRIPTION:  EXTRACTS NUMERICAL PORTION OF DDMMSSN/E STRING,
C                          DETERMINES SIGN AND CALLS FOR CONVERSION TO RADIANS.
C
C INPUT FILES/PARAMETERS:
C
C       STRNG                 CHAR*(*)    LAT/LONG STRING.
C       LEN                   INTEGER     LENGTH OF STRING.
C       NST                   CHAR(4)     TABLE OF EITHER N,S OR E,W.
C
C GLOBAL VARIABLES : NONE.
C
C OUTPUT FILES/PARAMETERS:
```

Jul 20 13:31 1989 car .f Page 81

```
C
C        LAT                    REAL*8      LATITUDE OR LONGITUDE.
C        INDX                   INTEGER     INDICATES WHERE DIRECTION INDICATOR
C                                           (N,S,E,W) WAS FOUND IN STRING.
C        IERROR                 INTEGER     ERROR CONDITION.
C
C SUBROUTINES/FUNCTIONS CALLED :
C
C        LLCONV                 CONVERTS DDMMSS TO A LAT OR LONG VALUE.
C
C CALLED BY: LLTORD.
C
C LOCAL VARIABLES:
C
C        CLAT                   REAL*8      LATITUDE OR LONGITUDE (DDMMSS).
C
C RESTRICTIONS: NONE.
C
C ABNORMAL RETURN CONDITIONS:   NONE.
C
C LOCATION:                     /a21/gjf/A21GEO.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE GETLL (STRNG,NST,LAT,INDX,LEN,IERROR)

C     GET A LAT OR LON VALUE FROM A PARAMETER STRING

      CHARACTER*(*) STRNG
C      REAL*8 LAT,CLAT
      REAL LAT,CLAT
C      REAL*8 LLCONV
      REAL LLCONV
      CHARACTER NST(4)

C  SEARCH FOR DIRECTION INDICATOR

      DO 110 I=1,4

          INDX = INDEX (STRNG(1:LEN),NST(I))
          IF (INDX.GT.0) GO TO 115

  110 CONTINUE

      IERROR = 1
      GO TO 190

  115 CONTINUE

      IF (I.GT.2) THEN
```

```
            ISIGN = -1
         ELSE
            ISIGN = 1
         ENDIF
         READ (STRNG(1:INDX-1),1115,ERR=182) CLAT
 1115    FORMAT(F10.0)
         CLAT = CLAT + .5
         LAT = LLCONV (CLAT,ISIGN)
         GO TO 190
  182       CONTINUE
            IERROR = 2
  190    CONTINUE
         RETURN
         END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GETMARK
C
C FUNCTIONAL DESCRIPTION:       .
C
C CALLED BY:                    PLTDAT
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine getmark(track,marker,posit,exist,timbuf)

        logical exist

        character*1 ucalpha(26)
        character*1 lcalpha(26)
        character*1 nums(9)
        character*2 marker
        character*9 timbuf

        integer*4 tmpmk1
        integer*4 tmpmk2
        integer*4 maxalp
        integer*4 maxlst
        integer*4 posit
        integer*4 track

c       posit- element of track in the table
c       exist- logical is true if track already exists , false if
c              is a new track (output parameter).
```

Jul 20 13:31 1989 car .f Page 83

```
c       actmrk - list of markers that are currently active on the system
c       mrkcnt - count of number of these markers (and, by correlation,
c                the count of # of tracks in the system currently.
c                Initialized to 0 in fmain.
c       trklst - list of all currentl track numbers in the system
c
c       marker assignment scheme is as follows:
c
c       A-Z, a1-z1, a2-z2, a3-z3,...,a9-z9, <recycle>
c
c       Total number of unique markers = 260
c
c
        integer*4 trklst(260)
        integer*4 curseg(260)
        integer*4 mrkcnt
        character*2 actmrk(260)
        character*9 boxdtg(260)
        logical  boxvis(260)
        common /actmrk/ trklst,mrkcnt,actmrk,curseg,
     +                  boxdtg,boxvis

        data maxalp /26/
        data maxlst /260/
        data nums    /'1','2','3','4','5','6','7','8','9'/
        data ucalpha /'A','B','C','D','E','F','G','H','I','J','K','L',
     +               'M','N','O','P','Q','R','S','T','U','V','W','X',
     +               'Y','Z'/
        data lcalpha /'a','b','c','d','e','f','g','h','i','j','k','l',
     +               'm','n','o','p','q','r','s','t','u','v','w','x',
     +               'y','z'/

        i = 0
c
c       search for the track number found in the active track number list
c       (mrkcnt initialized to 0 in fmain)
c
 100  i = i + 1
      if (i .le. mrkcnt .and. track .ne. trklst(i)) goto 100

        posit = i
c
c       if this track number is already on current list,
c       use the same marker that was previously used for this track number
c       and set exist to true
c       change current date time group of most recent plot for that track.

        if (track .eq. trklst(i)) then
            marker = actmrk(i)
            exist = .true.
c
c       only switch box value if it is newer than the one
c       already there.
c
            if (timbuf .gt. boxdtg(i)) then
               boxdtg(i) = timbuf
```

Jul 20 13:31 1989 car ·.f Page 84

```
            endif

        else
c
c           if this track number is not currently on list, generate a new
c           marker and put both the track number on the trklist and the
c           new marker on the actmrk list, set exist to false
c           and set most recent date time group for that track.
c
            exist = .false.
            mrkcnt = mrkcnt + 1
            if (mrkcnt .eq. maxlst) then
                mrkcnt = 1
            endif
            posit = mrkcnt
            if (mrkcnt .le. maxalp) then
                 marker = ucalpha(mrkcnt) // ' '
            else
                 tmpmk1 = mod(mrkcnt,maxalp)
                 tmpmk2 = mrkcnt / maxalp
                 marker = lcalpha(tmpmk1) // nums(tmpmk2)
            endif
            actmrk(mrkcnt) = marker
            trklst(mrkcnt) = track
            boxdtg(mrkcnt) = timbuf
       endif
       return
       end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   GETPTS
C
C FUNCTIONAL DESCRIPTION:       .
C
C CALLED BY:                   APFILL. APLINE, APMARK, APRECT, APSMOO
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine getpts(iarray,numpts,xarray,yarray)

c       iarray is passed from the read in the drawic (passed through either
c         apsmoo or apline) and the number of points and the first 12
c         points are loaded from that record.  If necessary, up to 2 more
c         records are read in and the points loaded into the appropriate
c         x and y arrays to be used in the redrawing of the curve or line.
c      VARIABLES:
c         xarray/yarray- arrays to be loaded with coordinates from file
c         iarray- holds coordinates read from file
c         numpts- number of points to be read from the file
c         ierror- integer flag set if error occurs during read
c         ifl- logical unit number of the file to be accessed
c   CALLS:     readem
c   PROGRAMMER:  Nancy Detrich, A215, March, 1984
```

Jul 20 13:31 1989 car ?.f Page 85

```
      real xarray(*),yarray(*)
      integer iarray(*),numpts,i,j,ifl,ierror

      numpts = iarray(2)

c     start loading arrays from third position of iarray
      j = 3
      do 100 i = 1, numpts
        xarray(i) = REAL(iarray(j))
        yarray(i) = REAL(iarray(j+1))

        if ((i.eq.12 .or. i.eq.25).and.i.ne.numpts) then
c         must read next record before able to continue loading arrays
          ifl = 10
          call readem (ifl,iarray,26,ierror)
c         reset to -1 so it will be 1 at the beginning of the loop
          j = -1
        endif
c       increment counter for iarray past saved points
        j = j + 2
  100 continue
      return
      end

C+*+*+*+*+*+*+*+*+*+*+*+*+*+*+*+*+*+*+*+*+*+*+*+*+*+*+*+*+*+*+*+*+*+*|*+*+*+*+
c* UNIT NAME:  getseg
c*
c* FUNCTIONAL DESCRIPTION:  a subroutine to generate a one-up segment name
c*
c*
c* INPUT FILES/PARAMETERS:
c*
c*
c* OUTPUT FILES/PARAMETERS:     qsegnm       generated segment number
c*
c* SUBROUTINES/FUNCTIONS CALLED:
c*
c* CALLED BY:                   ANNOTA, AREAFL, CHKSIZ, CURBOX, DISTAN
C                               DOVERL, DRWAMP, FOVERL, INIPIC
C                               LLSHOW, MAPOVR, MESGJF,RECDIS, SAVDIS,
C                               SEGMAP, SETFAD, TKINFO, TXWRIT, DSPCLS
c*
c* LOCAL VARIABLES:
c*
c* RESTRICTIONS:  qsegnm must be within the range 1100 < qsegnm < 32767
c*
c*
c* ABNORMAL RETURN CONDITIONS:  n/a
c*
c*
c* PROGRAMMER:  Sue Ferris      DATE OF LAST CHANGE     REASON FOR CHANGE
c*              Dave            11/1/84      put limits of segment numbers in *
c*                                           common area /getseg/
```

```
Jul 20 13:31 1989  car  `.f Page 87

C FUNCTIONAL DESCRIPTION:          .
C
C CALLED BY:                       CALCPR, CMDMAI, DECDET, DECSCA, DRAWST,
C                                  ERASES, EXECUT, INCDET, INCSCA,
C                                  INQSTA, MAJORS, MINORS, REMOVF, SAVEST,
C                                  SCENTE, SETSCA, SPROJE, SSCALE, TURNST
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*

        subroutine getwrd
c
c       this subroutine gets the next command word
c
        logical eol,eoc
        common /comnds/ lenl,indxw,lenw,eol,eoc
        character * 80 comlin
        common /comlin/ comlin
        common /oldwrd/ indxwo,lenwo
c
c       print*,'getwrd -- enter',indxw,lenw
        indxwo = indxw
        lenwo = lenw
        indxw = indxw + lenw
c       look for the first non-blank char or end of line
  100   continue
c ----- updated 7/31/87 CSL                              - getwrd
            if (indxw.gt.lenl) go to 170
            if (lenl.eq.0) go to 170
            if (comlin(indxw:indxw).ne.' ') go to 110
c            if (indxw+1.gt.lenl) go to 170
            indxw = indxw + 1
            go to 100
  110   continue
c       look for end of word, command or line
        lenw = 1
  120   continue
            if (indxw + lenw.gt.lenl.or.
     +      comlin(indxw + lenw:indxw + lenw).eq.' ') go to 190
            lenw = lenw + 1
            go to 120
  170   continue
            indxw = lenl
            eoc = .true.
            eol = .true.
  190   continue
c       print*,'getwrd -- exit',indxw,lenw,eoc,eol
c
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*
C UNIT NAME:                       GLTYPE
C
```

Jul 20 13:31 1989 car( .f Page 88

```
C FUNCTIONAL DESCRIPTION:
C
C CALLED BY:                    AREAFL, DMAPII
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE GLTYPE (LTYP,ltonvl)

C       THIS SUBROUTINE SETS A NEW LINE TYPE VALUE IF NECESSARY

        INTEGER OFFSET,SEG

        INTEGER SEGNO,FIRSEG
        COMMON /SEGNO/ SEGNO,FIRSEG

        COMMON /LTYPS/ LTYPS
        COMMON /LTYPE/ LTYPE

        logical map
        common /mapdbc/ map
        logical bitmod
        common /bitmod/ bitmod
        logical oneflg
        common /oneflg/ oneflg
        integer prtchoi(2)
        common /prtchoi/ prtchoi


C       DATA LTYPS/-1/
        DATA OFFSET/250/

        if (ltonvl.gt.0) then
            segno = firseg + ltonvl
        endif
        CALL FLUSHB
        if (bitmod) then
            call jclose
        else
            CALL JRCLOS
        endif
        SEG = ltonvl
        call soverl
        if (.not.(oneflg.and.(prtchoi(1).eq.2))) then
          IF (SEG.GT.16) THEN
              CALL MESG(267)
          ELSE
              CALL MESG(SEG+OFFSET)
          ENDIF
        endif
        call enall
        CALL GEOWIN
        CALL GRAVPT
        IF (map)
     +      PRINT*,'IN GLTYPE OPENING SEGMENT # ',SEGNO
```

Jul 20 13:31 1989 car' .f Page 89

```
        if (bitmod) then
           call jopen
        else
           CALL JROPEN(SEGNO)
        endif
        LTYPE = LTYP
C***    COLOR MUST BE SET EACH TIME YOU OPEN NEW
C***    SEGMENT WITH DI-3000 -- GJF
C        IF (LTYPE.NE.LTYPS) THEN
           CALL XCOLOR (LTYPE)
           LTYPS=LTYPE
C        ENDIF

        RETURN
        END

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:    GRAVPT
c
c  Functional Description:
c       this subroutines sets the graphics area viewport
c
c  Input Files/Parameters:
C       xllgvp,yllgvp,xurgvp,yurgvp
c
c  Output Files/Parameters:
c
c  Subroutines/Functions Called:
c       Note: Subroutines preceded by a "j" are explained in the DI-3000 manual.
c
c  Called By:                ANNOTA, BOXARE, CHKSIZ, CLRGRA, DOVERL,
C                            FOVERL, GLTYPE, INIPIC, LLSHOW,
C                            LOGO,   MAKGRA, MAPPER, OFFST,  SEGHND,
C                            TKINFO, TXWRIT, DSPCLS, STORCL
c
c  Local Variables:       N/A
c
c  Restrictions:               N/A
c
c  Abnormal Return Conditions: N/A
c
c  Location:   /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine gravpt
c
c       this subroutines sets the graphics area viewport
c
        common /comgvp/ xllgvp,yllgvp,xurgvp,yurgvp
c
        call jvport (xllgvp,xurgvp,yllgvp,yurgvp)
c
```

Jul 20 13:31 1989 car( .f Page 90

```
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     GRDLAT
C
C FUNCTIONAL DESCRIPTION:        .
C
C CALLED BY:                     LLGRID
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine grdlat (lon,lonst2,loninc,lonstp,plat,frstpo,
     +     ylatof,dotem,latval)

c     draw one latitude grid line

      COMMON /CONST/ MAXVAL,RMPV,C,R,ERNM

      LOGICAL NEWONS,NEWSEQ
      LOGICAL ISINV
      LOGICAL DOTEM,FRSTPO
      COMMON /LABSON/ LABSON
      LOGICAL LABSON
      LOGICAL INVALI
      COMMON /INVALI/ INVALI
      CHARACTER*15 LABELS
      logical map
      common /mapdbc/ map
      DATA ITYPE/1/,LLEN/9/

      if (map) then
          print*,'  ',lon,lonst2,loninc,lonstp,plat,frstpo,
     +     ylatof,dotem
      endif

              NEWSEQ=.TRUE.

              DO 870 LONVAL=LON,LON+LONST2,LONINC

                  PLON=LONVAL*C
                  CALL INVTES (PLAT,PLON,ISINV)

                  IF (.NOT.ISINV) THEN

                      CALL LLTOXY (PLAT,PLON,X,Y)

                      IF (.NOT.INVALI) THEN

                          CALL CLIPXY (X,Y,NEWONS)

                          IF (LABSON.AND.FRSTPO.AND.NEWONS) THEN
```

```
                                  FRSTPO=.FALSE.
                                  IDEG=ABS(LATVAL)/60
                                  MIN=MOD(ABS(LATVAL),60)

                                  if (map) then
                                      print*,'ideg,min',ideg,min,latval
                                  endif

                                  IF (MIN.GT.0) THEN
                                      WRITE (LABELS,1825) IDEG,MIN
1825                                  FORMAT(I3,1X,I2,'''')
                                      LEN=LLEN
                                  ELSE
                                         IF(IDEG.LT.10) THEN
                                                  WRITE(LABELS,1821)IDEG
                                                  LEN=2
                                         ELSE
                                                  WRITE(LABELS,1822)IDEG
                                                  LEN=3
                                         ENDIF
 1821                                    FORMAT(I1)
 1822                                    FORMAT(I2)
                                  ENDIF

                                  IF (LATVAL.LT.0) THEN
                                      LABELS(LEN:LEN)='S'
                                  ELSE
                                      LABELS(LEN:LEN)='N'
                                  ENDIF

                                  call gtext (x,y+ylatof,itype,len,labels)

                              ENDIF

                              IF (DOTEM) THEN

                                IF (NEWONS) THEN
                                  CALL FPOINT(X,Y)
                                  IF (NEWSEQ) NEWSEQ=.FALSE.
                                ENDIF

                              ELSE
                                  CALL PROCPO (NEWSEQ,NEWONS,X,Y)

                              ENDIF

                          ENDIF
                      ENDIF
 870              CONTINUE

        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     GRDLON
```

```
Jul 20 13:31 1989 car(   .f Page 92

C
C FUNCTIONAL DESCRIPTION:          .
C
C CALLED BY:                       LLGRID
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine grdlon (lat,latst2,latinc,latstp,plon,frstpo,
     +      ylonof,dotem,lonval)

c       draw one longitude grid line

        COMMON /CONST/ MAXVAL,RMPV,C,R,ERNM

        LOGICAL NEWONS,NEWSEQ
        LOGICAL ISINV
        LOGICAL DOTEM,FRSTPO
        COMMON /LABSON/ LABSON
        LOGICAL LABSON
        LOGICAL INVALI
        COMMON /INVALI/ INVALI
        CHARACTER*15 LABELS
        logical map
        common /mapdbc/ map

        DATA ITYPE/1/,LLEN/9/

        if (map) then
            print*,'  ',lat,latst2,latinc,latstp,plon,frstpo,
     +      ylonof,dotem
        endif
                NEWSEQ=.TRUE.

                DO 840 LATVAL=LAT-LATST2,LAT,LATINC

                    PLAT=LATVAL*C
                    CALL INVTES (PLAT,PLON,ISINV)

                    IF (.NOT.ISINV) THEN

                        CALL LLTOXY (PLAT,PLON,X,Y)

                        IF (.NOT.INVALI) THEN

                            CALL CLIPXY (X,Y,NEWONS)
                            IF (LABSON.AND.FRSTPO.AND.NEWONS) THEN

                              FRSTPO=.FALSE.
                              IDEG=ABS(LONVAL)/60
                              MIN=MOD(ABS(LONVAL),60)

                              if (map) then
                                  print*,'ideg,min',ideg,min,lonval
                              endif
```

```
                                IF (MIN.GT.0) THEN
                                    WRITE(LABELS,1825) IDEG,MIN
 1825                               FORMAT(I3,1X,I2,'''')
                                    LEN=LLEN
                                ELSE
                                         IF(IDEG.LT.10) THEN
                                                  WRITE(LABELS,1821)IDEG
                                                  LEN=2
                                         ELSEIF (IDEG.LT.100)THEN
                                                  WRITE(LABELS,1822)IDEG
                                                  LEN=3
                                         ELSE
                                                  WRITE(LABELS,1823)IDEG
                                                  LEN=4
                                         ENDIF
 1821                                    FORMAT(I1)
 1822                                    FORMAT(I2)
 1823                                    FORMAT(I3)
                                ENDIF

                                IF (LONVAL.LT.0) THEN
                                    LABELS(LEN:LEN)='W'
                                ELSE
                                    LABELS(LEN:LEN)='E'
                                ENDIF

                                call gtext (x,y+ylonof,itype,len,labels)

  660                       ENDIF

                            IF (DOTEM) THEN

                              IF (NEWONS) THEN
                                CALL FPOINT(X,Y)
                                IF (NEWSEQ) NEWSEQ=.FALSE.
                              ENDIF

                            ELSE
                                CALL PROCPO (NEWSEQ,NEWONS,X,Y)

                            ENDIF

                          ENDIF
                      ENDIF

  840             CONTINUE

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: GTEXT
C
C FUNCTIONAL DESCRIPTION:  OUTPUTS CHARACTER STRING AT CURRENT POSITION.
```

Jul 20 13:31 1989 car ·.f Page 94

```
C
C INPUT FILES/PARAMETERS:
C
C       X                    REAL         X COORDINATE.
C       Y                    REAL         Y COORDINATE.
C       ITYPE                INTEGER      SIZE PARAMETER.
C       NCHARS               INTEGER      LENGTH OF STRING.
C       BBUF                 INTEGER(66)  STRING.
C
C GLOBAL VARIABLES : NONE.
C
C OUTPUT FILES/PARAMETERS:  NONE.
C
C SUBROUTINES/FUNCTIONS CALLED : NONE.
C
C CALLED BY:                   GRDLAT, GRDLON
C
C LOCAL VARIABLES: NONE.
C
C RESTRICTIONS: NONE.
C
C ABNORMAL RETURN CONDITIONS:   NONE.
C
C LOCATION:                    /a21/gjf/MAPSRC.FTN
C
C PROGRAMMER:                  DATE OF LAST CHANGE     REASON FOR CHANGE
C
C     DAVE NATION                                      ORIGINAL CODE.
C     JERRY FENERTY                                    DOCUMENT AND MODIFY
C                                                      FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE GTEXT (X,Y,ITYPE,NCHAR,BBUF)

C     THIS SUBROUTINE OUTPUTS A CHARACTER ARRAY TO THE
C     CURRENT POSITION OF THE GRAPHIC CURSOR OF TYPE ITYPE.

      CHARACTER*(*) BBUF

      logical sys
      common /sysdbc/ sys

      if (sys) print *,'in gtext'
      call flushb
      CALL JMOVE (X,Y)
      CALL J1STRG (BBUF(1:NCHAR))

      RETURN
      END
```

Jul 20 12:36 1989 carf in.f Page 1

```
C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    fmain
c
c  Functional Description:
C       CARICATURE and CELEBRATION main FORTRAN program.
c
c  Input Files/Parameters: N/A
c
c  Output Files/Parameters: N/A
c
c  Subroutines/Functions Called:
c      Note: Subroutines preceded by a "j" are explained in the DI-3000 manual
c
c  Called By: N/A
c
c  Local Variables: N/A
c
c  Restrictions: N/A
c
c  Abnormal Return Conditions:  N/A
c
c  Location:      /gl
c
c  Programmer        Date of Last Change       Reason for Change
c  L McCleary        Jan 1988               sep amp & sys - fmain
c  C.S. Lamb         Jan 1988               jclear logic - fmain
c
C-*-*-*-*-*-*-*-*-*-*-*-*-*-*-*-*-*-*-*-*-*-*-*-*-*-*-*-*-*-*-*-*-*-*-*-*|*-*-*-*-
C
        program fmain

C       main process for CARICATURE and CELEBRATION

        logical sys,txtsiz,metafl,nolabl,nologo,nobitm,malbox,batch
        logical vax,clr
        common /sysdbc/ sys
        common /txsdbc/ txtsiz
        common /metdbc/ metafl
        common /nlbdbc/ nolabl
        common /nlgdbc/ nologo
        common /nbtdbc/ nobitm
        common /mlbdbc/ malbox
        common /batdbc/ batch
        common /vaxdbc/ vax
        common /clrdbc/ clr
c       added by gre needed for calls to xsize
        common /txtsz/ txtsz
        real*8 dtor,stor
        common /dtor/ dtor,stor
        logical gmactv
        common /gmactv/ gmactv
        integer qdsdev,qpydev,qecho,qlecho
        common /device/ qdsdev,qpydev,qecho,qlecho
c       aspect ratio and virtual coordinate limits of viewspace
        common /aspect/ xaspec,yaspec,xvlow,xvhigh,yvlow,yvhigh
        character*50 defpth
```

Jul 20 12:36 1989 carf in.f Page 2

```
      common /defpth/ defpth
      common /lendef/ lendef
      character*50 chatmp
      integer prtchoi(2)
      common /prtchoi/ prtchoi
      character*12 mapcho
      integer mfln
      common /mapcho/mapcho,mfln
      common /tablet/ inpdev
c     legend world coordinates, colors
      common /commen/xllmen,yllmen,xurmen,yurmen,ibcmen,iocmen,incmen
      common /commvp/ xllmvp,yllmvp,xurmvp,yurmvp
      logical bitmod
      common /bitmod/ bitmod
      logical qmapup
      common /mapup/qmapup
      logical ampflg,graflg,keyflg,legflg,menflg,popflg,
     +    sysflg,worflg,af(8)
      common /areaon/ ampflg,graflg,keyflg,legflg,menflg,popflg,
     +    sysflg,worflg,af
      logical exitfl
      integer trkndx (1000)
      common /trkndx/ trkndx
      character*160 trkrec (1000)
      common /trkrec/ trkrec
      logical segact (1000)
      common /segact/ segact
      logical LABSON
      common /LABSON/ LABSON
      logical logoon
      common /logoon/logoon
      logical mailfl(6)
      common/mlflag/mailfl
      dimension ltypov(16)
      logical ltonov(16),rankt(26,16)
      common /maptoo/ ltypov,ltonov,rankt
      logical overfl
      common/oneflg/oneflg
      logical oneflg
      Integer qmnum,qoldm
      Integer qdarry(500)
      Common /b3/ qdarry,qmnum,qoldm
      logical mesgon(1299)
      common /mesgon/ mesgon
c     segopen is only used with carjs.ftn on apollo
      common /segopen/  segopen
      logical segopen
      common /msgold/ msgold,msgonm
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
     logical mbxflg
     common /mbxflg/ mbxflg
     logical MBXACT
```

Jul 20 12:36 1989 car: in.f Page 3

```
        common /MBXACT/ MBXACT, fstmsg

        mbxflg = .false.
 1      continue
c       initialize common variables with data statements or block data
         call inicom

c       initialize ctrl y testing on VAX only
c         call sictrly

        mapcho = 'default'
        mfln = 7
        ierror = 0
c       read file containing path names for default files & map
c       data along with idebug string
        call rpaths (8,'path.dat',ierror)
c       examine idebug and set up logicals
        call setdbg

        if (sys)
     +  print*,'default path : ',defpth(1:lendef),lendef,idebug

c       define function keys
         call defkeys

C       ASSIGN THE REQUESTED GRAPHICS TERMINAL

c       print*,'Enter display device number if other than 1'
c       print*,'   Current AED512 assignments:'
c       print*,'         1 - ttyhc'
c       print*,'         2 - tty05'
c       read(*,1100) idev
c1100   format(i5)
c       if (idev.gt.1) qdsdev = idev

C       INITIALIZE_GRAPHICS
        if (txtsiz) then
                txtsz = 0.8
        else
                txtsz = 2.0
        end if
        if (sys) print*,'fmain - calling INIGRA'
        dtor = DATAN (1.0D0)
        dtor = dtor / 45.D0
        stor = dtor / 3600.0D0
        call inigra(ierr)
        call jdpint(1)
        if (metafl) then
           call inigm
           gmactv = .true.
        else
           gmactv = .false.
        endif
        if (nolabl) then
          labson = .false.
        else
```

Jul 20 12:36 1989 carf in.f Page 4

```
          labson = .true.
        endif
        CALL JASPEK (qdsdev, RATIO)
        if (ratio.lt.1.) then
            xaspec = 1.
            yaspec = ratio
        else
            xaspec = ratio
            yaspec = 1.
        endif
        xvlow = -1.
        xvhigh = -1.+2.*xaspec
        yvlow = -1.
        yvhigh = -1.+2.*yaspec
        call jvspac (xvlow,xvhigh,yvlow,yvhigh)
        call saveco
C        call adjust
        chatmp = defpth(1:lendef) // 'default'
        lentmp = lendef + 7
        if (sys)  print*,'default path : ',chatmp(1:lentmp)
        call rbound (lentmp,chatmp)
c**     next two stmts were uncommented out 16aug - cas **
        call rconfg (lentmp,chatmp)
        call rcolor (lentmp,chatmp)
        call rsavpr (lentmp,chatmp)
        if (sys) print*,'Fmain -- calc vps'
        chatmp = defpth(1:lendef) // mapcho
        lentmp = lendef + mfln
        call rparam (lentmp,chatmp,.true.,ierror)

c       calculate viewport parameters
        call calgvp
        call calcvp
        call calavp
        call calbvp
        call calmvp
        call calkvp
        if (vax)        CALL JESCAP(9801,1,0,1,0)
        if (batch)      CALL JBGBAT(0)
        if (sys) print*,'Fmain -- make segm'
c**** CSL erase 10/87
c*** following calls recommended in inipic for Sun version *******
c +++++++++++++++++++++++++++++++++++++++++++++++++++++++++
        if (.not. clr) then
c       clear areas and make retained segments
            call makful
            call makgra
            call makmen
            call makcom
            call makamp
            call makkey
            call makbox
            call maksho
        endif
c +++++++++++++++++++++++++++++++++++++++++++++++++++++++++
        if (sys) print*,'Fmain -- enable dev'
```

Jul 20 12:36 1989 carf in.f Page 5

```
        call jienab (qdsdev,1,qpydev)
        call jienab (qdsdev,2,inpdev)
        call jienab (qdsdev,4,qpydev)
        call jienab (qdsdev,5,inpdev)
        if (nologo) then
         logoon = .false.
        else
         if (sys) print*,'Fmain -- call logo'
         logoon = .true.
c**** CSL erase 10/87
c*** following call recommended in inipic for Sun version *******
         if (.not. clr) call logo
        endif
        xllmen = 0.
        xurmen = 17.
        yllmen = 1.
        yurmen = 43.
c       set aspect ratio of menu world coordinates so the units are square
        xurmen = xllmen +
     +  (xurmvp - xllmvp) * (yurmen - yllmen) / (yurmvp - yllmvp)
        if (sys)
     +  print*,'fmain -- Menu World C.',xllmen,xurmen,yllmen,yurmen
        call init
        if (sys) print*,'after init'
        do 155 i=1,6
              if(mailfl(i))then
                    ltonov(i)=.true.
                    overfl =.true.
              end if
 155    continue
        if (.not. nobitm) then
                if (bitmod) then
                    call recdat (chatmp,lentmp)
                    call mapper (.false.)
                    CALL MAPOVR
                    qmapup = .true.
                endif
        else if(malbox .and. mbxflg) then
                call drwmap
                qmapup = .true.
        endif
c**** CSL erase 10/87
c*** following call recommended in inipic for Sun version *******
        if (.not. clr)  call keys
        if (batch)      CALL JENBAT
        if (popflg) then
            call pmainmn (exitfl)
        else
          if (batch) CALL JBGBAT(0)
c          if(overfl)then
c                call doverl(ltypov,ltonov)
c                print*,'doverl in fmain'
c          endif
          if(mailfl(5))then
                prtchoi(1) = 2
                prtchoi(2) = 4
```

Jul 20 12:36 1989 carf in.f Page 6

```
              call printr
           endif
           call mhand
           if (batch) CALL JENBAT
        endif
        call jidisa (qdsdev,5,inpdev)
        call jidisa (qdsdev,4,qpydev)
        call jidisa (qdsdev,2,inpdev)
        call jidisa (qdsdev,1,qpydev)

C       SAVE_PARAMETER_FILE

c       call sparam (6,'noname',.true.,ierror)
        call wsavpr (lentmp,chatmp)

        if (metafl) call termgm
        CALL CLENUP
        if (sys) print*,'After clenup call'

        do 998 i = 1, numrcs
           if (trkndx(i) .eq. 0) then
              go to 999
           else
              print *, i,' ',segact(trkndx(i)),' ',trkrec(trkndx(i))
           end if
  998   continue
  999   continue
        if ((malbox) .and. mbxflg)then
             do 1000 i=1,500
                qdarry(i) = 0
 1000        continue
             do 1001 i=1,1299
                mesgon(i) = .false.
 1001        continue
             do 1002 i=1,16
                ltonov(i)=.false.
                lton(i) =.false.
                mailfl(i)=.false.
 1002          continue
             segopen = .false.
             msgold = -1
             msgonm = -1
             qmapup = .false.
             overfl=.false.
             goto 1
        endif

C    END_MAIN_PROCEDURE

        END
```

```
Jul 20 13:56 1989  carr  .f Page 1

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   help
c
c  Functional Description:
c       display help msg
c
c  Input Files/Parameters:
c
c  Output Files/Parameters: N/A
c
c  Subroutines/Functions Called:
c
c  Called By: helper
c
c  Local Variables: N/A
c
c  Restrictions: N/A
c
c  Abnormal Return Conditions:  N/A
c
c  Location:
c
c  Programmer       Date of Last Change      Reason for Change
C  L. McCleary      Jan 1988                 separate amp & sys - help
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine help(msgno,menun)
c
c      subroutine to display help msgs
c
       Logical qcancl,qext2m,qretrn,qstmnu
       Common /b1/ qcancl,qext2m,qretrn,qstmnu,qnextm
       character cchar
       character*50 menpth
       common /menpth/ menpth
       common /lenmen/ lenmen
       common /msgold/ msgold,msgonm
       integer mysegn,helpno
       character*26 flettr
       character*80 filenm
       character*4 fname
       logical rflag,eof,eom,ERROR
       integer qfb(26),qmb(4)
       common /butons/ qfb,qmb
       logical sys,frame
       common /sysdbc/ sys
       common /frmdbc/ frame
       common /cmxlin/maxlin

       data msginc,meninc,maxnum /50,25,26/

       data mysegn/303/
       data flettr/'abcdefghijklmnopqrstuvwxyz'/
       data fname/'help'/
       data lname/4/
```

Jul 20 13:56 1989 car' .f Page 2

```
      if (sys) print*,'help -- enter ',msgno,menun
      call clrmsg
      rflag=.false.
      ifl=17
      if (msgno.eq.1.or.msgno.eq.121) then
c             menu help
              if (sys) print*,'  menu help', menun
              indlet=menun/meninc+1
              if (indlet.lt.1) indlet=1
              if (indlet.gt.maxnum) indlet=maxnum
              filenm=menpth(1:lenmen)//fname(1:lname)//
     x              flettr(indlet:indlet)//'.men'
              lennam=lenmen+lname+5
              helpno=menun
      else
c             msg help
              if (sys) print*,'  msg help', msgno
              indlet=msgno/msginc+1
              if (indlet.lt.1) indlet=1
              if (indlet.gt.maxnum) indlet=maxnum
              filenm=menpth(1:lenmen)//fname(1:lname)//
     x                flettr(indlet:indlet)//'.msg'
              lennam=lenmen+lname+5
              helpno=msgno
      endif
c     print*,'file selected is ',filenm
      call openit(filenm,lennam,ifl,0,ierror)
      if (ierror.ne.0) go to 40
c     display 1st page of help msg
      if (sys) print*, '  display first page '
      rewind ifl
      call fndhlp(ifl,helpno,eof,eom)
      call disp5(ifl,eof,eom)
      lineno=1
      if (.not.eof) then
10        continue
c             input user option
              call mpick(ichoice,mysegn,ibuttn)
15            continue
              if (sys) print*,'  after mpick',
     +             ichoice,mysegn,ibuttn,qfb(15),qfb(16)
              if (ibuttn.eq.qfb(15)) then
c                     display the next page of help msg
c                     print*,'display next page'
                      if (.not.eom.and..not.eof) then
                              call disp5(ifl,eof,eom)
                              lineno=lineno+maxlin
                      endif
              else if(ibuttn.eq.qfb(16)) then
c                     display the previous page of help msg
c                     print*,'display previous page'
                      IF (LINENO.GT.1)  THEN
                          lineno=lineno-maxlin
                          rewind ifl
                          call fndhlp(ifl,helpno,eof,eom)
```

```
                              if (.not.eof) then
                                  do 20 i=1,lineno-1
                                          read(ifl,1000,err=30)cchar,msg
20                                continue
1000                              format(a1,a80)
                              endif
                              call disp5(ifl,eof,eom)
                          ENDIF
                  else if (ibuttn.eq.qfb(23)) then
                          call clrcom
                          call mesg(47)
                          call BUTTN(IBUT)
                          call clrmsg
                          rewind ifl
                          call fndhlp(ifl,helpno,eof,eom)
                          if (.not.eof) then
                                  do 60 i=1,lineno-1
                                          read(ifl,1000,err=30)cchar,msg
60                                continue
                          endif
                          call disp5(ifl,eof,eom)
                  else
                      if (frame) then
c*******                  temporarily do a jframe before processing unknown button
                          call jframe
                      endif
                      call subchk (ibuttn,mysegn,error,rflag)
                  endif
              if (.not.rflag) go to 10
              qretrn = .false.
              if (frame) then
c*******          temporarily do a jframe at end of help to clear screen
                  call jframe
              endif
          endif
c         if RETURN, leave help routine and redisplay previous menu and msg
          go to 50
30        continue
                  print*,'read error on msg file'
                  go to 50
40        continue
                  print*,'open error on message file',helpno,ierror
50        continue
          call closit(ifl)
          call clrcom
          call mesg(msgno)
          if (sys) print*,'help -- exit '
          return
          end


C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     helper
c
c  Functional Description:
c        performs help function by calling help with the current message
```

```
Jul 20 13:56 1989  car` `.f Page 4

c       and  menu numbers
c
c  Input Files/Parameters:
c
c  Output Files/Parameters: N/A
c
c  Subroutines/Functions Called:
c
c  Called By:                    CHECK, PAWS
c
c  Local Variables: N/A
c
c  Restrictions: N/A
c
c  Abnormal Return Conditions:  N/A
c
c  Location:      Apollo       /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine helper (menu)
c
c      performs help function by calling help with the current message and
c      menu numbers
c
       common /msgold/ msgold,msgonm
c
       msgno = msgonm
       call help (msgno,menu)
c
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    hilite
c
c  Functional Description:
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                    COLBAK, DETCON, FCFILL, PROCON, PRTMEN,
C                                RESCON, RSLCON, TRKCON, CLASSN
C                                FTRCON, GEOCON, OVRCON
c
c  Local Variables: N/A
c
c  Restrictions: N/A
c
```

Jul 20 13:56 1989 car! .f Page 5

```
c  Abnormal Return Conditions:  N/A
c
c  Location:      /a21/dave
c
c  Programmer         Date of Last Change        Reason for Change
c  L McCleary         Jan 1988                sep amp & sys - hilite
c
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine hilite (onflag,ichoic,width,len,table)

c     Highlight menu items

      integer ichoic,width,len,table(*),seg
      integer start,xend,array(19)
      real x1,x2,y1,y2,yhigh
      logical onflag,found
      common /commvp/ xllmvp,yllmvp,xurmvp,yurmvp
      common /commen/ xllmen,yllmen,xurmen,yurmen,ibcmen,iocmen,incmen
      logical sys,batch
      common /sysdbc/ sys
      common /batdbc/ batch

      IF (sys) then
            print*,' In Hilite '
            PRINT*,'ONFLAG = ',ONFLAG
            PRINT*,'ICHOIC = ',ICHOIC
            PRINT*,'WIDTH  = ',WIDTH
            PRINT*,'LEN    = ',LEN
      ENDIF
      IF (LEN .GT. 43) THEN
           PRINT*,' ERROR  IN PASSING PARAMETERS TO HILITE'
      ENDIF
c --- x1,y1,x2,y2 are calculated so as to draw a box around a menu
c --- item that is to be highlighted.-------------- <--- x=17.
c                                      |         |M |      y=43.
c                                      |GRAPHICS |EA|
c              ------------x2,y2       |AREA     |NR|
c              | Hilite  |             |         |UE|
c              | Box     |             |         | A|
c        x1,y1------------             -  x=0.-->----
c                                      |  y=1.      |
c                                      --------------
c
c --- The menu area goes from (0.,1.) to (17.,43.) (see diagram).
c --- The "y" values therefore range from 43. down to 1.  That means
c --- that 42 lines of text can fit in the menu area.  It has been
c --- estimated that 4 lines should be allowed for titles (at the top
c --- of the menu area) and 8 lines should be allowed for the con-
c --- struction box (the last 8 lines of the menu area).  That leaves
c --- 30 lines which are always available for menu items (15 double-
c --- spaced menu items).  Adjacent menu items are always supposed
c --- to be separated by a blank line to allow the highlight box to
c --- be drawn around the item.

c --- The following do loop searches each position of "table"
```

Jul 20 13:56 1989 carl .f Page 6

```
c --- looking for a match on "ichoic".  Since ichoic may be found
c --- in more than one position of table (i.e. the item may
c --- occupy more than one line in the menu), the starting position
c --- and ending position are saved in the appropriately named
c --- variables. (Note: the ending positioning is spelled "xend"
c --- because "end" is a reserved word in FORTRAN.)

      START = 1
      found = .false.
      do 50 i=1,len
         if (ichoic.eq.table(i)) then
            if (found) then
               xend = i
            else
               found = .true.
               start = i
               xend = i
            endif
         endif
   50 continue

c --- "yhigh" is the upper limit for the menu window in the
c --- y direction.
      yhigh = 43.

c --- If "ichoic" was found in "table", then calculate the lower
c --- left and upper right corners of the highlight box.
      if (found) then
         y2 = yhigh - (start - 1)
         y1 = yhigh - xend
c ------ The following adjustments are made so that the highlight
c ------ boxes of adjacent menu items do not touch (an adjustment
c ------ of 30% is made to the top and 40% to the bottom of each
c ------ box).
         y2 = y2 + .3
         y1 = y1 - .4
      endif


      if (width.eq.1) then
c ------ A "width" of 1 indicates that the menu item uses the
c ------ entire width of the menu area.
         x1 = .5
         x2 = 16.5
      elseif (width.eq.2) then
c ------ A "width" of 2 indicates that the menu item uses the
c ------ left quarter of the menu area (for color menus).
         x1 = .5
clj      x2 = 4.5
         x2 = 5.25
      elseif (width.eq.3) then
c ------ A "width" of 3 indicates that the menu item uses the
c ------ right quarter of the menu area (for color menus).
clj      x1 = 12.5
clj      x2 = 16.5
         x1 = 10.75
```

Jul 20 13:56 1989 carł .f Page 7

```
         x2 = 15.5
      elseif (width.eq.4) then
c ------ A "width" of 4 indicates that the menu item uses the
c ------ left half of the menu area.
         x1 = .5
         x2 = 8.
      elseif (width.eq.5) then
c ------ A "width" of 5 indicates that the menu item uses the
c ------ right half of the menu area.
         x1 = 9.
         x2 = 16.5
      endif

c --- Now draw the highlight box in the appropriate color (i.e. yellow
c --- to highlight and black to remove highlighting).

      call jvport (xllmvp,xurmvp,yllmvp,yurmvp)
      call jwindo (0.,17.,1.,43.)
c --- if requesting to turn segment on
      if (onflag) then
c ------ set segment number to a reserved hilite number
         if (width.eq.3) then
            seg = start + 31100
         else
            seg = START + 1019
         endif
c ------ if not already on  draw a rectangle as a hilite
         call jisgmt(seg,array)
         if (array(1) .eq. 0) then
            call jropen(seg)
            call jpintr (0)
            call xcolor (24)
            call jrect (x1,y1,x2,y2)
            call jrclos
            CALL JDETEC(seg,0)
         else
c ------ segment already on, do nothing
            if (sys) then
               print*,'TRYING TO HILITE ICHOIC ',ICHOIC,
     *         ',HOWEVER, CHOICE IS ALREADY ON '
            ENDIF
         endif

      else
c ------ requesting to turn segment off
         if (width.eq.3) then
            seg = start + 31100
         else
            seg = START + 1019
         endif
c ------ if it exists, purge it
         call jisgmt(seg,array)
         if(array(1) .eq. 1) then
          call jpurge(seg)
c          if (batch) then
              call jopen
```

Jul 20 13:56 1989 carh .f Page 8

```
                call jpintr (0)
c                call xcolor (8)
                call xcolor (ibcmen)
                call jrect (x1,y1,x2,y2)
                call jclose
c            endif
           if (sys) print*,'purging ',seg
          endif
      endif

      if (sys) print*,' Leaving Hilite ',START + 1019
      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     HILPLT
C
C FUNCTIONAL DESCRIPTION:        .
C
C CALLED BY:                     TKINFO
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine hilplt(lat,lon)
c
c
c     this subroutine hilites the plot at the input lat/lon to let the user
c     know which plot has been chosen for interrogation.  The hilite is a
c     diamond.
c

      character ewi
      character nsi
      character*7 lat
      character*8 lon
      integer*4 exlat
      integer*4 exlon
      real dx
      real dy
      real plat
      real plon
      real box
      real x
      real y
      logical isinv

c '
c***  seperate the lat/long numbers from the nsi/ewi indicators
c
      read(lat,10) exlat,nsi
 10   format(i6,a1)
      read(lon,20) exlon,ewi
 20   format(i7,a1)
```

Jul 20 13:56 1989 carl .f Page 9

```
      call lltor (exlat,exlon,nsi,ewi,plat,plon)
      call invtes (plat,plon,isinv)
      if (.not.isinv) then
c
c***        draw the diamond with the center around the plot
c
            call lltoxy (plat,plon,x,y)
            box = 6.
            dx = x
            dy = y - box
            call jmove (dx,dy)
            dx = x + box
            dy = y
            call jdraw (dx,dy)
            dx = x
            dy = y + box
            call jdraw (dx,dy)
            dx = x - box
            dy = y
            call jdraw (dx,dy)
            dx = x
            dy = y - box
            call jdraw (dx,dy)
      endif
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        HLDF
C
c FUNCTIONAL DESCRIPTION:           In CELEBRATION, HLDF is the
c                                   interface to high level display
c                                   files. This version is to give
c                                   CARICATURE similar capability
c                                   from the same calls to HLDF so
c                                   that different versions of many
c                                   modules don't have to be created
c                                   for each of the software packages
C
C CALLED BY:                        INIPIC, INTSCN, RPLSCN, CLASSN, STORCL
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine hldf(choice,action,segid,pickid,flag)
      integer   choice,action,segid,pickid
      logical   flag
      integer   iseg
      common/contrl/qclass
      logical       qclass
      common/gphwdo/qgxmin,qgymin,qgxmax,qgymax
      real         qgxmin,qgymin,qgxmax,qgymax
      common /comgvp/ xllgvp,yllgvp,xurgvp,yurgvp
```

Jul 20 13:56 1989 car) .f Page 10

```
        if(choice .eq. 1)then
c-----------    in CELEBRATION this retrieves next opcode
        else if(choice .eq. 2)then
c-----------    in CELEBRATION this builds opcode & puts it in table
c-----------    in CARICATURE just needs to redraw map
                flag=qclass
                call drwmap
                qclass=flag
                if(flag)call dspcls(iseg)
        else if(choice .eq. 3)then
c-----------    in CELEBRATION this puts locator in table
        else if(choice .eq. 4)then
c-----------    in CELEBRATION deletes something by segid
        else if(choice .eq. 5)then
c-----------    in CELEBRATION modifies something by segid
        else if(choice .eq. 6)then
c-----------    in CELEBRATION searches by opcode
        else if(choice .eq. 7)then
c-----------    in CELEBRATION deletes allitems of opcode
        else if(choice .eq. 8)then
c-----------    in CELEBRATION creates external HLDF file
        else if(choice .eq. 9)then
c-----------    in CELEBRATION clears HLDF tables
        else if(choice .eq. 10)then
c-----------    in CELEBRATION compacts storage
        else
                print*,'ERROR IN CHOICE TO HLDF'
        endif

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     hlsrgb
c
c  Functional Description:
c       converts hue/saturation/lightness color specifications to r/g/b
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:
c
c  Local Variables: N/A
c
c  Restrictions: N/A
c
c  Abnormal Return Conditions:  N/A
c
```

```
Jul 20 13:56 1989  carł  .f Page 11

c  Location:       /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine hlsrgb (icnt,ihue,isat,ilight,r,g,b)
c
c     converts hue/saturation/lightness color specifications to r/g/b
c
      integer ihue(1),isat(1),ilight(1)
      real r(1),g(1),b(1)
c
c     print*,'hlsrgb -- enter ',icnt,ihue(1),isat(1),ilight(1)
      do 110 i=1,icnt
          rhue = ihue(i)
          rt = isat(i)
          rsat = rt / 32768.
          rt = ilight(i)
          rlight = rt / 32768.
          if (rlight.gt.0.5) fact1 = rlight + rsat - (rlight *
     +      rsat)
          if (rlight.le.0.5) fact1 = rlight * (1.0 + rsat)
          fact2 = 2.0 * rlight - fact1
          r(i) = ddcval (fact2, fact1, rhue)
          g(i) = ddcval (fact2, fact1, rhue - 120.)
          b(i) = ddcval (fact2, fact1, rhue - 240.)
c         print*,ihue(i),isat(i),ilight(i),r(i),g(i),b(i)
  110 continue
c     print*,'hlsrgb -- exit ',r(10),g(10),b(10),ihue(10),
c    + isat(10),ilight(10),icnt
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  hlssav

c  Functional Description:
c       this subroutine saves color values in a table
c
c  Input Files/Parameters:

c  Output Files/Parameters: N/A

c  Subroutines/Functions Called:

c  Called By:                  RCOLOR

c  Local Variables: N/A

c  Restrictions: N/A

c  Abnormal Return Conditions:  N/A
```

```
Jul 20 13:56 1989  carr  .f Page 12

c  Location:      /a21/dave

c  Programmer        Date of Last Change        Reason for Change

C-*-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine hlssav (indx,hue,rlight,satur)

c       this subroutine saves color values in a table

        real hlscol(3,0:255)
        common /hlscol/ hlscol

        if (indx .ge. 0 .and. indx .le. 255) then
            hlscol(1,indx) = hue
            hlscol(2,indx) = rlight
            hlscol(3,indx) = satur
        endif

        return
        end

C+*+*+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ICBEZ
C
C FUNCTIONAL DESCRIPTION:       .
C
C CALLED BY:                    APSMOO
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine icbez (npol,xp,yp,xc,yc,npts)

c       this subroutine calculates the coordinates (xc,yc) for npts on
c       a bezier curve.  the input data are the npol points of the bezier
c       polygon given in (xp,yp).  the float function is used to convert
c       the integers to real values for calculations.
c    VARIABLES:
c       xc/yc- arrays loaded with the calculated points from this routine
c       xp/yp- arrays with the points from the savefile (user's points)
c       nbez/nlim/t/deltat- used in calculations
c       fact- factorial function--returns a real variable
c   PROGRAMMER:  Nancy Detrich, A215, March, 1984

        real xc(*),yc(*),xp(*),yp(*)
        integer nbez,nlim
        real t,deltat,fact

c       set the number of points to be calculated (fewer input points,
c           calculate more points to get a smooth curve)
c       CAUTION-- length of xc array is set to 34, so npts cannot be set
c           larger than that!!
        if (npol .le. 5) then
```

```
Jul 20 13:56 1989  carh  .f Page 13

          npts = 4 * npol
        else
          if (npol .le. 15) then
            npts = 2 * npol
          else
            npts = npol
          endif
        endif

c       the parametric iteration interval
        deltat = 1.0/float(npts-1)

c       first point of smooth line remains same as first point of polygon
        xc(1) = xp(1)
        yc(1) = yp(1)

c       the parameter nbez is one less than the number of points on the
c          polygon
        nbez = npol-1
        nlim = npts-1

c       calculate each point of the smooth line except first/last points
        do 2000 intep = 2,nlim
          t = (intep-1)*deltat
          xc(intep) = 0
          yc(intep) = 0

c         loop for each input point
          do 1000 j = 1,npol
            i = j-1
            bezbin = (fact(nbez))/(fact(i)*fact(nbez-i))
            bezwt = bezbin*(t**(i))*((1.0-t)**(nbez-i))

            xc(intep) = xc(intep)+xp(j)*bezwt
            yc(intep) = yc(intep)+yp(j)*bezwt
 1000     continue
 2000   continue

c       last point of smoothed line remains same as last point of polygon
        xc(npts) = xp(npol)
        yc(npts) = yp(npol)

        return
        end

C+*+*+*+*+*+*+*+*+*+*+*+*+*+*+*+*+*+*+*+*+*+*+*+*+*+*+*+*+*+*+*+*+*+*+*|*+*+*+*+
c   UNIT NAME:                        ICINIT
c
c   Functional Description:           Subroutine to initialize certain symbol
c                                     variables
c
c   Input Files/Parameters:
c
c      General Globals
c          qicolr       colors     integer   current interior color
```

Jul 20 13:56 1989 carh .f Page 14

```
c         qocolr       colors     integer   current outline color
c
c     Icon Globals
c         qicseg       icon       integer   segment number for icon appear-
c                                           ing the construction box
c         qiconx       icon       real      x position of icon
c         qicony       icon       real      y position of icon
c         qicmir       icon       integer   denotes direction in which icon
c                                           is mirrored (0=x; 1=y; 2=none)
c         qicszx       icon       real      scaling factor for x points of
c                                           icon
c         qicszy       icon       real      scaling factor for y points of
c                                           icon
c
c    Output Files/Parameters:  N/A
c
c    Subroutines Called:    N/A
c
c    Called By:                  INIPIC
c
c    Local Variables:   N/A
c
c    Restrictions:    N/A
c
c    Abnormal Return Conditions:   N/A
c
c    Location:       stepc03      /w3/ssb/prototype/icons/icinit.f
c
c    Programmer          Date of Last Change       Reason for Change
c       ssb                  3/08/84                 initial entry
c
C-*-*-*-*-*-*-*-*-*-*-*-*-*-*-*-*-*-*-*-*-*-*-*-*-*-*-*-*-*-*-*-*-*-*-*|*-*-*-*-

      subroutine icinit
c
      common/colors/qccolr,qicolr,qocolr
      integer qccolr,qicolr,qocolr
      common/icon/qicnum,qicseg,qiconx,qicony,qicszx,
     +            qicszy,qicrot,qicmir,qictyp,qconnx,qconny,
     +            qiconn
      integer qicnum(6),qicseg,qicmir,qictyp,qiconn
      real qiconx,qicony,qicszx,qicszy,qicrot
      real qconnx,qconny
      common/ictext/qictxt
      character*15 qictxt(8)

      qicseg=0

c   these have to be reset for symbols for release II,
c   otherwise the symbols use the color last set.

      qicolr = 104
      qocolr = 104

c    Set qiconx,qicony to 50,50 which is the center point
c    of the construction box.
```

```
      qiconx = 50.
      qicony = 50.
      qicszx = 1.
      qicszy = 1.
      qicrot = 0.
      qicmir = 2
      qiconn = 0
      qconnx = 0.
      qconny = 0.
      do 5 i = 1,8
         qictxt(i) = ' '
5     continue
      do 10 i = 1,6
         qicnum(i) = 0
10    continue
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       INCDET
C
C FUNCTIONAL DESCRIPTION:          .
C
C CALLED BY:                       STATEC
C
C PROGRAMMER:                      DATE OF LAST CHANGE     REASON FOR CHANGE
c  S. Lamb                       Feb 1988              command fix - incdet
C
C-*-*-*-*-*-*-*-*-*-*-*-*-*-*-*-*-*-*-*-*-*-*-*-*-*-*-*-*-*-*-*-*-*-*-*-*|*-*-*-*-
c
        subroutine incdet
c
c       this subroutine is the increase detail state interpreter (21)
c
        common /states/ nextst
        logical wordis,iseoc
        character*6 curwdb
        common /curwdb/ curwdb
        integer detail(6)
        common /detail/ detail
        character postfix(6)
        integer current
        integer i
        integer next
        data postfix/'a','b','c','d','e','f'/
c
c
        initls = nextst
c       do until nextst not = initial state
  100   continue
            call getwrd
c * ** *** **** ***** ****** ******* change check order, etc.
            if (wordis('SCALE')) then
                nextst = 23
```

```
Jul 20 13:56 1989  carl  .f Page 16

            else if (wordis('DETAIL').or.wordis('MAP')
     +               .or. iseoc()) then
c  ***            increase detail
                do 110 i=1,6
                     if(curwdb(6:6).eq.postfix(i)) then
                        current = i
                     endif
  110           continue
c               print*,'current state is ',postfix(current)
                next = current - 1
  120           continue
                if(next .gt. 0 .and. detail(next) .ne. 1) then
                     next = next - 1
                     goto 120
                else
                     continue
                endif
c               print*,'next level is ',postfix(next)
                if(next.gt.0) then
                     curwdb(6:6) = postfix(next)
                     call chawdb(6,curwdb)
                     nextst = 3
                else
c                     call drwamp(' ',1)                   - incdet
c ----- updated 7/31/87 CSL                                - incdet
                     call drwamp('Most detail already in use ',1)
                     nextst = 1
                endif
            else
c  ***            increase detail
                do 130 i=1,6
                     if(curwdb(6:6).eq.postfix(i)) then
                        current = i
                     endif
  130           continue
                next = current - 1
  140           continue
                if(next .gt. 0 .and. detail(next) .ne. 1) then
                     next = next - 1
                     goto 140
                else
                     continue
                endif
                if(next.gt.0) then
                     curwdb(6:6) = postfix(next)
                     call chawdb(6,curwdb)
                     nextst = 3
                else
c                     call drwamp(' ',1)                   - incdet
c ----- updated 7/31/87 CSL                                - incdet
                     call drwamp('Most detail already in use ',1)
                     nextst = 1
                endif
                call putwrd
            endif
        if (nextst.eq.initls) go to 100
```

Jul 20 13:56 1989 carh .f Page 17

```
c
       return
       end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     INCSCA
C
C FUNCTIONAL DESCRIPTION:        .
C
C CALLED BY:                     STATEC
C
C PROGRAMMER:                    DATE OF LAST CHANGE     REASON FOR CHANGE
c  S. Lamb                     Feb 1988              command fix - incsca
C
C-*-*-*-*-*-*-*-*-*-*-*-*-*-*-*-*-*-*-*-*-*-*-*-*-*-*-*-*-*-*-*-*-*-*-*-*|*-*-*-*-
c
       subroutine incsca
c
c      this subroutine is the increase scale state interpreter (23)
c
       common /states/ nextst
       logical wordis,iseoc
c      map parameters
       logical lton(16),dotem
       integer ipgrid(4),ltyptb(16)
       common /map/ XRNM,XC,YC,LEVEL,CLAT,CLON,XRAD,YRAD,ITPROJ,
     +     IRES,LTYPTB,LUNDAT,LUNIND,LUNLIN,LTON,IPGRID,DOTEM,
     +     ORHALT
c
       initls = nextst
c      do until nextst not = initial state
  100  continue
           call getwrd
c * ** *** **** ***** ****** ******* change check order, etc.
           if (wordis('DETAIL')) then
               nextst = 21
           else if (wordis('SCALE').or.wordis('MAP')
     +              .or. iseoc()) then
c              increase scale
               xrnmn = xrnm * 1.5
               call chscal (xrnmn)
               nextst = 3
           else
c              increase scale
               xrnmn = xrnm * 1.5
               call chscal (xrnmn)
               call putwrd
               nextst = 3
           endif
       if (nextst.eq.initls) go to 100
c
       return
       end
```

Jul 20 13:56 1989 carł .f Page 18

```
C+*+*+*+*+*+*+*+*+*+*+*+*+*+*+*+*+*+*+*+*+*+*+*+*+*+*+*+*+*+*+*+*+*|*+*+*+*+
c  UNIT NAME:                    inicom
c
c  Functional Description:
c       initialize common variables with data statements
c
c  Input Files/Parameters:
c
c  Output Files/Parameters: N/A
c
c  Subroutines/Functions Called:
c
c  Called By: fmain
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988                separate amp & sys - inicom
c
C-*-*-*-*-*-*-*-*-*-*-*-*-*-*-*-*-*-*-*-*-*-*-*-*-*-*-*-*-*-*-*-*-*|*-*-*-*-
c
        subroutine inicom

c       initialize common variables with data statements or use a block data

c     screen world coordinates
       common /comscr/ xllscr,yllscr,xurscr,yurscr
c     construction box world coordinates, colors
       common /combox/xllbox,yllbox,xurbox,yurbox,ibcbox,iocbox,incbox
c     menu world coordinates, colors
       common /commen/xllmen,yllmen,xurmen,yurmen,ibcmen,iocmen,incmen
c     legend world coordinates, colors
       common /comleg/xllleg,yllleg,xurleg,yurleg,ibcleg,iocleg,incleg
c     system area world coordinates, colors
       common /comsys/xllsys,yllsys,xursys,yursys,ibcsys,iocsys,incsys
c     graphics area world coordinates, colors
       common /comgra/xllgra,yllgra,xurgra,yurgra,ibcgra,iocgra
c     standard key area world coordinates, colors
       common /comkey/xllkey,yllkey,xurkey,yurkey,ibckey,iockey,inckey
c     amplification area world coordinates, colors
       common /comamp/xllamp,yllamp,xuramp,yuramp,ibcamp,iocamp,incamp
c     Pic amplification area world coordinates, colors
       common /compic/xllpic,yllpic,xurpic,yurpic,ibcpic,iocpic,incpic
c     graphics area virtual coordinates
       common /comgvp/ xllgvp,yllgvp,xurgvp,yurgvp
c     aspect ratio and virtual coordinate limits of viewspace
       common /aspect/ xaspec,yaspec,xvlow,xvhigh,yvlow,yvhigh
c     initialize common variables in states.ftn
       logical sketch,majorf,minorf
       common /statel/ sketch,majorf,minorf
```

Jul 20 13:56 1989 carr .f Page 19

```
      logical eofkey
      common /keylun/ keylun,newlun,eofkey
      logical quickd
      common /quickd/ quickd

c      common /cmenu/ imhigh,imoff,imstan,imnons
      common /ctext/ igrtxt,isytxt,iantxt
      common /tablet/ inpdev
      character*50 defpth
      common /defpth/ defpth
      common /lendef/ lendef
      character*50 mapath
      common /mapath/ mapath
      common /lenmap/ lenmap
      common /arsegs/ nsgmen,nsggra,nsgsys,nsgmsg,nsgmap,nsgful
      common /msgoff/ msgoff
      common /inewmn/ inewmn
      common /logseg/ nsglog
      common /nsgkey/ nsgkey,nsgktx
      common /csgamp/ nsgamp
      integer qfb(26),qmb(4)
      common /butons/ qfb,qmb
      integer qdsdev,qpydev,qecho,qlecho
      common /device/ qdsdev,qpydev,qecho,qlecho
      common /commvp/ xllmvp,yllmvp,xurmvp,yurmvp
      common/comwdo/qcxmn,qcymn,qcxmx,qcymx
      real qcxmn,qcymn,qcxmx,qcymx
      common/ampwdo/qaxmn,qaymn,qaxmx,qaymx
      real qaxmn,qaymn,qaxmx,qaymx
      common /cmxlin/maxlin
      common/scratr/qbox,qbkgrd,qmcolr
      integer qbox,qbkgrd,qmcolr
      common/segnum/qsegnm
      integer qsegnm
c     added by gre needed for calls to xsize
      common /txtsz/ txtsiz
      logical ampflg,graflg,keyflg,legflg,menflg,popflg,
     +     sysflg,worflg,af(8)
      common /areaon/ ampflg,graflg,keyflg,legflg,menflg,popflg,
     +     sysflg,worflg,af
      real*8 dtor,stor
      common /dtor/ dtor,stor
      integer ovseg, dfseg
      common /OVSEGS/ ovseg, dfseg
      COMMON /GRDSEG/ LLSEG,UTMSEG,GAUSEG
      INTEGER LLSEG,UTMSEG,GAUSEG
      common/ampprm/ampseg
      integer ampseg
      INTEGER   isecs,imins
      REAL      cc,cs
      COMMON    /c/ cc,isecs,cs,imins

      common /amfrst/ amfrst
      logical amfrst
```

Jul 20 13:56 1989 carr .f Page 20

```
      common /MBXACT/ MBXACT, fstmsg
      logical MBXACT, fstmsg

      integer bgnpos
      integer endpos
      integer numrcs
      integer tfaddx
      integer tfadtm
      integer tkoset
      integer tnewst
      integer toldst
      integer trkndx (1000)

      character*9 tfddtg
      character*9 tnewtm
      character*9 toldtm


      character*160 trkrec (1000)

      logical opnflg
      logical segact (1000)
      logical spprsd (1000)
      logical trkoff

      integer trklst(260)
      integer curseg(260)
      integer mrkcnt
      character*2 actmrk(260)
      character*9 boxdtg(260)
      logical boxvis(260)
      logical boxon
      integer boxcur

      common /colorm/ nonsel,iselec
      logical bitmod
      common /bitmod/ bitmod
      logical qmapup
      common /mapup/qmapup

      common /numrcs/ numrcs
      common /openfl/ opnflg
      common /segact/ segact
      common /spprsd/ spprsd
      common /tarbou/ tnewst, toldst
      common /tfadez/ tfaddx, tfadtm
      common /tfddtg/ tfddtg
      common /timpos/ bgnpos, endpos
      common /tkoset/ tkoset
      common /trcbou/ tnewtm, toldtm
      common /trkndx/ trkndx
      common /trkoff/ trkoff
      common /trkrec/ trkrec
      common /actmrk/ trklst,mrkcnt,actmrk,curseg,boxdtg,boxvis
      common /boxcur/ boxon,boxcur
c     aspect ratio and virtual coordinate limits of viewspace
```

Jul 20 13:56 1989 carl .f Page 21

```
      common /boxseg/ nsgbox,nsgsho,nsgcrm

      common /supflg/ supflg

c     initialize common areas for iosubs.ftn

      character*6 curwdb
      common /curwdb/ curwdb
      common /lenwdb/ lenwdb
      logical lton(16),dotem
      integer ipgrid(4),ltyptb(16)
      common /map/ XRNM,XC,YC,LEVEL,CLAT,CLON,XRAD,YRAD,ITPROJ,
     +     IRES,LTYPTB,LUNDAT,LUNIND,LUNLIN,LTON,IPGRID,DOTEM,
     +     ORHALT
      dimension ltypov(16)
      logical ltonov(16),rankt(26,16)
      common /maptoo/ ltypov,ltonov,rankt
      character*50 classi
      common /classi/ classi
      common /lencla/ lencla
      common /overly/ overtb
      logical overtb(16)
      character*80 savdes(20)
      common /savdes/ savdes
      common /maxsav/ maxsav,limsav
      real hlscol(3,0:255)
      common /hlscol/ hlscol

c     initialize common areas in mapsrc.ftn

      COMMON /CONST/ MAXVAL,RMPV,C,R,ERNM
      COMMON /PIE/ PIE,TPIE,PIO2,PIO4
      COMMON /ECCEN/ ECCEN,EC2
      COMMON /PROJT/ IGNOMN,IORTEQ,IORTPO,IORTHO,IPERSP
      COMMON /PROJT2/ IEQREC,IMERCA,ILAMCN
      COMMON /RADE/ RADE
      common /ltyps/ ltyps
      common /nmlim/ lunnam,areamn,areamx
      LOGICAL SAVEXY
      COMMON /STMSGS/ XPREV,YPREV,IRESSQ,XSAV,YSAV,SAVEXY
      logical gmactv
      common /gmactv/ gmactv

      COMMON /chscle/ scale,levtab,istptb,inctab
      DIMENSION SCALE(17)
      INTEGER LEVTAB(17),ISTPTB(17),INCTAB(17)
      COMMON /LABSON/ LABSON
      LOGICAL LABSON
c
c       initialize common for plotit
        logical nolobx
        common /nolobx/ nolobx
c       initialize common for drawel
        logical noelpl
        common /noelpl/ noelpl
```

Jul 20 13:56 1989 car! .f Page 22

```
      data ampflg/.true./,graflg/.true./,keyflg/.false./,
     + legflg/.true./,menflg/.true./,popflg/.false./,
     + sysflg/.true./,worflg/.false./,af/8*.false./
      data fstmsg/.true./
      data curwdb /'wdbiif'/,lenwdb/6/
      data classi/'UNCLASSIFIED'/,lencla/12/
      data keylun/28/,newlun/29/,eofkey/.false./
      data overtb/8*.true.,8*.false./
      data dotem/.true./
      DATA LUNDAT,LUNIND,LUNLIN/11,12,13/
      DATA ITPROJ/7/,ires/1/
      DATA LEVEL/1/,xrnm/4000/,orhalt/0./
      DATA LTON/.TRUE.,15*.false./
      data ltonov/16*.false./
      data rankt/.true.,415*.false./
      data ipgrid/1800,1800,180,180/
      DATA LTYPTB/34,35,36,37,38,39,48,41,69,43,44,44,45,44,46,47/
      data ltypov/16*152/
      data xc,yc,xrad,yrad/200,200,200,200/
      data maxsav/0/,limsav/20/
      data savdes/20*' '/
      data hlscol/768*0./
      DATA C/2.908882087E-4/
      DATA isecs/648000/
      DATA imins/10800/
      DATA cc/2.908882087e-4/

      DATA ERNM/3440.34/
      DATA RADE/57.2957795/
      DATA PIE/3.1415927/,TPIE/6.2831853/
      DATA PIO2/1.5707963/,PIO4/0.7853982/
      DATA IGNOMN/1/,IORTEQ/2/,IORTPO/3/,IORTHO/4/,IPERSP/5/
      DATA IEQREC/6/,IMERCA/7/,ILAMCN/8/
c     eccentricity of earth
      data eccen/0.016718/
      data ltyps/-1/
      data lunnam/16/,areamn,areamx/100.,25000./
      data savexy /.false./
      data ovseg,dfseg,llseg /0,0,0/
      data defpth/'/map/default/'/,lendef/13/
      data mapath/'/map/data/'/,lenmap/10/
      data qsegnm/1101/
      data nonsel,iselec /16,24/
c       data qbox,qbkgrd,qmcolr/32,0,7/
      data qbox,qbkgrd,qmcolr/32,8,7/
      data qcxmn,qcymn,qcxmx,qcymx/0.,0.,70.,4./
      data qaxmn,qaymn,qaxmx,qaymx/0.,0.,70.,4./
      data maxlin/4/
      data qdsdev,qpydev,qecho,qlecho/1,1,1,1/
c****** states.ftn data stmts
      data sketch,majorf,minorf/3*.false./
c     offset for start of message retained segment numbers
      data msgoff/30000/
      data nsgmen,nsggra,nsgsys,nsgmsg,nsgmap,nsgful
     + /310,311,312,313,314,315/
      data nsgbox /316/,nsgsho/317/,nsgcrm/318/,inewmn/0/
```

Jul 20 13:56 1989 carl .f Page 23

```
      data nsglog /319/
      data nsgkey /320/,nsgktx/321/
      data nsgamp /322/
      data inpdev/1/
c      data imhigh,imoff,imstan,imnons/20,21,22,19/
      data igrtxt,isytxt,iantxt/96,96,96/
      data
     + xllscr,yllscr,xurscr,yurscr/1.,1.,65.,41./
     + xllbox,yllbox,xurbox,yurbox,ibcbox,iocbox/49.,8.,65.,15.,56,16/
     + xllmen,yllmen,xurmen,yurmen,ibcmen,iocmen/49.,8.,65.,41.,56,16/
     + xllleg,yllleg,xurleg,yurleg,ibcleg,iocleg/32.,1.,65.,8.,56,16/
     + xllsys,yllsys,xursys,yursys,ibcsys,iocsys/1.,1.,49.,8.,56,16/
     + xllgra,yllgra,xurgra,yurgra,ibcgra,iocgra/1.,8.,49.,41.,25,16/
     + xllkey,yllkey,xurkey,yurkey,ibckey,iockey/49.,1.,65.,8.,56,16/
     + xllpic,yllpic,xurpic,yurpic,ibcpic,iocpic/1.,1.,65.,7.,25,16/
     + xllamp,yllamp,xuramp,yuramp,ibcamp,iocamp/1.,1.,54.,4.,56,16/

      data bgnpos /22/
      data boxon  /.false./
      data endpos /30/
      data numrcs /1000/
      data opnflg /.false./
      data segact /1000*.false./
      data spprsd /1000*.false./
      data tfaddx /0/
      data tfadtm /1440/
      data tfddtg /'000000000'/
      data tkoset /20000/
      data tnewst /0/
      data tnewtm /'000000000'/
      data toldst /0/
      data toldtm /'000000000'/
      data trkndx /1000*0/
      data trkoff /.false./
      data mrkcnt /0/
      data trklst /260*0/
      data trkrec /1000*' '/

c      DATA SCALE/50.,100.,200.,350.,450.,600.,750.,1000.,1500.,1750.,
c     +      2500.,3000.,4000.,6000.,8000.,10000.,11000./
c      DATA LEVTAB/99,3,2,1,1,1,1,1,1,1,1,1,1,1,1,1,1/
c      DATA ISTPTB/1,5,5,10,30,60,60,120,300,600,600,900,900,1800,
c     +      1800,1800,1800/
c      DATA INCTAB/1,1,2,5,5,10,10,30,60,60,90,90,180,180,180,180,
c     +      180/
       DATA SCALE /60.,350., 450.,600.,750., 1000.,1500.,1750.,
     +             2500.,3000.,4000., 6000.,8000.,10000.,
     +             11000.,12000.,13000./
       DATA LEVTAB/26,26,4,4,4,2,2,2,1,1,1,1,1,1,1,1,1/
       DATA ISTPTB/20,60, 300,300,300, 600,600,600,
     +             900,900,900, 1800,1800,1800,
     +             1800,1800,1800/
       DATA INCTAB/10,10, 60,60,60, 60,60,60,
     +             300,300,300, 300,300,300,
     +             300,300,300/
      DATA LABSON/.TRUE./
```

```
       DATA quickd/.TRUE./
        data nolobx /.false./
        data noelpl /.false./

        return
        end


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  inigra
c
c  Functional Description:
C       THIS SUBROUTINE INITIALIZES THE GRAPHIC DISPLAY
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                  FMAIN
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c  S. Lamb           Feb 1988                  detec chg - inigra
c
C-*-*-*-*-*-*-*-*-*-*-*-*-*-*-*-*-*-*-*-*-*-*-*-*-*-*-*-*-*-*-*-*-*-*-*-*-*|*-*-*-*-
C
        SUBROUTINE INIGRA (IERR)

C       THIS SUBROUTINE INITIALIZES THE GRAPHIC DISPLAY

        integer qdsdev,qpydev,qecho,qlecho
        common /device/ qdsdev,qpydev,qecho,qlecho
        integer mbxres
        common /mbxres/ mbxres
        character*80 filnam
        integer keylun,newlun
        logical eofkey
        common /keylun/ keylun,newlun,eofkey
        logical mailfl(4)
        common/mlflag/mailfl
        character*6 command
c       *** This variable must be set to the number of planes
c           in the graphics frame buffer somehow in order to
c           use the bitmod flag to modify map display
        common /nplane/ nplane
        logical bit,rdkey,savkey,malbox
```

Jul 20 13:56 1989 carł .f Page 25

```
      common /bitdbc/ bit
      common /rkdbc/ rdkey
      common /svkdbc/ savkey
      common /mlbdbc/ malbox
      logical bitmod
      common /bitmod/ bitmod
      data irdwr/0/

c     print*,'OMSGS - INIGRA'
      if (rdkey) then
          call getfnm (lennam,filnam)
c         print*,'inigra -- ',lennam,'  ',filnam(1:lennam)
          call openit (filnam(1:lennam),lennam,keylun,irdwr,ierror)
          if (ierror.ne.0) then
              print*,'inigra -- error on open of read key file ',
     +        keylun,irdwr,ierror,'  ',filnam(1:lennam),lennam
              eofkey = .true.
          else
              eofkey = .false.
              call kpause (eofkey)
              read (keylun,*,end=192,err=191) command
              if (command(1:6).ne.'jbegin') then
                  print*,'inigra -- incompatible command in save',
     +            ' file  ',command
c                 *** exit on error
                  go to 199
              endif
          endif
      endif
      go to 199
  191 continue
          print*,'inigra -- error on read of save key file',
     +    '  ',keylun
          go to 199
  192 continue
          print*,'Read key file is empty.'
          eofkey = .true.
  199 continue
      if (savkey) then
          call openit ('save_keys',9,newlun,irdwr,ierror)
          if (ierror.ne.0) then
              print*,'inigra -- error on open of save_keys',
     +        newlun,irdwr,ierror
          else
              write (newlun,*,err=135) '''jbegin'''
          endif
      endif
      go to 140
  135 continue
          print*,'inigra -- error on write to save key file',
     +    '  ',newlun
  140 continue
      CALL JBEGIN
      call jseter (7)
c *** Apollo specific subroutine loop for receiving mailbox
      if (malbox) then
```

```
Jul 20 13:56 1989  carh  .f Page 26

           call inmail
           if (mbxres .eq. 1) then
                call sndmail
           end if
        endif
c  ***
        CALL JDINIT (qdsdev)
        CALL JDEVON (qdsdev)
        call jddete (0)
        if ((bit) .and.nplane.ge.4) then
            bitmod = .true.
        else
            bitmod = .false.
        endif

        RETURN
        END

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    inione
c
c  Functional Description:
c       initialize common variables
c
c  Input Files/Parameters:
c
c  Output Files/Parameters: N/A
c
c  Subroutines/Functions Called:
c
c  Called By: init
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988                separate amp & sys - inione
c
C-*-*-*-*-*-*-*-*-*-*-*-*-*-*-*-*-*-*-*-*-*-*-*-*-*-*-*-*-*-*-*-*-*-*-*-*|*-*-*-*-
c
        subroutine inione
c
c       this subroutine can be used to initialize common blocks for
c       using the menu controllers and hldf
c
c
      common/dasegs/qdaseg
      integer       qdaseg

      common /label/ qlabel
```

Jul 20 13:56 1989 carl .f Page 27

```
      character *3   qlabel

      common/contrl/qclass
      logical qclass

      common/scratr/qbox,qbkgrd,qmback
      integer qbox,qbkgrd,qmback

      common/clsstr/qmajst,qcdwst,qcavst,qcurmj,qcurcw,qcurcv
      character *50 qmajst,qcdwst,qcavst(20),qcurmj,qcurcw,qcurcv(20)

      common/clindx/qmjidx,qarray
      integer qmjidx
      logical qarray(6)

      common/maxchr/qmxchr,qactul
      integer     qmxchr,qactul(4)

      common /nmbtxt/qtxtct
      integer qtxtct

      common/picks/qsegid,qpick,qmodfl
      integer     qsegid,qpick
      logical     qmodfl

      common/grfdef/qlclr,qlst1,qlst2,qlwid,qxsiz,qysiz,
     +      qcclr,qcfont,qtpath,qhjst,qvjst
      integer       qlclr,qlst1,qlst2,qlwid,qxsiz,qysiz,
     +      qcclr,qcfont,qtpath,qhjst,qvjst

      common/boxwdo/qbxmin,qbymin,qbxmax,qbymax
      real qbxmin,qbymin,qbxmax,qbymax

      common/mnuatr/qmcolr
      integer qmcolr

      common/milseg/qmilsg
      integer qmilsg(7)

c       getseg segment number range
        common /gtseg/qstart,qsgend
        integer qstart,qsgend

C SCALE COMMON BLOCKS
         Common /scale/qscclr,qscxy,qsctmp,qscseg,qsfacx
            Integer qscclr(3),qscseg(3)
            Real qscxy(3,2),qsctmp(3),qsfacx(3)
         Common /scltxt/qsctmv,qscid
            Character*5 qsctmv(3,3)
            character*2 qscid(3)
         Common /sclflg/qscflg
            Logical qscflg(3)

        common  /qprint/ qprint
        logical qprint
```

```
Jul 20 13:56 1989  carr  .f Page 28

        common/flname/ qname, qdscrp
        character *50 qname
        character *60 qdscrp

        common /hitabl/ hitabl
        integer hitabl(43)

        qstart = 1100
        qsgend = 20000

        qprint = .false.

c*******set global variables which DO NOT change during execution

        qdaseg = 1100
        qmxchr = 50

c*****initialize screen attribute colors
c*****note: qbox and qbkgrd are now loaded from default.cfg by rconfg
c*****      since they have already been used by makgra etc.
c      qbox = 32
cC      qbkgrd = 0
c      qbkgrd = 8
      qmback = 5

c****** Classification variables

        qclass = .false.
c       qarray(1) = .true.
c       qarray(2) = .false.
c       qarray(3) = .false.
c       qarray(4) = .false.
c       qarray(5) = .false.
c       qarray(6) = .false.

c**** count of text blocks
        qtxtct = 0
        qmodfl = .false.

        qlclr = 104
        qlstl = 1
        qlst2 = 1
        qlwid  = 32535
        call convwh(10.0,10.0,qxsiz,qysiz,1)
        qcclr = 104
        qcfont = 3
        qtpath = 1
        qhjst = 1
        qvjst = 1

c*****initialize construction box parameters
      qbxmin=-10.
      qbymin=-10.
      qbxmax=200.
      qbymax=200.
```

```
Jul 20 13:56 1989  carh  .f Page 29

c*****initialize menu color
      qmcolr=28

c*****initialize military reserved segment numbers
      do 10 i=1,7
         qmilsg(i)=31000+i
 10   continue
c**** initialize hitabl to 0
      do 20 i = 1,43
         hitabl(i) = 0
 20   continue

c*****read files from INDEX into array
      call intind
c
c SCALE COMMON VARIABLES
        qsfacx(1) = 1.0
        qsfacx(2) = 1.0
        qsfacx(3) = 1.0
        qscflg(1) = .false.
        qscflg(2) = .false.
        qscflg(3) = .false.

c*******Set default file name and file description to all blanks
        qname( 1:50 ) = ' '
        qdscrp( 1:60 ) = ' '

        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     inipic
c
c  Functional Description:
c       initialize variables for new picture
c
c  Input Files/Parameters:
c
c  Output Files/Parameters: N/A
c
c  Subroutines/Functions Called:
c
c  Called By: eramap, init, intscn
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988             separate amp & sys - inipic
C  C.S. Lamb       Jan 1988                jclear logic - inipic
```

```
Jul 20 13:56 1989  carb  .f Page 30

c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine inipic
c
c       this subroutine can be used to initialize common blocks
c       when beginning a new picture either from create or edit
c
c
      integer          segnum
c
      common /linatr/ qthick,qcolor,qstyle,qlsty2,qrohed
      integer          qthick,qcolor,qstyle,qlsty2,qrohed

      common /modlin/ qsgnum, qpikid, qcurln, qhiseg, qmdflg
      integer          qsgnum, qpikid, qcurln, qhiseg
      logical                                          qmdflg

      common /scgrid/ qlndot, qgrdsz, qgrdsg
      integer          qlndot, qgrdsz, qgrdsg

      common/colors/ qccolr,qicolr,qocolr
      integer qccolr,qicolr,qocolr

      common/segnum/qsegnm
      integer     qsegnm

      common/ampprm/ampseg
      integer ampseg

      common/mrkseg/dstsg1,dstsg2,dstsg3,dstfst
      integer dstsg1,dstsg2,dstsg3
      logical dstfst

      common/llseg/llsgmt,llfrst
      integer llsgmt
      logical llfrst

      common /amfrst/ amfrst
      logical amfrst

      common/contrl/qclass
      logical       qclass

      common/clindx/qmjidx,qarray
      integer qmjidx
      logical qarray(6)

      common/label/qlabel
      character*3  qlabel

      common/textfl/qftnot,qttlfl,qttl,qftn,qaxn
      logical     qftnot,qttlfl,qttl,qftn
      integer     qaxn

      common /txszay/ size
```

```
      real size(9)

      common/picks/qsegid,qpick,qmodfl
      integer     qsegid,qpick
      logical     qmodfl

      common /nmbtxt/qtxtct
      integer qtxtct

      common /comflg/qcmpfl
      logical qcmpfl

      common/arrow/qaline,qmaxln,qmaxpt,qheads,qmaxhd,qaflpt,qafill,
     +             qarcol,qaname,qmodln,qres,qmxres
      real qaline(10,21),qheads(5,9),qaflpt(2)
      integer qmaxln,qmaxpt(10),qmaxhd,qarcol,qaname,qmodln,
     +        qres(50),qmxres
      logical qafill

        common /qprint/ qprint
        logical qprint

       common/grfdef/qlclr,qlst1,qlst2,qlwith,qxsiz,qysiz,
     +                qcclr,qcfont,qtpath,qhjst,qvjst
        integer       qlclr,qlst1,qlst2,qlwith,qxsiz,qysiz,
     +                qcclr,qcfont,qtpath,qhjst,qvjst


c ----- legend common blocks
        common /legatr/ qlegfl,qcolin,qcolou,qlgfnt,qmodlg
        integer qcolin,qcolou,qlgfnt
        logical qlegfl,qmodlg

        common/legnos/qboxno,qsymno,qtxtno,qprtno
        integer qboxno,qsymno,qtxtno,qprtno

        common/legdim/qentry,qbordr,qinity,qtype,qtxtln,qtext,qydist,
     +              qytext,qlwide,qlclor,qinclr,qoclor,qmtype,
     +              qxscal,qyscal,qtclor,qahead
        integer qentry,qtype(10,6),qtxtln(10,2),qlwide(10),qahead(10)
        integer qlclor(10),qinclr(10),qoclor(10),qmtype(10),qtclor
        character*20 qtext(10,2)
        real qbordr,qinity,qydist,qytext,qxscal,qyscal
c -----

c scale common blocks
         common /scale/qscclr,qscxy,qsctmp,qscseg,qsfacx
            integer qscclr(3),qscseg(3)
            real qscxy(3,2),qsctmp(3),qsfacx(3)
         COMMON /SCLTXT/QSCTMV,QSCID
            CHARACTER*5 QSCTMV(3,3)
            CHARACTER*2 QSCID(3)
         common /sclflg/qscflg
            logical qscflg(3)
         common /scfrst/ qlstsc
            logical qlstsc
```

Jul 20 13:56 1989 carł .f Page 32

```
        common/change/qchang
        logical        qchang

        common /mapup/ qmapup
        logical qmapup

c grid common blocks

        common /grids/ qsw,qgtype,qgcolr,qxinc,qyinc
        real    qxinc(3),qyinc(3)
        logical   qsw(3)
        integer   qgcolr(3),qgtype(3)

        common/newgrd/newgrd,first
        logical newgrd,first

        integer qnmpts,qshade(60)
        real qlatt(60),qlonn(60)
        common /fills/ qnmpts,qlatt,qlonn,qshade

        integer qinpnm,qmax
        common /inpfil/ qinpnm,qmax


c       getseg segment number range
        common /gtseg/qstart,qsgend
        integer qstart,qsgend


        integer qlen
        character*80 qfilnm
        common /ovfnam/ qfilnm
        common /lenovf/ qlen

        common/filinp/qnum,qmknum,qxpos,qypos,qscal,qtyp,qintcl,qextcl
        integer    qnum,qmknum(100),qtyp(100),qintcl,qextcl
        real       qxpos(100),qypos(100),qscal(100)

        integer filseg
        common /dspseg/ filseg

        common/clsseg/qclssg
        integer qclssg

      common/chratr/qvert,qxbase,qybase,qxplan,qyplan,
     +               qhjust,qvjust,qcrpth,qxsize,qysize,
     +               qxxpos,qyypos,qfnum,qsdiam
      integer      qvert,qhjust,qvjust,qcrpth,
     +             qfnum,qxxpos(4),qyypos(4)
      real         qxbase,qybase,qxplan,qyplan,
     +             qxsize,qysize,qsdiam

        logical qlton(16),qdotem
        integer qpgrid(4),qtyptb(16)
```

Jul 20 13:56 1989 carŀ .f Page 33

```
      integer qlevel,qitpro,qires,qlunda,qlunin,qlunli
      real qxrnm,qxc,qyc,qclat,qclon,qxrad,qyrad,qorhal
      common /map/ qxrnm,qxc,qyc,qlevel,qclat,qclon,qxrad,qyrad,
     +      qitpro,
     +      qires,qtyptb,qlunda,qlunin,qlunli,qlton,qpgrid,qdotem,
     +      qorhal

      INTEGER QSYM
      COMMON /SYMUP/ QSYM

c       declare local variables
      integer array(19)
      logical hflag

c  serial number common bloc

     common/sernum/qserno,qserfl
     integer       qserno
     logical       qserfl

      character*50 defpth
      common /defpth/ defpth
      common /lendef/ lendef
      integer arrcnt
      common /arrcnt/arrcnt

c  free drawing

     common/fdrbgd/qseg,qpck,qbkgd
     integer     qseg,qpck
      logical     qbkgd

c  interrogation box

     logical boxon
     integer boxcur
     common /boxcur/ boxon,boxcur


c  common block to reinitialize track boxes (jit)

      character*2 actmrk(260)
      integer mrkcnt
      integer trklst(260)
      integer curseg(260)
      character*9 boxdtg(260)
      logical sys,vax,clr
      common /sysdbc/ sys
      common /vaxdbc/ vax
      common /clrdbc/ clr
      logical  boxvis(260)
      common /actmrk/ trklst,mrkcnt,actmrk,curseg,
     +                boxdtg,boxvis

      logical bitmod
      common /bitmod/ bitmod
```

Jul 20 13:56 1989 carr .f Page 34

```
c**** CSL erase 10/87
c**** following recommended in Sun version *******
c +++++++++++++++++++++++++++++++++++++++++++++++++
        common /mesgon/ mesgon
        logical mesgon(1299)
        common /msgold/ msgold,msgonm
        integer msgold,msgonm
        common /logoon/ logoon
        logical logoon
        common /logseg/ nsglog
        integer nsglog
        Common /b6/ qcrmnu
        Integer qcrmnu
        Common /b3/ qdarry,qmnum,qoldm
        Integer qdarry(500),qmnum,qoldm
        integer j
        logical jerr
c +++++++++++++++++++++++++++++++++++++++++++++++++
c       set data areas
        data size /05.,7.,10.,12.,15.,17.,20.,22.,25./

        QSYM = 0

        qmdflg = .false.
        qlndot = 12
        qgrdsz = 13

        if (sys) print*,'inipic -- enter',qchang,qsegnm

        qmapup = .false.
        qnmpts = 0

        qinpnm = 0
        qintcl = 72
        qextcl = 80
        qmax = 10

c       delete retained segments

        if (sys) print*,'  purging old picture',qsegnm

c**** CSL erase 10/87 clear all segments at once => redraw boxes etc.
c**** following calls recommended in Sun version *******
c +++++++++++++++++++++++++++++++++++++++++++++++++++
      if (clr) then
        call jclear
        call makful
        call makgra
        call makmen
        msgold = 0
        call makcom
        call makamp
        call makkey
        call makbox
        call maksho
```

Jul 20 13:56 1989 carl .f Page 35

```
        do 101 j = 1, 500
  101   qdarry(j) = 0
        do 102 j = 1, 1299
  102   mesgon(j) = .false.
        j = qcrmnu
        if (j .eq. 0) then
           j=1
           call logo
           call jvisbl (nsglog,1)
        endif
        call keys
        qcrmnu = 0
        msgonm = -1
        if (logoon) then
           logoon = .false.
        else
          call drawm(j, jerr)
        endif
      endif
c +++++++++++++++++++++++++++++++++++++++++++++++++++
c       purge classification segment
        call jisgmt(qclssg,array)
        if (array(1).eq.1) call jpurge(qclssg)
        do 100 i = qstart,qsegnm
            call jisgmt(i,array)
            if(array(1) .eq. 1)  call jpurge(i)
 100    continue
c ----- updated 7/31/87 CSL
c         if ((.not. amfrst).and.(ampseg.ne.0)) call jpurge(ampseg)
        qchang = .false.
        qsegnm = qstart
c*******set flags to begin a new picture

        qprint = .false.

c*******text flags
        qftnot = .false.
        qttlfl = .false.
        qttl = .false.
        qftn = .false.
        qmodfl = .false.
        qtxtct = 0
        qfnum  = 1
        qxbase = 1.0
        qybase = 0.0
        qxplan = 0.0
        qyplan = 1.0
        qcrpth = 1
        qvert  = 1
        qysize = 10.0
        qxsize = 10.0
        qvjust = 1
        qhjust = 1
c******classification flags
       qclass = .false.
       qclssg = 0
```

Jul 20 13:56 1989 carl .f Page 36

```
c     qarray(1) = .true.
c     qarray(2) = .false.
c     qarray(3) = .false.
c     qarray(4) = .false.
c     qarray(5) = .false.
c     qarray(6) = .false.

c******compass flag
      qcmpfl = .false.

c****** free drawing
      qbkgd = .false.

c******serial number flags
      qserno = 0
      qserfl = .false.

c*****call other initialization routines
      call clrstr
c      call hldfin

c*****initialize reserved retained segments for arrows
      qmxres=0
c      qres(1)=31000
      do 5 i=1,50
c        qres(i)=31000+i
        call getseg(qres(i))
 5    continue
      qccolr=104
      arrcnt = 0

c*****initialize screen attribute colors
c     qbox = 37
c     qbkgrd = 3
c     qmback = 5

c scale common variables
        qsfacx(1) = 1.0
        qsfacx(2) = 1.0
        qsfacx(3) = 1.0
        qscflg(1) = .false.
        qscflg(2) = .false.
        qscflg(3) = .false.
        qlstsc = .true.
c grid common variables
C       if (.not. vax) qlton(16) = .false.
        do 26 i = 1,3
          qsw(i) = .false.
          qgcolr(i) = 224
 26     continue
        qsw(1) = .true.
        first = .true.
        newgrd = .false.
c
c       clear graphics area
c        call clrgra
```

```
c**** CSL erase 10/87 clear all segments at once => redraw boxes etc.
c**** following call recommended in Sun version *******
c ++++++++++++++++++++++++++++++++++++++++++++++++++
      if (.not. clr) call clrgra
c ++++++++++++++++++++++++++++++++++++++++++++++++++

        qthick = 16383
        qcolor = 16
        qstyle = 1
        qlsty2 = 1
        qrohed = 11

        call getseg (qcurln)
        call getseg (qgrdsg)
        call getseg (qhiseg)
c

c ----- no legend is in existence.
        qlegfl = .false.
c ----- this is not a modification.
        qmodlg = .false.
c ----- there are no legend entries.
        qentry = 0
c ----- use the simplest and fastest font initially.
        qlgfnt = 1
c ----- set text color to black initially.
        qtclor = 248
c ----- there is no amplification area, first is true
        amfrst = .true.
c ----- there is are no markers, first for these are true
        dstfst = .true.
        llfrst  = .true.
c ----- get the segment numbers for the legend box, the legend
c ----- symbols area, the legend text area, and the legend
c ----- box user prompts
C THESE HAVE BEEN MOVED TO LEGBOX TO PREVENT THE LEGEND FROM BEING OVERWRITEN
C BY OTHER SYMBOLS
c         call getseg(qboxno)
c         call getseg(qsymno)
c         call getseg(qtxtno)
c         call getseg(qprtno)


c ----- initialize symbol (icon) variables.
        call icinit

c ----- initialize the current interior and outline
c ----- colors to red
        qicolr = 104
        qocolr = 104

c       get the segment number for the text shown in
c       the message area
        call getseg(filseg)

c       initialize timeline common blocks
```

```
        call initim

c       initialize hldf common blocks using dummy variables
c       these are set in fmain so no need to re init here - cas

        call hldf(9,iact,iseg,ipick,hflag)

c    jit: reinitialize the track boxes to new values.
c         these new segment numbers retain the
c         visibility flag of the old segment for that box.
c         This is to preserve the attributes of fade or
c         suppression.  Also, set boxon to false for interrogation.

        boxon = .false.

        do 10 i = 1,mrkcnt
           call getseg(segnum)
           curseg(i) = segnum
   10   continue

        if (bitmod) then
            call enall
            call gravpt
            call boxclr
            call soverl
        endif

        return

        end

C+*+*+*+*+*+*+*+*+*+*+*+*+*+*+*+*+*+*+*+*+*+*+*+*+*+*+*+*+*+*+*+*+*+*+*|*+*+*+*+
C* UNIT NAME:                    init
C*
C* FUNCTIONAL DESCRIPTION:
C*
C*   This subroutine initializes variables
C*
C*
C* INPUT FILES/PARAMETERS:
C*
C*       user input
C*
C* OUTPUT FILES/PARAMETERS:
C*
C*     Global Variables
C*       qcancl           logical; cancel flag
C*       qcr              integer; contains the asci value for the
C*                                 carriage return
C*       qcrmnu           integer; contains the current menu number
C*       qdarry           logical; array of flags which shows if a
C*                                 menu segment has been created for a
C*                                 particular menu
C*       qext2m           logical; exit to main menu flag
```

```
Jul 20 13:56 1989  carr  .f Page 39

C*       qexitg            logical; flag to exit graphics system
C*       qfb         integer array; contains the asci values for the
C*                                  function buttons, the button number
C*                                  corresponds to the array location
C*       qmb         integer array; contains the asci values for the
C*                                  mouse buttons
C*       qmloc             integer; contains the current location in the
C*                                  qstack array
C*       qmnum             integer; contains the menu number of the menu
C*                                  being displayed when the DRAWM
C*                                  routine is called
C*       qmodfl            logical; modify flag for the HLDF
C*       qmxary            integer; contains the size of the qdarry array
C*       qmxst             integer; contains the size of the qstack array
C*       qnextm            integer; contains the number of the next menu
C*                                  to be displayed
C*       qoldm             integer; contains  the number of the previous
C*                                  menu displayed
C*       qpick             integer; contains a pick id being passed back
C*                                  from DI3000
C*       qretrn            logical; return to previous menu flag
C*       qsegid            integer; contains a segment id being passed
C*                                  back from DI3000
C*       qsegnm            integer; contains the current segment id
C*       qstack            integer; array which contains the menu numbers
C*                                  of previous menu displayed
C*       qstmnu            logical; flag to put current menu on the stack
C*
C*
C* RESTRICTIONS:
C*
C*       The user must enter mouse or joystick when prompted for
C*       device choice.
C*
C* SUBROUTINES CALLED:
C*
C*       mhand             subroutine; drives the menu interface of the
C*                                     A21PROTOTYPE
C*       setvar  block data routine; initializes control variables
C*
C*       mesg              subroutine; places appropriate message in
C*                                     communications area
C*
C* CALLED BY:                    FMAIN, INIGM
C*
C* LOCAL VARIABLES:
C*
C*       no local variables
C*
C* ABNORMAL RETURN CONDITIONS:
C*
C*       A user error occurs if the user enters a device name other
C*       then mouse or joystick for device choice.
C*
C* LOCATION:
C*
```

Jul 20 13:56 1989 carh .f Page 40

```
C*      /u2/vcn/a21proto/maind
C*
C* PROGRAMMER:                DATE OF LAST CHANGE:    REASON FOR CHANGE:
C*
C*  VCNewton                   15 August 1983          initial entry
C*
C-*-*-*-*-*-*-*-*-*-*-*-*-*-*-*-*-*-*-*-*-*-*-*-*-*-*-*-*-*-*-*-*-*-*-*-*-*|*-*-*-*-

      Subroutine INIT

C     This subroutine initializes menu handler variables

C         (**Declare common blocks and common block variables**)
          Integer qcrmnu,qmxary,qmxst,qmloc,qmnum,
     +            qnextm,qoldm,qpick,qsegid,qsegnm,qstack(10)
          Logical qcancl,qext2m,qexitg,qmodfl,qretrn,qstmnu
          Integer qdarry(500)
          Common /b1/ qcancl,qext2m,qretrn,qstmnu,qnextm
          Common /b2/ qstack
          Common /b3/ qdarry,qmnum,qoldm
          Common /b4/ qmloc
          Common /b5/ qexitg
          Common /b6/ qcrmnu
          Common /b7/ qmxst
          Common /b8/ qmxary
          common/picks/qsegid,qpick,qmodfl
          Common /segnm/ segnm
          data qstack,qdarry/10*0,500*0/

C         (**Initialize variables needed for menu controllers**)
          Call inione
C         (**Initialize control variables**)
          Call SETVAR
C         (**Initialize other variables declared**)
          qcrmnu=0
          qexitg=.false.
          qmxary=500
          qmxst=10
          qmnum=0
C         qmodfl=.false.
          qoldm=0
          qpick=0
          qsegid=0
          qsegnm=1000
C         (**Initialize menu controller variables**)
          call inipic
c
c         (**Initialize variables for test of individual menus**)
c
          call tstini

      End

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  INITIM
```

Jul 20 13:56 1989 carr .f Page 41

```
C
C FUNCTIONAL DESCRIPTION:          .
C
C CALLED BY:                       INIPIC
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine initim
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       INMAIL
C
C FUNCTIONAL DESCRIPTION:          .
C
C CALLED BY:                       INIGRA
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine inmail
c
c       initialize mail function for Apollo version
c
        integer mbxres
        common /mbxres/ mbxres
        logical MBXACT, fstmsg
        common /MBXACT/ MBXACT, fstmsg
c
c        print*,'in inmail'
        mbxres = 0
        if(fstmsg) then
c            print*,'in inmail,first message,call openmail'
            call opmail(mbxres)
            fstmsg = .false.
        else
c            print*,'in inmail, call checkmail'
            call chekml(mbxres)
        endif
c
c  mbxres = 0   no channel to be opend, assume normal nsagrf
c  mbxres = 1   successful in opening mailbox channel
c
c       print*,'inmail -- exit'
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       INQSTA
C
```

Jul 20 13:56 1989 carr .f Page 42

```
C FUNCTIONAL DESCRIPTION:          .
C
C CALLED BY:                       STATEC
C
C PROGRAMMER:                      DATE OF LAST CHANGE     REASON FOR CHANGE
c  S. Lamb                       Feb 1988              command fix - inqsta
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine inqsta
c
c       this subroutine is the inquire state interpreter (4)
c
        common /states/ nextst
        logical wordis
c
        initls = nextst
c       do until nextst not = initial state
  100   continue
            call getwrd
            if (wordis('IS').or.wordis('THE').or.wordis('CURRENT'))
     +          then
c * ** *** **** ***** ****** ******* not understood / implem.
                nextst = 15
            else if (wordis('PROJECTION')) then
                nextst = 5
            else if (wordis('SCALE')) then
                nextst = 6
            else if (wordis('CENTER')) then
                nextst = 7
            else
                call putwrd
                nextst = 15
            endif
        if (nextst.eq.initls) go to 100
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        INTIND
C
C FUNCTIONAL DESCRIPTION:           .
C
C CALLED BY:                        INIONE
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine intind
        return
        end
```

```
Jul 20 13:56 1989  carł  .f Page 43

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    INTSCN
C
C FUNCTIONAL DESCRIPTION:       ENLARGES PICTURE TO FULL SCREEN
C                                AND CONVERTS SCREEN FOR BW PRINTOUT
C
C INPUT FILES/PARAMETERS:
C
C                    COMMON
C    VARIABLE        BLOCK         TYPE        DESCRIPTION
C
C     XLLGVP         COMGVP        REAL     LOWER LEFT X OF ORIGINAL VIEWPORT
C     YLLGVP         COMGVP        REAL     LOWER LEFT Y OF ORIGINAL VIEWPORT
C     XURGVP         COMGVP        REAL     UPPER RIGHT X OF ORIGINAL VIEWPORT
C     YURGVP         COMGVP        REAL     UPPER RIGHT Y OF ORIGINAL VIEWPORT
C     QCRMNU         B6            INTEGER  CURRENT MENU NUMBER
C     XVLOW          ASPECT        REAL     LOWER LEFT X-CORNER OF SCREEN
C     YVLOW          ASPECT        REAL     LOWER LEFT Y-CORNER OF SCREEN
C     XVHIGH         ASPECT        REAL     UPPER RIGHT X-CORNER OF SCREEN
C     YVHIGH         ASPECT        REAL     UPPER RIGHT Y-CORNER OF SCREEN
C
C OUTPUT FILES/PARAMETERS:      NONE
C
C                    COMMON
C    VARIABLE        BLOCK         TYPE        DESCRIPTION
C
C     SXLLGP         SAVGVP        REAL     LOWER LEFT X OF ORIGINAL VIEWPORT
C     SYLLGP         SAVGVP        REAL     LOWER LEFT Y OF ORIGINAL VIEWPORT
C     SXURGP         SAVGVP        REAL     UPPER RIGHT X OF ORIGINAL VIEWPORT
C     SYURGP         SAVGVP        REAL     UPPER RIGHT Y OF ORIGINAL VIEWPORT
C     SAVMNU         SAVMNU        INTEGER  MENU NUMBER OF CURRENT MESSAGE
C                                           BEFORE SCREEN WAS ENLARGED
C
C SUBROUTINES/FUNCTIONS CALLED
C
C    INIPIC        INITIALIZE VARIABLES FOR DRAWING NEW PICTURE
C    HLDF          RETRIEVES FILE FOR DISPLAY (CURRENT PICTURE)
C    STORE         STORES THE PICTURE IN AN HLDF FILE
C    JVSALL        MAKE ALL SEGMENTS INVISIBLE
C    CLRFUL        CLEAR FULL SCREEN
C
C CALLED BY:                  PRINTR
C
C LOCAL VARIABLES:
C
C    VARIABLE              TYPE        DESCRIPTION
C
C     LOG                 LOGICAL      FLAG SET BY HLDF (NOT NEEDED)
C     OCHANG              LOGICAL      SAVE QCHANG
C
C RESTRICTIONS:
C
C
C ABNORMAL RETURN CONDITIONS:   N/A
C
C
```

```
Jul 20 13:56 1989  carr  .f Page 44

C PROGRAMMER:                         DATE OF LAST CHANGE     REASON FOR CHANGE
C
C     DABUTSON                            11/13/84              INITIAL ENTRY
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE INTSCN
C
C ENLARGES THE DISPLAY AREA TO FULL SCREEN AND SAVES HLDF FILE
C
      common/oneflg/oneflg
      logical oneflg
      common /coltab/ coltab
      integer coltab(256)
      common/contrl/qclass
      logical       qclass
      common /coltobw/ coltobw
      logical       coltobw

      COMMON /COMGVP/ XLLGVP,YLLGVP,XURGVP,YURGVP
      COMMON /SAVGVP/ SXLLGP,SYLLGP,SXURGP,SYURGP
      COMMON /ASPECT/ XASPEC,YASPEC,XVLOW,XVHIGH,YVLOW,YVHIGH
      COMMON /ARSEGS/ NSGMEN,NSGGRA,NSGSYS,NSGMSG,NSGMAP,NSGFUL

      COMMON /QPRINT/QPRINT
      LOGICAL QPRINT

      COMMON/CHANGE/QCHANG
      LOGICAL       QCHANG

      COMMON/FLNAME/QNAME,qdscrp
      CHARACTER *50 QNAME
      character*60 qdscrp

        LOGICAL QLTON(16),QDOTEM
        INTEGER QPGRID(4),QTYPTB(16)
        INTEGER QLEVEL,QITPRO,QIRES,QLUNDA,QLUNIN,QLUNLI
        COMMON /MAP/ QXRNM,QXC,QYC,QLEVEL,QCLAT,QCLON,QXRAD,QYRAD,
     +      QITPRO,
     +      QIRES,QTYPTB,QLUNDA,QLUNIN,QLUNLI,QLTON,QPGRID,QDOTEM,
     +      QORHAL

      INTEGER QCRMNU
      COMMON /B6/ QCRMNU

      INTEGER QBOX,QBKGRD,QMBACK
      COMMON /SCRATR/ QBOX,QBKGRD,QMBACK

      COMMON /SAVMNU/ SAVMNU
      INTEGER SAVMNU
      integer prtchoi(2),featbk,featw,int,ierror
      common /prtchoi/ prtchoi

      CHARACTER*50 SVNAM
      LOGICAL LOG,OCHANG,tmpcls,savgrid
```

Jul 20 13:56 1989 carh .f Page 45

```
      common/label/qlabel
      character*3  qlabel

      common /msgold/ msgold,msgonm
      common /commvp/ xllmvp,yllmvp,xurmvp,yurmvp
      common /comkvp/ xllkvp,yllkvp,xurkvp,yurkvp
      common /comcvp/ xllcvp,yllcvp,xurcvp,yurcvp
      common /commen/xllmen,yllmen,xurmen,yurmen,ibcmen,iocmen,incmen
      common /nsgkey/ nsgkey,nsgktx
      common /pmenu/ pmenu,pmsg
      integer pmenu,pmsg
      logical qmapup
      common /mapup/ qmapup

      ierror = 0

C
C --- SAVE MAP VIEWPORT AND CURRENT MENU
C

      SXLLGP = XLLGVP
      SYLLGP = YLLGVP
      SXURGP = XURGVP
      SYURGP = YURGVP
      SAVMNU = QCRMNU

C
C --- STORE THE PICTURE
C
      OCHANG = QCHANG
      QCHANG = .TRUE.
      CALL STORE

C
C ---- CHANGE MAP VIEWPORT
C
      if(prtchoi(1).eq.2) then
         XLLGVP = XVLOW
         YLLGVP = YVLOW
         XURGVP = XVHIGH
         YURGVP = YVHIGH
      endif
C
C ---- CLEAR SCREEN AND INITIAL ALL NEEDED VARIABLES FOR A PICTURE
C
      if(.not.coltobw .or. (coltobw.and.qlabel.ne.'GEO')) then
         tmpcls=qclass
         savgrid = qlton(16)
         CALL INIPIC
         qclass=tmpcls
         qlton(16) = savgrid
      endif
      QCHANG = OCHANG
      QPRINT = .TRUE.
      if(prtchoi(1).eq.2) then
         CALL JVSALL(0)
```

Jul 20 13:56 1989 carh .f Page 46

```
          CALL CLRFUL
       else
c           call mesg(614)
       endif

       if (coltobw) then
         oneflg = .true.
         featbk = QTYPTB(8)
         featw  = QTYPTB(9)
         iboxtp = qbox
         qbox = 0
         QTYPTB(8) = 0
         QTYPTB(9) = 0
       endif

       if(coltobw) then

         if(qlabel .eq. 'GEO') then
            call UPDTMP
         else
            call HLDF (2,18,1,1,LOG)
clj ------ If not printing in full screen mode, then rewrite
clj ------ the filename so that it appears on the hardcopy.
            if(prtchoi(1).eq.1) call dspfln ( qname )
         endif

c          if(prtchoi(1).eq.1) then
c ---        REDRAW MENU,KEY,AND COMM. AREAS
c
c             call tmpcma (qname,pmsg)
c
c             call jvport (xllmvp,xurmvp,yllmvp,yurmvp)
c             call jwindo (xllmen,xurmen,yllmen,yurmen)
c             call jopen
c             call jrect (xllmen,yllmen,xurmen,yurmen)
c             Call tmpmen(pmenu,ierror)
c             call jclose
c
c             tmp = yurmen
c             yurmen = 8.
c             call keyvpt
c             call menwin
c             call jopen
c             call jrect (xllmen,yllmen,xurmen,yurmen)
c             call tmpmen (nsgktx,ierror)
c             yurmen = tmp
c             call jclose
c
c          endif

       else

         CALL HLDF(2,18,1,1,LOG)
```

Jul 20 13:56 1989 carl .f Page 47

```
      endif


      if (coltobw) then

        qbox = iboxtp
        QTYPTB(8) = featbk
        QTYPTB(9) = featw
        oneflg = .false.
      endif

      QPRINT = .FALSE.

C
C ---- COPY HLDF FILE TO SYSTEM ADMINSTRATOR'S DIRECTORY
C
      SVNAM = QNAME
      CALL SYSNAM(SVNAM,QNAME)
      CALL HLDF(8,INT,INT,INT,LOG)
      QNAME = SVNAM
      RETURN
      END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    INVTS2
C
C FUNCTIONAL DESCRIPTION:
C -            CHECKS MERCATOR AND EQUIRECTANGULAR FOR LINES
C -            TO BE CLIPPED AT LEFT AND RIGHT OF SCREEN.
C
C CALLED BY:                    NO LONGER USED BY CARICATURE
C
C PROGRAMMER:                   DATE OF LAST CHANGE     REASON FOR CHANGE
c -    L MCCLEARY                                 ORIGINAL CODE
C
C-*-*-*-*-*-*-*-*-*-*-*-*-*-*-*-*-*-*-*-*-*-*-*-*-*-*-*-*-*-*-*-*-*-*-*|*-*-*-*-

      SUBROUTINE INVTS2(TRLAT,TRLON,X,Y,PRVLON,PRVX,ISGOOD)

        LOGICAL ISGOOD
        LOGICAL INVALI
        COMMON/INVALI/INVALI
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        COMMON /PROJT/ IGNOMN,IORTEQ,IORTPO,IORTHO,IPERSP
        COMMON /PROJT2/ IEQREC,IMERCA,ILAMCN
        COMMON/PIE/PIE,TPIE,PIO2,PIO4

        C =2.908882087E-4

C      SPECIAL LOGIC FOR MERCATOR AND EQUIRECTANGULAR TO PREVENT THE
C      CONNECTION OF TWO POINTS WHICH SHOULD ONLY BE JOINED BY CLIPPING
```

Jul 20 13:56 1989 carr .f Page 48

```
C       TO THE LEFT AND RIGHT OF THE SCREEN
        IF(ITPROJ.EQ.IEQREC.OR.ITPROJ.EQ.IMERCA) THEN
             ISGOOD=.TRUE.
             PRVLN=0.
             TRLN=0.
C       CHECK FOR SAME SIGN OF X,PRVX
             IF(ABS(PRVX+X).EQ.ABS(PRVX)+ABS(X)) GO TO 14
C       IF ABS(LON) .GE. 90 DEG , ADD OR SUB 360 DEPENDING ON CLON SIGN
             IF(ABS(TRLON).LT.PIO2) THEN
                 TCON=0.
             ELSE
                 TCON=TPIE
             ENDIF
             IF(CLON.GE.0) THEN
                 IF(TRLON.GE.0) THEN
                   TRLN=TRLON
                 ELSE
                   TRLN=TRLON+TCON
                 ENDIF
                 IF(PRVLON.GE.0) THEN
                   PRVLN=PRVLON
                 ELSE
                   PRVLN=PRVLON+TCON
                 ENDIF
             ELSE
                 IF(TRLON.LT.0) THEN
                   TRLN=TRLON
                 ELSE
                   TRLN=TRLON-TCON
                 ENDIF
                 IF(PRVLON.LT.0) THEN
                   PRVLN=PRVLON
                 ELSE
                   PRVLN=PRVLON-TCON
                 ENDIF
             ENDIF
C       REJECT IF LONS MORE THAN 180 DEG APART
             IF(ABS(TRLN-PRVLN).GE.PIE) THEN
                 ISGOOD=.FALSE.
                 GO TO 14
             ENDIF
C       REJECT IF LONS DO NOT STRADDLE CLON
             TDIFF=TRLN-CLON
             PDIFF=PRVLN-CLON
             IF(TDIFF.GE.0..AND.PDIFF.LE.0.) GO TO 14
             IF(PDIFF.GE.0..AND.TDIFF.LE.0.) GO TO 14
             ISGOOD=.FALSE.
      ENDIF

   14      CONTINUE

      RETURN
      END

C+*+*+*+*+*+*+*+*+*+*+*+*+*+*+*+*+*+*+*+*+*+*+*+*+*+*+*+*+*+*+*+*+*+*+*+*|*+*+*+*+
```

```
Jul 20 13:56 1989  carr  .f Page 49

C UNIT NAME:                     ISAREA
C
C FUNCTIONAL DESCRIPTION:        .
C
C CALLED BY:                     CALCPR, DRAWST
C
C PROGRAMMER:                    DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        logical function isarea ()
c
c       this function determines whether the current word is an area name
c
        logical found
c -----  updated 7/31/87 CSL                               - isarea
        character typec
        real mparms(4)
        common /mparms/ mparms
        logical eol,eoc
        common /comnds/ lenl,indxw,lenw,eol,eoc
        character * 80 comlin
        common /comlin/ comlin
c
        call mesg(271)
c -----  updated 7/31/87 CSL                               - isarea
        call shownm (comlin(indxw:indxw+lenw-1),lenw,mparms,found,typec)
        isarea = found
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     ISBLAN
C
C FUNCTIONAL DESCRIPTION:        .
C
C CALLED BY:                     CMDMAI
C
C PROGRAMMER:                    DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        logical function isblan ()
c
c       this function determines whether the current command is blank
c
        logical eol,eoc
        common /comnds/ lenl,indxw,lenw,eol,eoc
c
        if (eoc.and.lenl.le.0) then
            isblan = .true.
        else
            isblan = .false.
        endif
```

Jul 20 13:56 1989 carl .f Page 50

```
c       print*,'isblan -- exit ',isblan
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     ISCOOR
C
C FUNCTIONAL DESCRIPTION:        .
C
C CALLED BY:                     CMDMAI, DRAWST, SCENTE
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        logical function iscoor ()
c
c       this function determines whether the current word is a geographic
c       coordinate
c
c
c ****
        iscoor = .false.
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     ISDECR
C
C FUNCTIONAL DESCRIPTION:        .
C
C CALLED BY:                     CMDMAI, DRAWST
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        logical function isdecr ()
c
c       this function determines whether the current word is an 'increase' word
c
        logical wordis
c
        if (wordis('LOWER').or.wordis('DOWN').or.wordis('DECREASE'))
     +  then
            isdecr = .true.
        else
            isdecr = .false.
        endif
c
        return
        end
```

Jul 20 13:56 1989 carh .f Page 51

```
C+*+*+*+*+*+*+*+*+*+*+*+*+*+*+*+*+*+*+*+*+*+*+*+*+*+*+*+*+*+*+*+*+*+*|*+*+*+*+
C UNIT NAME:                      ISEOC
C
C FUNCTIONAL DESCRIPTION:         .
C
C CALLED BY:                      CALCPR, CMDMAI, DECDET, DECSCA, DRAWST,
C                                 INCDET, INCSCA, MAJORS, MINORS
C                                 SCENTE, SETSCA, SPROJE, SSCALE
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        logical function iseoc ()
c
c       this function determines whether you are currently at an end of command
c
        logical eol,eoc
        common /comnds/ lenl,indxw,lenw,eol,eoc
c
        iseoc = eoc
c       print*,'iseoc -- exit ',iseoc
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      ISFEAT
C
C FUNCTIONAL DESCRIPTION:         .
C
C CALLED BY:                      CMDMAI, DRAWST, ERASES, MAJORS, MINORS,
C                                 REMOVF
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        logical function isfeat ()
c
c       this function determines whether the current word is a map feature
c
        common /indpar/ indpro,indftr
        logical wordis
c
        isfeat = .true.
        if (wordis('COASTLINES')) then
            indftr = 1
        else if (wordis('COUNTRIES')) then
            indftr = 2
        else if (wordis('STATES')) then
            indftr = 3
        else if (wordis('RIVERS')) then
```

Jul 20 13:56 1989 carl .f Page 52

```
          indftr = 4
      else if (wordis('RAILROADS')) then
          indftr = 5
      else if (wordis('ROADS')) then
          indftr = 6
      else if (wordis('GRIDS')) then
          indftr = 7
      else if (wordis('NAMES')) then
          indftr = 10
      else if (wordis('CITIES')) then
          indftr = 16
      else if (wordis('OVERLAY')) then
          indftr = 11
      else if (wordis('GAZETTEER')) then
          indftr = 15
      else
          isfeat = .false.
      endif
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     ISINCR
C
C FUNCTIONAL DESCRIPTION:        .
C
C CALLED BY:                     CMDMAI, DRAWST
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      logical function isincr ()
c
c     this function determines whether the current word is an 'increase' word
c
      logical wordis
c
      if (wordis('HIGHER').or.wordis('UP').or.wordis('RAISE')
     + .or.wordis('INCREASE')) then
          isincr = .true.
      else
          isincr = .false.
      endif
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     ISKILO
C
C FUNCTIONAL DESCRIPTION:        .
C
```

```
Jul 20 13:56 1989  carr  .f Page 53

C CALLED BY:                    SETSCA
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      logical function iskilo ()
c
c     this function determines whether the current word is kilometers
c
c
c ****
      iskilo = .false.
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     ISMILE
C
C FUNCTIONAL DESCRIPTION:        .
C
C CALLED BY:                     SETSCA
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      logical function ismile ()
c
c     this function determines whether the current word is miles
c
c
c ****
      ismile = .false.
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     ISNM
C
C FUNCTIONAL DESCRIPTION:        .
C
C CALLED BY:                     SETSCA
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      logical function isnm ()
c
c     this function determines whether the current word is nautical miles
c
```

Jul 20 13:56 1989 carh .f Page 54

```
c
c ****
      isnm = .false.
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      ISNUMB
C
C FUNCTIONAL DESCRIPTION:         .
C
C CALLED BY:                      SSCALE
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      logical function isnumb ()
c
c     this function determines whether the current word is a number
c
c
c ****
      isnumb = .false.
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      ISPROJ
C
C FUNCTIONAL DESCRIPTION:         .
C
C CALLED BY:                      CMDMAI, SPROJE
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      logical function isproj ()
c
c     this function determines whether the current word is a map projection
c
      common /indpar/ indpro,indftr
      logical wordis
c
      isproj = .true.
      if (wordis('GNOMONIC')) then
          indpro = 1
      else if (wordis('EQUATORIAL')) then
          indpro = 2
      else if (wordis('POLAR')) then
          indpro = 3
```

Jul 20 13:56 1989 carł .f Page 55

```
        else if (wordis('ORTHOGRAPHIC')) then
            indpro = 4
        else if (wordis('PERSPECTIVE')) then
            indpro = 5
        else if (wordis('EQUIRECTANGULAR')) then
            indpro = 6
        else if (wordis('MERCATOR')) then
            indpro = 7
        else
            isproj = .false.
        endif
c
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     ISSEGM
C
C FUNCTIONAL DESCRIPTION:        .
C
C CALLED BY:                     DRAWF, FTRCON
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        logical function issegm (nsegm)

c       does nsegm currently exist as a segment

        integer ARAY(19)

        ARAY(1) = 0
        CALL JISGMT(nsegm,ARAY)
        if (ARAY(1).EQ.1) then
            issegm = .true.
        else
            issegm = .false.
        endif

        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     JFILLM
C
C FUNCTIONAL DESCRIPTION:        .
C
C CALLED BY:                     FILLPT
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
```

Jul 20 13:56 1989 carl .f Page 56

```
      subroutine jfillm (icol,x,y,renew)
c
c     this subroutine does a hardware fill usually of a map using color
c     icol at x/y
c
      logical renew
      logical sys
      common /sysdbc/ sys

      call jconwv (x,y,z,vx,vy)
      if (sys) then
          print*,'jfillm -- ',x,y,vx,vy,renew,icol
          call jcmark (5)
          call jmark (x,y)
      else
          call jfillv (5126,icol,vx,vy,renew)
      endif
c
      return
      end

C+*+*+*+*+*+*+*+*+*+*+*+*+*+*+*+*+*+*+*+*+*+*+*+*+*+*+*+*+*+*+*+*+*+*+*+*+*+*+|*+*+*+*+
c  UNIT NAME:                    jfills
c
c  Functional Description:
c       this subroutine does a hardware fill using color icol at x/y
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                    APFILL
c
c  Local Variables: N/A
c
c  Restrictions: N/A
c
c  Abnormal Return Conditions:  N/A
c
c  Location:      /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine jfills (icol,x,y,renew)
c
c     this subroutine does a hardware fill usually of a symbol using
c     color icol at x/y
c
      logical renew
```

```
        call jconwv (x,y,z,vx,vy)
        call jfillv (5125,icol,vx,vy,renew)
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  jfillv
c
c  Functional Description:
c       this subroutine does a hardware fill using color icol at x/y using
c       escape code icode
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                  FCFILL, JFILLM, JFILLS
c
c  Local Variables: N/A
c
c  Restrictions: N/A
c
c  Abnormal Return Conditions:  N/A
c
c  Location:      /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine jfillv (icode,icol,vx,vy,renew)
c
c       this subroutine does a hardware fill using color icol at x/y
c
        logical renew
        real reapar(2)
        integer intpar(2)
        integer coltab(256)
        common /coltab/ coltab
        common /aspect/ xaspec,yaspec,xvlow,xvhigh,yvlow,yvhigh

        icol = coltab(icol+1)
c ***   fudge values because of Apollo seedfill problem
        avx = (vx + 1.) / 2.
        avx = avx / xaspec
        vx = avx * 2. - 1.
        avy = (vy + 1.) / 2.
        avy = avy / yaspec
        vy = avy * 2. - 1.

        reapar(1) = vx
```

Jul 20 13:56 1989 carl .f Page 58

```
        reapar(2) = vy
        intpar(1) = icol
        if (renew) then
            intpar(2) = 1
        else
            intpar(2) = 0
        endif
        call jescap (icode,2,2,intpar,reapar)

        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     JULIAN
C
C FUNCTIONAL DESCRIPTION:        .
C
C CALLED BY:                     DIFTIM, FADCHG
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine julian (julyr, julmon, julday, juldat)

c     this subroutine converts  yr, mon, day, values
c     into a corresponding julian date.

      integer i
      integer julyr
      integer julmon
      integer julday
      integer juldat
      integer*2 months(12)

      data months /31,28,31,30,31,30,31,31,30,31,30,31/

c       julyr = year
c       julmon = month
c       julday = day

        months(2) = 28

        if ((mod(julyr,4) .eq. 0) .and.
     +         ((mod(julyr,100) .ne. 0) .or.
     +         (mod(julyr,400) .eq. 0))) then
           months(2) = 29
        end if

        juldat = 0
        if (julmon .eq. 1) then
           juldat = julday
        else
           do 100 i=1,julmon-1
              juldat = juldat + months(i)
```

Jul 20 13:56 1989 carl .f Page 59

```
 100      continue
          juldat = juldat + julday
       end if
       return
       end

C++*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    keybd
c
c  Functional Description:       Subroutine to get keyboard input
c
c  Input Files/Parameters:
c      General Gobals
c        qdsdev        device       integer   DI-3000 variable
c        qpydev        device       integer   DI-3000 variable
c        qecho         device       integer   DI-3000 variable
c
c  Output Files/Parameters:      N/A
c
c  Subroutines/Functions Called:
c       Note: Subroutines preceded by a "j" are explained in the DI-3000 man
c
c  Called By:                    CLASS, OTHCLS
c
c  Local Variables:
c      maxchr                  integer   maximum length of input wanted
c                                          (80 or less characters)
c      length                  integer   actual length of input recieved
c      input                   character string of character input
c                                         from a menu
c
c  Restrictions: Input cannot be longer than 254 characters
c
c  Abnormal Return Conditions:  N/A
c
c  Location:   /a21/dave
c
c  Programmer        Date of Last Change       Reason for Change
c     bam              October 27, 1983
c
c  Work still to be done:
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

       subroutine keybd(maxchr,input,length)

c      calls jkeybd function

       integer qdsdev,qpydev,qecho,qlecho
       common /device/ qdsdev,qpydev,qecho,qlecho

       integer maxchr,length
       character *(*) input
       logical sys,rdkey,savkey
       common /sysdbc/ sys
```

Jul 20 13:56 1989 carh f Page 60

```
      common /rkdbc/ rdkey
      common /svkdbc/ savkey
      logical eofkey
      integer keylun,newlun
      common /keylun/ keylun,newlun,eofkey
      character*6 command
      logical timout
      integer*2 time
      common /timout/ timout,time
C      data keylun/28/,newlun/29/,eofkey/.false./     - keybd

      if (sys) print*,'keybd -- enter',maxchr
c     call enall
  100 continue
      if ( (rdkey).and..not.eofkey) then
          call kpause (eofkey)
          read (keylun,*,end=192,err=191) command,length,input
          if (command(1:5).ne.'jkeyb') then
              print*,'keybd -- incompatible command in ',
     +        'read_keys file  ',command,length
c             *** exit on error
              go to 199
          endif
      else

  125     continue

c         polling loop to check for incoming data or clock interrupt

          call datpol

c         check for keyboard interrupt

          call jkeybs(qdsdev,qpydev,qecho,maxchr,input,length)
          if (timout) then
             go to 125
          end if
      end if

      go to 199
  191 continue
          print*,'keybd -- error on read of save key file',
     +    '  ',keylun,length,'  ',input(1:length)
          go to 199
  192 continue
          print*,'keybd -- premature end of read key file.'
          eofkey = .true.
          go to 100
c         **** go back and get the function interactively on end of file
  199 continue
      if (savkey) then
          write (newlun,*,err=135) '''jkeybd''',length,' ''',
     +    input(1:length),''''
      endif
      go to 140
  135 continue
```

Jul 20 13:56 1989 carr .f Page 61

```
            print*,'keybd -- error on write to save key file',
     +      '  ',newlun,length,'  ',input(1:length)
  140   continue
        if (length.gt.maxchr) then
c           print*,'keybd -- length > maxchr : ',length,maxchr
            length = maxchr
        endif
c       call soverl
        if (sys) print*,'keybd -- exit ',length,'  ',input(1:length)

        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    keybs
c
c  Functional Description:
c       calls jkeybs function
c
c  Input Files/Parameters:
c
c  Output Files/Parameters: N/A
c
c  Subroutines/Functions Called:
c       Note: Subroutines preceded by a "j" are explained in the DI-3000 man
c
c  Called By:                    PROMPT
c
c  Local Variables: N/A
c
c  Restrictions: N/A
c
c  Abnormal Return Conditions:  N/A
c
c  Location:      Apollo       /gl
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-

        subroutine keybs (maxchr,input,length)

c       calls jkeybs function

        integer qdsdev,qpydev,qecho,qlecho
        common /device/ qdsdev,qpydev,qecho,qlecho

        integer maxchr,length
        character *(*) input
        logical sys,rdkey,savkey
        common /sysdbc/ sys
        common /rkdbc/ rdkey
        common /svkdbc/ savkey
        logical eofkey
        integer keylun,newlun
```

Jul 20 13:56 1989 carl .f Page 62

```
        common /keylun/ keylun,newlun,eofkey
        character*6 command
        integer*2 time
        logical timout
        common /timout/ timout, time

        if (sys) print*,'keybs -- enter',maxchr
c       call enall
  100   continue
        if ((rdkey).and..not.eofkey) then
            call kpause (eofkey)
            read (keylun,*,end=192,err=191) command,length,input
            if (command(1:5).ne.'jkeyb') then
                print*,'keybs -- incompatible command in ',
     +          'read_keys file  ',command,length
c               *** exit on error
                go to 199
            endif
        else

  125       continue
c
c           polling loop to check for incoming data or clock interrupt
c
            call datpol
c
c           check for keyboard interrupt
c
            call jkeybs (qdsdev,qpydev,qecho,maxchr,input,length)
            if (timout) then
               go to 125
            end if
        endif

c*******    remove <return> from length of input string *******************
c           length = length - 1
c***********************************************************************
        go to 199
  191   continue
            print*,'keybs -- error on read of save key file',
     +      '  ',keylun,length,'  ',input(1:length)
            go to 199
  192   continue
            print*,'keybs -- premature end of read key file.'
            eofkey = .true.
            go to 100
c           **** go back and get the function interactively on end of file
  199   continue
        if (savkey) then
            write (newlun,*,err=135) '''jkeybs''',length,' ''',
     +      input(1:length),''''
        endif
        go to 140
  135   continue
            print*,'keybs -- error on write to save key file',
     +      '  ',newlun,length,'  ',input(1:length)
```

```
  140   continue
        if (length.gt.maxchr) then
c           print*,'keybs -- length > maxchr : ',length,maxchr
            length = maxchr
        endif
c       call soverl
        if (sys) print*,'keybs -- exit ',length,'  ',input(1:length)

        return
        end

C+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    keys
c
c  Functional Description:
c       puts standard function key items in key area
c
c  Input Files/Parameters:
c
c  Output Files/Parameters: N/A
c
c  Subroutines/Functions Called:
c
c  Called By:                    FMAIN
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine keys
c
c       puts standard function key items in key area
c
        common /commen/xllmen,yllmen,xurmen,yurmen,ibcmen,iocmen,incmen
        common /nsgkey/ nsgkey,nsgktx
        data icolcm/16/
c
c       print*,'keys -- enter',nsgkey,nsgktx
        tmp = yurmen
        yurmen = 8.
        call keyvpt
        call menwin
        call creatm (nsgktx,ierror)
        yurmen = tmp
c       print*,'keys -- exit',ierror
c
        return
```

Jul 20 13:56 1989 carl .f Page 64

```
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    keyvpt
c
c  Functional Description:
c       this subroutines sets the key area viewport
c
c  Input Files/Parameters:
c
c  Output Files/Parameters: N/A
c
c  Subroutines/Functions Called:
c       Note: Subroutines preceded by a "j" are explained in the DI-3000 manual.
c
c  Called By:                    KEYS, MAKKEY
c
c  Local Variables: N/A
c
c  Restrictions: N/A
c
c  Abnormal Return Conditions:  N/A
c
c  Location:      Apollo      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine keyvpt
c
c     this subroutines sets the key area viewport
c
      common /comkvp/ xllkvp,yllkvp,xurkvp,yurkvp
c
      call jvport (xllkvp,xurkvp,yllkvp,yurkvp)
c
      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    LEGEND
C
C FUNCTIONAL DESCRIPTION:       .
C
C CALLED BY:                    ERASEM
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine legend
      return
      end
```

Jul 20 13:56 1989 carh .f Page 65

```
C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   length
c
c  Functional Description:
c       this subroutine finds the length of a string
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                   CRMESG, DISP5,  MESGJF, PLTCIT,
C                               READCH, GETARG, DSPCLS
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine length (buf,maxlen,lenbuf)
c
c       this subroutine finds the length of a string
c
        character*(*) buf
c
        call lngth (buf,maxlen,lenbuf)
c
        return
        end


c       subroutine length (buf,maxlen,lenbuf)
c
c       this subroutine finds the length of a string
c
c       character*(*) buf
c
c       do 110 i=maxlen,1,-1
c           if (buf(i:i).ne.' ') go to 120
c 110   continue
c       i=0
c 120   continue
c       lenbuf = i
c
c       return
```

Jul 20 13:56 1989 carł .f Page 66

```
c       end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: limits
C
C FUNCTIONAL DESCRIPTION:  CALCULATE GEOGRAPHIC LIMITS OF VIEWPORT
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                 NO LONGER USED BY CARICATURE
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                DATE OF LAST CHANGE     REASON FOR CHANGE
C
C     DAVE NATION                                    ORIGINAL CODE.
C     JERRY FENERTY                                  DOCUMENT AND MODIFY
C                                                    FOR A21 PROTOTYPE.
C     David Nation           12/10/86                Correct Equirect code
C                                                    & impl Mercator code
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE LIMITS(ITPRO,XRA,YRA,CLA,CLO,VMAXLA,VMINLA,
     +  VMAXLO,VMINLO)

C       CALCULATE GEOGRAPHIC LIMITS OF VIEWPORT

        LOGICAL NEWONS
        LOGICAL ISINV
        LOGICAL NPONSC,SPONSC

        COMMON /PROJT/ IGNOMN,IORTEQ,IORTPO,IORTHO,IPERSP
        COMMON /PROJT2/ IEQREC,IMERCA,ILAMCN
        COMMON /PIE/ PIE,TPIE,PIO2,PIO4
        COMMON /CONST/ MAXVAL,RMPV,C,R,ERNM
        LOGICAL INVALI
        COMMON /INVALI/ INVALI
        logical sys
        common /sysdbc/ sys

        if (sys) then
           print*,'limits -- enter ',ITPRO,XRA,YRA,CLA,CLO,VMAXLA,
```

Jul 20 13:56 1989 carl .f Page 67

```
     +          VMINLA,VMAXLO,VMINLO
        endif
        VMAXLA=90.*60.*C
        VMINLA=-90.*60.*C
        VMAXLO=180.*60.*C
        VMINLO=-180.*60.*C
C       TEST FOR POLES (DOES NOT WORK AS EXPECTED FOR OE PROJ)
        PLAT=90.*60.*C
        PLON=0.
        CALL INVTES (PLAT,PLON,ISINV)
        NPONSC=.FALSE.
        IF (.NOT.ISINV) THEN
            CALL LLTOXY (PLAT,PLON,X,Y)
            CALL CLIPXY (X,Y,NPONSC)
        ENDIF
        PLAT=-PLAT
        CALL INVTES (PLAT,PLON,ISINV)
        SPONSC=.FALSE.
        IF (.NOT.ISINV) THEN
            CALL LLTOXY (PLAT,PLON,X,Y)
            CALL CLIPXY (X,Y,SPONSC)
        ENDIF
C       GO TO (910,920,930,940,950,960,960,980),ITPRO      - limits
        GO TO (910,920,930,990,990,960,960,990),ITPRO
C                                   GNOMONIC        1
  910   CONTINUE
        IF (NPONSC) THEN
            CALL XYTOLL(0.,-YRA,PLAT,PLON)
            VMINLA=PLAT
            CALL XYTOLL(XRA,-YRA,PLAT,PLON)
            IF (PLAT.LT.VMINLA) VMINLA=PLAT
            GO TO 918
        ENDIF
        IF (SPONSC) THEN
            CALL XYTOLL (0.,YRA,PLAT,PLON)
            VMAXLA=PLAT
            CALL XYTOLL(XRA,YRA,PLAT,PLON)
            IF (PLAT.GT.VMAXLA) VMAXLA=PLAT
            GO TO 918
        ENDIF
            CALL XYTOLL (0.,YRA,PLAT,PLON)
            VMAXLA=PLAT
            CALL XYTOLL(XRA,YRA,PLAT,PLON)
            IF (PLAT.GT.VMAXLA) VMAXLA=PLAT
            CALL XYTOLL(0.,-YRA,PLAT,PLON)
            VMINLA=PLAT
            CALL XYTOLL(XRA,-YRA,PLAT,PLON)
            IF (PLAT.LT.VMINLA) VMINLA=PLAT
            CALL XYTOLL (-XRA,YRA,PLAT,PLON)
            VMIN=PLON
            CALL XYTOLL (-XRA,-YRA,PLAT,PLON)
            IF (PLON.LT.VMIN) VMIN=PLON
            CALL XYTOLL (XRA,YRA,PLAT,PLON)
            VMAX=PLON
```

Jul 20 13:56 1989 carł .f Page 68

```
            CALL XYTOLL (XRA,-YRA,PLAT,PLON)
            IF (PLON.GT.VMAX) VMAX=PLON
            IF (VMAX.GT.VMIN) THEN
                VMAXLO=VMAX
                VMINLO=VMIN
            ENDIF
  918   CONTINUE
        GO TO 990

C       ORTHOGRAPHIC EQUATORIAL     2

  920   CONTINUE
        CALL XYTOLL (0.,-YRA,PLAT,PLON)
        IF (.NOT.INVALI) THEN
            VMINLA=PLAT
        ENDIF
        CALL XYTOLL (0.,YRA,PLAT,PLON)
        IF (.NOT.INVALI) THEN
            VMAXLA=PLAT
        ENDIF
        PLAT=0.
        PLON=180.*60.*C
        CALL INVTES (PLAT,PLON,ISINV)
        NEWONS=.FALSE.
        IF (.NOT.ISINV) THEN
            CALL LLTOXY (PLAT,PLON,X,Y)
            CALL CLIPXY (X,Y,NEWONS)
        ENDIF
        IF (.NOT.NEWONS) THEN
            VMAXLO=CLO+PIO2
            VMINLO=CLO-PIO2
            CALL XYTOLL (-XRA,YRA,PLAT,PLON)
            IF (INVALI) GO TO 928
            VMIN=PLON
            CALL XYTOLL (-XRA,-YRA,PLAT,PLON)
            IF (INVALI) GO TO 928
            IF (PLON.LT.VMIN) VMIN=PLON
            VMINLO=VMIN
            CALL XYTOLL (XRA,YRA,PLAT,PLON)
            IF (INVALI) GO TO 928
            VMAX=PLON
            CALL XYTOLL (XRA,-YRA,PLAT,PLON)
            IF (INVALI) GO TO 928
            IF (PLON.GT.VMAX) VMAX=PLON
            VMAXLO=VMAX
        ENDIF
        GO TO 929
  928   CONTINUE
C       PRINT*,'LIMITS -- ERROR  INVALI,PLAT,PLON=',INVALI,PLAT,PLON
  929   CONTINUE
        GO TO 990

C       ORTHOGRAPHIC POLAR      3

  930   CONTINUE
        IF (CLA.GE.0.) THEN
```

```
            VMINLA=0.
            if (.not.nponsc) then
              call xytoll(xra,yra,plat,plon)
              vmaxlo = plon
              call xytoll(-xra,yra,plat,plon)
              vminlo = plon
              call xytoll(0.0,yra,plat,plon)
              vmaxla = plat
            else
              vmaxlo =  PIE
              vminlo = -PIE
              vmaxla =  PIO2
            endif
        ELSE
            VMAXLA=0.
            if (.not.sponsc) then
              call xytoll(xra,-yra,plat,plon)
              vmaxlo = plon
              call xytoll(-xra,-yra,plat,plon)
              vminlo = plon
              call xytoll(0.0,-yra,plat,plon)
              vmaxla = plat
            else
              vmaxlo =  PIE
              vminlo = -PIE
              vminla = -PIO2
            endif
        ENDIF
        if (vmaxlo.lt.vminlo) then
            vmaxlo =  PIE
            vminlo = -PIE
        endif
        GO TO 990

C       ORTHOGRAPHIC            4

  940   CONTINUE
        if (clat.gt.0) then
            call xytoll(-xra,-yra,plat,plon)
            vminla = plat
            if (.not.nponsc) then
              call xytoll(xra,yra,plat,plon)
              vmaxlo = plon
              call xytoll(-xra,yra,plat,plon)
              vminlo = plon
              call xytoll(0.0,yra,plat,plon)
              vmaxla = plat
            else
              vmaxlo =  PIE
              vminlo = -PIE
              vmaxla =  PIO2
            endif
        else
            call xytoll(xra,yra,plat,plon)
            vmaxla = plat
            if (.not.sponsc) then
```

Jul 20 13:56 1989 carh f Page 70

```
            call xytoll(xra,-yra,plat,plon)
            vmaxlo = plon
            call xytoll(-xra,-yra,plat,plon)
            vminlo = plon
            call xytoll(0.0,-yra,plat,plon)
            vminla = plat
          else
            vmaxlo =  PIE
            vminlo = -PIE
            vminla =  PIO2
          endif
      endif
      if (vmaxlo.lt.vminlo) then
          vmaxlo =  PIE
          vminlo = -PIE
      endif

      GO TO 990

C     PERSPECTIVE              5

  950 CONTINUE
      xedge = sqrt(xra**2 - yra**2) -1
      if (clat.gt.0.) then
          call xytoll(xedge,-yra,plat,plon)
          vminla = plat
          if (.not.nponsc) then
            call xytoll(0.,yra,plat,plon)
            vmaxla = plat
            PLAT=CLA
            PLON=180.*60.*C
            NEWONS=.FALSE.
            call xytoll(xedge,yra,plat,plon)
            vmaxlo = plon
            call xytoll(-xedge,yra,plat,plon)
            vminlo = plon
            if (vmaxlo.lt.vminlo) then
              vmaxlo =  PIE
              vminlo = -PIE
            endif
          endif
      else
          call xytoll(xedge,yra,plat,plon)
          vmaxla = plat
          if (.not.sponsc) then
            call xytoll(0.,-yra,plat,plon)
            vmaxla = plat
            PLAT=CLA
            PLON=180.*60.*C
            NEWONS=.FALSE.
            call xytoll(xedge,-yra,plat,plon)
            vmaxlo = plon
            call xytoll(-xedge,-yra,plat,plon)
            vminlo = plon
            if (vmaxlo.lt.vminlo) then
              vmaxlo =  PIE
```

Jul 20 13:56 1989 carr .f Page 71

```
            vminlo = -PIE
          endif
        endif
      endif

      GO TO 990

C     EQUIRECTANGULAR  AND MERCATOR

 960  CONTINUE
      CALL XYTOLL (0.,YRA,PLAT,PLON)
      IF (.not.INVALI) THEN
          VMAXLA=PLAT
      ENDIF
      CALL XYTOLL (0.,-YRA,PLAT,PLON)
      IF (.not.INVALI) THEN
          VMINLA=PLAT
      ENDIF
      PLAT=CLA
      PLON=180.*60.*C
      NEWONS=.FALSE.
      CALL LLTOXY (PLAT,PLON,X,Y)
      CALL CLIPXY (X,Y,NEWONS)
      IF (.NOT.NEWONS) THEN
          CALL XYTOLL (-XRA,0.,PLAT,PLON)
          VMINLO=PLON
          CALL XYTOLL (XRA,0.,PLAT,PLON)
          VMAXLO=PLON
      ENDIF
      GO TO 990

C     LAMBERT
 980  CONTINUE
      if (clat.gt.0.) then
          call xytoll(-xra,-yra,plat,plon)
          vminla = plat
          if (.not.nponsc) then
            call xytoll(0.,yra,plat,plon)
            vmaxla = plat
            call xytoll(xra,yra,plat,plon)
            vmaxlo = plon
            call xytoll(-xra,yra,plat,plon)
            if (plon.lt.vmaxlo) then
              vminlo = plon
            else
              vmaxlo = -vminlo
            endif
          endif
      else
          call xytoll(xra,yra,plat,plon)
          vmaxla = plat
          if (.not.sponsc) then
            call xytoll(0.,-yra,plat,plon)
            vmaxla = plat
            call xytoll(xra,-yra,plat,plon)
            vmaxlo = plon
```

Jul 20 13:56 1989 carł .f Page 72

```
            call xytoll(-xedge,-yra,plat,plon)
            if (plon.lt.vmaxlo) then
              vminlo = plon
            else
              vmaxlo = -vminlo
            endif
          endif
      endif

      GO TO 990

990   CONTINUE
      if (sys) then
          print*,'limits -- exit ',ITPRO,XRA,YRA,CLA,CLO,VMAXLA,
     +        VMINLA,VMAXLO,VMINLO
      endif
      RETURN
      END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: LLCONV
C
C FUNCTIONAL DESCRIPTION:  CONVERTS DDMMSS,SIGN INTO LAT OR LONG.
C
C INPUT FILES/PARAMETERS:
C
C       CLAT                    REAL*8      LAT OR LONG VALUE (DDMMSS).
C       SIGN                    INTEGER     INDICATES DIRECTION
C
C GLOBAL VARIABLES : NONE.
C
C OUTPUT FILES/PARAMETERS:

C       LLCONV                  REAL*8      LAT OR LONG VALUE (RADIANS)
C
C SUBROUTINES/FUNCTIONS CALLED : NONE.
C
C CALLED BY: GETLL, PLTCIT, PLTDAT
C
C LOCAL VARIABLES:

C       IDEG                    INTEGER     DEGRESS.
C       IMIN                    INTEGER     MINUTES.
C       ISEC                    INTEGER     SECONDS.
C       DTORAD                  REAL*8      DEGREES TO RADIANS CONVERSION.

C RESTRICTIONS: NONE.
C
C ABNORMAL RETURN CONDITIONS:    NONE.
C
C LOCATION:                      /a21/gjf/A21GEO.FTN
C
C PROGRAMMER:                    DATE OF LAST CHANGE     REASON FOR CHANGE
C
C    DAVE NATION                                         ORIGINAL CODE.
```

```
Jul 20 13:56 1989  carl  .f Page 73

C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

C        REAL*8 FUNCTION LLCONV (CLAT,ISIGN)
        REAL FUNCTION LLCONV (CLAT,ISIGN)

C       CONVERT DDMMSS INTEGER TO SECONDS ISIGN IS 1 OR -1 FOR THE SIGN

C        REAL*8 CLAT
        REAL CLAT

        DATA C /2.908882087E-4/
        DTORAD = C * 60
        IDEG = CLAT / 10000
        IMIN = (CLAT - IDEG * 10000) / 100
        ISEC = CLAT - IDEG * 10000 - IMIN * 100
        ZMIN = IMIN
        ZSEC = ISEC
        LLCONV = (IDEG + ZMIN/60 + ZSEC/3600) * ISIGN

        IF (LLCONV.GT.180) LLCONV = LLCONV - 360.

        LLCONV = LLCONV * DTORAD

        RETURN
        END


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    LLGRID
C
C FUNCTIONAL DESCRIPTION:       .
C
C CALLED BY:                    DGRID
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

       SUBROUTINE LLGRID (IPGRID,VMAXLA,VMINLA,VMAXLO,VMINLO,DOTEM,
     + ITPRO)
C              LATITUDE/LONGITUDE GRID DISPLAY SUBROUTINE
c
Ctfw   Replaced checka calls with ck4any calls to draw lines
Ctfw   through graticle concavities  - Tom Wescott 11/87
c
       COMMON /CONST/ MAXVAL,RMPV,C,R,ERNM

       LOGICAL CHINV,SETINV,SOMEON
       LOGICAL DOTEM,FRSTPO
       logical sys
       common /sysdbc/ sys

       DIMENSION ALIMIT(4)
```

Jul 20 13:56 1989 carł .f Page 75

```
                  call grdlon (lat,latst2,latinc,latstp,plon,frstpo,
     +                ylonof,dotem,lonval)

              ENDIF

 845      CONTINUE

          DO 847 LAT=0,-MAXLAT+LATST2,-LATST2

              CALL CHINT (INTERR,CH)
              IF (INTERR) GO TO 851

              RMAXLA=LAT*C
              RMINLA=(LAT-LATST2)*C

              IF (RMAXLA.LT.VMINLA) GO TO 847
              IF (RMINLA.GT.VMAXLA) GO TO 847

              call ck4any(someon,alimit)

              IF (SOMEON) THEN

                  call grdlon (lat-latst2,-latst2,-latinc,latstp,
     +                         plon,frstpo,ylonof,dotem,lonval)

              ENDIF

 847      CONTINUE
 850  CONTINUE
 851  CONTINUE

      DO 880 LATVAL=MAXLAT-LATSTP,-MAXLAT+LATSTP,-LATSTP

          CALL CHINT (INTERR,CH)
          IF (INTERR) GO TO 881
          PLAT=LATVAL*C

          IF (PLAT.GT.VMAXLA) GO TO 880
          IF (PLAT.LT.VMINLA) GO TO 881

          RMAXLA=PLAT
          RMINLA=PLAT
          CHINV=SETINV
          FRSTPO=.TRUE.

          DO 875 LON=-MAXLON,MAXLON-LONST2,LONST2

              RMAXLO=(LON+LONST2)*C
              RMINLO=LON*C

              IF (RMAXLO.LT.VMINLO) GO TO 875
              IF (RMINLO.GT.VMAXLO) GO TO 875

              call ck4any(someon,alimit)
```

Jul 20 13:56 1989 car! .f Page 76

```
                IF (SOMEON) THEN

                    call grdlat (lon,lonst2,loninc,lonstp,plat,frstpo,
     +                  ylatof,dotem,latval)

                ENDIF
  875     CONTINUE
  880   CONTINUE
  881   CONTINUE
C---- flush the graphics buffer of any remaining lat/long lines
        call flushb
        if (sys) print*,'llgrid -- exit '
        RETURN
        END


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: llinxy
C
C FUNCTIONAL DESCRIPTION:  CONVERTS LAT/LON TO X/Y, ALSO CHECKS FOR INVALID
C       CONVERSIONS, INVISIBLE POINTS, AND CLIPS
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                      DRAWEL, PLOTIT
C
C LOCAL VARIABLES: NONE.
C
C RESTRICTIONS: NONE.
C
C ABNORMAL RETURN CONDITIONS:     NONE.
C
C LOCATION:
C
C PROGRAMMER:                     DATE OF LAST CHANGE     REASON FOR CHANGE
C
C     DAVE NATION                                         ORIGINAL CODE.
C     JERRY FENERTY                                       DOCUMENT AND MODIFY
C                                                         FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE LLINXY (PLAT,PLON,X,Y,INVAL,ISINV,NEWONS)

C       CONVERTS LAT/LON TO X/Y, ALSO CHECKS FOR INVALID CONVERSIONS,
C       INVISIBLE POINTS, AND CLIPS
C       TO SCREEN WITH NEWONS

        LOGICAL ISINV,NEWONS,INVAL
        LOGICAL INVALI
```

```
Jul 20 13:56 1989  carł  .f Page 77

        COMMON /INVALI/ INVALI

        INVAL = .TRUE.
        ISINV = .TRUE.
        NEWONS = .FALSE.
        CALL INVTES (PLAT,PLON,ISINV)
        CALL LLTOXY (PLAT,PLON,X,Y)
        IF (.NOT.INVALI) THEN
            INVAL = .FALSE.
            CALL CLIPXY (X,Y,NEWONS)
        ENDIF

        RETURN
        END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     LLSEC
C
C FUNCTIONAL DESCRIPTION:        .
C
C CALLED BY:                     LLTOR
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        integer*4 function llsec (lat)
c
c       convert dms format of lat/lon to seconds
c
        integer*4 lat,ideg,imin,isec
c
c       print*,'llsec -- enter ',lat
        ideg = lat / 10000
        imin = (lat - ideg * 10000) / 100
        isec = lat - ideg * 10000 - imin * 100
        llsec = ideg * 3600 + imin * 60 + isec
c       print*,'llsec -- exit ',llsec
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     LLTOR
C
C FUNCTIONAL DESCRIPTION:        .
C
C CALLED BY:                     CURBOX, HILPLT, PLOTOV, PROCOV
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine lltor (lat,lon,nsi,ewi,plat,plon)
```

```
c
c       convert lat/lon in integer seconds to real lat/lon in radians
c
        real*8 dtor,stor
        common /dtor/ dtor,stor
        character nsi,ewi
        integer*4 lat,lon,lats,lons
        integer*4 llsec
c
            rlat = llsec (lat)
            if (nsi.eq.'S'.or.nsi.eq.'s') rlat = -rlat
            rlon = llsec (lon)
            if (ewi.eq.'W'.or.ewi.eq.'w') rlon = -rlon
            lats = rlat
            lons = rlon
            plat = rlat * stor
            plon = rlon * stor
c
        return
        end

C+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: LLTORD
C
C FUNCTIONAL DESCRIPTION:  INTERPRETS A LAT/LONG STRING (DDMMSSN/DDDMMSSE)
C                          AND RETURNS LAT/LONG IN RADIANS.
C
C INPUT FILES/PARAMETERS:
C
C       STRNG                 CHAR*(*)    LAT/LONG STRING.
C       LEN                   INTEGER     LENGTH OF STRING.
C
C
C GLOBAL VARIABLES : NONE.
C
C OUTPUT FILES/PARAMETERS:
C
C       LAT                   REAL*8      LATITUDE.
C       LON                   REAL*8      LONGITUDE.
C       IERROR                INTEGER     ERROR CONDITION.
C
C SUBROUTINES/FUNCTIONS CALLED :
C
C       GETLL                 CONVERTS DDMMSS TO A LAT OR LONG VALUE.
C
C CALLED BY:                    BSTMAP, LLCENT
C
C LOCAL VARIABLES:
C
C       NST                   CHAR(4)     'N','n','S','s'.
C       EWT                   CHAR(4)     'E','e','W','e'.
C
C RESTRICTIONS: STRING MUST BE IN FORMAT DDMMSS(N OR S)/DDDMMSS(E OR W).
C
C ABNORMAL RETURN CONDITIONS:   NONE.
```

Jul 20 13:56 1989 carŀ .f Page 79

```
C
C LOCATION:                     /a21/gjf/A21GEO.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C     L. MCCLEARY               AUG 1988                LAT LIMITS CHECK
C
C-*-*-*-*-*-*-*-*-*-*-*-*-*-*-*-*-*-*-*-*-*-*-*-*-*-*-*-*-*-*-*-*-*-*-*|*-*-*-*-

        SUBROUTINE LLTORD (STRNG,LEN,LAT,LON,IERROR)

C       INTERPRET LATITUDE LONGITUDE COORDINATE STRING

        CHARACTER*(*) STRNG
        REAL LAT,LON
        CHARACTER NST(4),EWT(4)
        DATA NST/'N','n','S','s'/,EWT/'E','e','W','w'/
        DATA PIO2/1.5707963/

        IERROR = 0

C  CALL GETLL WITH LATITUDE AND LONGITUDE PORTIONS OF STRING.

        CALL GETLL (STRNG(1:LEN),NST,LAT,INDX,LEN,IERROR)
        IF (IERROR.EQ.0) THEN
            IF (LAT.GT.PIO2) LAT = PIO2
            IF (LAT.LT.-PIO2) LAT = -PIO2
            INDX = INDX + 1
            IF (INDX.GT.LEN) THEN
                IERROR = 1
                RETURN
            ENDIF
 25         CONTINUE
            IF (STRNG(INDX:INDX).EQ.' '.OR.
     +          STRNG(INDX:INDX).EQ.'/') THEN
                INDX = INDX + 1
                IF (INDX.LT.LEN+1) GOTO 25
                IERROR = 1
            ENDIF
            IF (IERROR.EQ.0) THEN
                CALL GETLL (STRNG(INDX:LEN),EWT,LON,INDX2,
     +                      LEN-INDX+1,IERROR)
            ENDIF
        ENDIF
        RETURN
        END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    LNGTH
C
C FUNCTIONAL DESCRIPTION:       FINDS THE LENGTH OF A TEXT STRING BY SEARCH-
C                               ING BACKWARDS FOR THE FIRST OCCURENCES OF A
```

Jul 20 13:56 1989 carh .f Page 80

```
C                                PRINTABLE CHARACTER
C
C INPUT FILES/PARAMETERS:
C
C     VARIABLE                   TYPE              DESCRIPTION
C
C       BUF                    CHAR*(*)    A CHARACTER STRING OF UNKNOWN LENGTH
C       MAXLEN                 INTEGER     THE MAXIMUM LENGTH BUF CAN BE
C
C OUTPUT FILES/PARAMETERS:
C
C     VARIABLE                   TYPE              DESCRIPTION
C
C       LENBUF                 INTEGER     THE LENGTH OF THE TEXT STRING
C
C SUBROUTINES/FUNCTIONS CALLED
C
C       JXXXX            DI-3000 SUBROUTINES
C
C CALLED BY:                     DRWAMP, LENGTH, PLOTOV, PUTAMP
C
C LOCAL VARIABLES:        NONE
C
C RESTRICTIONS:           NONE
C
C ABNORMAL RETURN CONDITIONS: N/A
C
C PROGRAMMER:                    DATE OF LAST CHANGE     REASON FOR CHANGE
C
C  DABUTSON                             4/30/84           INITIAL ENTRY
c  L McCleary               1987              empty string - lngth
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
        SUBROUTINE LNGTH (BUF,MAXLEN,LENBUF)
C
C       THIS SUBROUTINE FINDS THE LENGTH OF A STRING
C
        CHARACTER*(*) BUF
C
C*** FROM THE MAXIMUM LENGTH UNTIL A PRINTABLE CHARACTER IS FOUND
        DO 110 I=MAXLEN,1,-1
            IF (BUF(I:I) .GE. '!' .AND. BUF(I:I) .LE. '~') GOTO 120
  110   CONTINUE
        I=0
  120   CONTINUE
C*** LENGTH IS SET TO I
        LENBUF = I
        IF (LENBUF.EQ.0.AND.BUF(1:1).EQ.' ') LENBUF = 1
C
        RETURN
        END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     LOADIC
```

Jul 20 13:56 1989 carh f Page 81

```
C
C FUNCTIONAL DESCRIPTION:        .
C
C CALLED BY:                    GETICN
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine loadic (icnnam)

c      this routine is called by the geticn to load the current
c       icon into a table.
c      VARIABLES:
c        icnnam- name of the icon to be drawn
c        filnam - name of the file to be accessed
c        common block device- selected display device for pausing
c        iunit- logical unit number  assigned to the file
c    CALLED BY: geticn
c    CALLS:    openit  closit
c    PROGRAMMER:  Nancy Detrich, A215, March, 1984

        character*50 filenm
        character*30 fname
        character*50 menpth
        common /menpth/ menpth
        common /lenmen/ lenmen
        integer icnnam
        logical sys
        common /sysdbc/ sys
        integer iarray(26,100)
        character*40 ictarr(100)
        common /iconda/ lenica,iarray,ictarr
        character cchar
        character*80 msg
        character*26 flettr
        data maxica,maxtxt /100,40/
c   !!!!! hard-coded unit number !!!!
        data iunit/10/
        data flettr /'abcdefghijklmnopqrstuvwxyz'/
c       numinc is range of menu numbers in each file
c       maxnum is number of menu files
        data numinc,maxnum /25,15/
        data fname/'file'/,lname/4/

        if (sys) print*,'LOADIC -- icnnam = ',icnnam
        ierror = 0
        indlet = icnnam / numinc + 1
        if (indlet.lt.1) indlet = 1
        if (indlet.gt.maxnum) indlet = maxnum
        filenm = menpth(1:lenmen) // fname(1:lname) //
     +  flettr(indlet:indlet) // '.icon'
        lennam = lenmen + lname + 6
c       print*,'  before open ',filenm(1:lennam)
        call openit(filenm,lennam,iunit,0,ierror)
        if (ierror.ne.0) go to 20
```

```
        REWIND iunit

        lenica = 0
c       loop until the correct icon records are located
  100   continue
            read (iunit,10110,end=193,err=192) cchar,msg
10110       format (a1,a80)
c           *** skip comment lines
            if (cchar.eq.'C'.or.cchar.eq.'c') go to 100
            if (cchar.eq.'I'.or.cchar.eq.'i') then
                read (msg,1150,end=193,err=192) msgnum
 1150           format (i5)
                if (msgnum.eq.icnnam) go to 115
            endif
        go to 100
  115   continue
C        print*,'ICON found ',ICNNAM
        i=0
c       loop until no more data lines (blank first char)
  120   continue
            read (iunit,10110,end=20,err=192) cchar,msg
c           *** skip comment lines
            if (cchar.eq.'C'.or.cchar.eq.'c')
     +      go to 120
            if (cchar.eq.' ') then
c                   read in record and load iarray with integers
c                   from the file
                    read(msg,11,end=20,err=192)
     +              (iarray(i,lenica+1),i = 1,26)
  11                format(26i3)
                    lenica = lenica + 1
C                    if (iarray(lenica,1).eq.7) then
                    if (iarray(1,lenica).eq.7) then
c                       read in the text string to be displayed
                        nchars = maxtxt
                        call readch(iunit,ictarr(lenica),nchars,ierror)
                        if (ierror.ne.0) go to 20
                    endif
                    if (lenica.ge.maxica) go to 20
            else
                go to 20
            endif
            go to 120

 20     continue
        go to 200
  190       continue
            print*,' Menu number conversion error ',icnnam
            ierror = 211
            go to 200
  191       continue
            print*,' Couldn''t open file ',filenm
            ierror = 212
            go to 200
  192       continue
```

Jul 20 13:56 1989 carb .f Page 83

```
            print*,' Error in icon file read ',filenm(1:LENNAM),icnnam
            ierror = 213
            go to 200
  193       continue
         print*,' Premature end of icon file ',filenm(1:LENNAM),icnnam
            ierror = 214
            go to 200
  200   continue

        call closit(iunit)
        if (sys) print*,'LOADIC -- exit',lenica
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   LOCAT
c
c  Functional Description:
c
c  Input Files/Parameters:
C       qdsdev,qpydev,qecho           INTEGER
C       BUTTON                        INTEGER
C       VX,VY                         REAL
c
c  Output Files/Parameters:
c
c  Subroutines/Functions Called:
c       Note: Subroutines preceded by a "j" are explained in the DI-3000 manual.
C       ENALL
C       SOVERL
c
c  Called By:                   FCFILL, LOCGEO
c
c  Local Variables:   N/A
c
c  Restrictions:                 N/A
c
c  Abnormal Return Conditions: N/A
c
c  Location:    /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine locat (button,vx,vy)

c       calls jlocat function

        integer button
        real vx,vy
        integer qdsdev,qpydev,qecho,qlecho
        common /device/ qdsdev,qpydev,qecho,qlecho
        logical sys,rdkey,savkey
        common /sysdbc/ sys
```

```
      common /rkdbc/ rdkey
      common /svkdbc/ savkey
      logical eofkey
      integer keylun,newlun
      common /keylun/ keylun,newlun,eofkey
      character*6 command
      logical timout
      integer*2 time
      common /timout/ timout, time

      if (sys) print*,'locat -- enter'
c     call enall
 100  continue
      if ((rdkey).and..not.eofkey) then
          call kpause (eofkey)
          read (keylun,*,end=192,err=191) command,button,vx,vy
          if (command(1:6).ne.'jlocat') then
              print*,'locat -- incompatible command in ',
     +        'read_keys file  ',command,button,vx,vy
c             *** exit on error
              go to 199
          endif
      else

 125     continue
c
c        polling loop to check for incoming data or clock interrupt
c
         call datpol
c
c        check for keyboard interrupt
c
         call jlocat (qdsdev,qpydev,qlecho,button,vx,vy)
         if (timout) then
            go to 125
         end if
      endif
      go to 199
 191  continue
          print*,'locat -- error on read of save key file',
     +    '  ',keylun,button,vx,vy
          go to 199
 192  continue
          print*,'locat -- premature end of read key file.'
          eofkey = .true.
          go to 100
c         **** go back and get the function interactively on end of file
 199  continue
      if (savkey) then
          write (newlun,*,err=135) '''jlocat''',button,vx,vy
      endif
      go to 140
 135  continue
          print*,'locat -- error on write to save key file',
     +    '  ',newlun,button,vx,vy
 140  continue
```

Jul 20 13:56 1989 carl .f Page 85

```
c       call soverl
        if (sys) print*,'locat -- exit',button,vx,vy

        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    LOCGEO
c
c  Functional Description:       Subroutine to position something in the
c                                display area, convert the point to world
c                                coordinates, and to check that point is in
c                                the display area (only for geography)
c
c  Input Files/Parameters:
c
c      General Gobals
c        qmb          butons       integer    contains mouse button values
c        xllgvp       comgvp       real       minimum window boundary in x
c                                             direction (for display area)
c        xurgvp       comgvp       real       maximum window boundary in x
c                                             direction (for display area)
c        yllgvp       comgvp       real       minimum window boundary in y
c                                             direction (for display area)
c        yurgvp       comgvp       real       maximum window boundary in y
c                                             direction (for display area)
c  Output Files/Parameters:
c
c        button                    integer    value of button pressed
c        worldx                    real       world coordinate value x of
c                                             point picked
c        worldy                    real       world coordinate value y of
c                                             point picked
c        valid                     logical    true if point is in display area
c
c  Subroutines/Functions Called:
c
c        geowin                set the graphics viewport window coordinates
c        gravpt                sets the graphics viewport
c        locat                 returns x,y position in virtual coordinates
c
c  Called By:                   ANNOTA, BOXARE, DISTAN, LLSHOW, OFFST
c
c  Local Variables:
c
c        button                    integer    value of button pressed
c        virtx                     real       x virtual coordinate of
c                                             point picked
c        virty                     real       y virtual coordinate of
c                                             point picked
c        worldx                    real       world coordinate value x of
c                                             point picked
c        worldy                    real       world coordinate value y of
c                                             point picked
c        valid                     logical    true if point is in display area
```

Jul 20 13:56 1989 carh f Page 86

```
c  Restrictions:                  N/A
c
c  Abnormal Return Conditions:  N/A
c
c  Location:      stepc03       /w3/ssb/prototype/arrows/locgeo.f
c
c  Programmer        Date of Last Change       Reason for Change
c     ssb               11/09/83                initial entry
c     ssb                3/06/84                completion
c     bap               11/06/84                Debug to work on Apollo
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine locgeo(button,worldx,worldy,valid)

c     do locate in the display area, convert the point to world coordinates

      common/butons/qfb,qmb
      integer qfb(26),qmb(4)
      common /comgvp/ xllgvp,yllgvp,xurgvp,yurgvp
      real            xllgvp,yllgvp,xurgvp,yurgvp
      real virtx, virty, worldx, worldy, worldz
      integer button
      logical valid
c
c
      valid=.false.
      call locat(button, virtx, virty)
c     ***********************************************************
c     * insure that pick is within the display area world coordinates
c     * and that the 'Pick' button (qmb(1)) was used
c     ***********************************************************'
c
c Temporarily comment out requirement that button be qmb(1) until
c DI3000 is installed.
c
c      if ((virtx.lt.xurgvp).and.(virtx.gt.xllgvp).and.(virty.gt.yllgvp)
c     +.and.(virty.lt.yurgvp).and.(button.eq.qmb(1))) then
      if ((virtx.lt.xurgvp).and.(virtx.gt.xllgvp).and.(virty.gt.yllgvp)
     +.and.(virty.lt.yurgvp)) then
        call jconvw (virtx, virty, worldx, worldy, worldz)
        valid=.true.
      endif
      return
      end


C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    logasc
c
c  Functional Description:
c       convert a logical array to t's and f's in a character string
c
c  Input Files/Parameters:
c
```

Jul 20 13:56 1989 carh .f Page 87

```
c  Output Files/Parameters: N/A
c
c  Subroutines/Functions Called:
c      Note: Subroutines preceded by a "j" are explained in the DI-3000 manual.
c
c  Called By:                    SPARAM
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine logasc (logarr,len,chastr)
c
c      convert a logical array to t's and f's in a character string
c
       logical logarr(*)
       character*(*) chastr
c
       do 110 i=1,len
           if (logarr(i)) then
               chastr(i:i) = 't'
           else
               chastr(i:i) = 'f'
           endif
  110  continue
c
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    logo
c
c  Functional Description:
c       displays logo information when first starting program in graphics ar
c
c  Input Files/Parameters:
c
c  Output Files/Parameters: N/A
c
c  Subroutines/Functions Called:
c      Note: Subroutines preceded by a "j" are explained in the DI-3000 manu
c
c  Called By:                    FMAIN
c
c  Local Variables: N/A
c
c  Restrictions: N/A
```

Jul 20 13:56 1989 carh .f Page 88

```
c
c  Abnormal Return Conditions:  N/A
c
c  Location:       /a21/dave
c
c  Programmer         Date of Last Change       Reason for Change
c  L McCleary          1987                     update     - logo
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine logo

c       displays logo information when first starting program in graphics ar

        common /comgra/xllgra,yllgra,xurgra,yurgra,ibcgra,iocgra
        common /mapdat/ mdraw,ovdraw
        logical mdraw,ovdraw
        common /logseg/ nsglog
        logical sys,plain
        common /sysdbc/ sys
        common /plndbc/ plain
        character*40 versn

        data lenver/40/
        data versn/'      Version 3.1      June, 1989'/
        data icolcm/16/

        call jdvisb (0)
        call gravpt
        call jwindo (xllgra,xurgra,yllgra,yurgra)
        call jropen (nsglog)
        diffx = xurgra - xllgra
        diffy = yurgra - yllgra
        xsize = .06 * diffx
        ysize = .09 * diffy
        call jsize (xsize,ysize)
        call jfont (3)
        call xcolor (icolcm)
        call jjust (2,1)
        rmidx = xllgra + diffx / 2
        posy = yllgra + diffy * .58
        if (sys) print*,'logo -- ',xllgra,
     +  xurgra,yllgra,yurgra,rmidx,posy,diffx,diffy,xsize,ysize
        call jmove (rmidx,posy)
        if (plain) then
            CALL J1STRG('Caricature')
        else
            CALL JHSTRG('Caricature')
        endif
        call jfont (1)
        xsize = .02 * diffx
        ysize = .03 * diffy
        call jsize (xsize,ysize)
        posy = yllgra + diffy * .25
        call jmove (rmidx,posy)
        if (plain) then
```

Jul 20 13:56 1989 carł .f Page 89

```
        CALL J1STRG ('National Security Agency')
        posy = yllgra + diffy * .20
        call jmove (rmidx,posy)
        CALL J1STRG ('Naval Ocean Systems Center')
    else
        CALL JHSTRG ('National Security Agency')
        posy = yllgra + diffy * .20
        call jmove (rmidx,posy)
        CALL JHSTRG ('Naval Ocean Systems Center')
    endif
    posy = yllgra + diffy * .09
    call jmove (rmidx,posy)
    if (plain) then
       call j1strg (versn(1:lenver))
    else
       call jhstrg (versn(1:lenver))
    endif
    call jrclos
    ovdraw = .true.
    call jdvisb (1)
    call jvisbl (nsglog,0)

    return
    end
```

Jul 20 14:11 1989 carn .f Page 1

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   MAJORS
C
C FUNCTIONAL DESCRIPTION:      .
C
C CALLED BY:                   STATEC
C
C PROGRAMMER:                  DATE OF LAST CHANGE     REASON FOR CHANGE
c  S. Lamb               Feb 1988               command fix - majors
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine majors
c
c       this subroutine is the major feature state interpreter (9)
c
        common /states/ nextst
        logical wordis,iseoc
        logical isfeat
        logical sketch,majorf,minorf
        common /statel/ sketch,majorf,minorf
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
c
        initls = nextst
c       do until nextst not = initial state
  100   continue
            call getwrd
            if (wordis('DETAIL')) then
                nextst = 21
            else if (wordis('SCALE')) then
                nextst = 23
            else if (isfeat()) then
                if (majorf) then
                    level = 0
                    nextst = 8
                else
                    level = level - 1
c                   *** could expand on this -- error message ***
                    if (level.lt.0) then
                        level = 0
                        nextst = 1
                    else
                        nextst = 8
                    endif
                endif
            else if (wordis('LEVEL').or.wordis('OF')) then
c * ** *** **** ***** ****** ******* not understood / implem.
                nextst = 15
            else if (iseoc()) then
                if (majorf) then
                    level = 0
```

```
Jul 20 14:11 1989  car.   .f Page 2

                else
                    level = level - 0
c                   *** could expand on this -- error message ***
                    if (level.lt.0) level = 0
                endif
                nextst = 1
            else
                call putwrd
                nextst = 15
            endif
        if (nextst.eq.initls) go to 100
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:  makamp
c
c  Functional Description:
c       this subroutine clears the amplification area
c       and puts it in a retained segment
c
c  Input Files/Parameters:
C       qbox,qbkgrd
C       nsgamp
c
c  Output Files/Parameters:
c
c  Subroutines/Functions Called:
c       Note: Subroutines preceded by a "j" are explained in the DI-3000 manual.
C       AMPVPT
C       CLRVPT
c
c  Called By:                    FMAIN, INIPIC
c
c  Local Variables:             N/A
c
c  Restrictions:                N/A
c
c  Abnormal Return Conditions: N/A
c
c  Location:
c
c  Programmer         Date of Last Change       Reason for Change
C  L. McCleary        Jan 1988               separate amp & sys - makamp
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine makamp
c
c       this subroutine clears the amplification area and puts it in a retained
c
        common /csgamp/ nsgamp
        common/scratr/qbox,qbkgrd
        integer qbox,qbkgrd
```

```
Jul 20 14:11 1989 car:   .f Page 3

c
        call ampvpt
        call clrvpt (nsgamp,qbox,qbkgrd)
        call jvisbl (nsgamp,1)
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:    MAKBOX
c
c  Functional Description:
c  this subroutine clears the construction box area
c  and puts it in a retaind segment
c
c  Input Files/Parameters:
C       qbox,qbkgrd,qmcolr
C       nsgbox,nsgsho,nsgcrm
c
c  Output Files/Parameters:
c
c  Subroutines/Functions Called:
C       BOXVPT
C       CLRBVP
c
c  Called By:                  FMAIN, INIPIC
c
c  Local Variables:            N/A
c
c  Restrictions:               N/A
c
c  Abnormal Return Conditions: N/A
c
c  Location:   /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
        subroutine makbox
c
c       this subroutine clears the construction box area and puts it in a
c       retained segment
c
        common /boxseg/ nsgbox,nsgsho,nsgcrm
        common/scratr/qbox,qbkgrd
        integer     qbox,qbkgrd

c ---- define box window
        common /boxdim/ qbxwmn,qbxwmx,qbywmn,qbywmx
        real            qbxwmn,qbxwmx,qbywmn,qbywmx

c ---- define default window for box area
        qbxwmn = -50.
        qbxwmx = 160.
```

```
Jul 20 14:11 1989  carr   .f Page 4

        qbywmn = -50.
        qbywmx = 160.

c        common/scratr/qbox,qbkgrd,qmcolr
c        integer qbox,qbkgrd,qmcolr
c
c       print*,'makbox -- enter ',nsgbox
        call boxvpt
c        call clrbvp (nsgbox,qbox,qmcolr)
        call clrbvp (nsgbox,qbox,qbkgrd)
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:  MAKCOM
c
c  Functional Description:
c       this subroutine clears the communications area
c       and puts it in a retaind segment
c
c  Input Files/Parameters:
C       qbox,qbkgrd,qmcolr
C       nsgmen,nsggra,nsgsys,nsgmsg,nsgmap,nsgful,nsgkey
c
c  Output Files/Parameters:
c
c  Subroutines/Functions Called:
c       Note: Subroutines preceded by a "j" are explained in the DI-3000 manual.
C       COMVPT
C       CLRVPT
c
c  Called By:                    FMAIN, INIPIC
c
c  Local Variables:             N/A
c
c  Restrictions:                N/A
c
c  Abnormal Return Conditions: N/A
c
c  Location:   /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine makcom
c
c       this subroutine clears the communications area and puts it in
c       a retained segment
c
        common /arsegs/ nsgmen,nsggra,nsgsys,nsgmsg,nsgmap,nsgful
        common/scratr/qbox,qbkgrd
        integer qbox,qbkgrd
c
```

Jul 20 14:11 1989 carr .f Page 5

```
        call comvpt
        call clrvpt (nsgsys,qbox,qbkgrd)
        call jvisbl (nsgsys,1)
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:    MAKFUL
c
c  Functional Description:
c       this subroutine clears the full screen area and
c       puts it in a retained egment
c
c  Input Files/Parameters:
C       qbox,qbkgrd,qmcolr
C       nsgmen,nsggra,nsgsys,nsgmsg,nsgmap,nsgful,nsgkey
C       xaspec,yaspec,xvlow,xvhigh,yvlow,yvhigh
c
c  Output Files/Parameters:
c
c  Subroutines/Functions Called:
c       Note: Subroutines preceded by a "j" are explained in the DI-3000 manual.
C       JVISBL
C       CLRVPT
c
c  Called By:                    FMAIN, INIPIC
c
c  Local Variables:          N/A
c
c  Restrictions:                N/A
c
c  Abnormal Return Conditions: N/A
c
c  Location:   /a21/dave
c
c  Programmer        Date of Last Change       Reason for Change
c  L McCleary        Jan 1988                 sep amp & sys - makful
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine makful
c
c       this subroutine clears the full screen area and puts it in a
c       retained segment
c
        common /aspect/ xaspec,yaspec,xvlow,xvhigh,yvlow,yvhigh
        common /arsegs/ nsgmen,nsggra,nsgsys,nsgmsg,nsgmap,nsgful
        common/scratr/qbox,qbkgrd
        integer qbox,qbkgrd
c
        call jvport (xvlow,xvhigh,yvlow,yvhigh)

        call clrvpt (nsgful,qbox,qbkgrd)
```

Jul 20 14:11 1989 carr .f Page 6

```
c        call jvisbl (nsgful,0)
        call jvisbl (nsgful,1)
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   MAKGRA
c
c  Functional Description:
c       this subroutine clears the graphics area
c       and puts it in a retained segent
c
c  Input Files/Parameters:
C       qbox,qbkgrd,qmcolr
C       nsgmen,nsggra,nsgsys,nsgmsg,nsgmap,nsgful,nsgkey
c
c  Output Files/Parameters:
c
c  Subroutines/Functions Called:
c       Note: Subroutines preceded by a "j" are explained in the DI-3000 manual.
C       GRAVPT
C       CLRVPT
c
c  Called By:                    FMAIN, INIPIC
c
c  Local Variables:            N/A
c
c  Restrictions:                N/A
c
c  Abnormal Return Conditions: N/A
c
c  Location:   /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine makgra
c
c       this subroutine clears the graphics area and puts it in a
c       retained segment
c
        common /arsegs/ nsgmen,nsggra,nsgsys,nsgmsg,nsgmap,nsgful
        common/scratr/qbox,qbkgrd
        integer qbox,qbkgrd
c
        call gravpt
        call clrvpt (nsggra,qbox,qbkgrd)
        call jvisbl (nsggra,1)
c
        return
        end
```

Jul 20 14:11 1989 carr .f Page 7

```
C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    MAKINV
C
C FUNCTIONAL DESCRIPTION:       .
C
C CALLED BY:                    TIMCHK
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine makinv(fadndx)
c
c     this subroutine invisibles the track
c     indicated by fadndx
c
      integer*4 fadndx
      integer*4 segnum
      integer*4 aray(19)

      integer tkoset
      common /tkoset/ tkoset
      integer trkndx(1000)
      common /trkndx/ trkndx

      segnum = trkndx(fadndx) + tkoset
c
c***  check to see if this plot has been suppressed
c***  if not, then make it invisible
c
      call jisgmt(segnum,aray)
      if (aray(1) .eq. 1) then
          call jvisbl(segnum,0)
      endif

      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   MAKKEY
c
c  Functional Description:
c       this subroutine clears the key area and
c       puts it in a retained segment
c
c  Input Files/Parameters:
C       qbox,qbkgrd,qmcolr
C       nsgmen,nsggra,nsgsys,nsgmsg,nsgmap,nsgful,nsgkey
c
c  Output Files/Parameters:
c
c  Subroutines/Functions Called:
c       Note: Subroutines preceded by a "j" are explained in the DI-3000 manual.
C       KEYVPT
C       CLRVPT
```

Jul 20 14:11 1989 car ·.f Page 8

```
c
c  Called By:                      FMAIN, INIPIC
c
c  Local Variables:                        N/A
c
c  Restrictions:                  N/A
c
c  Abnormal Return Conditions: N/A
c
c  Location:   /a21/dave
c
c  Programmer          Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine makkey
c
c      this subroutine clears the key area and puts it in a retaind segment
c
       common /nsgkey/ nsgkey,nsgktx
       common/scratr/qbox,qbkgrd
       integer qbox,qbkgrd
c
       call keyvpt
       call clrvpt (nsgkey,qbox,qbkgrd)
       call jvisbl (nsgkey,1)
c
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:    MAKMEN
c
c  Functional Description:
c       this subroutine clears the menu area and
c       puts it in a retained segment
c
c  Input Files/Parameters:
C       qbox,qbkgrd,qmcolr
C       nsgmen,nsggra,nsgsys,nsgmsg,nsgmap,nsgful,nsgkey
c
c  Output Files/Parameters:
c
c  Subroutines/Functions Called:
c       Note: Subroutines preceded by a "j" are explained in the DI-3000 manual.
C       MENVPT
C       CLRVPT
c
c  Called By:                      FMAIN, INIPIC
c
c  Local Variables:      N/A
c
c  Restrictions:                  N/A
c
c  Abnormal Return Conditions: N/A
```

```
Jul 20 14:11 1989  carr  .f Page 9

c
c  Location:   /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine makmen
c
c      this subroutine clears the menu area and puts it in a retained segment
c
       common /arsegs/ nsgmen,nsggra,nsgsys,nsgmsg,nsgmap,nsgful
       common/scratr/qbox,qbkgrd
       integer qbox,qbkgrd
c
       call menvpt
       call clrvpt (nsgmen,qbox,qbkgrd)
       call jvisbl (nsgmen,1)
c
       return
       end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   MAKSHO
c
c  Functional Description:
c       this subroutine clears the short menu area and
c       puts it in a retained segment
c
c  Input Files/Parameters:
C       nsgbox,nsgsho,nsgcrm
C       qbox,qbkgrd,qmcolr
c
c  Output Files/Parameters:
c
c  Subroutines/Functions Called:
C       CLRVPT
C       SHOVPT
c
c  Called By:                    FMAIN, INIPIC
c
c  Local Variables:        N/A
c
c  Restrictions:                N/A
c
c  Abnormal Return Conditions: N/A
c
c  Location:   /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine maksho
c
```

Jul 20 14:11 1989 carr .f Page 10

```
c       this subroutine clears the short menu area and puts it in a
c       retained segment
c
        common /boxseg/ nsgbox,nsgsho,nsgcrm
        common/scratr/qbox,qbkgrd
        integer qbox,qbkgrd
c
        call shovpt
        call clrvpt (nsgsho,qbox,qbkgrd)
c
        return
        end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     MAPOVR
C
C FUNCTIONAL DESCRIPTION:        .
C
C CALLED BY:                     DRAWIT, FMAIN, RECDIS, OVRCON
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine mapovr

c       this subroutine overlays text data on the map

        common /aspect/ xaspec,yaspec,xvlow,xvhigh,yvlow,yvhigh
        common /comgra/ xllgra,yllgra,xurgra,yurgra,ibcgra,iocgra
        logical overly,sclflg,f3,clsflg,f5,f6,incrdf,f8,
     +      tablet,ff(7)
        common /overly/ overly,sclflg,f3,clsflg,f5,f6,incrdf,f8,
     +      tablet,ff
        common /comscr/ xllscr,yllscr,xurscr,yurscr
        common /mapdat/ mdraw,ovdraw
        logical mdraw,ovdraw
        common /ctext/ igrtxt,isytxt,iantxt
        common /classi/ classi
        common /lencla/ lencla
        character*50 classi
        integer unidtb(16)
        character*15 comnam(10),crynam(10)
        common /dbover/ comnam,crynam,unidtb,numcom,numcry
        common /envirn/ comsat,hf,los,ll,unkn
        logical comsat,hf,los,ll,unkn
        integer sclseg,clsseg
        common /lnseg/ sclseg,clsseg
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        character*32 scabuf
        character *10 str,text
```

Jul 20 14:11 1989 car .f Page 11

```
      data scabuf/'       N Miles at center        '/
      data text/'          '/,str/'          '/
      data xarrow,yarrow/1.5,.2/

      ovdraw = .true.
      call jvport (xvlow,xvhigh,yvlow,yvhigh)
      call jwindo (xllscr,xurscr,yllscr,yurscr)
      if (sclflg) then
          if(clsseg.ne.0) call jpurge(sclseg)
          call getseg(sclseg)
          call jropen(sclseg)
          call jsize (1.,1.)
          call xcolor (igrtxt)
          ixr=xrnm
          if(ixr.gt.100000) ixr=99999
          write(scabuf(1:6),10100) ixr
10100     format(i6)
c          if (itproj.eq.6.or.itproj.eq.7) then
c              scabuf(8:14) = 'Minutes'
c          else
              scabuf(8:14) = 'N Miles'
c          endif
c          if (itproj.eq.5) then
c              call jjust(1,1)
c              call jmove (xllgra,yllgra+1.)
c              scabuf(16:24) = 'altitude '
c          else
              call jmove (xllgra,yllgra+1.)
              call jdraw (xllgra+(xurgra-xllgra)/2.,yllgra+1.)
              call jrdraw (-xarrow,yarrow)
              call jrmove (0.,-2.*yarrow)
              call jrdraw (xarrow,yarrow)
              call jmove (xllgra,yllgra+1.)
              call jrdraw (xarrow,yarrow)
              call jrmove (0,-2.*yarrow)
              call jrdraw (-xarrow,yarrow)
              call jjust(2,1)
              xx = xllgra+(xurgra-xllgra)/4.
              call jmove (xx,yllgra+2.)
              scabuf(16:24) = 'at center'
c          endif
          call mytext (24,scabuf)
          call jrclos
      endif
c      if (clsflg) then
c          if(clsseg .ne. 0) call jpurge(clsseg)
c          call getseg(clsseg)
c          call jropen(clsseg)
c          call jsize (1.,1.)
c          call xcolor (igrtxt)
c          call jjust(3,1)
c          call jmove (xurgra-1.,yllgra+1.)
c          call mytext (lencla,classi)
c          call jrclos
c      endif
```

Jul 20 14:11 1989 can .f Page 12

```
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    MAPPER
C
C FUNCTIONAL DESCRIPTION:       .
C
C CALLED BY:                  ` DRAWF, DRAWIT, FMAIN, RECDIS
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE MAPPER (drawon)

C       THIS SUBROUTINE CALLS THE DMAPII SUBROUTINE

        INTEGER SEGNO,FIRSEG
        COMMON /SEGNO/ SEGNO,FIRSEG

        INTEGER QLEVL(16)
        COMMON /LEVLS/ QLEVL

        logical metafl,map
        common /mapdbc/ map
        common /metdbc/ metafl

        logical drawon

        LOGICAL QMAPUP
        COMMON /MAPUP/ QMAPUP
        COMMON /PROJT/ IGNOMN,IORTEQ,IORTPO,IORTHO,IPERSP
        COMMON /PROJT2/ IEQREC,IMERCA,ILAMCN
        COMMON /PIE/ PIE,TPIE,PIO2,PIO4

        LOGICAL QLTON(16),QDOTEM
        INTEGER QPGRID(4),QTYPTB(16)
        INTEGER QLEVEL,QITPRO,QIRES,QLUNDA,QLUNIN,QLUNLI
        COMMON /MAP/ QXRNM,QXC,QYC,QLEVEL,QCLAT,QCLON,QXRAD,QYRAD,
     +      QITPRO,
     +      QIRES,QTYPTB,QLUNDA,QLUNIN,QLUNLI,QLTON,QPGRID,QDOTEM,
     +      QORHAL

        common/oneflg/oneflg
        logical oneflg
        dimension ltypov(16)
        logical ltonov(16),rankt(26,16)
        common /maptoo/ ltypov,ltonov,rankt
        logical bitmod
        common /bitmod/ bitmod
c
c
c-----------------------------------------------------------------------|--+
c Itproj:  1  2  3  4  5  6  7  8  9 10 11 12 13 14 15 16 17 18 19 20 21  |
```

Jul 20 14:11 1989 carı .f Page 13

```
c-----------------------------------------------------------------------+
c        g  o  o  o  p  e  m  l  a  a  a  k  m  o  p  p  u  s  s        |
c        n  r  r  r  e  q  e  a  l  z  z  a  i  b  o  o  t  i  t        |
c        o  e  p  t  r  r  r  m  b  e  e  v  l  l  s  l  m  n  e        |
c        m  q  o  h  s  e  c  c  r  a  d  r  l  m  t  y  z  u  r        |
c-----------------------------------------------------------------------+
      goto(1,03,01,01,01,02,02,02,02,01,01,01,02,03,01,01,02,02,01
     +    )qitpro
c
c       Case #1  Poles are ok for map center.
 1         if (abs(qclat).gt.pio2)  qclat = sign(pio2,qclat)
           go to 900
c
c       Case #2  Some projections must be nudged slightly off poles.
 2         hilat = pio2-(.01745329/2.)
           if (abs(qclat).gt.hilat)  qclat = sign(hilat,qclat)
           go to 900
c
c       Case #3  Others need respectably safe distance.
 3         hilat = pio2-.01745329
           if (abs(qclat).gt.hilat)  qclat = sign(hilat,qclat)
           go to 900
c
c       End Cases
 900    continue

        CALL INITIA (QXC,QYC,QCLAT,QCLON,QXRAD,QYRAD,QITPRO,QIRES,
     +  QXRNM,QORHAL)

c       screen width in amp area                        - mapper
        CALL SCRDIA
        CALL GRAVPT
        CALL GEOWIN
        CALL JWCLIP (.TRUE.)

        if (drawon) then
c           Enable all planes for display of map data
            call enall

            if (metafl) call gmopen ('metafile',8,ierror)
            if (bitmod) then
                call jopen
            else
                IF (map) print*,'opening',firseg
                CALL JROPEN(FIRSEG)
            endif

            CALL DMAPII(QXRNM,QXC,QYC,QLEVL,QCLAT,QCLON,QXRAD,QYRAD,
     +      QITPRO,
     +      QIRES,QTYPTB,QLUNDA,QLUNIN,QLUNLI,QLTON,QPGRID,QDOTEM,
     +      QORHAL,ltypov,ltonov,rankt)
c
            if (bitmod) then
                call jclose
            else
                CALL JRCLOS
```

```
            endif
            if (metafl) call gmclos
c
c           Display map parameters.
            call scrdia
c
        endif

c       Set to overlay planes to protect map from here on
c       but only if not drawing to one plane

        if (.not.(oneflg)) call soverl

c       draw all overlay features

        call doverl (ltypov,ltonov)
        CALL FLUSHB

        IF (map) PRINT*,'MAP CALL IS COMPLETE'

        RETURN
        END

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  menupr
c
c  Functional Description:
c       this subroutine puts a standard prompt for menu selection
c
c  Input Files/Parameters:
c
c  Output Files/Parameters: N/A
c
c  Subroutines/Functions Called:
c
c  Called By:                  DETCON, MMCON,  NOTAVA, PROCON, RESCON
C                              RSLCON, SUBCHK, TRKCON, FTRCON
C                              GEOCON, OVRCON
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine menupr
c
c       this subroutine puts a standard prompt for menu selection
c
```

Jul 20 14:11 1989 carr .f Page 15

```
c
c       call system (17,'Select menu item.')
        call mesg(1)
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:      MENVPT
c
c  Functional Description:
c       this subroutines sets the menu area viewport
c
c  Input Files/Parameters:
C       xllmvp,yllmvp,xurmvp,yurmvp
c
c  Output Files/Parameters:
c
c  Subroutines/Functions Called:
c       Note: Subroutines preceded by a "j" are explained in the DI-3000 manual.
c
c  Called By:                   CLRMEN, MAKMEN, RECDIS, SAVDIS, CLASS
c
c  Local Variables:     N/A
c
c  Restrictions:                N/A
c
c  Abnormal Return Conditions: N/A
c
c  Location:   /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
        subroutine menvpt
c
c       this subroutines sets the menu area viewport
c
        common /cqmmvp/ xllmvp,yllmvp,xurmvp,yurmvp
c
        call jvport (xllmvp,xurmvp,yllmvp,yurmvp)
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:      MENWIN
c
c  Functional Description:
c       this subroutines sets the menu area window
c
c  Input Files/Parameters:
C       xllmen
```

Jul 20 14:11 1989 carr .f Page 16

```
c       yllmen
c       xurmen
c       yurmen
c       ibcmen
c       iocmen
c       incmen
c
c  Output Files/Parameters:
c
c  Subroutines/Functions Called:
c       Note: Subroutines preceded by a "j" are explained in the DI-3000 manual.
c
c  Called By:                     CLRMEN, KEYS, RECDIS, SAVDIS, CLASS
c
c  Local Variables:    N/A
c
c  Restrictions:                 N/A
c
c  Abnormal Return Conditions: N/A
c
c  Location:   /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine menwin
c
c       this subroutines sets the menu area window
c
        common /commen/xllmen,yllmen,xurmen,yurmen,ibcmen,iocmen,incmen
c
        call jwindo (xllmen,xurmen,yllmen,yurmen)
c
        return
        end


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     mesg
c
c  Functional Description:        Subroutine to display a message in the
c                                  communications area
c
c  Input Files/Parameters:
c      General Gobals
c        qdsdev        device       integer   DI-3000 variable
c        qpydev        device       integer   DI-3000 variable
c        qecho         device       integer   DI-3000 variable
c        qxllcv        comcvp       integer   lower left x value of the
c                                              communications viewport
c        qyllcv        comcvp       integer   lower left y value of the
c                                              communications viewport
c        qxurcv        comcvp       integer   upper right x value of the
c                                              communications viewport
c        qyurcv        comcvp       integer   upper right y value of the
```

Jul 20 14:11 1989 carn .f Page 17

```
c                                                     communications viewport
c       qcxmin        comwdo        real      minimum x boundary for the
c                                               communications window
c       qcxmax        comdow        real      maximum x boundary for the
c                                               communications window
c       qcymin        comdow        real      minimum y boundary for the
c                                               communications window
c       qcymax        comdow        real      maximum y boundary for the
c                                               communications window
c
c  Output Files/Parameters:      N/A
c
c  Subroutines/Functions Called:
c       Note: Subroutines preceded by a "j" are explained in the DI-3000 manual.
c       clrbox                    clears the construction box area
c
c  Called By:  46 Routines
c
c  Local Variables:
c      msgno                   integer   number of message to be displayed
c                                         true if valid file name
c      msg                     character 80 by 5 character array to hold
c                                         message
c      lines                   integer   number of lines of message to be
c                                          displayed
c      length                  integer   actual length of input recieved
c
c  Restrictions: If communications area is only 6 lines high, then the
c   message to out putted must be one line less than 6, (5).  The com-
c   munications area is thought to have 80 character lines, therefore,
c   each line of an output message can be no longer than 80 characters.
c
c  Abnormal Return Conditions:  N/A
c
c  Location:    /a21/dave
c
c  Programmer         Date of Last Change        Reason for Change
c     bam              October 27, 1983
c  L McCleary          Jan 1988                 sep amp & sys - mesg
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine mesg(msgno)
c
c       put a message into the communications area
c
        logical mesgon(1299)
        logical sys
c        logical batch
        common /sysdbc/ sys
        common /msgold/ msgold,msgonm
        common /msgoff/ msgoff
        common /qprint/ qprint
        common /mesgon/ mesgon
        logical qprint
        data mesgon/1299*.false./
```

Jul 20 14:11 1989 carr .f Page 18

```
      data msgold/-1/,msgonm/-1/,maxmsg/1299/
c
c     If repeated input from the keyboard is needed without
c     changing the message, include the msgold common area in
c     your program and set it's value to 0 before calling mesg
c
      if (sys) print*,'mesg -- enter ',msgno,msgold
      if (msgno.ne.msgold .and. .not. qprint) then
c          if (batch) call clrcom
          if ((msgno .gt. 0) .and. (msgno .le. maxmsg)) then
              if (msgonm .gt. 0) then
                  call jvisbl(msgonm + msgoff,0)
              else if (msgonm .eq. 0) then
c                 msgonm 0 has been reserved for temporary messages used
c                 by dmapii and sysmsg, these are purged when replaced
                  call jpurge (msgoff)
              endif
              if (.not.mesgon(msgno)) then
                  call crmesg(msgno)
                  mesgon(msgno) = .true.
              else
                  call jvisbl(msgno + msgoff, 1)
              endif
              msgold = msgno
              msgonm = msgno
          else
              print*,'mesg -- message number ',msgno,' outside ',
     +            'range of message numbers (',maxmsg,')'
          endif
      endif
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      MESGJF
C
C FUNCTIONAL DESCRIPTION:         .
C
C CALLED BY:        .
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine mesgjf(msgno,il,iseg)

C  SUBROUTINE TO PLACE A MESSAGE IN THE COMMUNICATIONS AREA UNDER A
C  CURRENTLY DISPLAYED MESSAGE WITHOUT PURGING THE CURRENT MESSAGE IN
C  THE COMMUNICATIONS AREA.  THE MESSAGE IS DISPLAYED ON LINE
C  IL.  THE NEW MESSAGE IS PLACED IN A RETAINED SEGMENT AND THE
C  RETAINED SEGMENT NUMBER IS PASSED BACK TO THE CALLING ROUTINE,
C  (USUALLY PRMGJF)  WHERE THE SEGMENT CAN BE PURGED AFTER INPUT
C  IS RECIEVED.
```

```
        integer il
        character*50 menpth
        common /menpth/ menpth
        common /lenmen/ lenmen
        common/comwdo/qcxmn,qcymn,qcxmx,qcymx
        real qcxmn,qcymn,qcxmx,qcymx
C        common /arsegs/ nsgmen,nsggra,nsgsys,nsgmsg,nsgmap,nsgful
        character cchar
C        common /msgold/ msgold
c
        character *80 msg
        integer msgno,lenmsg
        character*80 filenm
        character*30 fname
        character*26  flettr
        data fname/'file'/,lname/4/
        data flettr /'abcdefghijklmnopqrstuvwxyz'/
        data icolcm/16/


            filenm = ' '

            call jwindo(qcxmn,qcxmx,qcymn,qcymx)
            CALL COMVPT
            CALL GETSEG(iseg)
            call jropen (iseg)
            call xsize (1.,1.)
            call xcolor (icolcm)
c
            ifl = 19
            indlet = msgno / 50 + 1
            if (indlet.lt.1) indlet = 1
            if (indlet.gt.26) indlet = 26
            filenm = menpth(1:lenmen) // fname(1:lname) //
     +      flettr(indlet:indlet) // '.msg'
            lennam = lenmen + lname + 5
            call openit(filenm,lennam,ifl,0,ierror)
            if (ierror.ne.0) go to 181
c           Loop though message file looking for message
  100       continue
                read (ifl,1100,end=183,err=182) cchar,msg
 1100           format (a1,a80)
c               print*,'line read - cchar: ',cchar,msg
c               *** skip comment lines
                if (cchar.eq.'C'.or.cchar.eq.'c') go to 100
                if (cchar.eq.'M'.or.cchar.eq.'m') then
                    read (msg,1150,end=183,err=182) msgnum
 1150               format (i5)
                    if (msgnum.eq.msgno) then
                        i=il-1
c                       loop until no more data lines (blank first char)
  120                   continue
                            read (ifl,1100,end=183,err=182) cchar,msg
c                           *** skip comment lines
                            if (cchar.eq.'C'.or.cchar.eq.'c')
     +                      go to 120
```

Jul 20 14:11 1989 carr .f Page 20

```
                              if (cchar.eq.'m'.or.cchar.eq.'M') go to 130
                              call length (msg,80,lenmsg)
                              i = i + 1
                              if (lenmsg.gt.0) then
                                  call jmove(qcxmn + 1,(qcymx - i - .3))
                                  call j1strg (msg(1:lenmsg))
                              endif
                          go to 120
  130                     continue
c                         position after last line for prompt subroutine
                          call echps(qcxmn+1,(qcymx - i - 1 - .3))
c                         exit after message found
                          go to 180
                      endif
                  endif
              go to 100
  180         continue
              go to 190
  181         continue
                  print*,'open error on message file ',msgno,ierror
                  go to 190
  182         continue
                  print*,'read error on message file ',msgno
                  go to 190
  183         continue
                  print*,'end of file - message not found :',msgno
  190         continue
              call jrclos
              call closit (ifl)
c
          return
          end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    messag
c
c  Functional Description:
c       calculate
c
c  Input Files/Parameters:
c
c  Output Files/Parameters: N/A
c
c  Subroutines/Functions Called:
c
c  Called By: llshow
c
c  Local Variables: N/A
c
c  Restrictions: N/A
c
c  Abnormal Return Conditions:  N/A
c
c  Location:
c
```

```
Jul 20 14:11 1989  carr   .f Page 21

c  Programmer      Date of Last Change     Reason for Change
C  L. McCleary     Jan 1988             separate amp & sys - messag
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        SUBROUTINE MESSAG(DIAM,LEN,LINE)

C  SUBROUTINE TO PLACE A CHARACTER STRING IN THE MESSAGE
C  AREA FOLLOWED WITH A MESSAGE TO PRESS ANY KEY TO CONTINUE.
C  THE MESSAGE AREA IS CLEARED BEFORE THE MESSAGE IS PLACED
C  IN THE COMMUNICATIONS AREA. NSGMSG IS USED AS THE RETAINED
C  SEGMENT NUMBER.

        CHARACTER*80 DIAM
        INTEGER LEN,LINE

        COMMON /MSGOLD/ MSGOLD,MSGONM

c         ICOLCM = 16
c         LOFF = LINE + .3
c         call clrcom
c         call CLRMSG
c         MSGONM = 0
         call drwamp(diam,1)

c         MSGOLD = 0

        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C* UNIT NAME:                       mhand
C*
C* FUNCTIONAL DESCRIPTION:
C*
C*   This subroutine drives the menu interface of the A21PROTOTYPE.
C*
C* INPUT FILES/PARAMETERS:
C*
C*     Global Variables
C*       qcancl          logical; cancel flag
C*       qcrmnu          integer; contains the current menu number
C*       qext2m          logical; exit to main menu flag
C*       qexitg          logical; flag to exit graphics system
C*       qnextm          integer; number of next menu to be displayed
C*       qretrn          logical; return to previous menu flag
C*       qstmnu          logical; flag to put current menu on the stack
C*
C* OUTPUT FILES/PARAMETERS:
C*
C*       values in global variables described above
C*
C* RESTRICTIONS:
C*
C*       not restricted
```

```
C*
C* SUBROUTINES CALLED:
C*
C*      popst           subroutine; simulates popping an item off a
C*                                  stack
C*      pushst          subroutine; simulates pushing an item on a
C*                                  stack
C*      setvar  block data routine; initializes control variables to
C*                                  point to the main menu
C*      store           subroutine; handles permanent stores
C*      subcal          subroutine; calls menu drawing routine and
C*                                  appropriate menu controller
C*
C* CALLED BY:                   FMAIN
C*
C* LOCAL VARIABLES:
C*
C*      no local variables
C*
C* ABNORMAL RETURN CONDITIONS:
C*
C*      no abnormal return conditions
C*
C* LOCATION:
C*
C*      /u2/vcn/a21proto/mhand
C*
C* PROGRAMMER:              DATE OF LAST CHANGE     REASON FOR CHANGE
C*
C*  VCNewton                  15 August 1983          initial entry
C*
C-*-*-*-*-*-*-*-*-*-*-*-*-*-*-*-*-*-*-*-*-*-*-*-*-*-*-*-*-*-*-*-*-*-*-*|*-*-*-*-

      Subroutine MHAND

C     This subroutine drives the menu interface of the A21PROTOTYPE.

C         (**Declare common blocks and common block variables**)
          Integer qcrmnu,qnextm
          Logical qcancl,qexitg,qext2m,qretrn,qstmnu
          Common /b1/ qcancl,qext2m,qretrn,qstmnu,qnextm
          Common /b5/ qexitg
          Common /b6/ qcrmnu
          logical stackd
          stackd = .false.
          call setvar
C         (**Loop:                          **)
C         (**Do-until exit graphics is chosen**)
   10     Continue
C            (**Execute menu process**)
             menun = qnextm
             Call SUBCAL (menun,ierror)
             if (ierror.ne.0) then
                qnextm = qcrmnu
                qstmnu = .false.
                if (stackd) call popst
```

Jul 20 14:11 1989 carr .f Page 23

```
                  stackd = .false.
                  print*,'mhand -- unable to interpret menu',menun,ierror
               else
C                 (**Fall through loop if exit graphics is chosen**)
                  If (.not.(qexitg)) then
                     stackd = .false.
C                    (**Check for exit to main menu or cancel**)
                     if ((qext2m) .or. (qcancl)) then
                        if (.not.qcancl) then
                           Call STORE
                        endif
C                       (**Re-init control variables to point to the**)
C                       (**main menu                                 **)
                        Call SETVAR
C                       (**Initialize menu controller variables**)
                        Call reinip
C                    (**Check for return to previous menu**)
                     elseIf (qretrn) then
                        Call POPST
                        qretrn=.false.
C                       (**Reset qstmnu flag in case it was set when**)
C                       (**return was executed                      **)
                        qstmnu=.false.
C                       (**Perform store if multiple returns were made**)
C                       (**to return to the main menu                 **)
                        If (qnextm .eq. 1) then
C                          (**Before a store is made a check should be done**)
C                          (**to see if a picture exists                   **)
                           Call Store
C                          (**Initialize menu controller variables**)
                           Call reinip
                        Endif
C                    (**Check for placing a menu on the stack**)
                     Elseif (qstmnu) then
                        Call PUSHST
                        qstmnu=.false.
                        stackd = .true.
                     Endif
C                    (**Set the current menu number to the number     **)
C                    (**corresponding to the next menu to be displayed**)
c                    qcrmnu=qnextm
                  Endif
               endif
               If (qnextm .eq. 1) then
C                 (**Store the index**)
                  Call strind
               Endif
C              (**Remain in loop if exit graphics is not chosen**)
               If (.not.(qexitg)) goto 10
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     MINORS
C
C FUNCTIONAL DESCRIPTION:
```

```
C
C CALLED BY:                    STATEC
C
C PROGRAMMER:                   DATE OF LAST CHANGE     REASON FOR CHANGE
c  S. Lamb               Feb 1988                 command fix - minors
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine minors
c
c       this subroutine is the minor feature state interpreter (10)
c
        common /states/ nextst
        logical wordis,iseoc
        logical isfeat
        logical sketch,majorf,minorf
        common /statel/ sketch,majorf,minorf
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
c
        initls = nextst
c       do until nextst not = initial state
  100   continue
            call getwrd
            if (wordis('DETAIL')) then
                nextst = 22
            else if (wordis('SCALE')) then
                nextst = 24
            else if (isfeat()) then
                if (minorf) then
                    level = 15
                    nextst = 8
                else
                    level = level + 1
c                   *** could expand on this -- error message ***
                    if (level.gt.15) then
                        level = 15
                        nextst = 1
                    else
                        nextst = 8
                    endif
                endif
                nextst = 8
            else if (wordis('LEVEL').or.wordis('OF')) then
c * ** *** **** ***** ****** ******* not understood / implem.
                nextst = 15
            else if (iseoc()) then
                if (minorf) then
                    level = 15
                else
                    level = level + 1
c                   *** could expand on this -- error message ***
```

```
                  if (level.gt.15) level = 15
              endif
              nextst = 1
          else
              call putwrd
              nextst = 15
          endif
      if (nextst.eq.initls) go to 100
c
      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    MIRRIT
C
C FUNCTIONAL DESCRIPTION:       .
C
C CALLED BY:                    CHGPTS
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

       subroutine mirrit(array,npts,scale)

c     This routine mirrors an array of points around the
c         0-point  by calculating the distance the point is
c         from 0 and subtracting two times that distance from
c         the point.
c    VARIABLES:
c        array- the points to be changed
c        npts- number of points in the array

      real array(*),scale
      integer npts
      real xv(4),yv(4),zv(4)

      call jiwind (xv,yv,zv)
      do 10 i=1,npts
         array(i) = -(array(i)) + (190./(2.6/scale))
10    continue
      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   mpick
c
c  Functional Description:
c       this subroutine gets a selection from the menu
c
c  Input Files/Parameters:
c
c  Output Files/Parameters: N/A
c
```

Jul 20 14:11 1989 carr .f Page 26

```
c  Subroutines/Functions Called:
c      Note: Subroutines preceded by a "j" are explained in the DI-3000 manual.
c
c  Called By:                    COLBAK, DETCON, HELP, MMCON,  PROCON,
C                                PRTMEN, RESCON, RSLCON, TRKCON
C                                TXWRIT, CLASS,  FTRCON, GEOCON, OVRCON
c
c  Local Variables: N/A
c
c  Restrictions: N/A
c
c  Abnormal Return Conditions:  N/A
c
c  Location:      /a21/dave
c
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine mpick (ichoic,mysegn,ibuttn)
c
c       this subroutine gets a selection from the menu
c
c       *** this is a machine dependent subroutine and should be changed
c           if necessary when a new device driver is used that returns
c           different values for buttons ****
c           currently the value for the '0' key is 48
c
        logical sys,aed,vax
        common /sysdbc/ sys
        common /aeddbc/ aed
        common /vaxdbc/ vax
        integer segnam,pickid
        integer qfb(26),qmb(4)
        common /butons/ qfb,qmb
        character ch1
        equivalence (ch1(1:1),ikey)
c       on screen standard function key common
        common /nsgkey/ nsgkey,nsgktx

c
        if (sys) print*,'mpick -- enter  ',mysegn
        call pick (ibuttn,segnam,pickid)
        if (sys) print*,'mpick --  ',ibuttn,segnam,pickid,qmb(1)
        ichoic = 0
clj ------ The following 3 lines were changed so that a
clj ------ pick can only be triggered with function
clj ------ button 1.   (June 3,1985)
clj        if (mysegn.eq.segnam) then
clj            ichoic = pickid
clj            ibuttn = qmb(1)
        if (mysegn.eq.segnam.and.ibuttn.eq.qmb(1)) then
            ichoic = pickid
        else if (ibuttn .ne. qmb(3) .and. ibuttn .ne. qfb(26) .and.
     +          ibuttn .ne. qfb(15) .and. ibuttn .ne. qfb(16)) then
            if (segnam.eq.nsgktx) then
                ibuttn = pickid
```

Jul 20 14:11 1989 carr .f Page 27

```
            else if (aed) then
                ichoic = ibuttn - 48
            else
c
c***            otherwise, set ibuttn to the segment number,
c***            this will trigger the call to check to look for a
c***            segment associated with a tracking plot on the screen
c
                ibuttn = segnam
            endif
        endif

c       The following logic is for button menu input
c
c       if (vax) then
c        if(ibuttn.le.9)then
c                ichoic=ibuttn
c        elseif (ibuttn.eq.ichar('A'))then
c                ichoic=10
c        elseif (ibuttn.eq.ichar('B'))then
c                ichoic=11
c        elseif (ibuttn.eq.ichar('C'))then
c                ichoic=12
c        elseif (ibuttn.eq.ichar('D'))then
c                ichoic=13
c        endif
c       endif

        if (sys)
     +  print*,'mpick -- exit  ichoic = ',ichoic,mysegn,ibuttn
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   MRCNTR
C
C FUNCTIONAL DESCRIPTION:
c -   Description: This routine mirrors an array of points around the
c                  50, 59 point.
c    VARIABLES:
c        array- the points to be changed
c        npts- number of points in the array
C
C CALLED BY:
C
C PROGRAMMER:                  DATE OF LAST CHANGE    REASON FOR CHANGE
c    MODIFIED BY M. Bloom, T333 June 1987 to allow icons to be
c      positioned by center point rather than lower left
c      corner
C
C-*-*-*-*-*-*-*-*-*-*-*-*-*-*-*-*-*-*-*-*-*-*-*-*-*-*-*-*-*-*-*-*-*-*-*-*-*|*-*-*-*-

       subroutine mrcntr(array,npts,scale)
```

Jul 20 14:11 1989 carr .f Page 28

```
      real array(*),scale
      integer npts

      real xv(4),yv(4),zv(4)
      call jiwind (xv,yv,zv)
      do 100 i=1,npts

c   Since the center of the construction box is 50,50 add 100
c   to the inverse of the point.  This mirrors the icon around
c   the center.

           array(i) = -(array(i)) + 100.
c          array(i) = -(array(i)) + (190./(2.6/scale))

100   continue
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   MVPDDG
C
C FUNCTIONAL DESCRIPTION:       .
C
C CALLED BY:                   MVTEXT
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine mvpddg(line1,line2)
c
c
c  this subroutine moves a pddg name from line1 into line2
c
      character * 120 line1
      character * 120 line2
      character*4 text

c     print*,'mvpddg -- enter'
      if(line1(37:38) .ne. '  ') then
           text(1:2) = line1(37:38)
           line1(37:38) = '  '
           line2(39:41) = '/' // text(1:2)
      endif
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   MVTEXT
C
C FUNCTIONAL DESCRIPTION:       .
C
C CALLED BY:                   READML, PROCDF
C
```

```
Jul 20 14:11 1989  carm  .f Page 29

C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine mvtext(fname,len)
c
c   this subroutine checks for co-located pddg names in an overlay file
c
c
      character*80 fname
      character*120 line(70)
      integer*2 lincnt
      character*15 latlo1
      character*15 latlo2
      data lunnam/19/

c      print*,'movtxt -- enter'
      open(unit=lunnam,file=fname(1:len),
     +     err = 200,status = 'old')
      i = 1
 100  continue
          read(lunnam,120,end=150) line(i)
 120      format(a120)
          i = i + 1
          goto 100
 150  continue
      lincnt = i-1
      do 170 j= 1,lincnt-1
c          print*,'line: ',line(j)
          if(line(j)(1:1) .ne. 'c') then
              latlo1 = line(j)(3:17)
              do 160 i=j+1,lincnt
                    latlo2 = line(i)(3:17)
                    if(latlo1 .eq. latlo2) then
                          call mvpddg(line(i),line(j))
                    endif
 160          continue
          endif
 170  continue
      REWIND lunnam
      do 180 j=1, lincnt
           write(lunnam,120) line(j)
 180  continue
      close(unit=lunnam)
      goto 300
 200  print*,'error in movtxt'
 300  continue
c      print*,'movtxt -- exit'
      return
      end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    mytext
c
c  Functional Description:
```

Jul 20 14:11 1989 carm .f Page 30

```
c       this subroutine formats a text string for graphics output
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                    CREATM, MAPOVR, PLOTIT
c
c  Local Variables: N/A
c
c  Restrictions: N/A
c
c  Abnormal Return Conditions:  N/A
c
c  Location:      /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine mytext (nbytes,textst)
c
c       this subroutine formats a text string for graphics output
c
        character*(*) textst
c
        call jlstrg(textst(1:nbytes))
c
        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: NAMLIM
C
C FUNCTIONAL DESCRIPTION:  NAMLIM OPENS NAME LIMITS FILE AND CALLS PLTNAM.
C
C INPUT FILES/PARAMETERS:
C
C       NAMFIL                  CHAR*80      NAME OF NAME LIMITS FILE.
C       LENNMF                  INTEGER      LENGTH OF NAMFIL.
C       LTON                    LOGICAL(16)  INDICATES WHICH FEATURES ARETURNED ON.
C       XRNM                    REAL         NAUTICAL MILE RADIUS OF MAP.
C
C GLOBAL VARIABLES :
C
C       LENMAP                  INTEGER      LENGTH OF MAP PATH.
C       MAPATH                  CHAR*50      MAP DATA PATH NAME.
C       LUNNAM                  INTEGER      LOGICAL UNIT NUMBER FOR NAME LIMITS
C                                            FILE.
C       AREAMN                  REAL         MINIMUM AREA SIZE.
C       AREAMX                  REAL         MAXIMUM AREA SIZE.
C
```

Jul 20 14:11 1989 carr .f Page 31

```
C OUTPUT FILES/PARAMETERS:  NONE.
C
C SUBROUTINES/FUNCTIONS CALLED :
C
C        PLTNAM              PLOTS NAMES FROM NAME LIMITS FILE.
C
C CALLED BY: DMAPII.
C
C LOCAL VARIABLES:
C
C        FILEN               CHAR*100    FULL PATHNAME.
C
C RESTRICTIONS: NONE.
C
C ABNORMAL RETURN CONDITIONS:   NONE.
C
C LOCATION:                     /a21/gjf/MAPSRC.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C     Dave Nation               5/6/85                  Change fill path name
C                                                       from defpth to mapath
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE NAMLIM (NAMFIL,LENNMF,LTON,XRNM)

C       THIS SUBROUTINE OPENS THE NAME LIMITS FILE AND CALLS PLTNAM

        character*50 mapath
        common /mapath/ mapath
        common /lenmap/ lenmap
        COMMON /NMLIM/ LUNNAM,AREAMN,AREAMX
        LOGICAL LTON(16)
        CHARACTER*80 NAMFIL
        CHARACTER*100 FILEN

        LEN = LENNMF + LENMAP
        if(lenmap .gt. 0) then
             filen = mapath(1:lenmap) // namfil(1:lennmf)
        else
             filen = namfil(1:lennmf)
        endif
        OPEN(UNIT=LUNNAM,FILE=FILEN(1:LEN),STATUS='OLD',
     +  ERR=671)

            CALL PLTNAM (LTON,XRNM)
            GO TO 699
  671   CONTINUE
c            PRINT*,'PLOT -- ERROR ON OPEN OF NAME LIMITS FILE ',
c     +      filen(1:lennmf)
  699   CONTINUE
```

Jul 20 14:11 1989 carr .f Page 32

```
        CLOSE(LUNNAM)

        RETURN
        END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     NEXTPT
C
C FUNCTIONAL DESCRIPTION:        .
C
C CALLED BY:                     NO LONGER USED BY CARICATURE
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine nextpt (longfl,alat,alon,df,arc,itproj)
c
c     This subroutine gets the next point of the DF l.o.b.
c
      logical longfl,NEWSEQ
      real LNP,LNM,L0

      common/constx/sazi,slat,cosazi,scazi,coslat,sinazi,cosi,
     1             sini,cosl0,cosf0,L0,lnp,lnm,f,f0

      data PI/3.14159/
      data TWOPI/6.28318/
      data R90/1.5708/


      if (longfl) then
c ------- This is a longitudinal bearing.
C ------- Latitude of new point
          ALAT = ALAT + DF
C ------- New length of arc
          ARC = ARC + ABS(DF)
          ABSLAT = ABS(ALAT)
C ------- Special case for crossing a pole
          IF (ABSLAT.GT.R90) THEN
C ----------- Convert latitude to value between -pi/2 and +pi/2
              SALAT = SIGN(1.0,ALAT)
              ALAT = SALAT*(PI-ABSLAT)
C ----------- Reverse direction of bearing
              DF = -DF

C ----------- Calculate new longitude (opposite side of globe)
              ALON = ALON + PI
              IF (ALON.GT.PI) THEN
                  ALON = ALON - TWOPI
              END IF

C ----------- Special case for non-circular projection types
              IF (itproj.GE.6) THEN
C --------------- Start new line at opposite bound of projection
```

Jul 20 14:11 1989 carr .f Page 33

```
                  NEWSEQ = .TRUE.
              END IF
          END IF
      else
c         This is a regular bearing.
          IF (ABS(SINI).LT.0.001) THEN
C ----------- If track along equator, just increment longitude
              ALON = LNM + SAZI*F
          ELSE
              SINLAT = SINI*SIN(F)
C ----------- L is difference in longitude from intersection of great circle
C ----------- with equator to next point
              COSL = COS(F)/SQRT(1-SINLAT**2)
C ----------- The following lines are limits,not sure if
C ----------- if it should be done this way
              COSL = AMAX1(-1.0000000,COSL)
              COSL = AMIN1( 1.0000000,COSL)
C ----------- Latitude of next point
              ALAT = ASIN(SINLAT)
              SALAT = SIGN(1.0,ALAT)
C ----------- Longitude of next point
              ALON = SALAT*SAZI*ACOS(COSL)
              IF (SLAT.GT.0.0) THEN
                  ALON = LNM + ALON
              ELSE
                  ALON = LNP + ALON
              END IF
          END IF
          IF (ABS(ALON).GT.PI) THEN
              ALON = ALON - SIGN(1.0,ALON)*TWOPI
          END IF
      endif

      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    notava
c
c  Functional Description:
c       puts out an error message indicating the function is not currently
c       available
c
c  Input Files/Parameters:
c
c  Output Files/Parameters: N/A
c
c  Subroutines/Functions Called:
c
c  Called By:                    PRINTR
c
c  Local Variables: N/A
c
c  Restrictions: N/A
c
```

```
c  Abnormal Return Conditions:  N/A
c
c  Location:       /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine notava
c
c      puts out an error message indicating the function is not currently
c      available
c
       call mesg (2)
       call paws
       call menupr
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    NOTUND
C
C FUNCTIONAL DESCRIPTION:       .
C
C CALLED BY:                    STATEC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

       subroutine notund
c
c      this subroutine is the not understood state interpreter (15)
c
       common /states/ nextst
       logical eol,eoc
       common /comnds/ lenl,indxw,lenw,eol,eoc
       character * 80 comlin
       common /comlin/ comlin
       character * 105 errlin
c
       errlin = 'Command not understood : ' //
     + comlin(indxw:indxw + lenw - 1)
       lenlin = 25 + lenw
       call cerror(lenlin,errlin)
       nextst = 1
c
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    NPICK
C
C FUNCTIONAL DESCRIPTION:       .
```

```
C
C CALLED BY:                    RECDIS, SAVDIS
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine npick (ichoic,mysegn,ibuttn,isegn)
c
c       modified mpick to get a selection from the menu
c
c       *** this is a machine dependent subroutine and should be changed
c           if necessary when a new device driver is used that returns
c           different values for buttons ****
c           currently the value for the '0' key is 48
c
        logical sys,aed
        common /sysdbc/ sys
        common /aeddbc/ aed
        integer segnam,pickid
        integer qfb(26),qmb(4)
        common /butons/ qfb,qmb
        character ch1
        equivalence (ch1(1:1),ikey)
c       on screen standard function key common
        common /nsgkey/ nsgkey,nsgktx
c
        if (sys) print*,'npick -- enter  ',mysegn
        call pick (ibuttn,segnam,pickid)
        if (sys) print*,'npick --  ',ibuttn,segnam,pickid,qmb(1)
        ichoic = 0
        if ((mysegn.eq.segnam.or.isegn.eq.segnam)
     +  .and.ibuttn.eq.qmb(1)) then
            ichoic = pickid
        else
            if (segnam.eq.nsgktx) then
                ibuttn = pickid
            else
                if (aed) ichoic = ibuttn - 48
            endif
        endif
        if (sys)
     +  print*,'npick -- exit  ichoic = ',ichoic,mysegn,ibuttn
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   openit

c  Functional Description:
c       this subroutine opens a file
c
c  Input Files/Parameters:
```

```
Jul 20 14:11 1989  carm  .f Page 36

c  Output Files/Parameters: N/A

c  Subroutines/Functions Called:

c  Called By:                     BSTMAP, CREATM, CRMESG, HELP,   INIGRA,
C                                 LOADIC, MESGJF, RBOUND, RCOLOR
C                                 RCONFG, RPARAM, RPATHS, RSAVPR, SPARAM
C                                 WSAVPR, WRITER

c  Local Variables: N/A

c  Restrictions: N/A

c  Abnormal Return Conditions:  N/A

c  Location:       /a21/dave

c  Programmer          Date of Last Change       Reason for Change
c  C.S. Lamb           Jan 1988               stat='UNKNOWN' - openit

C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine openit (filenm,len,ifl,irdwr,ierror)

c       this subroutine opens a file

        character*(*) filenm

c       print*,'Openit -- enter'
        ierror = 0
C        OPEN (file = filenm(1:len), UNIT=ifl, ERR=120, status='UNKNOWN')
        IF(IRDWR.EQ.0) THEN
            OPEN (file = filenm(1:len), UNIT = ifl, ERR = 120,
     1          STATUS='OLD')
        ELSE
            OPEN (file = filenm(1:len), UNIT = ifl, ERR = 100,
     1          STATUS='OLD')
            GOTO 110
  100       OPEN (file = filenm(1:len), UNIT = ifl, ERR = 120,
     1          STATUS='NEW')
        ENDIF
  110   rewind (ifl)
        go to 190
  120   continue
c       print*,'Openit -- open error'
        PRINT *,FILENM(1:LEN),' FILE OPEN PROBLEM, COULD BE SERIOUS!'
        ierror = 1
  190   continue

        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:      PAWS
c
```

Jul 20 14:11 1989 carr .f Page 37

```
c  Functional Description:
c       jpause function
c
c  Input Files/Parameters:
c       qdsdev
c       qpydev
c       qecho
c       qfb
c       qmb
c
c  Output Files/Parameters:
c
c  Subroutines/Functions Called:
c       buttn
c       helper
c
c  Called By:                    24 routines
c
c  Local Variables:
c       button          INTEGER              integer value of button pressed
c
c  Restrictions:                N/A
c
c  Abnormal Return Conditions: N/A
c
c  Location:        /a21/dave
c
c  Programmer       Date of Last Change      Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine paws
c
c      pause function used after error messages (also calls help when
c      appropriate
c
       integer qfb(26),qmb(4)
       common /butons/ qfb,qmb
       integer button
       Common /b6/ qcrmnu
       integer qcrmnu
c
       call buttn (button)
       if (button.eq.qfb(23)) then
           call helper (qcrmnu)
       endif
c
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:     PICK
c
c  Functional Description:
c       this subroutine does a jpick and supplies the first three variables
```

```
c
c  Input Files/Parameters:
c       qdsdev             INTEGER      device
c       qpydev             INTEGER      device
c       qecho              INTEGER      echo value for input
C       inpdev             INTEGER      input device
c       ichoic
c       segnam
c       pickid
c
c  Output Files/Parameters:
c
c  Subroutines/Functions Called:
c       Note: Subroutines preceded by a "j" are explained in the DI-3000 man
c
c  Called By:                     mpick, npick, pltsup, tquery
c
c  Local Variables:
c       segnam             INTEGER
c       pickid             INTEGER
c
c  Restrictions: N/A
c
c  Abnormal Return Conditions: N/A
c
c  Location:           /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-

        subroutine pick (ibuttn,segnam,pickid)

c       this subroutine does a jpick and supplies the first three variables

        common /tablet/ inpdev
        integer segnam,pickid
        integer qdsdev,qpydev,qecho,qlecho
        common /device/ qdsdev,qpydev,qecho,qlecho
        logical sys,rdkey,savkey
        common /sysdbc/ sys
        common /rkdbc/ rdkey
        common /svkdbc/ savkey
        logical eofkey
        integer keylun,newlun
        common /keylun/ keylun,newlun,eofkey
        character*6 command
        logical timout
        integer*2 time
        common /timout/ timout, time

        if (sys) print*,'pick -- enter'

c -- position cursor near middle of menu area

        CALL JPKAPR (QDSDEV,QPYDEV,.04,.04)
```

Jul 20 14:11 1989 carr .f Page 39

```
c       set pick echo position                            - pick
        CALL JPECHO(1,5,1,.69,.23)
  100   continue
        if ((rdkey).and..not.eofkey) then
            call kpause (eofkey)
            read (keylun,*,end=192,err=191) command,ibuttn,segnam,
     +      pickid
            if (command(1:5).ne.'jpick') then
                print*,'jpick -- incompatible command in ',
     +          'read_keys file  ',command,ibuttn,segnam,pickid
c               *** exit on error
                go to 199
            endif
        else

  125      continue
c
c          polling loop to check for incoming data or clock interrupt
c
           call datpol
c
c          check for keyboard interrupt
c
           call jpick (qdsdev,inpdev,qecho,ibuttn,segnam,pickid)
           if (timout) then
              go to 125
           end if
        endif

        go to 199
  191   continue
            print*,'pick -- error on read of save key file',
     +      '  ',keylun,ibuttn,segnam,pickid
            go to 199
  192   continue
            print*,'pick -- premature end of read key file.'
            eofkey = .true.
            go to 100
c           **** go back and get the function interactively on end of file
  199   continue
        if (savkey) then
            write (newlun,*,err=135)'''jpick''  ',ibuttn,segnam,
     +      pickid
        endif
        go to 140
  135   continue
            print*,'pick -- error on write to save key file',
     +      '  ',newlun,ibuttn,segnam,pickid
  140   continue
        if (sys) print*,'pick -- exit',ibuttn,segnam,pickid

        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
```

Jul 20 14:11 1989 carr .f Page 40

```
C UNIT NAME:                    PLOTIT
C
C FUNCTIONAL DESCRIPTION:       Marks DF station, and draws line of bearing.
C
C INPUT FILES/PARAMETERS:       rlo,rla - station coords.
C                               az,dst  - DF azimuth and arc length.
C                               xrnm    - map half width, nm
C
C GLOGBAL VARIABLES:            invali  - unplotable point flag.
C                               nolobx  - no label/box flag.
C
C SUBROUTINES CALLED:           llplxy,da2ll,ll2gc,blplin,mytext
C
C CALLED BY:                    drwlob
C
C LOCAL VARIABLES:              size    - annotation character size.
C                               box     - half width of marker box.
C
C PROGRAMMER:                   DATE OF LAST CHANGE     REASON FOR CHANGE
C       Tom Wescott (NOSC)      8/88                    add clip, simplify
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine plotit(rla,rlo,brgid,az,dst,rinc,xrnm,itproj,iacept)
c
c     Note:  arguments  rinc,itproj,iacept are no longer used.
      character*2 brgid
      real slat(2),slon(2),plat(361),plon(361)
      logical invali
      common /invali/invali
      common /pie/ pie,tpie,pio2,pio4
c
      logical nolobx
      common /nolobx/ nolobx
c
c
      if (abs(az).gt.pie)  az = az - sign(tpie,az)
      call llplxy(rlo,rla,1,x,y,nout)
c
c     Skip plotting of stations over the horizon or unlabeled.
      if ((.not.invali) .and. (.not.nolobx)) then
         if (xrnm .gt. 2000.) then
            size = 4.
            box = 2.
         else
            if (xrnm .gt. 1000.) then
               size = 5.
               box = 3.
            else
               size = 6.
               box = 5.
            endif
         endif
c
c        Draw box around location of DF station
         call jlstyl (0)
```

Jul 20 14:11 1989 carr .f Page 41

```
            call jmove (x-box,y-box)
            call jdraw (x+box,y-box)
            call jdraw (x+box,y+box)
            call jdraw (x-box,y+box)
            call jdraw (x-box,y-box)
c
c           Label the box with the bearing ID (station).
            if(abs(az).gt.1.57) then
               xx = x - box - 1.
               yy = y + box + 3.
            else
               xx = x - box - 2.
               yy = y - box - size - 3.
            endif
            call jmove (xx,yy)
            call jsize (size,size)
c            call j1text (2,brgid)
            call mytext (2,brgid)
         endif
c
c        Generate a great circle polyline along line of bearing.
         slat(1) = rla
         slon(1) = rlo
         call da2ll(slat(1),slon(1),dst,az,slat(2),slon(2))
         call ll2gc(slon,slat,2,361,plon,plat,npts)
c
c        Draw polyline with clipping.
         call blplin(plon,plat,npts)
c
         return
         end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PLOTON
C
C FUNCTIONAL DESCRIPTION:        .
C
C CALLED BY:                     TRKCON
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

         subroutine ploton

c this routine makes visible all the currently active segments within the
c fade time
c programmer: avw

         integer           curseg(260)
         integer           lctrak
         integer           loc
         integer           ltypov (16)
         integer           mrkcnt
         integer           numrcs
```

```
Jul 20 14:11 1989   carr   .f Page 42

      integer           tfaddx
      integer           tfadtm
      integer           tkoset
      integer           tnewst
      integer           toldst
      integer           trklst(260)
      integer           trkndx (1000)

      logical           ltonov (16)
      logical           rankt (26, 16)
      logical           segact (1000)
      logical           spprsd (1000)
      logical           boxvis(260)
      logical           trackn

      character*2       actmrk(260)
      character*9       boxdtg(260)
      character*160      trkrec (1000)

      common /trkdbc/   trackn
      common /actmrk/   trklst, mrkcnt, actmrk, curseg,
     +                  boxdtg, boxvis
      common /maptoo/   ltypov, ltonov, rankt
      common /numrcs/   numrcs
      common /segact/   segact
      common /spprsd/   spprsd
      common /tarbou/   tnewst, toldst
      common /tfadez/   tfaddx, tfadtm
      common /tkoset/   tkoset
      common /trkndx/   trkndx
      common /trkrec/   trkrec

      data lctrak       /3/

      if (trackn) then
         print *, 'enter ploton:'
         print *, '   tfaddx = ', tfaddx
      end if

      ltonov(lctrak) = .true.

      if (tfaddx .ne. 0) then
         loc = tfaddx
10       continue
         if (.not. spprsd(trkndx(loc))) then
            if (segact(trkndx(loc))) then
                call jvisbl (trkndx(loc)+tkoset, 1)
            else
               call seghnd (trkndx(loc)+tkoset, trkrec(trkndx(loc)))
               segact(trkndx(loc)) = .true.
            end if
         end if
         if (loc .eq. tnewst) then
            go to 20
         else
            loc = mod (loc, numrcs) + 1
```

Jul 20 14:11 1989 carr .f Page 43

```
            go to 10
         end if
      end if

   20 continue

c     turn on the boxes around the most current point of
c     each track if it is within the fade time and it is
c     not suppressed. (jit)

      do 30 i = 1,mrkcnt
         if (boxvis(i)) then
            call jvisbl(curseg(i), 1)
         endif
   30 continue
c
      if (trackn) then
         print *, 'exit ploton:'
         print *, '   tfaddx = ', tfaddx
      end if

      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PLOTOV
C
C FUNCTIONAL DESCRIPTION:       .
C
C CALLED BY:                    PLTDAT, PLTOVP
C
C RESTRICTIONS:                 This subroutine can omit overlays in azimuthal
C                               projections with horizon.  Needs a proper clip.
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-
c
      subroutine plotov (lat,nsi,lon,ewi,marknm,
     +       rsize,placen,linsym)
c
c     plot an overlay point and name on the current map at lat/lon
c     lat/lon are in d/m/s format as an integer*4
c
      real x
      real y
      character linsym
      character nsi,ewi
      character*80 placen
      character*80 string
      character*80 tmpstr
      integer iacept
      integer*4 lat,lon
      integer*4 marknm
      integer mrkbeg
```

Jul 20 14:11 1989 carr .f Page 44

```
      integer mrkend
      logical draw
      logical isinv
      logical newons
      logical map
      common /mapdbc/ map

      real oldx, oldy
      logical oldons,oldinv
      common /oldxy/ oldx,oldy,ixop,iyop,oldons,oldinv
      real plo(2),pla(2),gcplo(1200),gcpla(1200)
      common /savpln/ plo,pla
      real*8 dtor,stor
      common /dtor/ dtor,stor
      logical invali
      common /invali/ invali
      dimension ltypov(16)
      logical ltonov(16),rankt(26,16)
      common /maptoo/ ltypov,ltonov,rankt
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT

      data mrkbeg /10/
      data mrkend /11/
      data lcover /1/
c
      if (map) then
          print*,'plotov -- ',XRNM,XC,YC,LEVEL,CLAT,CLON,XRAD,
     +    YRAD,ITPROJ,IRES,LTYPTB,LUNDAT,LUNIND,LUNLIN,LTON,
     +    IPGRID,DOTEM,ORHALT
      endif
      draw = .false.
      if (xrnm .gt. 2000) then
          sizef = 8.
      else if (xrnm .le. 2000 .and. xrnm .gt. 1000) then
          sizef = 10.
      else
          sizef = 12.
      endif
          call lltor (lat,lon,nsi,ewi,plat,plon)
          call invtes (plat,plon,isinv)
c          print*,'plotov -- ',lat,nsi,lon,ewi,plat,plon,
c     +    isinv,'  ',placen
          if (isinv) then
             plo(1) = plon
             pla(1) = plat
          else
              call lltoxy (plat,plon,x,y)
              if (map) print*,'plat,plon,x,y=',plat,plon,x,y
              if (linsym.eq.'s'.or.linsym.eq.'S') then
                  draw = .true.
                  oldx = x
                  oldy = y
```

Jul 20 14:11 1989 carr .f Page 45

```
                  plo(1) = plon
                  pla(1) = plat
              else if (linsym.eq.'d'.or.linsym.eq.'D') then
                  draw = .true.
                  plo(2) = plon
                  pla(2) = plat
c                 Convert line segment into a great circle polyline.
                  call ll2gc(plo,pla,2,1200,gcplo,gcpla,nverts)
c                 Draw breakline clipped polyline to current point.
                  call blplin(gcplo,gcpla,nverts)
                  plo(1) = plo(2)
                  pla(1) = pla(2)
                  oldx = x
                  oldy = y
              else if (linsym.eq.'e'.or.linsym.eq.'E') then
                  read(placen, 10120) sma, smi, dazi,tmpstr
10120             format(3f8.0,a)
                  placen = ' '
                  placen = tmpstr
                  call drawel(plat,plon, sma, smi, dazi)
              else if (linsym.eq.'b'.or.linsym.eq.'B') then
                  linsym = 'b'
                  read (placen,10110,err=120) dazi,iacept,string
10110             format(f7.0,1x,i1,1x,a70)
                  razi = dazi * dtor
                  placen = string
                  call drwlob (plat,plon,razi,'  ',xrnm,
     +                        itproj,iacept)
                  go to 125
  120             continue
                      print*,'Error in conversion of bearing azimuth',
     +                placen
  125             continue
              endif
              call lltoxy (plat,plon,x,y)
              call clipxy (x,y,newons)
              if(newons.and..not.invali) then
                  if (rsize.lt..1) rsize = 1.
                  size = rsize * sizef
                  call jsize (size*.8,size)
c
c****             if tracking is being plotted, put up the 2 letter marker
c****             found in the placen string
c
                  if (linsym .eq. 't') then
                          size = rsize * 8.
                          call jsize(size,size)
                          call jmove(x-1.,y-1.2)
                          call j1strg(placen(mrkbeg:mrkend))
                          placen = '  '
                  else if (.not.draw.or.marknm.ge.1) then
                      if (marknm.ge.1.and.marknm.le.15)
     +                then
                          marker = marknm
                          call jcmark (marker)
                          call jmark(x,y)
```

Jul 20 14:11 1989 carπ .f Page 46

```
                        else
c
c if markernumber > 15, assume this is an icon file to be displayed
c
                            size = rsize * (sizef / 6.)
                            call geticn(ltypov(lcover),ltypov(lcover),
     +                                 size,size,x,y,marknm,2,0.0)
                        endif
                    endif
                    call lngth (placen,80,len)
                    if (len.gt.0) then
                        if (linsym.eq.'b'.and.dazi.lt.180.) then
                            call jjust (3,2)
                            ioffs = -5
                        else
                            call jjust (1,2)
                            ioffs = 5
                        endif
                        call jmove (x + ioffs,y)
                        call jlstrg (placen(1:len))
                    endif
                endif
            endif
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PLTCIT
C
C FUNCTIONAL DESCRIPTION:        .
C
C CALLED BY:                     DMAPII
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine pltcit (xrnm,citfil,lenctf)

c       this subroutine opens the cities file and plots it

        character*50 mapath
        common /mapath/ mapath
        common /lenmap/ lenmap
        character*80 citfil
        character*100 filen
        logical interr
        common /interr/ interr
        logical invali
        common /invali/ invali
        logical newons,isinv
        character nsi,ewi
        character*35 name
        character*35 string
```

Jul 20 14:11 1989 carn .f Page 47

```
        character*4 pnab
        integer*4 lat,lon
        logical pnatmp
        logical pnabon
        common /pnabon/ pnabon

        real llconv

        data pnabon/.true./
        data nxpc/80/
        data lunnam/16/
        DATA ICNAME/7/
c       factor is the value to divide xrnm by to limit the cities displayed
c       by population
        data factor/10./
c       ioffs is the offset from the marker to the pnab
        data ioffs/3/
c
        len = lenctf + lenmap
        if(lenmap .gt. 0) then
             filen = mapath(1:lenmap) // citfil(1:lenctf)
        else
             filen = citfil(1:lenctf)
        endif
c       print*,'pltcit -- ',len,'  ',filen(1:len)
        open(unit=lunnam,file=filen(1:len),status='old',
     +  err=185)
        rewind(lunnam)
        call jsize (7.,7.)
        call jjust (2,1)
        CALL JFONT(1)
        CALL JGAP(0.)
        CALL JPATH(1)
        CALL JBASE(1.,0.,0.)
        CALL JPLANE(0.,1.,0.)
  100   continue
            call chint (interr,ch)
            if (interr) go to 190
            read(lunnam,1110,err=181,end=190) pnab,lat,nsi,lon,ewi,
     +      ipop,marker,name
 1110       format (a4,1x,i6,a1,i7,a1,i5,1x,i1,1x,a35)
c           skip record if population is too small *****
            if (ipop.lt.xrnm/factor.and.marker.ne.4) go to 100
            call tocaps(nsi,1)
            isign = 1
            if (nsi.eq.'S') isign = -1
            plat = llconv(real(lat),isign)
            call tocaps(ewi,1)
            isign = 1
            if (ewi.eq.'W') isign = -1
            plon = llconv(real(lon),isign)
c            call lltord (lat,lon,nsi,ewi,plat,plon)
            call invtes (plat,plon,isinv)
            if (.not.isinv) then
                call lltoxy (plat,plon,x,y)
                call clipxy (x,y,newons)
```

Jul 20 14:11 1989 carm .f Page 48

```
                if(newons.and..not.invali) then
                    if (pnabon.and.pnab.eq.'....') then
                        pnatmp = .false.
                    else
                        pnatmp = pnabon
                    endif
                    if (pnatmp) then
                        string = pnab
                        lenstr = 4
                    else
                        call length (name,35,lenstr)
                        string = name(1:lenstr)
                    endif
                    if (marker.gt.1.and.marker.le.15) then
                        mark = marker
                    else
                        mark = 1
                    endif
                    call jcmark (mark)
                    call jmark (x,y)
                    if (lenstr.gt.0) then
                      CALL JMOVE(X+IOFFS,Y)
                      CALL JHSTRG(string(1:LENSTR))
                    ENDIF
                endif
            endif
            go to 100
  181   continue
            print*,'read error on cities file'
            go to 190
  185   continue
            print*,'pltcit -- Error on open of cities file',len,
     +      '  ',filen(1:len)
  190   continue
        call jjust (1,1)
        close(lunnam)
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PLTDAT
C
C FUNCTIONAL DESCRIPTION:       .
C
C CALLED BY:                    SEGHND
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine pltdat (trdata)

c  this subroutine sends a line of tracking data to be plotted on
c  the current map (originally called trakpt in /dsee/apollo)
```

```
      integer alat
      integer alon
      integer ipgrid(4)
      integer ires
      integer isign
      integer itproj
      integer latbeg, latend
      integer lonbeg, lonend
      integer level
      integer ltyptb(16)
      integer lundat
      integer lunind
      integer lunlin
      integer mrkrnr
      integer posit
      integer trkcol
      integer*4 track
      integer ltypov(16)
      integer lctrak

      real    clat
      real    clon
      real    dx
      real    dy
      real    orhalt
      real    rlat
      real    rlon
      real    rsize
      real    tmplat
      real    tmplon
      real    xc
      real    xllgvp
      real    xrad
      real    xrnm
      real    xurgvp
      real    yc
      real    yllgvp
      real    yrad
      real    yurgvp

      character*1        ewi
      character*1        linsym
      character*1        nsi
      character*7        lat
      character*8        lon
      character*160      trdata
      character*80       timbuf
      character*9        tmpdtg
      character*2        marker

      logical  lton(16)
      logical  dotem
      logical  isinv
      logical  exist
      logical  ltonov(16)
```

Jul 20 14:11 1989 carm .f Page 50

```
      logical  rankt(26,16)
      logical  trackn
c
c     llconv is a latlon conversion function

      real    llconv
c   exist is set in subroutine getmark depending on whether or not
c   the track already exists, or is newly created.
c   posit is the position of the track in the table.

      common /trkdbc/   trackn
      common /comgvp/   xllgvp, yllgvp, xurgvp, yurgvp
      common /map/      xrnm, xc, yc, level, clat, clon, xrad, yrad,
     +                  itproj, ires, ltyptb, lundat, lunind, lunlin,
     +                  lton, ipgrid, dotem, orhalt

      integer qdsdev,qpydev,qecho,qlecho
      common /device/ qdsdev,qpydev,qecho,qlecho
      common /maptoo/ ltypov, ltonov, rankt

      logical oneflg
      common /oneflg/ oneflg

      logical last
      common /lstplt/ last

      data trkcol /224/
      data lctrak /3/

      if (trackn) print *, 'enter pltdat,trdata=',trdata

      read (trdata, 45, err=200) linsym
   45 format (a1)

c ----- ignore comments and amplification lines in input text

      if (linsym .eq. ' ' ) then
c
c        reset linsym to signify tracking data
c
         linsym = 't'
c
c        new variables: track, alert, pddg, series, repnum
c
         read (trdata, 50, err=200)
     +           alat, nsi,alon, ewi,track,timbuf
   50    format (2x, i6, a1, i7, a1, i4, a9)
c
c        get the marker for this plot
c        JIT: add parameter timbuf to be used in fade time routines.
c
         call getmark(track, marker, posit, exist,timbuf(1:9))
         tmpdtg = timbuf(1:9)
c
c        put marker into timbuf after the date/time group
c        to be used in the plotting of this track
```

```
c
          timbuf(10:11) = marker
c
          rsize = 1.5
c
c         convert alat and alon to character, then convert to radians
c
          if (nsi .eq. 'N' .or. nsi .eq. 'n') then
               isign = 1
          else
               isign = -1
          endif
          tmplat = alat
          rlat = llconv(tmplat, isign)
          if (ewi .eq. 'E' .or. ewi .eq. 'e') then
               isign = 1
          else
               isign = -1
          endif
c
c         Check to see if this plot is visible on the current map.
c
          tmplon = alon
          rlon = llconv(tmplon, isign)
          call invtes(rlat,rlon,isinv)


          if ( .not. isinv .and. ltonov(lctrak)) then
c
c            this is true white on the color node
c
             call xcolor (trkcol)
c
c            set the pick aperture to a very small size for the plot
c
             dx = .0003
             dy = .0003
             call jpkapr(qdsdev,qpydev,dx,dy)
             call plotov (alat, nsi, alon, ewi, mrkrnr, rsize, timbuf,
     +             linsym)
c
c   split off the latitude and longitude values from the
c   tracking data line, and then pass these values to boxseg.
c
             latbeg = 3
             latend = 9
             lonbeg = 10
             lonend = 17
             lat = trdata(latbeg:latend)
             lon = trdata(lonbeg:lonend)

c
c            jrclos is used to close the segment which is opened in
c            the segment-handler routine.  this segment will redundantly be
c            closed when control returns to the segment-handler routine.
c
```

Jul 20 14:11 1989 carn .f Page 52

```
              call jrclos
c
              if (.not.(oneflg)) call curbox(lat, lon,
     +                                        posit,exist,tmpdtg)
           endif
        end if
        go to 250

  200   print *, 'error in overlay read in pltdat routine'
        go to 250

  210   print *, 'error in overlay write in pltdat routine'
  250   continue

        if (trackn) print *, 'exit pltdat'

        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: pltnam
C
C FUNCTIONAL DESCRIPTION:  THIS SUBROUTINE READS THE NAME LIMITS FILE AND PLOTS
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                      NAMLIM
C
C LOCAL VARIABLES: NONE.
C
C RESTRICTIONS: NONE.
C
C ABNORMAL RETURN CONDITIONS:     NONE.
C
C LOCATION:
C
C PROGRAMMER:                     DATE OF LAST CHANGE       REASON FOR CHANGE
C
C     DAVE NATION                                           ORIGINAL CODE.
C     JERRY FENERTY                                         DOCUMENT AND MODIFY
C                                                           FOR A21 PROTOTYPE.
C
C-*-*-*-*-*-*-*-*-*-*-*-*-*-*-*-*-*-*-*-*-*-*-*-*-*-*-*-*-*-*-*-*-*-*-*|*-*-*-*-

        SUBROUTINE PLTNAM (LTON,XRNM)

C       THIS SUBROUTINE READS THE NAME LIMITS FILE AND PLOTS

        CHARACTER*1 CH
```

```
      LOGICAL INTERR
      COMMON /INTERR/ INTERR
      CHARACTER*20 NAME
      CHARACTER TYPEC
      LOGICAL LTON(16)
      INTEGER CHRLEN
      LOGICAL INVALI
      COMMON /INVALI/ INVALI
      LOGICAL IFRST,NEWONS,ISINV
      COMMON /NMLIM/ LUNNAM,AREAMN,AREAMX
      COMMON /CHSIZE/ XCHSIZ,YCHSIZ,XCHMIN,YCHMIN
c** featrs is common to drawf routine for drwing
c** area names without redrawing any boundries.
      logical featrs(16), indrwf
      COMMON /pltftr/ featrs, indrwf
      INTEGER   isecs,imins
      REAL      c,cs
      COMMON    /c/ c,isecs,cs,imins

      DATA NXPC/80/
      DTORAD=C*60.

      AREAMN = XRNM/250.

      IF (AREAMN.LT.5) AREAMN = 0.

      REWIND(LUNNAM)
      NNAMS=0
      IFRST=.TRUE.

      IF (XRNM .GT. 2000) THEN
          SIZE = 8.
      ELSE IF (XRNM .LE. 2000 .AND. XRNM .GT. 1000) THEN
          SIZE = 10.
      ELSE
          SIZE = 12.
      ENDIF

C      CALL JSIZE (SIZE*.8,SIZE)
C      CALL JJUST (2,1)

      call jsize (7.,7.)
      call jjust (2,1)
      CALL JFONT(1)
      CALL JGAP(0.)
      CALL JPATH(1)
      CALL JBASE(1.,0.,0.)
      CALL JPLANE(0.,1.,0.)

  100 CONTINUE

          CALL CHINT (INTERR,CH)

          IF (INTERR) GO TO 190

          READ(LUNNAM,1110,ERR=182,END=190) NAME(1:20),RLATL
```

Jul 20 14:11 1989 carr .f Page 54

```
     +       ,RLATH,RLONL,RLONH,
     +       CLAT,CLON,DLAT,DLON,TYPEC
 1110        FORMAT(A20,2(F5.1,1X),6(F6.1,1X),A1)

C            do not plot aliases

             if(typec.eq.'A') go to 100

C            NO STATE IF NOT ON

             if (indrwf) then
                if(TYPEC.EQ.'S'.AND..NOT.featrs(3)) GO TO 100
             else
                if(TYPEC.EQ.'S'.AND..NOT.LTON(3)) GO TO 100
             endif

C            no country if not on

             if (indrwf) then
                if(typec.eq.' '.and..not.featrs(2)) go to 100
             else
                if(typec.eq.' '.and..not.lton(2)) go to 100
             endif

c            no continents if countries or states on

             if (indrwf) then
                if(typec.eq.'C'.and.(featrs(2).or.featrs(3))) go to 100
             else
                if(typec.eq.'C'.and.(lton(2).or.lton(3))) go to 100
             endif

             IF(TYPEC.EQ.'M'.AND..NOT.LTON(12)) GO TO 100

             PLAT=CLAT*DTORAD
             PLON=CLON*DTORAD
             CALL INVTES (PLAT,PLON,ISINV)

             IF (.NOT.ISINV) THEN

                 CALL LLTOXY (PLAT,PLON,X,Y)
                 CALL CLIPXY (X,Y,NEWONS)

                 IF(NEWONS.AND..NOT.INVALI) THEN

                     LEN=CHRLEN(NAME)
                     AREA=DLAT*DLON*COS(PLAT)
                     IF(AREA.GE.AREAMN.AND.AREA.LE.AREAMX) THEN

                        CALL JMOVE(X,Y)
                        CALL JHSTRG(NAME(1:LEN))

                     ENDIF

                 ENDIF
```

Jul 20 14:11 1989 carr .f Page 55

```
            ENDIF

            GO TO 100

  182   CONTINUE

c           PRINT*,'ERROR ON NAME LIMITS FILE'

  190   CONTINUE
        call jjust (1,1)

        RETURN
        END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      PLTOFF
C
C FUNCTIONAL DESCRIPTION:         .
C
C CALLED BY:                      TRKCON
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine pltoff

c this routine turns off all currently visible plots
c programmer: avw

        integer           curpos
        integer           curseg(260)
        integer           lctrak
        integer           ltypov (16)
        integer           mrkcnt
        integer           numrcs
        integer           tfaddx
        integer           tfadtm
        integer           tkoset
        integer           tnewst
        integer           toldst
        integer           trklst(260)
        integer           trkndx (1000)

        character*2       actmrk(260)
        character*9       boxdtg(260)

        logical           ltonov (16)
        logical           rankt (26, 16)
        logical           segact (1000)
        logical           boxvis(260)
        logical           trackn

        common /trkdbc/   trackn
        common /actmrk/   trklst, mrkcnt, actmrk, curseg,
```

Jul 20 14:11 1989 carr .f Page 56

```
     +                       boxdtg, boxvis
        common /maptoo/   ltypov, ltonov, rankt
        common /numrcs/   numrcs
        common /segact/   segact
        common /tarbou/   tnewst, toldst
        common /tfadez/   tfaddx, tfadtm
        common /tkoset/   tkoset
        common /trkndx/   trkndx

        data lctrak /3/

        if (trackn) print *,'enter pltoff: tfaddx=',tfaddx

        ltonov(lctrak) = .false.

        if (tfaddx .ne. 0) then
           curpos = tnewst
   10      continue
           if (segact(trkndx(curpos))) then
              call jvisbl (trkndx(curpos)+tkoset, 0)
           end if
           if (curpos .eq. tfaddx) then
              go to 20
           else
              curpos = curpos - 1
              if (curpos .eq. 0) then
                 curpos = numrcs
              end if
           end if
           go to 10
        end if

   20   continue

c       make invisible the segments which
c       display the boxes around the current points
c       for each track.    (jit)

        do 30 i = 1,mrkcnt
          call jvisbl(curseg(i),0)
   30   continue
c
        if (trackn) print *,'exit pltoff: tfaddx = ',tfaddx

        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PLTOVP
C
C FUNCTIONAL DESCRIPTION:       .
C
C CALLED BY:                    DOVERL, FOVERL
C
C PROGRAMMER:                   DATE OF LAST CHANGE      REASON FOR CHANGE
```

Jul 20 14:11 1989 carn .f Page 57

```
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine pltovp (xrnm,ovfnam,lenovf)

c       this subroutine plots overlay data on the current map

        character linsym
        logical interr
        common /interr/ interr
        character*80 placen
        integer*4 lat,lon
        integer*4 marknm
        character nsi,ewi
        character*(*) ovfnam
        character*105 string
        character*16 platlon
        character*72 amptxt(4)
        integer ampcnt
        logical eliflg
        common /inpoly/inpoly
        common/ampprm/ampseg
        data lunnam/9/

c        print *,'pltovp -- enter  ovfnam ',ovfnam(1:lenovf)
        eliflg = .false.
        ampcnt = 0
        open(unit=lunnam,file=ovfnam(1:lenovf),err = 186,
     +  status = 'old')

C ----- Make sure all commands are sent to device
        CALL FLUSHB

        rewind(lunnam)
  100   continue
            read(lunnam,10100,err = 182,end=190) linsym,string
10100       format(a1,a105)
c            PRINT 10101,LINSYM,STRING(1:70)
c10101       format(1x,a1,a70)
            if (linsym.eq.'c'.or.linsym.eq.'C') then
c               ignore comment lines
            else if(linsym .eq. 'a' .or. linsym .eq. 'A') then
                if(ampcnt .lt. 4) then
                    ampcnt  = ampcnt + 1
                    amptxt(ampcnt)(1:72) = string(2:73)
                endif
            else
                read(string,10110,err = 182,end=190)
     +          lat,nsi,lon,ewi,marknm,rsize,placen
10110           format(1x,i6,a1,i7,a1,i3,f5.0,1x,a80)

             call plotov (lat,nsi,lon,ewi,marknm,
     +          rsize,placen,linsym)
                if(linsym .eq. 'e' .or. linsym .eq. 'E') then
                       eliflg = .true.
                       call readel(string,platlon)
```

Jul 20 14:11 1989 carrr .f Page 58

```
                      if(ampcnt .lt. 4) then
                          ampcnt = ampcnt + 1
                          amptxt(ampcnt)=
     +                          platlon(1:8)//' '//platlon(9:16)
                      endif
               endif
           endif
           go to 100
  181   continue
           print*,'read error on overlay name file'
           go to 200
  182   continue
           print*,'decode error on overlay file'
           go to 200
  186   continue
           print*,'open error on overlay file ',ovfnam(1:lenovf)
           go to 200
  190   continue
c
c**** the following loop was added dec '86 to put amplification data
c**** in a separate area...LMA
        if (ampcnt .ge. 1) then
           call jrclos
           call drwamp(amptxt,ampcnt)
        endif
200     continue
        close (unit=lunnam)
c        print*,'pltovp -- exit  ampcnt',ampcnt
        return
        end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PLTSUP
C
C FUNCTIONAL DESCRIPTION:        .
C
C CALLED BY:                     TRKCON
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine pltsup
c
c     suppress plots on screen by purging the seg
c     associated with that track.
c

      logical abort
      logical endlst
      logical found

      integer chkndx
      integer chkseg
      integer ibuttn
```

```
      integer lctrak
      integer pickid
      integer segnam

      logical spprsd(1000)
      common /spprsd/ spprsd
      logical segact(1000)
      common /segact/ segact
      integer qfb(26)
      integer qmb(4)
      common /butons/ qfb,qmb
      integer ltypov (16)
      logical ltonov (16)
      logical rankt (26, 16)
      common /maptoo/ ltypov, ltonov, rankt
      integer tkoset
      common /tkoset/ tkoset
      integer trkndx(1000)
      common /trkndx/ trkndx
      integer tfaddx
      integer tfadtm
      common /tfadez/ tfaddx, tfadtm
      character*160  trkrec (1000)
      common /trkrec/ trkrec
      integer tnewst
      integer toldst
      common /tarbou/ tnewst, toldst
      integer numrcs
      common /numrcs/ numrcs

      data lctrak  /3/

      if (.not. ltonov(lctrak)) then
         go to 1000
      end if

c
c      ask user to pick a track for suppression
c
      abort = .false.
 100  if (abort) goto 200
         if (tnewst .ne. 0) then
             call mesg(1238)
             call pick(ibuttn, segnam, pickid)
             if (ibuttn .ne. 8 .and. ibuttn .ne. qfb(26)) then
                 chkndx = tfaddx - 1
                 if (tfaddx .eq. 0) then
                    tfaddx = numrcs
                 end if
                 found = .false.
                 endlst = .false.
c
c                search list until a segment match is found
c                or the end of the list is reached
c
 150             if (found .or. endlst) goto 175
```

Jul 20 14:11 1989 carr .f Page 60

```
                    chkndx = mod(chkndx,numrcs) + 1
                    chkseg = trkndx(chkndx) + tkoset
                    if (chkseg .eq. segnam) then
                        found = .true.
                    else
                        if (chkndx .eq. tnewst) then
                             endlst = .true.
                         endif
                    endif
                goto 150
 175            continue
c
c               if match is found, then purge that track from the display
c
                if (found) then
                    call supbox(trkrec(trkndx(chkndx)))
                    call jpurge(chkseg)
c
c    turn invisible the box around that plot, and set the
c    boolean flag for this box in boxvis array. (jit)
c

c
c                   show that track is suppressed so that
c                   when tracking is turned from off to on,
c                   this guy won't come back up.
c
                    spprsd(trkndx(chkndx)) = .true.
                    segact(trkndx(chkndx)) = .false.
                endif
            else
                abort = .true.
            endif
        else
            abort = .true.
        endif
      goto 100
 200  continue

 1000 continue

       return
       end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       PLTUNS
C
C FUNCTIONAL DESCRIPTION:          .
C
C CALLED BY:                       TRKCON
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-
```

Jul 20 14:11 1989 carn .f Page 61

```
      subroutine pltuns

c this routine displays all currently visible tracks (all tracks within
c current fade time)
c programmer: avw

      integer           curpos
      integer           lctrak
      integer           ltypov (16)
      integer           numrcs
      integer           segnam
      integer           tfaddx
      integer           tfadtm
      integer           tkoset
      integer           tnewst
      integer           toldst
      integer           trkndx (1000)

      character*9       tfddtg
      character*160     trkrec (1000)

      logical           ltonov (16)
      logical           rankt (26, 16)
      logical           segact (1000)
      logical           spprsd (1000)
      logical           trackn

      common /trkdbc/   trackn
      common /maptoo/   ltypov, ltonov, rankt
      common /numrcs/   numrcs
      common /segact/   segact
      common /spprsd/   spprsd
      common /tarbou/   tnewst, toldst
      common /tfadez/   tfaddx, tfadtm
      common /tfddtg/   tfddtg
      common /tkoset/   tkoset
      common /trkndx/   trkndx
      common /trkrec/   trkrec

      character*2 actmrk(260)
      integer*4 mrkcnt
      integer*4 trklst(260)
      integer*4 curseg(260)
      character*9 boxdtg(260)
      logical boxvis(260)
      common /actmrk/ trklst,mrkcnt,actmrk,curseg,
     +                boxdtg,boxvis

      data lctrak       /3/

      if (trackn) print *,'enter pltuns: tfaddx = ',tfaddx

      if (.not. ltonov(lctrak)) then
         go to 30
      end if
```

Jul 20 14:11 1989 carn .f Page 62

```
        ltonov(lctrak) = .true.
        if (tfaddx .eq. 0) then
           call mesg (1236)
           call paws
           return
        end if

        do 40 i = 1, mrkcnt
           if (boxdtg(i) .ge. tfddtg) then
c              print *, 'i / boxdtg(i) are', i, boxdtg(i)
c              print *, 'curseg(i) is ', curseg(i)
             boxvis(i) = .true.
           endif
   40   continue

        curpos = tfaddx
   10   continue
        if (segact(trkndx(curpos))) then
           call jvisbl (trkndx(curpos)+tkoset, 1)
        else
           segnam = trkndx(curpos) + tkoset
           call seghnd (segnam, trkrec(trkndx(curpos)))
           segact(trkndx(curpos)) = .true.
           spprsd(trkndx(curpos)) = .false.
        end if
        if (curpos .eq. tnewst) then
           go to 20
        else
           curpos = mod (curpos, numrcs) + 1
           go to 10
        end if

   20   continue
   30   continue
c
c    make all boxes visible again if they are within the
c    fade time.
c
c        print *, 'tfddtg is ', tfddtg

        if (trackn) print *,'exit pltuns: tfaddx = ',tfaddx

        return
        end

C+*+*+*+*+*+*+*+*+*+*+*+*+*+*+*+*+*+*+*+*+*+*+*+*+*+*+*+*+*+*+*+*|*+*+*+*+
C UNIT NAME:                    PMAINMN
C
C FUNCTIONAL DESCRIPTION:       .
C
C CALLED BY:                    FMAIN
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*|*-*-*-*-
```

```
      subroutine pmainmn
      return
      end

C+*+*+*+*+*+*+*+*+*+*+*+*+*+*+*+*+*+*+*+*+*+*+*+*+*+*+*+*+*+*+*+*|*+*+*+*+
C* UNIT NAME:                     popst
C*
C* FUNCTIONAL DESCRIPTION:
C*
C*       This subroutine pops a menu number off a stack.
C*
C* INPUT FILES/PARAMETERS:
C*
C*     Global Variables
C*
C*       qmloc           integer; contains the current location in the
C*                                stack
C*       qnextm          integer; contains the number of the next menu
C*                                to be displayed
C*       qstack    integer array; contains menu numbers of previous
C*                                menus displayed
C*
C* OUTPUT FILES/PARAMETERS:
C*
C*       values in global variables above, in particular the new value
C*       placed in the variable qnextm
C*
C* RESTRICTIONS:
C*
C*      The value in the variable qmloc must not be less than the
C*      minimum array size of the array qstack.
C*
C* SUBROUTINES CALLED:
C*
C*       mesg            subroutine; places an appropriate message
C*                                   in the communications area
C*
C* CALLED BY:                    MHAND
C*
C* LOCAL VARIABLES:
C*
C*       no local variables
C*
C* ABNORMAL RETURN CONDITIONS:
C*
C*      A system error will occur if the value in the variable qmloc is
C*      below the minimum array size of the array qstack.
C*
C* LOCATION:
C*
C*       /u2/vcn/a21proto/popst
C*
C* PROGRAMMER:             DATE OF LAST CHANGE:    REASON FOR CHANGE:
C*
```

Jul 20 14:11 1989 carn .f Page 64

```
C* VCNewton                   15 August 1983         initial entry
C*
C-*-*-*-*-*-*-*-*-*-*-*-*-*-*-*-*-*-*-*-*-*-*-*-*-*-*-*-*-*-*-*-*-*-*-*-*-*|*-*-*-*-

      Subroutine POPST

C     This subroutine pops a menu number off a stack.

C        (**Declare common blocks and common block variables**)
         Integer qmloc,qnextm,qstack(10)
C        (**The next 2 lines are coded so the variable qnextm can be**)
C        (**used in this routine, all other variables in the next 2 **)
C        (**lines of code are not used                             **)
         Logical qcancl,qext2m,qretrn,qstmnu
         Common /b1/ qcancl,qext2m,qretrn,qstmnu,qnextm
         Common /b2/ qstack
         Common /b4/ qmloc
C        (**Pop the stack if qmloc is not below the minimum array size*)
c        print*,'POPST -- enter   qmloc = ',qmloc
         If (qmloc .ge. 1) Then
C           (**Set qnextm to the next menu to be displayed**)
            qnextm=qstack(qmloc)
C           (**Simulate popping an item off a stack**)
            qmloc=qmloc - 1
         Else
C           (**When qmloc is too low **)
C           (**Execute system error process**)
            Call MESG(210)
            call paws
C           Exit process storing variables and keeping the current
C           screen for later debugging
         ENDIF
      End


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PROCOV
C
C FUNCTIONAL DESCRIPTION:       .
C
C CALLED BY:                    FDFPRO
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine procov (mparms,ierror,ovfnam,lenovf)
c
c       this subroutine calculates the geographic limits of the current
c       overlay data file
c
        character linsym
        character ch
        logical interr
        common /interr/ interr
        character*80 placen
```

```
      character*(*) ovfnam
      integer*4 lat,lon
      integer*4 marker
      character nsi,ewi
      real mparms(4)
      logical frstim
      character*105 string
      data lunnam/16/
c
      ierror = 0
      frstim = .true.
      open(unit=lunnam,file=ovfnam(1:lenovf),err = 186,
     +  status = 'old')
c
c     print*,'procov -- enter '
      rewind(lunnam)
  100 continue
          call chint (interr,ch)
          if (interr) go to 190
          read(lunnam,10100,err = 182,end=190) linsym,string
10100     format(a1,a105)
c         print*,'procov : ',linsym,string
c         *** ignore comment lines ***
          if (linsym.eq.'c'.or.linsym.eq.'C') go to 100
          read(string,10110,err = 182,end=190)
     +    lat,nsi,lon,ewi,marker,rsize,placen
10110     format(1x,i6,a1,i7,a1,i3,f5.0,1x,a80)
c         insure this is not a blank line
          if (nsi.ne.' ') then

              call lltor (lat,lon,nsi,ewi,plat,plon)

              if (frstim) then
                  frstim = .false.
                  ierror = 0
                  rminla = plat
                  rmaxla = plat
                  rminlo = plon
                  rmaxlo = plon
              else

                  if (plat.lt.rminla) then
                      rminla = plat
                  else if (plat.gt.rmaxla) then
                      rmaxla = plat
                  endif

                  if (plon.lt.rminlo) then
                      rminlo = plon
                  else if (plon.gt.rmaxlo) then
                      rmaxlo = plon
                  endif

              endif

          endif
```

Jul 20 14:11 1989 car .f Page 66

```
            go to 100

  181   continue
            print*,'read error on overlay name file'
            ierror = 2
            go to 190

  182   continue
            print*,'decode error on overlay file'
            ierror = 3
            go to 190

  186   continue
            print*,'open error on overlay file ',ovfnam(1:lenovf)
            ierror = 4

  190   continue

        close (unit=lunnam)
        mparms(1) = rminla
        mparms(2) = rmaxla
        mparms(3) = rminlo
        mparms(4) = rmaxlo
c       print*,'pltovp -- exit',mparms,ierror
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: PROCPO
C
C FUNCTIONAL DESCRIPTION:  DISPLAYS THE NEXT POINT.
C
C INPUT FILES/PARAMETERS:
C
C       NEWSEQ              LOGICAL     INDICATES IF POINT IS PART OF NEW
C                                       SEQUENCE OF POINTS.
C       NEWONS              LOGICAL     INDICATES WHETHER POINT IS ON SCREEN.
C       X                   REAL        X COORDINATE.
C       Y                   REAL        Y COORDINATE.
C
C GLOBAL VARIABLES : NONE.
C
C OUTPUT FILES/PARAMETERS:  NONE.
C
C SUBROUTINES/FUNCTIONS CALLED :
C
C       FPOSIT              POSITIONS POINT X,Y.
C       FDRAWV              DRAWS VECTOR TO X,Y.
C
C CALLED BY:                  GRDLAT, GRDLON
C
C LOCAL VARIABLES: NONE.
C
C RESTRICTIONS: NONE.
```

```
C
C ABNORMAL RETURN CONDITIONS:   NONE.
C
C LOCATION:                     /a21/gjf/MAPSRC.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*|*-*-*-*-

        SUBROUTINE PROCPO (NEWSEQ,NEWONS,X,Y)

C       THIS SUBROUTINE DISPLAYS THE NEXT POINT

        LOGICAL NEWSEQ,NEWONS

        IF (NEWSEQ) THEN

            NEWSEQ=.FALSE.
            CALL FPOSIT(X,Y)

        ELSE

            CALL FDRAWV(X,Y)

        ENDIF

        RETURN
        END

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    prompt
c
c  Functional Description:       Subroutine to display a message and get
c                                 user keyboard input.
c
c  Input Files/Parameters:       N/A
c
c  Output Files/Parameters:      N/A
c
c  Subroutines/Functions Called:
c      mesg                      displays messages in the communica-
c                                 tions area
c      keybd                     gets user's keyboard input (max of 80 chars)
c
c
c  Called By:                    FANNOT, FCHSCA, FOVERL, FSHOWA, GETCMD
C                                LLCENT, RESCON, SAVDIS, SUBCHK
C                                WRITEX, FDFPRO
c
c  Local Variables:
c      maxlen                  integer   maximum length of input wanted
```

```
c                                              (80 or less characters)
c     actlen                   integer   actual length of input recieved
c     msgno                    integer   number of message to be displayed
c     input                    character string of user's keyboard input
c
c  Restrictions: Maximum of 80 characters for string input
c
c  Abnormal Return Conditions:  N/A
c
c  Location:   /a21/dave
c
c  Programmer         Date of Last Change       Reason for Change
c     bam              October 27, 1983
c     dab              September 20, 1984        Apollo modification
c  L McCleary          Jan 1988                sep amp & sys - prompt
c
c  Work still to be done:
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine prompt(msgno,input,maxlen,actlen)
c
c       prompt the user with a message and wait for a response from keyboard
c

        integer qdsdev,qpydev,qecho,qlecho
        common /device/ qdsdev,qpydev,qecho,qlecho

        common/comwdo/qcxmn,qcymn,qcxmx,qcymx
        real      qcxmn,qcymn,qcxmx,qcymx


        character *(*) input
        integer msgno,maxlen,actlen
        logical sys
        common /sysdbc/ sys
c
        if (sys) print*,'prompt -- enter ',msgno,maxlen
        call mesg(msgno)
c --- added by Steve Pierce to force input not to echo over
c     message as requested by Pam. 7/18/85
        call comwin
        call comvpt
c        call jconwv(qcxmn+1.,qcymx - 5.,0.,vx,vy)
        call jconwv(qcxmn+1., 1.5, 0., vx,vy)
        call jpecho (qdsdev,4,qpydev,vx,vy)
c ----
        call keybs(maxlen,input,actlen)
        if (sys) then
            if (actlen.gt.0) print*,'    ',input(1:actlen)
            print*,'prompt -- exit ',actlen
        endif
c
        return
        end
```

Jul 20 14:11 1989 carr .f Page 69

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      PRTMEN
C
C FUNCTIONAL DESCRIPTION:         HANDLES MENU CHOICES FOR HARDCOPY PRINTOUT
C                                 OF FULL SCREEN OR PRESENT DISPLAYS
C
C INPUT FILES/PARAMETERS:
C
C
C OUTPUT FILES/PARAMETERS:        NONE
C
C SUBROUTINES/FUNCTIONS CALLED
C       HILITE               MENU CHOICE HILIGHTER
C       JVPORT               DRAWS NEW VIEWPORT
C       DRAWM                DRAWS MENU
C       JWINDO               CREATES NEW VIEWPORT PARAMETERS
C       MPICK                SUBROUTINE FOR PICKING MENU CHOICES
C       PRINTR               PRINTOUT CREATION/EXECUTION
C       MESG                 MESSAGE DISPLAYER
C
C CALLED BY:                    CHECK
C
C VARIABLES:
C
C        PRTCHOI             TWO ELEMENT ARRAY, FIRST FOR SCREEN DISPLAY
C                                 INDICATION, VALUES ARE:
C                                1 - FOR PRESENT DISPLAY
C                                2 - FOR FULL SCREEN
C                             SECOND FOR PRINTER TYPE, VALUES ARE:
C                                3 - FOR DOT MATRIX
C                                4 - FOR LASER
C                                5 - FOR INK JET
C                                6 TO 8 - FOR CALCOMP PLOTS
C
C RESTRICTIONS:          APOLLO  DEPENDENT SUBROUTINE
C
C     WRITTEN FOR THE CURRENT DEVICE DRIVER OF THE ACT II PRINTER
C     IF CHANGES TO DEVICE DRIVER WILL NEED TO CHANGE SOME PARAMETERS
C     BEING PASSED TO INTCOL AND/OR EXECOM
C
C ABNORMAL RETURN CONDITIONS:   N/A
C
C
C PROGRAMMER:                     DATE OF LAST CHANGE     REASON FOR CHANGE
C
C     RKDISBR                          14/04/87             INITIAL ENTRY
C
C-*-*-*-*-*-*-*-*-*-*-*-*-*-*-*-*-*-*-*-*-*-*-*-*-*-*-*-*-*-*-*-*-*-*-*-*|*-*-*-*-
C
       subroutine prtmen

c       print menu segment

       integer ibuttn,ichoic
       common /commvp/ xllmvp,yllmvp,xurmvp,yurmvp
```

Jul 20 14:11 1989 carm .f Page 70

```
      integer prtchoi(2),hilchoi(2)
      common /prtchoi/ prtchoi
      integer mtable(42),lentab

      common/b1/qcancl,qext2m,qretrn,qstmnu,qnextm
      integer qnextm
      logical qcancl,qext2m,qretrn,qstmnu,error,rflag
      common/b6/qcrmnu
      integer qcrmnu,pmenu,pmsg
      common /pmenu/ pmenu,pmsg
      common /isegn/ isegn
      common /msgold/ msgold,msgonm

      data mtable/0,0,0,0,1,1,0,2,0,0,0,0,3,0,4,0,5,0,0,0,6,0,7,0,8,
     +          0,0,0,9,0,0,0,0,0,0,0,0,0,0,0,0,0/

      data lentab/38/
      data hilchoi/1,3/
      data prtchoi/1,3/
      rflag = .false.

      if(qcrmnu.ne.324) then
         pmenu = qcrmnu
         pmsg = msgonm
      endif

c --- check for previous menu being either the restore display or
c     save display.
c     if so, then the viewport most be cleared of the saved files text
      if (pmenu.eq.20 .or. pmenu.eq.21)
     +   call jvisbl(isegn,0)

      call drawm(324,ierror)

      call jvport (xllmvp,xurmvp,yllmvp,yurmvp)
      call jwindo (0.,17.,1.,43.)

      call hilite (.false.,9,1,lentab,mtable)
      call hilite (.true.,(hilchoi(1)),1,lentab,mtable)
      call hilite (.true.,(hilchoi(2)),1,lentab,mtable)

      ichoic = 1.

  5   if(ibuttn.eq.8.or.ichoic.eq.9.or.
     +    (ibuttn.eq.77.and.qext2m)) goto 6
         call mesg(613)
         call mpick (ichoic,324,ibuttn)

         if(ibuttn.eq.1) then

            if(ichoic.eq.1.or.ichoic.eq.2) then
               prtchoi(1) = ichoic
            endif
            if(ichoic.ge.3.and.ichoic.le.8) then
               prtchoi(2) = ichoic
            endif
```

Jul 20 14:11 1989 carr .f Page 71

```
              if(ichoic.eq.9) then
                 call hilite (.true.,9,1,lentab,mtable)
                 call printr
              endif


             if(prtchoi(2).eq.6.or.prtchoi(2).eq.7.or.prtchoi(2).eq.8)
     +           prtchoi(1) = 2

              if(prtchoi(1).ne.hilchoi(1)) then
                 call hilite (.false.,(hilchoi(1)),1,lentab,mtable)
                 call hilite (.true.,(prtchoi(1)),1,lentab,mtable)
                 hilchoi(1) = prtchoi(1)
              endif
              if(prtchoi(2).ne.hilchoi(2)) then
                 call hilite (.false.,(hilchoi(2)),1,lentab,mtable)
                 call hilite (.true.,(prtchoi(2)),1,lentab,mtable)
                 hilchoi(2) = prtchoi(2)
              endif

           else
c ---         CHECK FOR A RECURSIVE CHOICE OF 'PRINT' IN THE KEY AREA
              if(ibuttn.ne.80) then
                 call check(ibuttn,qcrmnu,error,rflag)
              endif

           endif

        goto 5
    6   continue

c        print*,' choice - ',prtchoi(1),prtchoi(2),ibuttn

        if(ibuttn.eq.8.or.ichoic.eq.9) then
           call jvport (xllmvp,xurmvp,yllmvp,yurmvp)
           call jwindo (0.,17.,1.,43.)
           call drawm(pmenu,ierror)
        endif

        qretrn = .false.

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C* UNIT NAME:                    pushst
C*
C* FUNCTIONAL DESCRIPTION:
C*
C*     This subroutine places a menu number on a stack.
C*
C* INPUT FILES/PARAMETERS:
C*
C*     Global Variables
C*
```

Jul 20 14:11 1989 carn .f Page 72

```
C*       qcrmnu          integer; contains the current menu number
C*       qmxst           integer; contains the size of the qstack array
C*       qmloc           integer; contains the current location in the
C*                                qstack array
C*       qstack    integer array; contains menu numbers of previous
C*                                menus displayed
C*
C*
C* OUTPUT FILES/PARAMETERS:
C*
C*       values in the global variables described above, in particular
C*       the menu value placed on the stack
C*
C* RESTRICTIONS:
C*
C*      The value in the variable qmloc cannot exceed the maximum array
C*      size.
C*
C* SUBROUTINES CALLED:
C*
C*       mesg            subroutine; places an appropriate message
C*                                   in the communications area
C*
C* CALLED BY:                   MHAND
C*
C* LOCAL VARIABLES:
C*
C*       no local variables
C*
C* ABNORMAL RETURN CONDITIONS:
C*
C*      A system error will occur when the value in the variable qmloc
C*      is going to exceed the maximum size of the array qstack.
C*
C* LOCATION:
C*
C*       /u2/vcn/a21proto/pushst
C*
C* PROGRAMMER:              DATE OF LAST CHANGE:    REASON FOR CHANGE:
C*
C*  VCNewton                   15 August 1983         initial entry
C*
C-*-*-*-*-*-*-*-*-*-*-*-*-*-*-*-*-*-*-*-*-*-*-*-*-*-*-*-*-*-*-*-*-*-*-*-*|*-*-*-*-

      Subroutine PUSHST

C     This subroutine places a menu number on a stack.

C        (**Declare common blocks and common block variables**)
         Integer qcrmnu,qmxst,qmloc,qstack(10)
         Common /b2/ qstack
         Common /b4/ qmloc
         Common /b6/ qcrmnu
         Common /b7/ qmxst
C        (**Insure qmloc is not going to exceed max array size**)
         If (qmloc .lt. qmxst) then
```

Jul 20 14:11 1989 carr .f Page 73

```
C           (**Simulate pushing an item on a stack**)
            qmloc=qmloc + 1
            qstack(qmloc)=qcrmnu
         Else
C           (**Execute system error process**)
            Call MESG(209)
            call paws
C           EXIT PROCESS STORING VARIABLES AND KEEPING THE CURRENT
C           SCREEN FOR LATER DEBUGGING
         Endif
      End

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    putamp
c
c  Functional Description:
c       writes up to 4 lines of info into amp area
c
c  Input Files/Parameters:
c
c  Output Files/Parameters: N/A
c
c  Subroutines/Functions Called:
c
c  Called By:                    DRWAMP
c
c  Local Variables: N/A
c
c  Restrictions: N/A
c
c  Abnormal Return Conditions:  N/A
c
c  Location:
c
c  Programmer       Date of Last Change     Reason for Change
C  L. McCleary      Jan 1988                separate amp & sys - putamp
c
C-*-*-*-*-*-*-*-*-*-*-*-*-*-*-*-*-*-*-*-*-*-*-*-*-*-*-*-*-*-*-*-*-*-*-*-*|*-*-*-*-
c
      subroutine putamp(amptxt,ampcnt)
c
c  this subroutine writes up to 4 lines of data into amp area
c
      character*72 amptxt(4),line
      integer ampcnt,ampseg
      integer tmpcnt
c      character * 40 fixdat
      real x,y
      real yincr

      common /compic/xllpic,yllpic,xurpic,yurpic,ibcpic,iocpic
      common/ampprm/ampseg

c      print*,'putamp -- enter-amptxt',amptxt
c
```

Jul 20 14:11 1989 carr .f Page 74

```
c      fixdat = ' '
      x = xllpic + 1.
c      yincr = (yurpic - yllpic)/(ampcnt+1) + .05
      yincr = 1.
      y= yurpic - (2*yincr)
      do 110 tmpcnt = 2,ampcnt
           line = amptxt(tmpcnt)
           call lngth(line,72,length)
           CALL JMOVE(x,y)
           CALL J1STRG(line(1:length))
           y = y - yincr
           if (y.lt.0.01) y = 0.01
 110  continue
c      print*,'putamp - exit'
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   PUTARC
C
C FUNCTIONAL DESCRIPTION:      .
C
C CALLED BY:                   APARCS
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine putarc(a0,a1,a2,centrx,centry,rad)

c       This routine uses the parameters passed to draw one
c         arc.
c    VARIABLES:
c       a0,a1,a2- angles of the arc
c       centrx,centry- center point of arc
c       rad- radius of arc
c   PROGRAMMER:  Nancy Detrich, A215, March, 1984
C------  MODIFIED BY A692 FOR COMPLETION


        real a0,a1,a2,centrx,centry,rad

        if (((a0.le.a2).and.(a2.le.a1)).or.((a1.le.a2).and.
     +           (a2.le.a0))) then
          call jarc (centrx, centry,0.0, rad, 0, a1, a0)
        else
          if (a0.lt.a1)then
            call jarc(centrx,centry,0.0,rad,0,a1,a0+360)
          else
            call jarc(centrx,centry,0.0,rad,0,a1+360,a0)
          endif
        endif
        return
        end
```

Jul 20 14:11 1989 carm .f Page 75

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      PUTWRD
C
C FUNCTIONAL DESCRIPTION:         .
C
C CALLED BY:                      CALCPR, DECDET, DECSCA, ERASES, INCDET,
C                                 INCSCA, INQSTA, MAJORS, MINORS,
C                                 SCENTE, SETSCA, SPROJE, SSCALE
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine putwrd
c
c       this subroutine goes back to the previous command word
c       *** note - this can be used only once in its current form ***
c
        logical eol,eoc
        common /comnds/ lenl,indxw,lenw,eol,eoc
        common /oldwrd/ indxwo,lenwo
c
c       print*,'putwrd -- enter',indxw,lenw
        indxw = indxwo
        lenw = lenwo
c       print*,'putwrd -- exit',indxw,lenw
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     rbound

c  Functional Description:
c       this subroutine reads screen boundary parameters
c
c  Input Files/Parameters:

c  Output Files/Parameters: N/A

c  Subroutines/Functions Called:

c  Called By:                     FMAIN, RESCON

c  Local Variables: N/A

c  Restrictions: N/A

c  Abnormal Return Conditions:  N/A

c  Location:       /a21/dave

c  Programmer        Date of Last Change       Reason for Change
```

Jul 20 14:11 1989 carn .f Page 76

```
C-*-*-*-*-*-*-*-*-*-*-*-*-*-*-*-*-*-*-*-*-*-*-*-*-*-*-*-*-*-*-*-*-*-*-*-*|*-*-*-*-

      subroutine rbound (len,name)

c     this subroutine reads screen boundary parameters

      common /overly/ overtb
      logical overtb(16)
      character*16 chastr
      character*(*) name
      character*50 filenm
      common /comscr/btbscr(4)
      common /commen/btbmen(4),ibcmen,iocmen,incmen
      common /comleg/btbleg(4),ibcleg,iocleg
      common /combox/btbbox(4),ibcbox,iocbox
      common /comsys/btbsys(4),ibcsys,iocsys
      common /comgra/btbgra(4),ibcgra,iocgra
      common /comkey/btbkey(4),ibckey,iockey
      common /comamp/btbamp(4),ibcamp,iocamp
      common /comwor/btbwor(4),ibcwor,iocwor
      logical areaon(16)
      common /areaon/ areaon
      logical sys
      common /sysdbc/ sys
      data ifl/9/,irdwr/0/

      if (sys) print*,'Enter rbound ',len,name
      filenm = name(1:len) // '.bou'
      call openit (filenm,len+4,ifl,irdwr,ierror)
      if (ierror.ne.0) then
          call openit ('default.bou',11,ifl,irdwr,ierror)
      endif
      if (ierror.eq.0) then
          call readre (ifl,btbscr,4,ierror)
          call readre (ifl,btbmen,4,ierror)
          call readre (ifl,btbleg,4,ierror)
          call readre (ifl,btbsys,4,ierror)
          call readre (ifl,btbgra,4,ierror)
          call readre (ifl,btbkey,4,ierror)
          call readre (ifl,btbamp,4,ierror)
          call readre (ifl,btbwor,4,ierror)
          call readch (ifl,chastr,lench,ierror)
          call asclog(areaon,16,chastr)
          close (ifl)
          call calgvp
      else
          print*,'rbound -- Problem reading parameter file ',
     +    name(1:len),len
      endif
      do 110 i=1,4
          btbbox(i) = btbleg(i)
110   continue

      return
      end
```

```
C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    RCOLOR
C
C FUNCTIONAL DESCRIPTION:       .
C
C CALLED BY:                    FMAIN, RESCON
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine rcolor (len,name)

c       this subroutine reads color values and loads the color table

        character*(*) name
        character*50 filenm
        dimension iclval (6)
        integer coltab(256)
        integer qdsdev,qpydev,qecho,qlecho
        common /device/ qdsdev,qpydev,qecho,qlecho
        common /coltab/ coltab
        equivalence (index,iclval(1)),(istrt,iclval(2)),
     +  (ihue,iclval(3)),(isatur,iclval(4)),(light,iclval(5)),
     +  (icnsec,iclval(6))
        data ifl/9/,irdwr/0/

c       print*,'Enter rcolor ',len,name
        filenm = name(1:len) // '.col'
        ierror = 0
c       set up the default value
        do 10 i = 0,255
            coltab(i+1) = 3
 10     continue
        call openit (filenm,len+4,ifl,irdwr,ierror)
        if (ierror.ne.0) then
            call openit ('default.col',11,ifl,0,ierror)
        endif
        if (ierror.eq.0) then
            REWIND ifl
  160       continue
                call readin (ifl,iclval,6,ierror)
c  Map the proper values into the coltab array this array is
c  later used by xcolor to call jcolor with the proper color

                do 162 indx = 1,icnsec
                   coltab(istrt+indx) = index + indx - 1
 162            continue

c               print*,' rcolor -- ',iclval,ierror
                if (ierror.ne.0) go to 170
                hue = ihue
                satur = isatur
                rlight = light
                isatur = satur/100.*32767.
```

Jul 20 14:11 1989 carr .f Page 78

```
                light = rlight/100.*32767.
c               print*,'calling jcotbl :',istrt,ihue,isatur,light,
c    +                  index,qdsdev

c consec  consecutive locations are loaded
c into the color table
                do 165 indx=index,index + icnsec - 1
                   call jcotbl (qdsdev,1,indx,ihue,isatur,light)
                   call hlssav (indx,hue,rlight,satur)
 165            continue
                go to 160
  170       continue
            call closit (ifl)
        else
            print*,'Error on color file read'
c           call derror(30,'Problem reading color paramet.',.true.,5,ch)
        endif
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    rconfg

c  Functional Description:
c       this subroutine reads system configuration parameters
c
c  Input Files/Parameters:

c  Output Files/Parameters: N/A

c  Subroutines/Functions Called:

c  Called By: fmain

c  Local Variables: N/A

c  Restrictions: N/A

c  Abnormal Return Conditions:  N/A

c  Location:      /a21/dave

c  Programmer          Date of Last Change        Reason for Change
c  L McCleary          Jan 1988               sep amp & sys - rconfg
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine rconfg (len,name)

c       this subroutine reads system configuration parameters

        character*(*) name
        character*50 filenm
        integer fntab(17)
        common /fntab/ fntab
```

Jul 20 14:11 1989 carn .f Page 79

```
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
      integer detail(6)
      common /detail/ detail
      logical sys
      common /sysdbc/ sys
      common /scratr/qbox,qbkgrd
      integer qbox,qbkgrd
      common /combox/xllbox,yllbox,xurbox,yurbox,ibcbox,iocbox
      common /commen/xllmen,yllmen,xurmen,yurmen,ibcmen,iocmen,incmen
      common /comleg/xllleg,yllleg,xurleg,yurleg,ibcleg,iocleg
      common /comsys/xllsys,yllsys,xursys,yursys,ibcsys,iocsys
      common /comgra/xllgra,yllgra,xurgra,yurgra,ibcgra,iocgra
      common /comkey/xllkey,yllkey,xurkey,yurkey,ibckey,iockey
      common /compic/xllpic,yllpic,xurpic,yurpic,ibcpic,iocpic
      common /comamp/xllamp,yllamp,xuramp,yuramp,ibcamp,iocamp
      integer scrcol(2)
      data ifl/9/,irdwr/0/

      if (sys) print*,'Enter rconfg ',len,name
      filenm = name(1:len) // '.cfg'
      call openit (filenm,len+4,ifl,irdwr,ierror)
      if (ierror.ne.0) then
          call openit ('default.cfg',11,ifl,0,ierror)
      endif
      if (ierror.eq.0) then
          call readin (ifl,ltyptb,16,ierror)
          if (ierror.ne.0) print*,'Error reading line types',ltyptb
          call readin (ifl,fntab,17,ierror)
          if (ierror.ne.0) print*,'Error reading fntab',fntab
          do 100 i=1,6
             detail(i) = 0
100       continue
          do 110 i=1,17
              if(fntab(i).eq.1) then
                   detail(1) = 1
              else if(fntab(i).eq.2) then
                   detail(2) = 1
              else if(fntab(i).eq.3) then
                   detail(3) = 1
              else if(fntab(i).eq.4) then
                   detail(4) = 1
              else if(fntab(i).eq.5) then
                   detail(5) = 1
              else if(fntab(i).eq.6) then
                   detail(6) = 1
              endif
110       continue
          call readin(ifl,scrcol,2,ierror)
          if (ierror.ne.0) print *,'RCONFG error reading scrcol',scrcol
          qbox = scrcol(1)
          iocbox = scrcol(1)
          iocmen = scrcol(1)
```

Jul 20 14:11 1989 carr .f Page 80

```
              iocleg = scrcol(1)
              iocsys = scrcol(1)
              iocgra = scrcol(1)
              iockey = scrcol(1)
              iocpic = scrcol(1)
              iocamp = scrcol(1)
              qbkgrd = scrcol(2)
              ibcbox = scrcol(2)
              ibcmen = scrcol(2)
              ibcleg = scrcol(2)
              ibcsys = scrcol(2)
              ibcgra = scrcol(2)
              ibckey = scrcol(2)
              ibcpic = scrcol(2)
              ibcamp = scrcol(2)
              call closit (ifl)
          else
              print*,'Error in configuration file'
c             call derror(30,'Problem reading configur. file',.true.,5,ch)
          endif

          return
          end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    readch

c  Functional Description:
c       this subroutine reads from ifl in character format
c
c  Input Files/Parameters:

c  Output Files/Parameters: N/A

c  Subroutines/Functions Called:

c  Called By:                    LOADIC, RBOUND, RPARAM, RPATHS, RSAVPR

c  Local Variables: N/A

c  Restrictions: N/A

c  Abnormal Return Conditions:  N/A

c  Location:       /a21/dave

c  Programmer          Date of Last Change        Reason for Change
C-*-*-*-*-*-*-*-*-*-*-*-*-*-*-*-*-*-*-*-*-*-*-*-*-*-*-*-*-*-*-*-*-*-*-*-*-*-*|*-*-*-*-

          subroutine readch (ifl,charar,lenr,ierror)

c         this subroutine reads from ifl in character format

          character*(*) charar
```

```
        ierror = 0
        maxlen = len(charar)
        if (maxlen.gt.100.or.maxlen.le.0) then
            print*,'readch -- invalid length of character string '
     +      ,maxlen,'  ',charar
            maxlen = 100
        endif
        read(ifl,*,end=199,err=199) charar (1:maxlen)
        call length (charar,maxlen,lenr)
        go to 200
  199       continue
            ierror = 2
c           call derror(30,'Problem reading parameter     ',.true.,5,ch)
  200   continue
c       print*,'Readch --  : ',lenr,ierror,charar(1:lenr),maxlen

        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     READEL
C
C FUNCTIONAL DESCRIPTION:         .
C
C CALLED BY:                      PLTOVP, READML
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine readel(string,flatlon)
c
c  this routine reads the overlay or df file for an ellipse line and returns
c  its associated values for printing
c
      character * 105 string
      character*16 flatlon

c      print*,'readel -- enter'
      read(string,120,err = 200)flatlon
120   format(a16)
      goto 225
200   print*,'error in reading ellipse line in readel'
225   continue
c      print*,'readel -- exit-lat/lon:',flatlon
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     READEM
C
C FUNCTIONAL DESCRIPTION:         .
C
```

Jul 20 14:11 1989 carn .f Page 82

```
C CALLED BY:                    GETARC, GETCIR, GETPTS
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine readem(ifl,iarray,len,ierror)

c       this subroutine reads from ifl in integer format (I3)
c    VARIABLES:
c       ifl- logical unit number of the file to be accessed
c       iarray- array holding record just read in
c       len- number of positions to be read in
c       ierror- integer flag set if error during read
c   PROGRAMMER:  Nancy Detrich, A215, March, 1984


        integer iarray(*)

        ierror = 0
        read(ifl,1100,end=199,err=199) (iarray(i),i=1,len)
 1100   format(100i3)
        go to 200
  199       continue
            ierror = 2
  200   continue
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   readin

c  Functional Description:
c       this subroutine reads from ifl in integer format (I5)
c
c  Input Files/Parameters:

c  Output Files/Parameters: N/A

c  Subroutines/Functions Called:

c  Called By:                   BSTMAP, RCOLOR, RCONFG, RPARAM, RSAVPR

c  Local Variables: N/A

c  Restrictions: N/A

c  Abnormal Return Conditions:  N/A

c  Location:       /a21/dave

c  Programmer         Date of Last Change       Reason for Change

C-*-*-*-*-*-*-*-*-*-*-*-*-*-*-*-*-*-*-*-*-*-*-*-*-*-*-*-*-*-*-*-*-*-*-*-*-*-*-*|*-*-*-*-
```

```
Jul 20 14:11 1989  carr   .f Page 83

        subroutine readin (ifl,iarray,len,ierror)

c       this subroutine reads from ifl in integer format (I5)

        integer iarray(*)

        ierror = 0
        read(ifl,*,end=198,err=199) (iarray(i),i=1,len)
c       read(ifl,1100,end=198,err=199) (iarray(i),i=1,len)
c1100   format(<len>i5)
        go to 200
  198       continue
            ierror = 1
            go to 200
  199       continue
            ierror = 2
c           call derror(30,'Problem reading parameter     ',.true.,5,ch)
  200   continue
c       print*,'Readin -- iarray,len,ierror : ',(iarray(i),i=1,len),len
c    +      ,ierror

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       READML
C
C FUNCTIONAL DESCRIPTION:          .
C
C CALLED BY:
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine readml(string, exit)

c  this routine interprets the string of characters read from check_mail or
c  check_mail_cond.  The interpretation of the string is based on the value
c  of the first field, "type".

      character * 1024 string
      logical exit
      character * 1  type
      character * 13 msgnum
      character * 5  source
      character * 5  dest
      character * 1  input
      character * 1  action
      character * 3  length
      character * 995 data
      character * 120 buffer
      logical eliflag
      integer ilen,dlen
      integer*2 numb
```

```
      character * 80 mbxfil
      character*16 flatlon,blatlon(30)
      character * 120 fixdat
      integer lctrak
      integer ierror
      character linsym
      character*6 filedf
      character*105 text
      integer lcover, lcdf
      integer*4 lenovf
      character*80 ovfnam
      common /ovfnam/ ovfnam
      common /lenovf/ lenovf
      character*12 mapcho
      integer mflen
      common /mapcho/mapcho,mflen
      logical mdraw,ovdraw
      common /mapdat/ mdraw,ovdraw
      integer trakfd
      logical BEGTRK
      common /TRACK/ trakfd,BEGTRK
      logical mailfl(6)
      integer prtchoi(2)
      common /prtchoi/ prtchoi
      common/mlflag/mailfl
      logical mrkll
      common/mrkll/mrkll
c     map parameters
      logical lton(16),dotem
      integer ipgrid(4),ltyptb(16)
      common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
      data lcover /1/
      data lctrak /3/
      data lcdf   /2/
      data lunnam /19/
      data lundef /30/
      data trakfd /90/
      data filedf /'df.dat'/
      data mailfl /6*.false./

      exit = .false.
      mdraw = .true.
      eliflag = .false.
      read(string,100,err=200) type
100   format(a1)
      if(type .eq. 'D') then
           read(string,110,err=200) msgnum,source,dest,
     +                  input,action,length,data
110        format(1x,a13,a5,a5,a1,a1,a3,a995)
           ilen = (ichar(length(1:1))-48) * 100
           ilen = ilen + (ichar(length(2:2))-48) * 10
           ilen = ilen + (ichar(length(3:3))-48)
c
c******-----------------------------------------------------------------------
```

```
c          actions are as follows:
c            A:  Plot df or overlay data
c            B:  Begin interactive NSAgraph session
c            C:  Plot and print df data
c            D:  Display best stored map for a given lat/lon and mark that pt.
c            E:  Process ffix and display df data
c            F:  Track overlay data from an input file on a fixed map
c******-----------------------------------------------------------------------

           if(action .eq. 'A' .or. action .eq. 'C' .or.
     +        action .eq. 'E') then
               if(input .eq. 'F') then
                   mbxfil = data
                   dlen = len(mbxfil)
                   if (dlen .gt. 0) then

c                           -----------------------------------
c                           open the file sent in MBX message
c                           -----------------------------------

c
c---------if raw df data, process the ffix using nsagraph ffix routine,
c---------then put up map
c
                            if(action .eq. 'E') then
                                call procdf (dlen,mbxfil,ierror)
c
c--------------procdf puts processed data into 'df.dat' for display
c--------------let mbxfil eq 'df.dat' inorder to extract the ellipse fix
c
                                 ilen = 6
                                 mbxfil(1:ilen) = 'df.dat'
                            endif
                            open(unit=lunnam,file=mbxfil,
     +                      err = 200,status = 'old')

c                           ------------------------------------
c                           read each line of ov file to pull out fix pt.
c                           ------------------------------------

                            numb=1
  120                       continue
                                 read(lunnam,121,end=122,err=200)
     +                                 linsym,text
  121                            format(a1,a105)

c-------------check for ellipse line -- if more than one ellipse is in file
c-------------then revert to world map by sending bstmap 0/0 for lat/lon.

                                 if (linsym.eq.'e'.or.linsym.eq.'E')then
                                       if(eliflag) then
                                           flatlon = '0000000n0000000e'
                                           goto 122
                                       else
                                           call readel(text,flatlon)
                                       endif
```

Jul 20 14:11 1989 carr .f Page 86

```
                                  eliflag = .true.
                            elseif
     +                      (linsym.eq.'b'.or.linsym.eq.'B')then
                                  call readel(text,blatlon(numb))
                                  numb=numb+1
                            endif
                            goto 120
  122                 continue
                      numb=numb-1
c                     ---------------------------------------------------
c                     calc and put up best stored map to display this FFIX
c                     ---------------------------------------------------
c
c-------------if no ellipse is found, revert to world map.
c
                      if(.not. eliflag) then
                            flatlon = '0000000n0000000e'
                      endif
                      call bstmap(flatlon,blatlon,numb,mapcho,mflen)
c                      call recall(mflen,mapcho)

c------------if raw df data has been processed,(action E) procdf puts data
c------------into 'df.dat' file
c------------therfore, no transfer of data is necessary.  Otherwise...

                      if(action .ne. 'E') then
                           open(unit=lundef,file=filedf(1:6),
c     +                        err = 200,status = 'overwrite')
     +                       err = 200,status = 'old')

c     ---------------------------------------------------
c     read the df data from the sent input file and
c     write the df data into df.dat file
c     ---------------------------------------------------
                           REWIND lunnam
 125                       continue
                              read(lunnam,130,end=140) buffer
 130                          format(a120)
                              write(lundef,130) buffer
                              goto 125
140                        continue
                           close(unit=lundef)
                           close(unit=lunnam)
c    ---------------------------------------------------
c    move any co-located sites so that txt is readable on map
c    ---------------------------------------------------
                           call mvtext(filedf,6)
                      endif
c                 ------------------------------------------
c                 display df data on map and turn df ftr on
c                 ------------------------------------------
c                      call drwftr(lcdf)
                      if(action .eq. 'A') then
                           lton(lcover) = .true.
                           mailfl(2) = .true.
                      else if (action .eq. 'E') then
```

```
                              lton(lcdf) = .true.
                              mailfl(2) = .true.
                         else if(action .eq. 'C') then
                              lton(lcover) = .true.
                              mailfl(2) = .true.
                              mailfl(5) = .true.
c                              call mptxpr(mbxfil,ilen)
                              exit = .true.
                         endif
                    endif
                else
                    print*,'this input not avail ',input
                endif
          else if (action .eq. 'B' ) then
                print*,'interactive mode'
          else if (action .eq. 'D' .or. action .eq. 'F') then
                if(input .eq. 'M') then

c               ------------------------------------------------------
c               display best saved map for requested pt and show pt w/ "*"
c               ------------------------------------------------------

                     if(action .eq. 'D') then
                       read(string,150,err=200) flatlon
150                    format(29x,a16)
                       call bstmap(flatlon,blatlon,numb,mapcho,mflen)
                       fixdat = '* LAT/LON: '//flatlon
                       fixdat = ' '
                       mrkll = .true.
c                ------------------------------------------------------
c                tracking data has been sent; plot this line of it on map
c                ------------------------------------------------------
c       the tracking option has not been implemented because DFAC
c       has no requirement for this option any longer

                     else if (action .eq. 'F') then
c ---- begin tracking ----
c                          if(BEGTRK) then
c                              call recall(7,'default')
c                              open(unit=trakfd,file='track.1',
c     +                        err = 200,status = 'overwrite')
c                              lton(lctrak) = .true.
c                              BEGTRK = .false.
c                          endif
c                          read(string,160,err=200) fixdat
c160                       format(29x,a20)
c                          call trakpt(fixdat,lton(lctrak))
                     endif
                else
                    print*,'this input not avail ',input
                endif
          else
                print*,'this action not avail. ',action
          endif
     else
          print*,'this type not avail. ',type
```

```
Jul 20 14:11 1989  carn   .f Page 88

      endif
      goto 210

200   print*,'error in opening mail string - in readml'

210   continue

      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    readre

c  Functional Description:
c       this subroutine reads from ifl in real format
c
c  Input Files/Parameters:

c  Output Files/Parameters: N/A

c  Subroutines/Functions Called:

c  Called By:                    BSTMAP, RBOUND, RPARAM

c  Local Variables: N/A

c  Restrictions: N/A

c  Abnormal Return Conditions:  N/A

c  Location:      /a21/dave

c  Programmer        Date of Last Change       Reason for Change

C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine readre (ifl,rarray,len,ierror)

c       this subroutine reads from ifl in real format

        real rarray(*)

c       print*,'Enter readre ',len
        ierror = 0
        read(ifl,*,end=199,err=199) (rarray(i),i=1,len)
c       read(ifl,1100,end=199,err=199) (rarray(i),i=1,len)
c1100   format(4f12.5)
        go to 200
  199       continue
            ierror = 2
          print*,'Error on Readre read',len,rarray(1)
c           call derror(30,'Problem reading parameter     ',.true.,5,ch)
  200   continue
c       print*,'Readre -- rarray,len,ierror : ',(rarray(i),i=1,4),len,ierror
```

```
Jul 20 14:11 1989  carn   .f Page 89

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    redraw
c
c  Functional Description:
c     redraw all retained segments on screen (using jframe)
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                    RPLSCN, SUBCHK
c
c  Local Variables: N/A
c
c  Restrictions: N/A
c
c  Abnormal Return Conditions:  N/A
c
c  Location:      /a21/dave
c
c  Programmer         Date of Last Change       Reason for Change
c  L McCleary         Jan 1988                  'BATCH' fix - redraw
c
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine redraw

c     redraw all retained segments on screen (using jframe)

      logical sys,batch
      common /sysdbc/ sys
      common /batdbc/ batch

      if (sys) print*,'redraw -- enter '
      if (batch) then
         call jenbat
         call jbgbat (0)
      else
         call jframe
      endif
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     REDRCT
C
C FUNCTIONAL DESCRIPTION:        .
C
```

Jul 20 14:11 1989 carr .f Page 90

```
C CALLED BY:                      APRECT
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine redrct(xarray,yarray,start)

c       redraws a rectangle, given the top left, top right, bottom left,
c        and bottom right points in that order
c      VARIABLES:
c       start- the starting position in the array for that rectangle
c          (not implemented)
c       xarray/yarray- holds points for rectangles
c   PROGRAMMER:  Nancy Detrich, A215, March, 1984


        integer start
        real xarray(*),yarray(*)

        call jmove(xarray(start),yarray(start))
        call jdraw(xarray(start+1),yarray(start+1))
        call jdraw(xarray(start+3),yarray(start+3))
        call jdraw(xarray(start+2),yarray(start+2))
        call jdraw(xarray(start),yarray(start))
        return
        end

C+*+*+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       REDRLN
C
C FUNCTIONAL DESCRIPTION:          .
C
C CALLED BY:                       APLINE, APSMOO
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine redrln(xarray,yarray,numpts)

c       This routine draws a line connecting the points passed
c         in the arrays.
c      VARIABLES:
c        xarray/yarray- points to be used for line
c        numpts- number of points in the arrays
c   PROGRAMMER:  Nancy Detrich, A215, March, 1984


        real xarray(*),yarray(*)
        integer numpts

        call jmove (xarray(1),yarray(1))
        call jpoly (xarray(2),yarray(2),numpts-1)
c       do 100 i = 1,numpts-1
```

Jul 20 14:11 1989 carr' '.f Page 91

```
c         call jmove (xarray(i),yarray(i))
c         call jdraw (xarray(i+1),yarray(i+1))
c 100   continue
       return
       end

C+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    REDRMK
C
C FUNCTIONAL DESCRIPTION:       .
C
C CALLED BY:                    APMARK
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

       subroutine redrmk (mkrtyp,count,xarray,yarray)

c      This routine draws markers at the points in the x and
c       yarray.
c       The marker displayed is controlled by the mkrtyp passed
c       which is used for the DI-3000 call--the normal markers
c       of DI-3000 are used.
c    VARIABLES:
c       xarray/yarray- coordinates for placing markers
c       mkrtyp- the DI-3000 marker to be displayed
c       count- number of markers to be displayed
c   PROGRAMMER:  Nancy Detrich, A215, March, 1984


       real xarray(*),yarray(*)
       integer mkrtyp,count

       call jcmark(mkrtyp)
       call jpmark (xarray,yarray,count)
c      do 70 i = 1,count
c        call jmark(xarray(i),yarray(i))
c  70  continue
       return
       end

C+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    REINIP
C
C FUNCTIONAL DESCRIPTION:       .
C
C CALLED BY:                    MHAND
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

       subroutine reinip
```

Jul 20 14:11 1989 carn .f Page 92

```
c       reinitialize variables after returning to main menu if necessary
c       (If inipic is called, the map will be erased)

c       call inipic

        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     REMOVF
C
C FUNCTIONAL DESCRIPTION:        .
C
C CALLED BY:                     STATEC
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine removf
c
c       this subroutine removes a feature from current map
c

        common /states/ nextst
        logical isfeat
        common /indpar/ indpro,indftr
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        integer color

c        print*,'removf -- enter'
        call getwrd
        if (isfeat()) then
            if (LTON(indftr)) then
               color = LTYPTB(indftr)
               LTYPTB(indftr) = 24
               call drwftr(indftr)
               LTYPTB(indftr) = color
               LTON(indftr) = .false.
            endif
c           print*,'removf -- exit'
        endif
        nextst = 1
        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                          rename
c
```

Jul 20 14:11 1989 carr .f Page 93

```
c  Functional Description:              Move one file into another.
c
c  Input Files/Parameters:
c     Parameters
c       Name    Type   Description
c       ----    ----   -----------
c       oldnam  ch*50  File to be renamed.
c       newnam  ch*50  New name to give file.
c
c  Output Files/Parameters:     N/A
c
c  Subroutines/Functions Called:
c       Name    Description
c       ----    -----------
c       copyfl  Copy old file to new file.
c
c
c  Called By:
c
c  Local Variables:             N/A
c
c  Restrictions:                N/A
c
c  Abnormal Return Conditions:  N/A
c
c  Location:
c
c       Programmer      Date of Last Change     Reason for Change
c       ----------      -------------------     -----------------
c       sfw             8-Nov-1984              Restructuring and documentation.
c
c
c  Work still to be done:
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine rename( oldnam, newnam, ierr )

        integer ierr
        character *50 oldnam, newnam

c       Call copyit to make copy of original and delete then delete it.
        call copyfl( oldnam, newnam, 'delete', ierr )

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ROTPTS
C
C FUNCTIONAL DESCRIPTION:       .
C
C CALLED BY:                    APARCS, APCIRC, APFILL, APLINE,
C                               APMARK, APRECT, APSMOO
C
```

Jul 20 14:11 1989 carr .f Page 94

```
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine rotpts(xarray,yarray,npts)
C------  PROGRAMMED BY DIRK BUTSON OF A692 FOR COMPLETION

      real xarray(*),yarray(*)
      integer npts
      common /chgit/ mirflg,xscale,yscale,xoffst,yoffst,rotang
        real xscale,yscale,rotang
        integer xoffst,yoffst,mirflg

      if (rotang .ne. 0) then
         do 100 i = 1,npts
            x = xarray(i) * cos (rotang) + yarray(i) * sin (rotang)
            y = - xarray(i) * sin (rotang) + yarray(i) * cos (rotang)

            xarray(i) = x
            yarray(i) = y

clj ------- The following values used to offset the x and y
clj ------- positions are being used to prevent the rotation
clj ------- from changing the position of the symbol.

c           if (rotang.gt.0 .and. rotang.le.0.7854) then
c              xarray(i) = x
c              yarray(i) = y
c           elseif (rotang.gt.0.7854 .and. rotang.le.2.3562) then
c              xarray(i) = x
c              yarray(i) = y
c           elseif (rotang.gt.2.3562 .and. rotang.le.3.927) then
c              xarray(i) = x
c              yarray(i) = y
c           elseif (rotang.gt.3.927 .and. rotang.le.5.4978) then
c              xarray(i) = x
c              yarray(i) = y
c           else
c              xarray(i) = x
c              yarray(i) = y
c           endif
cmbb              xarray(i) = x - 45
cmbb              yarray(i) = y - 45
100      continue
      endif
      return
      end

C+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    rparam

c  Functional Description:
c       this subroutine reads map parameters
c
c  Input Files/Parameters:
```

Jul 20 14:11 1989 carr .f Page 95

```
c  Output Files/Parameters: N/A

c  Subroutines/Functions Called:

c  Called By:                    FMAIN, RECDIS, RESCON

c  Local Variables: N/A

c  Restrictions: N/A

c  Abnormal Return Conditions:  N/A

c  Location:       /a21/dave

c  Programmer         Date of Last Change       Reason for Change

C-*-*-*-*-*-*-*-*-*-*-*-*-*-*-*-*-*-*-*-*-*-*-*-*-*-*-*-*-*-*-*-*-*-*-*-*|*-*-*-*-

        subroutine rparam (lennam,name,dataon,ierror)

c       this subroutine reads map parameters

        character*6 curwdb
        common /curwdb/ curwdb
        common /lenwdb/ lenwdb
        common /tablet/ inpdev
        character*(*) name
        logical dataon
        character*50 filenm
        character*17 chastr
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        common /conic/ spll1,spll2,tranl,trank,tranr,tscale,pole,tilt
        common /oblm/ polat,polon,az,azlat,gamma,xshift
        dimension ltypov(16)
        logical ltonov(16),rankt(26,16)
        common /maptoo/ ltypov,ltonov,rankt
        CHARACTER NSI,EWI
        real retabl(4)
        integer intabl(17)
        character*50 classi
        common /classi/ classi
        common /lencla/ lencla
        logical overtb(16)
        common /overly/ overtb
        character*80 ovfnam
        common /ovfnam/ ovfnam
        common /lenovf/ lenovf
        logical sys
        common /sysdbc/ sys
        logical filply,opnply
        common / polycb / filply,opnply
```

Jul 20 14:11 1989 carr .f Page 96

```
        data iversn/7/
        DATA IDLA,IMLA,IDLO,ISLO/65,0,85,0/NSI,EWI/'N','E'/
c       convert minutes to radians by multiplying by CM2RAD
        DATA CM2RAD/2.908882087E-4/
        data ifl/9/,irdwr/0/

        if (sys)
     +  print*,'Enter rparam ',lennam,name,xrad,yrad,xc,yc

c
c       set up all overlay colors
c
        do 100 i = 1,16
            ltypov(i) = 152
100     continue
        CLAT=(IDLA*60+IMLA)*CM2RAD
        IF(NSI.EQ.'S') CLAT=-CLAT
        CLON=(IDLO*60+IMLO)*CM2RAD
        IF(EWI.EQ.'W') CLON=-CLON
        filenm = name(1:lennam) // '.prm'
        call openit (filenm,lennam+4,ifl,irdwr,ierror)
        if (ierror.ne.0) then
c           print*,'Error on open - using default'
            call openit ('default.prm',11,ifl,irdwr,ierror)
            if (ierror.ne.0) go to 150
        endif
        call readin (ifl,jversn,1,ierror)
        if (ierror.ne.0) then
c           print*,'rparam -- 1 ',jversn
            go to 150
        endif
        if(iversn.ne.jversn) then
c           print*,'using default ',iversn,jversn
            call openit ('default.prm',11,ifl,irdwr,ierror)
            if (ierror.ne.0) go to 150
            call readin (ifl,jversn,1,ierror)
            if (ierror.ne.0) go to 150
            if(jversn.ne.iversn) go to 150
        endif
        call readre (ifl,retabl,4,ierror)
        if (ierror.eq.0) then
            dxc = retabl(1)
            dyc = retabl(2)
            dxrad = retabl(3)
            dyrad = retabl(4)
        else
c           print*,'rparam -- 2 ',retabl
        endif
        call readre (ifl,retabl,4,ierror)
        if (ierror.eq.0) then
            xrnm = retabl(1)
            clat = retabl(2)
            clon = retabl(3)
            orhalt = retabl(4)
c           print*,'OMSGS - ',retabl,xrnm
        else
```

```
c           print*,'rparam -- 3 ',retabl
        endif
        call readin (ifl,intabl,7,ierror)
        if (ierror.eq.0) then
            do 120 i=1,4
                ipgrid(i) = intabl(i)
  120       continue
            level = intabl(5)
            itproj = intabl(6)
            ires = intabl(7)
        else
c           print*,'rparam -- 4 ',intabl
        endif
c       print*,'Rparam -- ready to read logicals'
        call readch (ifl,chastr,lenx,ierror)
c       if (ierror.ne.0) print*,'rparam ',ierror,chastr
        call asclog(lton,16,chastr(1:16))
        call asclog(dotem,1,chastr(17:17))
        call readch (ifl,curwdb,lenwdb,ierror)
c       if (ierror.ne.0) print*,'rparam ',ierror,chastr
        call readch (ifl,classi,lencla,ierror)
c       if (ierror.ne.0) print*,'rparam ',ierror,chastr
c       print*,'After read of text'
        call readch (ifl,chastr,lenx,ierror)
c       if (ierror.ne.0) print*,'rparam ',ierror,chastr
        call asclog(overtb,16,chastr)
        filply = overtb(5)
        call readch (ifl,ovfnam,lenovf,ierror)
c       if (ierror.ne.0) print*,'rparam ',ierror,chastr
        if (ierror.ne.0.or.lenovf.le.0) then
            lenovf = 11
            ovfnam(1:lenovf) = 'overlay.dat'
        endif
c
c       Set default std parallel and tilt for old files and non conics.
        splll = clat
        spll2 = clat
        tilt = 0.0
        az = tilt
        azlat = 0.0
c
c       Read the record containing conic standard parallels and tilt.
        call readre (ifl,retabl,3,ierror)
        if (ierror.eq.0) then
c          Replace defaults for Lambert,Albers,Kavrasky,Oblique Mercator.
           if ((itproj.eq.8).or.(itproj.eq.9).or.(itproj.eq.12).or.
     +        (itproj.eq.14)) then
              splll = retabl(1)
              spll2 = retabl(2)
              tilt = retabl(3)
              az = tilt
           endif
c          Override EOF error we may have got from reading an old files.
           ierror = 0
        endif
c
```

```
        go to 155
  150       continue
            ierror = 2
            print*,'Error in parameter file'
c           call derror(30,'Problem reading parameter file',.true.,5,ch)
  155   continue
        call closit (ifl)
c       print*,'Ready to call chawdb',curwdb
        call chawdb (6,curwdb)
        if (overtb(9)) inpdev = 2
        CALL INITIA (XC,YC,CLAt,CLOn,XRAd,YRAd,ITPROj,IRES,XRNM,
     +  ORHALT)
        lev = level
        call chlevl (lev)
        if (sys)
     +  print*,'Rparam -- exit',lennam,name(1:lennam),xrad,yrad,xrnm
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                rpaths

c  Functional Description:
c       read path names for parameter files and map data
c
c  Input Files/Parameters:

c  Output Files/Parameters: N/A

c  Subroutines/Functions Called:

c  Called By:                FMAIN

c  Local Variables: N/A

c  Restrictions: N/A

c  Abnormal Return Conditions:  N/A

c  Location:       /a21/dave

c  Programmer          Date of Last Change       Reason for Change

C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine rpaths (len,name,ierror)

c       read path names for parameter files and map data

        character*(*) name
        character*50 tmpstr
        character*50 defpth
        common /defpth/ defpth
        common /lendef/ lendef
        character*50 mapath
```

```
      common /mapath/ mapath
      common /lenmap/ lenmap
      character*50 menpth
      common /menpth/ menpth
      common /lenmen/ lenmen
      character*80 idebug
      common /idebug/ idebug
      data ifl/9/,irdwr/0/

      call openit (name,len,ifl,irdwr,ierror)
      call readch (ifl,tmpstr,lentmp,ierror)
      if (ierror.eq.0) then
          lendef = lentmp
          defpth = tmpstr
      else
          print*,'Default path not provided, using ',
     +    defpth(1:lendef),'.'
      endif
      call readch (ifl,tmpstr,lentmp,ierror)
      if (ierror.eq.0) then
          lenmap = lentmp
          mapath = tmpstr
      else
          print*,'Map data path not provided, using ',
     +    mapath(1:lenmap),'.'
      endif
      call readch (ifl,tmpstr,lentmp,ierror)
      if (ierror.eq.0) then
          idebug = tmpstr
      else
          idebug = ' '
      endif
      call readch (ifl,tmpstr,lentmp,ierror)
      if (ierror.eq.0) then
          lenmen = lentmp
          menpth = tmpstr
      else
          lenmen = lendef
          menpth = defpth
      endif
      call closit (ifl)
      if (index(idebug,'sys').ne.0)
     + print*,'rpaths -- ',lendef,'  ',defpth(1:lendef),lenmap,
     + '  ',mapath(1:lenmap)

      return
      end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                   RPLSCN
C
C FUNCTIONAL DESCRIPTION:      RETURNS PICTURE BACK TO ORIGINAL
C                              VIEWPORT
C
C INPUT FILES/PARAMETERS:      NONE
```

Jul 20 14:11 1989 carr .f Page 100

```
C
C                          COMMON
C    VARIABLE              BLOCK         TYPE        DESCRIPTION
C
C     SXLLGP               SAVGVP        REAL       LOWER LEFT X OF ORIGINAL VIEWPORT
C     SYLLGP               SAVGVP        REAL       LOWER LEFT Y OF ORIGINAL VIEWPORT
C     SXURGP               SAVGVP        REAL       UPPER RIGHT X OF ORIGINAL VIEWPORT
C     SYURGP               SAVGVP        REAL       UPPER RIGHT Y OF ORIGINAL VIEWPORT
C     SAVMNU               SAVMNU        INTEGER    MENU NUMBER OF CURRENT MESSAGE
C                                                   BEFORE SCREEN WAS ENLARGED
C     NSGFUL               ARSEG         INTEGER    SEGMENT NUMBER OF FULL SCREEN
C                                                   BORDER
C     NSGMEN               ARSEG         INTEGER    SEGMENT NUMBER OF MENU BLOCK
C     NSGGRA               ARSEG         INTEGER    SEGMENT NUMBER OF GRAPHICS BLOCK
C     NSGSYS               ARSEG         INTEGER    SEGMENT NUMBER OF COMMUNICATIONS
C                                                   BORDER
C     NSGKEY               NSGKEY        INTEGER    SEGMENT NUMBER OF FUNCTION KEY
C                                                   BOX
C     NSGKTX               NSGKEY        INTEGER    SEGMENT NUMBER OF FUNCTION KEY
C                                                   DESCRIPTION
C
C OUTPUT FILES/PARAMETERS:         NONE
C
C                          COMMON
C    VARIABLE              BLOCK         TYPE        DESCRIPTION
C
C     XLLGVP               COMGVP        REAL       LOWER LEFT X OF ORIGINAL VIEWPORT
C     YLLGVP               COMGVP        REAL       LOWER LEFT Y OF ORIGINAL VIEWPORT
C     XURGVP               COMGVP        REAL       UPPER RIGHT X OF ORIGINAL VIEWPORT
C     YURGVP               COMGVP        REAL       UPPER RIGHT Y OF ORIGINAL VIEWPORT
C
C SUBROUTINES/FUNCTIONS CALLED
C
C    INIPIC           INITIALIZE VARIABLES FOR DRAWING NEW PICTURE
C    DRAWM            DRAWS THE CURRENT MENU
C    JVISBL           DI-3000 ROUTINE TO  MAKE A SEGMENT VISIBLE OR INVISIBLE
C    MESG             INFORMS USER WITH A MESSAGE IN COMMUNICATION AREA
C    HLDF             RETRIEVES FILE FOR EDITTING (CURRENT PICTURE)
C
C CALLED BY:                     PRINTR
C
C LOCAL VARIABLES:
C
C    VARIABLE                 TYPE         DESCRIPTION
C
C     LOG                   LOGICAL       FLAG SET BY HLDF (NOT NEEDED)
C     IERROR                INTEGER       STATUS SET BY DRAWM (NOT NEEDED)
C
C RESTRICTIONS:
C
C
C ABNORMAL RETURN CONDITIONS:    N/A
C
C
C PROGRAMMER:                    DATE OF LAST CHANGE     REASON FOR CHANGE
C
```

Jul 20 14:11 1989 carı .f Page 101

```
C     DABUTSON                     11/13/84                INITIAL ENTRY
C
C-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE RPLSCN
C
C REPLACE MAP BACK TO ORIGINAL SIZE
C
      COMMON /COMGVP/ XLLGVP,YLLGVP,XURGVP,YURGVP
      COMMON /SAVGVP/ SXLLGP,SYLLGP,SXURGP,SYURGP
      COMMON /ASPECT/ XASPEC,YASPEC,XVLOW,XVHIGH,YVLOW,YVHIGH
      COMMON /ARSEGS/ NSGMEN,NSGGRA,NSGSYS,NSGMSG,NSGMAP,NSGFUL

      COMMON/SEGNUM/QSEGNM
      INTEGER     QSEGNM

      COMMON /QPRINT/QPRINT
      LOGICAL QPRINT

      COMMON/CHANGE/QCHANG
      LOGICAL        QCHANG

      COMMON /SAVMNU/ SAVMNU
      INTEGER SAVMNU

      COMMON /NSGKEY/ NSGKEY,NSGKTX
      COMMON/FLNAME/QNAME,qdscrp
      CHARACTER *50 QNAME
      character*60 qdscrp

      INTEGER IERROR
      LOGICAL LOG
      LOGICAL QLTON(16),QDOTEM
      INTEGER QPGRID(4),QTYPTB(16)
      INTEGER QLEVEL,QITPRO,QIRES,QLUNDA,QLUNIN,QLUNLI
      COMMON /MAP/ QXRNM,QXC,QYC,QLEVEL,QCLAT,QCLON,QXRAD,QYRAD,
     +      QITPRO,
     +      QIRES,QTYPTB,QLUNDA,QLUNIN,QLUNLI,QLTON,QPGRID,QDOTEM,
     +      QORHAL

      common/typtmp/typtmp
      integer typtmp(16)
      common/oneflg/oneflg
      logical oneflg
      common/contrl/qclass
      logical        qclass
      logical        tmpcls

      tmpcls=qclass
      call eramap
      qclass=tmpcls
C
C ---- SET VIEWPORT BACK TO ORIGINAL VALUES
C
      XLLGVP = SXLLGP
      YLLGVP = SYLLGP
```

Jul 20 14:11 1989 carı .f Page 102

```
      XURGVP = SXURGP
      YURGVP = SYURGP
C
C ---- RESET ALL NEEDED VARIABLES FOR A PICTURE
C
      ONEFLG = .FALSE.
C
C ---- REDRAW ORIGINAL MENU TURN ON ALL BOXES SURROUNDING EACH
C       AREA
C
      CALL DRAWM(SAVMNU,IERROR)
      CALL JVISBL(NSGFUL,0)
clj - Charlie added the following line to erase
clj - any filled areas which did not disappear
clj - with the call to inipic.
      call redraw
      CALL JVISBL(NSGMEN,1)
      CALL JVISBL(NSGGRA,1)
      CALL JVISBL(NSGSYS,1)
      CALL JVISBL(NSGKEY,1)
      CALL JVISBL(NSGKTX,1)
      CALL MESG(574)
C
C ---- REDRAW HLDF
C
      CALL HLDF(2,18,1,1,LOG)
clj -------
      call dspfln ( qname )
clj -------
      RETURN
      END


C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    rsavpr
c
c  Functional Description:
c       read save file parameters
c
c  Input Files/Parameters:
c
c  Output Files/Parameters: N/A
c
c  Subroutines/Functions Called:
c
c  Called By:                    FMAIN
c
c  Local Variables: N/A
c
c  Restrictions: N/A
c
c  Abnormal Return Conditions:  N/A
c
c  Location:      /a21/dave
c
c  Programmer        Date of Last Change       Reason for Change
```

Jul 20 14:11 1989 carr .f Page 103

```
c
C-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine rsavpr (len,name)

c     read save file parameters

      character*(*) name
      character*80 savdes(20),filenm
      common /savdes/ savdes
      common /maxsav/ maxsav,limsav
      data ifl/9/,irdwr/0/

      filenm = name(1:len) // '.des'
      call openit (filenm,len+4,ifl,irdwr,ierror)
      if (ierror.ne.0) then
          print*,'Error on save descriptor open - trying default'
          call openit ('default.des',11,ifl,irdwr,ierror)
          if (ierror.ne.0) go to 150
      endif
      call readin (ifl,maxsav,1,ierror)
      if (ierror.ne.0) go to 150
      if (maxsav.gt.limsav) maxsav = limsav
      if (maxsav.lt.0) maxsav = 0
      if (maxsav.gt.0) then
          do 110 i=1,maxsav
              call readch (ifl,savdes(i),lenx,ierror)
              if (ierror.ne.0) go to 150
  110     continue
      endif
  150 continue
      call closit (ifl)

      return
      end
```

```
Jul 20 15:18 1989  carr  if.f Page 1

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      ARCOS
C
C FUNCTIONAL DESCRIPTION:         .
C
C CALLED BY:                      BPE, CONFID
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine arcos (c)
c
c      Dan L. Pratt replaced the IBM arcos, arsin calls with these routines
c      on 16 May 1981 for use on UNIX systems without the functions.
c
        real c
        real*4 x
        real*4 pi
        x   = c
        pi  = 4.0 * atan(1.0)
        pi  = 3.14159
c
        if (c .eq. 0.0) x = pi/2.
        if (c .lt. 0.0) x = atan(sqrt(1.0 - x*x)/x) + pi
        if (c .gt. 0.0) x = atan(sqrt(1.0 - x*x)/x)
        c = x
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      ARSIN
C
C FUNCTIONAL DESCRIPTION:         .
C
C CALLED BY:                      CONFID
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine arsin (c)
c
        real c
        real*4 x, y, z
        real*4 neg
        real*4 pi
        x   = c
        pi  = 4.0 * atan(1.0)
        pi  = 3.14159
        neg = 1.0
c
        if (x .lt. 0.0) then
             x = -x
             neg = -1.0
```

```
Jul 20 15:18 1989  carr   df.f Page 2

        end if
c
        z = 1.0 - x*x
        if (z .eq. 0.0) return
        y = sqrt(1.0/z)
        x = neg * atan(x * y)
        if (x .eq. 1.0) then
             x = neg * pi/2.
        end if
        c = x
        return
        end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      BPE
C
C FUNCTIONAL DESCRIPTION:         .
C
C CALLED BY:                      EXH, SEQ
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

       subroutine bpe(iter)
c
       real nxsx(50),nxsy(50),nxsz(50)
       real invar(50)
       integer save(50)
       common nbr,k,ires,nst,wbrf,invar,cost(999),
     1 ista(50),sing(999),cosg(999),stax(999),stay(999),staz(999),
     2 brnx(50),brny(50),brnz(50),il(50),save,swt(50),
     3 nxsx,nxsy,nxsz,wt(50),c11,c22,c33,c13,c12,c23,
     4 tlat,tlon,sma,smi,orien,area,tx,ty,tz,e1,e2,e3,chisq(30),dtr
c
c
      do 100 kk=1,iter
          c11= 0.
          c22= 0.
          c33= 0.
          c12= 0.
          c13= 0.
          c23= 0.
          do 6 i = 1, k
              j = il(i)
              c11 = c11 + wt(j) * brnx(j)**2
              c22 = c22 + wt(j) * brny(j)**2
              c33 = c33 + wt(j) * brnz(j)**2
              c12 = c12 + wt(j) * brnx(j) * brny(j)
              c13 = c13 + wt(j) * brnx(j) * brnz(j)
              c23 = c23 + wt(j) * brny(j) * brnz(j)
    6     continue
c
ccccc
          call eigen(c11,c22,c33,c12,c13,c23,e1,e2,e3,tx,ty,tz)
```

Jul 20 15:18 1989 carr df.f Page 3

```
c
c         need antipode?
c
          ict = 0
          do 10 i = 1, k
              j = il(i)
              if (0. .le. tx*nxsx(j)+ty*nxsy(j)+tz*nxsz(j)) ict = ict+1
   10     continue
          if (k .le. 2*ict) go to 11
          tx = -tx
          ty = -ty
          tz = -tz
   11     continue
c
c
          do 20 i= 1,k
              j = il(i)
              l = ista(j)
              tdots = tx*stax(l) + ty*stay(l) + tz*staz(l)
              if (tdots .gt.  .99999) tdots =  .99999
              if (tdots .lt. -.99999) tdots = -.99999
c
c             insert range weighting function here
c
              tdots1 = tdots
              call arcos(tdots1)
c
              rge   = 34.44 * tdots1
              if (rge .lt. 10.) go to 137
              rfn   = .285714 + rge * .0714256
              go to 138
  137         rfn   = 3. - rge * (.402 - rge * .0204)
  138         wt(j) = invar(j) / (rfn**2 * (1. - tdots**2))
   20     continue
c
c
  100 continue
      wbrf = e1
      if (k .eq. ict) return
      if (0 .eq. ict) return
      wbrf = 1000.
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        CNVRT
C
C FUNCTIONAL DESCRIPTION:           .
C
C CALLED BY:                        DOFIX
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

```
Jul 20 15:18 1989  carm   if.f Page 4

      subroutine cnvrt(degr, ideg, imin, isec, idir,
     1                 degr2, jdeg, jmin, jsec, jdir)
c
      character in,ie,iw,is,idir,jdir
      data in,ie,iw,is /'n','e','w','s'/
      deg  = abs(degr)
      ideg = deg
      imin = (deg - ideg) * 60.
      isec = (deg - ideg - float(imin)/60.)*3600.
      if (degr .lt. 0.) go to 1
      idir = in
      go to 2
    1 idir = is
    2 deg  = abs(degr2)
      jdeg = deg
      jmin = (deg -jdeg) * 60.
      jsec = (deg -jdeg - float(jmin)/60.) * 3600.
      if (degr2 .lt. 0) go to 4
      jdir = iw
      go to 3
    4 jdir = ie
    3 return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        CONFID
C
C FUNCTIONAL DESCRIPTION:           .
C
C CALLED BY:                        EXH, SEQ
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine confid
c
      real nxsx(50),nxsy(50),nxsz(50)
      real invar(50)
      integer save(50)
      common nbr,k,ires,nst,wbrf,invar,cost(999),
     1 ista(50),sing(999),cosg(999),stax(999),stay(999),staz(999),
     2 brnx(50),brny(50),brnz(50),il(50),save,swt(50),
     3 nxsx,nxsy,nxsz,wt(50),c11,c22,c33,c13,c12,c23,
     4 tlat,tlon,sma,smi,orien,area,tx,ty,tz,e1,e2,e3,chisq(30),dtr
c
      real*4 pi
c     fact = earth radius * sqrt(-2 ln (1-p))
      pi  = 4.0 * atan(1.0)
      pi = 3.14159
      data fact /7384./
c
      tlat = tz
      call arsin(tlat)
      tlat = tlat/dtr
```

```
      if (abs(tx) .le. 1.e-6) go to 10
      tlon = atan (ty/tx)/dtr
      if (tx .le. 0.)     tlon = tlon + 180.
      if (tlon .gt. 180.) tlon = tlon - 360.
      go to 15
10    tlon = 90.
      if (ty .le. 0.) tlon = -90.
   15 continue
      c11 = 0.
      c22 = 0.
      c33 = 0.
      c12 = 0.
      c13 = 0.
      c23 = 0.
      do 30 i=1,k
ccccc     j = ista(il(i))
          itemp = il(i)
          j   = ista(itemp)
          bx  = stay(j) * tz - staz(j) * ty
          by  = staz(j) * tx - stax(j) * tz
          bz  = stax(j) * ty - stay(j) * tx
ccccc     cof = wt(il(i))/(bx**2 + by**2 + bz**2)
          cof = wt(itemp)/(bx**2 + by**2 + bz**2)
          c11 = c11 + cof * bx**2
          c22 = c22 + cof * by**2
          c33 = c33 + cof * bz**2
          c12 = c12 + cof * bx * by
          c13 = c13 + cof * bx * bz
          c23 = c23 + cof * by * bz
   30 continue
      b = (c11 + c22 + c33)/2.
      c = c11 * (c22 + c33) + c22 * c33 - (c12**2 + c13**2 + c23**2)
      d = sqrt(b**2 - c)
      e2 = b - d
      e3 = b + d
      sma = fact/sqrt(e2)
      smi = fact/sqrt(e3)
c
      call evect(e2,c11,c22,c33,c12,c13,c23,x,y,z)
c
      if ((x * ty - y * tx) .gt. 0.) z = -z
      temp = z/sqrt(1. - tz**2)
      if (1. .ge. abs(temp)) go to 20
      orien = 0.
      go to 22
   20 continue
      call arcos(temp)
      orien = temp/dtr
   22 continue
      area = pi * sma * smi
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DERROR
```

Jul 20 15:18 1989 carr if.f Page 6

```
C
C FUNCTIONAL DESCRIPTION:        .
C
C CALLED BY:                     GETBRG, WRITER
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine derror

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DOFIX
C
C FUNCTIONAL DESCRIPTION:        .
C
C CALLED BY:                     PROCDF
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

c       FFIX software
c
      subroutine dofix(stanam,slat,slong,sigx,inst,inbr,brgid,brg,used,
     1 bpelat,bpelon,smajor,sminor,azimth,fixed)
c
c       This version of the venerable FFIX algorithm is modified to
c       run under FORTRAN 77, and to operate from the terminal,
c       one set of bearings at a time.
c
c       Remodified by Charlie James,T3331 (May 1982)
c       8/8/83 added fixed parameter D. Nation, R531
c
      integer fixed
      real nxsx(50),nxsy(50),nxsz(50)
      real invar(50),slat(999),slong(999),sigx(999),brg(30)
      integer save(50)
      logical used(30)
      character*2 stname(30),stanam(999),brgid(30)
      common nbr,k,ires,nst,wbrf,invar,cost(999),
     1 ista(50),sing(999),cosg(999),stax(999),stay(999),staz(999),
     2 brnx(50),brny(50),brnz(50),il(50),save,swt(50),
     3 nxsx,nxsy,nxsz,wt(50),c11,c22,c33,c13,c12,c23,
     4 tlat,tlon,sma,smi,orien,area,tx,ty,tz,e1,e2,e3,chisq(30),dtr
c
c       nbr     number of bearings in a DF flash set
c               this modified routine limits nbr to 50 (or less?)
c       k       number of bearings used in a fix (of set "nbr")
c       ires
c       nst     total number of DF stations in existence
c       wrbf
```

Jul 20 15:18 1989 carn df.f Page 7

```
c       sname   DF station names (digraphs: see /u4/aea/appl/df/df.sites)
c       stname  DF station names (as read from the file "bearings")
c       invar   station location values?
c       cost    cos stn lat
c       ista    station nr from which df was taken
c       sing    sin stn lon
c       cosg    cos stn lon
c       stax    cost * cosg (cos stn lat * cos stn lon)
c       stay    cost * sing (cos stn lat * sin stn lon)
c       staz    sin stn lat
c       sigx    fudge factor (sigma?) assigned each DF station
c       brnx    cos brg * sin stn lon - sin brg * sin stn lat * cos stn lon
c       brny   -cos brg * cos stn lon - sin brg * sin stn lat * sin stn lon
c       brnz    sin brg * cos stn lat
c       il      ordinal nr of DF bearing in any series of bearings
c       save    (relates to save - those df bearings used?
c       swt
c       nxsx    brny * sin stn lat - brnz * cos stn lat * sin stn lon
c       nxsy    brnz * cos stn lat * cos stn lon - brnx * sin stn lat
c       nxsz    brnx * cos stn lat * sin stn lon - brny * cos stn lat *
c                                         cos stn lon
c       wt      weight assigned to each bearing
c       c11
c       c22
c       c33
c       c12
c       c13
c       c23
c       tlat    latitude from sub CONFID
c       tlon    longitude from sub CONFID
c       sma     semi-major axis (ellipse of confidence = eoc)
c       smi     semi-minor axis "eoc"
c       orien   orientation of "eoc"
c       area    area of "eoc"
c       tz
c       ty
c       tz
c       e1
c       e2
c       e3
c       chisq
c       dtr     .01745329 conversion factor degrees to radians
c
c
c
      real*4 pi
c     dimension sigx(50)
      dimension sint(50)
      dimension xhisq(30)
      equivalence (sint(1),staz(1))
      character unused, yesu, nofix, lat, lon
c     character*2 brgid
      data  unused/'u'/
      data    yesu/'y'/
      data   nofix/'n'/
c             Table of 20 % values
```

```
c
        data xhisq/1.642,3.219, 4.642, 5.989, 7.289, 8.558, 9.803,
     1    11.030,12.242,13.442,14.631,15.812,16.985,18.151,19.311,
     2    20.465,21.615,22.760,23.900,25.038,26.171,27.301,28.429,
     3    29.553,30.675,31.795,32.912,34.027,35.139,36.250/
c
      nst = inst
      nbr = inbr

      pi  = 4.0 * atan(1.0)
      pi = 3.14159
      dtr = .01745329
c
c       iflsh is the numerical set number of a single flash series.
c
      iflsh = 0
      do 101 ii = 1, 30
          chisq(ii) = xhisq(ii)
101   continue
c
c       first get the number of stations;
c       access the data and build values
c
c
      do 20 i = 1, nst
c
c             calculate inverse station variance here
c
          cosg(i) = cos(slong(i))
          sing(i) = sin(slong(i))
          cost(i) = cos(slat(i))
          staz(i) = sin(slat(i))
          stax(i) = cost(i) * cosg(i)
          stay(i) = cost(i) * sing(i)
   20 continue
c
      iflsh = iflsh + 1
c
c       This is now flash sequence number "iflsh", which has "nbr"
c       bearings in it.
c
      do 40 j = 1, nbr
          if (nbr .le. 0) go to 975
c
c         read the DF station ID, and the bearing from that station
c
          stname(j) = brgid(j)

          brg(j)  = brg(j) * dtr
c
          do 38 i = 1, nst
c             validate the site name (digraph)
              if (brgid(j) .eq. stanam(i)) go to 39
   38     continue
c
c
```

```
c       bearing nr. "j" taken from station "i"
c
39        continue
c
c        ... bearing number j came from station number i ...
          ista(j) = i
c
c       ... the invariance of bearing is a function of the station ...
          invar(j) =  1./(dtr * sigx(i))**2
c
          cbrg    = cos(brg(j))
          sbrg    = sin(brg(j))
c
c         bearing plane normal vector
c
c            cos brg * sin stn lon - sin brg * sin stn lat * cos stn lon
          brnx(j) = cbrg * sing(i) - sbrg * sint(i) * cosg(i)
c
c           -cos brg * cos stn lon - sin brg * sin stn lat * sin stn lon
          brny(j) =-cbrg * cosg(i) - sbrg * sint(i) * sing(i)
c
c            sin brg * cos stn lat
          brnz(j) = sbrg * cost(i)
c
c            brny * sin stn lat - brnz * cos stn lat * sin stn lon
          nxsx(j) = brny(j) * staz(i) - brnz(j) * stay(i)
c
c            brnz * cos stn lat * cos stn lon - brnx * sin stn lat
          nxsy(j) = brnz(j) * stax(i) - brnx(j) * staz(i)
c
c            brnx * cos stn lat * sin stn lon - brny * cos stn lat * cos stn
          nxsz(j) = brnx(j) * stay(i) - brny(j) * stax(i)
c
   40     continue
c
c     do an exhaustive test if few bearings
c
      if (nbr .le. 10) go to 50
      call seq
      go to 60
c
   50 k = nbr
      call exh

c
60    continue
      if (ires .ne. 1)  go to 800
      if (sma .gt. 999) go to 800
      nrej   = nbr - k
      tlon   = -tlon
      ratio  = smi/sma
      radius = sma * (.29294*(ratio**2)-.063163*ratio+.76996)
c
c     tlat, tlon, lat and lon are returned from subr CONFID
c     convert to integer and print ...
c
```

Jul 20 15:18 1989 carı df.f Page 10

```
      call cnvrt(tlat,lado,lamo,laso,lat,tlon,lodo,lomo,loso,lon)
c
      bpelat = lado + (lamo + laso/60.)/60.
      bpelon = lodo + (lomo + loso/60.)/60.
      bpelat = bpelat * dtr
      bpelon = bpelon * dtr
      if(.not.(lat .eq. 's')) go to 62
         bpelat = -bpelat
   62 continue
      if(.not.(lon .eq. 'w')) go to 64
         bpelon = -bpelon
   64 continue
      smajor = sma
      sminor = smi
      azimth = orien

      j = 1
      do 81 i=1,nbr
c        if (i.ne.1) go to 80
c        write (3,341) iflsh
c 341    format (/,/,'NBR: ',i3)
c  80    continue
         if (i.eq.il(j)) go to 82
c        write (3,342) i,stname(i)
c 342    format (1x,'Did not use bearing ',i3,' from station ',a2)
         used(i) = .false.
         go to 81
   82    continue
c        write (3,343) i,stname(i)
c 343    format (1x,'Used bearing ',i3,' from station ',a2)
         used(i) = .true.
         j = j + 1
         if (j .gt. k) go to 84
   81 continue
      go to 975
   84 continue
      i = i + 1
      if (i .gt. nbr) go to 975
      do 85 j=i,nbr
c        write (3,342) j,stname(j)
         used(j) = .false.
   85 continue
      go to 975
c
  800 ires = 2
c     WILL SET THE NO-FIX FLAG HERE
c
975   continue

      fixed = ires

      return
      end
```

C+*+*+*+*+*+*+*+*+*+*+*+*+*+*+*+*+*+*+*+*+*+*+*+*+*+*+*+*+*+*+*+*+*+*+*+*+*+*+*+*+*|*+*+*+*+

Jul 20 15:18 1989 carr df.f Page 11

```
C UNIT NAME:                       EIGEN
C
C FUNCTIONAL DESCRIPTION:          .
C
C CALLED BY:                       BPE
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine eigen(d11,d22,d33,d12,d13,d23,e1,e2,e3,tx,ty,tz)
c
      c11 = d11
      c22 = d22
      c33 = d33
      c12 = d12
      c13 = d13
      c23 = d23
c
      b = c11 + c22 + c33
      c = c11 *(c22 + c33) + c22  * c33 - (c12**2 + c23**2 + c13**2)
      a = c12/c11
      d = c11 *(c22 - c12*a) * (c33 - c13*c13/c11 - ((c23 - c13*a)**2)
     1        /(c22 - c12*a))
      if (d .gt. 0.) go to 13
      e1 = 0.
      return
c
   13 continue
      x = 0.
c
c       What's going on here?  the first time, anyway??
c
      do 10 i = 1, 10
          fx = x**3 - b*x**2  + c*x - d
          fp = 3*x**2 - 2*b*x + c
          xn = x - fx/fp
          if (xn .eq. 0.) go to 12
          if (abs((xn-x)/xn) .lt. .0001) go to 12
          x = xn
   10 continue
c
c
   12 e1 = xn
      call evect(e1,d11,d22,d33,d12,d13,d23,tx,ty,tz)
      return
      end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       EVECT
C
C FUNCTIONAL DESCRIPTION:          .
C
C CALLED BY:                       CONFID, EIGEN
C
```

```
Jul 20 15:18 1989  carr   df.f Page 12

C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine evect(e1,c11,c22,c33,c12,c13,c23,tx,ty,tz)
c
      d1 = (c11 - e1) * (c22 - e1) - c12**2
      if (abs(d1) .le. .0001) go to 10
      x = c13 * (e1 - c22) + c12 * c23
      y = (e1 - c11) * c23 + c13 * c12
      z = d1
      go to 50
   10 d2 = (c11 - e1) * (c33 - e1) - c13**2
      if (abs(d2) .le. .0001) go to 20
      x = (e1 - c33) * c12 + c13 * c23
      y = d2
      z = (e1 - c11) * c23 + c13 * c12
      go to 50
   20 x = (c22  - e1) * (c33 - e1) - c23**2
      y = (e1 - c33) * c12 + c23 * c13
      z = (e1 - c22) * c13 + c23 * c12
   50 temp = sqrt(x**2 + y**2 + z**2)
      tx = x/temp
      ty = y/temp
      tz = z/temp
      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       EXH
C
C FUNCTIONAL DESCRIPTION:          .
C
C CALLED BY:                       DOFIX
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine exh
c
c       SUBROUTINE EXH - EXHAUSTIVE
c
      real nxsx(50),nxsy(50),nxsz(50)
      real invar(50)
      integer save(50)
      common nbr,k,ires,nst,wbrf,invar,cost(999),
     1 ista(50),sing(999),cosg(999),stax(999),stay(999),staz(999),
     2 brnx(50),brny(50),brnz(50),il(50),save,swt(50),
     3 nxsx,nxsy,nxsz,wt(50),c11,c22,c33,c13,c12,c23,
     4 tlat,tlon,sma,smi,orien,area,tx,ty,tz,e1,e2,e3,chisq(30),dtr
c
      dimension klim(10)
      data klim/3, 3, 3, 3, 3, 3, 4, 4, 5, 5/
   10 continue
```

Jul 20 15:18 1989 carr if.f Page 13

```
      do 15 i = 1, k
          il(i) = i
   15 continue
      rej = 1000.
c
c     is station unique?
c
20    continue
      itemp = il(1)
      is = ista(itemp)
ccccc is = ista(il(1))
c
      do 21 i = 2,k
ccccc       if(is .ne. ista(il(i))) go to 25
            itemp = il(i)
            if (is .ne. ista(itemp)) go to 25
   21 continue
      go to 40
c
c     set initial weights and call bpe
   25 continue
      do 26 i=1,k
            itemp = il(i)
            wt(itemp) = invar(itemp)
ccccc       wt(il(i)) = invar(il(i))
   26 continue
      call bpe(2)
cccc  is bearing set better than previous best?
  800 continue
      if (wbrf .ge. rej) go to 40
c     save this case
      do 30 i = 1, k
          itemp      = il(i)
          save(i)    = itemp
          swt(itemp) = wt(itemp)
ccccc     swt(il(i)) = wt(il(i))
   30 continue
      rej = wbrf
c     find next combination
c
   40 i = k
c
c     (Do While, check after doing...)
c
   41 continue
      if (il(i) .lt. nbr - k + i) go to 45
      if (i .le. 1) go to 50
      i = i - 1
      go to 41
c
   45 j = i
c
   46 continue
      il(i) = il(j) + 1
      if (i .ge. k) go to 20
      j = i
```

```
Jul 20 15:18 1989  carr  df.f Page 14

      i = i + 1
      go to 46
c
c     all combinations complete
c
   50 wbrf = rej
      if (wbrf .lt. chisq(k-2)) go to 60
c c
c     try smaller k
c
      if (k .le. klim(nbr)) go to 90
      k = k - 1
      go to 10
c
c     output results
c
   60 continue
c
      do 61 i = 1, k
           itemp = save(i)
           il(i) = itemp
           wt(itemp)  = swt(itemp)
ccccc      wt(il(i))  = swt(il(i))
   61 continue
c
      call bpe(1)
      ires = 1
      call confid
      go to 999
c
   90 ires = 2
999   continue
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    FDFPRO
C
C FUNCTIONAL DESCRIPTION:       .
C
C CALLED BY:                    GEOCON
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine fdfpro

c       process/display df menu function

        character * 80 retstr
        real parms(4)
        logical qmapup
        common /mapup/qmapup
c       map parameters
```

Jul 20 15:18 1989 carm lf.f Page 15

```
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        dimension ltypov(16)
        logical ltonov(16),rankt(26,16)
        common /maptoo/ ltypov,ltonov,rankt

        data lcdf/22/

c       print*,'enter fdfpro'
        irchar = 25
        call prompt(1208,retstr,25,irchar)
        if (irchar.gt.0) then
            call mesg (1209)
            ierror = 0
            call procdf (irchar,retstr,ierror)
            if(ierror .eq. 0) then
                ltonov(lcdf-20) = .true.
                if ( .not. qmapup)  then
                    call procov (parms,ierror,'df.dat',6)
                    if (ierror.eq.0) then
c
c***                    calculate map parmameters
c***                    then draw map and df overlays
c
                        call calmap (parms)
                        call drwmap
                    else
                        call mesg (1211)
                        call paws
                    endif
                else
                    call mesg (1210)
                    call drawf(lcdf)
                endif
            else
                call mesg(1211)
                call paws
            endif
         endif
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     GETBRG
C
C FUNCTIONAL DESCRIPTION:        .
C
C CALLED BY:                     PROCDF
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

Jul 20 15:18 1989 carm if.f Page 16

```
      subroutine getbrg(extflg,lunit)

c     This subroutine reads a set of bearings.  It uses the
c     bearing ID (a digraph) to get the latitude and longitude
c     from the site table.

c     "nst" is the number of stations (sites)
      common /sytdat/ slat(999),slong(999),sigx(999),nst
      character*2 sname
      common /snam/ sname(999)

c     "nbr" is the number of bearings in this set
      logical used
      common /brguse/ used(30)
      common /brgdat/ brglat(30),brglon(30),brg(30),nbr
      character*2 brgid(30)
      common /brgid/ brgid
      character*2 waste
      character*1 ch

      logical extflg,found,pause

      extflg = .true.

c ----- The following statement is the target of the abnormal
c ----- exit caused by finding an illegal bearing ID.

   10 continue
      read (lunit,20,end=300,err=300) nbr
   20 format (1x,i3)

      if (nbr.le.0) go to 300

      do 200 i=1,nbr
         read (lunit,50,end=300,err=300) brgid(i),brg(i)
   50    format (1x,a2,f5.1)
         found = .false.
         do 100 j=1,nst
            if (brgid(i).eq.sname(j)) then
                brglat(i) = slat(j)
                brglon(i) = slong(j)
                found = .true.
c --------------- ABNORMAL EXIT FROM DO-LOOP
                go to 150
            endif
  100    continue
  150    continue

         if(.not.(found)) then
c           Read rest of bearings for this set.
            do 180 k=i+1,nbr
               read (lunit,170,end=300,err=300) waste
  170          format (a2)
  180       continue
            extflg = .true.
```

Jul 20 15:18 1989 carr df.f Page 17

```
              pause = .true.
              call derror (18,'ILLEGAL BEARING ID',pause,idelay,ch)
c ----------- ABNORMAL EXIT FROM DO-LOOP
              go to 10
           endif

  200   continue
        extflg = .false.

  300   continue

        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      GETSYT
C
C FUNCTIONAL DESCRIPTION:         .
C
C CALLED BY:                      PROCDF
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine getsyt(filnam,last,iunit)

c       This subroutine reads the site file, converts site locations
c       to radians, and stores the values in a table of the common
c       area.
c
c       "nst" is the number of stations (sites)
        common /sytdat/ slat(999),slong(999),sigx(999),nst
        character*2 sname
        common /snam/ sname(999)

        character*50 filnam
        character nsind
        character ewind
        data dtr/.01745329/

        open (unit=iunit,file=filnam(1:last),status='old',err=200)
        rewind (iunit)

        read (iunit,20) nst
   20   format (i3)
        do 100 i=1,nst
           read (iunit,40) sname(i),lad,lam,las,nsind,lod,lom,los,
     +                     ewind,sigx(i)
   40      format (a2,1x,i3,2i2,a1,i3,2i2,a1,f5.2)
           slat(i) = lad + (lam + las/60.)/60.
           slong(i) = lod + (lom + los/60.)/60.
           slat(i) = slat(i) * dtr
cccc       slong(i) = - slong(i) * dtr
           slong(i) = slong(i) * dtr
```

```
Jul 20 15:18 1989  carn   if.f Page 18

          if (nsind .eq. 'S' .or. nsind .eq. 's') then
              slat(i) = -slat(i)
          endif
          if (ewind .eq. 'W' .or. ewind .eq. 'w') then
              slong(i) = -slong(i)
          endif
  100   continue

        close (iunit)
        goto 300

  200   call mesg(1211)

  300   return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      PROCDF
C
C FUNCTIONAL DESCRIPTION:         .
C
C CALLED BY:                      READML, FDFPRO
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine procdf (brglen,brgfil,ierror)
c
c       this subroutine processes a df bearing file
c
        character*2 sname
        common /snam/ sname(999)
        character*2 brgid(30)
        common /brgid/ brgid
        character*50 mapath
        common /mapath/ mapath
        common /lenmap/ lenmap
        character*50 defpth
        common /defpth/ defpth
        common /lendef/ lendef
        logical used
        integer ierror
        common /brguse/ used(30)
        common /brgdat/ brglat(30),brglon(30),brg(30),nbr
        common /sytdat/ slat(999),slong(999),sigx(999),nst

        logical extflg
        integer brglen
        integer sytlen
        integer fixed
        integer iunit
        integer dunit
        integer munit
```

Jul 20 15:18 1989 carm df.f Page 19

```
c ----- brgfil = name of bearings file
        character*50 brgfil

c ----- sytfil = name of df sites file
        character*50 sytfil
        character*120 buffer

c ----- iunit = unitid for df sites file
c ----- lunit = unitid for bearings file
        data iunit /8/
        data munit /9/
        data lunit /10/
        data dunit /20/
        data irdwr/0/

        ierror = 0
        sytfil = mapath(1:lenmap) // 'df.sit'
        sytlen =  lenmap + 6
        call getsyt (sytfil,sytlen,iunit)
        open(unit=lunit,file= brgfil(1:brglen), err=253, status='old')

        extflg = .true.
        call getbrg (extflg,lunit)

   50   continue
        if (extflg) go to 200
           call dofix(sname,slat,slong,sigx,nst,nbr,brgid,brg,used,
     1     bpelat,bpelon,sma,smi,azimth,fixed)
           call writer(fixed,bpelat,bpelon,sma,smi,azimth)
           extflg = .true.
           call getbrg(extflg,lunit)
           go to 50
  200   continue
        call closit (lunit)

        open(unit=munit,file= 'df.inp', err=253, status='old')
        rewind(munit)

        open(unit=dunit,file= 'df.dat',err = 250,status='unknown')

c      ---------------------------------------------------
c      read the df data from the sent input file and
c      write the df data into df.dat file
c      ---------------------------------------------------
 125   continue
               read(munit,130,end=140,err=251) buffer
 130           format(a120)
               write(dunit,130,err=252) buffer
               goto 125
 140   continue
        call closit(dunit)
        call closit(lunit)
        call closit(munit)
c      -------------------------------------------------------
c      move any co-located sites so that txt is readable on map
c      -------------------------------------------------------
```

```
Jul 20 15:18 1989  carr   df.f Page 20

        call mvtext('df.dat',6)

        goto 300
 250    print*,'error opening df.dat in procdf'
        ierror = 1
        goto 300
 251    print*,'error reading df.inp in procdf'
        ierror = 1
        goto 300
 252    print*,'error writing df.dat in procdf'
        ierror = 1
        goto 300
 253    print*,'error opening df.inp in procdf'
        ierror = 1
 300    continue

        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    RTODI
C
C FUNCTIONAL DESCRIPTION:       .
C
C CALLED BY:                    WRITER
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      integer function rtodi (rads)

c     RTODI converts radians to deg, min, sec in integer
c     format (dddmmss).

      integer deg,min,sec
      real    rads,degree,dtr

      data    dtr /0.01745329/

      degree = abs(rads) / dtr
      deg    = int(degree)
      min    = int((degree - deg) * 60.0)
      sec    = int((((degree - deg) * 60.0) - min) * 60.0)
      rtodi  = (deg * 10000) + (min * 100) + sec

      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SEQ
C
C FUNCTIONAL DESCRIPTION:       .
C
```

```
Jul 20 15:18 1989  carm  df.f Page 21

C CALLED BY:                     DOFIX
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine seq
c
      real nxsx(50),nxsy(50),nxsz(50)
      real invar(50)
      integer save(50)
      common nbr,k,ires,nst,wbrf,invar,cost(999),
     1 ista(50),sing(999),cosg(999),stax(999),stay(999),staz(999),
     2 brnx(50),brny(50),brnz(50),il(50),save,swt(50),
     3 nxsx,nxsy,nxsz,wt(50),c11,c22,c33,c13,c12,c23,
     4 tlat,tlon,sma,smi,orien,area,tx,ty,tz,e1,e2,e3,chisq(30),dtr
c
      k = nbr
c
       do 15 i = 1, k
           il(i) = i
15     continue
c
       do 20 i = 1, k
           itemp     = il(i)
           jtemp     = ista(itemp)
           wt(itemp) = invar(jtemp)
ccccc      wt(i)     = invar(ista(il(i)))
20     continue
c
   21 continue
      call bpe(2)
c
c     test results
c
      m = k - 2
      if (k .ge. 33) go to 25
c
      if (wbrf .lt. chisq(m)) go to 50
      go to 26
   25 rm=m
      xchi = sqrt(2.0*wbrf) - sqrt(2.0*rm-1.)
      if (xchi .lt. 0.842) go to 50
   26 continue
c
c     not acceptable - find bearing to remove
c
      if (k .le. (nbr+1)/2.) go to 900
      emax = 0.
      do 30 i = 1, k
          ib = il(i)
          x  = wt(ib)* (brnx(ib)*tx + brny(ib)*ty + brnz(ib)*tz)**2
          if   (0. .lt. nxsx(ib)*tx + nxsy(ib)*ty + nxsz(ib)*tz)
     +    go to 60
          x  =  2 * wt(ib) - x
60        continue
```

Jul 20 15:18 1989 carr if.f Page 22

```
          if (x .le. emax) go to 30
          emax = x
          is = i
   30 continue
      k = k - 1
c
      do 35 i = is, k
          il(i) = il(i+1)
   35 continue
c
c     is station unique
c
ccccc il = ista(il(1))
      itemp = il(1)
      il    = ista(itemp)
c
      do 40 i = 2, k
          itemp = il(i)
          if (ista(itemp) .ne. il) go to 21
ccccc     if (ista(il(i)) .ne. il) go to 21
   40 continue
c
c     no fix
c
  900 ires = 2
      go to 999
   50 continue
      call bpe(1)
      ires=1
      call confid
  999 return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     WRITER
C
C FUNCTIONAL DESCRIPTION:        .
C
C CALLED BY:                     PROCDF
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine writer (fixed,bpelat,bpelon,sma,smi,azimth)

c     Writer writes to an intermediate file 'DF.dat', that contains
c     DF information.  The info. includes bearing site info. and
c     ellipse info. about a specific target.  The info. about each
c     bearing site (up to 999) contains; position (lat/lon),
c     direction of bearing, and a digraph code for each site.
c     The info. about the ellipse for the target area contains;
c     the best point estimate (lat/lon), length of the major and
c     minor axis, and the azimth.
c
```

Jul 20 15:18 1989 carm lf.f Page 23

```
c     NOTE:
c         Routine openit, closit, and derror have been
c         commented out.  Also, fortran statements open and
c         close have been inserted.  All this was done
c         inorder to test WRITER.
c
        logical used
        common /brguse/ used(30)
        common /brgdat/ brglat(30),brglon(30),brg(30),nbr
        character*2 brgid(30)
        common /brgid/ brgid
      character*1 dirctn(2)
      integer     fixed,iarray(2),rtodi
      real        rarray(3),size,dtr

      data munit /9/
      data size  /1.0/
      data dtr   /0.01745329/

c
c-----open file and check for any errors
c
      call openit ('df.inp',6,munit,0,ierror)
      if (ierror .ne. 0) go to 20
      rewind (munit)
c
c-----write info. to the file for each site
c
      do 10 index = 1,nbr,1
         if (brglat(index) .le. 0) then
            dirctn(1) = 's'
         else
            dirctn(1) = 'n'
         endif

         if (brglon(index) .le. 0) then
            dirctn(2) = 'w'
         else
            dirctn(2) = 'e'
         endif

         iarray(1) = rtodi(brglat(index))
         iarray(2) = rtodi(brglon(index))
         rarray(1) = abs(brg(index)) / dtr

         call writfl (munit,'b',iarray,dirctn,1,size,rarray,
     +                brgid(index),used(index))
10    continue
c
c-----write info. about ellipse
c
      if (fixed .eq. 1) then
         if (bpelat .le. 0) then
            dirctn(1) = 's'
         else
            dirctn(1) = 'n'
```

```
Jul 20 15:18 1989  carr   if.f Page 24

         endif

         if (bpelon .le. 0) then
            dirctn(2) = 'w'
         else
            dirctn(2) = 'e'
         endif

         iarray(1) = rtodi(bpelat)
         iarray(2) = rtodi(bpelon)
         rarray(1) = sma
         rarray(2) = smi
         rarray(3) = azimth

         call writfl (munit,'e',iarray,dirctn,2,size,rarray,'  ',
     +   used)
      endif

      go to 30

 20   call derror (30,'Problem opening DF.inp file    ',.true.,5,ch)
      call closit (munit)
30    continue

      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      WRITFL
C
C FUNCTIONAL DESCRIPTION:         .
C
C CALLED BY:                      WRITER
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine writfl (unitno,rectyp,coord,dirctn,
     +              .      marker,size,ellpse,sitid,used)

c     Writfl writes bearing site and ellipse info. to the file
c     'DF.dat'.  Bearing site and ellipse info. can be distinguished
c     by the first character in the first field of each record.
c     I.e. a 'b' for bearing site and an 'e' for an ellipse.
c     Also included in each record is a marker id and marker size.

      character*1 rectyp,dirctn(2)
      character*2 sitid
      integer     unitno,marker,coord(2)
      real        size,ellpse(3)
      logical used
      integer iused

c
```

Jul 20 15:18 1989 carr df.f Page 25

```
c-----check for the type of record and
c-----write info. to the file
c
      if (rectyp .eq. 'b') then
         if(used) then
               iused = 1
         else
               iused = 0
         endif
         write(unit=unitno,fmt=1000) 'b',coord(1),dirctn(1),coord(2),
     +                               dirctn(2),marker,size,ellpse(1),
     +                               iused,sitid
1000     format(a1,1x,i6,a1,i7,a1,i3,f5.1,1x,f7.2,1x,i1,1x,a2)
      else if (rectyp .eq. 'e') then
         write(unit=unitno,fmt=1010) 'e',coord(1),dirctn(1),coord(2),
     +                               dirctn(2),marker,size,ellpse(1),
     +                               ellpse(2),ellpse(3),' '
1010     format(a1,1x,i6,a1,i7,a1,i3,f5.1,1x,3f8.2,1x,a56)
      endif

      return
      end
```

Jul 20 15:13 1989 carr men.f Page 1

```
C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    DETCON
c
c  Functional Description:
c       this subroutine causes the feature detail level menu to appear
c
c  Input Files/Parameters:
c
c  Output Files/Parameters:
c
c  Subroutines/Functions Called:
c      check                      checks the value of the button re-
c                                 turned from a pick or locate
c      hilite                     highlights menu choices by drawing
c                                 a box around them
c      mpick                      routine to pick from the menu
c
c  Called By:                     SUBCAL
c
c  Local Variables:
c
c  Restrictions:
c
c  Abnormal Return Conditions:
c
c  Location:
c
c  Programmer         Date of Last Change       Reason for Change
c  C.S. Lamb          Jan 1988                jclear logic - detcon
c
C-*-*-*-*-*-*-*-*-*-*-*-*-*-*-*-*-*-*-*-*-*-*-*-*-*-*-*-*-*-*-*-*-*-*-*|*-*-*-*-

        subroutine detcon

c       this subroutine causes the feature detail level menu to appear

        Integer qnextm,HLTAB(29)
        Logical qcancl,qext2m,qretrn,qstmnu
        Common /b1/ qcancl,qext2m,qretrn,qstmnu,qnextm
        logical sys
        common /sysdbc/ sys
        logical qexitg
        Common /b5/ qexitg
        logical error,rflag
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        INTEGER QLEVL(16)
        COMMON /LEVLS/ QLEVL
        dimension ltypov(16)
        logical ltonov(16),rankt(26,16)
        common /maptoo/ ltypov,ltonov,rankt
```

Jul 20 15:13 1989 carr men.f Page 2

```
        data IHLLEN/29/
        data HLTAB/0,0,0,0,0,0,0,0,0,0,10,0,1,0,2,0,3,0,4,0,5,
     +          0,6,0,7,0,8,0,9/
c
c 0 None
c 1 Major Feat.
c 2
c 3
c 4
c 5
c 6
c 7
c 8
c 9 Minor Feat.
c
        rflag = .false.
        qcancl = .false.
        qext2m = .false.
        qretrn = .false.
        qstmnu = .false.
        if (level.gt.9) then
            ix = 9
        else if (level.eq.0) then
            ix = 10
        else
            ix = level
        endif
c        call hilite(.true.,ix,1,IHLLEN,HLTAB)
        mysegn = 6
 100    continue
c**** CSL erase 10/87
            call hilite(.true.,ix,1,IHLLEN,HLTAB)
            call menupr
            call mpick(ichoic,mysegn,ibuttn)
            if (ichoic.ge.1.and.ichoic.le.10) then
                call hilite(.false.,ix,1,IHLLEN,HLTAB)
                call hilite(.true.,ichoic,1,IHLLEN,HLTAB)
                ix = ichoic
                if (ichoic.eq.9) then
                    level = 26
                else if (ichoice.eq.10) then
                    level = 0
                else
                    level = ichoic
                endif
                do 130 i=1,16
                    qlevl (i) = level
  130           continue
                call chlevl(level)
            else
                call check(ibuttn,mysegn,error,rflag)
            endif
            if (sys)
     +      print*,'detcon--ibuttn mysegn error',ibuttn,mysegn,error,rflag
        if(.not.rflag) go to 100
c
```

Jul 20 15:13 1989 carr nen.f Page 3

```
        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    FTRCON
c
c  Functional Description:
c       this subroutine processes the map feature menu
c
c  Input Files/Parameters:
c
c  Output Files/Parameters:
c
c  Subroutines/Functions Called:
c
c  Called By:                    SUBCAL
c
c  Local Variables:
c
c  Restrictions:
c
c  Abnormal Return Conditions:
c
c  Location:
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*|*-*-*-*-

        subroutine ftrcon

c       this subroutine processes the map feature menu

        integer qnextm,HLTAB(33)
        logical qcancl,qext2m,qretrn,qstmnu
        common /b1/ qcancl,qext2m,qretrn,qstmnu,qnextm
        logical sys
        common /sysdbc/ sys
        logical error,rflag
        logical issegm
        integer i
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        integer SEGNO,FIRSEG
        common /SEGNO/ SEGNO,FIRSEG
        logical overtb(16)
        common /overly/overtb
        dimension ltypov(16)
        logical ltonov(16),rankt(26,16)
        common /maptoo/ ltypov,ltonov,rankt
        integer ichoic
```

Jul 20 15:13 1989 carr men.f Page 4

```
        logical qmapup
        common /mapup/qmapup
        logical filply,opnply
        common / polycb / filply,opnply
c
c       commons for grids
c
        COMMON/NEWGRD/ NEWGRD,FIRST
        LOGICAL NEWGRD,FIRST
        COMMON/GRIDS/QSW,QGTYPE,QGCOLR,QXINC,QYINC
        REAL   QXINC(3),QYINC(3)
        LOGICAL   QSW(3)
        INTEGER   QGCOLR(3),QGTYPE(3)
        COMMON /GRDSEG/ LLSEG,UTMSEG,GAUSEG
        INTEGER LLSEG,UTMSEG,GAUSEG
        logical bitmod
        common /bitmod/ bitmod

        data IHLLEN/33/
        data HLTAB/0,0,0,0,1,1,0,2,2,0,3,3,0,4,0,5,0,6,0,7,
     +           0,8,0,9,0,10,0,12,0,16,16,0,17/
c
c     Map Features
c    1 Coastlines,
c     islands/lakes
c    2 Political
c       boundaries
c    3 Internal
c       boundaries
c    4 Rivers
c    5 Railroads
c    6 Roads
c    7 Cities
c    8 Earth fill
c    9 Water fill
c   10 Area names
c   12 MD
c   16 Lat/lon
c       grid lines
c   17 Land fill
c   (A Alter color)
c
        rflag = .false.
        qcancl = .false.
        qext2m = .false.
        qretrn = .false.
        qstmnu = .false.
 100    continue
        do 110 i= 1,16
             if(lton(i))
     +       call hilite(.true.,i,1,IHLLEN,HLTAB)
 110    continue
c
c       hilite for Land fill
c
        if (overtb(5)) call hilite (.true.,i,1,IHLLEN,HLTAB)
```

Jul 20 15:13 1989 carr men.f Page 5

```
        mysegn = 3
        call mpick(ichoic,mysegn,ibuttn)
        if (sys) then
           print*,'ftrcon - ichoic= ',ichoic,llseg,firseg
        endif
        if (ichoic.ge.1.and.ichoic.le.16) then

            segno = firseg + ichoic

              if (lton(ichoic)) then
                call hilite(.false.,ichoic,1,IHLLEN,HLTAB)
                lton(ichoic) = .false.
                if (.not.bitmod.and.issegm(segno))
     +            call jvisbl (segno, 0)
              else
                call hilite(.true.,ichoic,1,IHLLEN,HLTAB)
                lton(ichoic) = .true.
                if (issegm(segno)) then
                   call jvisbl(segno,1)
                else
                  do 120 i= 1,26
c                       set up rank table
                    if (i .le. LEVEL) then
                       rankt(i,ichoic)=.true.
                    else
                       rankt(i,ichoic)=.false.
                    endif
 120              continue

c          make sure  double line rivers are added if necessary
                if ((ichoic.eq.4).and.(LEVEL.ge.1)) then
                  rankt(5,4) = .true.
                endif

c       turn on indefinite political boundaries
                if ((ichoic.eq.2).and.(LEVEL.ge.1)) rankt(2,2) = .true.

c               "cannot earth fill while map is present"

                  if ( ichoic .eq. 8 .and. qmapup) then
                    call mesg(1231)
                    call paws
                  else
                    if (sys) then
                       print*,'calling drawf ichoic= ',ichoic
                    endif
                    call drawf (ichoic)
                  endif
                endif
                call menupr
              endif
        else if (ichoic .eq. 17) then
              if (overtb(5)) then
                  call hilite(.false.,ichoic,1,IHLLEN,HLTAB)
                  overtb(5) = .false.
```

Jul 20 15:13 1989 carm nen.f Page 6

```
                filply = .false.
            else
                call hilite(.true.,ichoic,1,IHLLEN,HLTAB)
                overtb(5) = .true.
                filply = .true.
            endif
            call menupr
        else
            call check(ibuttn,mysegn,error,rflag)
        endif
        if (sys)
     +  print*,'ftrcon--ibuttn mysegn error',ibuttn,mysegn,error,rflag
        if(.not.rflag) go to 100

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     GEOCON
c
c  Functional Description:
c       this subroutine processes the alter display submenu
c
c  Input Files/Parameters:
c
c  Output Files/Parameters:
c
c  Subroutines/Functions Called:
c      mesg                       displays messages in the communica-
c                                  tions area
c
c  Called By:                     SUBCAL
c
c  Local Variables:
c
c  Restrictions:
c
c  Abnormal Return Conditions:
c
c  Location:
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine geocon

c       this subroutine processes the alter display submenu

        Integer qnextm,HLTAB(34)
        Logical qcancl,qext2m,qretrn,qstmnu
        Common /b1/ qcancl,qext2m,qretrn,qstmnu,qnextm
        logical qexitg
        Common /b5/ qexitg
        logical sys
```

Jul 20 15:13 1989 carr men.f Page 7

```
      common /sysdbc/ sys
      character*50 defpth
      common /defpth/ defpth
      common /lendef/ lendef
      character*10 savenm(10)
      integer lsavnm(10)
      common /savenm/ savenm,lsavnm
      logical error,rflag

      data IHLLEN/34/
      data HLTAB/0,0,0,0,1,1,0,2,0,3,0,4,0,5,5,0,6,6,0,7,0,8,8,
     +          0,9,9,0,10,10,0,11,11,11,0/
      data isavnm/0/,nsavnm/10/,savenm/10*'          '/,lsavnm/10*0/

c         Geographic
c           Functions
c        1 Change Width and
c          center point
c        2 Erase map
c        3 Box area
c        4 Draw Current Map
c        5 Annotate on
c          screen
c        6 Distance/Az.
c          between pnts
c        7 Show area
c        8 Display
c          overlay data
c        9 Process/
c          Display DF
c       10 Color area
c          fill

      rflag = .false.
      qcancl = .false.
      qext2m = .false.
      qretrn = .false.
      qstmnu = .false.
 100  continue
      mysegn = 2
      call mpick(ichoic,mysegn,ibuttn)
      if (sys)
     + print*,'geocon--ichoic mysegn ibuttn',ichoic,mysegn,ibuttn
      if (ichoic.ge.1.and.ichoic.le.10) then
          call hilite(.true.,ichoic,1,IHLLEN,HLTAB)
      endif
          if (ichoic.eq.1) then
              call fchsca
              call menupr
          else if (ichoic.eq.2) then
              call eramap
              call menupr
          else if (ichoic.eq.3) then
              call boxare
              call menupr
          else if (ichoic.eq.4) then
```

```
                call drwmap
                call menupr
            else if (ichoic.eq.5) then
                call fannot
                call menupr
            else if (ichoic.eq.6) then
                call distan
c               call paws
                call menupr
            else if (ichoic.eq.7) then
                call fshowa
                call menupr
            else if (ichoic.eq.8) then
                call foverl
                call menupr
            else if (ichoic.eq.9) then
                call fdfpro
                call menupr
            else if (ichoic.eq.10) then
                call fcfill
                call soverl
                call menupr
            else
                call check(ibuttn,mysegn,error,rflag)
            endif
        if (ichoic.ge.1.and.ichoic.le.12) then
            call hilite(.false.,ichoic,1,IHLLEN,HLTAB)
        endif
        if (sys)
     +  print*,'geocon--ibuttn mysegn error',ibuttn,mysegn,error,rflag
        if(.not.rflag) go to 100
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       MMCON
C
C FUNCTIONAL DESCRIPTION:          .
C
C CALLED BY:            .          SUBCAL
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine mmcon

c       this subroutine processes the main menu selections

        Integer qnextm
        Logical qcancl,qext2m,qretrn,qstmnu
        Common /b1/ qcancl,qext2m,qretrn,qstmnu,qnextm
        logical qexitg
        Common /b5/ qexitg
```

```
      common /commen/ xllmen,yllmen,xurmen,yurmen,ibcmen,iocmen,incmen
      common /comgra/xllgra,yllgra,xurgra,yurgra,ibcgra,iocgra
      common /commvp/ xllmvp,yllmvp,xurmvp,yurmvp
      character*50 defpth
      common /defpth/ defpth
      common /lendef/ lendef
      logical error,rflag
      logical sys
      common /sysdbc/ sys
      data maxmen/199/

c     main menu level
      rflag = .false.
      qcancl = .false.
      qext2m = .false.
      qretrn = .false.
      qstmnu = .true.
      qnextm = 1
      call menupr
  100 continue
          mysegn = 1
          call mpick (ichoic,mysegn,ibuttn)
          if (sys)
     +    print*,'mmcon-- ichoic mysegn ibuttn',ichoic,mysegn,ibuttn
          if (ichoic.eq.1) then
c             Geographic functions
              qnextm = 2
              rflag = .true.
          else if (ichoic.eq.2) then
c             Map Features
              qnextm = 3
              rflag = .true.
          else if (ichoic.eq.3) then
c             Map Overlay
              qnextm = 4
              rflag = .true.
          else if (ichoic.eq.4) then
c             Map Projection
              qnextm = 5
              rflag = .true.
          else if (ichoic.eq.5) then
c             Level of Detail
              qnextm = 6
              rflag = .true.
          else if (ichoic.eq.6) then
c             Map Data Base resolution
              qnextm = 7
              rflag = .true.
          else if (ichoic.eq.7) then
c             Save/Restore menu
              qnextm = 8
              rflag = .true.
          else if (ichoic.eq.8) then
c             Tracking menu
              qnextm = 9
              rflag = .true.
```

Jul 20 15:13 1989 carm men.f Page 10

```
c               print*,'Tracking menu called'
            else if (ichoic.eq.9) then
c               save display
                QNEXTM = 021
                RFLAG = .TRUE.
            else if (ichoic.eq.10) then
c               recall display
                QNEXTM = 020
                RFLAG = .TRUE.
            else
                call check(ibuttn,mysegn,error,rflag)
            endif
        if (.not.(qexitg.or.(qnextm.ne.1))) go to 100

        return
        end

C+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    ovrcon
c
c  Functional Description:
c       process map overlay feature menu
c
c  Input Files/Parameters:
c
c  Output Files/Parameters: N/A
c
c  Subroutines/Functions Called:
c
c  Called By: subcal
c
c  Local Variables: N/A
c
c  Restrictions: N/A
c
c  Abnormal Return Conditions:  N/A
c
c  Location:
c
c  Programmer       Date of Last Change     Reason for Change
C  L. McCleary      Jan 1988               separate amp & sys - ovrcon
C  T. WESCOTT       JUL 1988               RANGE RINGS - OVRCON
C  L. McCleary      Mar 1989               SATEL. COV. - OVRCON
c
C-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine ovrcon

c       this subroutine processes the map overlay feature menu

        common/clindx/qmjidx,qarray
        integer qmjidx
        logical qarray(6)

        common /commen/ xllmen,yllmen,xurmen,yurmen,ibcmen,iocmen,incmen
```

Jul 20 15:13 1989 carr men.f Page 11

```
        common /comgvp/ xllgvp,yllgvp,xurgvp,yurgvp
        common /commvp/ xllmvp,yllmvp,xurmvp,yurmvp
        common /comgra/ xllgra,yllgra,xurgra,yurgra,ibcgra,iocgra
        Integer qnextm,HLTAB(20)
        Logical qcancl,qext2m,qretrn,qstmnu
        Common /b1/ qcancl,qext2m,qretrn,qstmnu,qnextm
        logical qexitg
        Common /b5/ qexitg
        logical error,rflag
        logical sys
        common /sysdbc/ sys
        logical overly (16)
        common /overly/ overly
        INTEGER SEGNO,FIRSEG
        COMMON /SEGNO/ SEGNO,FIRSEG
        integer sclseg,clsseg
        common /lnseg/ sclseg,clsseg
c        integer rrgseg
c        common /rrgseg/ rrgseg,rrlat,rrlon,rrincr
        integer ovseg, dfseg
        common /OVSEGS/ ovseg, dfseg
        integer dseg
        logical bitmod
        common /bitmod/ bitmod
        common/ampprm/ampseg
        integer ampseg

c**     map parameters
        integer ovix
        dimension ltypov(16)
        logical ltonov(16),rankt(26,16)
        common /maptoo/ ltypov,ltonov,rankt
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        data IHLLEN/20/
        data HLTAB/0,0,0,0,1,0,2,0,3,0,4,0,5,0,6,0,0,0,0,0/
c
c    Map Overlay
c       Features
c    1 Overlay data = ltonov(1)
c    2 DF data      = ltonov(2)
c    3 Scale Line   = overly(2)
c    4 Classificat. = overly(4)
c    5 Range rings  = overly(5)
c    6 Satel. cov.  = overly(6)
c

c        print*,'ovrcon ampseg --- ',ampseg
c
        rflag = .false.
        qcancl = .false.
        qext2m = .false.
        qretrn = .false.
```

Jul 20 15:13 1989 car ›men.f Page 12

```
        qstmnu = .false.

clj --- The classification on/off flag is now "qmjidx".
clj --- When qmjidx equals 1, there is no classification.
        if (qmjidx.ne.1) then
            overly(4) = .true.
        else
            call hilite(.false.,4,1,IHLLEN,HLTAB)
            overly(4) = .false.
        endif

ctw---  Range rings not yet stored in parameter file and
ctw---  properly recovered.  overly(5) may be random.
c        if (rrgseg.le.0) overly(5) = .false.

c       Satellite coverage not yet stored in parameter file and
c       properly recovered.  overly(6) may be random.
c        if (scvseg.le.0) overly(6) = .false.

 100    continue
        if(ltonov(1))
     +          call hilite(.true.,1,1,IHLLEN,HLTAB)
        if(ltonov(2))
     +          call hilite(.true.,2,1,IHLLEN,HLTAB)
        if (overly(2))
     +          call hilite(.true.,3,1,IHLLEN,HLTAB)
        if (overly(4))
     +          call hilite(.true.,4,1,IHLLEN,HLTAB)
c        if (overly(5))
c     +          call hilite(.true.,5,1,IHLLEN,HLTAB)
c        if (overly(6))
c     +          call hilite(.true.,6,1,IHLLEN,HLTAB)
        mysegn = 4
        call mpick(ichoic,mysegn,ibuttn)
        if (ichoic.eq.1.or.ichoic.eq.2) then
                if (ichoic.eq.1) ix = 21
                if (ichoic.eq.2) ix = 22
c**
c**             check for display overlay data.
c**             if so, use ltonov instead of lton.
c**
                segno = firseg + ix
c**
c**             set dseg to seg# of overlay (ovix=1) or df (ovix=2)
c**
                ovix = ix - 20
                if(ovix .eq. 1) then
                    dseg = ovseg
                else
                    dseg = dfseg
                endif
                if(ltonov(ovix)) then
                    ltonov(ovix) = .false.
                    call hilite(.false.,ichoic,1,IHLLEN,HLTAB)
                    call jvisbl (dseg, 0)
C                    if(ovix .eq. 1)then
```

Jul 20 15:13 1989  carr  men.f Page 13

```
C                        call jpurge(ampseg)
C                    endif
                    if(ovix .eq. 2)then
                        call drwamp(' ',0)
                    endif
                else
                    ltonov(ovix) = .true.
                    call hilite(.true.,ichoic,1,IHLLEN,HLTAB)
c ***               Remove interrogation of segment because when map is changed,
c                   the segment is no longer displayed.  The feature is always
c                   displayed when this feature is selected now.
c                   if (issegm(dseg)) then
c                       call jvisbl (dseg, 1)
c                   else
                        call drawf(ix)
c                   endif
                endif
                call menupr
        else if (ichoic.eq.3) then
                if (overly(2)) then
                    overly(2) = .false.
                    call hilite(.false.,ichoic,1,IHLLEN,HLTAB)
                    call jvisbl(sclseg,0)
                else
                    overly(2) = .true.
                    call hilite(.true.,ichoic,1,IHLLEN,HLTAB)
                    call mapovr
                endif
                call menupr
        else if (ichoic.eq.4) then
c ------------- Classification menu
                QNEXTM = 019
                QSTMNU = .TRUE.
                RFLAG = .TRUE.
        else if (ichoic.eq.5) then
c                if (overly(5)) then
c                    overly(5) = .false.
c                    call hilite(.false.,ichoic,1,IHLLEN,HLTAB)
c                    call jvisbl(rrgseg,0)
c                else
                    overly(5) = .true.
                    call hilite(.true.,ichoic,1,IHLLEN,HLTAB)
                    call ranger
                    call hilite(.false.,ichoic,1,IHLLEN,HLTAB)
c                endif
                call menupr
        else if (ichoic.eq.6) then
                overly(6) = .true.
                call hilite(.true.,ichoic,1,IHLLEN,HLTAB)
                call satcov
                call hilite(.false.,ichoic,1,IHLLEN,HLTAB)
                call menupr
        else
                call check(ibuttn,mysegn,error,rflag)
        endif
        if (sys)
```

Jul 20 15:13 1989 carr men.f Page 14

```
     + print*,'ovrcon--ibuttn mysegn error',ibuttn,mysegn,error,rflag
       if(.not.rflag) go to 100
c
       return
       end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  PROCON
c
c  Functional Description:
c       this subroutine processes the map projection menu
c
c  Input Files/Parameters:
c
c  Output Files/Parameters:
c
c  Subroutines/Functions Called:
c      check                      checks the value of the button re-
c                                 turned from a pick or locate
c      hilite                     highlights menu choices by drawing
c                                 a box around them
c      mpick                      routine to pick from the menu
c      eramap                     erases the map area
c
c  Called By:                     SUBCAL
c
c  Local Variables:
c
c  Restrictions:
c
c  Abnormal Return Conditions:
c
c  Location:
c
c  Programmer                Date of Last Change       Reason for Change
c    Tom Wescott (NOSC)      Mar 7, 88                 Expanded menu.
C-*-*-*-*-*-*-*-*-*-*-*-*-*-*-*-*-*-*-*-*-*-*-*-*-*-*-*-*-*-*-*-*-*-*-*|*-*-*-*-

       subroutine procon

c      this subroutine processes the map projection menu

       parameter (ITEMS=19)
       Integer qnextm,HLTAB(2*ITEMS+2)
       Logical qcancl,qext2m,qretrn,qstmnu
       Common /b1/ qcancl,qext2m,qretrn,qstmnu,qnextm
       logical sys
       common /sysdbc/ sys
       logical qexitg
       Common /b5/ qexitg
       character*50 defpth
       common /defpth/ defpth
       common /lendef/ lendef
       logical error,rflag
c      map parameters
```

Jul 20 15:13 1989 carr men.f Page 15

```
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
      data HLTAB/0,0,0,9,0,10,0,11,0,6,0,1,0,12,0,8,0,7,0,13,0,14,0,
     + 4,0,5,0,15,0,16,0,18,0,19,0,17,0,2,0,3/
c
c     menu call parameters for menu,legend,system area, graphics area
c     lower left x,y, upper right x,y, background and outline color indexs
c
c   Map Projection Menu:
C         ITEM#    PROJECTION          ITPROJ
C          (1)  Albers Equal-area         9
C          (2)  Azimuthal Equal-area     10
C          (3)  Azimuthal Equidistant    11
C          (4)  Equirectangular           6
C          (5)  Gnomonic                  1
C          (6)  Kavraisky IV             12
C          (7)  Lambert Conformal         8
C          (8)  Mercator                  7
C          (9)  Miller                   13
C         (10)  Oblique Mercator         14
C         (11)  Orthographic              4
C         (12)  Perspective               5
C         (13)  Polar Stereographic      15
C         (14)  Polyconic                16
C         (15)  Sinusoidal               18
C         (16)  Stereographic            19
C         (17)  UTM                      17
C         (18)  Ortho. Equatorial         2
C         (19)  Ortho. Polar              3
C
      IHLLEN = 2*ITEMS+2
      rflag = .false.
      qcancl = .false.
      qext2m = .false.
      qretrn = .false.
      qstmnu = .false.
 100  continue
          call menupr
          mysegn = 5
          call hilite(.true.,itproj,1,IHLLEN,HLTAB)
          call mpick(ichoic,mysegn,ibuttn)
          if (ichoic.ge.1.and.ichoic.le.ITEMS) then
              if(itproj.ne.ichoic) then
                      call hilite(.false.,itproj,1,IHLLEN,HLTAB)
                      itproj = ichoic
                      call hilite(.true.,ichoic,1,IHLLEN,HLTAB)
                      call drwmap
              endif
          else
              call check(ibuttn,mysegn,error,rflag)
          endif
          if (sys)
     +    print*,'procon--ibuttn mysegn error',ibuttn,mysegn,error,rflag
```

Jul 20 15:13 1989 carr men.f Page 16

```
      if(.not.rflag) go to 100
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    recdis
c
c  Functional Description:
c       recall display menu controller
c
c  Input Files/Parameters:
c
c  Output Files/Parameters: N/A
c
c  Subroutines/Functions Called:
c
c  Called By: subcal
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988               delete call eramap - recdis
c  S. Lamb         Feb 1988               detec chg - recdis
c  S. Lamb         Aug 1988               allow DrawMap sel - recdis
c
C-*-*-*-*-*-*-*-*-*-*-*-*-*-*-*-*-*-*-*-*-*-*-*-*-*-*-*-*-*-*-*-*-*-*-*|*-*-*-*-
c
      subroutine recdis

c     recall display menu controller

      integer istats(19)
      common /commen/xllmen,yllmen,xurmen,yurmen,ibcmen,iocmen,incmen
      Integer qnextm,HLTAB(21)
      Logical qcancl,qext2m,qretrn,qstmnu
      Common /b1/ qcancl,qext2m,qretrn,qstmnu,qnextm
      logical error,rflag
      logical sys
      common /sysdbc/ sys
      logical bitmod
      common /bitmod/ bitmod
      character*80 filen
      character*80 savdes(20),line
      common /savdes/ savdes
      common /maxsav/ maxsav,limsav
      logical qmapup
      common /mapup/qmapup
      character*50 defpth
```

Jul 20 15:13 1989 car: men.f Page 17

```
        common /defpth/ defpth
        common /lendef/ lendef
        common /txtsz/ txtsiz
        character*20 savcha
        common /isegn/ isegn

        data savcha/'123456789abcdefghijk'/
        data IHLLEN/21/
        data HLTAB/0,1,2,3,4,5,6,7,8,9,10,11,12,13,14,15,
     +  16,17,18,19,20/

c
c    RECALL DISPLAY
c     1
c     2
c     3
c     4
c     5
c     6
c     7
c     8
c     9
c    10
c    11
c    12
c    13
c    14
c    15
c    16
c    17
c    18
c    19
c    20
c
        rflag = .false.
        qcancl = .false.
        qext2m = .false.
        qretrn = .false.
        qstmnu = .false.

 100    continue
        mysegn = 20
        call menvpt
        call menwin
        call getseg (isegn)
        call jropen (isegn)
        x = xllmen + 2.
        do 110 i=1,maxsav
            call jpkid (i)
            call jcolor (24)
            y = yurmen - 2. - i * 2.
            call jmove (x,y)
            if (sys) print*,'recdis -- ',i,x,y,savdes(i)
            call xsize (1.,1.)
            line = savdes(i)
            call jlstrg (line(1:20))
```

Jul 20 15:13 1989 carr men.f Page 18

```
  110   continue
        call jrclos
        call jdetec(isegn, 1)
        call mesg (1245)
        call npick(ichoic,mysegn,ibuttn,isegn)
        if (ichoic.ge.1.and.ichoic.le.maxsav) then
            filen = defpth(1:lendef) // 'save'
     +      // savcha(ichoic:ichoic)
            lenfn = lendef + 5
            if (sys) print*,'recdis -- ',filen(1:lenfn),lenfn
            call rparam (lenfn,filen,.true.,ierror)
            if (ierror .eq. 0) then
                call mesg(1221)
c                call eramap
                call enall
                if (bitmod) then
                    call recdat (filen,lenfn)
                    call mapper (.false.)
                    CALL MAPOVR
                else
                    call drwmap
                endif
                qmapup = .true.
            else
                call mesg(1230)
                call paws
                call jpurge (isegn)
            endif
        else
            call check(ibuttn,mysegn,error,rflag)
            call jisgmt(isegn,istats)
c               --purge seg if not alrdy deleted due to oper selec
            if (istats(1).ne.0) call jpurge (isegn)
        endif
        if(.not.rflag) go to 100
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    rescon
c
c  Functional Description:
c       process save/restore menu
c
c  Input Files/Parameters:
c
c  Output Files/Parameters: N/A
c
c  Subroutines/Functions Called:
c
c  Called By: subcal
c
c  Local Variables: N/A
c
```

Jul 20 15:13 1989 carr men.f Page 19

```
c  Restrictions: N/A
c
c  Abnormal Return Conditions:  N/A
c
c  Location:
c
c  Programmer       Date of Last Change      Reason for Change
C  L. McCleary      Jan 1988                 fix call setcol - rescon
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine rescon

c       this subroutine processes the save/restore selections

        common /tablet/ inpdev
        common /commvp/ xllmvp,yllmvp,xurmvp,yurmvp
        common/scratr/qbox,qbkgrd
        integer      qbox,qbkgrd
        character*50 chatmp
        character*50 defpth
        common /defpth/ defpth
        common /lendef/ lendef
        Integer qnextm,HLTAB(35)
        Logical qcancl,qext2m,qretrn,qstmnu
        Common /b1/ qcancl,qext2m,qretrn,qstmnu,qnextm
        logical error,rflag
        logical qexitg
        Common /b5/ qexitg
        character * 25 retstr
        real hlscol(3,0:255)
        common /hlscol/ hlscol
        integer menclr
        integer mencol
        logical sys
        common /sysdbc/ sys

c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        logical qmapup
        common /mapup/qmapup
        logical bitmod
        common /bitmod/ bitmod
        data IHLLEN/35/
        data HLTAB/0,0,0,0,1,1,0,2,2,0,0,0,0,0,0,3,0,4,0,5,
     +       0,0,0,0,0,0,6,0,7,0,8,0,9,0,0/
        data MENCLR /10/
        data MENCOL /8/

c       menu call parameters for menu,legend,system area, graphics area
c       lower left x,y, upper right x,y, background and outline color indexs
```

Jul 20 15:13 1989 carm men.f Page 20

```
c     Save/Restore
c       parameters
c     1 Save
c         display
c     2 Restore
c         display
c     Set to system
c       defaults
c     3 Colors
c     4 Map params.
c     5 Boundaries
c      Set to user
c        values
c     6 Colors
c     7 Map params.
c     8 Boundaries
c     9 Alter color
c     0 Save colors

        rflag = .false.
        qcancl = .false.
        qext2m = .false.
        qretrn = .false.
        qstmnu = .false.
        mysegn = 8
 100    continue
            call menupr
            call mpick(ichoic,mysegn,ibuttn)
            if (ichoic .ge. 1 .and. ichoic .le. 9) then
                call hilite(.true.,ichoic,1,IHLLEN,HLTAB)
            endif
            if (ichoic.eq.1) then
c               save display
                call prompt(1219,retstr,25,irchar)
                if (irchar.gt.0) then
                    call mesg (1220)
                    call sparam (irchar,retstr,.true.,ierror)
                    if (bitmod) call savdat (retstr,irchar)
                endif
            else if (ichoic.eq.2) then
c               recall display
                call prompt (1208,retstr,25,irchar)
                if (irchar.gt.0) then
                    call mesg (1221)
                    call rparam (irchar,retstr,.true.,ierror)
                    if (ierror .eq. 0) then
c****CSL*not needed since drwmap calls eramap*
c                        call eramap
                        if (bitmod) then
                            call recdat (retstr,irchar)
                        else
                            call drwmap
                        endif
                        qmapup = .true.
                    else
                        call mesg(1230)
```

Jul 20 15:13 1989 carr men.f Page 21

```
                      call paws
                   endif
               endif
            else if (ichoic.eq.3) then
               call mesg (1222)
               chatmp = defpth(1:lendef) // 'default'
               call rcolor (lendef+7,chatmp)
            else if (ichoic.eq.4) then
               call mesg (1223)
               chatmp = defpth(1:lendef) // 'default'
               call rparam (lendef+7,chatmp,.false.,ierror)
               call eramap
            else if (ichoic.eq.5) then
c              call mesg (1224)
               chatmp = defpth(1:lendef) // 'default'
               call rbound (lendef+7,chatmp,.false.)
            else if (ichoic.eq.6) then
               call prompt (1208,retstr,25,irchar)
               if (irchar.gt.0) then
                   call mesg (1222)
                   call rcolor (irchar,retstr)
               endif
            else if (ichoic.eq.7) then
               call prompt (1208,retstr,25,irchar)
               if (irchar.gt.0) then
                   call mesg (1223)
                   call rparam (irchar,retstr,.false.,ierror)
                   call eramap
               endif
            else if (ichoic.eq.8) then
               call prompt (1208,retstr,25,irchar)
               if (irchar.gt.0) then
                   call rbound (irchar,retstr,.false.)
               endif
            else if (ichoic.eq.9) then
               call prompt (1225,retstr,25,irchar)
               if (irchar.le.0) go to 155
               read (retstr(1:irchar),1200,err=150) icol
 1200          format(i3)
               if (sys) print*,'Color index selected: ',icol
               if (icol.ge.0.and.icol.le.255) then
                   call mesg (1226)

c**                clearing menu area
                   call drawm (MENCLR,ierror)
                   call jvport (xllmvp,xurmvp,yllmvp,yurmvp)
                   call enall
c                   call setcol (icol,8,248,22,qbkgrd,qbox,
                   call setcol (icol,6,248,22,qbkgrd,qbox,
     +             hlscol(1,icol))
c                   call boxclr
                   call soverl
c**                bring back save/restore menu
                   call drawm (MENCOL,ierror)
               endif
               go to 155
```

Jul 20 15:13 1989 carr nen.f Page 22

```
  150              continue
                   call mesg(1227)
                   if (sys)
     +             print*,'Error on color index conversion',icol,
     +             irchar,'  ',retstr(1:irchar)
                   call paws
  155          continue
c            else if (ichoic.eq.10) then
c                call prompt(1208,retstr,25,irchar)
c                if (irchar.gt.0) then
c                    call mesg (1228)
c                    call scolor (retstr,irchar)
c                endif
            else
                call check(ibuttn,mysegn,error,rflag)
            endif
        call hilite(.false.,ichoic,1,IHLLEN,HLTAB)
        if(.not.rflag) go to 100

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                 RSLCON
c
c  Functional Description:
c       this subroutine causes map database resolution menu to appear
c
c  Input Files/Parameters:
c
c  Output Files/Parameters:
c
c  Subroutines/Functions Called:
c      check                    checks the value of the button re-
c                               turned from a pick or locate
c      hilite                   highlights menu choices by drawing
c                               a box around them
c      mpick                    routine to pick from the menu
c
c  Called By:                   SUBCAL
c
c  Local Variables:
c
c  Restrictions:
c
c  Abnormal Return Conditions:
c
c  Location:
c
c  Programmer         Date of Last Change       Reason for Change
c  C.S.Lamb           Jan 1988                 jclear logic - rslcon
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine rslcon
```

```
c       this subroutine causes map database resolution menu to appear

        Integer qnextm,HLTAB(30)
        Logical qcancl,qext2m,qretrn,qstmnu
        Common /b1/ qcancl,qext2m,qretrn,qstmnu,qnextm
        logical sys
        common /sysdbc/ sys
        logical qexitg
        Common /b5/ qexitg
        logical error,rflag
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        character*6 curwdb
        common /curwdb/ curwdb
        logical quickd
        common /quickd/ quickd
        integer fntab(17)
        common /fntab/ fntab
        character suffix(6)
        character*6 wdb
        integer itrtab (6)
        integer is

        data IHLLEN/30/
        data HLTAB/0,0,0,0,0,0,0,0,1,0,2,0,3,0,4,0,5,0,6,
     +             0,0,0,0,0,0,0,0,7,0,8/
        data itrtab/1,5,8,11,14,17/
        data suffix/'a','b','c','d','e','f'/
c        1 Most detail
c        2
c        3
c        4
c        5
c        6 Least detail
c
c          Quickdraw
c
c             On
c             Off
c
        rflag = .false.
        qcancl = .false.
        qext2m = .false.
        qretrn = .false.
        qstmnu = .false.
        do 110 ix = 1,6
            if(curwdb(6:6).eq.suffix(ix)) is = ix
  110   continue

c        if (quickd) then
c          call hilite (.true.,7,1,IHLLEN,HLTAB)
```

```
c        else
c          call hilite (.true.,8,1,IHLLEN,HLTAB)
c        endif

c        call hilite (.true.,is,1,IHLLEN,HLTAB)

       mysegn = 7
  100  continue
           if (quickd) then
             call hilite (.true.,7,1,IHLLEN,HLTAB)
           else
             call hilite (.true.,8,1,IHLLEN,HLTAB)
           endif
           call hilite (.true.,is,1,IHLLEN,HLTAB)
           call menupr
           call mpick(ichoic,mysegn,ibuttn)
           if (ichoic.ge.1.and.ichoic.le.6) then
               call hilite(.false.,is,1,IHLLEN,HLTAB)
               call hilite(.true.,ichoic,1,IHLLEN,HLTAB)
c              translate input # to only those wdbii versions available
c              set up both quickdraw and regular wdbii level
               is = fntab (itrtab(ichoic))
               wdb = 'wdbii' // suffix(is)
               if (wdb.ne.curwdb) then
                   curwdb = wdb
                   call chawdb (6,curwdb)
               endif
           else if ( (ichoic.eq.7) .and. (.not.quickd) ) then

c    turn on quickdraw

                  call hilite (.false.,8,1,IHLLEN,HLTAB)
                  call hilite (.true.,7,1,IHLLEN,HLTAB)
                  quickd = .true.
                  call hilite (.false.,is,1,IHLLEN,HLTAB)
                  is = is + 2
                  if (is .gt. 6) is = 6
                  wdb = 'wdbii' // suffix(is)
                  if (wdb.ne.curwdb) then
                    curwdb = wdb
                    call chawdb (6,curwdb)
                  endif
                  call hilite (.true.,is,1,IHLLEN,HLTAB)
           else if ( (ichoic.eq.8) .and. (quickd) ) then

c    turn off quickdraw

                  call hilite (.false.,7,1,IHLLEN,HLTAB)
                  call hilite (.true.,8,1,IHLLEN,HLTAB)
                  quickd = .false.
                  call hilite (.false.,is,1,IHLLEN,HLTAB)
                  is = is - 2
                  if (is .lt. 1) is = 1
                  wdb = 'wdbii' // suffix(is)
                  if (wdb.ne.curwdb) then
                    curwdb = wdb
```

Jul 20 15:13 1989 carm nen.f Page 25

```
                    call chawdb (6,curwdb)
                  endif
                  call hilite (.true.,is,1,IHLLEN,HLTAB)
           else
               call check(ibuttn,mysegn,error,rflag)
           endif
           if (sys)
     +     print*,'rslcon--ibuttn mysegn error',ibuttn,mysegn,rflag
       if(.not.rflag) go to 100
c
       return
       end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      SAVDIS
C
C FUNCTIONAL DESCRIPTION:         .
C
C CALLED BY:                      SUBCAL
C
C PROGRAMMER:                     DATE OF LAST CHANGE     REASON FOR CHANGE
c  S. Lamb                    Feb 1988                  detec chg - savdis
C
C-*-*-*-*-*-*-*-*-*-*-*-*-*-*-*-*-*-*-*-*-*-*-*-*-*-*-*-*-*-*-*-*-*-*-*-*-*|*-*-*-*-

       subroutine savdis

c      save display menu controller

       common /commen/xllmen,yllmen,xurmen,yurmen,ibcmen,iocmen,incmen
       Integer qnextm,HLTAB(21)
       Logical qcancl,qext2m,qretrn,qstmnu
       Common /b1/ qcancl,qext2m,qretrn,qstmnu,qnextm
       logical error,rflag
       logical sys
       common /sysdbc/ sys
       logical bitmod
       common /bitmod/ bitmod
       character*80 filen,line
       character*80 savdes(20)
       common /savdes/ savdes
       common /maxsav/ maxsav,limsav
       character * 80 retstr
       character*50 defpth
       common /defpth/ defpth
       common /lendef/ lendef
       common /txtsz/ txtsiz
       character*20 savcha
       common /isegn/ isegn

       data savcha/'123456789abcdefghijk'/
       data IHLLEN/21/
       data HLTAB/0,1,2,3,4,5,6,7,8,9,10,11,12,13,14,15,
     + 16,17,18,19,20/
```

```
c     SAVE DISPLAY
c     1
c     2
c     3
c     4
c     5
c     6
c     7
c     8
c     9
c    10
c    11
c    12
c    13
c    14
c    15
c    16
c    17
c    18
c    19
c    20
        if (sys) print*,'savdis -- ',maxsav,limsav,'  ',savdes(1)
        rflag = .false.
        qcancl = .false.
        qext2m = .false.
        qretrn = .false.
        qstmnu = .false.

        mysegn = 21
        call menvpt
        call menwin
        call getseg (isegn)
        call jropen (isegn)
        x = xllmen + 2.
        do 110 i=1,maxsav
            call jpkid (i)
            call jcolor (24)
            y = yurmen - 2. - i * 2.
            call jmove (x,y)
            if (sys) print*,'recdis -- ',i,x,y,savdes(i)
            call xsize (1.,1.)
            line = savdes(i)
            call j1strg (line(1:20))
 110    continue
        call jrclos
        call jdetec(isegn, 1)
100     continue
        call mesg (1245)
        call npick(ichoic,mysegn,ibuttn,isegn)
        if (ichoic.ge.1.and.ichoic.le.maxsav) then
            call prompt(1219,retstr,25,irchar)
            if (irchar.gt.0) then
                savdes(ichoic) = '                         '
                savdes(ichoic) = retstr(1:irchar)
```

Jul 20 15:13 1989 carr men.f Page 27

```
            endif
            filen = defpth(1:lendef) // 'save'
     +      // savcha(ichoic:ichoic)
            lenfn = lendef + 5
            if (sys) print*,'savdis -- ',filen(1:lenfn),lenfn
            call mesg(1220)
            call sparam (lenfn,filen,.true.,ierror)
            if (bitmod) call savdat (filen,lenfn)
            qretrn = .true.
            rflag = .true.
        else
            call check(ibuttn,mysegn,error,rflag)
        endif
        if(.not.rflag) go to 100
        call jpurge (isegn)

        return
        end

C+*+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     TRKCON
C
C FUNCTIONAL DESCRIPTION:        .
C
C CALLED BY:                     SUBCAL
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine trkcon

c       this subroutine processes the tracking menu selection

        logical error
        logical rflag
        integer ichoic
        integer lctrak
        integer mysegn
        integer ibuttn
        integer line
        integer lpp
        integer secnds
        real xarray(2)
        real yarray(2)

        logical lton(16), dotem
        integer ipgrid(4)
        integer ltyptb(16)
        integer HLTAB(22)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        integer ltypov(16)
```

Jul 20 15:13 1989 carr men.f Page 28

```
        common /gphwdo/xllgeo,yllgeo,xurgeo,yurgeo

        logical ltonov(16),rankt(26,16)
        common /maptoo/ ltypov,ltonov,rankt

        data secnds /0/
        data IHLLEN /22/
        data HLTAB
     +      /0,0,0,0,0,0,1,0,2,0,0,3,0,4,0,5,0,6,0,7,0,8/

c    Tracking Menu
c       TRACKING
c    1     ON
c    2     OFF
c    3 Plot Suppress
c    4 Plot UnSuppress
c    5 Set Fade Time
c    6 Replay Tracks
c    7 Interrogate
c    8 Display Text
c <<<<   9 Time window  >>>>> omitted


        lctrak = 3
        if (ltonov(lctrak)) then
            line = 1
        else
            line = 2
        endif
        call hilite(.true.,line,1,IHLLEN,HLTAB)

        mysegn = 9
 100    continue
            call menupr

c           choose which line on the menu to hilite

            call mpick(ichoic,mysegn,ibuttn)
            if (ichoic.ge.1.and.ichoic.le.8) then
                if (ichoic .eq. 1 .and. .not. ltonov(lctrak)) then
                    call hilite(.false.,2,1,IHLLEN,HLTAB)
                    call hilite(.true.,ichoic,1,IHLLEN,HLTAB)
                    call ploton
                else if (ichoic .eq. 2 .and. ltonov(lctrak)) then
                    call hilite(.false.,1,1,IHLLEN,HLTAB)
                    call hilite(.true.,ichoic,1,IHLLEN,HLTAB)
                    call pltoff
                else if (ichoic .eq. 3) then
                    call hilite(.true.,ichoic,1,IHLLEN,HLTAB)
                    call pltsup
                else if (ichoic .eq. 4) then
                    call hilite(.true.,ichoic,1,IHLLEN,HLTAB)
                    call pltuns
                else if (ichoic .eq. 5) then
                    call hilite(.true.,ichoic,1,IHLLEN,HLTAB)
                    call setfad
```

```
Jul 20 15:13 1989  carr  nen.f Page 29

                else if (ichoic .eq. 6) then
                    call hilite(.true.,ichoic,1,IHLLEN,HLTAB)
                    call replay(secnds)
                else if (ichoic .eq. 7) then
                    call hilite(.true.,ichoic,1,IHLLEN,HLTAB)
                    call tquery
                else if (ichoic .eq. 8) then
                    call hilite(.true.,ichoic,1,IHLLEN,HLTAB)

c                   set up extent of page for text display
c                   put parms in for lower left/upper right
c                   and lines per page.

                    xarray(1) = xllgeo + 1.0
                    xarray(2) = xurgeo - 1.0
                    yarray(1) = yllgeo + 1.0
                    yarray(2) = yurgeo - 1.0
c                    lpp = 36
                    lpp = 33
                   call writex(xarray,yarray,lpp)
                endif

cccc                else if (ichoic .eq. 9) then
cccc                    call hilite(.true.,ichoic,1,IHLLEN,HLTAB)
cccc                    call timwin
                if (ichoic .gt. 2) then
                    call hilite(.false.,ichoic,1,IHLLEN,HLTAB)
                endif
            else
                call check(ibuttn,mysegn,error,rflag)
            endif
        if(.not.rflag) go to 100
c       print*,'exit trkcon'
        return
        end
```

```
Jul 20 15:06 1989 carr mmi.f Page 1

C+*+*+*+*+*+*+*+*+*+*+*+*+*+*+*+*+*+*+*+*+*+*+*+*+*+*+*+*+*+*+*+*+*|*+*+*+*+
C UNIT NAME: BOXARE
C
C FUNCTIONAL DESCRIPTION:  THIS SUBROUTINE DOES THE BOX AREA CALCUALTIONS
C
C INPUT FILES/PARAMETERS:
C
C GLOBAL VARIABLES :
C
C OUTPUT FILES/PARAMETERS:  NONE.
C
C SUBROUTINES/FUNCTIONS CALLED : NONE.
C
C CALLED BY:                    GEOCON
C
C LOCAL VARIABLES:
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     DAVE NATION                                       ORIGINAL CODE.
C     JERRY FENERTY                                     DOCUMENTATION AND MO
C                                                       FOR A21 PROTOTYPE.
C     Tom Wescott (NOSC)        7/88                    xrnmnw from arc dist.
C
C-*-*-*-*-*-*-*-*-*-*-*-*-*-*-*-*-*-*-*-*-*-*-*-*-*-*-*-*-*-*-*-*-*-*|*-*-*-*-

        SUBROUTINE BOXARE

C       THIS SUBROUTINE DOES THE BOX AREA CALCUALTIONS

C       MAP PARAMETERS
        LOGICAL LTON(16),DOTEM
        INTEGER IPGRID(4),LTYPTB(16)
        COMMON /MAP/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT

        integer qdsdev,qpydev,qecho,qlecho
        common /device/ qdsdev,qpydev,qecho,qlecho

        LOGICAL INVALI
        COMMON /INVALI/ INVALI

        LOGICAL map
        common /mapdbc/ map

        LOGICAL vax
        common /vaxdbc/ vax

        INTEGER QCRMNU
```

Jul 20 15:06 1989 carr mmi.f Page 2

```
      COMMON /B6/ QCRMNU

      INTEGER QFB(26),QMB(4)
      COMMON /BUTONS/ QFB,QMB

      LOGICAL QPREV
      COMMON /PREV/ QPREV

      common /pie/ pie,tpie,pio2,pio4

      COMMON /B1/ QCANCL,QEXT2M,QRETRN,QSTMNU,QNEXTM
      INTEGER QNEXTM
      LOGICAL QCANCL,QEXT2M,QRETRN,QSTMNU

      LOGICAL VALID,ERROR,RFLAG

      ERROR = .FALSE.
      RFLAG = .FALSE.
      MYSEGN = QCRMNU

c     CONVERT MINUTES TO RADIANS BY MULTIPLYING BY CM2RAD
      DATA CM2RAD/2.908882087E-4/
c
      CLA = CLAT
      CLO = CLON

  20  CONTINUE
      CALL MESG(275)
      CALL GRAVPT
      CALL GEOWIN
      cursbx = 0.
      cursby = 0.
      call jconwv (cursbx,cursby,0.,vx,vy)
      call jpecho (1,2,1,vx,vy)
      CALL LOCGEO (IBUT,X,Y,VALID)
      cursbx = x
      cursby = y
      IF (IBUT.NE.QMB(1)) THEN
          CALL CHECK(IBUT,MYSEGN,ERROR,RFLAG)
          IF (ERROR) THEN
              CALL MESG(2)
              CALL PAWS
          ENDIF
          IF (RFLAG) GOTO 66
          GOTO 20
      ENDIF
      IF (map)
     + PRINT*,'IN BOXARE FIRST POINT IS ',VALID
      IF (VALID) GOTO 35
      CALL MESG(288)
      CALL PAWS
      GOTO 20

  35  CONTINUE
      CALL MESG(276)
      CALL GRAVPT
```

Jul 20 15:06 1989 carr mmi.f Page 3

```
      CALL GEOWIN
      call jconwv (cursbx,cursby,0.,vx,vy)
      call jpecho (1,2,1,vx,vy)
c     --save echo type; set for Rectangle (except for vax)
      ijkl = qlecho
      qlecho = 6
      if (vax) qlecho = 2
      CALL LOCGEO (IBUT,X2,Y2,VALID)
      qlecho = ijkl
      IF (IBUT.NE.QMB(1)) THEN
          CALL CHECK(IBUT,MYSEGN,ERROR,RFLAG)
          IF (ERROR) THEN
              CALL MESG(2)
              CALL PAWS
          ENDIF
          IF (RFLAG) GOTO 66
          GOTO 35
      ENDIF

      IF (map)
     + PRINT*,'IN BOXARE SECOND POINT IS ',VALID
      IF (VALID) GOTO 45
      CALL MESG(288)
      CALL PAWS
      GOTO 35

 45   CONTINUE
      YC = (Y+Y2)/2.
      XC = (X+X2)/2.
c
      CALL INITIA(XC,YC,CLAT,CLON,XRAD,YRAD,ITPROJ,IRES,XRNM,
     +            ORHALT)
      CALL XYTOLL(XC,YC,CLAT,CLON)

      IF (INVALI) THEN
          IF (map)
     +     PRINT*,'BOXARE CONVERSION OF CENTER POINT IS NOT POSSIBLE'
          CALL MESG(288)
          CALL PAWS
          CLAT=CLA
          CLON=CLO
          GOTO 20
      ENDIF

ctfw  CALL XYTOLL(X,YC,CLA2,CLO2)
      call xytoll(x,y,cla2,clo2)

      IF (INVALI) THEN
          IF (map)
     +     PRINT*,'BOXARE CONVERSION OF SECOND POINT IS NOT POSSIBLE'
          CALL MESG(288)
          CALL PAWS
          CLAT=CLA
          CLON=CLO
          GOTO 20
      ENDIF
```

```
ctfw    XRNMNW = ABS(CLON-CLO2)/CM2RAD
ctfw
ctfw    Set map radius to arc distance of box semi-major axis.
        call ll2da(clat,clon,cla2,clo2,rdist,az,range,bering)
        xdist = abs(rdist*sin(az))
        ydist = abs(rdist*cos(az))
        dist = amax1(xdist,ydist)
        xrnmnw = dist/cm2rad
ctfw
        CALL CHSCAL (XRNMNW)
        QPREV = .TRUE.

        CALL UPDTMP

 66     CONTINUE
        QRETRN = .FALSE.
        RETURN
        END

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DISTAN
C
C FUNCTIONAL DESCRIPTION:        .
C
C CALLED BY:                     GEOCON
C
C PROGRAMMER:                    DATE OF LAST CHANGE     REASON FOR CHANGE
C Tom Wescott (NOSC)             Mar 89                  improve accuracy
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine distan

c       calculate the distance between two points and display

        COMMON /PIE/ PIE,TPIE,PIO2,PIO4
        COMMON /ER/ ER,ERD
        REAL*8 ERD
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        logical valid
        common /comsys/ xllsys,yllsys,xursys,yursys,ibcsys,iocsys
        COMMON /RADE/RADE
        common /comgvp/ xllgvp,yllgvp,xurgvp,yurgvp
        common /ctext/ igrtxt,isytxt,iantxt
        character*80 line,blanks
        character*72 amptxt(4)
        integer qdsdev,qpydev,qecho,qlecho
        common /device/ qdsdev,qpydev,qecho,qlecho
```

Jul 20 15:06 1989 carr mmi.f Page 5

```
      INTEGER QFB(26),QMB(4)
      COMMON /BUTONS/ QFB,QMB
      COMMON /B1/ QCANCL,QEXT2M,QRETRN,QSTMNU,QNEXTM
      INTEGER QNEXTM
      LOGICAL QCANCL,QEXT2M,QRETRN,QSTMNU
      LOGICAL ERROR,RFLAG
      common/llseg/llsgmt,llfrst
      integer llsgmt
      logical llfrst

      integer dstsg1,dstsg2,dstsg3
      logical dstfst
      common/mrkseg/dstsg1,dstsg2,dstsg3,dstfst

      data cdg2ml/69./, cml2km/1.60934/, cnm2mi/1.1508/
      data blanks/'                                    '/
      data x1,y1 / 0.,0. /
C
C  THE FOLLOWING TWO DATA STATEMENTS WERE USED TO ADD THE DISPLAY OF
C  DISTANCE/AZ BEARING TO SCREEN
C
      data ernm /3440.34/
      data steps /60/

      valid = .true.

      ERROR = .FALSE.
      RFLAG = .FALSE.
      MYSEGN = QCRMNU
      isytxt = 16
 10   call mesg (1201)
      call jvport (xllgvp,xurgvp,yllgvp,yurgvp)
      call jwindo (-xrad,xrad,-yrad,yrad)
      call jconwv (x1,y1,0.,vx,vy)
      call jpecho (1,2,1,vx,vy)
      call locgeo (ibutn,x1,y1,valid)
c
      IF (IBUTN.NE.QMB(1)) THEN
          CALL CHECK(IBUTN,MYSEGN,ERROR,RFLAG)
          IF (ERROR) THEN
              CALL MESG(2)
              CALL PAWS
          ENDIF
          IF (RFLAG) GOTO 66
          GOTO 10
      ENDIF
c
      if (.not. valid) then
        call mesg(288)
        call paws
        goto 10
      endif
      IF(.NOT. DSTFST)THEN
           CALL JPURGE(DSTSG1)
           CALL JPURGE(DSTSG2)
           CALL JPURGE(DSTSG3)
```

```
Jul 20 15:06 1989  car:  mmi.f Page 6

        ELSE
            CALL GETSEG(DSTSG1)
            CALL GETSEG(DSTSG2)
            CALL GETSEG(DSTSG3)
            DSTFST = .FALSE.
        END IF
        IF(.NOT. LLFRST)THEN
             CALL JPURGE(LLSGMT)
c ----- updated 7/31/87 CSL
             llfrst = .true.
        END IF
        CALL JROPEN(dstsg1)
        CALL JCMARK(4)
        CALL XCOLOR(32)
        CALL jmark (x1,y1)
        CALL JRCLOS
c
        CALL XYTOLL(X1,Y1,plat,plon)
 20     call mesg (1202)
        call jvport (xllgvp,xurgvp,yllgvp,yurgvp)
        call jwindo (-xrad,xrad,-yrad,yrad)
        call jconwv (x1,y1,0.,vx,vy)
        call jpecho (1,2,1,vx,vy)
c       --save echo type; set for Rubberband line
        ijkl = qlecho
        qlecho = 2
        call locgeo (ibutn,x2,y2,valid)
        qlecho = ijkl
c
        IF (IBUTN.NE.QMB(1)) THEN
            CALL CHECK(IBUTN,MYSEGN,ERROR,RFLAG)
            IF (ERROR) THEN
                CALL MESG(2)
                CALL PAWS
            ENDIF
            IF (RFLAG) THEN
c       -- purge the segment containing first marker
               CALL JPURGE(DSTSG1)
c       -- open & close segs so purges (upon reentry) don't fail
               CALL JROPEN(DSTSG1)
               CALL JRCLOS
               CALL JROPEN(DSTSG2)
               CALL JRCLOS
               CALL JROPEN(DSTSG3)
               CALL JRCLOS
               GOTO 66
            ELSE
               GOTO 20
            ENDIF
        ENDIF
        if (.not. valid) then
          call mesg(288)
          call paws
          goto 20
        endif
        CALL JROPEN(dstsg2)
```

Jul 20 15:06 1989 car mmi.f Page 7

```
        CALL JCMARK(4)
        CALL XCOLOR(32)
        CALL JMARK(X2,Y2)
        CALL JRCLOS
c
        CALL XYTOLL(X2,Y2,plat2,plon2)
C
        call ll2da(plat,plon,plat2,plon2,dist,az,range,bering)
        degazi = bering
        rnmiles = range
        rmiles = rnmiles * cnm2mi
        rkilom = rmiles * cml2km
C
C   FOLLOWING CHANGES (ADDITON OF NEXT 8 LINES) WERE NECESSARY TO DISPLAY
C   THE DISTANCE/AZIMUTH BEARING ARC BETWEEN THE TWO POINTS (RPSMITH 11/87)
C
        RINC = XRNM / (ERNM * STEPS)
        AZMTH = DEGAZI / RADE
        RANGE = DIST / RADE
        CALL JROPEN (dstsg3)
        CALL XCOLOR (32)
        iacc = 1
        call plotgc (plat,plon,AZMTH,RANGE,RINC,itproj,iacc)
        CALL JRCLOS
        line = ' '
        line = ' '
        line(1:8) = 'Points: '
        iegeo = 0
        call formt (plat,plon,iegeo,line(9:24))
        iegeo = 0
        call formt (plat2,plon2,iegeo,line(28:43))
        line(25:27) = ' - '
        amptxt(1) = line
        line = ' '
        write(line(1:8),1100) rnmiles
 1100   format(f8.2)
        line(10:13) = 'NM  '
        write(line(14:22),1100) rmiles
        line(24:27) = 'MI  '
        write(line(28:36),1100) rkilom
        line(38:39) = 'KM'
        amptxt(2) = line
        line = ' '
        write(line(1:8),1100) degazi
        line(10:25) = 'Degrees azimuth'
        amptxt(3) = line
        call clrcom
        call drwamp (amptxt,3)

 66     CONTINUE
        QRETRN = .FALSE.
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
```

```
Jul 20 15:06 1989  carı  mmi.f Page 8

C UNIT NAME:                     FCHAZU
C
C FUNCTIONAL DESCRIPTION:        Updates azimuth of central great circle for
C                                oblique conics.
C INPUT FILES/PARAMETERS:
C
C GLOBAL VARIABLES:              None.
C
C OUTPUT FILES/PARAMETERS:       az    -  Azumuth, degrees.
C                                azlat -  Latitude where azimuth specified.
C
C SUBROUTINES CALLED:            None.
C
C CALLED BY:                      FCHSCA
C
C LOCAL VARIABLES:               None.
C
C RESTRICTIONS:                  None.
C
C ABNORMAL RETURN CONDITIONS:    None.
C
C PROGRAMMER:                    DATE OF LAST CHANGE     REASON FOR CHANGE
C     Tom Wescott (NOSC)         May 88                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine fchazu
c
      character*25 retstr
      character*1 str(25)
      equivalence (retstr,str)
      character chr
      common /center/ clat,clon,cclat,sclat
      common /proj/itproj,wmrad,xoffs,yoffs,scalr,not1st
      common /oblm/ polat,polon,az,azlat,gamma,xshift
      parameter(D2R = 3.14159/180.0)
      logical chazsp
      common /chazsp/ chazsp
c
c
*-------------------------------------------------------------------------|--+
* Itproj:  1  2  3  4  5  6  7  8  9 10 11 12 13 14 15 16 17 18 19 20 21  |
*----------------------------------------------------------------------------+
*          g  o  o  o  p  e  m  l  a  a  a  k  m  o  p  p  u  s  s        |
*          n  r  r  r  e  q  e  a  l  z  z  a  i  b  o  o  t  i  t        |
*          o  e  p  t  r  r  r  m  b  e  e  v  l  l  s  l  m  n  e        |
*          m  q  o  h  s  e  c  c  r  a  d  r  l  m  t  y  z  u  r        |
*----------------------------------------------------------------------------+
      goto(1,01,01,01,01,01,01,01,01,01,01,01,01,02,01,01,01,01,01
     +    )itproj
c
c     Case 1:  Map is not oblique, set default azumuth for next map.
 1       continue
         az = 0.0
         azlat = 0.0
         go to 99
```

Jul 20 15:06 1989 carr mmi.f Page 9

```
c
c     Case 2:  Map is oblique, Allow user to override last values.
 2       continue
c        Prompt user for great circle azimuth.
         call prompt(1212,retstr,25,irchar)
         if (irchar.gt.0) then
            call ascint (retstr,iazu,irchar,ierror)
            if(ierror.eq.0) then
               chazsp = .true.
               az = iazu*D2R
c              Prompt for latitude of azimuth specification.
               call prompt(1213,retstr,25,irchar)
               if (irchar.gt.0) then
                  isign = +1
                  chr = str(irchar)
                  if (chr .eq. 'N' .or. chr .eq. 'n') then
                     irchar = irchar - 1
                  elseif (chr .eq. 'S' .or. chr .eq. 's') then
                     isign = -1
                     irchar = irchar - 1
                  endif
               endif
               if (irchar.gt.0) then
                  call ascint (retstr,iazl,irchar,ierror)
                  if (ierror.eq.0) then
                     azlat = isign*iazl*D2R
                  else
                     azlat = clat
                  endif
               endif
            endif
         endif
c
c        Use Law of Sines to verify that the specified great circle reaches
c        to map center latitude.  If not, alert user to the situation.
         sinAZC = sin(Az)*cos(azlat)/cos(clat)
         if (abs(sinAZC).gt.1.0) call mesg(1214)
c
         go to 99
c
 99      continue
c     End Cases
c
      return
      end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   FCHSCA
C
C FUNCTIONAL DESCRIPTION:       .
C
C CALLED BY:                    GEOCON
C
C PROGRAMMER:                   DATE OF LAST CHANGE     REASON FOR CHANGE
C
```

Jul 20 15:06 1989 carm mi.f Page 10

```
C-*-*-*-*-*-*-*-*-*-*-*-*-*-*-*-*-*-*-*-*-*-*-*-*-*-*-*-*-*-*-*-*-*-*-*-*|*-*-*-*-

      subroutine fchsca

c     change scale and center point function

      character * 25 retstr
      logical rflag

      common /const/ maxval,rmpv,c,r,ernm
      LOGICAL QLTON(16),QDOTEM
      INTEGER QPGRID(4),QTYPTB(16)
      INTEGER QLEVEL,QITPRO,QIRES,QLUNDA,QLUNIN,QLUNLI
      COMMON /MAP/ QXRNM,QXC,QYC,QLEVEL,QCLAT,QCLON,QXRAD,QYRAD,
     +    QITPRO,
     +    QIRES,QTYPTB,QLUNDA,QLUNIN,QLUNLI,QLTON,QPGRID,QDOTEM,
     +    QORHAL
      logical chazsp
      common /chazsp/ chazsp
c
c
c             Change scale value and center point
              CALL PROMPT(1204,retstr,25,irchar)
              call offst (rflag)
              if (irchar.gt.0) then
                  call ascint (retstr,ixr,irchar,ierror)
                  if(ixr.gt.0.and.ierror.eq.0) then
                      if (qitpro .ne. 5) then
c                        User input is viewport width in nm.
                         xrnmnw = ixr/2
                      else
c                        Interpret user input as perspective altitude,
c                        and calculate corresponding viewport width.
                         qorhal = ixr
                         ah = asin(ernm/(qorhal+ernm))
                         er = asin(1.0) - ah
                         xrnmnw = er*ernm
                      endif
                      call chscal (xrnmnw)
                  endif
              endif
c
              chazsp = .false.
c             Update conic std parallels.
              call fchspl
c             Update oblique conic tilt angle.
              call fchazu
c
              if (.not.rflag.or.irchar.gt.0.or.chazsp) then
                  call drwmap
              endif

      return
      end
```

Jul 20 15:06 1989 carr mmi.f Page 11

```
C+*+*+*+*+*+*+*+*+*+*+*+*+*+*+*+*+*+*+*+*+*+*+*+*+*+*+*+*+*+*+*+*+*+*|*+*+*+*+
C UNIT NAME:                  FCHSPL
C
C FUNCTIONAL DESCRIPTION:     Updates conic standard parallels
C                             to map center or to user input.
C
C INPUT FILES/PARAMETERS:     ispl -  User input, degrees.
C
C GLOBAL VARIABLES:           None.
C
C OUTPUT FILES/PARAMETERS:    splll,spll2  - Standard parallels, radians.
C
C SUBROUTINES CALLED:         None.
C
C CALLED BY:                   FCHSCA
C
C LOCAL VARIABLES:            None.
C
C RESTRICTIONS:               None.
C
C ABNORMAL RETURN CONDITIONS: None.
C
C PROGRAMMER:                 DATE OF LAST CHANGE     REASON FOR CHANGE
C     Tom Wescott (NOSC)      Dec 88                  Original entry.
C
C-*-*-*-*-*-*-*-*-*-*-*-*-*-*-*-*-*-*-*-*-*-*-*-*-*-*-*-*-*-*-*-*-*-*|*-*-*-*-

      subroutine fchspl
c
      character*25 retstr
      character*1 str(25)
      equivalence (retstr,str)
      character chr
      common /center/ clat,clon,cclat,sclat
      common /proj/itproj,wmrad,xoffs,yoffs,scalr,notlst
      common /conic/ splll,spll2,tranl,trank,tranr,tscale,pole,tilt
      logical chazsp
      common /chazsp/ chazsp
c
c
*-----------------------------------------------------------------------|--+
* Itproj:  1  2  3  4  5  6  7  8  9 10 11 12 13 14 15 16 17 18 19 20 21  |
*-------------------------------------------------------------------------+
*          g  o  o  o  p  e  m  l  a  a  a  k  m  o  p  p  u  s  s        |
*          n  r  r  r  e  q  e  a  l  z  z  a  i  b  o  o  t  i  t        |
*          o  e  p  t  r  r  r  m  b  e  e  v  l  l  s  l  m  n  e        |
*          m  q  o  h  s  e  c  c  r  a  d  r  l  m  t  y  z  u  r        |
*-------------------------------------------------------------------------+
      goto(1,01,01,01,01,01,01,02,02,01,01,02,01,01,01,01,01,01,01
     +    )itproj
c
c     Case 1:  Map is not a conic, prepare default parallels for next conic.
 1        continue
          splll = clat
          spll2 = splll
          go to 99
```

```
Jul 20 15:06 1989  carr  mmi.f Page 12

c
c     Case 2:  Map is a conic, Allow user to override last values.
 2       continue
         d2r = 3.14159/180.
c
c        Prompt user for first parallel.
         call prompt(1248,retstr,25,irchar)
         if (irchar.gt.0) then
            isign = +1
            chr = str(irchar)
            if (chr .eq. 'N' .or. chr .eq. 'n') then
               irchar = irchar - 1
            elseif (chr .eq. 'S' .or. chr .eq. 's') then
               isign = -1
               irchar = irchar - 1
            endif
         endif
         if (irchar.gt.0) then
            call ascint (retstr,ispl,irchar,ierror)
            if(ierror.eq.0) then
               chazsp = .true.
               spll1 = isign*ispl*d2r
c
c              Set new default 2nd parallel and prompt again.
               spll2 = spll1
               call prompt(1249,retstr,25,irchar)
               if (irchar.gt.0) then
                  isign = +1
                  chr = str(irchar)
                  if (chr .eq. 'N' .or. chr .eq. 'n') then
                     irchar = irchar - 1
                  elseif (chr .eq. 'S'.or. chr .eq. 's') then
                     isign = -1
                     irchar = irchar - 1
                  endif
               endif
               if (irchar.gt.0) then
                  call ascint (retstr,ispl,irchar,ierror)
                  if (ierror.eq.0) then
                     spll2 = isign*ispl*d2r
                  endif
               endif
            endif
         endif
         go to 99
c
 99      continue
c     End Cases
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    LLCENT
C
```

```
Jul 20 15:06 1989  carn  nmi.f Page 13

C FUNCTIONAL DESCRIPTION:          .
C
C CALLED BY:                       OFFST
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine llcent (rflag)

c       this subroutine prompts for a new center of the map in
c       lat/lon format (jit)

        integer          err
        integer          qires
        integer          qitpro
        integer          qlevel
        integer          qlunda
        integer          qlunin
        integer          qlunli
        integer          qpgrid(4)
        integer          qtyptb(16)

        real             lat
        real             lon

        character*50     strng

        logical          qlton(16)
        logical          qdotem
        logical          rflag

        common /map/ qxrnm, qxc, qyc, qlevel, qclat, qclon,
     +               qxrad, qyrad, qitpro, qires, qtyptb, qlunda,
     +               qlunin, qlunli, qlton, qpgrid, qdotem, qorhal

   10   continue
        call prompt(1243, strng, 50, len)

c       if there is a value and not just <ret>


        if (len .gt. 0) then
           call tocaps(strng,len)
           call lltord(strng(1:len), len, lat, lon, err)
           if (err .gt. 0) then
               call mesg(1244)
               call paws
               goto 10
           endif

c          change map parameters to new center coordinates

           qclat = lat
           qclon = lon
```

Jul 20 15:06 1989 carn mmi.f Page 14

```
c           call updtmp
        else
            rflag = .true.
        endif

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: LLSHOW
C
C FUNCTIONAL DESCRIPTION:  LLSHOW IS RESPONSIBLE FOR PRINTING THE LATITUDE
C                          AND LONGITUDE OF A POINT ON THE MAP
C                          IN THE COMMUNICATIONS AREA.
C
C INPUT FILES/PARAMETERS:  NONE.
C
C GLOBAL VARIABLES :
C
C        QFB(26)            INTEGER     FUNCTION BUTTON VALUES
C        QMAPUP             LOGICAL     INDICATES WHETHER MAP IS CURRENTLY
C                                       DISPLAYED.
C        INVALI             LOGICAL     INDICATES IF POINT CHOSEN WAS
C                                       CONVERTED FROM X,Y TO LAT/LONG.
C
C OUTPUT FILES/PARAMETERS:  NONE.
C
C SUBROUTINES/FUNCTIONS CALLED : MESG
C
C         MESG              PRINTS MESSAGE IN COMMUNICATIONS AREA.
C         PAWS              PAUSES TILL USER INPUT.
C         GEOWIN            SETS GEOGRAPHIC WINDOW.
C         GRAVPT            SETS GEOGRAPHIC VIEWPORT.
C         LOCGEO            RETURNS WORLD COORDINATES OF POINT PICKED
C                           BY THE USER. (GEOGRAPHIC AREA)
C         XYTOLL            CONVERTS X,Y TO LAT/LONG.
C         FORMT             FORMATS RADIANS INTO LAT/LONG STRING.
C         MESSAG            PRINTS CHARACTER STRING IN COMMUNICATIONS
C                           AREA.
C
C CALLED BY: CHECK.
C
C LOCAL VARIABLES:
C
C       XLAT                REAL         LATITUDE OF POINT.
C       XLON                REAL         LONGITUDE OF POINT.
C       GEOSTR              CHARACTER*20 LAT/LONG STRING RETURNED FROM FORMT.
C       STRING              CHARACTER*80 MESSAGE TO BE PRINTED IN
C                                              COMMUNICATIONS AREA.
C       VALID               LOGICAL      INDICATES WHETHER POINT CHOSEN IS
C                                              IN MAP AREA.
C       IEGEO               INTEGER      ERROR CONDITION FROM FORMT.
C
C RESTRICTIONS: NONE.
```

Jul 20 15:06 1989 carı mmi.f Page 15

```
C
C ABNORMAL RETURN CONDITIONS:   NONE.
C
C LOCATION:                     /ul/a21/gjf/LLSHOW.FTN
C
C PROGRAMMER:                   DATE OF LAST CHANGE     REASON FOR CHANGE
C
C     GJFenerty
c  L McCleary                   1987            call jpecho - llshow
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE LLSHOW

C  SUBROUTINE TO DETERMINE THE LAT/LONG COORDINATES OF A POINT ON
C  THE MAP.

        INTEGER QFB(26),QMB(4)
        COMMON /BUTONS/ QFB,QMB

        LOGICAL QMAPUP
        COMMON /MAPUP/ QMAPUP

        LOGICAL INVALI
        COMMON /INVALI/ INVALI

        INTEGER QCRMNU
        COMMON /B6/ QCRMNU

        COMMON /B1/ QCANCL,QEXT2M,QRETRN,QSTMNU,QNEXTM
        INTEGER QNEXTM
        LOGICAL QCANCL,QEXT2M,QRETRN,QSTMNU
        common/llseg/llsgmt,llfrst
        integer llsgmt
        logical llfrst
        integer dstsg1,dstsg2,dstsg3
        logical dstfst
        common/mrkseg/dstsg1,dstsg2,dstsg3,dstfst

        REAL XLAT,XLON
        CHARACTER*20 GEOSTR
        CHARACTER*80 STRING
        LOGICAL VALID,ERROR,RFLAG
        INTEGER IEGEO

        data x,y /0.,0./

        MYSEGN = QCRMNU
        RFLAG = .FALSE.
        ERROR = .FALSE.

        STRING(1:80) = ' '
        GEOSTR = ' '
        IEGEO = 0
        STRING(1:29) = 'The LAT/LONG coordinates are '
```

Jul 20 15:06 1989 carn mmi.f Page 16

```
44        CONTINUE
          CALL MESG(297)
          CALL GEOWIN
          CALL GRAVPT
          call jconwv (x,y,0.,vx,vy)
          call jpecho (1,2,1,vx,vy)
          CALL LOCGEO (IBUT,X,Y,VALID)

C         ** IF LEAVE BUTTON EXIT SUBROUTINE         **
C         ** IF PICK IS INVALID, PRINT ERROR MESSAGE **
C         ** AND ALLOW USER TO REPICK POINT.         **

          IF (IBUT.NE.QMB(1)) THEN
              CALL CHECK(IBUT,MYSEGN,ERROR,RFLAG)
              IF (ERROR) THEN
                  CALL MESG(2)
                  CALL PAWS
              ENDIF
              IF (RFLAG) GOTO 66
              GOTO 44
          ENDIF

          IF (VALID) GOTO 38
          CALL MESG(288)
          CALL PAWS
          GOTO 44

38        CONTINUE
          CALL GEOWIN
          CALL GRAVPT

C CONVERT X,Y TO LAT/LONG (RADIANS) THEN TO DDMMSS TYPE CHARACTER STRING.

          CALL XYTOLL(X,Y,XLAT,XLON)

          IF (.NOT.INVALI) THEN
              IF(.NOT. DSTFST)THEN
                 CALL JPURGE(DSTSG1)
                 CALL JPURGE(DSTSG2)
                 CALL JPURGE(DSTSG3)
c ----- updated 7/31/87 CSL                            - llshow
                 dstfst = .true.
              END IF
              IF(LLFRST)THEN
                  CALL GETSEG(LLSGMT)
                  LLFRST = .FALSE.
              ELSE
                  CALL JPURGE(LLSGMT)
              END IF
              CALL JROPEN(LLSGMT)
              CALL JCMARK(4)
              CALL XCOLOR(104)
              CALL JMARK(X,Y)
              CALL JRCLOS

              CALL FORMT (XLAT,XLON,IEGEO,GEOSTR)
```

Jul 20 15:06 1989 car: mmi.f Page 17

```
C IF THERE ARE NO CONVERSION ERRORS PRINT CHARACTER STRING.

            IF (IEGEO.EQ.0) THEN

                STRING(30:50) = GEOSTR
                CALL MESSAG(STRING,50,1)
                CALL JOPEN
                CALL JCMARK(4)
                CALL XCOLOR(104)
                CALL JMARK(X,Y)
                CALL JCLOSE

            ELSE

c               PRINT*,'ERROR IN LLIMIT',IEGEO,GEOSTR
                CALL MESG(288)
                CALL PAWS

            ENDIF

        ELSE

            CALL MESG(288)
            CALL PAWS

        ENDIF

   66   CONTINUE

        QRETRN = .FALSE.

        RETURN
        END

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: OFFST
C
C FUNCTIONAL DESCRIPTION:  OFFSETS CENTER POINT OF MAP.
C
C INPUT FILES/PARAMETERS:  NONE.
C
C GLOBAL VARIABLES :
C
C       QFB                     INTEGER(26) FUNCTION BUTTON VALUES.
C       INVALI                  LOGICAL     INDICATES WHETHER CONVERSION
C                                           WAS INVALID.
C       QXC                     REAL        X CENTER OF MAP (WORLD COORD.).
C       QYC                     REAL        Y CENTER OF MAP (WORLD COORD.).
C       QCLAT                   REAL        LATITUDE AT CENTER (RADIANS).
C       QCLON                   REAL        LONGITUDE AT CENTER (RADIANS).
C       QXRAD                   REAL        WIDTH OF HALF OF VIEWPORT.
C       QYRAD                   REAL        HEIGTH OF HALF OF VIEWPORT.
C       QITPRO                  INTEGER     CURRENT PROJECTION.
```

```
C       QIRES                 REAL        RESOLUTION.
C       QXRNM                 REAL        RADIUS OF MAP (NAUTICAL MILES).
C       QORHAL                REAL        ALTITUDE FOR PERSPECTIVE PROJECTIO
C
C
C OUTPUT FILES/PARAMETERS:  NONE.
C
C SUBROUTINES/FUNCTIONS CALLED :
C
C       GRAVPT                SETS GEOGRAPHY VIEWPORT.
C       GEOWIN                SETS GEOGRAPHY WINDOW.
C       MESG                  PUTS MESSAGE IN COMMUNICATIONS AREA.
C       PAWS                  CAUSES PAUSE IN PROGRAM.
C       LOCGEO                PERFORMS LOCATE IN GEOGRAPHIC AREA.
C       RDRAW                 REDRAWS MAP.
C       XYTOLL                CONVERTS X,Y TO LAT,LONG.
C       INITIA                INITIALIZES MAP PARAMETERS.
C
C CALLED BY:                    FCHSCA
C
C LOCAL VARIABLES:
C
C       VALID                 LOGICAL     INDICATES IF LOCATE WAS LEGAL.
C       IBUT                  INTEGER     BUTTON USED TO TRIGGER LOCATE.
C       X                     REAL        X COORDINATE OF LOCATE.
C       Y                     REAL        Y COORDINATE OF LOCATE.
C
C RESTRICTIONS: NONE.
C
C ABNORMAL RETURN CONDITIONS:   NONE.
C
C LOCATION:                     /a21/gjf/MAPSRC.FTN
C
C PROGRAMMER:                   DATE OF LAST CHANGE     REASON FOR CHANGE
C
C    DAVE NATION                                        ORIGINAL CODE.
C    JERRY FENERTY                                      DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE OFFST (rflag)

C     ALLOWS THE OPERATOR TO OFFSET THE CENTER POINT OF A MAP (not redrawn

C     MAP PARAMETERS

      LOGICAL QLTON(16),QDOTEM
      INTEGER QPGRID(4),QTYPTB(16)
      INTEGER QLEVEL,QITPRO,QIRES,QLUNDA,QLUNIN,QLUNLI

      COMMON /MAP/ QXRNM,QXC,QYC,QLEVEL,QCLAT,QCLON,QXRAD,QYRAD,
     +    QITPRO,
     +    QIRES,QTYPTB,QLUNDA,QLUNIN,QLUNLI,QLTON,QPGRID,QDOTEM,
     +    QORHAL
```

```
      LOGICAL INVALI
      COMMON /INVALI/ INVALI

      INTEGER QFB(26),QMB(4)
      COMMON /BUTONS/ QFB,QMB
      integer qdsdev,qpydev,qecho,qlecho
      common /device/ qdsdev,qpydev,qecho,qlecho
      COMMON /B1/ QCANCL,QEXT2M,QRETRN,QSTMNU,QNEXTM
      INTEGER QNEXTM
      LOGICAL QCANCL,QEXT2M,QRETRN,QSTMNU

      INTEGER QCRMNU
      COMMON /B6/ QCRMNU

      LOGICAL QPREV
      COMMON /PREV/ QPREV

      LOGICAL VALID,RFLAG,ERROR

      data curscx,curscy / 0.,0. /

      ierror = 0
      RFLAG = .FALSE.
      ERROR = .FALSE.
      MYSEGN = QCRMNU

      CLA=QCLAT
      CLO=QCLON

 20   CALL MESG(274)
      CALL GRAVPT
      CALL GEOWIN
      call jconwv (curscx,curscy,0.,vx,vy)
      call jpecho (1,2,1,vx,vy)
      ijkl = qlecho
c     --save echo type; set for Rubberband line
      qlecho = 2
      CALL LOCGEO (IBUT,X,Y,VALID)
      qlecho = ijkl
      IF (IBUT.NE.QMB(1)) THEN
          CALL CHECK(IBUT,MYSEGN,ERROR,RFLAG)
          IF (ERROR) THEN
              CALL MESG(2)
              CALL PAWS
          ENDIF
c
c         If <F8> is pressed, then go on to center by lat/lon
c         selection.  Would exit from there.
c
          IF (RFLAG) THEN
             rflag = .false.
             CALL LLCENT (rflag)
             GOTO 66
          ENDIF
          GOTO 20
      ENDIF
```

```
      IF (VALID) GOTO 35
      CALL MESG(288)
      CALL PAWS
      GOTO 20

 35   continue
c 35  CALL INITIA(QXC,QYC,QCLAT,QCLON,QXRAD,QYRAD,QITPRO,QIRES,QXRNM,
c    +             QORHAL)
      CALL XYTOLL(X,Y,QCLAT,QCLON)

      IF (INVALI) THEN

c           PRINT*,'CONVERSION OF NEW CENTER POINT IS
c     +  NOT NOW POSSIBLE'
          QCLAT=CLA
          QCLON=CLO
          CALL MESG(288)
          CALL PAWS
          GOTO 20

      ELSE

        QPREV = .TRUE.

      ENDIF

 66   CONTINUE
      QRETRN = .FALSE.
      RETURN
      END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   RANGER
C
C FUNCTIONAL DESCRIPTION:      MMI for range rings/radials about selected point.
C
C INPUT FILES/PARAMETERS:      User input position, range, #rings, #lines
C
C GLOBAL VARIABLES:            None.
C
C OUTPUT FILES/PARAMETERS:     Graphic segment.
C
C SUBROUTINES CALLED:
C
C CALLED BY:                   ovrcon
C
C LOCAL VARIABLES:
C
C RESTRICTIONS:                Currently does not redraw like other overlays
C                              as ring data are not saved in parameter file.
C
C PROGRAMMER:                  DATE OF LAST CHANGE     REASON FOR CHANGE
C      Tom Wescott (NOSC)      Jul 88                  Original entry.
C      L. McCleary (NOSC)      Mar 89                  Modify MMI
```

Jul 20 15:06 1989 carr mmi.f Page 21

```
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine ranger
c
      INTEGER QFB(26),QMB(4)
      COMMON /BUTONS/ QFB,QMB
      logical valid
      logical rflag, error
      character * 25 retstr
      character * 50 strng
      common /ctext/ igrtxt,isytxt,iantxt
      integer rrgseg
      common /rrgseg/ rrgseg
      data rrgseg /0/
      data ixrnm / 100 /
      data nrings,nlines / 5,8 /

      rflag = .false.
      error = .false.

      rrx = 0.
      rry = 0.
c
c     Get center point for range rings.
c
   10 continue
      call mesg(10)
      call gravpt
      call geowin
      call getseg(rrgseg)
      call jconwv(rrx,rry,0.,vx,vy)
      call jpecho(1,2,1,vx,vy)
      call locgeo(ibutn,rrx,rry,valid)
      IF (IBUTN.NE.QMB(1)) THEN
           CALL CHECK(IBUTN,rrgseg,ERROR,RFLAG)
           IF (ERROR) THEN
               CALL MESG(2)
               CALL PAWS
           ENDIF
           IF (RFLAG) THEN
               rflag = .false.
               call prompt(11, strng, 50, len)
               if (len .gt. 0) then
                   call tocaps(strng,len)
                   call lltord(strng(1:len), len, rrlat, rrlon, llerr)
                   if (llerr .gt. 0) then
                        call mesg(1244)
                        call paws
                        goto 10
                   endif
               else
                   rflag = .true.
                   go to 900
               endif
               GOTO 16
```

Jul 20 15:06 1989 car ɔmmi.f Page 22

```
          ENDIF
          GOTO 10
      ENDIF

      IF (.not.VALID) then
          CALL MESG(288)
          CALL PAWS
          GOTO 10
      endif

      call xytoll(rrx,rry,rrlat,rrlon)
c
c     Specify range incr, nrings, nlines
c
   16 continue
      call prompt(16,retstr,25,irchar)
      if (irchar.gt.0) then
         call ascint (retstr,ixrnm,irchar,ierror)
         if (ixrnm.le.0.or.ierror.ne.0) then
            call mesg(19)
            call paws
            go to 16
         endif
      endif
c
   17 continue
      call prompt(17,retstr,25,irchar)
      if (irchar.gt.0) then
         call ascint (retstr,nrings,irchar,ierror)
         if (nrings.lt.0.or.ierror.ne.0) then
            call mesg(19)
            call paws
            go to 17
         endif
      endif
c
   18 continue
      call prompt(18,retstr,25,irchar)
      if (irchar.gt.0) then
         call ascint (retstr,nlines,irchar,ierror)
         if (nlines.lt.0.or.ierror.ne.0) then
            call mesg(19)
            call paws
            go to 18
         endif
      endif

      call gravpt
      call geowin
      call jropen(rrgseg)
      call xcolor (igrtxt)
c
      call rngrin (rrlon,rrlat,ixrnm,nrings,nlines)

      call jrclos
c
```

Jul 20 15:06 1989 car mmi.f Page 23

```
c     allow another ring to be drawn
      goto 10
c
 900  continue
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SATCOV
C
C FUNCTIONAL DESCRIPTION:       Draws satellite coverage area.
C
C INPUT FILES/PARAMETERS:       User input position, altitude,
C                               field of view, look angle from nadir,
C                               azimuth of look angle
C
C GLOBAL VARIABLES:             None.
C
C OUTPUT FILES/PARAMETERS:      Graphic segment.
C
C SUBROUTINES CALLED:           ftprnt
C
C CALLED BY:                    ovrcon
C
C LOCAL VARIABLES:
C
C RESTRICTIONS:                 Currently does not redraw like other overlays
C                               as data are not saved in parameter file.
C
C PROGRAMMER:                   DATE OF LAST CHANGE     REASON FOR CHANGE
C     L. McCleary (NOSC)        Mar 89                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine satcov
c
      INTEGER QFB(26),QMB(4)
      COMMON /BUTONS/ QFB,QMB
      logical valid
      logical rflag, error
      character * 25 retstr
      character * 50 strng
      common /ctext/ igrtxt,isytxt,iantxt
      parameter(D2R = 3.14159/180.0)
      integer scvseg
      common /scvseg/ scvseg
      character*72 amptxt(3)
      data scvseg /0/
      data rotang /0.0/
      data ialt /22300/
      data iafovd /90/
      data itiltd /0/
      data iazid  /0/
```

Jul 20 15:06 1989 carr mmi.f Page 24

```
      rflag = .false.
      error = .false.

      scx = 0.
      scy = 0.
c
c     Get center point for satellite coverage.
c
   10 continue
      call mesg(10)
      call gravpt
      call geowin
      call getseg(scvseg)
      call jconwv(scx,scy,0.,vx,vy)
      call jpecho(1,2,1,vx,vy)
      call locgeo(ibutn,scx,scy,valid)
      IF (IBUTN.NE.QMB(1)) THEN
           CALL CHECK(IBUTN,scvseg,ERROR,RFLAG)
           IF (ERROR) THEN
               CALL MESG(2)
               CALL PAWS
           ENDIF
           IF (RFLAG) THEN
               rflag = .false.
               call prompt(11, strng, 50, len)
               if (len .gt. 0) then
                   call tocaps(strng,len)
                   call lltord(strng(1:len), len, scvlat, scvlon, llerr)
                   if (llerr .gt. 0) then
                         call mesg(1244)
                         call paws
                         goto 10
                   endif
               else
                   rflag = .true.
                   go to 900
               endif
               GOTO 12
           ENDIF
           GOTO 10
      ENDIF

      IF (.not.VALID) then
          CALL MESG(288)
          CALL PAWS
          GOTO 10
      endif

      call xytoll(scx,scy,scvlat,scvlon)
c
c     Specify alt, afov, tilt, azi
c
   12 continue
      call prompt(12,retstr,25,irchar)
      if (irchar.gt.0) then
         call ascint (retstr,itemp,irchar,ierror)
```

Jul 20 15:06 1989 carr mmi.f Page 25

```
         if (itemp.le.0.or.ierror.ne.0) then
            call mesg(19)
            call paws
            go to 12
         else
            ialt = itemp
         endif
      endif
      alt = ialt
c
   13 continue
      call prompt(13,retstr,25,irchar)
      if (irchar.gt.0) then
         call ascint (retstr,itemp,irchar,ierror)
         if (itemp.le.0.or.ierror.ne.0) then
            call mesg(19)
            call paws
            go to 13
         else
            iafovd = itemp
         endif
      endif
      afov = iafovd * d2r
c
   14 continue
      call prompt(14,retstr,25,irchar)
      if (irchar.gt.0) then
         call ascint (retstr,itemp,irchar,ierror)
         if (itemp.lt.0.or.ierror.ne.0) then
            call mesg(19)
            call paws
            go to 14
         else
            itiltd = itemp
         endif
      endif
      tilt = itiltd * d2r
c
   15 continue
      call prompt(15,retstr,25,irchar)
      if (irchar.gt.0) then
         call ascint (retstr,itemp,irchar,ierror)
         if (ierror.ne.0) then
            call mesg(19)
            call paws
            go to 15
         else
            iazid = itemp
         endif
      endif
      azi = iazid * d2r
c
      amptxt(1) = 'Satellite location: '
      call formt(scvlat,scvlon,0,amptxt(1)(21:))
      write(amptxt(2),22) ialt
 22   format ('Altitude:',I8,' nm.')
```

```
      write(amptxt(2)(35:),23) iafovd
 23   format ('Field of view:',I4,' deg.')
      write(amptxt(3),24) itiltd
 24   format ('Look angle from nadir:',I4,' deg.')
      write(amptxt(3)(35:),25) iazid
 25   format ('Azimuth of look angle:',I4,' deg.')
      call drwamp (amptxt,3)
c
      call gravpt
      call geowin
      call jropen(scvseg)
      call xcolor (igrtxt)
c
      XTIE = 0.0
      YTIE = 0.0
      rotang = rotang + .6
      DX = cos(rotang)
      DY = sin(rotang)
      DIST = 5.0
      CALL FTPRNT(scvlon,scvlat,alt,afov,tilt,azi,XTIE,YTIE,DX,DY,DIST)
      call jrclos
c
c     allow another ftprnt
      goto 10
c
 900  continue
c
      return
      end
```

Jul 20 14:44 1989 carr mth.f Page 1

```
C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BL2LL
C
C FUNCTIONAL DESCRIPTION:       Transforms polyline from stereographic
C                               breakline coordinates back to lon,lat.
C
C INPUT FILES/PARAMETERS:       xin,yin       - Polyline in stereographic XY.
C
C GLOBAL VARIABLES:             blclon,blclat - Center of ster. projection.
C
C OUTPUT FILES/PARAMETERS:      plon,plat     - Output polyline in (lon,lat).
C
C SUBROUTINES CALLED:           xpster
C
C CALLED BY:                    blplgn, blplin
C
C LOCAL VARIABLES:
C
C RESTRICTIONS:                 None.
C
C ABNORMAL RETURN CONDITIONS:   None.
C
C PROGRAMMER:                   DATE OF LAST CHANGE     REASON FOR CHANGE
C     Tom Wescott (NOSC)        Jan 88                  Original entry.
C
C-*-*-*-*-*-*-*-*-*-*-*-*-*-*-*-*-*-*-*-*-*-*-*-*-*-*-*-*-*-*-*-*-*-*-*|*-*-*-*-

      subroutine BL2LL(xin,yin,nin,plon,plat)
c
      real   xin(*),yin(*), plon(*),plat(*)
      common /center/clat,clon,cclat,sclat
      real ax(3),ay(3),bx(3),by(3),alon(3),alat(3),blon(3),blat(3)
      common /break/ blclat,blclon,ax,ay,bx,by,alon,alat,blon,blat
c
c     Save current map center.
      zclat = clat
      zclon = clon
      zcclat = cclat
      zsclat = sclat
c
c     Set center temporarily to the breakline midpoint.
      clon = blclon
      clat = blclat
      cclat = cos(clat)
      sclat = sin(clat)
c
      do 100 i = 1, nin
         call xpster(xin(i),yin(i),plon(i),plat(i))
 100  continue
c
c     Restore map center common.
      clat = zclat
      clon = zclon
      cclat = zcclat
      sclat = zsclat
c
```

Jul 20 14:44 1989 carr mth.f Page 2

```
      return
      end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BL2XY
C
C FUNCTIONAL DESCRIPTION:       Transforms polyline to a temporary stereo-
C                               graphic projection where breakline clipping
C                               will be performed.
C
C INPUT FILES/PARAMETERS:       plon,plat  - Input polyline in (lon,lat).
C
C GLOBAL VARIABLES:             blclat,blclon  - Center of stereog. projection.
C
C OUTPUT FILES/PARAMETERS:      xout,yout  - Polyline in stereographic (X,Y).
C
C SUBROUTINES CALLED:           pxster
C
C CALLED BY:                    blchk, blplin, blplgn
C
C LOCAL VARIABLES:
C
C RESTRICTIONS:                 none.
C
C ABNORMAL RETURN CONDITIONS:   none.
C
C PROGRAMMER:                   DATE OF LAST CHANGE     REASON FOR CHANGE
C     Tom Wescott (NOSC)        Jan 88                  Original entry.
C
C-*-*-*-*-*-*-*-*-*-*-*-*-*-*-*-*-*-*-*-*-*-*-*-*-*-*-*-*-*-*-*-*-*-*-*|*-*-*-*-

      subroutine BL2XY(plon,plat,nin,xout,yout)
c
      real   plon(*),plat(*),xout(*),yout(*)
      common /center/clat,clon,cclat,sclat
      real ax(3),ay(3),bx(3),by(3),alon(3),alat(3),blon(3),blat(3)
      common /break/ blclat,blclon,ax,ay,bx,by,alon,alat,blon,blat
c
c     Save current map center.
      zclat = clat
      zclon = clon
      zcclat = cclat
      zsclat = sclat
c
c     Set center temporarily to the breakline midpoint.
      clon = blclon
      clat = blclat
      cclat = cos(clat)
      sclat = sin(clat)
c
      call pxster(plon,plat,nin,xout,yout,nout)
c
c     Restore map center common.
      clat = zclat
      clon = zclon
```

```
Jul 20 14:44 1989 carr  πth.f Page 3

      cclat = zcclat
      sclat = zsclat
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BLCHK
C
C FUNCTIONAL DESCRIPTION:       Detects intersection of conic breakline
C                               with a geographic bounding rectangle.
C
C INPUT FILES/PARAMETERS:       alimit(4)    - Geo. rectangle limit array.
C
C GLOBAL VARIABLES:             ax(1),ay(1) - Breakline line segment start.
C                               bx(1),by(1) -     "       "       "    end.
C
C OUTPUT FILES/PARAMETERS:      noclip = .false. with intersection.
C
C SUBROUTINES CALLED:           bl2xy.
C
C CALLED BY:                     DMAPII
C
C LOCAL VARIABLES:              s1           - Sign + for left half plane.
C                               dX, dY, D    - Coefficients of breakline in
C                                              form:    dY*x - dX*y + D = 0
C
C RESTRICTIONS:                 Geo. rectangle must span less than pi lon.
C
C ABNORMAL RETURN CONDITIONS:   none.
C
C PROGRAMMER:                   DATE OF LAST CHANGE      REASON FOR CHANGE
C      Tom Wescott (NOSC)       Jan 88                   Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine BLCHK(noclip,alimit)
c
      real alimit(4)
      logical noclip
      common /pie/ pie,tpie,pio2,pio4
      real ax(3),ay(3),bx(3),by(3),alon(3),alat(3),blon(3),blat(3)
      common /break/ blclat,blclon,ax,ay,bx,by,alon,alat,blon,blat
c
c     Note: Geographic rectangle sides may be curved in a coordinate
c     system where breakline is straight.  Test at least 3 pts per side.
      parameter (NPOINTS = 3)
      real rla(NPOINTS*4),rlo(NPOINTS*4),x(NPOINTS*4),y(NPOINTS*4)
c
cccc
c     Get N,S,E,W sides of rectangle from WDBII limit array.
      rsout = alimit(1)
      rnort = alimit(2)
      rmnlo = alimit(3)
      rmxlo = alimit(4)
```

```
      Dlo = rmxlo - rmnlo
      if (Dlo.gt.pie) then
c        Limit array spans the dateline. Convert to continuous coords.
         reast = rmnlo + tpie
         rwest = rmxlo
      else
         reast = rmxlo
         rwest = rmnlo
      endif
c
c     Load polyline arrays with test points spaced along rectangle border.
      kount = 0
      xincr = (reast-rwest)/(NPOINTS-1)
      yincr = (rnort-rsout)/(NPOINTS-1)
c
      rlon = rwest - xincr
      do 210 icol = 1, NPOINTS
         kount = kount + 1
         rla(kount) = rnort
         rlon = rlon + xincr
         rl = rlon
         if (rl.gt.pie) rl = rl - tpie
         rlo(kount) = rl
 210  continue
c
      rlat = rnort
      do 220 irow = 1, NPOINTS-1
         kount = kount + 1
         rlat = rlat - yincr
         rla(kount) = rlat
         rlo(kount) = reast
 220  continue
c
      rlon = reast
      do 240 icol = 1, NPOINTS-1
         kount = kount + 1
         rla(kount) = rsout
         rlon = rlon - xincr
         rl = rlon
         if (rl.gt.pie) rl = rl - tpie
         rlo(kount) = rl
 240  continue
c
      rlat = rsout
      do 260 irow = 1, NPOINTS-1
         kount = kount + 1
         rlat = rlat + yincr
         rla(kount) = rlat
         rlo(kount) = rwest
 260  continue
c
c
c     Convert test points to breakline coordinate system (x,y).
      call bl2xy(rlo,rla,kount,x,y)
c
c     Compute breakline (also half plane) general form coefficients
```

```
c     from directed line segment  (ax(1),ay(1)) to (bx(1),by(1)).
      dY = ay(1) - by(1)
      dX = ax(1) - bx(1)
      D  = ax(1)*by(1) - ay(1)*bx(1)
      d2far = 10.0 * amax1(abs(dX),abs(dY))
c
c     Check polyline segments to find out if any cross the breakline.
      noclip = .true.
      s1 = dY*x(1) - dX*y(1) + D
      do 500 i = 2, kount
         s2 = dY*x(i) - dX*y(i) + D
         if ((s1*s2) .lt. 0.0) then
c           Great circle of the breakline was crossed by the polyline segment.
c           Now test for breakline crossing the line of the segment.
            ddy = y(i-1) - y(i)
            ddx = x(i-1) - x(i)
c           Skip test for segments passing near the breakline antipode.
            if((abs(ddx).lt.d2far).and.(abs(ddy).lt.d2far)) then
               dd = x(i-1)*y(i) - y(i-1)*x(i)
               s3 = ddy*ax(1) - ddx*ay(1) + dd
               s4 = ddy*bx(1) - ddx*by(1) + dd
               if (s3*s4 .lt. 0.0) then
                  noclip = .false.
                  RETURN
               endif
            endif
         endif
         s1 = s2
 500  continue
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BLHATC
C
C FUNCTIONAL DESCRIPTION:       Draws a hatch pattern inside a polygon that
C                               might be clipped by the breakline of a map
C                               or contain potentially singular points.
C
C INPUT FILES/PARAMETERS:       rla(),rlo() - Input polygon coords.
C                               nin         - Number of input points.
C                               xtie,ytie   - Tie point for hatch pattern.
C                               dx,dy       - direction vector for hatch lines.
C                               dist        - hatch line spacing (display units)
C
C GLOBAL VARIABLES:             ax(2),ay(2) - Left hemisphere clip line start.
C                               bx(2),by(2) -    "      "      "     " end.
C                               ax(3),ay(3) - Rght hemisphere clip line start.
C
C OUTPUT FILES/PARAMETERS:      Hatched polygon interior.
C
C SUBROUTINES CALLED:           bl2ll, bl2xy, cliplg, hatch, llplxy
C
C CALLED BY:                    ftprnt
```

Jul 20 14:44 1989 carn nth.f Page 6

```
C
C LOCAL VARIABLES:              inxt     - linking list for input polygon.
C                               nxt      - linking list for clipped polygon.
C                               outply   - pointers to clipped polygon segments.
C
C RESTRICTIONS:                 Blset must have been called to set up breakline.
C
C ABNORMAL RETURN CONDITIONS:   None.
C
C PROGRAMMER:                   DATE OF LAST CHANGE      REASON FOR CHANGE
C     Tom Wescott (NOSC)        Oct 88                   Original entry.
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
C     not in 3.0
      subroutine blhatc(rlo,rla,nin,xtie,ytie,dx,dy,dist)
C
      real ax(3),ay(3),bx(3),by(3),alon(3),alat(3),blon(3),blat(3)
      common /break/ blclat,blclon,ax,ay,bx,by,alon,alat,blon,blat
      parameter(NPONBL=13)
      real rlo(*),rla(*)
C
      include   'carmaxdim.inc'
C
      real xx(IDIM),yy(IDIM)
      real x(IDIM),y(IDIM),u(IDIM),v(IDIM)
      integer iinxt(IDIM), inxt(IDIM), nxt(IDIM)
      integer outply(MXPLYS)
C
C
C     Convert input (lon,lat) to breakline coordinate system.
      call bl2xy(rlo,rla,nin,xx,yy)
C
C     Get breakline length.
      dxp2p = ax(1) - bx(1)
      dyp2p = ay(1) - by(1)
      dp2p = sqrt(dxp2p**2 + dyp2p**2)
      toofar = .05*dp2p
C
C     Close the polygon if necessary.
      if ((xx(nin).ne.xx(1)).or.(yy(nin).ne.yy(1))) then
         n = nin + 1
         xx(n) = xx(1)
         yy(n) = yy(1)
      else
         n = nin
      endif
C
C     Initialize vertex linking list.
      do 120 i = 1, n-1
         iinxt(i) = i+1
 120  continue
      iinxt(n) = 1
      ist = 1
C
C     Force singular points outside linked list version of the polygon.
      call blsing(rlo,rla,n,xx,yy,nout,iinxt,ist)
```

Jul 20 14:44 1989 carm nth.f Page 7

```
      n = nout
      if (n.gt.MAXV) write(*,*)'BLHATC... array larger than ',MAXV
C
      do 300 ihemi = 1,2
         ln4clp = ihemi + 1
         cax = ax(ln4clp)
         cay = ay(ln4clp)
         cbx = bx(ln4clp)
         cby = by(ln4clp)
C
C        Reset initial vertex linking list.
         do 150 i = 1, n
            inxt(i) = iinxt(i)
 150     continue
         ist = 1
         mrk = n
C
C        Perform line clip.
         call cliplg(cax,cay,cbx,cby,xx,yy,ist,inxt,mrk,outply,nxt)
         dcx = cbx - cax
         dcy = cby - cay
C
         kountp = 0
C        While (clipped polygon segments remain) Do.
 201        if (outply(kountp+1).eq.0) go to 220
            kountp = kountp + 1
C
C           Get the first vertex from linked list.
            k = 1
            ivrt = outply(kountp)
            u(k) = xx(ivrt)
            v(k) = yy(ivrt)
            ivrt = nxt(ivrt)
            iclose = ivrt
            do 210 knt = 2, MAXV
               uknt = xx(ivrt)
               vknt = yy(ivrt)
C
C              Check polyline segment length in breakline coord system.
               dxx = (uknt-u(k))
               dyy = (vknt-v(k))
               dxxyy = amax1(abs(dxx),abs(dyy))
C
               if((dxxyy.gt.toofar).and.(abs(dxx*dcy-dyy*dcx).lt..0001))
     +            then
C                 If polyline segment is long and parallel to clipline,
C                 add intermediate points tacking it to a great circle.
                  xxincr = dxx/(NPONBL-1)
                  yyincr = dyy/(NPONBL-1)
                  kstart = k
                  do 204 i = 1, NPONBL-2
                     k = k + 1
                     u(k) = u(kstart) + xxincr*i
                     v(k) = v(kstart) + yyincr*i
 204              continue
               endif
```

Jul 20 14:44 1989 carn nth.f Page 8

```
C              Append the next point from output from clip.
               k = k + 1
               u(k) = uknt
               v(k) = vknt
C
               ivrt = nxt(ivrt)
               if (ivrt.eq.iclose) go to 211
 210        continue
 211        continue
            kountv = k

            call bl2ll(u,v,kountv,u,v)
            call llplxy(u,v,kountv,x,y,nout)
CD           ROTANG = ROTANG + .6
CD           DX = DX*COS(ROTANG)
CD           DY = DY*SIN(ROTANG)
            if (nout.gt.2) call hatch(x,y,nout,xtie,ytie,dx,dy,dist)
            go to 201
C
C        End While.
 220     continue
C
 300  continue
C
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BLPLGN
C
C FUNCTIONAL DESCRIPTION:       Does an area fill (no outline) for the inside of
C                               a polygon that might require clipping by a map
C                               breakline or contain potentially singular points.
C
C INPUT FILES/PARAMETERS:       rla(),rlo() - Input polygon coords.
C                               nin         - Number of input points.
C
C GLOBAL VARIABLES:             ax(2),ay(2) - Left hemisphere clip line start.
C                               bx(2),by(2) -    "      "      "     "  end.
C                               ax(3),ay(3) - Rght hemisphere clip line start.
C
C OUTPUT FILES/PARAMETERS:      Filled polygon interior.
C
C SUBROUTINES CALLED:           bl2ll, bl2xy, cliplg, ,jpolg2, llplxy
C
C CALLED BY:                    flsply
C
C LOCAL VARIABLES:              inxt     - linking list for input polygon.
C                               nxt      - linking list for clipped polygon.
C                               outply   - pointers to clipped polygon segments.
C
C RESTRICTIONS:                 Blset must have been called to set up breakline.
C
C ABNORMAL RETURN CONDITIONS:   None.
C
```

```
C PROGRAMMER:                      DATE OF LAST CHANGE      REASON FOR CHANGE
C     Tom Wescott (NOSC)           Feb 88                   Original entry.
C      "     "                     Mar 89                   Multiple output polygons.
C
C-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-
      subroutine blplgn(rlo,rla,nin)
C
      real ax(3),ay(3),bx(3),by(3),alon(3),alat(3),blon(3),blat(3)
      common /break/ blclat,blclon,ax,ay,bx,by,alon,alat,blon,blat
      parameter(NPONBL=13)
      real rlo(*),rla(*)
C
      include   'carmaxdim.inc'
C
      real xx(IDIM),yy(IDIM)
      real x(IDIM),y(IDIM),u(IDIM),v(IDIM)
      integer iinxt(IDIM), inxt(IDIM), nxt(IDIM)
      integer outply(MXPLYS)
C
C
C     Convert input (lon,lat) to breakline coordinate system.
      call bl2xy(rlo,rla,nin,xx,yy)
C
C     Get breakline length.
      dxp2p = ax(1) - bx(1)
      dyp2p = ay(1) - by(1)
      dp2p = sqrt(dxp2p**2 + dyp2p**2)
      toofar = .05*dp2p
C
C     Close the polygon if necessary.
      if ((xx(nin).ne.xx(1)).or.(yy(nin).ne.yy(1))) then
         n = nin + 1
         xx(n) = xx(1)
         yy(n) = yy(1)
      else
         n = nin
      endif
C
C     Initialize vertex linking list.
      do 120 i = 1, n-1
         iinxt(i) = i+1
 120  continue
      iinxt(n) = 1
      ist = 1
C
C     Force singular points outside linked list version of the polygon.
      call blsing(rlo,rla,n,xx,yy,nout,iinxt,ist)
      n = nout
      if (n.gt.MAXV) write(*,*)'BLPLGN... array larger than ',MAXV
C
      do 300 ihemi = 1,2
         ln4clp = ihemi + 1
         cax = ax(ln4clp)
         cay = ay(ln4clp)
         cbx = bx(ln4clp)
         cby = by(ln4clp)
```

Jul 20 14:44 1989 carm nth.f Page 10

```
C
C       Reset initial vertex linking list.
        do 150 i = 1, n
           inxt(i) = iinxt(i)
 150    continue
        ist = 1
        mrk = n
C
C       Perform line clip.
        call cliplg(cax,cay,cbx,cby,xx,yy,ist,inxt,mrk,outply,nxt)
        dcx = cbx - cax
        dcy = cby - cay
C
        kountp = 0
C       While (clipped polygon segments remain) Do.
 201       if (outply(kountp+1).eq.0) go to 220
           kountp = kountp + 1
C
C          Get the first vertex from linked list.
           k = 1
           ivrt = outply(kountp)
           u(k) = xx(ivrt)
           v(k) = yy(ivrt)
           ivrt = nxt(ivrt)
           iclose = ivrt
           do 210 knt = 2, MAXV
              uknt = xx(ivrt)
              vknt = yy(ivrt)
C
C             Check polyline segment length in breakline coord system.
              dxx = (uknt-u(k))
              dyy = (vknt-v(k))
              dxxyy = amax1(abs(dxx),abs(dyy))
C
              if((dxxyy.gt.toofar).and.(abs(dxx*dcy-dyy*dcx).lt..0001))
     +           then
C                If polyline segment is long and parallel to clipline,
C                add intermediate points tacking it to a great circle.
                 xxincr = dxx/(NPONBL-1)
                 yyincr = dyy/(NPONBL-1)
                 kstart = k
                 do 204 i = 1, NPONBL-2
                    k = k + 1
                    u(k) = u(kstart) + xxincr*i
                    v(k) = v(kstart) + yyincr*i
 204             continue
              endif
C             Append the next point from output from clip.
              k = k + 1
              u(k) = uknt
              v(k) = vknt
C
              ivrt = nxt(ivrt)
              if (ivrt.eq.iclose) go to 211
 210       continue
 211       continue
```

```
Jul 20 14:44 1989  carr   mth.f Page 11

            kountv = k

            call bl2ll(u,v,kountv,u,v)
            call llplxy(u,v,kountv,x,y,nout)
            noedge = 1
            if (nout.gt.2) call jpolg2(x,y,nout,noedge)
            go to 201
C
C         End While.
 220      continue
C
 300  continue
C
      return
      end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                     BLPLIN
C
C FUNCTIONAL DESCRIPTION:        Draws a polyline across a map area
C                                containing a conic breakline.
C
C INPUT FILES/PARAMETERS:        rlo(n),rla(n)- Input polyline arrays in LL.
C                                n            - Number of input points.
C
C                                Line segments in breakline coordinate system:
C                                ax(1),ay(1)  - Break line segment start.
C                                bx(1),by(1)  -   "     "      "    end.
C                                ax(2),ay(2)  - Left hemisphere clip line start.
C                                ax(3),ay(3)  - Rght hemisphere clip line start.
C
C GLOBAL VARIABLES:              none.
C
C OUTPUT FILES/PARAMETERS:       This subroutine has graphic output only.
C                                Polyline is broken into sections that do not
C                                cross the breakline, and each of the sections
C                                is drawn on the map.  Pen lifted for invalids.
C
C SUBROUTINES CALLED:            none.
C
C CALLED BY:                     flsply,plotov,plotit,rngrin
C
C LOCAL VARIABLES:               x(n),y(n)   - Polyline in breakline coords.
C                                xmap,ymap   - Output point map position.
C                                s1,s2...    - Sign of sN tells half plane.
C                                dX, dY, D   - Coefficients of clip line in
C                                              form:    dY*x - dX*y + D = 0
C                                ddx,ddy,dd  - Coefs of polyline segment.
C                                far         - Traps segments near BL antipode.
C
C RESTRICTIONS:                  none.
C
C ABNORMAL RETURN CONDITIONS:    none.
C
C PROGRAMMER:                    DATE OF LAST CHANGE     REASON FOR CHANGE
```

Jul 20 14:44 1989 carr nth.f Page 12

```
C     Tom Wescott (NOSC)       Dec 87                    Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine blplin(rlo,rla,n)
c
      real ax(3),ay(3),bx(3),by(3),alon(3),alat(3),blon(3),blat(3)
      common /break/ blclat,blclon,ax,ay,bx,by,alon,alat,blon,blat
      logical invali, invprv, pen
      common /invali/ invali
c
      include   'carmaxdim.inc'
c
      real rlo(*),rla(*)
      real x(IDIM),y(IDIM)
c
c
      if (n.gt.MAXV) write(*,*)'BLPLIN... array larger than ',MAXV
c
c     Convert input (lon,lat) to breakline coordinate system.
      call bl2xy(rlo,rla,n,x,y)
c
c     Calculate radius of breakline hemisphere.
      radius = sqrt((bx(1))**2.0 + (by(1))**2.0)
      far = 10.0*radius
c
c
      do 500 l = 2,3
c        Compute clip line (also half plane) general form coefficients
c        from directed line segment  (ax,ay) to (bx,by).
         dY = ay(l) - by(l)
         dX = ax(l) - bx(l)
         D  = ax(l)*by(l) - ay(l)*bx(l)
c
c        Process the first point.
         s1 = dY*x(1) - dX*y(1) + D
         call llplxy(rlo(1),rla(1),1,xmap,ymap,nout)
         call jmove(xmap,ymap)
c
         if (n.gt.1) then
            do 100 i = 2, n
               s2 = dY*x(i) - dX*y(i) + D
               if ((s1.lt.0.0).and.(s2.lt.0.0)) then
c                 Output nothing.
               else
                  invprv = invali
                  call llplxy(rlo(i),rla(i),1,xmap,ymap,nout)
                  pen = .true.
                  if ((invali).or.(invprv)) pen = .false.
c
                  if ((s1.ge.0.0).and.(s2.ge.0.0)) then
c                    Output line from point i-1 to point i.
                     if (pen) call jdraw(xmap,ymap)
                     if (.not.pen) call jmove(xmap,ymap)
                  else
c                    Find intersection of polyline segment with clip line.
```

Jul 20 14:44 1989 carm nth.f Page 13

```
                    ddy = y(i-1) - y(i)
                    ddx = x(i-1) - x(i)
                    dd = x(i-1)*y(i) - y(i-1)*x(i)
                    xa = -(ddx*D-dX*dd)
                    ya = -(ddy*D-dY*dd)
                    wa = -(ddy*dX -dY*ddx)
                    xintr = xa/wa
                    yintr = ya/wa
                    call bl2ll(xintr,yintr,1,rlon,rlat)
                    call llplxy(rlon,rlat,1,xmintr,ymintr,nvalid)
c
                    dmax = amaxl(abs(x(i-1)),abs(y(i-1))
     +              ,abs(x(i)),abs(y(i)))
                    if (dmax.gt.far) then
c                      Polyline segment is near the breakline antipode where
c                      clip is unreqd and can be inaccurate.  Output line.
                       call llplxy(rlo(i-1),rla(i-1),1,xprv,yprv,nout)
                       call jmove(xprv,yprv)
                       if (invali) pen = .false.
                       if (pen) call jdraw(xmap,ymap)
                       if (.not.pen) call jmove(xmap,ymap)
                    else
                       if (s1.lt.0.0) then
c                         Output line from intersection point to point i.
                          call jmove(xmintr,ymintr)
                          if (pen) call jdraw(xmap,ymap)
                          if (.not.pen) call jmove(xmap,ymap)
                       else
c                         Output line from point i-1 to intersection point.
                          if (pen) call jdraw(xmintr,ymintr)
                          if (.not.pen) call jmove(xmintr,ymintr)
                       endif
                    endif
                 endif
              endif
              s1 = s2
 100       continue
        endif
 500  continue
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BLSET
C
C FUNCTIONAL DESCRIPTION:       (1)  Locates end points of conic breakline.
C                               (2)  Sets a transformation to a special ster-
C                               eographic projection where the breakline is
C                               straight, distortion is minimal, and coordinates
C                               have no nearby discontinuity, so that breakline
C                               clipping can easily be applied.
C
C INPUT FILES/PARAMETERS:       clat,clon  - Map center point.
C
```

```
Jul 20 14:44 1989  carr   mth.f Page 14

C GLOBAL VARIABLES:            None.
C
C OUTPUT FILES/PARAMETERS:     nobrl                     - No breakline flag.
C                              blclon,blclat             - Breakline midpoint
C                              blaz                      - Azimuth at midpiont.
C                              ax(1),ay(1),bx(1),by(1) - Breakline end points.
C                              ax(2),ay(2),bx(2),by(2) - Left clip line.
C                              ax(3),ay(3),bx(3),by(3) - Right clip line.
C
C SUBROUTINES CALLED:          da2ll, bl2xy
C
C CALLED BY:                   DMAPII
C
C LOCAL VARIABLES:             EPSLON  - Angular separation of clip lines.
C                              HILAT   - Slightly less than pi over two.
C
C RESTRICTIONS:                Breakline assumed to be a great semicircle.
C
C ABNORMAL RETURN CONDITIONS:  None.
C
C PROGRAMMER:                  DATE OF LAST CHANGE       REASON FOR CHANGE
C     Tom Wescott (NOSC)       Jan 88                    Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine BLSET(nobrl)
c
      common /pie/ pie,tpie,pio2,pio4
      common /center/clat,clon,cclat,sclat
      common /proj/ itproj,wmrad,xoffs,yoffs,scalr,notlst
      real alon(3),alat(3),blon(3),blat(3),ax(3),ay(3),bx(3),by(3)
      common /break/ blclat,blclon,ax,ay,bx,by,alon,alat,blon,blat
      common /utmz/ zone,cmerid,aaxis,baxis,e2,ep2,ap,bp,cp,dp,ep
      common /oblm/ polat,polon,az,azlat,gamma,xshift
      logical nobrl
CC      REAL DBGX(1300), DBGY(1300), DBGLO(1300), DBGLA(1300)
c
      parameter (HILAT = 3.13/2.0)
      parameter (EPSLON = 1.0E-5)
c     NOTE:  HILAT and EPSLON are used to position the end points of
c            clipping lines.  If you space these lines too closely,
c            acccuracy limits will cause vector wrap around.
c            1.56, 1.0E-5 seem to work for 32 bit arithmetic.
c
c
      nobrl = .false.
c     Locate breakline midpoint and azimuth.
*----------------------------------------------------------------------|--+
* Itproj:  1  2  3  4  5  6  7  8  9 10 11 12 13 14 15 16 17 18 19 20 21  |
*-------------------------------------------------------------------------+
*          g  o  o  o  p  e  m  l  a  a  a  k  m  o  p  p  u  s  s        |
*          n  r  r  r  e  q  e  a  l  z  z  a  i  b  o  o  t  i  t        |
*          o  e  p  t  r  r  r  m  b  e  e  v  l  l  s  l  m  n  e        |
*          m  q  o  h  s  e  c  c  r  a  d  r  l  m  t  y  z  u  r        |
*-------------------------------------------------------------------------+
      goto(1,01,01,01,01,02,02,02,02,05,05,02,02,04,01,02,03,02,01
```

```
     +    )itproj
c
c        Case 1:  There is no breakline.
 1          continue
            nobrl = .true.
c           Proceed to case 2 for dummy values.
c
c        Case 2:  Upright Conics etc.
 2          continue
c           Breakline is meridian opposite center, midpoint at equator.
            blclat = 0.0
            blclon = clon - sign(pie,clon)
            blaz = 0.0
            go to 99
c
c        Case 3:  Universal Transverse Mercator.
 3          continue
c           Breakline is equator, midpoint is opposite central meridian.
            blclat = 0.0
            blclon = cmerid - sign(pie,cmerid)
            blaz = pio2
            go to 99
c
c        Case 4:  Oblique cylindricals.
 4          continue
c           Breakline midpoint is at the antipode.
            blclat = -clat
            blclon = clon - sign(pie,clon)
c           Breakline azimuth is direction to new pole.
            call ll2da(blclat,blclon,polat,polon,pdst,blaz,range,bering)
            go to 99
c
c        Case 5:  Azimuthals displaying the whole world.
 5          continue
c           Obviously azimuthals do not have a breakline, but we can use
c           one to insure rigorous processing of antipodal polygons.
c           Breakline midpoint is at the antipode.
            blclat = -clat
            blclon = clon - sign(pie,clon)
c           Breakline azimuth is not important.
            blaz = 0.0
            go to 99
c
 99      continue
c     End Cases.
c
c     Locate end points of the breakline in lat,lon.
      aznort = blaz
      azsout = aznort - sign(pie,aznort)
      call da2ll(blclat,blclon,pio2,aznort,alat(1),alon(1))
      call da2ll(blclat,blclon,pio2,azsout,blat(1),blon(1))
c
c     Locate end points of the clip line for left hemisphere.
      azsw = azsout + EPSLON
      call da2ll(blclat,blclon,HILAT,azsw,alat(2),alon(2))
      aznw = aznort - EPSLON
```

```
Jul 20 14:44 1989  carr  mth.f Page 16

      call da2ll(blclat,blclon,HILAT,aznw,blat(2),blon(2))
c
c     Locate end points of the clip line for right hemisphere.
      azne = aznort + EPSLON
      call da2ll(blclat,blclon,HILAT,azne,alat(3),alon(3))
      azse = azsout - EPSLON
      call da2ll(blclat,blclon,HILAT,azse,blat(3),blon(3))
c
c     Transform all end points to breakline coordinate system.
      call bl2xy(alon,alat,3,ax,ay)
      call bl2xy(blon,blat,3,bx,by)
c
CCccc   DEBUG ... Draw clip lines as calculated piecewise in BL coords.
CCcc       call jcolor(22)
CC         npts = 180
CC         do 690 line = 2,3
CC            xincr = (bx(line)-ax(line))/npts
CC            yincr = (by(line)-ay(line))/npts
CC            do 610 n = 1, npts
CC               dbgx(n) = ax(line) + n*xincr
CC               dbgy(n) = ay(line) + n*yincr
CC 610        continue
CC            call bl2ll(dbgx,dbgy,npts,dbglo,dbgla)
CC            call llplxy(dbglo,dbgla,npts,dbgx,dbgy,nout)
CC            call jmove(dbgx,dbgy)
CC            call jpoly(dbgx,dbgy,nout)
CC 690     continue
CCccc   ...DEBUG
CC
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BLSING
C
C FUNCTIONAL DESCRIPTION:       Excludes potentially singular points from the
C                               interior of spherical polygon by inserting small
C                               keyhole shaped areas which cut them out.
C                               When outlining the polygon, use original verts.
C                               When filling the polygon, include the insertions.
C
C INPUT FILES/PARAMETERS:       rlo(),rla() - Input polygon (lon,lat).
C                               xx(),yy()   - Input polygon (breakline coords).
C                               nin         - Number of input points.
C                               list()      - pointers linking xx,yy verticies.
C
C GLOBAL VARIABLES:             ax(2),ay(2) - Left hemisphere clip line start.
C                               bx(2),by(2) -   "     "      "    "   end.
C                               ax(3),ay(3) - Rght hemisphere clip line start.
C
C OUTPUT FILES/PARAMETERS:      xx(),yy()   - Input vtx list, new verts appended.
C                               nout        - Number of output verticies.
C                               list()      - Revised linkage.
C
C SUBROUTINES CALLED:           bl2xy, bl2ll, spgtst
```

Jul 20 14:44 1989 carm nth.f Page 17

```
C
C CALLED BY:                    blplgn, blhatc
C
C RESTRICTIONS:                 Blset must have been called to set up breakline.
C
C ABNORMAL RETURN CONDITIONS:   None.
C
C PROGRAMMER:                   DATE OF LAST CHANGE     REASON FOR CHANGE
C      Tom Wescott (NOSC)       Oct 88                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
C      not in 3.0
       subroutine blsing(rlo,rla,nin,xx,yy,nout,list,lstart)
C
       real ax(3),ay(3),bx(3),by(3),alon(3),alat(3),blon(3),blat(3)
       common /break/ blclat,blclon,ax,ay,bx,by,alon,alat,blon,blat
       real pxx(4),pyy(4)
       common /center/ clat,clon,cclat,sclat
       common /pie/ pie,tpie,pio2,pio4
       parameter (R2D = 180./3.14159)
       parameter (NCIRCL = 31)
       real rlo(*),rla(*), xx(*),yy(*)
       integer list(*)

       logical inside
C
       nout = nin
C
C      For polygons that intersect the breakline and must be clipped, there
C      are four troublesome points which, if enclosed, can cause problems.
C      1), 2)  The breakline ends (e.g. poles unplottable in many projections)
C          3)  The map center (edge of the world in breakline coord system)
C          4)  The antipode of center (unplottable in azimuthal projections)
C      If any of these lie inside the polygon, cut a keyhole to exclude them.
C
C      Set up an array containing these points in breakline coordinate system.
       pxx(1) = ax(1)
       pyy(1) = ay(1)
       pxx(2) = bx(1)
       pyy(2) = by(1)
       pxx(3) = 0.0
       pyy(3) = 0.0
C      Antipode is undefined, use center point for reference.
       pxx(4) = 0.0
       pyy(4) = 0.0
C
       do 190 ntrble = 1, 4
C         Find (lon,lat) of these points.
          if (ntrble .eq. 3) then
C            Set up to test antipode of map center (which is breakline center).
             trblon = blclon
             trblat = blclat
          else if (ntrble.eq.4) then
C            Set up to test map center (the antipode of breakline system center).
             trblon = blclon - sign(pie,blclon)
             trblat = - blclat
```

```
         else
            call bl2ll(pxx(ntrble),pyy(ntrble),1,trblon,trblat)
         endif
C
C        See if troublesome point lies inside the polygon.
C        TBD:  A bounding rectangle screen would make this test faster.
         call spgtst(rlo,rla,nin,trblon,trblat,inside,area)
         if (inside) then
C
C           Use vertex mapping nearest the troublesome point for keyhole start.
C           We need the linkage pointer from this vertex to the next in line.
            dmin = 1.0E9
            do 166 iv = 1, nin
               call llplxy(rlo(iv),rla(iv),1,vx,vy,nvout)
               dist = sqrt((pxx(ntrble)-vx)**2 + (pyy(ntrble)-vy)**2)
               if (dist.lt.dmin) then
                  dmin = dist
                  nearvt = iv
                  p2next = list(iv)
               endif
               key = nearvt
 166        continue

CD           WRITE(*,*)'BLSING... troublesome pt inside polygon',ntrble
CD           WRITE(*,*)'      ...',trblon*R2D,trblat*R2D,'near ',nearvt
CD           CALL LLPLXY(TRBLON*.999,TRBLAT*.999,1,XXX,YYY,IDUM)
CD           CALL JCMARK(3)                 ! MARK KEYHOLE CIRCLE WITH "*"
CD           CALL JMARK(XXX,YYY)

CD           CALL BL2LL(XX(KEY),YY(KEY),1,KEYLO,KEYLA)
CD           CALL LLPLXY(KEYLO,KEYLA,1,KEYX,KEYY,IDUM)
CD           CALL JCMARK(4)                 ! MARK KEYHOLE START/END WITH "0"
CD           CALL JMARK(KEYX,KEYY)

CD           IF (NTRBLE.EQ.2) THEN
CD              WRITE(*,*) ' BLSING...  south pole in plg.'
CD              DO 334 IPI = 1, NIN
CD              WRITE (*,*)'    south polar polygon  ',rlo(ipi),rla(ipi)
CD334           CONTINUE
CD           ENDIF
C
C           Use interpole distance to set radius for keyhole circle.
            dxp2p = ax(1) - bx(1)
            dyp2p = ay(1) - by(1)
            dp2p = sqrt(dxp2p*dxp2p+dyp2p*dyp2p)
            r = .005*dp2p
C           Or, a very large circle which excludes breakline center antipode.
            if (ntrble .eq. 4) r = 1.0E+4
            theta0 = atan2(dyp2p,dxp2p)
C
C           Make a circle around the trouble point in the direction
C           (cw/ccw) opposite to vertex order in the original polygon.
C           New verticies are appended to (xx,yy).
            do 140 i = 1, NCIRCL
               theta = theta0 + (i-1)*tpie/(NCIRCL-1)
               theta = sign(theta,area)
```

Jul 20 14:44 1989 carm nth.f Page 19

```
C
C              Note that when the map center is inside a polygon, the
C              direction of traversal in breakline coords is reversed!
               if (ntrble .eq. 4) theta = -theta
C
               if (i.eq.1) then
C                 Link from keyhole start.
                  list(nearvt) = nout + 1
               else
C                 Continue with keyhole.
                  list(nout) = nout + 1
               endif

               nout = nout + 1
               xx(nout) = pxx(ntrble) + r*cos(theta)
               yy(nout) = pyy(ntrble) + r*sin(theta)
CD              CALL BL2LL(XX(NOUT),YY(NOUT),1,KEYLO,KEYLA)
CD              CALL LLPLXY(KEYLO,KEYLA,1,KEYX,KEYY,IDUM)
CD              CALL JCMARK(5)             ! MARK KEYHOLE PATH WITH "X"
CD              CALL JMARK(KEYX,KEYY)
 140        continue
C
C           Add line from circle back to where we left the original polygon.
            list(nout) = nout + 1
            nout = nout + 1
            xx(nout) = xx(key)
            yy(nout) = yy(key)
            list(nout) = p2next
C
CD           CALL BL2LL(XX(NOUT),YY(NOUT),1,KEYLO,KEYLA)
CD           CALL LLPLXY(KEYLO,KEYLA,1,KEYX,KEYY,IDUM)
CD           CALL JCMARK(5)             ! MARK KEYHOLE START/END WITH "X"
CD           CALL JMARK(KEYX,KEYY)
C
         endif
 190  continue
C
CD     WRITE(*,*) ' BLSING linkage'
CD     DO 2111 j= 1, nout, 10
CD        WRITE(*,9211) (k, list(k),k=j,j+9)
CD9211    FORMAT(' ',10(I3,')',I3,' '))
CD2111 CONTINUE
      return
      end


C+*+*+*+*+*+*+*+*+*+*+*+*+*+*+*+*+*+*+*+*+*+*+*+*+*+*+*+*+*+*+*+*+*+*|*+*+*+*+
C UNIT NAME:                   CK4ALL
C
C FUNCTIONAL DESCRIPTION:      Checks for all of a geographic area bounding
C                              rectangle (BR) being visible in the viewport.
C
C INPUT FILES/PARAMETERS:      alimit(4) - geographic area BR.
C
C GLOBAL VARIABLES:            vpnort,vpsout,vpeast,vpwest - viewport BR
C
```

```
C OUTPUT FILES/PARAMETERS:      allon
C
C SUBROUTINES CALLED:           lltoxy, clipxy
C
C CALLED BY:                    DMAPII
C
C RESTRICTIONS:                 Geo area rectangle delta lon < pi.
C
C ABNORMAL RETURN CONDITIONS:   None.
C
C PROGRAMMER:                   DATE OF LAST CHANGE     REASON FOR CHANGE
C     Tom Wescott  (NOSC)       11/87                   Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine ck4all(allon,alimit)
c
      common /viewbr/ vpnort,vpsout,vpeast,vpwest
      logical invali, allon, ison
      common /invali/ invali
      common /pie/ pie,tpie,pio2,pio4
      real  alimit(4)
c
c     To handle case when one side of the viewport arcs through one
c     side of the area rectangle, test at least three pts per side..
      parameter (NPOINTS = 3)
c
cccc
c     Get N,S,E,W sides of rectangle from WDBII limit array.
      rsout = alimit(1)
      rnort = alimit(2)
      rwest = alimit(3)
      reast = alimit(4)
      Dlo = reast - rwest
      if (Dlo.gt.pie) then
         tmp = reast
         reast = rwest
         rwest = tmp
      endif
c
      allon = .false.
      xincr = (reast-rwest)/(NPOINTS-1)
c
      rlon = rwest - xincr
      do 300 icol = 1, NPOINTS
         rlon = rlon + xincr
         if ((icol.eq.1).or.(icol.eq.NPOINTS)) then
            yincr = (rnort-rsout)/(NPOINTS-1)
            npts = NPOINTS
         else
            yincr = rnort - rsout
            npts = 2
         endif
c
         tlat = rsout - yincr
         do 200 irow = 1, npts
```

```
Jul 20 14:44 1989  carr  nth.f Page 21

            tlat = tlat + yincr
            rlat = tlat
c
c           Nudge any test points off possibly invalid poles.
            if (abs(rlat).ge.pio2) rlat = rlat - sign(.001,rlat)
c
            call lltoxy(rlat,rlon,x,y)
            if (invali) then
               GO TO 900
            else
               call clipxy(x,y,ison)
               if (.not. ison) GO TO 900
            endif
 200     continue
 300  continue
      allon = .true.
c
 900  return
      end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      CK4ANY
C
C FUNCTIONAL DESCRIPTION:         Checks for intersection of a geographic
C                                 area with the viewport by comparing bounding
C                                 rectangles (BR) in lon,lat.  If rectangles
C                                 intersect, visibility is checked.
C
C INPUT FILES/PARAMETERS:         alimit(4) - geographic area BR.
C
C GLOBAL VARIABLES:               vpnort,vpsout,vpeast,vpwest - viewport BR
C
C OUTPUT FILES/PARAMETERS:        someon
C
C SUBROUTINES/FUNCTIONS:          lltoxy, clipxy
C
C CALLED BY:                       DMAPII, LLGRID
C
C RESTRICTIONS:                   Geo rectangle delta lon must be less than pi.
C
C ABNORMAL RETURN CONDITIONS:     None.
C
C PROGRAMMER:                     DATE OF LAST CHANGE     REASON FOR CHANGE
C     Tom Wescott  (NOSC)         11/87                   Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine ck4any(someon,alimit)
c
      common /viewp/ xrad,yrad,ixnp,iynp,xc,yc
      common /viewbr/ vpnort,vpsout,vpeast,vpwest
      common /pie/ pie,tpie,pio2,pio4
      logical invali, someon, ison
      common /invali/ invali
c
```

Jul 20 14:44 1989 carn nth.f Page 22

```
      real  alimit(4)
c
c     To handle case where one side of the viewport arcs through one
c     side of the area rectangle, test at least three pts per side..
      parameter (NPOINTS = 5)
c
c
c     Get N,S,E,W sides of geo rectangle from WDBII limit array
c     as viewed from side of earth containing the rectangle.
      rsout = alimit(1)
      rnort = alimit(2)
      rmnlo = alimit(3)
      rmxlo = alimit(4)
      Dlo = rmxlo - rmnlo
      if (Dlo.gt.pie) then
c        Limit array spans the dateline.  Convert to continuous coords.
         reast = rmnlo + tpie
         rwest = rmxlo
      else
         reast = rmxlo
         rwest = rmnlo
      endif
c
      someon = .false.
c
c     Speedy return if geographic area N-S does not overlap viewport BR.
      if ((rnort.gt.vpsout) .and. (rsout.lt.vpnort)) then
c
c        We can identify intersection of area with viewport by testing
c        visibility of all points (approximated by NPOINT) along the
c        rectangle sides and making sure any totally invisible rectangle
c        does not surround the viewport.
c
c        Trim large rectangles to viewport size prior to testing
c        to insure all test points dont miss the viewport.
         if (rnort.gt.vpnort) rnort = vpnort + .0001
         if (rsout.lt.vpsout) rsout = vpsout - .0001
c
         nclipt = 0
         ixt = 0
         iyt = 0
         xincr = (reast-rwest)/(NPOINTS-1)
         yincr = (rnort-rsout)/(NPOINTS-1)
c
         rlon = rwest - xincr
         do 300 icol = 1,NPOINTS
            rlon = rlon + xincr
            rl = rlon
            if (rl.gt.pie) rl = rl - tpie
            tlat = rsout - yincr
            do 200 irow = 1,NPOINTS
               tlat = tlat + yincr
               rlat = tlat
c
c              Nudge any test points off possibly invalid poles.
               if (abs(rlat).ge.pio2) rlat = rlat - sign(.001,rlat)
```

Jul 20 14:44 1989 carm nth.f Page 23

```
c
               call lltoxy(rlat,rl,x,y)
               if (.not. invali) then
                  call clipxy(x,y,ison)
                  if (ison) then
                     someon = .true.
                     RETURN
                  else
c                    Totalize viewport space sector containing clipped corner.
                     if (((icol.eq.1).or.(icol.eq.NPOINTS)).and.
     +                  ((irow.eq.1).or.(irow.eq.NPOINTS))) then
                        nclipt = nclipt + 1
                        ixt = ixt + ixnp
                        iyt = iyt + iynp
                     endif
                  endif
               endif
 200        continue
 300     continue
c
c        Set someon to true if rectangle corners straddle the viewport.
         if (nclipt.eq.4) then
            if (((ixt.eq.0).and.(abs(iyt).ne.4)) .or.
     +         ((iyt.eq.0).and.(abs(ixt).ne.4))) then
c              Insure rectangle is not on back side of earth.
               if (abs(reast).gt.pie) reast = reast - sign(tpie,reast)
               if (eastl(reast,rwest) .eq. reast)  someon = .true.
            endif
         endif
c
      endif
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        CLIP2L
C
C FUNCTIONAL DESCRIPTION:           Clips a polygon by a line.  Output points
C                                   will lie in the half plane to the left of
C                                   a specified directed line segment.
C
C INPUT FILES/PARAMETERS:           x(n), y(n) - Input polygon coords.
C                                   n          - Number of input points.
C                                   ax,ay      - Directed line segment start.
C                                   bx,by      -    "       "       "   end.
C
C GLOBAL VARIABLES:                 none.
C
C OUTPUT FILES/PARAMETERS:          u(m), v(m) - Clipped polygon coords.
C                                   m          - Number of output points.
C
C SUBROUTINES/FUNCTIONS CALLED:     none.
C
C CALLED BY:                        BLPLGN
```

```
C
C LOCAL VARIABLES:                 s1, s2      - Sign of sN tells half plane.
C                                  dX, dY, D   - Coefficients of clip line in
C                                                form:     dY*x - dX*y + D = 0
C                                  ddx,ddy,dd  - Coefs of polyline segment.
C
C RESTRICTIONS:                    Don't use single buffer for input & output.
C
C ABNORMAL RETURN CONDITIONS:      none.
C
C REFERENCE:                       Sutherland & Hodgeman    CACM 1974
C
C PROGRAMMER:                    DATE OF LAST CHANGE     REASON FOR CHANGE
C     Tom Wescott (NOSC)         Dec 87                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
      subroutine clip2l(ax,ay,bx,by,x,y,n,u,v,m)
c
      include   'carmaxdim.inc'
c
      dimension x(*),y(*), u(*),v(*)
c
c     Compute clip line (also half plane) general form coefficients
c     from directed line segment  (ax,ay) to (bx,by).
      dY = ay - by
      dX = ax - bx
      D  = ax*by - ay*bx
c
      m = 0
c     Process the first point.
      s1 = dY*x(1) - dX*y(1) + D
      if (s1.ge.0.0) then
         m = m + 1
         u(m) = x(1)
         v(m) = y(1)
      endif
c
      if (n.gt.1) then
         do 100 i = 2, n
c
            if (m.ge.MAXV) then
               write(*,*)' CLIP2L... array exceeded ',MAXV
               STOP
            endif
c
            s2 = dY*x(i) - dX*y(i) + D
            if ((s1.lt.0.0).and.(s2.lt.0.0)) then
c              Output nothing.
            else
               if ((s1.ge.0.0).and.(s2.ge.0.0)) then
c                 Output line from point i-1 to point i.
                  m = m + 1
                  u(m) = x(i)
                  v(m) = y(i)
               else
```

Jul 20 14:44 1989 carm ıth.f Page 25

```
c                 Find intersection of polyline segment with clip line.
                  ddy = y(i-1) - y(i)
                  ddx = x(i-1) - x(i)
                  dd = x(i-1)*y(i) - y(i-1)*x(i)
                  xa = -(ddx*D-dX*dd)
                  ya = -(ddy*D-dY*dd)
                  wa = -(ddy*dX -dY*ddx)
c                 Note:  wa cannot be 0.0 here, divide check unnecessary.
                  xintr = xa/wa
                  yintr = ya/wa
c
                  if (s1.lt.0.0) then
c                    Output line from intersection point to point i.
                     m = m + 1
                     u(m) = xintr
                     v(m) = yintr
                     m = m + 1
                     u(m) = x(i)
                     v(m) = y(i)
                  else
c                    Output line from point i-1 to intersection point.
                     m = m + 1
                     u(m) = xintr
                     v(m) = yintr
                  endif
c
               endif
            endif
            s1 = s2
 100     continue
      endif
c
      return
      end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CLIPLG
C
C FUNCTIONAL DESCRIPTION:       Clips a polygon by a line.  Output points
C                               will lie in the half plane to the left of
C                               a specified directed line segment.
C
C INPUT FILES/PARAMETERS:       ax,ay        - Directed line segment start.
C                               bx,by        -    "      "      "    end.
C                               Closed polygon in linked list form:
C                                 x(n), y(n) - Vertex coordinate arrays.
C                                 inply      - Pointer to polygon start in x,y.
C                                 iptr(n)    - Ptr. array to vertex (n+1). Plgn
C                                              (terminated by repeat of 1stvrt).
C                                 m          - End of data marker in x,y.
C
C GLOBAL VARIABLES:             None.
C
C OUTPUT FILES/PARAMETERS:      Multiple polygons in linked list form:
C                                 outply(k)  - List of starting ptrs. for k
```

Jul 20 14:44 1989 carm nth.f Page 26

```
C                                                  polygons.  (terminated with a 0)
C                                  nxt(m+j)    - Pointer array to vertex (n+1).
C                                  m           - Updated end of data marker.
C
C SUBROUTINES CALLED:             None.
C
C CALLED BY:                      blhatc, blplgn, jpolg2
C
C LOCAL VARIABLES:                j            - # of intersections with clip line.
C                                 xi,yi        - Current point in input polyline.
C                                 xprv,yprv    - Previous point.
C                                 s1, s2       - Sign of sN tells half plane.
C                                 dX, dY, D    - Coefficients of clip line in
C                                                form:    dY*x - dX*y + D = 0
C                                 ddx,ddy,dd   - Coefs of polyline segment.
C
C RESTRICTIONS:                   None.
C
C ABNORMAL RETURN CONDITIONS:     None.
C
C PROGRAMMER:                     DATE OF LAST CHANGE     REASON FOR CHANGE
C     Tom Wescott (NOSC)          Aug 88                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
      subroutine cliplg(ax,ay,bx,by,x,y,inply,iptr,m,outply,nxt)
c
      real x(*),y(*)
      integer iptr(*), nxt(*)
c
      include  'carmaxdim.inc'
c
      integer list(2*MXPLYS), outply(MXPLYS)
c
c     Compute clip line (also half plane) general form coefficients
c     from directed line segment  (ax,ay) to (bx,by).
      dY = ay - by
      dX = ax - bx
      D  = ax*by - ay*bx
c
c     Initialize counters, and set up loop with previous point.
      nin = 0
      j = 0
      lstptr = inply
      xprv = x(lstptr)
      yprv = y(lstptr)
      s1 = dY*xprv - dX*yprv + D
      inptr = lstptr
c
c     Do Until (input polygon has closed)
 101     inptr = iptr(inptr)
         nin = nin + 1
         if ((nin.gt.idim).or.(inptr.gt.idim).or.(inptr.lt.1)) then
            Write(*,*)'CLIPLG...  bad input polygon linkage'
            STOP
         endif
```

Jul 20 14:44 1989 carr nth.f Page 27

```
          xi = x(inptr)
          yi = y(inptr)
c
          s2 = dY*xi - dX*yi + D
cc        if ((s1.lt.0.0).and.(s2.lt.0.0)) then
          if ((s1.le.0.0).and.(s2.le.0.0)) then
c            Output nothing.
          else
             if ((s1.ge.0.0).and.(s2.ge.0.0)) then
c               Output line from previous point to point i.
                nxt(lstptr) = inptr
             else
c               Find intersection of polyline segment with clip line.
                ddy = yprv - yi
                ddx = xprv - xi
                dd = xprv*yi - yprv*xi
                xa = -(ddx*D-dX*dd)
                ya = -(ddy*D-dY*dd)
                wa = -(ddy*dX -dY*ddx)
                xintr = xa/wa
                yintr = ya/wa
c               Append intersection pt to input polyline list.
                j = j + 1
                if (j+m.gt.idim)
     +             write(*,*)' CLIPLG... vertex limit exceeded ',idim
                list(j) = m+j
                x(m+j) = xintr
                y(m+j) = yintr
c
                if (s1.lt.0.0) then
c                  Output line from intersection point to point i.
                   nxt(m+j) = inptr
                else
c                  Output line from previous point to intersection point.
                   nxt(lstptr) = m+j
c                  Flag link from intersection with a zero.  Will fix it later.
                   nxt(m+j) = 0
                endif
             endif
          endif
          s1 = s2
          xprv = xi
          yprv = yi
          lstptr = inptr
          if (inptr.ne.inply) go to 101
c      End do.
c
       if (j.eq.0) then
c         Input lies entirely to one side of the clip line.
          outply(1) = 0
          outply(2) = 0
          if (s1.ge.0) outply(1) = inply
       else
c
c         Sort the list of intersections by position along the clip line.
          do 290 i = 1, j-1
```

```
            do 280 k = i+1, j
               if (abs(dX).gt.abs(dY)) then
                  if (x(list(i)).lt.x(list(k))) then
                     itemp = list(i)
                     list(i) = list(k)
                     list(k) = itemp
                  endif
               else
                  if (y(list(i)).lt.y(list(k))) then
                     itemp = list(i)
                     list(i) = list(k)
                     list(k) = itemp
                  endif
               endif
 280        continue
 290     continue
c
c        Bad input recovery:  If each pair of intersections do not contain
c        one nxt=0, we have cut thru two parts of an internally reflexed
c        polygon.  Reorder intersections for least objectionable linkage.
         do 298  i = 1, j-1, 2
            if (((nxt(list(i)).ne.0).and.(nxt(list(i+1)).ne.0)).or.
     +          ((nxt(list(i)).eq.0).and.(nxt(list(i+1)).eq.0))) then
CD             WRITE(*,*)'CLIPLG...reflex',nxt(list(i)),nxt(list(i+1))
c              Swap 2nd element of this bad pair with next linkable.
               ibad = nxt(list(i+1))
               do 295 k = i+2, j
                  itry = nxt(list(k))
                  if (((ibad.ne.0).and.(itry.eq.0)).or.
     +                 ((ibad.eq.0).and.(itry.ne.0))) then
                     itemp = list(k)
                     list(k) = list(i+1)
                     list(i+1) = itemp
                     go to 296
                  endif
 295           continue
 296           continue
            endif
 298     continue
c
c        Close polygons by linking alternate pairs of intersections.
         do 300 intr = 1, j-1, 2
            iaddr1 = list(intr)
            iaddr2 = list(intr+1)
            if (nxt(iaddr1).eq.0) nxt(iaddr1) = iaddr2
            if (nxt(iaddr2).eq.0) nxt(iaddr2) = iaddr1
 300     continue
c
c        Make a list of possible start points for output polygons.
         do 410 i = 1, j/2
            outply(i) = list(i*2)
 410     continue
         outply(j/2+1) = 0
c
c        Traverse that list to identify start points and delete extras.
         kountp = 0
```

```
        nxtplg = outply(1)
c       While (more polygons) do
 420       if (nxtplg.eq.0) go to 490
           kountp = kountp + 1
           if (kountp.gt.MXPLYS) then
              write(*,*)'CLIPLG... output exceeded max # of polygons'
              STOP
           endif
           istvrt = nxt(nxtplg)
           nxtvrt = nxt(istvrt)
           kountv = 1
c          While (polygon not closed) do
 430          if (nxtvrt.eq.istvrt) go to 480
c             Check remainder of polygon list for a duplicate entry.
              do 460 k = kountp+1, j/2
                 if (outply(k).eq.nxtvrt) then
c                   Delete duplicate polygon from start points list.
                    do 450 kk = k, j/2
                       outply(kk) = outply(kk+1)
 450                continue
                 endif
 460          continue
              nxtvrt = nxt(nxtvrt)
              kountv = kountv + 1
              go to 430
 480       continue
           nxtplg = outply(kountp+1)
           go to 420
 490    continue
      endif
c
c     Reset end of data marker.
      m = m+j
c
      return
      end


C+*+*+*+*+*+*+*+*+*+*+*+*+*+*+*+*+*+*+*+*+*+*+*+*+*+*+*+*+*+*+*+*+*+*+*+*+*+|*+*+*+*+
C UNIT NAME: CLIPXY
C
C FUNCTIONAL DESCRIPTION:  CLIPS POINT X,Y AGAINST VIEWPORT.
C
C INPUT FILES/PARAMETERS:
C
C       NEWONS                  LOGICAL     INDICATES WHETHER POINT IS ON SCREEN.
C       X                       REAL        X COORDINATE.
C       Y                       REAL        Y COORDINATE.
C
C GLOBAL VARIABLES : NONE.
C
C OUTPUT FILES/PARAMETERS:  NONE.
C
C SUBROUTINES/FUNCTIONS CALLED :
C
C       FPOSIT                  POSITIONS POINT X,Y.
```

```
C        FDRAWV                   DRAWS VECTOR TO X,Y.
C
C CALLED BY:                       BSTMAP, CHECKA, CHECKB, FILLPT, GRDLAT,
C                                  GRDLON, LIMITS, LLINXY, PLOTOV,
C                                  PLTCIT, PLTNAM
C
C LOCAL VARIABLES: NONE.
C
C RESTRICTIONS: NONE.
C
C ABNORMAL RETURN CONDITIONS:      NONE.
C
C LOCATION:                        /a21/gjf/MAPSRC.FTN
C
C PROGRAMMER:                      DATE OF LAST CHANGE     REASON FOR CHANGE
C
C     DAVE NATION                                          ORIGINAL CODE.
C     JERRY FENERTY                                        DOCUMENT AND MODIFY
C                                                          FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE CLIPXY (X,Y,NEWONS)

      LOGICAL NEWONS
      COMMON /VIEWP/ XRAD,YRAD,IXNP,IYNP,XC,YC

      NEWONS=.FALSE.
          IXNP=0
          IYNP=0
          IF (X.GT.XRAD) IXNP=1
          IF (X.LT.-XRAD) IXNP=-1
          IF (Y.GT.YRAD) IYNP=1
          IF (Y.LT.-YRAD) IYNP=-1
          IF (IXNP.EQ.0.AND.IYNP.EQ.0) NEWONS=.TRUE.

      RETURN
      END

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       D2OUTL
C
C FUNCTIONAL DESCRIPTION:          Draw (fill) map outline.
C
C INPUT FILES/PARAMETERS:          None.
C
C GLOBAL VARIABLES:                clat,clon       - Map center.
C                                  xrad,yrad       - Viewport limits.
C                                  alat(),alon()   - Conic clip line ends.
C                                  blat(),blon()
C
C OUTPUT FILES/PARAMETERS:         Whole earth polygon filled with ocean color.
C
C SUBROUTINES CALLED:              llplxy, xytoll
C
```

Jul 20 14:44 1989 carm nth.f Page 31

```
C CALLED BY:                     DMAPII
C
C LOCAL VARIABLES:               None.
C
C RESTRICTIONS:                  None.
C
C ABNORMAL RETURN CONDITIONS:    None.
C
C PROGRAMMER:                    DATE OF LAST CHANGE      REASON FOR CHANGE
C     DAVE NATION                                         Original droutl.
C     Tom Wescott  (NOSC)        11/87                    Generalized.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine D2OUTL
c
      common /center/ clat,clon,cclat,sclat
      common /viewp/ xrad,yrad,ixnp,iynp,xc,yc
      common /pie/ pie,tpie,pio2,pio4
      common /comgra/xllgra,yllgra,xurgra,yurgra,ibcgra,iocgra,incgra
      logical invali,notlst
      common /invali/ invali
      common /proj/ itproj,wmrad,xoffs,yoffs,scalr,notlst
      real ax(3),ay(3),bx(3),by(3),alon(3),alat(3),blon(3),blat(3)
      common /break/ blclat,blclon,ax,ay,bx,by,alon,alat,blon,blat
      parameter (NLOOPS = 9)
      parameter (NPOINTS = 37)
      real plon(5*NPOINTS),plat(5*NPOINTS),x(5*NPOINTS),y(5*NPOINTS)
c
c
c     Set interior and edge style for outline polygon.
      call jpintr(1)
      call jpedge(1)
c
c-------------------------------------------------------------------|--+
c Itproj:  1  2  3  4  5  6  7  8  9 10 11 12 13 14 15 16 17 18 19 20 21  |
c----------------------------------------------------------------------+
c          g  o  o  o  p  e  m  l  a  a  a  k  m  o  p  p  u  s  s      |
c          n  r  r  r  e  q  e  a  l  z  z  a  i  b  o  o  t  i  t      |
c          o  e  p  t  r  r  r  m  b  e  e  v  l  l  s  l  m  n  e      |
c          m  q  o  h  s  e  c  c  r  a  d  r  l  m  t  y  z  u  r      |
c----------------------------------------------------------------------+
      goto(3,02,02,03,03,05,05,04,04,03,03,04,05,05,02,04,01,04,03
     +    )itproj
c
c       Case #1  For omitting the outline.  Fill entire display.
 01         continue
            call jrect(-xrad,-yrad,xrad,yrad)
            go to 900
c
c       Case #2  For azimuthal projections with offset centers.
 02         continue
               if ((itproj.eq.3).or.(itproj.eq.15)) then
c                 For polar stereographic or polar orthographic.
                  polat = sign(pio2,clat)
                  call llplxy(0.0,polat,1,xcntr,ycntr,idummy)
```

```
Jul 20 14:44 1989  carr  mth.f Page 32

                 elseif (itproj.eq.2) then
c                   For equatorial orthographic.
                    call llplxy(clon,0.0,1,xcntr,ycntr,idummy)
                 endif
c                Jump to general azimuthal process for circle draw.
                 go to 302
c
c          Case #3  For general azimuthal projections.
 03             continue
                call llplxy(clon,clat,1,xcntr,ycntr,idummy)
c
c               Set line segment between proj. center and pt. outside viewport.
 302            xearth = xcntr
                yearth = ycntr
                xspace = -xrad*sign(1.1,xearth)
                yspace = -yrad*sign(1.1,yearth)
c
c               Locate possible intersection of map edge with line segment.
                do 304 itest = 1, NLOOPS
                   xedge = (xspace+xearth)*0.5
                   yedge = (yspace+yearth)*0.5
                   call xytoll(xedge,yedge,rlat,rlon)
                   if (invali) then
                      xspace = xedge
                      yspace = yedge
                   else
                      xearth = xedge
                      yearth = yedge
                   endif
 304            continue
c
c               Draw circle with radius slightly larger than map.
                rad = sqrt((xcntr-xedge)**2.+(ycntr-yedge)**2.) + 0.5
                call jcircl(xcntr,ycntr,0.,rad,0)
                go to 900
c
c          Case #4 For conics, etc. with pole to pole breakline opposite center.
 04             continue
c
c               Get geographic limits of the map from clip line ends.
                rnort = alat(3)
                rsout = alat(2)
                reast = alon(3)
                rwest = alon(2)
c
c               Translate longitude limits to continuous scale where  W < E.
                breakl = clon - sign(pie,clon)
                treast = reast
                trwest = rwest
                if (treast.lt.breakl) treast = treast + tpie
                if (trwest.lt.breakl) trwest = trwest + tpie
c
c               Draw a polygon around the curved figure defined by map limits.
                stepla = (rnort-rsout)/(NPOINTS-1)
                steplo = (treast-trwest)/(NPOINTS-1)
                j = 1
```

```
          do 402 i = 0, NPOINTS-1
             plon(j) = reast
             plat(j) = rnort - i*stepla
             j = j + 1
 402      continue
          do 404 i = 1, NPOINTS-1
             plon(j) = treast - i*steplo
             if (plon(j).gt.pie) plon(j) = plon(j) - tpie
             plat(j) = rsout
             j = j + 1
 404      continue
          do 406 i = 1, NPOINTS-1
             plon(j) = rwest
             plat(j) = rsout + i*stepla
             j = j + 1
 406      continue
          do 408 i = 1, NPOINTS-1
             plon(j) = trwest + i*steplo
             if (plon(j).gt.pie) plon(j) = plon(j) - tpie
             plat(j) = rnort
             j = j + 1
 408      continue
          call llplxy(plon,plat,j-1,x,y,nout)
c
          xmax = 10.0*xrad
          ymax = 10.0*yrad
          do 410 k = 1,nout
             if (abs(x(k)).gt.xmax) x(k) = sign(xmax,x(k))
             if (abs(y(k)).gt.ymax) y(k) = sign(ymax,y(k))
 410      continue
          call jpolgn(x,y,nout)
          go to 900
c
c      Case #5  For cylindricals, including obliques.
 05       continue
c         Get rectanglular limits of the map from clip line ends.
          plon(1) = alon(2)
          plat(1) = alat(2)
          plon(2) = blon(2)
          plat(2) = blat(2)
          plon(3) = alon(3)
          plat(3) = alat(3)
          plon(4) = blon(3)
          plat(4) = blat(3)
          plon(5) = plon(1)
          plat(5) = plat(1)
          call llplxy(plon,plat,5,x,y,nout)
          xmax = 10.0*xrad
          ymax = 10.0*yrad
          do 510 k = 1,nout
             if (abs(x(k)).gt.xmax) x(k) = sign(xmax,x(k))
             if (abs(y(k)).gt.ymax) y(k) = sign(ymax,y(k))
 510      continue
          call jpolgn(x,y,nout)
          go to 900
c
```

```
Jul 20 14:44 1989   carr   mth.f Page 34

c     End cases.
 900  continue
c
c     Draw a box around graphics area to overwrite background color.
      call xcolor (iocgra)
      call jmove (xrad,yrad)
      call jdraw (xrad,-yrad)
      call jdraw (-xrad,-yrad)
      call jdraw (-xrad,yrad)
      call jdraw (xrad,yrad)
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DA2LL
C
C FUNCTIONAL DESCRIPTION:       Converts distance and azimuth from
C                               any point to lat, lon.
C
C INPUT FILES/PARAMETERS:       slat,slon  - Start point coords.
C                               dist       - Arc distance.
C                               az         - Azimuth.
C
C GLOBAL VARIABLES:             pie, pio2
C
C OUTPUT FILES/PARAMETERS:      tlat,tlon  - Target point coords.
C
C SUBROUTINES CALLED:           None.
C
C CALLED BY:                    BLSET, LL2GC, PXOBLM, XPSTER
C
C LOCAL VARIABLES:              S,T,D      - Sides of polar triangle.
C
C RESTRICTIONS:                 None.
C
C ABNORMAL RETURN CONDITIONS:   Az from poles assumed cw from prime meridian.
C
C PROGRAMMER:                   DATE OF LAST CHANGE     REASON FOR CHANGE
C     Dave Nation                                       Original DATOLL
C     Tom Wescott (NOSC)        Dec 87                  Robust version.
C
C-*-*-*-*-*-*-*-*-*-*-*-*-*-*-*-*-*-*-*-*-*-*-*-*-*-*-*-*-*-*-*-*-*-*-*-*|*-*-*-*-
      subroutine DA2LL(slat,slon,dist,az,tlat,tlon)
c
      common /pie/ pie,tpie,pio2,pio4
c
      cosT = sin(slat)
      sinT = cos(slat)
      cosD = cos(dist)
      sinD = sin(dist)
c
c     Law of Cosines for polar distance of target point.
      cosS = cosT*cosD + sinT*sinD*cos(az)
      if (abs(cosS).gt.1.0)  cosS = sign(1.0,cosS)
```

Jul 20 14:44 1989 carr mth.f Page 35

```
      S = acos(cosS)
      tlat = pio2 - S
c
c     Calculate polar angle.
      sinS = sin(S)
      sinAz = sin(az)
      if ((abs(slat).lt.pio2).and.(abs(tlat).lt.pio2)) then
         denom = sinS*sinT
         dnumr = cosD - cosS*cosT
         cosDlo = dnumr/denom
c
         if (abs(cosDlo) .lt. 0.900) then
c           Law of Cosines works well for most polar angles.
            Dlo = sign(acos(cosDlo),sinAz)
         else
c           Law of Sines is more accurate when Dlo near 0 or pi.
            sinDlo = sinD*sinAz/sinS
            if (abs(sinDlo).gt.1.0)  sinDlo = sign(1.0,sinDlo)
            Dlo = asin(sinDlo)
            if (dnumr.lt.0.0)  Dlo = sign(pie,Dlo) - Dlo
         endif
      else
         if(sinS.eq.0.0) then
c           Target point is a pole.
            Dlo = 0.0
         else
c           Start point is a pole, assume caller has defined az from prime M.
            Dlo = - slon - az*cosT
         endif
      endif
c
      tlon = slon + Dlo
      if (abs(tlon).gt.pie) tlon = tlon - sign(tpie,tlon)
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: distaz
C
C FUNCTIONAL DESCRIPTION:  Compute distance and azimuth between 2 points
C
C INPUT FILES/PARAMETERS:
C               L1, L2  - Latitude of first and second points in radians.
C               DLo     - Longitude difference between points in radians.
C
C GLOBAL VARIABLES :
C               common /center/
C               common /pie/
C
C OUTPUT FILES/PARAMETERS:
C               dist    - Arc length between points in degrees.
C               az      - Azimuth of second point in radians.
C                         Note... convention is cw positive.
C
```

```
C SUBROUTINES/FUNCTIONS CALLED :
C
C CALLED BY:                      NO LONGER USED BY CARICATURE
C
C LOCAL VARIABLES: NONE.
C
C RESTRICTIONS: NONE.
C
C ABNORMAL RETURN CONDITIONS:     NONE.
C
C LOCATION:
C
C PROGRAMMER:                     DATE OF LAST CHANGE     REASON FOR CHANGE
C
C     DAVE NATION                                         ORIGINAL CODE.
C     JERRY FENERTY                                       DOCUMENT AND MODIFY
C                                                         FOR A21 PROTOTYPE.
C     Tom Wescott (NOSC)          Jan 86           Change to single precision
c     Tom Wescott                 1987             fix cosER - distaz
C
C-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE DISTAZ (L1,DLo,L2,DIST,AZ)

c
      real L1, L2
      common /pi/ pie,tpie,pio2,pio4
      common /rade/ rade
      real*8 erd
      common /er/ er,erd
c
c
      sinL1 = sin(L1)
      cosL1 = cos(L1)
      sinL2 = sin(L2)
      cosL2 = cos(L2)
      cosDLo = cos(DLo)
c
c     Use cosine rule for sides to compute arc distance.
      cosER = sinL1*sinL2+cosL1*cosL2*cosDLo
      cosER = amax1(cosER,-1.0)
      cosER = amin1(cosER,1.0)
      er = acos(cosER)
c     Convert arc distance into degrees.
      dist = er * rade

cTemp Set erd for the remaining double precision routines.
      erd = er
c
      sinER = sin(er)
      sercl1 = sinER*cosL1
      if (sercl1 .eq. 0.0) then
c        Points are on same meridian, avoid zero divide.
         if (L2.gt.L1) then
            az = pie
         else
```

Jul 20 14:44 1989 carr nth.f Page 37

```
            az = 0.
         endif
      else
c        Use cosine rule again to compute azimuth.
         cosAZ = (sinL2-cosER*sinL1)/sercl1
         cosAz = amax1(cosAz,-1.0)
         cosAz = amin1(cosAz,1.0)
         az = acos(cosAZ)
      endif
c
c     Make azimuth clockwise positive.
      if (Dlo .lt. 0.0) az = tpie - az
c
      return
      end


C+*+*+*+*+*+*+*+*+*+*+*+*+*+*+*+*+*+*+*+*+*+*+*+*+*+*+*+*+*+*+*+*+*+*+*+*|*+*+*+*+
* UNIT NAME: DMAPII
*
* FUNCTIONAL DESCRIPTION:  READS WDBII AND DRAWS MAP.
*
* INPUT FILES/PARAMETERS:
*
*       XRNM    HORIZONTAL RADIUS (X DIRECTION) IN NAUTICAL MILES
*               OF THE DISPLAY VIEWPORT.  THIS IS 1/2 OF THE VIEWPORT WIDTH.
*               (ONE NAUTICAL MILE ROUGHLY EQUATES TO 1 MINUTE LATITUDE)
*       XCN     SCREEN COORDINATES OF THE CENTER OF THE MAP IN THE X DIRECTI
*       YCN     SAME AS ABOVE IN THE Y DIRECTION.
*       LEVEL   LEVELS OF DETAIL (CORRESPONDS TO LINE RANKING VALUES WITHIN
*               CATEGORIES OF WDBII DATA) RANGE IS BETWEEN 1 - LEAST DETAILE
*               AND 15 - MOST DETAILED
*       CLA     LATITUDE OF MAP AT CENTER OF SCREEN IN RADIANS
*               (NORTH IS POSITIVE, SOUTH NEGATIVE)
*       CLO     LONGITUDE OF MAP AT CENTER OF SCREEN IN RADIANS
*               (EAST IS POSITIVE, WEST NEGATIVE)
*       XRA     HALF OF WIDTH OF VIEWPORT IN SCREEN COORDINATES
*       YRA     HALF OF HEIGHT OF VIEWPORT IN SCREEN COORDINATES
*       ITPRO   NUMERIC VALUE REPRESENTING TYPE OF PROJECTION
*                       1 - GNOMONIC
*                       2 - ORTHOGRAPHIC EQUATORIAL
*                       3 - ORTHOGRAPHIC POLAR
*                       4 - ORTHOGRAPHIC (OBLIQUE)
*                       5 - PERSPECTIVE
*                       6 - EQUIRECTANGULAR
*                       7 - MERCATOR
*                       8 - LAMBERT CONFORMAL
*       IRES    MINIMUM RESOLUTION OF LINES IN SCREEN COORDINATES
*               A LINE WILL NOT BE DRAWN UNLESS IT IS IRES UNITS LONG
*               (UNLESS IT IS THE LAST VECTOR IN A STRING)
*       LTYPTB  THIS IS A TABLE OF 16 VARIABLES CONTAINING AN INTEGER
*               VALUE REPRESENTING LINE TYPE FOR THE WDBII LINE
*               CATEGORIES.  THE CATEGORIES ARE AS FOLLOWS:
*                    1      COASTLINES, ISLANDS, LAKES
*                    2      POLITICAL BOUNDARIES
*                    3      INTERNAL POLITICAL BOUNDARIES
```

Jul 20 14:44 1989 carı mth.f Page 38

```
*                      4       RIVERS
*                      5       RAILROADS
*                      6       ROADS
*                      7       CITY NAMES
*                      8       OUTLINE OF EARTH (ORTHOGRAPHIC PROJECTIONS)
*                      9       WATER FILL
*                     10       COUNTRY NAMES
*                     11
*                     12       MILITARY DISTRICTS
*                     13
*                     14
*                     15       SCALES
*                     16       GRIDS
*               THE VALUE REPRESENTS A VALUE RELATED TO THE HARDWARE
*               GRAPHICS DEVICE (COLOR, PLANE OR INTENSITY FOR RASTER SYSTEM
*               LINE TEXTURE FOR STORAGE TUBES)
*       LUNDAT  LOGICAL UNIT NUMBER FOR WDBII DATA FILE
*       LUNIND  LOGICAL UNIT NUMBER FOR WDBII INDEX FILE (REPRESENTS LINES)
*       LUNLIN  LOGICAL UNIT NUMBER FOR WDBII LINE INDEX FILE
*       LTON    TABLE OF 16 LOGICAL VALUES.  DETERMINES WHETHER THE
*               LINE TYPES REFERENCED BY LTYPTB ARE TO BE DISPLAYED
*       IPGRID  LAT/LON GRID DISPLAY PARAMETERS:
*               A FOUR VALUE INTEGER ARRAY CONSISTING OF THE FOLLOWING
*               1 - LATSTP - THE # OF MINUTES BETWEEN DISPLAYED LATITUDE LIN
*               2 - LONSTP - AS ABOVE WITH LONGITUDE
*               3 - LATINC - THE # OF MINUTES BETWEEN LINE SEGMENTS IN THE
*                       LINES REPRESENTING LATITUDE (RESOLUTION OF THE LINE)
*               4 - LONINC - AS ABOVE WITH LONGITUDE
*       DOTEM   A LOGICAL VALUE INDICATING TO USE DOTS TO REPRESENT LINES
*               OF LATITUDE AND LONGITUDE IF TRUE.
*       ORHALT  ALTITUDE FOR PERSPECTIVE
*       LTYPOV  THIS IS A TABLE OF 16 VARIABLES CONTAINING AN INTEGER
*               VALUE REPRESENTING LINE TYPE FOR OVERLAY FEATURES.
*       LTONOV  TABLE OF 16 LOGICAL VALUES.  DETERMINES WHETHER THE
*               LINE TYPES REFERENCED BY LTYPOV ARE TO BE DISPLAYED.
*       RANKT   RANK TABLE  -- LOGICAL TABLE OF UP TO 26 RANKS FOR EACH
*               OF THE 16 MAP LINE TYPES.
*
* GLOBAL VARIABLES :
*
*       INTERR       INTERR  LOGICAL     FLAG TO INDICATE IF MAP
*                                        DRAWING IS TO BE INTERRUPTED.
*       INVALI       INVALI  LOGICAL     INDICATES VALIDITY OF XYTOLL
*                                        AND LLTOXY CONVERSIONS.
*       LTYPS        LTYPS   INTEGER     CURRENT LINE TYPE.
*       ISEMAX       ISEMAX  INTEGER
*       XRAD         VIEWP   REAL        HALF OF VIEPORT WIDTH.
*       YRAD         VIEWP   REAL        HALF OF VIEWPORT HIEGHT
*       KB           TERMIN  INTEGER     WRITE UNIT NUMBER.
*       ICRT         TERMAIN INTEGER     READ UNIT NUMBER.
*       IGNOMN       PROJT   INTEGER     GNOMONIC PROJECTION.
*       IORTEQ       PROJT   INTEGER     ORTHOGRAPHIC EQUATORIAL PROJECTION.
*       IORTPO       PROJT   INTEGER     ORTHOGRAPHIC POLAR PROJECTION.
*       IORTHO       PROJT   INTEGER     ORTHOGRAPHIC PROJECTION.
*       IPERSP       PROJT   INTEGER     PERSPECTIVE PROJECTION.
*       IEQREC       PROJT2  INTEGER     EQUIRECTANGULAR PROJECTION.
```

Jul 20 14:44 1989 carr mth.f Page 39

```
*       IMERCA        PROJT2  INTEGER    MERCATOR PROJECTION.
*       ILAMCN        PROJT2  INTEGER    LAMBERT CONFORMAL PROJECTION.
*       ICNTGP        COUNTS  INTEGER
*       ICNTDV        COUNTS  INTEGER
*       PIE           PIE     REAL       3.14 ...
*       TPIE          PIE     REAL       TWO * PIE.
*       PIO2          PIE     REAL       PIE / 2.
*       PIO4          PIE     REAL       PIE / 4.
*       FILPLY     POLYCB  LOGICAL    WHETHER OR NOT POLYGON FILL HAS BEEN
*                             SELECTED FROM MENU.
*       OPNPLY     POLYCB  LOGICAL    WHETHER OR NOT POLYGON FILL FILE
*                             HAS OPENED PROPERLY.
*
* OUTPUT FILES/PARAMETERS:  NONE.
*
* SUBROUTINES/FUNCTIONS CALLED :
*
*       INITIA        INITIALIZE MAP PARAMETERS.
*       LIMITS        CALCULATE THE GEOGRAPHIC LIMITS.
*       MAPMSG        PRINTS MESSAGE INDICATING WHICH FEATURE
*                     IS BEING DRAWN.
*       GLTYPE        SETS COLOR TYPE AND OPENS NEXT SEGMENT.
*       DROUTL        DRAWS OUTLINE  OF EARTH.
*       FLUSHB        FLUSHES GRAPHIC BUFFER.
*       CHINT         CHECKS FOR INTERRUPT.
*       CHECKA        CHECKS RECTANGULAR AREA FOR INTERSECTION
*                     WITH VIEWPORT.
*       CHECKM        CHECKS RECTANGULAR AREA FOR INTERSECTION
*                     WITH VIEWPORT (MERCATOR & EQUIRECTANGULAR).
*       GTLIN         GETS LINE RECORD FROM WDBII.
*       GETPOI        GETS A POINT FROM WDBII.
*       GETLND        GETS A LINE INDEX RECORD
*       INVTES        CHECKS INVISIBILITY OF A POINT.
*       INVTS2        CHECKS MERCATOR AND EQUIRECTANGULAR FOR LINES
*                     TO BE CLIPPED AT LEFT AND RIGHT OF SCREEN.
*       LLTOXY        CONVERTS LAT/LONG TO X,Y.
*       CLIPXY        CLIPS X,Y AGAINST VIEPORT.
*       PROCPO        POSITIONS POINT X,Y.
*       GETSEG        RETURNS NEXT SEGMENT NUMBER.
*       FILLPT        SEED FILL AT POINT X,Y.
*       FILLIT        PERFORMS SEED FILL AT X,Y IF X,Y IS ON SCREEN.
*       GRID          DRAWS LAT/LONG, UTM OR GAUSS GRID.
*       SCLRET        DRAWS MAP SCALES.
*       NAMLIM        PLOTS NAMES ON MAP.
*
* CALLED BY:                    MAPPER
*
* LOCAL VARIABLES:
*
*       MAXCAT              INTEGER     MAXIMUM CATEGORY VALUE.
*       LCGRID              INTEGER     GRID FEATURE NUMBER.
*       LCOUTL              INTEGER     EARTH OUTLINE FEATURE NUMBER.
*       LCFILL              INTEGER     FILL FEATURE NUMBER.
*       LCNAME              INTEGER     NAMES FEATURE NUMBER.
*       LCCITY              INTEGER     CITY NAMES FEATURE NUMBER.
*       LSCALE              INTEGER     SCALES FEATURE NUMBER
```

Jul 20 14:44 1989 car mth.f Page 40

```
*       LCWTR                   INTEGER     WATER FILL FEATURE NUMBER
*       EOF                     LOGICAL     END OF FILE FLAG.
*       ERF                     LOGICAL     END OF FILE FOR WDBII DATA
*                                           FILE.
*       SETINV                  LOGICAL     WHETHER OR NOT TO CHECK LINES
*                                           AND/OR POINTS FOR VISIBILITY
*                                           ON SPHERE.
*       CHINV                   LOGICAL     SAME AS SETINV.
*       SOMEON                  LOGICAL     INDICATES THAT AT LEAST ONE POINT
*                                           CHECKED IS ON THE SCREEN.
*       ALLON                   LOGICAL     INDICATES ALL POINTS ARE ON SCREEN
*       ISINV                   LOGICAL     INDICATES IF POINT WAS
*                                           INVISIBLE.
*       ISGOOD                  LOGICAL     WHETHER OR NOT TWO POINTS SHOULD
*                                  BE CONNECTED (MERC. & EQUIREC.).
*       DOFILL                  LOGICAL     WHETHER OR NOT POLYGON FILL
*                                  WILL BE EXECUTED.
*       NEWONS                  LOGICAL     INDICATES IF NEW POINT IS
*                                           INVISIBLE.
*       NEWSEQ                  LOGICAL     INDICATES IF POINT IS PART
*                                           OF NEW SEQUENCE OF POINTS
*                                           OR PART OF PREVIOUS LINE.
*       SEGCDE                  INTEGER     0 - NORMAL FILL
*                                           1 - INTERIOR SEGMENT FILL
*       LINCDE                  INTEGER     NULL   - DEFAULT
*                                  CONCAT - CONCATENATE LINES
*                                  TPL    - 2 PT. LINE
*                                         (SHOULD NOT OCCUR)
*                                  SLP    - SINGLE LINE POLYGON
*                                  EOP    - END OF POLYGON
*                                         (MULTIPLE LINES)
*                                  EOS    - END OF STRING OF LINES
*                                         (MULTIPLE LINES PLUS
*                                         POLYGON FILL FILE DATA).
*
* RESTRICTIONS: NONE.
*
* ABNORMAL RETURN CONDITIONS:   NONE.
*
* LOCATION:                     /gl/dmapii.ftn
*
* PROGRAMMER:                   DATE OF LAST CHANGE     REASON FOR CHANGE
*
*     DANation                                            Original code
*     GJFenerty
*     DAN BERKICH -SAIC-       OCTOBER 1986            POLYGON FILL
*     for L MCCLEARY -NOSC-
*
C-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE DMAPII (XRNM,XCN,YCN,LEVEL,CLA,CLO,XRA,YRA,ITPRO,
     +        IRES,LTYPTB,LUNDAT,LUNIND,LUNLIN,LTON,IPGRID,DOTEM,
     +        ORHALT,ltypov,ltonov,rankt)

      INTEGER LEVEL(16)
      logical select
```

Jul 20 14:44 1989 carr mth.f Page 41

```
LOGICAL EOF,ERF,CHINV,SETINV,SOMEON,allon,ISINV
LOGICAL LTON(16)
LOGICAL DOTEM
logical rankt(26,16)
logical ltonov(16)
dimension ltypov(16)

DIMENSION ALIMIT(4),LTYPTB(16),IPGRID(4)

CHARACTER*1 CH
logical savchi
LOGICAL INTERR
COMMON /INTERR/ INTERR
COMMON /LTYPS/ LTYPS
COMMON /ISEMAX/ ISEMAX
COMMON /VIEWP/ XRAD,YRAD,IXNP,IYNP,XC,YC
COMMON /TERMIN/ KB,ICRT
COMMON /PROJT/ IGNOMN,IORTEQ,IORTPO,IORTHO,IPERSP
COMMON /PROJT2/ IEQREC,IMERCA,ILAMCN
COMMON /COUNTS/ ICNTGP,ICNTDV,icntpl
COMMON /PIE/ PIE,TPIE,PIO2,PIO4
common/scratr/qbox,qbkgrd
integer     qbox,qbkgrd
LOGICAL INVALI
COMMON /INVALI/ INVALI

COMMON /LWDBII/ NLINDE,LENLIN,icntli

logical map,vax,count
common /mapdbc/ map
common /vaxdbc/ vax
common /cntdbc/ count
logical bitmod
common /bitmod/ bitmod
common /viewbr/ vpnort,vpsout,vpeast,vpwest
INTEGER SEGNO,FIRSEG
COMMON /SEGNO/ SEGNO,FIRSEG
integer boxseg
integer oldlca
common /gmcom/ oldlca,irnk

EQUIVALENCE (RMINLA,ALIMIT(1)),(RMAXLA,ALIMIT(2))
EQUIVALENCE (RMINLO,ALIMIT(3)),(RMAXLO,ALIMIT(4))

logical filply,opnply
common /polycb/ filply,opnply
LOGICAL isgood,DOFILL,savfil
common /dofill/DOFILL
real maxx,maxx2
common /maxx/ maxx,maxx2
INTEGER    pntblk,POICNT,LINBLK

integer pblack
INTEGER null,concat,tpl,slp,eop,eos
PARAMETER (Null    = 0)
PARAMETER (CONCAT = 1)
```

Jul 20 14:44 1989 carı mth.f Page 42

```
      PARAMETER (TPL    = 2)
      PARAMETER (SLP    = 5)
      PARAMETER (EOP    = 6)
      PARAMETER (EOS    = 7)
      PARAMETER (PBLACK = 0)
      integer   lincde
      integer*2 segcde
      INTEGER   iprojection
      COMMON   /con001/ iprojection

      DATA MAXCAT/16/
      DATA ISEMAX/15/
      DATA LCCIL/1/
      DATA LCGRID/16/,LCOUTL/8/,ICRT/5/,KB/6/,LCNAME/10/
      DATA LCCITY/7/,LSCALE/15/,LCWTR/9/

c     placement in overlay values for polygon fill

C      DATA LCFILL/5/

      iprojection = itpro
      DOFILL = (filply.and.opnply)
      INTERR = .FALSE.
      if (map) then
         print*,' ********** IN DMAPII ************'
         print*,
     1     'XRNM,XCN,YCN,LEVEL,CLA,CLO,XRA,YRA,ITPRO,LTYPTB,LTON'
         print*,XRNM,XCN,YCN,LEVEL,CLA,CLO,XRA,YRA,ITPRO,
     1        LTYPTB,LTON
      endif

C     MAKE SURE THE NEXT COLOR IS SET IN GLTYPE
      LTYPS = -1

C     DO SOME LIMITING ON THE NAUTICAL MILE RADIUS VALUE
      IF (XRNM.LT..1) XRNM = .1
      IF (XRNM.GT.30000.) XRNM = 30000.

      XRAD = XRA
      YRAD = YRA

      CALL INITIA (XCN,YCN,CLA,CLO,XRA,YRA,ITPRO,IRES,XRNM,ORHALT)
      ICNTGP=0
      ICNTDV=0
      icntpl=0
c
c     Determine NSEW geographic limits of viewport's bounding rectangle.
      call limit2
c
c     Set up the breakline for conics.
      call blset(setinv)
c
C     DRAW OUTLINE OF EARTH
      IF (LTON(LCOUTL)) THEN
          if (DOFILL) then
            LTYPE=LTYPTB(lcwtr)
```

Jul 20 14:44 1989 carn nth.f Page 43

```
            CALL GLTYPE(LTYPE,lcwtr)
          else
            ltype=ltyptb(LCOUTL)
            CALL GLTYPE(LTYPE,lcoutl)
          endif

C         POLYGON COLOR = CURRENT LINE COLOR
          CALL XPIDEX (LTYPE,0)
          call d2outl
c
          CALL FLUSHB
          if (bitmod) then
            call jclose
            call jopen
          else
            CALL JRCLOS
            CALL JPURGE(FIRSEG)
            CALL JROPEN(FIRSEG)
          endif
          CALL XPIDEX (qbox,0)
          CALL JPINTR (0)
          CALL JPEDGE (1)
          CALL XCOLOR(qbox)
          CALL JRECT (-XRAD,-YRAD,XRAD,YRAD)
        ENDIF
c
C ----- REMOVE WHEN USING C I/O ROUTINES
        if (vax) then
c          no need for rewind
        else
           rewind lunlin
        endif

        EOF=.FALSE.
c       initializing variable icntli so that getlnd starts at the beginning
c       of the file after an interrupt
        ICNTLI=0
        ICGLIN=0
        INVALI=.FALSE.
        CALL lltoxy(cla,clo+pie,maxx,y1)
        maxx = abs(maxx)
        lastcat = 0
        oldlca = -1
c   ------------------ Top of Segment Loop ------------------------
C       LOOP THROUGH SECTIONS IN FILE
        nseg = 0
  810   CONTINUE

          CHINV=SETINV
          CALL getlnd (lunlin,icglin,lblk,loffs,nlines,lcateg,
     +                 rminla,rmaxla,rminlo,rmaxlo,eof)
          IF (EOF) GO TO 890
          nseg = nseg + 1

          DOFILL = (filply.and.opnply)
```

```
C  don't  READ TO END OF FILE IF INTERRUPTED WITHOUT DRAWING
          CALL CHINT (INTERR,CH)
          IF (INTERR) GO TO 969
          IF (LCATEG.GE.1.AND.LCATEG.LE.MAXCAT.AND.
     +    ((LTON(LCATEG)).or.
     +     ((LCATEG.EQ.1).and.(DOFILL)))) then
          IF (LCATEG.GT.1) DOFILL = .FALSE.
            if (lcateg.ne.oldlca) then
                LTYPE=LTYPTB(LCATEG)
                CALL GLTYPE(LTYPE,lcateg)
                if (level(lcateg).lt.1) level(lcateg) = 1
                ICNTDV=0
                oldlca = lcateg
            endif
          segcde = 0
          IF (DOFILL) CALL rdseg(icglin,linblk,lincnt,
     +                segcde,rminla,rminlo,rmaxla,rmaxlo,ierror)

c         Check segment for intersection with viewport.
          call ck4any(someon,alimit)
          if (someon)  call ck4all(allon,alimit)
c
          savchi = chinv
          IF (SOMEON) then
             IF (lastcat.NE.lcateg) then
               lastcat = lcateg
               if (opnply) then
                 maxrank = 0
                 if ((lcateg.eq.5.).or.(lcateg.eq.6)) then
                   i = 9
                 else if (lcateg.eq.11) then
                   i = 26
                 else
                   i = 15
                 endif
                 do 100 irnk = 1,i
                   if (rankt(irnk,lcateg)) maxrank = irnk
 100             continue
               endif
             endif
c
             if (.not.chinv) then
c               Conic breakline is possible, segment may need clipping.
                call blchk(isgood,alimit)
             else
                isgood = .true.
             endif
c
             IF (segcde.EQ.1) THEN
c              Segment is interior to shoreline.  Use add file for background.
               if (lton(LCCIL)) then
                 CALL jcolor(ltyptb(lccil))
               else
                 CALL jcolor(ltyptb(lcoutl))
               endif
               CALL jpidex(ltyptb(lcoutl),0)
```

Jul 20 14:44 1989 carr mth.f Page 45

```
c
              CALL intpoi(isgood)
              CALL mrkpoi
              CALL rdline(linblk,pntblk,poicnt,
     +             rsmnla,rsmnlo,rsmxla,rsmxlo,lblkoff,ierror)
              call sveadd(pntblk,poicnt)
              call flsply(EOS,lton,isgood)
            ENDIF
            CALL intpoi(isgood)
c
c---------------------------------------------------------------------
c           T o p   o f   L i n e   L o o p
c
               DO 880 J=1,NLINES
                   savfil = dofill
                   chinv = savchi
                   CALL CHINT (INTERR,CH)
                   IF (INTERR) GO TO 969
                   lblksav = lblk
                   loffsav = loffs
                   CALL gtlin(lunind,lblk,loffs,iblk,ioffs,
     +                         npoint,irnk,
     +                         rminla,rmaxla,rminlo,rmaxlo,ios)
                  IF (lcateg.ne.1) THEN
                     lincde = 0
                  ELSE
                     IF (DOFILL) THEN
                       lincde = irnk/2**8
                     ELSE
                       lincde = 0
                     ENDIF
                     irnk = MOD(irnk,2**8)
                     IF (mod(irnk,100).GT.15) THEN
                         ityp = irnk/16
                         irnk  = mod(irnk,16)
                     ELSE
                         ITYP = irnk/100
                         irnk  = mod(irnk,100)
                     ENDIF
                     if (irnk.eq.8) then
c                       Avoid trying to fill reefs.
                        dofill = .false.
                     endif

                     IF (ityp.EQ.2) THEN
                        if (lton(LCCIL)) then
                          call jcolor (ltyptb(lccil))
                        else if (lton(lcoutl)) then
                          CALL jcolor(ltyptb(lcwtr))
                        else
                          call jcolor(qbkgrd)
                        endif
                        if (lton(lcoutl)) then
                           CALL jpidex(ltyptb(lcwtr),1)
                        else
                           call jpidex(qbkgrd,1)
```

Jul 20 14:44 1989 carr mth.f Page 46

```
                        endif
                     ELSE
                        if (dofill) then
                           if (lton(LCCIL)) then
                             CALL jcolor(ltyptb(lccil))
                           else
                             CALL jcolor(ltyptb(lcoutl))
                           endif
                        else
                           CALL jcolor(ltyptb(lccil))
                        endif
                           CALL jpidex(ltyptb(lcoutl),0)
                     ENDIF
                  ENDIF
                 IF ((lincde.EQ.eos)
     +                  .AND.DOFILL) THEN
                  CALL rdline(linblk,pntblk,poicnt,
     +                     rminla,rminlo,rmaxla,rmaxlo,lblkoff,ierror)
                      IF (pntblk.ne.0) THEN
c                        Make sure that the line in the polygon fill file
c                        is a mate to the WDB line.
                       IF (lblkoff/2**8.ne.lblksav.or.
     +                           mod(lblkoff,2**8).ne.loffsav) THEN
                      PRINT *,
     +                'Polygon fill line DOES NOT match WDB line...'
                             print *,icglin
 821  format(x,'WDB blk/off =',i5,'/',i2,' CHG blk/off =',i5,'/',i2)
                      PRINT 821,lblksav,loffsav
     1                 ,lblkoff/2**8,mod(lblkoff,2**8)
c                         do not append points
                          poicnt = 0
                       ENDIF
                    ENDIF
                 ENDIF


c                   ****** use combination of digits of rrr and rds rank
                    if (lcateg.eq.5.or.lcateg.eq.6) irnk = irnk/10
                    if ((opnply).and.(irnk.gt.maxrank)) goto 882
                    select = rankt(irnk,lcateg)
                    IF (select) then

c                     Polyline visibility check.
                      if (.not.allon) call ck4any(someon,alimit)

                      IF (SOMEON.or.(dofill.and.
     +                (lincde.eq.CONCAT.or.lincde.ge.EOP))) then
C                        NEWSEQ=.TRUE.
                         PNTCNT=0
                         ERF=.FALSE.
                         ISINV=.FALSE.
                         ipcnt = 0
c
c            -------------------------------------------------
c             T o p   o f   P o i n t s   L o o p
c
```

```
c                       Concatenate WDBII polyline to polyline buffers.
                        DO 860 K=1,NPOINT
                          CALL getpoi(lundat,iblk,ioffs,plat,plon,erf)
                          IF (ERF) GO TO 865
                          CALL svepoi(plon,plat)
  860                   CONTINUE
c
                     IF (lincde.EQ.EOS)
     +               THEN
c                       Concatenate ADD FILE polyline to polyline buffers.
                        CALL mrkpoi
                        call sveadd(pntblk,poicnt)
                     ENDIF
c
c             B o t t o m   o f   P o i n t s   L o o p
c           ------------------------------------------------
c
                     IF (lincde.NE.concat) THEN
c                       Process the completed polygon.
                        CALL flsply(lincde,lton,isgood)
                        CALL intpoi(isgood)
                     ENDIF
  865                      CONTINUE
                         endif
                   endif
                   dofill = savfil
  880          CONTINUE
  882          CONTINUE
c
c          B o t t o m  o f   L i n e   L o o p
c -----------------------------------------------------------------------
c
          endif
        endif
c       check the size of the current retained segment and create a new on
c         call chksiz
      GO TO 810
  890 CONTINUE

      if ((count) .and. icntdr.gt.0) then
          print*,'dmapii -- moves, draws, polylines : ',icntgp,
     +    icntdv,icntpl,' (',icntmv,icntdr,')'
      endif

      CALL FLUSHB

      call areafl

      if(lton(lcwtr)) then
         ltype = ltyptb(lcwtr)
         call gltype(ltype,lcwtr)
         call fillit(ltype,xrnm,level(lcwtr))
      endif
      if(lton(lcname)) then
         ltype = ltyptb(lcname)
         call gltype(ltype,lcname)
```

```
            call namlim('namlim.dat',10,lton,xrnm)
         endif
         if(lton(lccity)) then
            ltype = ltyptb(lccity)
            call gltype(ltype,lccity)
            call pltcit(xrnm,'cities.dat',10)
         endif
         if (lton(lcgrid)) then
            ltype=ltyptb(lcgrid)
            call gltype(ltype,lcgrid)
c
c           The grid drawing routines still use numeric vs spatial limits:
            vmaxla = vpnort
            vminla = vpsout
            vmaxlo = vpeast
            vminlo = vpwest
            if (vmaxlo.lt.vminlo) then
               vmaxlo = +pie
               vminlo = -pie
            endif
            call dgrid(ipgrid,vmaxla,vminla,vmaxlo,vminlo,dotem,itpro)
         endif
  969    CONTINUE

         if (interr) then
             call flushb
         endif

C       PATCH EDGES

        if (dofill) then
c                                    put box in its own segment
          if (.not.bitmod) then
           call jrclos
           call getseg(boxseg)
           call jropen(boxseg)
          endif
          CALL xcolor(qbox)
          CALL jmove(-xrad,-yrad)
          CALL jdraw(-xrad,yrad)
          CALL jdraw(xrad,yrad)
          CALL jdraw(xrad,-yrad)
          CALL jdraw(-xrad,-yrad)
          CALL jupdat
        endif

         RETURN
         END

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      eastl
C
C FUNCTIONAL DESCRIPTION:         Finds the eastmost of two longitudes
C                                 as viewed from map center
C
```

Jul 20 14:44 1989 carı mth.f Page 49

```
C INPUT FILES/PARAMETERS:        rlon1,rlon2 - Two longitudes.
C
C GLOBAL VARIABLES:              clon        - Map center longitude
C
C OUTPUT FILES/PARAMETERS:       east1       - The eastmost.
C
C SUBROUTINES/FUNCTIONS CALLED:  None.
C
C CALLED BY:                     CK4ANY
C
C LOCAL VARIABLES:               Breakl    - Conic break line longitude.
C                                r1, r2    - Conditionally offset rlon1,rlon2.
C
C RESTRICTIONS:                  None.
C
C ABNORMAL RETURN CONDITIONS:    None.
C
C LOCATION:
C
C PROGRAMMER:                    DATE OF LAST CHANGE    REASON FOR CHANGE
C
C     Tom Wescott  (NOSC)        11/87                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      function east1(rlon1,rlon2)
c
      common/center/ clat,clon,cclat,sclat
      common/pie/ pie,tpie,pio2,pio4
c
      breakl = clon - sign(pie,clon)
c
      r1 = rlon1
      r2 = rlon2
      if (r1 .lt. breakl) r1 = rlon1 + tpie
      if (r2 .lt. breakl) r2 = rlon2 + tpie
c
      if (r1 .lt. r2) then
         east1 = rlon2
      else
         east1 = rlon1
      endif
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     FTPRNT
C
C FUNCTIONAL DESCRIPTION:        Cross hatches the footprint (instantaneous
C                                viewing area) for an aerial platform.
C
C INPUT FILES/PARAMETERS:        plo,pla    - Platform (lon,lat).
C                                alt        - Platform altitude, nm.
C                                afov       - Angular field of view, radians.
```

Jul 20 14:44 1989 carr mth.f Page 50

```
C                                tilt      - Look angle from nadir, radians.
C                                azi       - Azimuth of look angle, radians.
C                                x0,y0     - Point justifying the hatch.
C                                dx,dy     - Hatch line direction vector.
C                                dist      - Distance between hatch lines.
C
C GLOBAL VARIABLES:              None.
C
C OUTPUT FILES/PARAMETERS:       Array of line segments forming hatch pattern.
C
C SUBROUTINES CALLED:            blplin, blhatc, da2ll
C
C CALLED BY:                     satcov
C
C LOCAL VARIABLES:               plo(),pla()- Polyline in geographic coords.
C                                EARTHR    - Earth radius, nm
C
C RESTRICTIONS:                  None.
C
C PROGRAMMER:                    DATE OF LAST CHANGE    REASON FOR CHANGE
C     Tom Wescott (NOSC)         Oct 88                 Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
C     not in 3.0
      subroutine ftprnt(plo,pla,alt,afov,tilt,azi,x0,y0,dx,dy,dist)
C
      parameter (NPTS=61, IDIM=10*NPTS)
      real rlo(2*NPTS),rla(2*NPTS), ulo(IDIM),ula(IDIM)
      common /pie/ pie,tpie,pio2,pio4
      logical invali
      common /invali/ invali
      parameter (EARTHR = 3440.1)
C
C
C     Find horizon - platform - center of earth angle.
      pc = EARTHR + alt
      hpc = asin(EARTHR/pc)
C
C     To calculate tilt and azimuth angles for any ray from the platform,
C     consider a sphere of radius alt tangent to the earth at nadir.
C     Get spherical (pseudolat,azimuth) coords of viewing cone center line.
      cphi = tilt - pio2
      ctheta = azi
      razmax = 0.0
      razmin = 0.0
C
C     Does viewing cone miss the earth?
      halfov = afov/2.0
      if (hpc .lt. (tilt-halfov)) RETURN
C
C     Generate closed polyline for the projected cone rays.
      do 100 i = 1, NPTS
         azz = i*tpie/(NPTS-1.)
C
C        Get tilt and azimuth for the ray at angle azz around the cone.
         call da2ll(cphi,ctheta,halfov,azz,phi,theta)
```

```
C       Convert pseudolat to tilt angle from nadir.
        rtilt = pio2 + phi
        razmth = theta
C
C       Truncate polyline radially at the horizon.
        rtilt = amin1(rtilt,hpc)

C       Law of Sines calculates arc from nadir to intersection with earth.
        sinEXT = amin1(1.0,pc*sin(rtilt)/EARTHR)
        arc = asin(sinEXT) - rtilt
C
        call da2ll(pla,plo,arc,razmth,rla(i),rlo(i))
C
 100  continue
C
C
C     Condition polyline for uniform pt spacing in current projection.
      call ll2gc(rlo,rla,npts,IDIM,ulo,ula,nout)
C
C     Area outline is an option.
      call blplin(ulo,ula,nout)
C
C     Fill area viewed with a hatch pattern.
      call blhatc(ulo,ula,nout,x0,y0,dx,dy,dist)
C
C     Mark sub-platform point if view is oblique.
      if ((tilt.gt.0.0).and.(.not.invali)) then
         call llplxy(plo,pla,1,px,py,idummy)
         call jcmark(2)
         call jmark(px,py)
      endif
C
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    HATCH
C
C FUNCTIONAL DESCRIPTION:       Cross hatches a polygon by parallel lines.
C
C INPUT FILES/PARAMETERS:       x(n), y(n) - Vertex coordinate arrays.
C                               n          - Number of verticies.
C                               xtie,ytie  - Point justifying the hatch.
C                               dX,dY      - Hatch line direction vector.
C                               dist       - Distance between hatch lines.
C
C GLOBAL VARIABLES:             None.
C
C OUTPUT FILES/PARAMETERS:      Array of line segments forming hatch pattern.
C
C SUBROUTINES CALLED:           jdraw, jmove
C
C CALLED BY:                    blhatc
C
C LOCAL VARIABLES:              xi,yi        - Current point in input polyline.
```

Jul 20 14:44 1989 carn nth.f Page 52

```
C                              s1, s2         - Sign of sN tells half plane.
C                              dX, dY, D      - Coefficients of hatch line in
C                                               form:    dY*x - dX*y + D = 0
C                              ddx,ddy,dd     - Coefs of polyline segment.
C
C RESTRICTIONS:                None.
C
C PROGRAMMER:                  DATE OF LAST CHANGE     REASON FOR CHANGE
C     Tom Wescott (NOSC)       Oct 88                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
      subroutine hatch(x,y,nin,xtie,ytie,dX,dY,dist)
      dimension x(*),y(*)
c
      include   'carmaxdim.inc'
c
      dimension xout(MAXV),yout(MAXV)
c
c     Insure that we are dealing with a closed polygon.
      if ((x(nin).ne.x(1)).or.(y(nin).ne.y(1))) then
         n = nin + 1
         x(n) = x(1)
         y(n) = y(1)
      else
         n = nin
      endif
c
c     Bracket coefficient D for hatch lines that intersect the polygon.
      Dmin = dX*y(1) - dY*x(1)
      Dmax = dmin
      do 100 i = 2, n
         D = dX*y(i) - dY*x(i)
         Dmin = amin1(Dmin,D)
         Dmax = amax1(Dmax,D)
 100  continue
      Dtie = dX*ytie - dY*xtie
c
c     Construct a distance vector s perpendicular to hatch vector.
      dmod = sqrt(dX*dX+dY*dY)
      sx = -dist/dmod*dY
      sy = +dist/dmod*dX
c
c     Vector q = tie + ks will locate base for hatch lines.  k = kmin...kmax.
      kmin = (Dmin-Dtie)/(dist*dmod)
      kmax = (Dmax-Dtie)/(dist*dmod)
c
      do 400 k = kmin, kmax
         nintr = 0
         qx = xtie + k*sx
         qy = ytie + k*sy
         D = dX*qy - dY*qx
c
c        Process the first point.
         s1 = dY*x(1) - dX*y(1) + D
c
```

Jul 20 14:44 1989 carm mth.f Page 53

```
      if (n.gt.1) then
         do 200 i = 2, n
            s2 = dY*x(i) - dX*y(i) + D
            if ((s1.le.0.0).and.(s2.le.0.0)) then
c              Do nothing.
            else if ((s1.gt.0.0).and.(s2.gt.0.0)) then
c              Do nothing.
            else
c              Find intersection of polyline segment with hatch line.
               ddy = y(i-1) - y(i)
               ddx = x(i-1) - x(i)
               dd = x(i-1)*y(i) - y(i-1)*x(i)
               xa = -(ddx*D-dX*dd)
               ya = -(ddy*D-dY*dd)
               wa = -(ddy*dX-dY*ddx)
               nintr = nintr + 1
c              if (nintr.ge.MAXV) return
               xout(nintr) = xa/wa
               yout(nintr) = ya/wa
            endif
            s1 = s2
 200     continue
      endif
c
c     Sort the list of intersections by position along the hatch line.
      if (nintr.gt.1) then
         do 290 ii = 1, nintr-1
            do 280 kk = ii+1, nintr
               if (abs(dX).gt.abs(dY)) then
                  if (xout(ii).lt.xout(kk)) then
                     temp = xout(ii)
                     xout(ii) = xout(kk)
                     xout(kk) = temp
                     temp = yout(ii)
                     yout(ii) = yout(kk)
                     yout(kk) = temp
                  endif
               else
                  if (yout(ii).lt.yout(kk)) then
                     temp = xout(ii)
                     xout(ii) = xout(kk)
                     xout(kk) = temp
                     temp = yout(ii)
                     yout(ii) = yout(kk)
                     yout(kk) = temp
                  endif
               endif
 280        continue
 290     continue
      endif
c     Draw lines between adjacent pairs of intersections.
      if (nintr.gt.1) then
         do 500 i = 1, nintr-1, 2
            call jmove(xout(i),yout(i))
            call jdraw(xout(i+1),yout(i+1))
 500     continue
```

```
         endif
 400  continue
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: initia
C
C FUNCTIONAL DESCRIPTION: Initialize variables for dmapii
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                    BOXARE, BSTMAP, DMAPII, MAPPER, RPARAM
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                      DATE OF LAST CHANGE     REASON FOR CHANGE
C
C     DAVE NATION                                       ORIGINAL CODE.
C     JERRY FENERTY                                     DOCUMENTATION AND MODIFI
C                                                       FOR A21 PROTOTYPE.
C     Tom Wescott  (NOSC)          10/87                Partial cleanup.
C
C-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE INITIA (XCN,YCN,CLA,CLO,XRA,YRA,ITPRO,IRES,XRNM,
     +  ORHAL)

C       Initialize variables for dmapii

c        COMMON /PROJT/ IGNOMN,IORTEQ,IORTPO,IORTHO,IPERSP
c        COMMON /PROJT2/ IEQREC,IMERCA,ILAMCN
        COMMON /PIE/ PIE,TPIE,PIO2,PIO4
        LOGICAL SAVEXY
        COMMON /STMSGS/ XPREV,YPREV,IRESSQ,XSAV,YSAV,SAVEXY
        COMMON /CONST/ MAXVAL,RMPV,C,R,ERNM
        COMMON /CENTER/ CLAT,CLON,CCLAT,SCLAT
        COMMON /VIEWP/ XRAD,YRAD,IXNP,IYNP,XC,YC
        LOGICAL OLDONS,OLDINV
        COMMON /OLDXY/ XOLD,YOLD,IXOP,IYOP,OLDONS,OLDINV
        COMMON /ECCEN/ ECCEN,EC2
        COMMON /RADE/RADE
```

Jul 20 14:44 1989 carr mth.f Page 55

```
      logical notlst
      common /proj/ itproj,wmrad,xoffs,yoffs,scalr,notlst
      common /conic/ spll1,spll2,tranl,trank,tranr,tscale,pole,tilt
      LOGICAL NEWONS,NEWSEQ
      logical map
      common /mapdbc/ map

      if (map)
     + print*,'initia -- enter ',xcn,ycn,cla,clo,xra,yra,itpro,ires,
     + xrnm,orhal
c     limit xrnm to >= 1.0
      if (xrnm.lt.1.0) xrnm = 1.0

      EC2=ECCEN**2
      RMPV=1.0E-7
      MAXVAL=27000
      SAVEXY=.FALSE.
      OLDONS=.FALSE.
      NEWONS=.FALSE.
      NEWSEQ=.FALSE.
      ITPROJ=ITPRO
      CLAT=CLA
      CLON=CLO
      XRAD=XRA
      YRAD=YRA
      XC=XCN
      YC=YCN
      R1=XRAD
      R2=XRNM
      WMRAD=R1*ERNM/R2
      IRESSQ=IRES**2
      SCLAT=SIN(CLAT)
      CCLAT=COS(CLAT)
      RXRNM=XRNM*C
      R=XRAD*COS(RXRNM)/SIN(RXRNM)
      XOFFS=0
      YOFFS=0
c
c     Make an initial call to calculate and store projection constants.
      notlst = .false.
      call lltoxy(clat,clon,x,y)
c
c     Translate map center point to display center.
      XOFFS = -X
      YOFFS = -Y
c
      if (map)
     + print*,'initia -- exit ',wmrad,r,maxval,rmpv,itproj

      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        INVTES
C
```

```
Jul 20 14:44 1989  carr  ıth.f Page 56

C FUNCTIONAL DESCRIPTION:           CHECKS POINT FOR INVISIBILITY
C
C       NOTE:  Usefullness of invtes reduced in caricature 3.0 or later. Where
C              invisibility, independant of projection, is checked by calling
C              lltoxy with the point in question, then looking at the invali
C              flag in common /invali/.  It will be set to .true. for any
C              point lying over the viewing horizon.   TFW.
C
C                   COMMON
C      VARIABLE     BLOCK          TYPE         DESCRIPTION
C
C GLOBAL VARIABLES:
C
C     CCLAT         CENTER       REAL       COSINE OF CLAT
C     CLAT          CENTER       REAL       LATITUDE
C     CLON          CENTER       REAL       LONGITUDE
C     ER            ER           REAL
C     IGNOMN        PROJT        INTEGER    GNEMONIC PROJECTION
C     INVALI        INVALI       LOGICAL    CHECKS FOR INVALID COORDS
C     IORTEQ        PROJT        INTEGER    ORTHO. EQUATORIAL PROJECTION
C     IORTPO        PROJT        INTEGER    ORTHO. POLAR PROJECTION
C     IORTHO        PROJT        INTEGER    OBLIQUE PROJECTION
C     IPERSP        PROJT        INTEGER    PERSPECTIVE PROJECTION
C     ITPROJ        PROJ         INTEGER    CURRENT PROJECTION
C     PIE           PIE          REAL       THE CONSTANT (22/7)
C     TPIE          PIE          REAL       PIE * 2
C
C INPUT FILES/PARAMETERS:
C
C     VARIABLE                  TYPE          DESCRIPTION
C
C     PLAT                      REAL           LATITUDE IN RADIANS
C     PLON                      REAL           LONGITUDE IN RADIANS
C
C OUTPUT FILES/PARAMETERS:    NONE
C     ISINV                   LOGICAL         FLAG OF INVISIBILITY
C
C SUBROUTINES/FUNCTIONS CALLED:  NONE.
C
C CALLED BY:                    CHECKA, CHECKM, DMAPII, FILLIT, GRDLAT,
C                               GRDLON, HILPLT, LIMITS, LLINXY
C                               PLOTOV, PLTCIT, PLTDAT, PLTNAM
C
C LOCAL VARIABLES: NONE
C
C ABNORMAL RETURN CONDITIONS:  N/A
C
C PROGRAMMER:                DATE OF LAST CHANGE    REASON FOR CHANGE
C
C GJFENERTY                                          INTIAL ENTRY
C Tom Wescott   (NOSC)       10/87                   Change perspective
C
C-*-*-*-*-*-*-*-*-*-*-*-*-*-*-*-*-*-*-*-*-*-*-*-*-*-*-*-*-*-*-*-*-*-*-*|*-*-*-*-

      SUBROUTINE INVTES (PLAT,PLON,ISINV)
```

```
C     THIS SUBROUTINE TESTS A POINT FOR INVISIBILITY (ON OPPOSITE HEMISPHERE
C           OF EARTH FROM CENTER POINT OF PROJECTION)
C               (USING THE LAW OF COSINES)

      LOGICAL ISINV
      COMMON /PROJT/ IGNOMN,IORTEQ,IORTPO,IORTHO,IPERSP
      COMMON /PROJT2/ IEQREC,IMERCA,ILAMCN
      COMMON /PIE/ PIE,TPIE,PIO2,PIO4
      COMMON /CONST/ MAXVAL,RMPV,C,R,ERNM
      COMMON /CENTER/ CLAT,CLON,CCLAT,SCLAT
      logical invali,notlst
      common /invali/ invali
      common /proj/ itproj,wmrad,xoffs,yoffs,scalr,notlst
      REAL*8 ERD
      COMMON /ER/ ER,ERD

      ISINV=.FALSE.

      IF (ITPROJ.EQ.IORTEQ) THEN

          DLON=PLON-CLON
          IF (ABS(DLON).GT.PIE) DLON=DLON-SIGN(TPIE,DLON)
          IF (ABS(DLON).GT.PIO2) ISINV=.TRUE.

      ELSE IF (ITPROJ.EQ.IORTPO) THEN

          IF ((CLAT.LT.0..AND.PLAT.GT.0.).OR.(CLAT.GE.0..AND.PLAT
     +        .LT.0.))ISINV=.TRUE.

      ELSE IF (ITPROJ.EQ.IGNOMN.OR.ITPROJ.EQ.IORTHO) THEN

          R1=SCLAT*SIN(PLAT)+CCLAT*COS(PLAT)*COS(PLON-CLON)
          GCD=ACOS(R1)
          IF (GCD.GT.PIE) GCD=TPIE-GCD
          IF (GCD.LT.-PIE) GCD=-TPIE-GCD
          IF (ABS(GCD).GT.PIO2) ISINV=.TRUE.

      ELSE IF (ITPROJ.EQ.IPERSP) THEN

C         Over the horizon points are returned from lltoxy invalid.
          call lltoxy(plat,plon,x,y)
          isinv = invali

      ENDIF

      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    jpolg2
C
C FUNCTIONAL DESCRIPTION:       This subroutine is used to overcome limits
C                               on the # of verticies for filled polygons
C                               in some display systems.  It disects limit
C                               exceeding polygons into smaller contiguous
```

```
C                               sections as required before filling.
C
C INPUT FILES/PARAMETERS:       x(n), y(n) - Vertex coordinate arrays.
C                               n          - Number of verticies.
C                               jedge      - 0 plots edge, 1 omits edge.
C
C GLOBAL VARIABLES:             MXVOUT     - Max number of output verticies.
C                               IDIM       - Max array size.
C                               MXPLYS     - Max number of reduced polygons
C
C OUTPUT FILES/PARAMETERS:      Multiple polygons are drawn via jpolgn.
C
C SUBROUTINES CALLED:           jpedge, jpolgn, cliplg
C
C CALLED BY:                    blplgn
C
C LOCAL VARIABLES:              Linked list form of closed input polygon.
C                                 iptr(n)     - Pointer array to vertex (n+1).
C                                 marker      - End of data marker in x,y.
C                               Multiple output polygons in linked list form:
C                                 outplg(k)   - Starting ptrs. for k polygons.
C                                 nxt()       - Pointer array to vertex (n+1).
C
C RESTRICTIONS:                 None.
C
C ABNORMAL RETURN CONDITIONS:   None.
C
C PROGRAMMER:                   DATE OF LAST CHANGE     REASON FOR CHANGE
C     Tom Wescott (NOSC)        Aug 88                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
      subroutine jpolg2(x,y,nin,jedge)
c
      dimension x(*),y(*)
c
      include   'carmaxdim.inc'
c
      dimension xx(IDIM),yy(IDIM)
      integer iptr(IDIM), nxt(IDIM)
      integer  outplg(MXPLYS),outmp(MXPLYS)
c
      if (nin.le.MXVOUT) then
         call jpedge(jedge)
         call jpolgn(x,y,nin)
      else
c        Temporarily turn the edge off.
         call jpedge(1)
c
c        Close polygon if necessary.
         if ((x(nin).ne.x(1)).or.(y(nin).ne.y(1))) then
            n = nin + 1
            x(n) = x(1)
            y(n) = y(1)
         else
            n = nin
         endif
```

```
c
c       Init output list linking to next input vertex.
        do 100 i = 1, n-1
           nxt(i) = i+1
 100    continue
        nxt(n) = 1
        marker = n
c
c       Initialize array of output polygon start points.
        outplg(1) = 1
        iend = 1
        outplg(2) = 0
c
        iplg = 1
c       While (more polygons in output list) do
 201       if (outplg(iplg) .eq. 0) go to 290
c          Temp save the new polygon from the output array.  Get stats.
           istvrt = outplg(iplg)
           ymax = y(istvrt)
           ymin = y(istvrt)
           ivrt = istvrt
           kount = 0
c          Do Until (polygon traversed)
 220          continue
              kount = kount + 1
              if ((kount.gt.IDIM).or.(ivrt.lt.1).or.(ivrt.gt.IDIM))
     +            write(*,*)'JPOLG2... bad polygon linkage '
c
c             Convert linked list polygon into polyline format.
              xx(kount) = x(ivrt)
              yy(kount) = y(ivrt)
              ymax = amax1(ymax,y(ivrt))
              ymin = amin1(ymin,y(ivrt))
c
c             Save polygon linkage prior to alteration by clipping.
              ivrt = nxt(ivrt)
              iptr(ivrt) = nxt(ivrt)
              if (ivrt.ne.istvrt) go to 220
c          End do.
c
           if (kount.le.MXVOUT) then
c             Send current polygon to ordinary drawing process.
              call jpolgn(xx,yy,kount)
           else
c             Bisect current polygon and append sections to outplg list.
              ymid = (ymax+ymin)/2.0
              ax = 1.0
              ay = ymid
              bx = -1.0
              by = ymid
c
              call cliplg(ax,ay,bx,by,x,y,istvrt,iptr,
     +                    marker,outmp,nxt)
c
c             Catenate output polygons onto output list.
              ii = 1
```

```
Jul 20 14:44 1989  carm  nth.f Page 60

c             While (output polygons remain) do
 291             if (outmp(ii).eq.0) go to 292
                 iend = iend + 1
                 outplg(iend) = outmp(ii)
                 ii = ii + 1
                 go to 291
c             End while.
 292          continue
              outplg(iend+1) = 0
c
              call cliplg(bx,by,ax,ay,x,y,istvrt,iptr,
     +                    marker,outmp,nxt)
c
              ii = 1
c             While (output polygons remain) do
 293             if (outmp(ii).eq.0) go to 294
                 iend = iend + 1
                 outplg(iend) = outmp(ii)
                 ii = ii + 1
                 go to 293
c             End while.
 294          continue
              outplg(iend+1) = 0
           endif
c
           iplg = iplg + 1
           go to 201
c       End While.
 290    continue
c
c       Draw the polygon outline?
        call jpedge(jedge)
        if (jedge.ne.1) call jpolgn(x,y,nin)
      endif
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    LIMIT2
C
C FUNCTIONAL DESCRIPTION:       Finds the viewport's bounding rectangle
C                               in a rectilinear lon,lat grid.
C
C INPUT FILES/PARAMETERS:       none.
C
C GLOBAL VARIABLES :            clat,clon       - Map center
C                               xrad,yrad       - Viewport half widths
C
C OUTPUT FILES/PARAMETERS:      common/viewBR/  - Lon,lat Coordinates of the
C                               vpnort,vpsout     bounding rectangle for that
C                               vpeast,vpwest     portion of the world within
C                                                 the viewport.  Limits are
C                                                 spatial (not numeric) and can
C                                                 straddle the int'l date line.
```

```
C
C SUBROUTINES CALLED :         xytoll, lltoxy, clipxy
C
C CALLED BY:                    DMAPII
C
C LOCAL VARIABLES:              NPOINTS        - Parameter specifying the # of
C                                                points on each viewport side
C                                                to search for lon,lat extrema.
C                               NLOOPS         - Parameter determining accuracy
C                                                of horizon location.
C RESTRICTIONS:                 None.  Works with all well behaved projections
C
C ABNORMAL RETURN CONDITIONS:   None.
C
C PROGRAMMER:              DATE OF LAST CHANGE       REASON FOR CHANGE
C     Tom Wescott   (NOSC)       10/87                original entry
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine limit2
c
        common /viewp/ xrad,yrad,ixnp,iynp,xc,yc
        common /viewBR/ vpnort,vpsout,vpeast,vpwest
        common /pie/ pie,tpie,pio2,pio4
        common /center/ clat,clon,cclat,sclat
        logical nponsc, sponsc
        logical invali
        common /invali/ invali
c
c       Set No. of points to be tested on each viewport side.
c       (use an odd integer >= 3 to handle graticle concavities.
        parameter(NPOINTS=3)
c
c       Set accuracy level of binary search for the horizon.
        parameter (NLOOPS=9)
c
        if ((abs(clat).gt.pio2).or.(abs(clon).gt.pie).or.(xrad.le.0.))
     +     write(*,*) ' Bad map parameters found in LIMIT2'
c
c       Store break line (longitude at edge of conic projections).
        breakl = clon   - sign(pie,clon)
c
        vpnort = -pio2
        vpsout = +pio2
        vpeast = -pie
        vpwest = tpie+tpie
c
c       Find bounding rectangle by checking (lon,lat) at regular
c       intervals along the viewport frame or along the map edge.
        yincr = (yrad+yrad)/(NPOINTS-1)
c
        do 300 y = -yrad, yrad, yincr
           if (abs(y) .eq. yrad) then
              xincr = (xrad+xrad)/(NPOINTS-1)
           else
              xincr = xrad+xrad
```

```
            endif
c
            do 200 x = -xrad, xrad, xincr
               call xytoll(x,y,rlat,rlon)
               if (invali) then
c                 This point on the viewport frame lies off the earth.  Locate
c                 map edge (lon,lat) by searching along line from map center.
c                 Use last pt on map to calculate minimum bounding coords.
                  call lltoxy(clat,clon,xearth,yearth)
                  xspace = x
                  yspace = y
                  do 100 itest = 1, NLOOPS
                     xtest = (xspace+xearth)*0.5
                     ytest = (yspace+yearth)*0.5
                     call xytoll(xtest,ytest,rrlat,rrlon)
                     if (invali) then
                        xspace = xtest
                        yspace = ytest
                     else
                        xearth = xtest
                        yearth = ytest
                        rlat = rrlat
                        rlon = rrlon
                     endif
 100              continue
c
               endif
c
c              Update bounds in conditionally biased lon. where west < east.
               if (rlon .lt. breakl) rlon = rlon + tpie
               vpnort = amaxl(vpnort,rlat)
               vpsout = aminl(vpsout,rlat)
               vpeast = amaxl(vpeast,rlon)
               vpwest = aminl(vpwest,rlon)
  200       continue
  300    continue

c        Convert to unbiased longitude.
         if (abs(vpeast).gt.pie) vpeast = vpeast - sign(tpie,vpeast)
         if (abs(vpwest).gt.pie) vpwest = vpwest - sign(tpie,vpwest)
c
c        Check for presence of poles inside the viewport.
         call lltoxy(pio2,0.0,x,y)
         call clipxy(x,y,nponsc)
         if (invali) nponsc = .false.
         call lltoxy(-pio2,0.0,x,y)
         call clipxy(x,y,sponsc)
         if (invali) sponsc = .false.
c
         if ((nponsc).or.(sponsc)) then
c           Open limits to include area around poles.
            vpwest = breakl
            vpeast = breakl - .00001
            if (nponsc) then
               vpnort = +pio2
            endif
```

Jul 20 14:44 1989 carr nth.f Page 63

```
            if (sponsc) then
               vpsout = -pio2
            endif
         endif
c
         R2D = 180./PIE
c         WRITE (*,9010) vpnort*R2D,vpsout*R2D,vpeast*R2D,vpwest*R2D
c 9010    FORMAT(' LIMIT2... Bounding (N,S,E,W) = ',4(1X,F7.1),/)
c
         return
         end


C+*+*+*+*+*+*+*+*+*+*+*+*+*+*+*+*+*+*+*+*+*+*+*+*+*+*+*+*+*+*+*+*+*+*|*+*+*+*+
C UNIT NAME:                     LL2DA
C
C FUNCTIONAL DESCRIPTION:        Converts geographic location (lat,lon)
C                                into distance azimuth from any point.
C
C INPUT FILES/PARAMETERS:        slat,slon  - Start point coords.
C                                tlat,tlon  - Target point coords.
C
C OUTPUT FILES/PARAMETERS:       dist       - Arc distance in radians.
C                                az         - Azimuth in radians, -pi to pi.
C                                range      - Approx. distance, nautical miles.
C                                bering     - Azimuth in degrees, 0 to 360.
C
C LOCAL VARIABLES:               S,T,D      - Sides of polar triangle.
C
C ABNORMAL RETURN CONDITIONS:    1) Az from poles defined cw from prime meridian.
C                                2) When dist=0,pi  returned az is meaningless.
C
C PROGRAMMER:                    DATE OF LAST CHANGE      REASON FOR CHANGE
C     Tom Wescott (NOSC)         Dec 87                   Original entry.
C         "                      Feb 89                   Improved accuracy.
C
C-*-*-*-*-*-*-*-*-*-*-*-*-*-*-*-*-*-*-*-*-*-*-*-*-*-*-*-*-*-*-*-*-*-*-*|*-*-*-*-
      subroutine LL2DA(slat,slon,tlat,tlon,dist,az,range,bering)
C
      common /pie/ pie,tpie,pio2,pio4
      parameter (CCLOSE = .9999)
C
      Dlo = tlon - slon
      if (abs(Dlo).gt.pie) Dlo = Dlo - sign(tpie,Dlo)
      sinT = cos(slat)
      cosT = sin(slat)
      sinS = cos(tlat)
      cosS = sin(tlat)
C
C     Law of Cosines for arc distance between points.
      cosD = cosT*cosS + sinT*sinS*cos(Dlo)
      if (cosD.lt.CCLOSE) then
         dist = acos(amax1(cosD,-1.0))
      else
C        Plane geometry approximation better for very close targets.
         dist = sqrt((tlat-slat)**2. + (Dlo*sinS)**2.)
```

Jul 20 14:44 1989 carr mth.f Page 64

```
      endif
C
C     Using both Law of Cosines and Sines insures accurate azimuths.
      az = - tlon*cosT
      sinD = sin(dist)
      denom = sinD*sinT
      if ((denom.ne.0.0).and.(abs(cosT).ne.1.0)) then
         cosAz = (cosS-cosD*cosT)/denom
         sinAz = sinS*sin(Dlo)/sinD
         if ((sinAZ.ne.0.).or.(cosAZ.ne.0.))  az = atan2(sinAz,cosAz)
      endif
C
C     Also output range and bearing.
      r2d = 180.0/pie
      range = dist*R2D*60.0
      bering = az*R2D
      if (bering.lt.0.0) bering = 360.0 + bering
C
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  LL2GC
C
C FUNCTIONAL DESCRIPTION:     Conditions a Lon,lat polyline by inserting
C                             equidistant points so that the segments
C                             smoothly follow great circles in the current
C                             map projection.
C
C INPUT FILES/PARAMETERS:     plat,plon - Input polyline
C                             nin       - # of input points.
C                             maxpts    - output array size limit.
C
C GLOBAL VARIABLES:           None.
C
C OUTPUT FILES/PARAMETERS:    gclon,gclat - output polyline.
C                             nout        - # of output points.
C
C SUBROUTINES CALLED:         ll2da, da2ll, llplxy
C
C CALLED BY:                  plotit, plotov, ftprnt, ranger
C
C LOCAL VARIABLES:            DSTMAX,MIN - Limits for output segment length.
C                             distxy     - Display distance between input pts.
C
C RESTRICTIONS:               None.
C
C PROGRAMMER:                 DATE OF LAST CHANGE     REASON FOR CHANGE
C     Tom Wescott (NOSC)      Dec 87                  Original entry.
C      "     "                Apr 89                  Improve pt spacing.
C
C-*-*-*-*-*-*-*-*-*-*-*-*-*-*-*-*-*-*-*-*-*-*-*-*-*-*-*-*-*-*-*-*-*-*-*|*-*-*-*-
      subroutine LL2GC(plon,plat,nin,maxpts,gclon,gclat,nout)
C
C     Set screen units per inch of display.
```

```
      parameter (SUNITS=400., SINCHS=15.0, UPERI=SUNITS/SINCHS)
C     Set max segment length to about .25" on the display, min to .01".
      parameter (DSTMAX=0.25*UPERI, DSTMIN=0.01*UPERI)
      parameter(EPSLON=.001)
      parameter(ARCMAX=.05)
      real plon(*),plat(*),gclon(*),gclat(*),lon1,lat1,lon2,lat2
      logical invali, offsc1, offsc2
      common /invali/ invali
C
      nout = 1
      nover = 0
      lon1 = plon(1)
      lat1 = plat(1)
      call llplxy(lon1,lat1,1,x1,y1,nout)
      gclon(1) = lon1
      gclat(1) = lat1
      if (nin.lt.2) RETURN
C
      do 200 n = 2, nin
         lon2 = plon(n)
         lat2 = plat(n)
         offsc2 = .false.
         call llplxy(lon2,lat2,1,x2,y2,idummy)
         if (invali) offsc2 = .true.
C
C        Test for point 2 being off screen.
         if (amax1(abs(x2),abs(y2)).gt.SUNITS) offsc2 = .true.
C
C        Init intermediate point to  pt 1.
         tlat = lat1
         tlon = lon1
         dstold = SUNITS
C
C        While (distance to pt2 too big) do
 101        continue
            offsc1 = .false.
            call llplxy(tlon,tlat,1,tx,ty,idummy)
            if (invali) offsc1 = .true.
            if (amax1(abs(tx),abs(ty)).gt.SUNITS) offsc1 = .true.
C
            distxy = sqrt((x2-tx)**2 + (y2-ty)**2)
            if (distxy .le. DSTMAX) go to 190
C
            call ll2da(tlat,tlon,lat2,lon2,arc,az,range,bering)
            if (offsc1.and.offsc2) then
C              Off the map.  Don't waste time adding too many points.
C              Calculate nadd from a maximum arc distance parameter.
               nadd =  int(arc/ARCMAX)
               if (nadd .eq. 0) go to 190
            else
C              Estimate nadd based on xy distance to next point,
               nadd = max0(1, int(distxy/DSTMAX))
CDEBUG
CD              CALL JCMARK(3)     ! asterisk
C
               if (distxy.gt.dstold) then
```

Jul 20 14:44 1989 carn mth.f Page 66

```
C                 We are approaching a discontinuity or distorted area where
C                 distxy increases as points are added.  A better estimate for
C                 nadd can be made from differential arc dist between pts.

                  call da2ll(tlat,tlon,EPSLON*arc,az,elat,elon)
                  call llplxy(elon,elat,1,ex,ey,idummy)
                  dxy = sqrt((tx-ex)**2 + (ty-ey)**2)
                  nadd = max0(1, int(dxy/(DSTMAX*EPSLON)))
CDEBUG
CD                 CALL JCMARK(4)
               endif
            endif
C
C           Calculate next add point on great circle between t and pt 2.
            dincr = arc/(nadd+1)
            call da2ll(tlat,tlon,dincr,az,tlat,tlon)
CDEBUG
CD           CALL LLPLXY(TLON,TLAT,1,XX,YY,IDUMMY)
CD           CALL JMARK(XX,YY)
C
            if (nout .le. maxpts-2) then
               nout = nout + 1
               gclat(nout) = tlat
               gclon(nout) = tlon
            else
               nover = nover + 1
               kount = maxpts + nover
               write(*,*)'LL2GC... Output array overflow ',kount
               write(*,*)' xx,yy,arc,nadd = ',xx,yy,arc,nadd
            endif
C
            dstold = distxy
            go to 101
C        End while.
 190     continue
C
         if ((distxy.ge.DSTMIN).or.(n.eq.nin)) then
C           Output segment end point and update next segment start point.
            nout = nout + 1
            gclat(nout) = lat2
            gclon(nout) = lon2
            lon1 = lon2
            lat1 = lat2
            x1 = x2
            y1 = y2
         else
C           Skip output and update for extremely short segments
         endif
 200  continue
C
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  LLPLXY
```

Jul 20 14:44 1989 carr mth.f Page 67

```
C
C FUNCTIONAL DESCRIPTION:      Converts geographic polyline to display coords.
C                                                                              +
C         PROJECTION                ITPROJ   PROPERTY     COVERAGE       APPL.   |
C                                          c e e a s    w h o s l    p t n a   |
C                                          o q q z p    o e c e o    r o a r   |
C                                          n u u i e    r m e a c    e p v e   |
C                                          f i i m c    l i a / a    s o / a   |
C                                          o a d u i    d s n r l    e g t     |
C                                          r r i t a      p / e      n r r m   |
C                                          m e s h l      h c g      t a a e   |
C                                          a a t a        e o i      a p c a   |
C                                          l     l        r n o      t h k s   |
C                                                         e t n      n c   u   |
C    (1)  Albers Equal-area          9       .                .      .     .   |
C    (2)  Azimuthal Equal-area      10       .   .      . . .        .     .   |
C    (3)  Azimuthal Equidistant     11         . .      . . .        .         |
C    (4)  Equirectangular            6         .        . . . .      .         |
C    (5)  Gnomonic                   1           .          .            .     |
C    (6)  Kavraisky IV              12             .    . . .        .         |
C    (7)  Lambert Conformal          8     .              . . .      .   .     |
C    (8)  Mercator                   7     .            . . . .      .   .     |
C    (9)  Miller                    13             .    .            .         |
C   (10)  Oblique Mercator          14     .       .    . . .        . . .     |
C   (11)  Orthographic               4           .        . . .      .         |
C   (12)  Perspective                5           .        . . .      .         |
C   (13)  Polar Stereographic       15     .     .        . . .      .   .     |
C   (14)  Polyconic                 16             .          .        .       |
C   (15)  Sinusoidal                18       .          . . .        .     .   |
C   (16)  Stereographic             19     .     .        . . .      .   .     |
C   (17)  Ortho. Equatorial          2           .        .          .         |
C   (18)  Ortho. Polar               3           .        .          .         |
C   (19)  Univ. Transverse Mercator 17     .            . . . .      .   .     |
C                                                                              +
C
C INPUT FILES/PARAMETERS:      plon(), plat() - input polyline arrays
C                              nin            - number of input points
C
C GLOBAL VARIABLES:            itproj         - projection identification no.
C
C OUTPUT FILES/PARAMETERS:     x(),y()        - output polyline arrays
C                              nout           - number of output points
C                              invali         - flag for last input point
C
C SUBROUTINES CALLED:          px????  All (lon,lat) to (x,y) transformations.
C
C CALLED BY:                   BLPLGN, BLPLIN, D2OUTL, FLSPLY, LLTOXY, rngrin
C
C LOCAL VARIABLES:             None.
C
C RESTRICTIONS:                None.
C
C ABNORMAL RETURN CONDITIONS:  PX??? error convention:  If a point cannot be
C                              sensibly mapped or lies over the horizon:
C                              1.  Point is omitted from output polyline.
C                              2.  Invalid flag set if point is a singlton.
```

```
C
C PROGRAMMER:                    DATE OF LAST CHANGE      REASON FOR CHANGE
C     Dave Nation                                         Original lltoxy
C     Tom Wescott  (NOSC)        Mar 88                   Polyline version.
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine LLPLXY(plon,plat,nin,x,y,nout)
c
      logical invali,notlst
      common /invali/ invali
      common /proj/ itproj,wmrad,xoffs,yoffs,scalr,notlst
      real plon(*), plat(*), x(*), y(*)
c
c
*-------------------------------------------------------------------|--+
* Itproj:  1  2  3  4  5  6  7  8  9 10 11 12 13 14 15 16 17 18 19 20 21  |
*----------------------------------------------------------------------+
*          g  o  o  o  p  e  m  l  a  a  a  k  m  o  p  p  u  s  s        |
*          n  r  r  r  e  q  e  a  l  z  z  a  i  b  o  o  t  i  t        |
*          o  e  p  t  r  r  r  m  b  e  e  v  l  l  s  l  m  n  e        |
*          m  q  o  h  s  e  c  c  r  a  d  r  l  m  t  y  z  u  r        |
*----------------------------------------------------------------------+
      goto(1,02,03,04,05,06,07,08,09,10,11,12,13,14,15,16,17,18,19
     +    )itproj
c
c            Proj. #0  Bad input trap.
             write(*,*)' LLPLXY... Bad projection ID#.'
             go to 900
c
c            Proj. #1  Gnomonic
  1          call pxgnom(plon,plat,nin,x,y,nout)
             go to 900
c
c            Proj. #2  Orthographic Equatorial
  2          call pxoreq(plon,plat,nin,x,y,nout)
             go to 900
c
c            Proj. #3  Orthographic Polar
  3          call pxorpo(plon,plat,nin,x,y,nout)
             go to 900
c
c            Proj. #4  Orthographic
  4          call pxorth(plon,plat,nin,x,y,nout)
             go to 900
c
c            Proj. #5  Perspective
  5          call pxpers(plon,plat,nin,x,y,nout)
             go to 900
c
c            Proj. #6  Equirectangular
  6          call pxeqre(plon,plat,nin,x,y,nout)
             go to 900
c
c            Proj. #7  Mercator
  7          call pxmerc(plon,plat,nin,x,y,nout)
```

```
Jul 20 14:44 1989  carr  mth.f Page 69

              go to 900
c
c             Proj. #8  Lambert Conformal
  8           call pxlamc(plon,plat,nin,x,y,nout)
              go to 900
c
c             Proj. #9  Albers Equal-area Conic.
  9           call pxalbr(plon,plat,nin,x,y,nout)
              go to 900
c
c             Proj. #10  Azimuthal Equal-area
 10           call pxazea(plon,plat,nin,x,y,nout)
              go to 900
c
c             Proj. #11  Azimuthal Equidistant
 11           call pxazed(plon,plat,nin,x,y,nout)
              go to 900
c
c             Proj. #12  Kavraisky IV
 12           call pxkavr(plon,plat,nin,x,y,nout)
              go to 900
c
c             Proj. #13  Miller
 13           call pxmill(plon,plat,nin,x,y,nout)
              go to 900
c
c             Proj. #14 Oblique Mercator
 14           call pxoblm(plon,plat,nin,x,y,nout)
              go to 900
c
c             Proj. #15  Polar Stereographic
 15           call pxpost(plon,plat,nin,x,y,nout)
              go to 900
c
c             Proj. #16  Polyconic
 16           call pxpoly(plon,plat,nin,x,y,nout)
              go to 900
c
c             Proj. #17  Universal Transverse Mercator
 17           call pxutmz(plon,plat,nin,x,y,nout)
              go to 900
c
c             Proj. #18  Sinusoidal
 18           call pxsinu(plon,plat,nin,x,y,nout)
              go to 900
c
c             Proj. #19  Stereographic
 19           call pxster(plon,plat,nin,x,y,nout)
              go to 900
c
c     End cases.
 900  continue
c
      return
      end
```

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   LLTOXY
C
C FUNCTIONAL DESCRIPTION:      Converts a (lon,lat) point to display (x,y).
C                              This subroutine has been functionally
C                              replaced by LLPLXY.  Its call remains for
C                              compatibility.
C
C INPUT FILES/PARAMETERS:      plon, plat     - input point
C
C GLOBAL VARIABLES:            None.
C
C OUTPUT FILES/PARAMETERS:     x,y            -  output point
C                              invali         -  flag for bad input point
C
C SUBROUTINES CALLED:          llplxy         -  Polyline conversion.
C
C CALLED BY:                    BSTMAP, CHECKA, CHECKB, CHECKM, CURBOX
C                               DMAPII, DROUTL, FDRAWV, FILLPT
C                               GRDLAT, GRDLON, HILPLT, INITIA, LIMITS
C                               LLINXY, PLOTOV, PLTCIT, PLTNAM
C
C LOCAL VARIABLES:             None.
C
C RESTRICTIONS:                None.
C
C ABNORMAL RETURN CONDITIONS:  Invalid flag set for input points which
C                              are over the horizon or can't be computed.
C
C LOCATION:
C
C PROGRAMMER:                DATE OF LAST CHANGE       REASON FOR CHANGE
C     DAVE NATION                                      ORIGINAL CODE.
C     JERRY FENERTY                                    DOCUMENTATION AND MO
C                                                      FOR A21 PROTOTYPE.
C     Tom Wescott  (NOSC)    Jan 87                    optimization, add invali
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine lltoxy(plat,plon,x,y)
c
      nin = 1
      call llplxy(plon,plat,nin,x,y,nout)
c
      return
      end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      NRELIM
C
C FUNCTIONAL DESCRIPTION:
C           This subroutine solves a set of linear equations and gives an LU
C           decomposition of the coefficient matrix.  The Gauss elimination
C           method is used, with partial pivoting.  Multiple right hand sides
```

```
C          are permitted, they should be supplied as columns that augment
C          the coefficient matrix.
C
C REFERENCE:                     APPLIED NUMERICAL ANALYSIS  Gerald & Wheatly 1985
C
C INPUT FILES/PARAMETERS:
C                                ab    - Coefficient matrix augmented with
C                                        R.H.S. vectors.
C                                n     - Number of equations.
C                                np    - No. of columns in the augmented matrix.
C                                ndim  - First dimension of matrix ab.
C
C GLOBAL VARIABLES:              None.
C
C OUTPUT FILES/PARAMETERS:       The solution vector(s) are returned in the
C                                augmentation columns of ab.
C
C SUBROUTINES CALLED:            None.
C
C LOCAL VARIABLES:
C
C RESTRICTIONS:                  None.
C
C ABNORMAL RETURN CONDITIONS:    None.
C
C PROGRAMMER:                    DATE OF LAST CHANGE      REASON FOR CHANGE
C     Tom Wescott (NOSC)         Dec 87                   Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine nrelim(ab,n,np,ndim)
c
      real ab(ndim,np)
      integer n,np,ndim
      real save,ratio,value
      integer nml,ipvt,ip1,j,nvbl,l,kcol,jcol,jrow
c
cccc
c     Begin the reduction.
      nml = n - 1
      do 35 i = 1, nml
c
c        Find the row number of the pivot row.  We will then
c        interchange rows to put the pivot element on the diagonal.
         ipvt = i
         ip1 = i + 1
         do 10 j = ip1, n
            if (abs(ab(ipvt,i)) .lt. abs(ab(j,i))) ipvt = j
 10      continue
c
c        Check for a near singular matrix.
         if (abs(ab(ipvt,i)) .lt. 1.0 E-6) then
cc          write(*,100)
 100        format(' NRELIM... Gauss elimination solution not feasable')
            return
         endif
```

Jul 20 14:44 1989 carm nth.f Page 72

```
c
c        Now interchange, except if the pivot element is already on
c        the diagonal, don't need to.
         if (ipvt .ne. i) then
            do 20 jcol = 1, np
               save = ab(i, jcol)
               ab(i,jcol) = ab(ipvt,jcol)
               ab(ipvt,jcol) = save
 20         continue
         endif
c
c        Now reduce all elements below the diagonal in the ith row.
c        Check first to see if a zero is already present.  If so, we
c        can skip the reduction on that row.
         do 32 jrow = ip1, n
            if (ab(jrow,i) .eq. 0) go to 32
            ratio = ab(jrow,i) / ab(i,i)
            ab(jrow,i) = ratio
            do 30 kcol = ip1, np
               ab(jrow,kcol) = ab(jrow,kcol) - ratio*ab(i,kcol)
 30         continue
 32      continue
 35   continue
c
c     We still need to check ab(n,n) for size.
      if (abs(ab(n,n)) .lt. 1.0E-6) then
CC          write(*,100)
         return
      endif
c
c     Back substitute.
      np1 = n + 1
      do 50 kcol = np1, np
         ab(n,kcol) = ab(n,kcol) / ab(n,n)
         do 45 j = 2, n
            nvbl = np1 - j
            l = nvbl + 1
            value = ab(nvbl,kcol)
            do 40 k = l, n
               value = value - ab(nvbl,k) * ab(k,kcol)
 40         continue
            ab(nvbl,kcol) = value / ab(nvbl,nvbl)
 45      continue
 50   continue
c
      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  NRFCN
C
C FUNCTIONAL DESCRIPTION:      Evaluates system equations for NRSYST.
C
C INPUT FILES/PARAMETERS:      x(n)  - Contains current guess for vector
C                                      (x1,x2...xN).  Should be preloaded with
```

Jul 20 14:44 1989 carr mth.f Page 73

```
C                                      an initial guess, and will ultimately
C                                      contain a nearby solution.
C
C GLOBAL VARIABLES:              None.
C
C OUTPUT FILES/PARAMETERS:       f(n)  - Functions evaluated at position x(n).
C
C SUBROUTINES CALLED:            None
C
C LOCAL VARIABLES:               None
C
C RESTRICTIONS:                  None.
C
C ABNORMAL RETURN CONDITIONS:    None.
C
C PROGRAMMER:                    DATE OF LAST CHANGE     REASON FOR CHANGE
C     Tom Wescott (NOSC)         Dec 87                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine nrfcn(x,f)
c
      real x(2), f(2)
      common /pie/ pie,tpie,pio2,pio4
      common /xymap/ projx,projy,xytol,ftol,delta
c
c     Convert longitude to normal domain.
      if(abs(x(1)) .gt. pie) x(1) = x(1) - sign(tpie,x(1))
c
c     Calculate iterated map position from current (lon,lat) guess.
      rlon = x(1)
      rlat = x(2)
      call lltoxy(rlat,rlon,calcx,calcy)
c
c     Set function values to distance between map position and input point.
      f(1) = calcx - projx
      f(2) = calcy - projy
c
c     Set sign of delta to insure next perturbation stays in Lat domain.
      delta = -sign(delta,x(2))
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    NRSYST
C
C FUNCTIONAL DESCRIPTION:
C         This subroutine solves a system of n nonlinear equations by the
C         Newton Raphson-Method.  The partial derivatives of the functions
C         are estimated by difference quotients when a variable is
C         purturbed by an amount equal to delta.  (Delta is added).
C         This is done for each variable in the function.  Increments
C         to improve the estimates for the X-values are computed from
C         a system of equations using subroutine NRELIM.
```

```
Jul 20 14:44 1989  carr   mth.f Page 74

C
C REFERENCE:  APPLIED NUMERICAL ANALYSIS  Gerald & Wheatly 1885
C         The reference algorithm has been modified to increase the prob-
C         ability of global convergence limiting the size of any correction,
C         and by making half sized corrections on every third iteration.
C
C INPUT FILES/PARAMETERS:
C         nrfcn - Subroutine that computes values of the functions.
C                 Must be declared external to the calling program.
C         n     - The number of equations.
C         maxit - Limit to the number of iterations that will be used.
C         x     - Array to hold the x-values. Initially this array holds
C                 the initial guesses.  It returns the final values.
C         f     - An array that holds values of the functions.
C         delta - A small value used to perturb the x values so partial
C                 derivatives can be computed by difference quotient.
C         xtol  - Tolerance value for change in x values to stop iter-
C                 ations.  When the largest change in any x meets xtol
C                 the subroutine terminates.
C         ftol  - Tolerance on the value of f to terminate.  When the
C                 largest f value is less than ftol, termination.
C         i     - Status variable.
C                 Calling with  i = 0  displays progress of the iteration.
C
C GLOBAL VARIABLES:            none.
C
C OUTPUT FILES/PARAMETERS:
C                        x(n)  - Final values of the iteration process.
C                        i     - Status variable indicates termination method.
C                             i = 1   - xtol was met
C                             i = 2   - ftol was met
C                             i = -1  - Maxit was exceeded, tolerances not met
C                             i = -2  - Very small pivot encountered in Gaussian
C                                       elimination step.  No results obtained.
C                             i = -3  - Bad n input.  Must be between 2 and 10.
C
C SUBROUTINES CALLED:          nrfcn, nrelim
C
C LOCAL VARIABLES:
C
C RESTRICTIONS:                none.
C
C ABNORMAL RETURN CONDITIONS:  none.
C
C PROGRAMMER:                  DATE OF LAST CHANGE     REASON FOR CHANGE
C     Tom Wescott (NOSC)       Dec 87                  Original entry.
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine nrsyst(fcn,n,maxit,x,f,delta,xtol,ftol,i)
c
      real x(n), f(n), delta, xtol, ftol
      integer n, maxit, i
      real a(10,11), xsave(10), fsave(10)
      integer np, it, ivbl, itest, ifcn, irow, jcol
      real xmin(10), xmax(10), chgmax(10)
```

```
      common /domain/ xmin, xmax, chgmax
c
c     Check validity of value of n.
      if (n .lt. 2 .or. n .gt. 10) then
         i = -3
         write(*,1004) n
         return
      endif
c
c     Begin iterations - Get f values, then, save x values.
      np = n + 1
      do 100 it = 1, maxit
         call nrfcn(x,f)
         do 10 ivbl = 1, n
            xsave(ivbl) = x(ivbl)
 10      continue
c
c        Test f Values and save them.
         itest = 0
         do 20 ifcn = 1, n
            if (abs(f(ifcn)) .gt. ftol) itest = itest + 1
            fsave(ifcn) = f(ifcn)
 20      continue
         if (i .eq. 0) then
            write(*,1000) it, (x(ii)*180./3.14159,ii=1,n)
            write(*,1001) f
         endif
c
c        See if Ftol is met. If not continue, If so set i and return.
         if (itest .eq. 0) then
            if (i.eq.0) write(*,1005) it, F
            i = 2
            return
         endif
c
c        This double loop computes the partial derivatives of each
c        function for each variable and stores them in a coef array.
         do 50 jcol = 1, n
            x(jcol) = xsave(jcol) + delta
            call nrfcn(x,f)
            do 40 irow = 1, n
               a(irow,jcol) = (f(irow)-fsave(irow))/delta
 40         continue
c
c           Reset x values for the next column of partials.
            x(jcol) = xsave(jcol)
 50      continue
c
c        Now we put negative values as right hand sides and call nrelim.
         do 60 irow = 1, n
            a(irow,np) = -fsave(irow)
 60      continue
         call nrelim(a,n,np,10)
c
c        Be sure that the coefficient matrix is not to ill-conditioned.
         do 70 irow = 1, n
```

Jul 20 14:44 1989 carr mth.f Page 76

```
            if (abs(a(irow,irow)) .le. 1.0E-6) then
               if (i.eq.0) write(*,1003)
               i = -2
               return
            endif
 70      continue
c
c        Apply the corrections to the x values, and see if xtol is met.
         itest = 0
         do 80 ivbl = 1, n
c           Calculate maximum allowable correction.
            chg = a(ivbl,np)
            cmax = chgmax(ivbl)
            if (abs(chg) .gt. cmax)  chg = sign(cmax,chg)
c
c           Destablize possible oscillation with occasional half correction.
            if (mod(it,3) .eq. 0) chg = 0.5*chg

c           Apply correction and constrain x values to domain.
            x(ivbl) = xsave(ivbl) + chg
            x(ivbl) = amin1(x(ivbl),xmax(ivbl))
            x(ivbl) = amax1(x(ivbl),xmin(ivbl))
            if (abs(a(ivbl,np)) .gt. xtol) itest = itest + 1
 80      continue
c
c        If xtol is met, print the last values and return, else do
c        another iteration.
         if (itest .eq. 0) then
            if (i .eq. 0) write(*,1002)it,(x(ii)*180./3.14159,ii=1,n)
            i = 1
            return
         endif
 100  continue
c
c     We have done maxit iterations, set i = -1 and return.
      i = -1
      return
c
cccc
 1000 format(' nrsyst... After iteration ',i3,':'
     +       ,/,'  X(n) = ',10F13.5)
 1001 format  ('  F(n) = ',10F13.5)
 1002 format(/' nrsyst... After iteration ',I3,'    X values (meeting '
     +        ,'xtol) are: ',/,'  X(n) = ',10F13.5)
 1003 format(' nrsyst... Cannot solve system, matrix nearly singular.')
 1004 format(/' nrsyst... Number of equations passed in is invalid')
 1005 format(/' nrsyst... After iteration ',I3,'    F values (meeting '
     +        ,'ftol) are: ',/,'  F(n) = ',10F13.5)
c
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                 PINSPG
C
C FUNCTIONAL DESCRIPTION:   Test for point being inside the smaller of the
```

Jul 20 14:44 1989 carm nth.f Page 77

```
C                             two regions defined by a spherical polygon.
C
C INPUT FILES/PARAMETERS:    rlo, rla    - Vertex coordinate arrays.
C                             n           - Number of verticies.
C                             plo,pla     - Point to be tested.
C
C GLOBAL VARIABLES:                       - Multiples of pi.
C
C OUTPUT FILES/PARAMETERS:   pinspg      - Returned true if point is inside.
C                                           Internally reflex areas are true.
C                             area        - Area of smaller region, signed radians.
C
C SUBROUTINES CALLED:         ll2da.
C
C CALLED BY:                  blhatc
C
C RESTRICTIONS:               None.
C
C PROGRAMMER:                 DATE OF LAST CHANGE      REASON FOR CHANGE
C     Tom Wescott  (NOSC)     Nov 88                   Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
      logical function pinspg(rlo,rla,nin,plo,pla,area)
c
      common /pie/ pie,tpie,pio2,pio4
      dimension rlo(*),rla(*)
c
c     Insure that we are dealing with a closed polygon.
      if ((rlo(nin).ne.rlo(1)).or.(rla(nin).ne.rla(1))) then
         n = nin + 1
         rlo(n) = rlo(1)
         rla(n) = rla(1)
      else
         n = nin
      endif
c
c     Get azimuth and its reciprocal from test point to first vertex.
      call ll2da(pla,plo,rla(1),rlo(1),d,azt2l,rng,bering)
      if (d .gt. 0.0001) then
         call ll2da(rla(1),rlo(1),pla,plo,d,azl2t,rng,bering)
      else
         azl2t = azt2l - sign(pie,azt2l)
      endif
c
      totang = 0.0
      totare = 0.0
      do 200 i = 2, n
c
c        Get azimuth and its reciprocal from test point to current vertex.
         call ll2da(pla,plo,rla(i),rlo(i),dist,azt2v,range,bering)
         if (d .gt. 0.0001) then
            call ll2da(rla(i),rlo(i),pla,plo,d,azv2t,rng,bering)
         else
            azv2t = azt2v - sign(pie,azt2t)
         endif
```

```
c        Sum angles about the test point.
         anglet = azt2v - azt2l
         if (abs(anglet).gt.pie) anglet = anglet - sign(tpie,anglet)
         totang = totang + anglet
c
c        Get azimuth and its reciprocal from current vertex to last vertex.
         call ll2da(rla(i),rlo(i),rla(i-1),rlo(i-1),d,azv2l,rng,bering)
         if (d .gt. 0.0001) then
            call ll2da(rla(i-1),rlo(i-1),rla(i),rlo(i),d,azl2v,rng,ber)
         else
            azl2v = azv2l - sign(pie,azvtl)
         endif

c        Calculate area of triangle tvl from its spherical excess.
         anglev = azv2l-azv2t
         if (abs(anglev).gt.pie) anglev = anglev - sign(tpie,anglev)
         anglel = azl2v-azl2t
         if (abs(anglel).gt.pie) anglel = anglel - sign(tpie,anglel)

         area = abs(anglet) + abs(anglev) + abs(anglel) - pie
         totare = totare + sign(area,anglet)
c
         azt2l = azt2v
         azl2t = azv2t
 200  continue
c
      area = totare
      pinspg = .true.
      if (abs(totang) .le. pie) pinspg = .false.
      if (abs(totare) .gt. tpie) then
         pinspg = .not.(pinspg)
         area = sign(tpie,area) - area
      endif
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      PXALBR
C
C FUNCTIONAL DESCRIPTION:         ALBERS EQUAL AREA CONIC PROJECTION INTO X/Y
C                                         Elliptical earth model.
C
C INPUT FILES/PARAMETERS:         plon(), plat() - input polyline arrays
C                                 nin            - number of input points
C
C GLOBAL VARIABLES:               clat,clon      - map center lat,lon
C                                 pie,pio2       - multiples of pi
C                                 eccen          - earth eccentricity
C                                 wmrad          - earth radius, world units
C                                 xoffs, yoffs   - display offset, world units
C
C OUTPUT FILES/PARAMETERS:        x(),y()        - output polyline arrays
C                                 nout           - number of valid output points
C                                 invali         - flag for last input point
```

```
C                                 tranl          - transformation constant
C                                 trank          -        "          "
C                                 tranr          -        "          "
C                                 trank2,const   -        "          "
C                                 tscale         - trans. dependent scale factor
C                                 pole           - latitude of near pole
C
C SUBROUTINES CALLED:             None.
C
C CALLED BY:                      llplxy
C
C LOCAL VARIABLES:
C
C RESTRICTIONS:                   Initial call must be with:   notlst = .false.
C
C ABNORMAL RETURN CONDITIONS:  Far pole is invalid.
C
C REFERENCE:                      CAM program documentation,  CIA 1986
C
C PROGRAMMER:                     DATE OF LAST CHANGE     REASON FOR CHANGE
C     Tom Wescott   (NOSC)        Feb 88                  Initial entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine PXALBR(plon,plat,nin,x,y,nout)
c
      common /pie/ pie,tpie,pio2,pio4
      common /eccen/ eccen,ec2
      common /eco2/ eco2
      logical invali,notlst
      common /invali/ invali
      common /proj/ itproj,wmrad,xoffs,yoffs,scalr,notlst
      common /conic/ spll1,spll2,tranl,trank,tranr,tscale,pole,tilt
      common /albers/ dnom,trank2,const,sinB1
      common /center/clat,clon,cclat,sclat
      real plat(*), plon(*), x(*), y(*)
      parameter (SAFETY = .004)
      parameter (HILAT = 3.14159265/2.0-SAFETY)
c
c------------------- INITIALIZATION SECTION------------------------
      if (notlst) then
c        Skip calculation of map constants.
      else
         notlst = .true.
         ec2 = eccen*eccen
         eco2 = eccen/2.0
c
c        Condition standard parallels to avoid special angle singularities.
c        (This has a negligible effect on map geometry.)
         if (abs(spll1).gt.HILAT) spll1 = sign(HILAT,spll1)
         if (abs(spll2).gt.HILAT) spll2 = sign(HILAT,spll2)
         if (abs(abs(spll1)-abs(spll2)) .lt. SAFETY) then
            spll1 = spll1 - sign(SAFETY,spll1)
         endif
c
c        Compute Albers Conic transformation constants.
```

```
          spll0 = (spll1 + spll2)/2.0
          pole = sign(pio2,spll0)
          dnom = 1. + ec2*2./3. + ec2*ec2*3./5. + ec2*ec2*ec2*4./7.
c
          es02 = (eccen*sin(spll0))**2.0
          dnum = 1. + es02*2./3. + es02*es02*3./5. + es02*es02*es02*4./7.
          sinB0 = sin(spll0)*(dnum/dnom)
c
          es12 = (eccen*sin(spll1))**2.0
          dnum = 1. + es12*2./3. + es12*es12*3./5. + es12*es12*es12*4./7.
          sinB1 = sin(spll1)*(dnum/dnom)
c
          es22 = (eccen*sin(spll2))**2.0
          dnum = 1. + es22*2./3. + es22*es22*3./5. + es22*es22*es22*4./7.
          sinB2 = sin(spll2)*(dnum/dnom)
c
          c2 = wmrad*wmrad*(1.0-ec2)*
     +         (0.5/(1.0-ec2)+(.25/eccen)*alog((1.0+eccen)/(1.0-eccen)))
          t1 = (wmrad*cos(spll1))**2.0/(1.0-es12)
          t2 = (wmrad*cos(spll2))**2.0/(1.0-es22)
c
          tranl = (t1-t2)/(2.0*c2*(sinB2-sinB1))
          const = 2.0*c2/tranl
          trank = wmrad*cos(spll1)/(tranl*sqrt(1.0-es12))
          trank2 = trank*trank
          tranr = sqrt(trank2 + const*(sinB1-sinB0))
c
c         Compute a map dependant scale factor which normalizes a small
c         one nm E-W distance along a key latitude (clat) for any cone.
          scalat = clat
          if (abs(scalat).gt.HILAT) scalat = sign(HILAT,scalat)
          Dlo = .01745
          es2 = (eccen*sin(scalat))**2.0
          dnum = 1.+es2*2./3. + es2*es2*3./5. + es2*es2*es2*4./7.
          sinB = sin(scalat)*dnum/dnom
          rm = sqrt(trank2+const*(sinB1-sinB))
          deltax = rm * sin(tranl*Dlo)
          dxmap = Dlo*wmrad*cos(scalat)
          tscale = dxmap/deltax
          scalr = tscale
c
       endif
c
c------------------- COMPUTATIONAL SECTION------------------------
       eterm = 1.0
       nout = 0
       do 100 n = 1, nin
c
          invali = .false.
          ptlat = plat(n)
          Dlo = plon(n) - clon
          if (abs(Dlo).gt.pie) Dlo = Dlo - sign(tpie,Dlo)
c
          if (ptlat.eq.-pole) then
             invali = .true.
          else
```

```
            if (eccen .ne. 0.0) then
               es2 = (eccen*sin(ptlat))**2.0
               dnum = 1.+es2*2./3. + es2*es2*3./5. + es2*es2*es2*4./7.
               eterm = dnum/dnom
            endif
c
            sinB = sin(ptlat)*eterm
            rm = sqrt(trank2+const*(sinB1-sinB))
            rx = rm*sin(tranl*Dlo)
            ry = tranr - rm*cos(tranl*Dlo)
c
c           Apply viewing transformation.
            nout = nout + 1
            x(nout) = rx*scalr + xoffs
            y(nout) = ry*scalr + yoffs
         endif
c
 100  continue
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXAZEA
C
C FUNCTIONAL DESCRIPTION:         AZIMUTHAL EQUAL AREA INTO X/Y
C                                     Spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               cclat,sclat    - cos,sin of center lat
C                               wmrad          - earth radius, world units
C                               xoffs, yoffs   - display offset, world units
C
C OUTPUT FILES/PARAMETERS:      x(),y()        - output polyline arrays
C                               nout           - number of valid output points
C                               invali         - flag for last input point, true
C                                                unless pt. very near antipode.
C SUBROUTINES CALLED:           None.
C
C CALLED BY:                    lltoxy, llplxy
C
C LOCAL VARIABLES:              er             - arc from center to point
C
C RESTRICTIONS:                 Declares antipode invalid.
C
C ABNORMAL RETURN CONDITIONS:   None.
C
C PROGRAMMER:                   DATE OF LAST CHANGE      REASON FOR CHANGE
C     Tom Wescott   (NOSC)      Jan 87                   Original entry.
C                               OCT 88
C
C-*-*-*-*-*-*-*-*-*-*-*-*-*-*-*-*-*-*-*-*-*-*-*-*-*-*-*-*-*-*-*-*-*-*-*-*|*-*-*-*-
```

```
        subroutine pxazea(plon,plat,nin,x,y,nout)
c
        common /center/ clat,clon,cclat,sclat
        logical invali,notlst
        common /invali/ invali
        common /proj/ itproj,wmrad,xoffs,yoffs,scalr,notlst
        real plat(*), plon(*), x(*), y(*)
        parameter(COSHZN = -0.999999)
c
        if (notlst) then
c          Skip calculation of map constant.
        else
           notlst = .true.
           scalr = wmrad
        endif
c
        nout = 0
        do 100 i = 1, nin
c
           invali = .false.
           sinL1 = sin(plat(i))
           cosL1 = cos(plat(i))
           Dlo = plon(i) - clon
           sinDlo = sin(Dlo)
           cosDlo = cos(Dlo)
c
c          Calculate arc from map center to point (plon,plat).
           cosER = sclat*sinL1 + cclat*cosL1*cosDlo
           if (abs(cosER) .gt. 1.0) cosER = sign(1.0,cosER)
c
           if (cosER .lt. COSHZN) then
c             The point is beyond the defined map boundary.
              invali = .true.
              cosER = COSHZN
           endif
c
c          Calculate output point on plane of projection.
           er = acos(cosER)
           sinER = sin(er)
           if (sinER .eq. 0.0) then
c             Point is at the projection center.
              rx = 0.0
              ry = 0.0
           else
              const = 2.0*sin(er/2.0)/sinER
              rx = const*cosL1*sinDlo
              ry = const*(cclat*sinL1-sclat*cosL1*cosDlo)
           endif
c
c          Apply viewing transformation.
           nout = nout + 1
           x(nout) = rx*scalr - xoffs
           y(nout) = ry*scalr - yoffs
c
 100    continue
c
```

Jul 20 14:44 1989 carn mth.f Page 83

```
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   PXAZED
C
C FUNCTIONAL DESCRIPTION:      AZIMUTHAL EQUIDISTANT PROJECTION INTO X/Y
C                                      Spherical earth model.
C
C INPUT FILES/PARAMETERS:      plon(), plat() - input polyline arrays
C                              nin            - number of input points
C
C GLOBAL VARIABLES:            clat,clon      - map center lat,lon
C                              cclat,sclat    - cos,sin of center lat
C                              wmrad          - earth radius, world units
C                              xoffs, yoffs   - display offset, world units
C
C OUTPUT FILES/PARAMETERS:     x(),y()        - output polyline arrays
C                              nout           - number of valid output points
C                              invali         - flag for last input point, true
C                                               unless point very near antipode.
C
C SUBROUTINES CALLED:          None.
C
C CALLED BY:                   lltoxy, llplxy
C
C LOCAL VARIABLES:             er             - arc from center to point
C
C RESTRICTIONS:                None.
C
C ABNORMAL RETURN CONDITIONS:  None.
C
C PROGRAMMER:                  DATE OF LAST CHANGE      REASON FOR CHANGE
C     Tom Wescott   (NOSC)     Jan 87                   Original entry.
C                              OCT 88
C
C-*-*-*-*-*-*-*-*-*-*-*-*-*-*-*-*-*-*-*-*-*-*-*-*-*-*-*-*-*-*-*-*-*-*-*|*-*-*-*-
        subroutine pxazed(plon,plat,nin,x,y,nout)
c
        common /center/ clat,clon,cclat,sclat
        logical invali,notlst
        common /invali/ invali
        common /proj/ itproj,wmrad,xoffs,yoffs,scalr,notlst
        real plat(*), plon(*), x(*), y(*)
        parameter(COSHZN = -0.999999)
c
c
        if (notlst) then
c          Skip calculation of map constant.
        else
           notlst = .true.
           scalr = wmrad
        endif
c
        nout = 0
```

```
        do 100 i = 1, nin
c
           invali = .false.
           sinL1 = sin(plat(i))
           cosL1 = cos(plat(i))
           Dlo = plon(i) - clon
           sinDlo = sin(Dlo)
           cosDlo = cos(Dlo)
c
c          Calculate arc from map center to point (plon,plat).
           cosER = sclat*sinL1 + cclat*cosL1*cosDlo
           if (abs(cosER) .gt. 1.0) cosER = sign(1.0,cosER)
c
           if (cosER .lt. COSHZN) then
c             The point is outside valid map area.
              invali = .true.
              cosER = COSHZN
           endif
c
c          Calculate output point on plane of projection.
           er = acos(cosER)
           sinER = sin(er)
           if (sinER .eq. 0.0) then
c             Point is at the projection center.
              rx = 0.0
              ry = 0.0
           else
              const = er/sinER
              rx = const*cosL1*sinDlo
              ry = const*(cclat*sinL1-sclat*cosL1*cosDlo)
           endif
c
c          Apply viewing transformation.
           nout = nout + 1
           x(nout) = rx*scalr - xoffs
           y(nout) = ry*scalr - yoffs
c
 100    continue
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXEQRE
C
C FUNCTIONAL DESCRIPTION:          EQUIRECTANGULAR PROJECTION INTO X/Y
C                                     spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               cclat,sclat    - cos,sin of center lat
C                               pio2           - multiple of pi
C                               wmrad          - earth radius, world units
```

```
Jul 20 14:44 1989  carr  mth.f Page 85

C                              xoffs, yoffs   - display offset, world units
C
C OUTPUT FILES/PARAMETERS:     x(),y()        - output polyline arrays
C                              nout           - number of valid output points
C                              invali         - flag for last input point
C
C SUBROUTINES CALLED:          None.
C
C CALLED BY:                   lltoxy, llplxy
C
C LOCAL VARIABLES:             None.
C
C RESTRICTIONS:                None.
C
C ABNORMAL RETURN CONDITIONS:  Invalid flag set for pts. at poles.
C
C LOCATION:
C
C PROGRAMMER:                  DATE OF LAST CHANGE      REASON FOR CHANGE
C     DAVE NATION                                       ORIGINAL CODE.
C     JERRY FENERTY                                     DOCUMENTATION AND MO
C                                                       FOR A21 PROTOTYPE.
C     Tom Wescott  (NOSC)      Jan 87                   optimization, add invali
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine PXEQRE(plon,plat,nin,x,y,nout)
c
        common /center/ clat,clon,cclat,sclat
        common /pie/ pie,tpie,pio2,pio4
        logical invali,notlst
        common /invali/ invali
        common /proj/ itproj,wmrad,xoffs,yoffs,scalr,notlst
        real plat(*), plon(*), x(*), y(*)
c
c
        if (notlst) then
c          Skip calculation of scale factor.
        else
           notlst = .true.
           scalr = wmrad*cclat
CC         IF (INDEX(IDEBUG,'oldhldf') .ne. 0) scalr = wmrad
        endif
c
        nout = 0
        do 100 i = 1, nin
c
           invali = .false.
           if (abs(plat(i)).ge.pio2) then
c             The point lies on a pole.
              invali = .true.
           else
c             Calculate output point on cylinder of projection.
              rx = plon(i) - clon
              if (abs(rx).gt.pie) rx = rx - sign(tpie,rx)
c
```

```
              ry = plat(i) - clat
c
c             Apply viewing transformation.
              nout = nout + 1
              x(nout) = rx*scalr + xoffs
              y(nout) = ry*scalr + yoffs
           endif
c
 100    continue
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXGNOM
C
C FUNCTIONAL DESCRIPTION:          GNOMONIC PROJECTION INTO X/Y
C                                     Spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               cclat,sclat    - cos,sin of center lat
C                               wmrad          - earth radius, world units
C                               xoffs, yoffs   - display offset, world units
C
C OUTPUT FILES/PARAMETERS:      x(),y()        - output polyline arrays
C                               nout           - number of valid output points
C                               invali         - flag for last input point
C
C SUBROUTINES CALLED:           None.
C
C CALLED BY:                    lltoxy, llplxy
C
C LOCAL VARIABLES:              er             - arc from center to point
C
C RESTRICTIONS:                 Declares points more than 80 degrees from
C                               the center invalid, and does not output them.
C
C ABNORMAL RETURN CONDITIONS:   None.
C
C PROGRAMMER:                 DATE OF LAST CHANGE      REASON FOR CHANGE
C
C     DAVE NATION                                      ORIGINAL CODE.
C     JERRY FENERTY                                    DOCUMENTATION AND MO
C                                                      FOR A21 PROTOTYPE.
C     Tom Wescott  (NOSC)     Jan 87                   optimization, add invali
C
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine pxgnom(plon,plat,nin,x,y,nout)
c
        common /center/ clat,clon,cclat,sclat
        logical invali,notlst
```

```
        common /invali/ invali
        common /proj/ itproj,wmrad,xoffs,yoffs,scalr,notlst
        real plat(*), plon(*), x(*), y(*)
        parameter (COSHZN=0.17)
c
c
        if (notlst) then
c          Skip calculation of map constant.
        else
           notlst = .true.
           scalr = wmrad
        endif
c
        nout = 0
        do 100 i = 1, nin
c
           invali = .false.
           sinL1 = sin(plat(i))
           cosL1 = cos(plat(i))
           Dlo = plon(i)-clon
           sinDlo = sin(Dlo)
           cosDlo = cos(Dlo)
c
c          Calculate arc from map center to point (plon,plat).
           cosER = sclat*sinL1 + cclat*cosL1*cosDlo
c
           if (cosER .le. COSHZN) then
c             The point lies beyond the map limit.
              invali = .true.
           else
c             Calculate output point on plane of projection.
              const = 1.0/cosER
              rx = const*cosL1*sinDlo
              ry = const*(cclat*sinL1-sclat*cosL1*cosDlo)
c
c             Apply viewing transformation.
              nout = nout+1
              x(nout) = rx*scalr + xoffs
              y(nout) = ry*scalr + yoffs
           endif
c
 100    continue
c
        return
        end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXKAVR
C
C FUNCTIONAL DESCRIPTION:       KAVRAISKY IV  CONIC PROJECTION INTO X/Y
C                                       Spherical earth model.
C
C INPUT FILES/PARAMETERS:       plon(), plat() - input polyline arrays
C                               nin            - number of input points
C
```

```
Jul 20 14:44 1989  carr  nth.f Page 88

C GLOBAL VARIABLES:            clat,clon       - map center lat,lon
C                              pie,pio2        - multiples of pi
C                              wmrad           - earth radius, world units
C                              xoffs, yoffs    - display offset, world units
C
C OUTPUT FILES/PARAMETERS:     x(),y()         - output polyline arrays
C                              nout            - number of valid output points
C                              tranl           - transformation constant
C                              trank           -         "          "
C                              tranr           -         "          "
C                              tscale          - trans. dependent scale factor
C
C SUBROUTINES CALLED:          None.
C
C CALLED BY:                   llplxy
C
C LOCAL VARIABLES:
C
C RESTRICTIONS:                Initial call must be with:   notlst = .false.
C
C ABNORMAL RETURN CONDITIONS:  None.
C
C REFERENCE:                   CAM program documentation,  CIA 1986
C
C PROGRAMMER:                  DATE OF LAST CHANGE     REASON FOR CHANGE
C     Tom Wescott   (NOSC)     Feb 88                  Initial entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine PXKAVR(plon,plat,nin,x,y,nout)
c
      common /pie/ pie,tpie,pio2,pio4
      logical invali,notlst
      common /invali/ invali
      common /proj/ itproj,wmrad,xoffs,yoffs,scalr,notlst
      common /conic/ spll1,spll2,tranl,trank,tranr,tscale,pole,tilt
      common /center/clat,clon,cclat,sclat
      real plat(*), plon(*), x(*), y(*)
      parameter (SAFETY = .004)
      parameter (HILAT = 3.14159265/2.0-SAFETY)
c
c------------------- INITIALIZATION SECTION------------------------
      if (notlst) then
c        Skip calculation of map constants.
      else
         notlst = .true.
c
c        Condition standard parallels to avoid special angle singularities.
c        (This has a negligible effect on map geometry.)
         if (abs(spll1).gt.HILAT) spll1 = sign(HILAT,spll1)
         if (abs(spll2).gt.HILAT) spll2 = sign(HILAT,spll2)
         if (abs(abs(spll1)-abs(spll2)) .lt. SAFETY) then
            spll1 = spll1 - sign(SAFETY,spll1)
         endif
c
c        Compute KAVRAISKY IV transformation constants.
```

```
         tranl = (cos(spll1)-cos(spll2))/(spll2-spll1)
         trank = ((cos(spll1)+cos(spll2))/tranl+spll1+spll2)*wmrad/2.
         tranr = trank-wmrad*clat
c
c        Compute a scale factor which normalizes a small one nautical
c        mile E-W distance along a key latitude (clat) for any cone.
         scalat = clat
         if (abs(scalat).gt.HILAT) scalat = sign(HILAT,scalat)
         Dlo = .01745
         rm = trank-wmrad*scalat
         deltax = rm*sin(tranl*Dlo)
         dxmap = Dlo*wmrad*cos(scalat)
         tscale = dxmap/deltax
         scalr = tscale
c
      endif
c
c------------------- COMPUTATIONAL SECTION------------------------
      nout = 0
      do 100 n = 1, nin
c
         invali = .false.
         ptlat = plat(n)
         Dlo = plon(n) - clon
         if (abs(Dlo).gt.pie) Dlo = Dlo - sign(tpie,Dlo)
c
         rm = trank - wmrad*ptlat
         rx = rm*sin(tranl*Dlo)
         ry = tranr - rm*cos(tranl*Dlo)
c
c        Apply viewing transformation.
         nout = nout + 1
         x(nout) = rx*scalr + xoffs
         y(nout) = ry*scalr + yoffs
c
 100  continue
c
      return
      end


C+*+*+*+*+*+*+*+*+*+*+*+*+*+*+*+*+*+*+*+*+*+*+*+*+*+*+*+*+*+*+*+*+*|*+*+*+*+
C UNIT NAME:                    PXLAMC
C
C FUNCTIONAL DESCRIPTION:       LAMBERT CONFORMAL PROJECTION INTO X/Y
C                                     Elliptical earth model.
C
C INPUT FILES/PARAMETERS:       plon(), plat() - input polyline arrays
C                               nin            - number of input points
C
C GLOBAL VARIABLES:             clat,clon      - map center lat,lon
C                               pio4           - multiple of pi
C                               eccen          - earth eccentricity
C                               wmrad          - earth radius, world units
C                               xoffs, yoffs   - display offset, world units
C
```

```
Jul 20 14:44 1989  carr  mth.f Page 90

C OUTPUT FILES/PARAMETERS:      x(),y()         - output polyline arrays
C                               nout            - number of valid output points
C                               invali          - flag for last input point
C                               pole             +.5 if cone over N, -.5 over S
C                               tranl           - transformation constant
C                               trank           -        "           "
C                               tranr           -        "           "
C                               tscale          - trans. dependent scale factor
C
C SUBROUTINES CALLED:           None.
C
C CALLED BY:                     llplxy
C
C LOCAL VARIABLES:
C
C RESTRICTIONS:                 Initial call must be with:   notlst = .false.
C
C ABNORMAL RETURN CONDITIONS:   Invalid returned for pts. near far pole.
C
C REFERENCE:                    CAM Program Documentation   CIA 1986
C
C PROGRAMMER:                   DATE OF LAST CHANGE     REASON FOR CHANGE
C     DAVE NATION                                       ORIGINAL CODE.
C     JERRY FENERTY                                     DOCUMENTATION AND MO
C     Tom Wescott  (NOSC)       Jan 87                  Added polyline loop.
C     Tom Wescott               Jul 87                  Use CIA CAM formulas.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine pxlamc(plon,plat,nin,x,y,nout)
c
      common /pie/ pie,tpie,pio2,pio4
      common /eccen/ eccen,ec2
      common /eco2/ eco2
      logical invali,notlst
      common /invali/ invali
      common /proj/ itproj,wmrad,xoffs,yoffs,scalr,notlst
      common /conic/ splll,spll2,tranl,trank,tranr,tscale,pole,tilt
      common /center/clat,clon,cclat,sclat
      real plat(*), plon(*), x(*), y(*)
      parameter (SAFETY = .004)
      parameter (HILAT = 3.1415/2.0 )
      parameter (HHILAT = HILAT/2.0)
c
c------------------- INITIALIZATION SECTION------------------------
      if (notlst) then
c        Skip calculation of map constants.
      else
         notlst = .true.
         ec2 = eccen*eccen
         eco2 = eccen/2.0
c
c        Condition standard parallels to avoid singularities.
c        (This has a negligible effect on map geometry.)
         if (splll .eq. 0.0) splll = SAFETY
         if (spll2 .eq. 0.0) spll2 = SAFETY
```

Jul 20 14:44 1989 carr mth.f Page 91

```
         if (abs(spll1).gt.HILAT) spll1 = sign(HILAT,spll1)
         if (abs(spll2).gt.HILAT) spll2 = sign(HILAT,spll2)
         if (spll1 .eq. -spll2) then
            spll1 = SAFETY
            spll2 = SAFETY
         endif
c
c        Compute Lambert Conformal Conic transformation constants.
         spll0 = (spll1 + spll2)/2.0
         pole = sign(0.5,spll0)
c
         esinl = eccen*sin(clat)
         eterm = ((1.0 + esinl)/(1.0 - esinl))**eco2
         tanZ02 = eterm*tan(pio4 - pole*abs(clat))
c
         esinl = eccen*sin(spll1)
         eterm = ((1.0 + esinl)/(1.0 - esinl))**eco2
         tanZ12 = eterm*tan(pio4 - pole*abs(spll1))
c
         esinl = eccen*sin(spll2)
         eterm = ((1.0 + esinl)/(1.0 - esinl))**eco2
         tanZ22 = eterm*tan(pio4 - pole*abs(spll2))
c
         r1 = wmrad/(sqrt(1.0 - ec2*sin(spll1)*sin(spll1)))
         r2 = wmrad/(sqrt(1.0 - ec2*sin(spll2)*sin(spll2)))
         denom = alog(tanZ12) - alog(tanZ22)
         if (denom .ne. 0.0) then
            sinPHI = alog(cos(spll1))-alog(cos(spll2))+alog(r1)-alog(r2)
            sinPHI = sinPHI/denom
         else
c           Avoid zero divide if parallels same.  Replace with limit.
            sinPHI = sin(spll1)
         endif
         tranl = abs(sinPHI)
c
         trank = 0.5*((r1*cos(spll1)/(tranl*tanZ12**tranl))
     +               +(r2*cos(spll2)/(tranl*tanZ22**tranl)))
c
         tranr = trank*(tanZ02**tranl)
c
c        Compute a map dependant scale factor which normalizes a small
c        one nm E-W distance along a key latitude (clat) for any cone.
         scalat = clat
         if (abs(scalat).gt.HILAT) scalat = sign(HILAT,scalat)
         Dlo = .01745
         tanZM2 = eterm*tan(pio4 - pole*scalat)
         rm = abs(trank*(tanZM2**tranl))
         deltax = rm * sin(tranl*abs(Dlo))
         if (pole*Dlo .lt. 0.0) deltax = - deltax
         dxmap = Dlo*wmrad*cos(scalat)
         tscale = dxmap/deltax
         scalr = tscale
c
      endif
c
c------------------- COMPUTATIONAL SECTION------------------------
```

```
      eterm = 1.0
      nout = 0
      do 100 n = 1, nin
c
         invali = .false.
         ptlat = plat(n)
         Dlo = plon(n) - clon
         if (abs(Dlo).gt.pie) Dlo = Dlo - sign(tpie,Dlo)
         absDlo = abs(Dlo)
c
         if ((abs(ptlat).gt.pio2).or.(pole*ptlat.le.-HHILAT)) then
            invali = .true.
         else
            if (eccen .ne. 0.0) then
               esinl = eccen * sin(ptlat)
               eterm = ((1.0 + esinl)/(1.0 - esinl))**eco2
            endif
c
            tanZM2 = eterm*tan(pio4 - pole*ptlat)
c
            rm = abs(trank*(tanZM2**tranl))
            rx = rm * sin(tranl*absDlo)
            if (pole*Dlo .lt. 0.0) rx = -rx
            ry = tranr - rm*cos(tranl*absDlo)
c
c           Apply viewing transformation.
            nout = nout + 1
            x(nout) = rx*scalr + xoffs
            y(nout) = ry*scalr + yoffs
         endif
c
 100  continue
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  PXMERC
C
C FUNCTIONAL DESCRIPTION:        MERCATOR PROJECTION INTO X/Y
C                                   Elliptical earth model.
C
C INPUT FILES/PARAMETERS:     plon(), plat() - input polyline arrays
C                             nin            - number of input points
C
C GLOBAL VARIABLES:           clat,clon      - map center lat,lon
C                             cclat,sclat    - cos,sin of center lat
C                             pio2,pio4      - multiples of pi
C                             eccen          - earth eccentricity
C                             wmrad          - earth radius, world units
C                             xoffs, yoffs   - display offset, world units
C                             scalr          - display scale factor
C
C OUTPUT FILES/PARAMETERS:    x(),y()        - output polyline arrays
C                             nout           - number of valid output points
```

Jul 20 14:44 1989 carn nth.f Page 93

```
C                              invali         - flag for last input point
C
C SUBROUTINES CALLED:          None.
C
C CALLED BY:                   llplxy
C
C LOCAL VARIABLES:             None.
C
C RESTRICTIONS:                None.
C
C ABNORMAL RETURN CONDITIONS:  Invalid flag set for pts at poles.
C
C PROGRAMMER:                  DATE OF LAST CHANGE     REASON FOR CHANGE
C     DAVE NATION                                      ORIGINAL CODE.
C     JERRY FENERTY                                    DOCUMENTATION AND MO
C                                                      FOR A21 PROTOTYPE.
C     Tom Wescott  (NOSC)      Jan 87                  optimization, add invali
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine PXMERC(plon,plat,nin,x,y,nout)
c
        common /center/ clat,clon,cclat,sclat
        common /pie/ pie,tpie,pio2,pio4
        common /eccen/ eccen,ec2
        logical invali,notlst
        common /invali/ invali
        common /proj/ itproj,wmrad,xoffs,yoffs,scalr,notlst
        real plat(*), plon(*), x(*), y(*)
        parameter (HILAT=3.13/2.0)
c
c
        if (notlst) then
c          Skip calculation of scale factor.
        else
           notlst = .true.
           scalr = wmrad*cos(clat)
        endif
c
        nout = 0
        do 100 i = 1, nin
c
           invali = .false.
           ptlat = plat(i)
c
           if (abs(ptlat).ge.HILAT) then
              if (abs(ptlat).ge.pio2) invali = .true.
              ptlat = sign(HILAT,ptlat)
           endif
c
c          Calculate output point on cylinder of projection.
           rx = plon(i) - clon
           if (abs(rx).gt.pie) rx = rx - sign(tpie,rx)
c
           ry = alog(tan(pio4+0.5*ptlat))
           if (eccen .ne. 0.0) then
```

```
Jul 20 14:44 1989   carr   mth.f Page 94

c             Add on eccentricity term.
              esinL = eccen*sin(ptlat)
              ry = ry + 0.5*eccen*alog((1.0-esinL)/(1.0+esinL))
           endif
           ry = ry - clat
c
c          Apply viewing transformation.
           nout = nout + 1
           x(nout) = rx*scalr + xoffs
           y(nout) = ry*scalr + yoffs
c
 100    continue
c
        return
        end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PXMILL
C
C FUNCTIONAL DESCRIPTION:         MILLER CYLINDRICAL PROJECTION INTO X/Y
C                                       Spherical earth model.
C
C INPUT FILES/PARAMETERS:        plon(), plat() - input polyline arrays
C                                nin            - number of input points
C
C GLOBAL VARIABLES:              clat,clon      - map center lat,lon
C                                cclat,sclat    - cos,sin of center lat
C                                pio2,pio4      - multiples of pi
C                                wmrad          - earth radius, world units
C                                xoffs, yoffs   - display offset, world units
C
C OUTPUT FILES/PARAMETERS:       x(),y()        - output polyline arrays
C                                nout           - number of valid output points
C                                invali         - flag for last input point
C
C SUBROUTINES CALLED:            None.
C
C CALLED BY:                     llplxy
C
C LOCAL VARIABLES:               None.
C
C RESTRICTIONS:                  None.
C
C ABNORMAL RETURN CONDITIONS:    Invalid flag set for pts at poles.
C
C PROGRAMMER:                    DATE OF LAST CHANGE     REASON FOR CHANGE
C     DAVE NATION                                        ORIGINAL CODE.
C     JERRY FENERTY                                      DOCUMENTATION AND MO
C                                                        FOR A21 PROTOTYPE.
C     Tom Wescott   (NOSC)       Jan 87                  optimization, add invali
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine PXMILL(plon,plat,nin,x,y,nout)
c
```

```
        common /center/ clat,clon,cclat,sclat
        common /pie/ pie,tpie,pio2,pio4
        logical invali,notlst
        common /invali/ invali
        common /proj/ itproj,wmrad,xoffs,yoffs,scalr,notlst
        real plat(*), plon(*), x(*), y(*)
c
c
        if (notlst) then
c          Skip calculation of map constant.
        else
           notlst = .true.
           scalr = wmrad*cclat
        endif
c
        nout = 0
        do 100 i = 1, nin
c
           invali = .false.
           ptlat = plat(i)
           ptlon = plon(i)
c
           if (abs(ptlat).ge.pio2) then
              invali = .true.
           else
c             Calculate output point on cylinder of projection.
              rx = ptlon - clon
              if (abs(rx).gt.pie) rx = rx - sign(tpie,rx)
c
              ry = 1.25 + alog(tan(pio4+0.4*ptlat))
              ry = ry - clat
c
c             Apply viewing transformation.
              nout = nout + 1
              x(nout) = rx*scalr + xoffs
              y(nout) = ry*scalr + yoffs
           endif
c
 100    continue
c
        return
        end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXOBLM
C
C FUNCTIONAL DESCRIPTION:       OBLIQUE MERCATOR PROJECTION INTO X/Y
C                                     Spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               cclat,sclat    - cos,sin of center lat
C                               wmrad          - earth radius, world units
```

```
C                              xoffs, yoffs    - display offset, world units
C                              az,azlat        - Gt. circle azimuth at azlat.
C                              tilt            - GT. circle azimuth at equator.
C
C OUTPUT FILES/PARAMETERS:     x(),y()         - output polyline arrays
C                              nout            - number of valid output points
C                              invali          - flag for last input point
C
C SUBROUTINES CALLED:          da2ll
C
C CALLED BY:                   lltoxy, llplxy
C
C LOCAL VARIABLES:             SINMAX          - sin of max angle from great c.
C
C RESTRICTIONS:                Declares points beyond MAX from central great
C                              circle invalid, and truncates them there to work
C                              around polygon clipping problems near new poles.
C
C ABNORMAL RETURN CONDITIONS:  None.
C
C PROGRAMMER:                  DATE OF LAST CHANGE      REASON FOR CHANGE
C     Tom Wescott  (NOSC)      Apr 88                   original entry
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine PXOBLM(plon,plat,nin,x,y,nout)
c
      common /center/ clat,clon,cclat,sclat
      common /pie/ pie,tpie,pio2,pio4
      logical invali,notlst
      common /invali/ invali
      common /proj/ itproj,wmrad,xoffs,yoffs,scalr,notlst
      common /conic/ spll1,spll2,tranl,trank,tranr,tscale,pole,tilt
      common /oblm/ polat,polon,az,azlat,gamma,xshift
      real plat(*), plon(*), x(*), y(*)
      parameter (SINMAX=.99)
c
c---------------------- INITIALIZATION SECTION ---------------------------
      if (notlst) then
c        Skip calculation of constants.
      else
         notlst = .true.
c
c        Specify central great circle by lat,azimuth, and center pt.
c        Convert great circle azimuth to range  -pio2 < az < pio2.
         if (abs(az).gt.pie) az = az - sign(tpie,az)
         if (abs(az).gt.pio2) az = az - sign(pie,az)
c
c        Calculate north rotation angle for map center.
         sinB0 = sin(az)*cos(azlat)/cos(clat)
         if (abs(sinB0).gt.1.0) then
            sinB0 = sign(1.0,sinB0)
CCCC        WRITE(*,*)'PXOBLM... gt. circle doesnt go thru map center'
         endif
         b0 = asin(sinB0)
c        Resolve asin() ambiguity by larger side rule.
```

Jul 20 14:44 1989 carr mth.f Page 97

```
         if (pio2-azlat .gt. pio2-clat)  b0 = sign(1.0,b0)*(pie-abs(b0))
c        Redefine central great circle azimuth at map center point.
         az = b0
         azlat = clat
         azlon = clon

         gamma = asin(sinB0) - sign(pio2,b0)
         sinG = sin(gamma)
         cosG = cos(gamma)
c
c        Calculate equatorial tilt (azimuth of gt. circle at equator).
         blat = 0.0
         b = asin(sin(az)*cos(azlat)/cos(blat))
c        Resolve asin() ambiguity by larger side rule.
         if (pio2-azlat .gt. pio2-blat)  b = sign(1.0,b)*(pie-abs(b))
c
         a = az
         tilt = b
         if (azlat.lt.0.0)  tilt = sign(1.0,az)*(pie-abs(b))
c
c        Find longitude of gt. circle-equator intersection.
         if ((a.ne.b).or.(azlat.ne.0.0)) then
            Dlo = 2.*atan2(sin(azlat/2.),tan((a-b)/2.)*cos(azlat/2.))
         else
            Dlo = 0.0
         endif
c        Find nearest intersection, where sign of tilt is correct.
         if (Dlo.gt.pio2) Dlo = Dlo -sign(pie,Dlo)
         dnode = azlon + Dlo
         if (abs(dnode).gt.pie) dnode = dnode - sign(tpie,dnode)
c
c        Calculate lat,lon coordinates of positive new pole.
         az2new = tilt - sign(pio2,tilt)
         call da2ll(0.0,dnode,pio2,az2new,polat,polon)
         sinPL = sin(polat)
         cosPL = cos(polat)
c
c        Calculate x position (parallel to great circle) of center point.
         cplon = clon - polon
         xshift=atan2(sin(cplon)*cclat,
     +            cclat*sin(polat)*cos(cplon)-cos(polat)*sclat)
c
         scalr = wmrad
      endif
c
c------------------------- COMPUTATIONAL SECTION ----------------------------
      sinPl = sin(polat)
      cosPl = cos(polat)
      nout = 0
      do 100 i = 1, nin
c
         invali = .false.
         ptlon = plon(i)
c        Rotate points with respect to great. circle.
         ptlon = ptlon - polon
         cosLO = cos(ptlon)
```

Jul 20 14:44 1989 carr mth.f Page 98

```
          sinLO = sin(ptlon)
          sinLA = sin(plat(i))
          cosLA = cos(plat(i))
c
c         Calculate output point on cylinder of projection.
          sinfnc = sinLA*sinPL+cosLA*cosPL*cosLO
          if (abs(sinfnc) .gt. SINMAX) then
c            Point is too far from central great circle.  Truncate.
             invali =.true.
             sinfnc = sign(SINMAX,sinfnc)
          endif
c
          rx = atan2(sinLO*cosLA, cosLA*sinPL*cosLO-cosPL*sinLA)
          deltax = rx - xshift
          if (abs(deltax).gt.pie) rx = rx - sign(tpie,deltax)
c
          ry = 0.5*alog((1+sinfnc)/(1-sinfnc))
c
c         Apply north up viewing transformation.
          nout = nout + 1
          x(nout) = (+rx*cosG + ry*sinG)*scalr + xoffs
          y(nout) = (-rx*sinG + ry*cosG)*scalr + yoffs
c
 100  continue
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXOREQ
C
C FUNCTIONAL DESCRIPTION:       EQUATORIAL ORTHOGRAPHIC PROJECTION INTO X/Y
C                                       Spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               cclat,sclat    - cos,sin of center lat
C                               wmrad          - earth radius, world units
C                               xoffs, yoffs   - display offset, world units
C
C OUTPUT FILES/PARAMETERS:      x(),y()        - output polyline arrays
C                               nout           - number of valid output points
C                               invali         - flag for last input point
C
C SUBROUTINES CALLED:           None.
C
C CALLED BY:                    lltoxy, llplxy
C
C LOCAL VARIABLES:              er             - arc from center to point
C
C RESTRICTIONS:                 None.
C
C ABNORMAL RETURN CONDITIONS:   Declares points over the horizon invalid
```

```
C                               and does not output them.
C
C PROGRAMMER:                   DATE OF LAST CHANGE     REASON FOR CHANGE
C     DAVE NATION                                       ORIGINAL CODE.
C     JERRY FENERTY                                     DOCUMENTATION AND MO
C                                                       FOR A21 PROTOTYPE.
C     Tom Wescott   (NOSC)      Jan 87                  optimization, add invali
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine PXOREQ(plon,plat,nin,x,y,nout)
c
        common /center/ clat,clon,cclat,sclat
        logical invali,not1st
        common /invali/ invali
        common /proj/ itproj,wmrad,xoffs,yoffs,scalr,not1st
        real plat(*), plon(*), x(*), y(*)
c
c
        if (not1st) then
c          Skip calculation of scaling constant.
        else
           not1st = .true.
           scalr = wmrad
        endif
c
        nout = 0
        do 100 i = 1, nin
c
           invali = .false.
           sinL1 = sin(plat(i))
           cosL1 = cos(plat(i))
           Dlo = plon(i) - clon
c
c          Calculate arc from equatorial center, to point (plon,plat).
           cosER = cosL1*cos(Dlo)
c
           if (cosER .lt. 0.0) then
c             The point lies over the horizon.
              invali = .true.
           else
c             Calculate output point on plane of projection.
              rx = cosL1*sin(Dlo)
              ry = sinL1
c
c             Apply viewing transformation.
              nout = nout + 1
              x(nout) = rx*scalr + xoffs
              y(nout) = ry*scalr + yoffs
           endif
c
 100    continue
c
        return
        end
```

Jul 20 14:44 1989 carr mth.f Page 100

```
C+*+*+*+*+*+*+*+*+*+*+*+*+*+*+*+*+*+*+*+*+*+*+*+*+*+*+*+*+*+*+*+*+*|*+*+*+*+
C UNIT NAME:                    PXORPO
C
C FUNCTIONAL DESCRIPTION:        POLAR ORTHOGRAPHIC PROJECTION INTO X/Y
C                                    Spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               cclat,sclat    - cos,sin of center lat
C                               wmrad          - earth radius, world units
C                               xoffs, yoffs   - display offset, world units
C
C OUTPUT FILES/PARAMETERS:      x(),y()        - output polyline arrays
C                               nout           - number of valid output points
C                               invali         - flag for last input point
C
C SUBROUTINES CALLED:           None.
C
C CALLED BY:                    lltoxy, llplxy
C
C LOCAL VARIABLES:              cosER          - cos of arc from cntr to point.
C                               spolat         - sin of pole latitude.
C
C RESTRICTIONS:                 None.
C
C ABNORMAL RETURN CONDITIONS:   Points < 90 from center are invalid.
C
C PROGRAMMER:                   DATE OF LAST CHANGE     REASON FOR CHANGE
C     DAVE NATION                                       ORIGINAL CODE.
C     JERRY FENERTY                                     DOCUMENTATION AND MO
C                                                       FOR A21 PROTOTYPE.
C     Tom Wescott   (NOSC)      Jan 87                  optimization, add invali
C
C-*-*-*-*-*-*-*-*-*-*-*-*-*-*-*-*-*-*-*-*-*-*-*-*-*-*-*-*-*-*-*-*-*|*-*-*-*-

        subroutine PXORPO(plon,plat,nin,x,y,nout)
c
        common /center/ clat,clon,cclat,sclat
        common /pie/ pie,tpie,pio2,pio4
        logical invali,notlst
        common /invali/ invali
        common /proj/ itproj,wmrad,xoffs,yoffs,scalr,notlst
        real plat(*), plon(*), x(*), y(*)
c
c
        if (notlst) then
c          Skip calculation of constants.
        else
           notlst = .true.
           scalr = wmrad
        endif
c
        nout = 0
```

```
        do 100 i = 1, nin
c
           invali = .false.
           sinL1 = sin(plat(i))
           cosL1 = cos(plat(i))
           Dlo = plon(i) - clon
           spolat = sign(1.0,clat)
c
c          Calculate arc from map center to point (plon,plat).
           cosER = spolat*sinL1
c
           if (cosER .lt. -0.0) then
c             The point lies over the horizon.
              invali = .true.
           else
c             Calculate output point on plane of projection.
              rx = cosL1*sin(Dlo)
              ry = spolat*(-cosL1*cos(Dlo))

c             Apply viewing transformation.
              nout = nout + 1
              x(nout) = rx*scalr + xoffs
              y(nout) = ry*scalr + yoffs
           endif
c
 100    continue
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   PXORTH
C
C FUNCTIONAL DESCRIPTION:          ORTHOGRAPHIC PROJECTION INTO X/Y
C                                      Spherical earth model.
C
C INPUT FILES/PARAMETERS:      plon(), plat() - input polyline arrays
C                              nin            - number of input points
C
C GLOBAL VARIABLES:            clat,clon      - map center lat,lon
C                              cclat,sclat    - cos,sin of center lat
C                              wmrad          - earth radius, world units
C                              xoffs, yoffs   - display offset, world units
C
C OUTPUT FILES/PARAMETERS:     x(),y()        - output polyline arrays
C                              nout           - number of valid output points
C                              invali         - flag for last input point
C
C SUBROUTINES CALLED:          None.
C
C CALLED BY:                   llplxy,lltoxy
C
C LOCAL VARIABLES:             er             - arc from center to point
C
C RESTRICTIONS:                Declares points over the horizon invalid
```

Jul 20 14:44 1989 carr mth.f Page 102

```
C                              and does not output them.
C
C ABNORMAL RETURN CONDITIONS:  None.
C
C PROGRAMMER:                  DATE OF LAST CHANGE      REASON FOR CHANGE
C     DAVE NATION                                       ORIGINAL CODE.
C     JERRY FENERTY                                     DOCUMENTATION AND MO
C                                                       FOR A21 PROTOTYPE.
C     Tom Wescott  (NOSC)      Jan 87                   optimization, add invali
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine PXORTH(plon,plat,nin,x,y,nout)
c
        common /center/ clat,clon,cclat,sclat
        logical invali,notlst
        common /invali/ invali
        common /proj/ itproj,wmrad,xoffs,yoffs,scalr,notlst
        real plat(*), plon(*), x(*), y(*)
c
c
        if (notlst) then
c          Skip calculation of map constant.
        else
           notlst = .true.
           scalr = wmrad
        endif
c
        nout = 0
        do 100 i = 1, nin
c
           invali = .false.
           sinL1 = sin(plat(i))
           cosL1 = cos(plat(i))
           Dlo = plon(i)-clon
           sinDlo = sin(Dlo)
           cosDlo = cos(Dlo)
c
c          Calculate arc from map center to point (plon,plat).
           cosER = sclat*sinL1 + cclat*cosL1*cosDlo
c
           if (cosER .lt. 0.0) then
c             The point lies over the horizon.
              invali = .true.
           else
c             Calculate output point on plane of projection.
              rx = cosL1*sinDlo
              ry = cclat*sinL1 - sclat*cosL1*cosDlo
c
c             Apply viewing transformation.
              nout = nout+1
              x(nout) = rx*scalr + xoffs
              y(nout) = ry*scalr + yoffs
           endif
c
 100    continue
```

```
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXPERS
C
C FUNCTIONAL DESCRIPTION:       PERSPECTIVE PROJECTION INTO X/Y
C                                    Spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               cclat,sclat    - cos,sin of center lat
C                               xrnm           - map half width, nm
C                               wmrad          - earth radius, world units
C                               xrad           - screen radius, world units
C                               xoffs, yoffs   - display offset, world units
C
C OUTPUT FILES/PARAMETERS:      x(),y()        - output polyline arrays
C                               nout           - number of output points
C                               invali         - flag for last input point
C                               orhalt         - view point altitude, nm
C                               orhc           - earth center to viewpoint
C                               cosERM         - cos of max value for arc er
C                               radmax         - horizon dist. in proj. plane
C
C SUBROUTINES CALLED:           None.
C
C CALLED BY:                    lltoxy, llplxy
C
C LOCAL VARIABLES:              cosER          - cos of tangency to point arc.
C
C RESTRICTIONS:
C
C ABNORMAL RETURN CONDITIONS:   Declares points over the horizon invalid.
C                               and places output values on the horizon.
C LOCATION:
C
C PROGRAMMER:                   DATE OF LAST CHANGE    REASON FOR CHANGE
C     DAVE NATION                                      ORIGINAL CODE.
C     JERRY FENERTY                                    DOCUMENTATION AND MO
C                                                      FOR A21 PROTOTYPE.
C     Tom Wescott  (NOSC)       Jan 87                 Optimization, add invali.
C     Tom Wescott               Jul 87                 Clamp ivalids to horizon.
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine pxpers(plon,plat,nin,x,y,nout)
c
        common /center/ clat,clon,cclat,sclat
        common /pie/ pie,tpie,pio2,pio4
        common /viewp/ xrad,yrad,ixnp,iynp,xc,yc
        common /const/ maxval,rmpv,c,r,ernm
```

```
        logical invali,notlst
        common /invali/ invali
        common /proj/ itproj,wmrad,xoffs,yoffs,scalr,notlst
        common /pers/ orhalt,orhc,pconst,cosERM,radmax
        real plat(*), plon(*), x(*), y(*)
        parameter (ALTMAX = 99999.)
c
c
c--------------------- INITIALIZATION SECTION-------------------------
        if (notlst) then
c          Skip calculation of map constants.
        else
           notlst = .true.
c
c          Calculate view point altitude in nm based on wmrad.
           xrnm = ernm*xrad/wmrad
           ermax = xrnm/ernm
           if (ermax.ge.pio2) ermax = pio2 - .00001
           orhalt = ernm/cos(ermax) - ernm
           orhalt = amin1(orhalt,ALTMAX)
c
c          Calculate all map constants based on altitude.
c          Distance from view point to earth center in world units.
           worhal = orhalt*wmrad/ernm
           orhc = wmrad + worhal
           pconst = wmrad*(orhc+wmrad)
c
c          Cosine of center to horizon arc distance.
           cosERM = -wmrad/orhc
c
c          Radius of horizon circle on far side projection plane.
           ahmax = asin(wmrad/orhc)
           radmax = (orhc + wmrad)*(tan(ahmax))
c
c          Scale factor to view full world.
           if (yrad.lt.xrad) then
              scalr = yrad/radmax
           else
              scalr = xrad/radmax
           endif
        endif
c
c----------------------- COMPUTATION SECTION --------------------------
        nout = 0
        do 100 i = 1, nin
c
           invali = .false.
           sinL1 = sin(plat(i))
           cosL1 = cos(plat(i))
           Dlo = plon(i) - clon + pie
           sinDlo = sin(Dlo)
           cosDlo = cos(Dlo)
c
c          Calculate arc distance from center point to point (plon,plat).
           cosER = -sclat*sinL1 + cclat*cosL1*cosDlo
c
```

```
c          Calculate output point on plane of projection.
           const = pconst/(orhc+wmrad*cosER)
           rx = -const*cosL1*sinDlo
           ry = const*(cclat*sinL1+sclat*cosL1*cosDlo)
c
           if (cosER.Gt.cosERM) then
              invali = .true.
c
c             A radial clip is required to properly handle polygons
c             which cross the horizon.  For now, approximate this by
c             moving over the horizon points back to the horizon.
c             This will minimize thru the earth visibility, and
c             artifacts from otherwise unplotted invalid verticies.
c
              radius = sqrt(rx*rx + ry*ry)
              if (radius .ne. 0.0) then
                 rmult = radmax/radius
                 rx = rx*rmult
                 ry = ry*rmult
              else
                 go to 100
              endif
c
           endif
c
c          Apply viewing transformation.
           nout = nout + 1
           x(nout) = rx*scalr + xoffs
           y(nout) = ry*scalr + yoffs
c
 100    continue
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXPOLY
C
C FUNCTIONAL DESCRIPTION:          POLYCONIC PROJECTION INTO X/Y
C                                     Elliptical earth model.
C
C INPUT FILES/PARAMETERS:       plon(), plat() - input polyline arrays
C                               nin            - number of input points
C
C GLOBAL VARIABLES:             clat,clon      - map center lat,lon
C                               wmrad          - earth radius, world units
C                               xoffs, yoffs   - display offset, world units
C
C OUTPUT FILES/PARAMETERS:      x(),y()        - output polyline arrays
C                               nout           - number of valid output points
C                               invali         - flag for last input point
C                               ap,bp,cp,dp,ep - transformation constants
C
C SUBROUTINES CALLED:           None.
C
```

```
C CALLED BY:                    llplxy
C
C LOCAL VARIABLES:              aaxix         - major axis of spheriod, m
C                               baxis         - minor axis, m
C
C RESTRICTIONS:                 Initial call must be with:   notlst = .false.
C
C ABNORMAL RETURN CONDITIONS:   Invalid returned for pts. near far pole.
C
C REFERENCE:                    CAM Program Documentation   CIA 1986
C
C PROGRAMMER:                   DATE OF LAST CHANGE     REASON FOR CHANGE
C     Tom Wescott               Feb 88                  Original entry.
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine PXPOLY(plon,plat,nin,x,y,nout)
c
      common /pie/ pie,tpie,pio2,pio4
      logical invali,notlst
      common /invali/ invali
      common /proj/ itproj,wmrad,xoffs,yoffs,scalr,notlst
      common /poly/ ap,bp,cp,dp,ep,e2,aaxis,baxis
      common /center/clat,clon,cclat,sclat
      real plat(*), plon(*), x(*), y(*)
c
c------------------- INITIALIZATION SECTION------------------------
      if (notlst) then
c        Skip calculation of map constants.
      else
         notlst = .true.
c
c        From Int'l Astronomical Union figure of the earth (1968)
         aaxis = 1.00111887
         baxis = 0.99776226
c
         e2 = (aaxis**2.0-baxis**2.0)/(aaxis**2.0)
         an1 = (aaxis-baxis)/(aaxis+baxis)
         an2 = an1*an1
         an3 = an2*an1
         an4 = an3*an1
         an5 = an4*an1
c
         ap = aaxis*(1.0 - an1 + 5./4.*(an2-an3) + 81./64.*(an4-an5))
         bp = 3.0/2.0*aaxis*(an1 - an2 + 7./8.*(an3-an4) + 55./64.*an5)
         cp = 15./16.*aaxis*(an2 - an3 + 3./4.*(an4-an5))
         dp = 35./48.*aaxis*(an3 - an4 + 11./16.*an5)
         ep = 315./512.*aaxis*(an4 - an5)
c
         scalr = wmrad
      endif
c
c------------------- COMPUTATIONAL SECTION------------------------
      nout = 0
      do 100 n = 1, nin
c
```

```
          invali = .false.
          ptlat = plat(n)
          absLat = abs(plat(n))
          delf = clon - plon(n)
          if (abs(delf).gt.pie) delf = delf - sign(tpie,delf)
          absDel = abs(delf)
          s = (ap*absLat-bp*sin(2.0*absLat)+cp*sin(4.*absLat)
     &          -dp*sin(6.*absLat) + ep*sin(8.*absLat))
          rh = aaxis/(1.0-e2*sin(2.0*absLat))
c
          if (ptlat.ne.0) then
             theta = absDel*sin(absLat)
             xl = rh*cos(absLat)/sin(absLat)
             ry = s + 2.0*xl*(sin(theta/2.0))**2.0
             rx = xl*sin(theta)
          else
             ry = 0.0
             rx = aaxis*absDel
          endif
c
c         Give proper signs to rx and ry.
          rx = -sign(rx,delf)
          ry = sign(ry,ptlat)
c
c         Apply viewing transformation.
          nout = nout + 1
          x(nout) = rx*scalr + xoffs
          y(nout) = ry*scalr + yoffs
c
 100  continue
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      PXPOST
C
C FUNCTIONAL DESCRIPTION:          POLAR STEREOGRAPHIC PROJECTION INTO X/Y
C                                         Elliptical earth model.
C
C INPUT FILES/PARAMETERS:         plon(), plat() - input polyline arrays
C                                 nin            - number of input points
C
C GLOBAL VARIABLES:               clat,clon      - map center lat,lon
C                                 wmrad          - earth radius, world units
C                                 eccen          - earth eccentricity
C                                 xoffs, yoffs   - display offset, world units
C
C OUTPUT FILES/PARAMETERS:        x(),y()        - output polyline arrays
C                                 nout           - number of valid output points
C                                 invali         - flag for last input point
C
C SUBROUTINES CALLED:             None.
C
C CALLED BY:                      lltoxy, llplxy
```

Jul 20 14:44 1989 carr mth.f Page 108

```
C
C LOCAL VARIABLES:             cosER         - cos of arc from cntr to point.
C                              spolat        - sin of near pole latitude.
C
C RESTRICTIONS:                None.
C
C ABNORMAL RETURN CONDITIONS:  Last points > 170 from center flagged invalid.
C
C PROGRAMMER:                  DATE OF LAST CHANGE     REASON FOR CHANGE
C     Tom Wescott  (NOSC)      Jan 87                  Initial entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine PXPOST(plon,plat,nin,x,y,nout)
c
      common /center/ clat,clon,cclat,sclat
      logical invali,notlst
      common /invali/ invali
      common /proj/ itproj,wmrad,xoffs,yoffs,scalr,notlst
      real plat(*), plon(*), x(*), y(*)
      parameter (COSHZN = -0.985)
c
c
      if (notlst) then
c        Skip calculation of constants.
      else
         notlst = .true.
         scalr = wmrad
      endif
c
      efactr = 1.0
      nout = 0
      do 100 i = 1, nin
c
         invali = .false.
         sinL1 = sin(plat(i))
         cosL1 = cos(plat(i))
         Dlo = plon(i) - clon
         spolat = sign(1.0,clat)
c
c        Calculate arc from map center to point (plon,plat).
         cosER = spolat*sinL1
c
         if (cosER.le.COSHZN) then
            invali = .true.
         else
c           Calculate output point on plane of projection.
            if (eccen.ne.0.0) then
c              Calculate eccentricity factor.
               esinl = eccen*sinL1
               efactr = ((1.0-esinl)/(1.0+esinl))**(eccen/2.0)
            endif
            const = (2.0*efactr)/(1.0+cosER)
            rx = const*cosL1*sin(Dlo)
            ry = const*(-spolat*cosL1*cos(Dlo))
c
```

```
c             Apply viewing transformation.
              nout = nout + 1
              x(nout) = rx*scalr + xoffs
              y(nout) = ry*scalr + yoffs
           endif
c
 100    continue
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   PXSINU
C
C FUNCTIONAL DESCRIPTION:         SINUSOIDAL PROJECTION INTO X/Y
C                                    spherical earth model.
C
C INPUT FILES/PARAMETERS:      plon(), plat() - input polyline arrays
C                              nin            - number of input points
C
C GLOBAL VARIABLES:            clat,clon      - map center lat,lon
C                              cclat,sclat    - cos,sin of center lat
C                              pio2           - multiple of pi
C                              wmrad          - earth radius, world units
C                              xoffs, yoffs   - display offset, world units
C
C OUTPUT FILES/PARAMETERS:     x(),y()        - output polyline arrays
C                              nout           - number of valid output points
C                              invali         - flag for last input point
C
C SUBROUTINES CALLED:          None.
C
C CALLED BY:                   lltoxy, llplxy
C
C LOCAL VARIABLES:             None.
C
C RESTRICTIONS:                None.
C
C ABNORMAL RETURN CONDITIONS:  Invalid flag set for pts. at poles.
C
C LOCATION:
C
C PROGRAMMER:                  DATE OF LAST CHANGE     REASON FOR CHANGE
C     Tom Wescott   (NOSC)     Jan 87                  Original entry
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine PXSINU(plon,plat,nin,x,y,nout)
c
        common /center/ clat,clon,cclat,sclat
        common /pie/ pie,tpie,pio2,pio4
        logical invali,notlst
        common /invali/ invali
        common /proj/ itproj,wmrad,xoffs,yoffs,scalr,notlst
        real plat(*), plon(*), x(*), y(*)
```

```
c
c
       if (not1st) then
c         Skip calculation of map constant.
       else
          not1st = .true.
          scalr = wmrad
       endif
c
       nout = 0
       do 100 i = 1, nin
c
          invali = .false.
          if (abs(plat(i)).gt.pio2) then
             invali = .true.
          else
             rx = plon(i) - clon
             if (abs(rx).gt.pie) rx = rx - sign(tpie,rx)
             rx = cos(plat(i))*rx
             ry = plat(i) - clat
c
c            Apply viewing transformation.
             nout = nout + 1
             x(nout) = rx*scalr - xoffs
             y(nout) = ry*scalr - yoffs
          endif
c
 100   continue
c
       return
       end

C+*+*+*+*+*+*+*+*+*+*+*+*+*+*+*+*+*+*+*+*+*+*+*+*+*+*+*+*+*+*+*+*+*+*+*+*+*+*+*+*+|*+*+*+*+
C UNIT NAME:                      PXSTER
C
C FUNCTIONAL DESCRIPTION:           STEREOGRAPHIC PROJECTION INTO X/Y
C                                        Spherical earth model.
C
C INPUT FILES/PARAMETERS:         plon(), plat() - input polyline arrays
C                                 nin            - number of input points
C
C GLOBAL VARIABLES:               clat,clon      - map center lat,lon
C                                 cclat,sclat    - cos,sin of center lat
C                                 wmrad          - earth radius, world units
C                                 xoffs, yoffs   - display offset, world units
C
C OUTPUT FILES/PARAMETERS:        x(),y()        - output polyline arrays
C                                 nout           - number of valid output points
C                                 invali         - flag for last input point
C
C SUBROUTINES CALLED:             none.
C
C CALLED BY:                      lltoxy, llplxy, blplgn, blplin
C
C LOCAL VARIABLES:                er             - arc from center to point
```

Jul 20 14:44 1989 carr mth.f Page 111

```
C
C RESTRICTIONS:                  None.  All input points are converted.
C
C ABNORMAL RETURN CONDITIONS:    Last points > 170 from center flagged invalid.
C                                Points very close to the antipode are nudged.
C LOCATION:
C
C PROGRAMMER:                    DATE OF LAST CHANGE     REASON FOR CHANGE
C     Tom Wescott   (NOSC)       Jan 87                  Initial entry.
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine PXSTER(plon,plat,nin,x,y,nout)
c
      common /center/ clat,clon,cclat,sclat
      logical invali,notlst
      common /invali/ invali
      common /proj/ itproj,wmrad,xoffs,yoffs,scalr,notlst
      real plat(*), plon(*), x(*), y(*)
      parameter (COSHZN = -0.984)
      parameter (ANTIPO = -.999999)
c
c
      if (notlst) then
c        Skip calculation of map constant.
      else
         notlst = .true.
         scalr = wmrad
      endif
c
      nout = 0
      do 100 i = 1, nin
c
         invali = .false.
         sinL1 = sin(plat(i))
         cosL1 = cos(plat(i))
         Dlo = plon(i)-clon
         sinDlo = sin(Dlo)
         cosDlo = cos(Dlo)
c
c        Calculate arc from map center to point (plon,plat).
         cosER = sclat*sinL1 + cclat*cosL1*cosDlo
         if (cosER .le. COSHZN)  invali = .true.
c
c        Insure that all points can be calculated.
         cosER = amax1(cosER,ANTIPO)
c
c        Calculate output point on plane of projection.
         const = 2.0/(1.0+cosER)
         rx = const*cosL1*sinDlo
         ry = const*(cclat*sinL1-sclat*cosL1*cosDlo)
c
c        Apply viewing transformation.
         nout = nout + 1
         x(nout) = rx*scalr + xoffs
         y(nout) = ry*scalr + yoffs
```

```
c
 100    continue
c
        return
        end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXUTMZ
C
C FUNCTIONAL DESCRIPTION:        UNIVERSAL TRANSVERSE MERCATOR INTO X/Y
C                                    Elliptical earth model.
C
C INPUT FILES/PARAMETERS:       plon(), plat() - input polyline arrays
C                               nin            - number of input points
C
C GLOBAL VARIABLES:             clat,clon      - map center lat,lon
C                               wmrad          - earth radius, world units
C                               xoffs, yoffs   - display offset, world units
C
C OUTPUT FILES/PARAMETERS:      x(),y()        - output polyline arrays
C                               nout           - number of valid output points
C                               invali         - flag for last input point
C                               ap,bp,cp,dp,ep - transformation constants
C
C SUBROUTINES CALLED:           None.
C
C CALLED BY:                     llplxy
C
C LOCAL VARIABLES:              aaxix         - major axis of spheriod, m
C                               baxis         - minor axis, m
C
C RESTRICTIONS:                 None.
C
C ABNORMAL RETURN CONDITIONS:   Invalid returned for pts. at new poles.
C
C REFERENCE:                    CAM Program Documentation   CIA 1986
C
C PROGRAMMER:                   DATE OF LAST CHANGE     REASON FOR CHANGE
C     Tom Wescott               Feb 88                  Original entry.
C
C-*-*-*-*-*-*-*-*-*-*-*-*-*-*-*-*-*-*-*-*-*-*-*-*-*-*-*-*-*-*-*-*-*-*-*|*-*-*-*-

      subroutine PXUTMZ(plon,plat,nin,x,y,nout)
c
      common /pie/ pie,tpie,pio2,pio4
      logical invali,notlst
      common /invali/ invali
      common /proj/ itproj,wmrad,xoffs,yoffs,scalr,notlst
      common /utmz/ ap,bp,cp,dp,ep,e2,ep2,aaxis,baxis,cmerid,zone
      common /center/clat,clon,cclat,sclat
      real plat(*), plon(*), x(*), y(*)
      parameter (HILAT=1.5709)
c
c
c------------------- INITIALIZATION SECTION------------------------
```

```
      if (notlst) then
c        Skip calculation of map constants.
      else
         notlst = .true.
c
c        Calculate UTM zone and its central meridian.
         zwidth = tpie/60.0
         zone = 1.0 + int((clon+pie)/zwidth)
         cmerid = zwidth*(zone-0.5) - pie
c
c        From Int'l Astronomical Union figure of the earth (1968)
         aaxis = 1.00111887
         baxis = 0.99776226
c
         ep2 = (aaxis**2.0-baxis**2.0)/(baxis**2.0)
         e2 = (aaxis**2.0-baxis**2.0)/(aaxis**2.0)
         an1 = (aaxis-baxis)/(aaxis+baxis)
         an2 = an1*an1
         an3 = an2*an1
         an4 = an3*an1
         an5 = an4*an1
c
         ap = aaxis*(1.0 - an1 + 5./4.*(an2-an3) + 81./64.*(an4-an5))
         bp = 3.0/2.0*aaxis*(an1 - an2 + 7./8.*(an3-an4) + 55./64.*an5)
         cp = 15./16.*aaxis*(an2 - an3 + 3./4.*(an4-an5))
         dp = 35./48.*aaxis*(an3 - an4 + 11./16.*an5)
         ep = 315./512.*aaxis*(an4 - an5)
         zkphi = .9996
c
         scalr = wmrad
      endif
c
c------------------ COMPUTATIONAL SECTION-----------------------
      nout = 0
      do 100 n = 1, nin
c
         invali = .false.
         delf = cmerid - plon(n)
         if (delf.gt.pie) delf = delf - sign(tpie,delf)
         absDel = abs(delf)
         ptlat = plat(n)
         absLat = abs(ptlat)
c
c        Exact position of poles is too hard to calculate by series.
         absLat = amin1(absLat,HILAT)
c
         if ((absLat.eq.0.0).and.(absDel.eq.pio2)) then
c           Point at a new pole is undefined.
            invali = .true.
         else if (absDel.gt.pio2*1.3) then
c           Problems exist near cmerid + 180.  Until they are resolved...
            invali = .true.
         else
            sinAl = sin(absLat)
            sinAl2 = sinAl*sinAl
            cosAl = cos(absLat)
```

```
            cosAl2 = cosAl*cosAl
            cosAl3 = cosAl*cosAl2
            cosAl4 = cosAl*cosAl3
            cosAl5 = cosAl*cosAl4
            tanAl2 = tan(absLat)**2.0
            tanAl4 = tanAl2*tanAl2
c
            s = zkphi*(ap*absLat-bp*sin(2.0*absLat)+cp*sin(4.*absLat)
     +          -dp*sin(6.*absLat)+ep*sin(8.*absLat))
c
            ve = aaxis/sqrt(1.0-e2*sinAl2)
c
            sr = ve/2.0*sinAl*cosAl*zkphi
c
            st = ve*sinAl*cosAl3*(5.0-tanAl2+9.0*
     +            ep2*cosAl2+4.0*ep2*ep2*cosAl4)*zkphi/24.0
c
            su = ve*cosAl*zkphi
c
            sv = ve/6.0*cosAl3*(1.0-tanAl2+ep2*cosAl2)*zkphi
c
            sa = absDel**6.0/720.0*ve*sinAl*cosAl5*(61.0-58.0*tanAl2
     +             +tanAl4+270.0*ep2*cosAl2-330.0*ep2*sinAl2)*zkphi
c
            sb = absDel**5.0/120.0*ve*cosAl5*(5.0-18.0*tanAl2+tanAl4
     +             +14.0*ep2*cosAl2-58.0*ep2*sinAl2)*zkphi
c
c
            rx = su*absDel + sv*absDel**3.0 + sb
            rx = -sign(rx,delf)
c
            ry = s + sr*absDel**2.0 + st*absDel**4.0 + sa
            ry = sign(ry,ptlat)
c
c           Apply viewing transformation.
            nout = nout + 1
            x(nout) = rx*scalr + xoffs
            y(nout) = ry*scalr + yoffs
         endif
c
 100  continue
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXVDGN
C
C FUNCTIONAL DESCRIPTION:          VAN DER GRINTEN I PROJECTION INTO X/Y
C                                     spherical earth model.
C
C INPUT FILES/PARAMETERS:       plon(), plat() - input polyline arrays
C                               nin            - number of input points
C
C GLOBAL VARIABLES:             clat,clon      - map center lat,lon
```

```
C                               cclat,sclat     - cos,sin of center lat
C                               pio2            - multiple of pi
C                               wmrad           - earth radius, world units
C                               xoffs, yoffs    - display offset, world units
C
C OUTPUT FILES/PARAMETERS:      x(),y()         - output polyline arrays
C                               nout            - number of valid output points
C                               invali          - flag for last input point
C
C SUBROUTINES CALLED:           None.
C
C CALLED BY:                    lltoxy, llplxy
C
C LOCAL VARIABLES:              None.
C
C RESTRICTIONS:                 None.
C
C ABNORMAL RETURN CONDITIONS:  Invalid flag set for pts. at poles.
C
C REFERENCE:                    NOAA/USGS map projection package   version 1.0.2
C
C PROGRAMMER:                   DATE OF LAST CHANGE      REASON FOR CHANGE
C     Tom Wescott  (NOSC)       Jun 89                   Original entry
C
C-*-*-*-*-*-*-*-*-*-*-*-*-*-*-*-*-*-*-*-*-*-*-*-*-*-*-*-*-*-*-*-*-*-*-*-*-*|*-*-*-*-
c       not in 3.0, not yet used in 3.1
CTESTING        subroutine pxsinu(plon,plat,nin,x,y,nout)
        subroutine pxvdgn(plon,plat,nin,x,y,nout)
c
        common /center/ clat,clon,cclat,sclat
        common /pie/ pie,tpie,pio2,pio4
        logical invali,notlst
        common /invali/ invali
        common /proj/ itproj,wmrad,xoffs,yoffs,scalr,notlst
        real plat(*), plon(*), x(*), y(*)
        real lat,lon,m,m2
c
        parameter(SAFETY = 1.0E-5, EQTORL = 1.0E-2)
c
        if (notlst) then
c          Skip calculation of map constant.
        else
           notlst = .true.
           scalr = wmrad
        endif
c
        nout = 0
        do 100 i = 1, nin
c
           invali = .false.
           lat = plat(i)
           lon = plon(i) - clon
           if (abs(lon).gt.pie) lon = lon - sign(tpie,lon)

           if (abs(plat(i)).gt.pio2) then
              invali = .true.
```

```
           else
              theta = asin(abs(lat/pio2))
              if (abs(plat(i)).lt.EQTORL) then
c                Near equatorial case, use rectangular approximation.
                 rx =  lon
                 ry =  lat
              else if ((abs(lon).lt.SAFETY).or.
     +           ((pio2-abs(lat)).lt.SAFETY)) then
c                Central meridian case, use Tom's guess approximation.
                 rx = lon * (cos(lat))**.33
                 ry = pie  * sign(tan(0.5*theta),lat)
              else
c                Ordinary case.
                 al = .5 * abs(pie/lon - lon/pie)
                 a2 = al * al
                 sinTHT = sin(theta)
                 cosTHT = cos(theta)
                 g = cosTHT/(sinTHT + cosTHT - 1.0)
                 g2 = g * g
                 m = g * (2.0/sinTHT - 1)
                 m2 = m * m
                 square = abs(a2*(g-m2)**2 - (m2+a2)*(g2-m2))
                 con = pie * (al * (g-m2) + sqrt(square)) / (m2+a2)
                 rx = sign(con,lon)
                 con = abs(con/pie)
                 square = abs(1.0 - con*con - 2.0*al*con)
                 ry = sign(pie*sqrt(square),lat)
              endif
c
c             Apply viewing transformation.
              nout = nout + 1
              x(nout) = rx*scalr - xoffs
              y(nout) = ry*scalr - yoffs
           endif
c
 100    continue
c
        return
        end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    RNGRIN
C
C FUNCTIONAL DESCRIPTION:       Draws range rings/radials about selected point.
C
C INPUT FILES/PARAMETERS:       rrlon,rrlat - center lon,lat
C                               ixrnm       - range (radius) in nm
C                               nrings      - # rings
C                               nlines      - # radial lines
C
C GLOBAL VARIABLES:             None.
C
C OUTPUT FILES/PARAMETERS:      Graphic segment.
C
C SUBROUTINES CALLED:
```

Jul 20 14:44 1989 carr mth.f Page 117

```
C
C CALLED BY:                    ranger
C
C LOCAL VARIABLES:
C
C RESTRICTIONS:                 Currently does not redraw like other overlays
C                               as ring data are not saved in parameter file.
C
C PROGRAMMER:                   DATE OF LAST CHANGE      REASON FOR CHANGE
C     Tom Wescott (NOSC)        Jul 88                   Original entry.
C     L. McCleary (NOSC)        Mar 89                   Seperate routine
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine  rngrin (rrlon,rrlat,ixrnm,nrings,nlines)

      logical first
      common /pie/ pie,tpie,pio2,pio4
      common /viewp/ xrad,yrad,ixnp,iynp,xc,yc

      parameter (MAXPTS = 361)
      real plon(MAXPTS),plat(MAXPTS)

      data rrincr/.01745329/

c     User input is in nm, convert to radians.
      rrincr = ixrnm*(1./60.)*(pie/180.)

c     Draw the range rings.
      rngmax = amin1(pie,nrings*rrincr)
      lastrr = rngmax/rrincr + 0.5
      do 500 irng = 1, lastrr
         rngrad = irng * rrincr
c
c        Test ring radius a few places and calculate central
c        angle that keeps cord to arc distance below map resolution.
         radius = 0.0
         do 200 itest = 0, 3
            tstaz = pio4*(itest) + .001
            call da2ll(rrlat,rrlon,rngrad,tstaz,rtlat,rtlon)
            call llplxy(rtlon,rtlat,1,rtx,rty,nout)
            tstrad = sqrt((rrx-rtx)**2.+(rry-rty)**2.)
            radius = amax1(tstrad,radius)
 200     continue
c
         resolu = .001*xrad
         arg = 1.0 - resolu/radius
         if (abs(arg).gt.1.0) arg = sign(1.0,arg)
         deltaz = acos(arg)
         deltaz = amax1(deltaz,tpie/360.)
         deltaz = amin1(deltaz,tpie/8.)
c
         npts = 1.0 + tpie/deltaz
         azincr = tpie/(npts-1)

         ipt = 1
```

```
         first = .true.
         do 400 i = 1, npts
            az = (i + 0.6) * azincr
            call da2ll(rrlat,rrlon,rngrad,az,plat(ipt),plon(ipt))
            dlo = abs(plon(ipt)-prevlo)
            if((dlo.gt.pie*.1).and.(dlo.lt.pie*1.9).and.
     +         (.not.first))then
c              Crossed near a pole where with several projections, higher point
c              density is reqd.  To avoid artifacts, process ring in sections.
               call blplin(plon,plat,ipt-1)
               plat(1) = plat(ipt)
               plon(1) = plon(ipt)
               ipt = 1
               first = .true.
            else
               first = .false.
            endif
            prevlo = plon(ipt)
            ipt = ipt + 1
            if (ipt.gt.maxpts) go to 401
 400     continue
 401     continue
         call blplin(plon,plat,ipt-1)
 500  continue
c
c     Draw a few polylines along lines of bearing.
      dincr = pie/90.0
      dincr = amin1(dincr,0.5*rrincr)
      rngmax = (nrings + 1) * rrincr - dincr
      rngmax = amin1(rngmax,pie)
      do 700 line = 1, nlines
         az = line * tpie/nlines
         npts = rngmax/dincr + 0.5
         ipt = 1
         first = .true.
         do 600 i = 1, npts
            dist = i * dincr
            call da2ll(rrlat,rrlon,dist,az,plat(ipt),plon(ipt))
            dlo = abs(plon(ipt)-prevlo)
            if((dlo.gt.pie*.1).and.(dlo.lt.pie*1.9).and.
     +         (.not.first))then
c              Crossed near a pole.  Process line of bearing in sections.
               call blplin(plon,plat,ipt-1)
               plat(1) = plat(ipt)
               plon(1) = plon(ipt)
               ipt = 1
               first = .true.
            else
               first = .false.
            endif
            prevlo = plon(ipt)
            ipt = ipt + 1
            if (ipt.gt.maxpts) go to 601
 600     continue
 601     continue
         call blplin(plon,plat,ipt-1)
```

```
 700  continue

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  SPGCVX
C
C FUNCTIONAL DESCRIPTION:     Test for convex property in spherical polygons.
C
C INPUT FILES/PARAMETERS:     plo, pla  - Vertex coordinate arrays, lon,lat.
C                             plen      - Number of verticies.
C
C OUTPUT FILES/PARAMETERS:    convex    - Returned true if polygon is convex.
C
C SUBROUTINES CALLED:         ll2da.
C
C RESTRICTIONS:               Polygons must span less than one hemisphere.
C
C PROGRAMMER:                 DATE OF LAST CHANGE      REASON FOR CHANGE
C     Tom Wescott (NOSC)      Feb 89                   Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
c       not in 3.0, not yet used in 3.1
      subroutine spgcvx(plo,pla,plen,convex)
C
      common /pie/ pie,tpie,pio2,pio4
      integer plen
      real plo(plen),pla(plen)
      logical convex
C
C      pie = 2.0*acos(0.0)                                         !_TESTING
C      tpie = 2.0*pie                                              !_TESTING
      convex = .true.
      if (plen.le.3) return
      hemi = 0.0
C
      do 200 n = 1, plen
         i = n+1
         if (i.gt.plen) i = 1
C
C        Define hemispheres by great circle from vertex n to vertex i.
         call ll2da(pla(n),plo(n),pla(i),plo(i),dist,az1,rng,bear)
         if (dist.gt.0.0) then
C
            do 100 jj = i+1, i+plen-1
               j = jj
               if (j.gt.plen) j = j-plen
C
               call ll2da(pla(n),plo(n),pla(j),plo(j),dist,az2,rng,bear)
               if (dist.ne.0.0) then
                  azrel = az2 - az1
                  if (abs(azrel).gt.pie) azrel = azrel-sign(tpie,azrel)
                  if (azrel.ne.0.0) then
C
```

Jul 20 14:44 1989 carr 'mth.f Page 120

```
                     if (hemi.eq.0.0) then
C                       Init hemisphere by first point.
                        hemi = sign(1.0,azrel)
                     else
C                       Look for any point in opposite hemisphere.
                        hhemi = sign(1.0,azrel)
                        if (hhemi.ne.hemi) then
                           convex = .false.
                           RETURN
                        endif
                     endif
C
                  endif
               endif
 100        continue
         endif
 200  continue
C
      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   SPGINT
C
C FUNCTIONAL DESCRIPTION:      Flags the intersection of two spherical polygons
C                              by looking for intersection between great circle
C                              segments of one polygon and those of the other.
C                              If none found, it checks for containment.
C
C INPUT FILES/PARAMETERS:      xlo(),yla()  - Polygon #1. (lon,lat), radians.
C                              ulo(),vla()  - Polygon #2.     "        "
C                              nvrt1,nvrt2  - Number of verticies in polygons.
C
C OUTPUT FILES/PARAMETERS:     isect        - .true. if intersection exists.
C
C SUBROUTINES CALLED:          ll2da, spgtst
C
C LOCAL VARIABLES:             H1,H2..      - Sign of Hn identifies half sphere
C                                             containing pt. n.    Half sphere is
C                                             defined (+/-) as (L/R) of a directed
C                                             great circle segment.
C RESTRICTIONS:                None.
C
C PROGRAMMER:                  DATE OF LAST CHANGE     REASON FOR CHANGE
C     Tom Wescott (NOSC)       Feb 89                  Original code.
C
C-*-*-*-*-*-*-*-*-*-*-*-*-*-*-*-*-*-*-*-*-*-*-*-*-*-*-*-*-*-*-*-*-*-*-*-*-*|*-*-*-*-
c       not in 3.0, not yet used in 3.1
      subroutine spgint(xlo,yla,nvrt1,ulo,vla,nvrt2,isect)
C
      real xlo(nvrt1),yla(nvrt1), ulo(nvrt2),vla(nvrt2)
      logical isect,inside
C
      pie = 2.0*acos(0.0)
      tpie = 2.0*pie
```

```
      isect = .true.
      H1 = 0.
c
      do 500 i = 1, nvrt1
         inxt = i + 1
         if (inxt.gt.nvrt1) inxt = 1
c
c        Azimuth (az0) of line segment i to inxt to defines half spheres.
         call ll2da(yla(i),xlo(i),yla(inxt),xlo(inxt),dist,az0,rng,bear)
c
c        Avoid processing of coincident sequential verticies.
         if (dist.le.0.0) go to 500
c
         do 400 j = 0, nvrt2
            jnxt = j + 1
            if (jnxt.gt.nvrt2) jnxt = 1
c
c           Find half sphere of the point jnxt of polygon 2.
            call ll2da(yla(i),xlo(i),vla(jnxt),ulo(jnxt),dst,azjnxt,r,b)
c
            if (dist.le.0.0) RETURN
            deltaz = azjnxt-az0
            if (abs(deltaz).gt.pie) deltaz = deltaz-sign(tpie,deltaz)
            H2 = sign(1.0,deltaz)
c
c           Did j to jnxt segment of polygon2 cross between half spheres?
            if ((H1.ne.H2).and.(jnxt.gt.1)) then
c
c              Intersection will be proven if segment of polygon 1 crosses
c              between half spheres defined by the segment of polygon 2.
               call ll2da(vla(j),ulo(j),vla(jnxt),ulo(jnxt),d,az20,r,b)
c
               call ll2da(vla(j),ulo(j),yla(i),xlo(i),d,az21,r,b)
               deltaz = az21-az20
               if (abs(deltaz).gt.pie) deltaz = deltaz-sign(tpie,deltaz)
               H21 = sign(1.0,deltaz)
c
               call ll2da(vla(j),ulo(j),yla(inxt),xlo(inxt),d,az22,r,b)
               deltaz = az22-az20
               if (abs(deltaz).gt.pie) deltaz = deltaz-sign(tpie,deltaz)
               H22 = sign(1.0,deltaz)

               if (H21.ne.H22) RETURN
            endif
c
            H1 = H2
 400     continue
c
 500  continue
c
c     If we haven't returned by now the polygon segments don't intersect.
c     Any polygon point inside the alternate polygon proves containment.
c
      call spgtst(xlo,yla,nvrt1,ulo(1),vla(1),inside,area)
      if (inside) RETURN
c
```

Jul 20 14:44 1989 carr mth.f Page 122

```
      call spgtst(ulo,vla,nvrt2,xlo(1),yla(1),inside,area)
      if (inside) RETURN
C
      isect = .false.
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                 SPGRAD
C
C FUNCTIONAL DESCRIPTION:    Uses iteration to find the radius and center point
C                            for minumum bounding circle of a spherical polygon.
C
C INPUT FILES/PARAMETERS:    plat,plon  - Polygon vertex arrays, radians.
C                            nvrts      - # of verticies
C
C OUTPUT FILES/PARAMETERS:   radius     - Containment arc, radians
C                            cla,clo    - lat,lon of center, radians
C
C SUBROUTINES CALLED:        ll2da, da2ll
C
C LOCAL VARIABLES:           CONVRG     - Parameter determining the speed and
C                                         accuracy of convergence.  Use .7 to .99
C RESTRICTIONS:              None.
C
C PROGRAMMER:                DATE OF LAST CHANGE     REASON FOR CHANGE
C     Tom Wescott (NOSC)     Feb 89                  Original code.
C
C-*-*-*-*-*-*-*-*-*-*-*-*-*-*-*-*-*-*-*-*-*-*-*-*-*-*-*-*-*-*-*-*-*-*-*-*-*|*-*-*-*-
c        not in 3.0, not yet used in 3.1
      subroutine spgrad(plon,plat,nvrts,radius,clo,cla)
C
      parameter (MAXIT = 1000)
      parameter (TOLER = .0001)
      parameter (CONVRG = .9)
      real plon(nvrts),plat(nvrts)
C
      clo = plon(1)
      cla = plat(1)
      do 300 iter = 1, MAXIT
         radius = 0.0
C        Find distance and azimuth to vertex farthest from center pt. guess.
         do 100 i = 1, nvrts
            call ll2da(cla,clo,plat(i),plon(i),dst,az,range,bering)
            if (dst.gt.radius) then
               radius = dst
               azim = az
            endif
 100     continue
C
C        Apply a correction in direction azim.
         prevlo = clo
         prevla = cla
         if (iter.eq.1) rjump = radius
         rjump = CONVRG*rjump
```

```
         call da2ll(prevla,prevlo,rjump,azim,cla,clo)
c
         if (rjump.lt.TOLER) go to 900
 300  continue
C
 900  continue
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  SPGTST
C
C FUNCTIONAL DESCRIPTION:     Spherical polygon utility.
C                             1)  Tests for point being inside the smaller of the
C                                 two regions defined by a spherical polygon.
C                             2)  Computes area of the smaller region.
C                             3)  Sign of area identifies direction of traversal
C                                 (+cw/-ccw) about the smaller region.
C
C INPUT FILES/PARAMETERS:     vlo, vla  - Vertex coordinate arrays, lon,lat.
C                             n         - Number of verticies.
C                             plo,pla   - Point to be tested.
C
C GLOBAL VARIABLES:           None.
C
C OUTPUT FILES/PARAMETERS:    inside    - Returned true if point is inside.
C                                         (Internally reflexed areas are inside).
C                                         (border points inside smaller region).
C                             area      - Polygon area on unit sphere, radians.
C
C SUBROUTINES CALLED:         ll2da.
C
C RESTRICTIONS:               None.
C
C PROGRAMMER:                 DATE OF LAST CHANGE      REASON FOR CHANGE
C     Tom Wescott (NOSC)      Feb 89                   Original entry.
C
C-*-*-*-*-*-*-*-*-*-*-*-*-*-*-*-*-*-*-*-*-*-*-*-*-*-*-*-*-*-*-*-*-*-*-*-*|*-*-*-*-
c       not in 3.0
      subroutine spgtst(vlo,vla,n,plo,pla,inside,area)
C
      logical inside
      parameter (COINCI = 1.0E-5)
      dimension vlo(n),vla(n)

CD     write(*,*) 'SPGTST... test point lon,lat = ',plo,pla
CD     write(*,'(5(1X,F6.3))') (vlo(j),j=1,n)
CD     write(*,'(5(1X,F6.3))') (vla(j),j=1,n)
CD     write(*,*)
C
      pie = 2.0*acos(0.0)
      tpie = 2.0*pie
      totang = 0.0
      totare = 0.0
```

```
C
      do 200 lst = 0, n
         i = lst + 1
         if (i.gt.n) i = 1
C
C        Get azimuth and its reciprocal from test point to i-th vertex.
         call ll2da(pla,plo,vla(i),vlo(i),dist,azT2V,range,bering)
         call ll2da(vla(i),vlo(i),pla,plo,dist,azV2T,range,bering)
C        When points are coincident, must flip defined azimuth for reciprocal !
         if (dist.le.COINCI) azV2T = azT2V - sign(pie,azT2V)
C
         if (lst.gt.0) then
C           Totalize angle at test point angle between last and i-th verticies.
            angleT = azT2V - azT2L
            if (abs(angleT).gt.pie) angleT = angleT - sign(tpie,angleT)
            totang = totang + angleT
C
C           Get azimuth and its reciprocal from i-th vertex to last vertex.
            call ll2da(vla(i),vlo(i),vla(lst),vlo(lst),dist,azV2L,rng,b)
            call ll2da(vla(lst),vlo(lst),vla(i),vlo(i),dist,azL2V,rng,b)
            if (dist.le.COINCI) azL2V = azV2L - sign(pie,azV2L)
C
C           Calculate area of triangle TVL via its spherical excess.  Totalize.
            angleV = azV2L - azV2T
            if (abs(angleV).gt.pie) angleV = angleV - sign(tpie,angleV)
            angleL = azL2V - azL2T
            if (abs(angleL).gt.pie) angleL = angleL - sign(tpie,angleL)
            area = abs(angleT) + abs(angleV) + abs(angleL) - pie
            totare = totare + sign(area,angleT)
C
CD             WRITE(*,*)'AR,AN,TAR,TAN =',AREA,ANGLET,TOTARE,TOTANG
         endif
C
         azT2L = azT2V
         azL2T = azV2T
 200  continue
C
      area = totare
      inside = .true.
      if (abs(totang).lt.pie) inside = .false.
C
C     Reverse the results for polygons covering more than a half sphere.
      if (abs(totare).gt.tpie) then
         inside = .not.(inside)
         area = area - sign(4.0*pie,area)
      endif
C
CD     WRITE(*,*)'inside = ',inside,'  smaller area = ',area
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    XPAZEA
C
C FUNCTIONAL DESCRIPTION:       (X,Y) TO (LON,LAT) FOR AZIMUTHAL EQUAL AREA
```

Jul 20 14:44 1989 carr mth.f Page 125

```
C                                  Spherical earth model.
C
C INPUT FILES/PARAMETERS:       x,y           - map coordinates.
C
C GLOBAL VARIABLES :            clon, clat    - map center.
C                               scalr         - Map scale factor.
C                               xoffs, yoffs  - display offset, world units.
C
C OUTPUT FILES/PARAMETERS:      plat, plon    - geographic coordinates.
C                               invali        - Set true when pt. is off the
C                                               earth or at the antipode.
C
C SUBROUTINES CALLED:           da2ll
C
C CALLED BY:                    xytoll
C
C LOCAL VARIABLES:              az     - Azimuth of pt. x,y from map center.
C                               er     - Arc distance from map center to x,y.
C
C RESTRICTIONS:                 None.
C
C ABNORMAL RETURN CONDITIONS:   None.
C
C PROGRAMMER:                   DATE OF LAST CHANGE       REASON FOR CHANGE
C     Tom Wescott (NOSC)        Jan 87                    Initial entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
      subroutine xpazea(x,y,plon,plat)
c
      common /center/ clat,clon,cclat,sclat
      common /pie/ pie,tpie,poi2,pio4
      logical not1st,invali
      common /proj/ itproj,wmrad,xoffs,yoffs,scalr,not1st
      common /invali/ invali
c
c     Invert the viewing transformation.
      dx = (x-xoffs)/scalr
      dy = (y-yoffs)/scalr
c
c     Compute azimuth from map center.
      if ((dx.ne.0.0).or.(dy.ne.0.0)) az = atan2(dx,dy)
c
c     Compute arc distance from map center.
      ro2 = (sqrt(dx*dx+dy*dy))/2.0
      invali = .false.
      if (ro2.ge.1.0) then
c        Point is off the map.
         invali = .true.
      else
         er = 2.0*asin(ro2)
c        Convert to lat, lon
         call da2ll(clat,clon,er,az,plat,plon)
      endif
c
      return
      end
```

Jul 20 14:44 1989 carr mth.f Page 126

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    XPAZED
C
C FUNCTIONAL DESCRIPTION:       (X,Y) TO (LON,LAT) FOR AZIMUTHAL EQUIDISTANT
C                                   Spherical earth model.
C
C INPUT FILES/PARAMETERS:       x,y          - map coordinates.
C
C GLOBAL VARIABLES :            clon, clat   - map center.
C                               scalr        - Map scale factor.
C                               xoffs, yoffs - display offset, world units.
C
C OUTPUT FILES/PARAMETERS:      plat, plon   - geographic coordinates.
C                               invali       - Set true when pt. is off the
C                                              earth or at the antipode.
C
C SUBROUTINES CALLED:           da2ll
C
C CALLED BY:                    xytoll
C
C LOCAL VARIABLES:              az     - Azimuth of pt. x,y from map center.
C                               er     - Arc distance from map center to x,y.
C
C RESTRICTIONS:                 None.
C
C ABNORMAL RETURN CONDITIONS:   None.
C
C PROGRAMMER:                   DATE OF LAST CHANGE        REASON FOR CHANGE
C     Tom Wescott (NOSC)        Jan 87                     Initial entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
        subroutine xpazed(x,y,plon,plat)
c
        common /center/ clat,clon,cclat,sclat
        common /pie/ pie,tpie,poi2,pio4
        logical notlst,invali
        common /proj/ itproj,wmrad,xoffs,yoffs,scalr,notlst
        common /invali/ invali
c
c       Invert the viewing transformation.
        dx = (x-xoffs)/scalr
        dy = (y-yoffs)/scalr
c
c       Compute azimuth from map center.
        if ((dx.ne.0.0).or.(dy.ne.0.0)) az = atan2(dx,dy)
c
c       Compute arc distance from map center.
        er = sqrt(dx*dx+dy*dy)
c
        invali = .false.
        if (er .ge. pie) then
c          Point is off the map.
           invali = .true.
        else
```

Jul 20 14:44 1989 carn mth.f Page 127

```
c          Convert to lat, lon
           call da2ll(clat,clon,er,az,plat,plon)
        endif
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                 xpgenr
C
C FUNCTIONAL DESCRIPTION:    GENERIC CONVERSION OF (X,Y) TO (LON,LAT)
C                            Solves a 2x2 system of nonlinear mapping
C                            equations to convert xy to ll on any well
C                            behaved projection.
C
C INPUT FILES/PARAMETERS:    xmap, ymap      - point on a map
C
C GLOBAL VARIABLES:          clat,clon       - map center lat,lon
C
C OUTPUT FILES/PARAMETERS:   plon(), plat() - geographic location of input point
C                            invali          - flag for bad input point
C
C SUBROUTINES CALLED:        nrsyst
C
C CALLED BY:                 xytoll
C
C LOCAL VARIABLES:           x(n)            - array of output coords.
C                            f(n)            - array of function values.
C                            XTOL            - iteration tolerance for ll
C                            FTOL            - tolerance for map position
C                            DELTA           - small dist for partial calc.
C                            MAXIT           - max # of iterations
C                            N               - number of eqtns in system
C                            i               - solution status & debug switch
C
C RESTRICTIONS:              Method will fail to locate a valid point if
C                            iteration wanders out of the range of the
C                            lltoxy functions (possible with gnomonic).
C
C
C ABNORMAL RETURN CONDITIONS:  invali = .true. if the method fails to converge.
C                              This happens when x,y is off the map.
C
C LOCATION:
C
C PROGRAMMER:                DATE OF LAST CHANGE     REASON FOR CHANGE
C
C     Tom Wescott  (NOSC)    Aug 87                  Original entry
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine xpgenr(xmap,ymap,plon,plat)
c
      real x(2),f(2),delta,xtol,ftol
      integer maxit,n,i
```

```
      external nrfcn
      logical invali
      common /invali/ invali
      common /xymap/ projx,projy,xytol,ftol,delta
      common /center/ clat,clon,cclat,sclat
      common /pie/ pie,tpie,pio2,pio4
      real xmin(10),xmax(10),chgmax(10)
      common /domain/ xmin, xmax, chgmax
c
c     Set iteration tolerance for system solution, function values, and
c     the perturbation distance used to estimate partial derivatives.
      MAXIT = 30
      N = 2
      XTOL = .00005
      FTOL = .0001
      DELTA = 0.003
c
c     Set domain.  Allow Lon iteration to cross dateline or conic break.
      xmin(1) = clon - tpie
      xmax(1) = clon + tpie
c     Dont allow Lat to iterate quite all the way to a pole.
      xmin(2) = -pio2 + 0.4*FTOL
      xmax(2) = +pio2 - 0.4*FTOL
c     Restrict maximum change per iteration to avoid wild jumps.
      chgmax(1) = 0.025 * (xmax(1)-xmin(1))
      chgmax(2) = 0.100 * (xmax(2)-xmin(2))
c
c     Set status var for debug.  (i = 0 prints progress of iteration ).
      i = 10
c
 100  continue
      projx = xmap
      projy = ymap
      xytol = xtol
      invali = .false.
c
c     Set initial guess at map center.
      x(1) = clon
      x(2) = clat
      if (x(2) .lt. xmin(2)) x(2) = xmin(2)
      if (x(2) .gt. xmax(2)) x(2) = xmax(2)
c
c     Solve the system of nonlinear mapping equations.
      call nrsyst(nrfcn,N,MAXIT,x,f,DELTA,XTOL,FTOL,i)
c
      if (i .lt. 0) then
         invali = .true.
cc          write(*,*)'xpgenr... Solution invalid,  nrsyst status = ',i
      else
         plon = x(1)
         plat = x(2)
c        Insure solution coordinates are in the normal lon,lat range.
101      if((abs(plon) .gt. pie) .or. (abs(plat) .gt. pio2)) then
            if(abs(plon) .gt. pie) plon = plon - sign(tpie,plon)
            if(abs(plat) .gt. pio2) then
               plat = sign(pie,plat) - plat
```

```
            plon = plon - sign(pie,plon)
          endif
          go to 101
        endif
      endif
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     XPGNOM
C
C FUNCTIONAL DESCRIPTION:        GNOMONIC PROJ.  (X,Y) TO (LON,LAT)
C                                      Spherical earth model
C
C INPUT FILES/PARAMETERS:        x,y             - map coordinates
C
C GLOBAL VARIABLES :             clat, clon      - map center
C                                wmrad           - earth radius, world units
C                                xoffs, yoffs    - display offset, world units
C
C OUTPUT FILES/PARAMETERS:       lat, lon        - geographic coordinates
C
C SUBROUTINES CALLED:            da2ll
C
C CALLED BY:                     bl2ll,xytoll
C
C LOCAL VARIABLES:               None.
C
C RESTRICTIONS:                  None.  All points converted.
C
C PROGRAMMER:                DATE OF LAST CHANGE       REASON FOR CHANGE
C     Tom Wescott (NOSC)     Jan 87                    Initial entry.
C
C-*-*-*-*-*-*-*-*-*-*-*-*-*-*-*-*-*-*-*-*-*-*-*-*-*-*-*-*-*-*-*-*-*-*-*-*|*-*-*-*-
c
        subroutine xpgnom(x,y,plon,plat)
c
        common /center/ clat,clon,cclat,sclat
        logical notlst
        common /proj/ itproj,wmrad,xoffs,yoffs,scalr,notlst
c
c       Invert the viewing transformation.
        dx = (x-xoffs)/scalr
        dy = (y-yoffs)/scalr
c
c       Compute azimuth from map center.
        if ((dx.ne.0.0).or.(dy.ne.0.0))  az = atan2(dx,dy)
c
c       Compute arc distance for gnomonic projection.
        r = sqrt(dx*dx+dy*dy)
        er = atan(r)
c
c       Convert to lat,lon.
        call da2ll(clat,clon,er,az,plat,plon)
```

Jul 20 14:44 1989 carr mth.f Page 130

```
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     XPSTER
C
C FUNCTIONAL DESCRIPTION:        STEREOGRAPHIC PROJ.  (X,Y) TO (LON,LAT)
C                                       Spherical earth model
C
C INPUT FILES/PARAMETERS:        x,y             - map coordinates
C
C GLOBAL VARIABLES :             clat, clon      - map center
C                                wmrad           - earth radius, world units
C                                xoffs, yoffs    - display offset, world units
C
C OUTPUT FILES/PARAMETERS:       lat, lon        - geographic coordinates
C
C SUBROUTINES CALLED:            da2ll
C
C CALLED BY:                     bl2ll,xytoll
C
C LOCAL VARIABLES:               None.
C
C RESTRICTIONS:                  None.  All points are converted.
C
C ABNORMAL RETURN CONDITIONS:    None.
C
C PROGRAMMER:                DATE OF LAST CHANGE        REASON FOR CHANGE
C     Tom Wescott (NOSC)     Jan 87                     Initial entry.
C
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine XPSTER(x,y,plon,plat)
c
      common /center/ clat,clon,cclat,sclat
      logical notlst
      common /proj/ itproj,wmrad,xoffs,yoffs,scalr,notlst
c
c     Invert the viewing transformation.
      dx = (x-xoffs)/scalr
      dy = (y-yoffs)/scalr
c
c     Compute azimuth from map center.
      if ((dx.ne.0.0).or.(dy.ne.0.0)) az = atan2(dx,dy)
c
c     Compute arc distance for stereographic projection.
      r = sqrt(dx*dx+dy*dy)
      er = 2.0*atan(r/2.0)
c
c     Convert to lat,lon.
      call da2ll(clat,clon,er,az,plat,plon)
c
      return
      end
```

Jul 20 14:44 1989 car: mth.f Page 131

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    XYTOLL
C
C FUNCTIONAL DESCRIPTION:       Convert screen location to geographic coords.
C
C INPUT FILES/PARAMETERS:       (x,y)      - Display coordinates.
C
C GLOBAL VARIABLES:             itproj     - Projection ID#.
C
C OUTPUT FILES/PARAMETERS:      (lon,lat)  - Geographic coordinates.
C                               invali     - Flag for bad input.
C
C SUBROUTINES CALLED:           xp????     - Inverse mapping routines.
C
C CALLED BY:                    The multitudes.
C
C LOCAL VARIABLES:              None.
C
C RESTRICTIONS:                 None.
C
C ABNORMAL RETURN CONDITIONS:   Invalid set if input point is off the map.
C
C PROGRAMMER:                   DATE OF LAST CHANGE     REASON FOR CHANGE
C     DAVE NATION                                       ORIGINAL CODE.
C     Tom Wescott   (NOSC)      10/87                   Add generic capability.
C                               OCT 88
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine XYTOLL(x,y,plat,plon)
c
      common /pie/ pie,tpie,pio2,pio4
      logical invali,not1st
      common /invali/ invali
      common /proj/ itproj,wmrad,xoffs,yoffs,scalr,not1st
c
c
      invali = .false.
*-----------------------------------------------------------------------|--+
* Itproj:  1  2  3  4  5  6  7  8  9 10 11 12 13 14 15 16 17 18 19 20 21  |
*--------------------------------------------------------------------------+
*          g  o  o  o  p  e  m  l  a  a  a  k  m  o  p  p  u  s  s        |
*          n  r  r  r  e  q  e  a  l  z  z  a  i  b  o  o  t  i  t        |
*          o  e  p  t  r  r  r  m  b  e  e  v  l  l  s  l  m  n  e        |
*          m  q  o  h  s  e  c  c  r  a  d  r  l  m  t  y  z  u  r        |
*--------------------------------------------------------------------------+
      goto(1,99,99,99,99,99,99,99,99,10,11,99,99,99,99,99,99,99,19
     +    )itproj
c
c            Generic iterative method works for all well behaved projections.
 99          call xpgenr(x,y,plon,plat)
             go to 900
c
c            Proj. #1  Gnomonic
```

Jul 20 14:32 1989 cars .f Page 1

```
C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     SAVARC
C
C FUNCTIONAL DESCRIPTION:        .
C
C CALLED BY:                     APARCS
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine savarc(xsave1,ysave1,xsave2,ysave2,xsave3,ysave3,
     +          arccnt,ifl)

c       This routine writes out the points needed to redraw arcs.
c         The three points along the arc that the user input are
c         written to the file, along with the number of arcs
c         that are being saved.
c         The opcode for the arcs is written in position 1
c         of the first line written out.
c         This routine is used by both the create and the conversion
c         routines of the Icon Editor.  When saving a newly-created
c         icon, the .icon file is written to.  When saving a
c         converted icon, the .conv file is written to.  This
c         is controlled by the ifl variable which is the logical
c         unit number of the file to be written to.
c     VARIABLES:
c         xsaveX/ysaveX- arrays holding the three points of each arc
c         fullfl- flag set when all positions of the record being
c           built for output have been filled
c         iarray- holds elements to be written
c         arccnt- number of arcs to be saved
c         maxlen- maximum number of positions allowed in record
c           (in this case, an 80-position record will hold 26
c            integers in I3 format)
c         icount- counter used to load arrays
c         ifl- logical unit number of the file to be accessed
c   PROGRAMMER:  Nancy Detrich, A215, March, 1984
C------  MODIFIED BY A692 FOR COMPLETION

        real xsave1(*),ysave1(*),xsave2(*)
        real ysave2(*),xsave3(*),ysave3(*)
        logical fullfl
        integer iarray(26),arccnt,ifl,maxlen,icount
        data maxlen/26/

c       only process if there are arcs to be saved
        if (arccnt .gt. 0 ) then
c         put op code for arcs in position 1
          iarray(1) = 8
c         number of arcs saved in position 2
          iarray(2) = arccnt
c         set counter ahead to start saving points
          icount = 3
          do 100 i = 1,arccnt
            fullfl = .false.
```

Jul 20 14:32 1989 cars .f Page 2

```
c           load the points of the each arc
            iarray(icount)   = INT(xsave1(i))
            iarray(icount+1) = INT(ysave1(i))
            iarray(icount+2) = INT(xsave2(i))
            iarray(icount+3) = INT(ysave2(i))
            iarray(icount+4) = INT(xsave3(i))
            iarray(icount+5) = INT(ysave3(i))
            icount = icount + 6
c           a record is full if the arc count is 4 or 8, so write
c                    out record and set full flag
            if (i .eq. 4 .or. i .eq.8) then
              call writit(ifl,iarray,icount-1,ierror)
              fullfl = .true.
              icount = 1
            endif
 100      continue

c         write out (last) record that is not full
          if (.not.fullfl) then
            call writit(ifl,iarray,icount-1,ierror)
          endif
        endif
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     SAVCIR
C
C FUNCTIONAL DESCRIPTION:        .
C
C CALLED BY:                     APCIRC
C
C PROGRAMMER:                    DATE OF LAST CHANGE      REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine savcir(icode,numcir,radius,xcentr,ycentr,ifl)

c       This routine is passed the arrays holding the center coordinates
c       and radius length of the circles to be written to the savefile.
c       The routine loads an array with the radius,x, and y center
c       point of each circle and writes out a record to the file when
c       26 values have been put into the array (78 positions of the
c       80-position record).
c   VARIABLES:
c       xcentr - array holding x center coordinate of circles
c       ycentr - array holding y center coordinate of circles
c       radius - array holding radius length of circles
c       icode - integer value (2) to be read and used by redraw routine
c       numcir - number of circles being saved off
c       fullfl - flag to indicate when 26 positions have been filled
c             in iarray meaning the record is ready to be written out
c       maxlen - indicates the length of iarray--dependent on the record
c             length of the file being written to
c       iarray - array to hold the record being built to be written out
```

Jul 20 14:32 1989 car: .f Page 3

```
c       icount - counter used to step through iarray
c       i - counter used to step through the arrays passed with points
c           and radius of circles
c       ifl - logical unit number associated with file to be
c           accessed
c   PROGRAMMER:  Nancy Detrich, A215, March, 1984

        real xcentr(*),ycentr(*),radius(*)
        integer icode,numcir
        integer maxlen,iarray(26),icount,i,ifl
        logical fullfl
        data maxlen/26/

c       only write out a record if at least 1 circle has been created
        if (numcir .gt. 0) then
          iarray(1) = icode
          iarray(2) = numcir
c         set counter ahead on first record because of icode and numcir
          icount = 3
c         load the iarray and write out a record when one is full
          do 100 i=1,numcir
            fullfl = .false.
            iarray(icount) = INT(radius(i) )
            iarray(icount+1) = INT(xcentr(i))
            iarray(icount+2) = INT(ycentr(i))
            icount = icount +3
c           a record is full when 8 or 16 points have been put into it, so
c              write it out
            if(MOD(i,8) .eq. 0) then
              call writit(ifl,iarray,maxlen,ierror)
              fullfl = .true.
c             reset counter to start in 1st position of iarray to fill
c               next record
              icount = 1
            endif
 100      continue
c         if fullfl is false here, means a partial record must be written
c            to the file
          if(.not.fullfl) then
            call writit(ifl,iarray,icount-1,ierror)
          endif
        endif
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     SAVE
C
C FUNCTIONAL DESCRIPTION:        .
C
C CALLED BY:                     APFILL, APLINE, APMARK, APRECT, APSMOO
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

Jul 20 14:32 1989 cars .f Page 4

```
      subroutine save(icode,numpts,xarray,yarray,ifl)

c      This routine calls the writit routine to write parameters
c        and points to the savefile.  An array of integers is
c        passed to writit and 12 x and y values may be written
c        in the first record, 13 on the second and 9 on the
c        third.
c        This routine is used by the create and convert routines
c        of the Icon Editor and the file to be written to is
c        controlled by the logical unit number, ifl.
c     VARIABLES:
c       xarray/yarray- points to be saved
c       numpts- number of points in each array
c       maxlen- maximum number of elements allowed to be written per
c        record
c       fullfl- flag set when a record is full
c       iarray- array loaded and sent to writit to be written to file
c       icode- the op code to be saved with the information
c             being saved
c   PROGRAMMER:  Nancy Detrich, A215, March, 1984

       real xarray(*),yarray(*)
       integer ifl,maxlen,icount
       logical  fullfl
c      array set to 26 because being written to 80 pos record in I3 format
       integer iarray(26),numpts,icode
       data  maxlen/26/

c        do not write a record if no points were passed
        if (numpts.gt.0) then
c         put op code in first position
          iarray(1) = icode
c         put number of points being written in position 2
          iarray(2) = numpts
c         set array value ahead on first record
          icount = 3
          do 100 i=1,numpts
c           truncate on entry into integer array
            fullfl=.false.
            iarray(icount) = INT(xarray(i))
            iarray(icount + 1) = INT(yarray(i))
            icount = icount + 2

c           a record is full if the points count is 12 or 25, so write
c             out record and set full flag
            if (i .eq. 12 .or. i .eq.25) then
              call writit(ifl,iarray,maxlen,ierror)
              fullfl = .true.
              icount = 1
            endif
  100     continue

c         write out record that is not full
          if (.not.fullfl) then
            call writit(ifl,iarray,icount-1,ierror)
```

```
Jul 20 14:32 1989  car:   .f Page 5

            endif

          endif
          return
          end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    saveco
c
c  Functional Description:
c       this subroutine saves the screen definition common areas
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                    FMAIN
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine saveco
c
c       this subroutine saves the screen definition common areas
c
        common /aspect/ parvie(6)
        common /saveta/ savevi(6)
c
        do 110 i=1,6
            savevi(i) = parvie(i)
  110   continue
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     SAVEST
C
C FUNCTIONAL DESCRIPTION:        .
C
C CALLED BY:                     STATEC
C
```

```
Jul 20 14:32 1989  car:   .f Page 6

C PROGRAMMER:                      DATE OF LAST CHANGE     REASON FOR CHANGE
c  S. Lamb                  Feb 1988                    command fix - savest
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine savest
c
c       this subroutine is the save state interpreter (28)
c
        common /states/ nextst
        logical eol,eoc
        common /comnds/ lenl,indxw,lenw,eol,eoc
        logical wordis,iseoc
c
        initls = nextst
c       do until nextst not = initial state
  100   continue
            call getwrd
c ****  change all of this
            if (wordis('COMMAND').or.wordis('FILE').or.wordis(':'))
     +          then
c * ** *** **** ***** ****** ******* not understood / implem.
                nextst = 15
            else if (iseoc()) then
c               prompt for filename
                nextst = 1
            else
c               put word into filename
                nextst = 1
            endif
        if (nextst.eq.initls) go to 100
        if (lenfn.gt.0) then
c           open file using default path
c           if error, putwrd, msg
c           else cmdfil = .true.
        endif
c
        return
        end


C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       SAVTXT
C
C FUNCTIONAL DESCRIPTION:          .
C
C CALLED BY:                       APTEXT
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine savtxt(size,height,style,nchars,retstr,x,y,ifl)

c       this subroutine saves the necessary parameters to be used
c       by the redraw routine when the icon is requested.
```

Jul 20 14:32 1989 car :.f Page 7

```
c       The icode is set to 7 to indicate the records being written
c       pertain to text, and the size, height, style, number of characters
c       in the text string and the x and y positions of that text
c       string are output.  Any real variables are converted to integer
c       values before being output.
c       The actual character string is output on a separate line as
c       characters.
c    VARIABLES:
c      retstr- the text string to be displayed
c      nchars- number of characters in text string
c      x/y- coordinate for positioning text string
c      height- height of characters in text string
c      style- determines font setting
c      size- selection made from menu
c      icode -op code for text
c      ierror- integer flag set if error occurs during write
c   PROGRAMMER:  Nancy Detrich, A215, March, 1984

        character*80 retstr
        integer x,y
        integer height
        integer style,size,ifl,nchars,ix,iy,icode,ierror

        icode = 7
        ix = INT(x)
        iy = INT(y)
c       write the parameters needed for redrawing
        write (ifl,1100) icode,size,height,style,nchars,ix,iy
c       write the text string (character format)
        call writch(ifl,retstr,nchars,len,ierror)

 1100   format (15i3)
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     SCENTE
C
C FUNCTIONAL DESCRIPTION:        .
C
C CALLED BY:                     STATEC
C
C PROGRAMMER:                    DATE OF LAST CHANGE     REASON FOR CHANGE
c  S. Lamb                 Feb 1988                 command fix - scente
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine scente
c
c       this subroutine is the center point state interpreter (18)
c
        common /states/ nextst
        logical wordis,iseoc
        logical iscoor
c
```

```
Jul 20 14:32 1989  car:   .f Page 8

        initls = nextst
c       do until nextst not = initial state
  100   continue
            call getwrd
            if (wordis('POINT').or.wordis('TO')) then
c * ** *** **** ***** ****** ******* not understood / implem.
                nextst = 15
            else if (iscoor()) then
                nextst = 19
            else if (iseoc()) then
                nextst = 7
            else
                call putwrd
                nextst = 7
            endif
        if (nextst.eq.initls) go to 100
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     SCLRET
C
C FUNCTIONAL DESCRIPTION:        .
C
C CALLED BY:                     DOVERL
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine sclret
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: SCRDIA
C
C FUNCTIONAL DESCRIPTION:  SCRDIA IS RESPONSIBLE FOR PRINTING THE CURRENT
C                          MAP DIAMETER IN THE COMMUNICATIONS AREA.
C
C INPUT FILES/PARAMETERS:  NONE.
C
C GLOBAL VARIABLES :
C
C        QXRNM                   REAL         RADIUS OF MAP. (NAUTICAL MILES)
C        QMAPUP                  LOGICAL      INDICATES WHETHER MAP IS CURRENTLY
C                                             DISPLAYED.
C
C OUTPUT FILES/PARAMETERS:  NONE.
C
C SUBROUTINES/FUNCTIONS CALLED : MESG
C
C         MESSAG                PRINTS CHARACTER STRING IN COMMUNICATIONS
```

Jul 20 14:32 1989 car: .f Page 9

```
C                         AREA.
C
C CALLED BY:                 CHECK, MAPPER
C
C LOCAL VARIABLES:
C
C      DIAM                  CHARACTER*80 CHARACTER STRING HOLDING CURRENT
C                                         DIAMETER.
C
C RESTRICTIONS: NONE.
C
C ABNORMAL RETURN CONDITIONS:   NONE.
C
C LOCATION:                     /ul/a21/gjf/SCRDIA.FTN
C
C PROGRAMMER:                   DATE OF LAST CHANGE     REASON FOR CHANGE
C
C     GJFenerty
C     Tom Wescott  (NOSC)       10/87                   Added map constnts
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine SCRDIA

C  SUBROUTINE TO CALCULATE AND DISPLAY THE CURRENT MAP DIAMETER IN
C  NAUTICAL MILES, KILOMETERS, MILES AND DEGREES.  USUALLY CALLED
C  FROM CHECK.

      LOGICAL QLTON(16),QDOTEM
      INTEGER QPGRID(4),QTYPTB(16)
      INTEGER QLEVEL,QITPRO,QIRES,QLUNDA,QLUNIN,QLUNLI
      REAL QXRNM,QXC,QYC,QCLAT,QCLON,QXRAD,QYRAD,QORHAL
      COMMON /MAP/ QXRNM,QXC,QYC,QLEVEL,QCLAT,QCLON,QXRAD,QYRAD,
     +    QITPRO,
     +    QIRES,QTYPTB,QLUNDA,QLUNIN,QLUNLI,QLTON,QPGRID,QDOTEM,
     +    QORHAL

      LOGICAL QMAPUP
      COMMON /MAPUP/ QMAPUP
      common /conic/ spll1,spll2,tranl,trank,tranr,tscale,pole,tilt
      common /pers/ orhalt,orhc,pconst,cosERM,radmax
      common /utmz/ ap,bp,cp,dp,ep,e2,ep2,aaxis,baxis,cmerid,zone

     CHARACTER*72 line,amptxt(4)


     CHARACTER*6 QCURWD
     COMMON /CURWDB/ QCURWD
     CHARACTER*15 MAPROJ(19)
     DATA MAPROJ /
    + 'Gnomonic      ', 'Equat. Ortho.  ', 'Polar Ortho.   ',
    + 'Orthographic  ', 'Perspective    ', 'Equirectangular',
    + 'Mercator      ', 'Lambert Conf.  ', 'Albers         ',
    + 'Az. Equal-area ', 'Az. Equidistant', 'Kavraisky IV   ',
    + 'Miller        ', 'Obliq. Mercator', 'Polar Stereo.  ',
    + 'Polyconic     ', 'UTM            ', 'Sinusoidal     ',
```

```
Jul 20 14:32 1989  carr  .f Page 10

     + 'Stereographic  '/

        IF (QMAPUP) THEN

C      ** LOAD STRING DIAM WITH SCALE,CENTER POINT,WDBII,DETAIL,PROJ.
        IEGEO = 0
        line = ' '
        IXRNM = QXRNM * 2

        WRITE (line(1:18),101) IXRNM
  101     FORMAT('Width:',I5,' NM  ')
        IXRNM = QXRNM*1.15*2
        WRITE (line(19:28),102) IXRNM
  102     FORMAT(I5,' MI  ')
        IXRNM = QXRNM*1.852*2
        WRITE (line(29:37),103) IXRNM
  103     FORMAT(I6,' KM')
        amptxt(1) = line
        line = ' '
        WRITE (line(1:8),104)
  104     FORMAT('Center: ')
        CALL FORMT (QCLAT,QCLON,IEGEO,line(9:24))
c
*-----------------------------------------------------------------------|--+
* Itproj:  1  2  3  4  5  6  7  8  9 10 11 12 13 14 15 16 17 18 19 20 21  |
*--------------------------------------------------------------------------+
*          g  o  o  o  p  e  m  l  a  a  a  k  m  o  p  p  u  s  s        |
*          n  r  r  r  e  q  e  a  l  z  z  a  i  b  o  o  t  i  t        |
*          o  e  p  t  r  r  r  m  b  e  e  v  l  l  s  l  m  n  e        |
*          m  q  o  h  s  e  c  c  r  a  d  r  l  m  t  y  z  u  r        |
*--------------------------------------------------------------------------+
      goto(1,01,01,01,02,01,01,03,03,01,01,03,01,05,01,01,04,01,01
     +    )qitpro
c
c       Default case:  Maps without special constants.
 1         continue
           go to 99
c
c       Perspective case:  Display view point altitide.
 2         continue
           iorhal = int(orhalt + 0.5)
           write (line(28:50),1002) iorhal
 1002      format(1X,'Altitude: ',i5,' NM ')
           go to 99
c
c       Conics case:  Display standard parallels.
 3         continue
           ispll1 = anint(spll1*180./3.14159)
           ispll2 = anint(spll2*180./3.14159)
           write (line(28:55),1003) abs(ispll1),abs(ispll2)
 1003      format(1X,'Std parallels: ',I2,'  ,',I2)
           if (spll1.ge.0.) line(46:46) = 'N'
           if (spll1.lt.0.) line(46:46) = 'S'
           if (spll2.ge.0.) line(50:50) = 'N'
           if (spll2.lt.0.) line(50:50) = 'S'
           go to 99
```

```
c
c       UTM case:  Display zone number.
 4         continue
           izone = zone
           write (line(28:50),1004) izone
 1004      format(1X,'Zone: ',i5)
           go to 99
c
c       Oblique case:  Display tilt angle:
 5         continue
           itilt = anint(tilt*180./3.14159)
           write (line(28:55),1005) itilt
 1005      format(1X,'Equatorial Tilt: ',I3,' deg.')
           go to 99
c
 99        continue
c       end cases
c
        amptxt(2) = line
        line = ' '
        WRITE (line(1:8),105) QCURWD
  105     FORMAT(A6,2X)
        WRITE (line(9:24),106) QLEVEL
  106     FORMAT('detail:',I3,6X)
        WRITE (line(28:55),107) MAPROJ(QITPRO)
  107     FORMAT(' Projection: ',A15)
        amptxt(3) = line
c        call clrcom
        call drwamp(amptxt,3)
        ELSE

          CALL MESG(294)
          CALL PAWS

        ENDIF

        RETURN
        END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     SEGHND
C
C FUNCTIONAL DESCRIPTION:        .
C
C CALLED BY:                     ADDTRK, CHGIND, PLOTON, PLTUNS, REPLAY
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine seghnd (segnr, data)

c this routine sets up the graphics window and viewport, opens the new
c segment, displays the data, closes the segment, and sets the
c detectability and visibility
```

Jul 20 14:32 1989 cars .f Page 12

```
c programmer: avw

        integer          segnr

        character*(160)  data
        logical trackn
        common /trkdbc/ trackn

        if (trackn) then
           print *, 'enter seghnd'
           print *, '    segnr = ', segnr
        end if

c set window and viewport

        call jrclos

        call gravpt
        call geowin

c open new retained segment

        call jropen (segnr)

c display the new data
c       print*,'in seghnd/seg#= ',segnr

        call pltdat (data)

c close segment

        call jrclos

c set detectability and visibility

        call jdetec (segnr, 1)
        call jvisbl (segnr, 1)

        if (trackn)  print *, 'exit seghnd'

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: SEGMAP
C
C FUNCTIONAL DESCRIPTION:  SETS UP RETAINED SEGMENT NUMBERS FOR MAP.
C
C INPUT FILES/PARAMETERS:  NONE.
C
C GLOBAL VARIABLES :
C
C       FIRSEG       INTEGER      FIRST MAP SEGMENT NUMBER
C
C OUTPUT FILES/PARAMETERS:  NONE.
```

Jul 20 14:32 1989 cars .f Page 13

```
C
C SUBROUTINES/FUNCTIONS CALLED :
C
C       GETSEG        GETS NEXT SEGMENT NUMBER.
C
C CALLED BY:                      DRWMAP
C
C LOCAL VARIABLES: NONE.
C
C RESTRICTIONS: NONE.
C
C ABNORMAL RETURN CONDITIONS:   NONE.
C
C LOCATION:                       /u1/a21/gjf/cntrl.f
C
C PROGRAMMER:                     DATE OF LAST CHANGE     REASON FOR CHANGE
C
C     GJFenerty
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE SEGMAP

C  SETS SEGMENT NUMBERS FOR DRAWING MAP

        INTEGER SEGNO,FIRSEG
        COMMON /SEGNO/ SEGNO,FIRSEG
        INTEGER I

        CALL GETSEG(FIRSEG)
        DO 20 I=1,16
           CALL GETSEG(SEGNO)
 20     CONTINUE

        SEGNO = FIRSEG

        RETURN
        END

C+*+*+*+*+*+*+*+*+*+*+*+*+*+*+*+*+*+*+*+*+*+*+*+*+*+*+*+*+*+*+*+*+*+*+*+*+*|*+*+*+*+
c UNIT NAME:   setcol
c
c Purpose:
c subroutine to set map feature colors
c
c Access: call setcol
c
c Parameters:
c
c Returns: none
c
c Globals:
c
c Calls: arrow
c
```

```
c Called by:                      RESCON
c
c Author: Ellen Jenkins, R531, September 30, 1982
c
c Location: file: setcol.f
c           directory: /u3/dave/hlpd
c           archive: /u3/dave/archive/hlspsrc
c
c History:
c version date    who                  history or reason for change.
c   1    10/7/82  D. A. Nation         Rearranged arrow calls to save space
c   2    1/4/83   D. A. Nation         Function key F8 used for exit on Apollo
c        Jan 1988 L. McCleary          call jpecho - setcol
c        Jan 1988 L. McCleary          continuous hue - setcol
c
c
c        _________________________________________________________________
c        |                                               |               |
c        |  ____________________________________________ |               |
c        |  |                                          | |               |
c        |  |          Current Color Choice            | |               |
c        |  |__________________________________________| |               |
c        |                          /\  ___/\            |               |
c        |  Text Example           /  \/     \______     |               |
c        |                                               |               |
c        |  ____________________________________________ |               |
c        |  |     |              |                |    | |               |
c        |  |     | Color        | Pallette       |    | |               |
c        |  |_____|______________|________________|____| |               |
c        |                                               |               |
c        |                                               |               |
c        |                    Hue                        |               |
c        |                                               |               |
c        |  ____________________________________________ |               |
c        |                                               |               |
c        |                 Saturation                    |               |
c        |                                               |               |
c        |  ____________________________________________ |               |
c        |                                               |               |
c        |                                               |               |
c        |                 Lightness                     |               |
c        |  ____________________________________________ |               |
c        |                                               |               |
c        |                                               |               |
c        ---------------------------------------------------------------------
c
c
C-*-*-*-*-*-*-*-*-*-*-*-*-*-*-*-*-*-*-*-*-*-*-*-*-*-*-*-*-*-*-*-*-*-*-*-*|*-*-*-*-
c
      subroutine setcol (icolor,nhues,ishue,ifcol,ibcol,ioucol,hls)
c
c     this subroutine does the color selection graphics
c
      real hls(3)
      character*1 ch
```

Jul 20 14:32 1989 car: .f Page 15

```
      integer*2 ikey
      logical sys
      common /sysdbc/ sys
      integer qfb(26),qmb(4)
      common /butons/qfb,qmb
      data vx,vy /0.,0./
      data xlow,xhigh,ylow,yhigh/1.,100.,1.,100./

      if (sys)
     + print*,'enter setcol ',icolor,nhues,ishue,ifcol,
     + ibcol,ioucol,hls

      intcol = ifcol
      call jwindo (xlow,xhigh,ylow,yhigh)
      call jwclip (.true.)
      call jopen
c
c     clear given area with background color
c
      CALL XPIDEX (ibcol,0)
      CALL XCOLOR (ioucol)
      CALL JRECT (xlow,ylow,xhigh,yhigh)
c
c     draw initial display
c
      xrange = xhigh - xlow
      yrange = yhigh - ylow
      CALL XCOLOR (icolor)
      CALL XPIDEX (icolor,0)
      xlmarg = xlow + .05 * xrange
      xrmarg = xhigh - .05 * xrange
      xsrang = xrmarg - xlmarg
      xcentr = (xrmarg - xlmarg) / 2. + xlmarg
      y1 = ylow + .85 * yrange
      y2 = yhigh - .05 * yrange
      CALL JRECT (xlmarg,y1,xrmarg,y2)
      call jupdat
      yfigur = yhigh - .25 * yrange
      call jmove (xlmarg, yfigur)
c      call jsize (xrange / 50., yrange / 40.)
      call jsize(5.0,2.5)
      call j1strg ('Text')
      call jmove (xlmarg, yfigur-.05*yrange)
      call j1strg ('Example')
      call jmove (xcentr, yfigur)
      call jrdraw (.2 * xrange, .05 * yrange)
      call jrdraw (.1 * xrange, -.1 * yrange)
      call jdraw (xrmarg, yfigur)
      yhues = ylow + .5 * yrange
      ysatur = ylow + .3 * yrange
      ylight = ylow + .1 * yrange
c      CALL XCOLOR (ifcol)
c      call jjust (2,1)
      space=(xrmarg-xlmarg)/nhues
      x1=xlmarg
      half = space/2.
```

```
      x2 = x1 + half
      do 50 kk=1,nhues
         numcol=(360/nhues)*(kk-1)
         mcolor=ishue+(kk-1)
         call jclose
c         print *,'mcolor,numcol',mcolor,numcol,x1,x2
         call jcotbl(1,1,mcolor,numcol,32767,16384)
         call jopen
         call xpidex(mcolor,0)
         call xcolor(mcolor)
         call jrect (x1,yhues+.10*yrange,x2,yhues)
         x1=x2
         x2=x1+space
 50   continue
      x2 = x2 - half
      call xpidex(ishue,0)
      call xcolor(ishue)
c         print *,'ishue ,numcol',ishue ,numcol,x1,x2
      call jrect (x1,yhues+.10*yrange,x2,yhues)
      call xcolor (ifcol)
      call jjust (2,1)
      call jmove (xcentr,yhues + .14 * yrange)
      call jsize(5.0,2.5)
      call j1strg ('Hue')
      call jmove (xlmarg,ysatur)
      call jdraw (xrmarg,ysatur)
      call jmove (xlmarg,ysatur + .01 * yrange)
      call jdraw (xlmarg,ysatur - .01 * yrange)
      call jmove (xcentr,ysatur + .05 * yrange)
      call j1strg ('Saturation')
      call jmove (xcentr,ysatur + .01 * yrange)
      call jdraw (xcentr,ysatur - .01 * yrange)
      call jmove (xrmarg,ysatur + .01 * yrange)
      call jdraw (xrmarg,ysatur - .01 * yrange)
      call jmove (xlmarg,ylight)
      call jdraw (xrmarg,ylight)
      call jmove (xlmarg,ylight + .01 * yrange)
      call jdraw (xlmarg,ylight - .01 * yrange)
      call jmove (xcentr,ylight + .05 * yrange)
      call j1strg ('Lightness')
      call jmove (xcentr,ylight + .01 * yrange)
      call jdraw (xcentr,ylight - .01 * yrange)
      call jmove (xrmarg,ylight + .01 * yrange)
      call jdraw (xrmarg,ylight - .01 * yrange)
      call jjust (1,1)
      call jmove (xlmarg,yhues + .10 * yrange)
      call j1strg ('0')
      call jjust (3,1)
      call jmove (xrmarg,yhues + .10 * yrange)
      call j1strg ('360')
      call jjust (1,1)
      call jmove (xlmarg,ysatur + .03 * yrange)
      call j1strg ('0')
      call jjust (3,1)
      call jmove (xrmarg,ysatur + .03 * yrange)
      call j1strg ('100')
```

Jul 20 14:32 1989 car: .f Page 17

```
         call jjust (1,1)
         call jmove (xlmarg,ylight + .03 * yrange)
         call j1strg ('0')
         call jjust (3,1)
         call jmove (xrmarg,ylight + .03 * yrange)
         call j1strg ('100')
         call jclose
         x1prev = xlmarg + ((hls(3)/100.)*xsrang)
         x2prev = xlmarg + ((hls(2)/100.)*xsrang)
         x3prev = xlmarg + ((hls(1)/360.)*xsrang)
         hue = hls(1)
         satur = hls(3)
         rlight = hls(2)
c             print 101,hue,satur,rlight
c  DAN1  call arrw (x3prev,yhues,intcol,xsrang,yrange,hue)
c  DAN1  call arrw (x1prev,ysatur,intcol,xsrang,yrange,satur)
c  DAN1  call arrw (x2prev,ylight,intcol,xsrang,yrange,rlight)
c        Loop until end ('E' key)
  100    continue
c  DAN1      addition
             call arrw (x3prev,yhues,intcol,xsrang,yrange,hue)
             call arrw (x1prev,ysatur,intcol,xsrang,yrange,satur)
             call arrw (x2prev,ylight,intcol,xsrang,yrange,rlight)
c  DAN1      end
             ihue = hue
             isatur = satur/100.*32767.
             light = rlight/100.*32767.
             call jcotbl (1,1,icolor,ihue,isatur,light)
c             print 101,hue,satur,rlight
c  101        format(' hue, sat, lit ',3f6.1)
             call jpecho (1,2,1,vx,vy)
             call jlocat (1,1,1,ik,vx,vy)
             ikey = ik
             ch = char(ikey)
c            print*,'setcol -- ikey, ch : ',ikey,'  ',ch
c            translate to world coord.
             call jconvw (vx,vy,x,y,z)
c DAN2
             if (ch.eq.'R'.or.ch.eq.'r'.or.ch.eq.'.'
     +       .or.ikey.eq.qmb(3)
     +       .or.ikey.eq.8) go to 190
c DAN2
c
c            process locator selection
c
             if (x.lt.xlmarg) x = xlmarg
             if (x.gt.xrmarg) x = xrmarg
             if (y.gt.(yhues-((yhues-ysatur)*.25))) then
                call arrw (x3prev,yhues,ibcol,xsrang,yrange,hue)
c                if (x.lt.(xlmarg + half)) then
c                   x = xlmarg
c                   hue = 0
c                else if (x.ge.(xrmarg-half)) then
c                   x = xrmarg
c                   hue = 360
c                else
```

```
c                   prtion=xsrang/nhues
c                   half = prtion/2.
c                   iratio = (x - xlmarg + half)/prtion
c                   ratio = iratio * prtion
c                   hue = (ratio) / xsrang * 360.
c                   x = xlmarg + iratio * prtion
c                endif
c  DAN1         call arrw (x,yhues,intcol,xsrang,yrange,hue)
                x3prev = x
                hue = (x - xlmarg) / xsrang * 360.
             else if (y.gt.(ysatur-((ysatur-ylight)*.25))) then
                call arrw (x1prev,ysatur,ibcol,xsrang,yrange,satur)
                x1prev = x
                satur = (x - xlmarg) / xsrang * 100.
c  DAN1         call arrw (x,ysatur,intcol,xsrang,yrange,satur)
             else
                call arrw (x2prev,ylight,ibcol,xsrang,yrange,rlight)
                x2prev = x
                rlight = (x - xlmarg) / xsrang * 100.
c  DAN1         call arrw (x,ylight,intcol,xsrang,yrange,rlight)
             endif
             go to 100
  190   continue
        hls(1) = hue
        hls(2) = rlight
        hls(3) = satur
        if (sys)  print*,'exit setcol'
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SETCOR
C
C FUNCTIONAL DESCRIPTION:       .
C
C CALLED BY:                    STATEC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine setcor
c
c       this subroutine is the set coordinates state interpreter (19)
c
        common /states/ nextst
c
c  **   set new coordinates
        nextst = 14
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
```

```
Jul 20 14:32 1989  car:  .f Page 19

C UNIT NAME:                    SETDBG
C
C FUNCTIONAL DESCRIPTION:       .
c  subroutine setdbg - sets up array of flags for the debugs
C
C CALLED BY:
C
C PROGRAMMER:                   DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine setdbg

      character*80 idebug
      common /idebug/ idebug
      logical map,rdkey,savkey,sys,noscal,vax,olhldf,aed,batch
      logical frame,square,noblnk,bxclr,txtsiz,metafl,nolabl,nologo
      logical nobitm,malbox,trackn,bit,mask,forma,plain,count
      logical timeot,fill,jsub,sr8,rel2,clr

      common /mapdbc/ map
      common /rkdbc/ rdkey
      common /svkdbc/ savkey
      common /sysdbc/ sys
      common /nsldbc/ noscal
      common /vaxdbc/ vax
      common /ohfdbc/ olhldf
      common /aeddbc/ aed
      common /batdbc/ batch
      common /frmdbc/ frame
      common /sqrdbc/ square
      common /nbldbc/ noblnk
      common /bxcdbc/ bxclr
      common /txsdbc/ txtsiz
      common /metdbc/ metafl
      common /nlbdbc/ nolabl
      common /nlgdbc/ nologo
      common /nbtdbc/ nobitm
      common /mlbdbc/ malbox
      common /trkdbc/ trackn
      common /bitdbc/ bit
      common /mskdbc/ mask
      common /fmadbc/ forma
      common /plndbc/ plain
      common /cntdbc/ count
      common /timdbc/ timeot
      common /fildbc/ fill
      common /jsbdbc/ jsub
      common /sr8dbc/ sr8
      common /rl2dbc/ rel2
      common /clrdbc/ clr

c     --convert the string to lower case (for reference consistency)
      call tolowr(idebug, len(idebug))

      if (index(idebug,'map').ne.0) then
```

Jul 20 14:32 1989 cars .f Page 20

```
   map = .true.
else
   map = .false.
endif

if (index(idebug,'read_keys').ne.0) then
  rdkey =.true.
else
  rdkey = .false.
endif

if (index(idebug,'save_keys').ne.0) then
  savkey = .true.
else
  savkey = .false.
endif

if (index(idebug,'sys').ne.0) then
  sys = .true.
else
  sys = .false.
endif

if (index(idebug,'noscal').ne.0) then
  noscal = .true.
else
  noscal = .false.
endif

if (index(idebug,'vax').ne.0) then
  vax = .true.
else
  vax = .false.
endif

if (index(idebug,'oldhldf').ne.0) then
  olhldf = .true.
else
  olhldf = .false.
endif

if (index(idebug,'aed').ne.0) then
  aed = .true.
else
  aed = .false.
endif

if (index(idebug,'batch').ne.0) then
  batch = .true.
else
  batch = .false.
endif

if (index(idebug,'frame').ne.0) then
  frame = .true.
else
```

Jul 20 14:32 1989 carr .f Page 21

```
          frame = .false.
        endif

        if (index(idebug,'square').ne.0) then
          square = .true.
        else
          square = .false.
        endif

        if (index(idebug,'noblanks').ne.0) then
           noblnk = .true.
        else
           noblnk = .false.
        endif

        if (index(idebug,'bxclr').ne.0) then
           bxclr = .true.
        else
           bxclr = .false.
        endif

        if (index(idebug,'txtsiz').ne.0) then
           txtsiz = .true.
        else
           txtsiz = .false.
        endif

       if (index(idebug,'metafile').ne.0) then
           metafl = .true.
        else
           metafl = .false.
        endif

        if (index(idebug,'nolables').ne.0) then
           nolabl = .true.
        else
           nolabl = .false.
        endif

        if (index(idebug,'nologo').ne.0) then
           nologo = .true.
        else
           nologo = .false.
        endif

        if (index(idebug,'nobitm').ne.0) then
           nobitm = .true.
        else
           nobitm = .false.
        endif

        if (index(idebug,'mailbox').ne.0) then
           malbox = .true.
        else
           malbox = .false.
        endif
```

Jul 20 14:32 1989 cars .f Page 22

```
      if (index(idebug,'tracking').ne.0) then
         trackn = .true.
      else
         trackn = .false.
      endif

      if (index(idebug,'bit').ne.0) then
         bit = .true.
      else
         bit = .false.
      endif

      if (index(idebug,'mask').ne.0) then
         mask = .true.
      else
         mask = .false.
      endif

      if (index(idebug,'forma').ne.0) then
         forma = .true.
      else
         forma = .false.
      endif

      if (index(idebug,'plain').ne.0) then
         plain = .true.
      else
         plain = .false.
      endif

      if (index(idebug,'count').ne.0) then
         count = .true.
      else
         count = .false.
      endif

      if (index(idebug,'timeout').ne.0) then
         timeot = .true.
      else
         timeot = .false.
      endif

      if (index(idebug,'fill').ne.0) then
         fill = .true.
      else
         fill = .false.
      endif

      if (index(idebug,'jsub').ne.0) then
         jsub = .true.
      else
         jsub = .false.
      endif

      if (index(idebug,'sr8').ne.0) then
```

```
        sr8 = .true.
      else
        sr8 = .false.
      endif

      if (index(idebug,'rel2').ne.0) then
        rel2 = .true.
      else
        rel2 = .false.
      endif

      if (index(idebug,'jclear').ne.0) then
        clr = .true.
      else
        clr = .false.
      endif

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      SETFAD
C
C FUNCTIONAL DESCRIPTION:         .
C
C CALLED BY:                      TRKCON
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine setfad

c
c     this subroutine sets the fade time based upon users request
c     and then updates the screen to reflect the new fade time

      logical longer

      character*2 chmin
      character*2 chhour
      character*80 line
      character*5 newfad

      integer*4 error
      integer*4 hours
      integer*4 minute
      integer*4 icolcm
      integer*4 lctrak
      integer*4 temptm
      integer*4 txtseg

      integer tfaddx
      integer tfadtm
      common /tfadez/ tfaddx, tfadtm
```

```
      integer tnewst
      integer toldst
      common /tarbou/ tnewst, toldst
      integer ltypov(16)
      logical ltonov(16)
      logical rankt(26,16)
      logical trackn
      common /trkdbc/ trackn
      common /maptoo/ ltypov,ltonov,rankt
      real qcxmn
      real qcymn
      real qcxmx
      real qcymx
      common/comwdo/qcxmn,qcymn,qcxmx,qcymx
      character*9 tfddtg
      common /tfddtg/ tfddtg
      integer qdsdev,qpydev,qecho,qlecho
      common /device/ qdsdev,qpydev,qecho,qlecho

      data lctrak /3/
      data icolcm /16/

c     if tracking is not turned on, then cannot set the fade time.

c jit      if (.not. ltonov(lctrak)) then
c jit         call mesg(1247)
c jit         call paws
c jit         goto 300
c jit      endif

      if (trackn) then
         print *, 'enter setfad'
         print *, '   tfadtm = ', tfadtm
      end if

c     print out msg to user to enter new fade time
c
      call mesg(1235)
c
c     back up one row and print out msg to show current fade time
c
      call comvpt
      call comwin
      call getseg(txtseg)
      call jrclos
      call jropen (txtseg)

      hours = tfadtm / 60
      call cvitoc (hours,chhour)
      minute = mod(tfadtm,60)
      call cvitoc (minute,chmin)
      line(1:38) ='Current fade time in hh:mm format is: '
      line(39:43) = chhour // ':' // chmin
      call jmove(qcxmn + 1,qcymx - 1.3)
      call xsize (1.,1.)
      call xcolor (icolcm)
```

```
      call jlstrg(line(1:43))
      call jrclos
c
c     get keyboard input
c
      error = 0
      call jkeybs(qdsdev,qpydev,qecho,5,newfad,ilen)
c
c     if user hit carriage return, then go to end of subroutine
c
      if (ilen .eq. 0) then
         call jpurge(txtseg)
         goto 300
      endif
c
c     convert fade time input of hh:mm input to integer minutes
c
      call convfad(newfad,temptm,ilen,error)
c
c     set longer flag true if new fade time is larger than old fade time
c     set longer false if new fade time is smaller than old fade time
c
      if (error .eq. 0) then
         if (temptm .ne. tfadtm) then
              if (temptm .lt. tfadtm) then
                   longer = .false.
              else if (temptm .gt. tfadtm) then
                   longer = .true.
              endif

c              if (trackn) then
c              end if

              tfadtm = temptm
c
c             if tnewst is 0 then no tracking data has been put on list,
c             else we know that at least 1 track has been processed.
c
              if (tnewst .ne. 0) then
c
c                reset the dtg
c
                 call fadchg(tfddtg)
c
c                jit: call routine to set boxes to invisible if faded.
c
                 call fadbox(tfddtg)
c
c                reset the fade index and display or erase tracks
c
                 call chgind(tfddtg,longer,tfaddx)

              endif
         endif
      endif
```

Jul 20 14:32 1989 cars f Page 26

```
      goto 200
100   print*,'Error in fade time input'
200   continue
      call jpurge(txtseg)

300   continue

      if (trackn) print *, 'exit setfad'

      return
      end

C++*+*+*+*+*+*+*+*+*+*+*+*+*+*+*+*+*+*+*+*+*+*+*+*+*+*+*+*+*+*+*+*+*+*+*|*+*+*+*+
c  Unit Name : seticn
c
c  Functional Desription:   Sets scaling factor to make icons same
c                           size as in the construction area.
c
c  Global
c        qbxwmn,qbxwmx   Window coordinates of box area
c        qbywmn,qbywmx
c        xllbvp,yllbvp   Virtual coordinates of box area
c        xurbvp,yurbvp
c
c  Subroutines/functions called
c
c         JXXXX   Di-3000 Subroutines       See user's manual
c
c  Local
c     vx,vy,vz      window coordinates of current window
c     xl,yl,xh,yh   virtual coordinates of current viewport
c     dimvpt        minimum virtual distance of box
c                   (used for square area { if call bsqvpt is used} )
c     xscale        scaling factor to use if icon in box is to be
c                   same as icon in graphics area.
c     yscale        same as xscale
c
c  Programmer
c     Dirk Butson              8/13/85      Initial Entry
c
C-*-*-*-*-*-*-*-*-*-*-*-*-*-*-*-*-*-*-*-*-*-*-*-*-*-*-*-*-*-*-*-*-*-*-*-*|*-*-*-*-

        subroutine seticn(xscale,yscale)

        common /boxdim/ qbxwmn,qbxwmx,qbywmn,qbywmx
        real            qbxwmn,qbxwmx,qbywmn,qbywmx

        common /combvp/ xllbvp,yllbvp,xurbvp,yurbvp

        real vx(4),vy(4),vz(4)
        call jiwind(vx,vy,vz)
        call jconwv(vx(1),vy(1),vz(1),xl,yl)
        call jconwv(vx(3),vy(3),vz(3),xh,yh)
        dimvpt = amin1(xurbvp-xllbvp,yurbvp-yllbvp)
        xscale = ((vx(3) - vx(1))/(qbxwmx-qbxwmn)) /
```

Jul 20 14:32 1989 carr .f Page 27

```
     +            ((xh    - xl   )/(dimvpt))
        yscale = ((vy(3) - vy(1))/(qbywmx-qbywmn)) /
     +            ((yh    - yl   )/(dimvpt))
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SETPRO
C
C FUNCTIONAL DESCRIPTION:       .
C
C CALLED BY:                    STATEC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine setpro
c
c       this subroutine is the set projection state interpreter (13)
c
        common /states/ nextst
        common /indpar/ indpro,indftr
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
c
        itproj = indpro
        nextst = 14
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SETSCA
C
C FUNCTIONAL DESCRIPTION:       .
C
C CALLED BY:                    STATEC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine setsca
c
c       this subroutine is the set scale state interpreter (17)
c
        common /states/ nextst
        logical iseoc
        logical isnm,iskilo,ismile
```

```
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
c
        initls = nextst
c       do until nextst not = initial state
  100   continue
            call getwrd
            if (iseoc().or.isnm()) then
c ***           set scale
                nextst = 14
            else if (iskilo()) then
c ***           convert number
c ***           set scale
                nextst = 14
            else if (ismile()) then
c ***           convert number
c ***           set scale
                nextst = 14
            else
c ***           set scale
                call putwrd
                nextst = 1
            endif
        if (nextst.eq.initls) go to 100
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C* UNIT NAME:                    setvar
C*
C* FUNCTIONAL DESCRIPTION:
C*
C*   Block data routine which initializes control variables to point
C* to the main menu (a block data routine is used in Fortran77 to
C* initialize large areas of common blocks).
C*
C*
C* INPUT FILES/PARAMETERS:
C*
C*       global variables described below
C*
C* OUTPUT FILES/PARAMETERS:
C*
C*     Global Variables
C*       qcancl           logical; cancel flag
C*       qext2m           logical; exit to main menu flag
C*       qretrn           logical; return to previous menu flag
C*       qstmnu           logical; flag to put current menu on the stack
C*       qmloc            integer; current location in the stack
C*       qnextm           integer; next menu to be displayed
```

```
Jul 20 14:32 1989  cars  .f Page 29

C*      qcmpfl          logical; compass is present flag
C*
C* RESTRICTIONS:
C*
C*      not restricted
C*
C* SUBROUTINES CALLED:
C*
C*      no subroutines called
C*
C* CALLED BY:                    INIT, MHAND
C*
C* LOCAL VARIABLES:
C*
C*      no local variables
C*
C* ABNORMAL RETURN CONDITIONS:
C*
C*      no abnormal return conditions
C*
C* LOCATION:
C*
C*      /u2/vcn/a21proto/setvar
C*
C* PROGRAMMER:              DATE OF LAST CHANGE:    REASON FOR CHANGE:
C*
C*  VCNewton                    15 August 1983       initial entry
C*
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine setvar

C       Block data routine, initializes control variables to point to the
C       main menu

C        (**Declare common blocks and common block variables**)
         Integer qmloc,qnextm
         Logical qcancl,qext2m,qretrn,qstmnu
         Common /b1/ qcancl,qext2m,qretrn,qstmnu,qnextm
         Common /b4/ qmloc
         Common /comflg/qcmpfl
            Logical qcmpfl
c        print*,'Setvar -- enter'
C        (**Initialize control variables**)
         qcancl=.false.
         qext2m=.false.
         qretrn=.false.
         qstmnu=.false.
         qnextm=1
         qmloc=1
         qcmpfl = .false.
c        print*,'Setvar -- exit',qnextm
      End

C+*+*+*+*+*+*+*+*+*+*+*+*+*+*+*+*+*+*+*+*+*+*+*+*+*+*+*+*+*+*+*+*+*+*+*+*+*|*+*+*+*+
```

```
C UNIT NAME: sgn
C
C FUNCTIONAL DESCRIPTION:  Arithmetic signum function
C
C INPUT FILES/PARAMETERS:
C
C GLOBAL VARIABLES : NONE.
C
C OUTPUT FILES/PARAMETERS:  Returns true if x >= 0 (in ispos)
C
C SUBROUTINES/FUNCTIONS CALLED :
C
C CALLED BY:                    FDRAWV
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     Edward Swing                                      ORIGINAL CODE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine sgn(x,ispos)

        logical ispos

        if (x.ge.0.) then
            ispos = .true.
        else
            ispos = .false.
        endif

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:       SHOVPT
c
c  Functional Description:
c       this subroutines sets the short menu area viewport
c
c  Input Files/Parameters:
c       xllmvp          REAL
c       xurmvp          REAL
c       yurmvp          REAL
c       yurbvp          REAL
c
c  Output Files/Parameters:       N/A
c
```

Jul 20 14:32 1989 cars .f Page 31

```
c  Subroutines/Functions Called:
c       Note: Subroutines preceded by a "j" are explained in the DI-3000 manual.
c
c  Called By:                    MAKSHO
c
c  Local Variables:   N/A
c
c  Restrictions:      N/A
c
c  Abnormal Return Conditions: N/A
c
c  Location:  /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-
c
       subroutine shovpt
c
c      this subroutines sets the short menu area viewport
c
       common /commvp/ xllmvp,yllmvp,xurmvp,yurmvp
       common /combvp/ xllbvp,yllbvp,xurbvp,yurbvp
c
       call jvport (xllmvp,xurmvp,yurbvp,yurmvp)
c
       return
       end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: SHOWNM
C
C FUNCTIONAL DESCRIPTION:  FINDS AREA NAME AND RETURNS MAP PARAMETERS.
C
C INPUT FILES/PARAMETERS:
C
C        MSG                    CHAR*80     AREA NAME.
C        ISL                    INTEGER     LENGTH OF AREA NAME.
C
C GLOBAL VARIABLES :
C
C        QLUNNA                 INTEGER     LOGICAL UNIT NUMBER FOR NAMES
C                                           FILE.
C
C OUTPUT FILES/PARAMETERS:
C
C        PARMS                  INTEGER(4)  MINLAT,MAXLAT,MINLON,MAXLON.
C        FOUND                  LOGICAL     INDICATES WHETHER AREA NAME WAS FOUND.
C
C SUBROUTINES/FUNCTIONS CALLED :
C
C        TOCAPS                 CONVERTS LETTERS TO CAPITALS.
C
C CALLED BY:                      FSHOWA, ISAREA
C
```

```
Jul 20 14:32 1989  cars   f Page 32

C LOCAL VARIABLES:
C
C       CHATMP                CHAR*50     PATHNAME.
C
C RESTRICTIONS: NONE.
C
C ABNORMAL RETURN CONDITIONS:   NONE.
C
C LOCATION:                     /a21/gjf/MAPADD.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE SHOWNM (MSG,ISL,PARMS,FOUND,TYPEC)

C       THIS SUBROUTINE FINDS AN AREA NAME AND RETURNS MAP PARAMETERS

        REAL PARMS(4)

        INTEGER QKB,QICRT
        COMMON /TERMIN/ QKB,QICRT

        INTEGER QLUNNA
        COMMON /NMLIM/ QLUNNA,QAREAN,QAREAX

        CHARACTER*80 MSG
        CHARACTER*20 NAME
        CHARACTER*80 CHATMP
        CHARACTER TYPEC

        CHARACTER*50 QDFPTH
        common /mapath/ QDFPTH
        INTEGER QLENDF
        common /lenmap/ QLENDF
        INTEGER   isecs,imins
        REAL      c,cs
        COMMON    /c/ c,isecs,cs,imins

        LOGICAL FOUND
        DTORAD=C*60.

        CALL TOCAPS (MSG,ISL)
        if (qlendf.gt.0) then
            CHATMP = QDFPTH(1:QLENDF) // 'namlim.dat'
            lentmp = qlendf+10
        else
            chatmp = 'namlim.dat'
            lentmp = 10
        endif
        OPEN(UNIT=QLUNNA,FILE=CHATMP(1:lentmp),STATUS='OLD',
     +  ERR=671)
```

Jul 20 14:32 1989 cars f Page 33

```
      REWIND QLUNNA
      FOUND=.FALSE.

 100  CONTINUE

          READ(QLUNNA,1110,ERR=182,END=190) NAME(1:20),
    +     (PARMS(I),I=1,4),
    +     QCLAT,QCLON,QDLAT,QDLON,TYPEC
1110      FORMAT(A20,2(F5.1,1X),6(F6.1,1X),A1)

          IF (NAME(1:ISL).EQ.MSG(1:ISL)) THEN

              FOUND=.TRUE.

              DO 150 I=1,4

                  IF (PARMS(I).GT.180.) PARMS(I)=PARMS(I)-360.
                  PARMS(I)=PARMS(I)*DTORAD

 150          CONTINUE

              GO TO 190

          ENDIF

          GO TO 100

 182  CONTINUE
c          PRINT*,'DECODE ERROR ON NAME LIMITS FILE'

 190  CONTINUE
      GO TO 699

 671  CONTINUE
c          PRINT*,'PLOT -- ERROR ON OPEN OF NAME LIMITS FILE'

 699  CONTINUE

C     MYCROFT CLOSE

      CLOSE(QLUNNA)

      RETURN
      END

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  SOVERL
c
c  Functional Description:     Utility to set write mask to the viewing
c                              planes.  Sets mask for overlay planes.
c
c  Input Files/Parameters:     N/A
c
c  Output Files/Parameters:    N/A
c
```

```
c  Called By:                    CLRCOM, CLRFUL, CLRGRA, CLRVPT, DRWAMP,
C                                FCFILL, GLTYPE, INIPIC, MAPPER
C                                RESCON, GEOCON
c
c  Local Variables:
c    code       integer          escape code number
c    ilist      integer          array of integer parameters
c    ninteg     integer          number of integer parameters
c    nreal      integer          number of real paramenters
c    rlist      real             array of real parameters
c
c  Restrictions:                 N/A
c
c  Subroutines/Functions Called:        N/A
c
c  Abnormal Return Conditions:          N/A
c
c  Location:                            /u1/a21/bap/sbakovr.f
c
c  Programmer: Brian A. Pelletier
c
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE SOVERL

c     set write mask to the viewing planes.  Sets mask for overlay planes.

        integer code, ninteg, nreal, ilist(1)
        real rlist(1)
        data code, ninteg, nreal/5127, 1, 0/
        data ilist(1)/248/
        call jescap(code, ninteg, nreal, ilist, rlist)
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    sparam

c  Functional Description:
c       this subroutine saves map parameters
c
c  Input Files/Parameters:

c  Output Files/Parameters: N/A

c  Subroutines/Functions Called:

c  Called By:                    RESCON, SAVDIS

c  Local Variables: N/A

c  Restrictions: N/A

c  Abnormal Return Conditions:  N/A
```

Jul 20 14:32 1989 cars .f Page 35

```
c  Location:      /a21/dave

c  Programmer       Date of Last Change      Reason for Change
c                                            Original entry.
c  Tom Wescott  (NOSC)     11/87             Add std parallels.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine sparam (len,name,dataon,ierror)

c       this subroutine saves map parameters

        character*6 curwdb
        common /curwdb/ curwdb
        common /lenwdb/ lenwdb
        character*(*) name
        logical dataon
        character*50 filenm
        character*17 chastr
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        common /conic/ spll1,spll2,tranl,trank,tranr,tscale,pole,tilt
        dimension ltypov(16)
        logical ltonov(16),rankt(26,16)
        common /maptoo/ ltypov,ltonov,rankt
        real retabl(4)
        integer intabl(17)
        character*50 classi
        common /classi/ classi
        common /lencla/ lencla
        common /overly/ overtb
        logical overtb(16)
        character*80 ovfnam
        common /ovfnam/ ovfnam
        common /lenovf/ lenovf
        logical filply,opnply
        common / polycb / filply,opnply
        data iversn/7/
        data ifl/9/,irdwr/1/

c       print*,'Enter sparam ',len,name
        filenm = name(1:len) // '.prm'
        call openit (filenm,len+4,ifl,irdwr,ierror)
        if (ierror.ne.0) go to 150
        call writin (ifl,iversn,1,ierror)
        retabl(1) = xc
        retabl(2) = yc
        retabl(3) = xrad
        retabl(4) = yrad
        call writre (ifl,retabl,4,ierror)
        retabl(1) = xrnm
        retabl(2) = clat
        retabl(3) = clon
```

Jul 20 14:32 1989 cars .f Page 36

```
        retabl(4) = orhalt
        call writre (ifl,retabl,4,ierror)
        do 120 i=1,4
            intabl(i) = ipgrid(i)
  120   continue
        intabl(5) = level
        intabl(6) = itproj
        intabl(7) = ires
        call writin (ifl,intabl,7,ierror)
        call logasc(lton,16,chastr(1:16))
        call logasc(dotem,1,chastr(17:17))
        call writch (ifl,chastr,17,ierror)
        call writch (ifl,curwdb,lenwdb,ierror)
        call writch (ifl,classi,lencla,ierror)
        overtb(5) = filply
        call logasc(overtb,16,chastr)
        call writch (ifl,chastr,16,ierror)
        call writch (ifl,ovfnam,lenovf,ierror)
c
c       Save the standard parallels.
        retabl(1) = splll
        retabl(2) = spll2
        retabl(3) = tilt
        call writre (ifl,retabl,3,ierror)
c
        go to 155
  150       continue
            ierror = 2
            print*,'Error in parameter file save'
c           call derror(30,'Problem saving parameter file ',.true.,5,ch)
  155   continue
        call closit (ifl)

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    SPCNWV
c
c  Functional Description:       SPCNWV is a special conversion routine
c                                for world-to-virtual conversions where
c                                the virtual value may be outside of the
c                                specified virtual space.  (This corrects
c                                errors which occurred by calling the
c                                routine JCONWV.)
c
c  Input Files/Parameters:
c    xpt       real          world x-value
c    ypt       real          world y-value
c
c  Output Files/Parameters:
c    xvpt      real          virtual x-value
c    yvpt      real          virtual y-value
c
c  Subroutines/Functions Called:
```

```
Jul 20 14:32 1989  cars  .f Page 37

c    All subroutine names preceeded by a "j" are DI3000 subroutines.
c    For more information see the DI3000 Users Guide.
c
c  Called by:
c
c  Local Variables:
c    xllv     real        lower bound virtual x-value
c    xllw     real        lower bound world x-value
c    xurv     real        upper bound virtual x-value
c    xurw     real        upper bound world x-value
c    yllv     real        lower bound virtual y-value
c    yllw     real        lower bound world y-value
c    yurv     real        upper bound virtual y-value
c    yurw     real        upper bound world y-value
c
c  Restrictions: N/A
c
c  Abnormal Return Conditions: N/A
c
c  Location: N/A
c
c  Programmer: Alan V. Wenell
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine spcnwv (xpt, ypt, xvpt, yvpt)

      real          xllv
      real          xllw
      real          xpt
      real          xurv
      real          xurw
      real          xvpt
      real          yllv
      real          yllw
      real          ypt
      real          yurv
      real          yurw
      real          yvpt

c     print *, 'enter spcnwv'
c     print *, 'xpt, ypt = ', xpt, ypt

c ----- get current world parameters
      call j4rget (1, xllw, xurw, yllw, yurw)
c     print *, 'xllw, xurw, yllw, yurw: ', xllw, xurw, yllw, yurw

c ----- get current virtual parameters
      call j4rget (2, xllv, xurv, yllv, yurv)
c     print *, 'xllv, xurv, yllv, yurv: ', xllv, xurv, yllv, yurv

c ----- solve following equations for xvpt, yvpt:
c -----    (xvpt-xllv) / (xurv-xllv) = (xpt-xllw) / (xurw-xllw)
c -----    (yvpt-yllv) / (yurv-yllv) = (ypt-yllw) / (yurw-yllw)

      xvpt = (((xpt - xllw) * (xurv - xllv)) /
```

Jul 20 14:32 1989 cars f Page 38

```
     +        (xurw - xllw)) + xllv

        yvpt = (((ypt - yllw) * (yurv - yllv)) /
     +        (yurw - yllw)) + yllv

c       print *, 'exit spcnwv'
c       print *, 'xvpt, yvpt = ', xvpt, yvpt

        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SPROJE
C
C FUNCTIONAL DESCRIPTION:        .
C
C CALLED BY:                    STATEC
C
C PROGRAMMER:                   DATE OF LAST CHANGE     REASON FOR CHANGE
c  S. Lamb                Feb 1988                 command fix - sproje
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine sproje
c
c       this subroutine is the projection state interpreter (12)
c
        common /states/ nextst
        logical isproj
        logical wordis,iseoc
c
        initls = nextst
c       do until nextst not = initial state
  100   continue
            call getwrd
            if (wordis('TO')) then
c * ** *** **** ***** ****** ******* not understood / implem.
                nextst = 15
            else if (iseoc()) then
                nextst = 5
            else if (isproj()) then
                nextst = 13
            else
                call putwrd
                nextst = 5
            endif
        if (nextst.eq.initls) go to 100
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SSCALE
C
```

```
Jul 20 14:32 1989  cars  .f Page 39

C FUNCTIONAL DESCRIPTION:        .
C
C CALLED BY:                     STATEC
C
C PROGRAMMER:                    DATE OF LAST CHANGE     REASON FOR CHANGE
c  S. Lamb                 Feb 1988                  command fix - sscale
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine sscale
c
c       this subroutine is the scale state interpreter (16)
c
        common /states/ nextst
        logical wordis,iseoc
        logical isnumb
c
        initls = nextst
c       do until nextst not = initial state
  100   continue
            call getwrd
            if (wordis('TO')) then
c * ** *** **** ***** ****** ******* not understood / implem.
                nextst = 15
            else if (iseoc()) then
                nextst = 6
            else if (isnumb()) then
                nextst = 17
            else
                call putwrd
                nextst = 6
            endif
        if (nextst.eq.initls) go to 100
c
        return
        end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     STATEC
C
C FUNCTIONAL DESCRIPTION:        .
C
C CALLED BY:                     COMMND
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine statec
c
c       this subroutine handles control of command states
c
        common /states/ nextst
c       print*,'statec -- enter'
        call getcmd
```

```
      nextst = 1
c     do until nextst = 0
  100 continue
c         print*,'statec -- next state is ',nextst
          if (nextst.eq.1) then
                                call cmdmai
          else if (nextst.eq.2) then
                                call drawst
          else if (nextst.eq.3) then
                                call drcmap
          else if (nextst.eq.4) then
                                call inqsta
          else if (nextst.eq.5) then
                                call dispro
          else if (nextst.eq.6) then
                                call dissca
          else if (nextst.eq.7) then
                                call discen
          else if (nextst.eq.8) then
                                call drawft
          else if (nextst.eq.9) then
                                call majors
          else if (nextst.eq.10) then
                                call minors
          else if (nextst.eq.11) then
                                call calcpr
          else if (nextst.eq.12) then
                                call sproje
          else if (nextst.eq.13) then
                                call setpro
          else if (nextst.eq.14) then
                                call erasem
          else if (nextst.eq.15) then
                                call notund
          else if (nextst.eq.16) then
                                call sscale
          else if (nextst.eq.17) then
                                call setsca
          else if (nextst.eq.18) then
                                call scente
          else if (nextst.eq.19) then
                                call setcor
          else if (nextst.eq.20) then
                                call areanf
          else if (nextst.eq.21) then
                                call incdet
          else if (nextst.eq.22) then
                                call decdet
          else if (nextst.eq.23) then
                                call incsca
          else if (nextst.eq.24) then
                                call decsca
          else if (nextst.eq.25) then
                                call erases
          else if (nextst.eq.26) then
                                call turnst
```

```
            else if (nextst.eq.27) then
                                   call execut
            else if (nextst.eq.28) then
                                   call savest
            else if (nextst.eq.29) then
                                   call closes
            else if(nextst.eq.30) then
                                   call removf
            else
                print*,'statec -- nextst not known ',nextst
                nextst = 1
            endif
        if (nextst.ne.0) go to 100
  190   continue
c       print*,'statec -- exit'
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        STORE
C
C FUNCTIONAL DESCRIPTION:           .
C
C CALLED BY:                        INTSCN, MHAND, SUBCHK
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine store
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        STOTXT
C
C FUNCTIONAL DESCRIPTION:           .
C
C CALLED BY:                        ANNOTA
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine stotxt

c       stub subroutine
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        STRIND
```

Jul 20 14:32 1989 cars .f Page 42

```
C
C FUNCTIONAL DESCRIPTION:          .
C
C CALLED BY:                       MHAND, SUBCHK
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine strind
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       SUBCAL
C
C FUNCTIONAL DESCRIPTION:          .
C
C CALLED BY:                       MHAND
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      Subroutine SUBCAL (menun,ierror)

C        (**Declare variables and common blocks**)

         Integer qcrmnu
         Common /b6/qcrmnu
         common /logseg/ nsglog
         logical logoon
         common /logoon/logoon
         logical sys
         common /sysdbc/ sys

         if (sys)
     +      print*,'subcal -- enter  menun qcrmnu : ',menun,qcrmnu
C        (**Draw menu**)
         mensav = qcrmnu
         call drawm (menun,ierror)
         if (ierror.eq.0) then
C           (**Execute appropriate menu controller**)
            if (qcrmnu.eq.1) then
               if (logoon) then
                 call jvisbl (nsglog,1)
                 call MMCON
                 call jvisbl (nsglog,0)
                 logoon = .false.
                 call jpurge (nsglog)
               else
                 call MMCON
               endif
            else if (qcrmnu.eq.2) then
               call GEOCON
```

Jul 20 14:32 1989 cars .f Page 43

```
            else if (qcrmnu.eq.3) then
               call FTRCON
            else if (qcrmnu.eq.4) then
               call OVRCON
            else if (qcrmnu.eq.5) then
               call PROCON
            else if (qcrmnu.eq.6) then
               call DETCON
            else if (qcrmnu.eq.7) then
               call RSLCON
            else if (qcrmnu.eq.8) then
               call RESCON
            else if (qcrmnu.eq.9) then
               call TRKCON
            else if (qcrmnu.eq.19) then
               call CLASS
               call mesg(1)
            else if (qcrmnu.eq.20) then
               call recdis
            else if (qcrmnu.eq.21) then
               call savdis
            else
               ierror = 3
               print*,'Missing menu controller for menu number ',qcrmnu
C              (**Else qcrmnu value is invalid, execute system**)
C              (**error routine                                **)
c              call MESG(1)
c              (**Set current menu back to previous menu**)
               qcrmnu = mensav
            endif
C           (**End case**)
         endif
         if (ierror.ne.0) then
            call mesg(ierror)
            call paws
         endif
         if (sys)
     +   print*,'subcal -- exit  ierror: ',ierror
      End


C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    subchk
C
C FUNCTIONAL DESCRIPTION:       Do essential check functions.
C
C INPUT FILES/PARAMETERS:
C     Menu control globals
C       qcancl      b1        logical  cancel flag
C       qext2m      b1        logical  exit to main menu flag
C       qretrn      b1        logical  return to previous action/menu
C
C     General globals
C       qfb         butons    integer  array of values for function buttons
C       qmb         butons    integer  array of values for the mouse buttons
C
```

```
C
C
C OUTPUT FILES/PARAMETERS:
C
C     error                       logical  true if an error is detected by
C                                          check
C     rflag                       logical  true if exiting the calling menu
C
C SUBROUTINES/FUNCTIONS CALLED
C
C     prompt                      displays a message on the screen and
C                                 gets input from the user
C     redraw                      clear the screen and redraw it from segment
C                                 storage
C     tmpstr                      temporary store the graphic
C
C
C CALLED BY:                        CHECK, HELP
C
C LOCAL VARIABLES:
C
C     ans                         char     answer returned from a prompt
C     button                      integer  button passed to check
C     cmenu                       integer  menu id of routine calling check
C     len                         integer  length of the answer returned
C                                          by a prompt
C
C RESTRICTIONS:
C
C
C ABNORMAL RETURN CONDITIONS:       n/a
C
C LOCATION:                         /u2/say/TEXT/source/check.f
C
C PROGRAMMER:                       DATE OF LAST CHANGE      REASON FOR CHANGE
C
C     SAYates                              10/27/83          initial entry
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine subchk (button,cmenu,error,rflag)

c     Do essential check functions

c*****definition and declaration of common blocks

      integer     qnextm
      logical     qcancl,qext2m,qretrn,qstmnu,qexitg
      common/b1/qcancl,qext2m,qretrn,qstmnu,qnextm
      common/b5/qexitg

      integer     qfb(26),qmb(4)
      common/butons/qfb,qmb

      common /msgold/ msgold,msgonm
```

Jul 20 14:32 1989 cars .f Page 45

```
      integer     qsegid,qpick
      logical     qmodfl
      common/picks/qsegid,qpick,qmodfl

c*****declaration of local variables

      integer     cmenu,button,len
      logical     rflag,error
      character*1 ans
      logical sys
      common /sysdbc/ sys

      if (sys) print*,'subchk -- enter ',button,cmenu

      qretrn = .false.
      rflag = .false.
      error = .false.


c*****beginning of routine

c*****leave
c      if((button .eq. qfb(26) .or. button .eq. qmb(2))
      if((button .eq. qfb(26) .or. button .eq. qmb(3))
     +      .and. cmenu .ne. 1) then
         qretrn = .true.
         rflag = .true.
c*****exit to main menu
      else if(button .eq. qfb(22)) then
         call prompt(4,ans,1,len)
         if(ans(1:1) .eq. 'y' .or. ans(1:1) .eq. 'Y') then
            qext2m = .true.
         endif
c*****temporary store
      else if(button .eq. qfb(25)) then
         call mesg(74)
         call store
         call strind
         if(qretrn) then
            rflag = .true.
         endif
         qretrn = .false.
c*****cancel
      else if(button .eq. qfb(21)) then
         call prompt(360,ans,1,len)
         if(ans .eq. 'y' .or. ans .eq. 'Y') then
            qcancl = .true.
         endif
c*****redraw
      else if(button .eq. qfb(20)) then
         call redraw
c*****exit graphics
      else if (button .eq. 95) then
         call prompt(4,ans,1,len)
         if(ans(1:1) .eq. 'y' .or. ans(1:1) .eq. 'Y') then
            qexitg = .true.
```

Jul 20 14:32 1989 cars f Page 46

```
         else
            call menupr
         endif
      else
         error = .true.
      endif
      if (qcancl.or.qext2m.or.qexitg) rflag = .true.
      if (sys) print*,'subchk -- exit ',error,rflag
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        SUPBOX
C
C FUNCTIONAL DESCRIPTION:           .
C
C CALLED BY:                        PLTSUP
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine supbox(trec)

c     this subroutine is called to turn invisible a box around a plot which has
c     been suppressed. (jit)

      integer     tnum

      character*9 tbuf
      character*160 trec

      character*2 actmrk(260)
      integer*4 mrkcnt
      integer*4 trklst(260)
      integer*4 curseg(260)
      character*9 boxdtg(260)
      logical boxvis(260)

      common /actmrk/ trklst,mrkcnt,actmrk,curseg,
     +                boxdtg, boxvis

c     pull out the date time group from the record.

      read(trec,10) tnum,tbuf
   10 format(17x,i4,a9)

      do 20 i = 1,mrkcnt
         if (tnum .eq. trklst(i)) then
c            print *, 'trklst(i) is ', trklst(i)
c            print *, 'curseg(i) is ', curseg(i)
c            print *, ' '
           if (boxdtg(i) .eq. tbuf) then
              call jvisbl(curseg(i),0)
              boxvis(i) = .false.
```

```
            endif
         endif
  20  continue

      return

      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SYSNAM
C
C FUNCTIONAL DESCRIPTION:       RETURNS A PATHNAME FOR HLDF FILE WITHIN
C                               SYSTEM ADMINISTRATOR'S DIRECTORY
C
C INPUT PARAMETERS:
C
C   OLDNAM  -  CHAR*(*)  NAME OF HLDF FILE
C
C OUTPUT PARAMETERS:
C
C   NEWNAM  -  CHAR*(*)  COPY OF HLDF FILE BEING PRINTED IN SYSTEM
C                        ADMINISTRATOR'S DIRECTORY
C
C CALLED BY:
C
C   INTSCN - CHANGES VIEWPORT TO FULL SCREEN, REDRAWS PICTURE, SAVES FILE
C            IN SYSTEM ADMINISTRATOR'S DIRECTORY
C
C LOCAL VARIABLES:
C
C   I - INCREMENT THROUGH CHARACTER STRING OF NAMED HLDF FILE
C   LENGTH - THE MAXIMUM LENGTH TO INCREMENT THROUGH NAMED HLDF FILE
C
C RESTRICTIONS:
C
C   APOLLO DEPENDENT SUBROUTINE
C
C WRITTEN BY:
C
C    PROGRAMMER            DATE       REASON FOR CHANGE
C   DIRK BUTSON           850116        INITIAL ENTRY
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE SYSNAM(OLDNAM,NEWNAM)
C
C  RENAMES QNAME TO SAVE HLDF FILE IN SYSTEM ADMINISTRATOR'S DIRECTORY
C
      CHARACTER*(*) OLDNAM,NEWNAM
      INTEGER I,LENGTH

      NEWNAM(1:12) = '/A21/SYSTEM/'
      I = 1
      LENGTH = MIN ( LEN(NEWNAM)-12 , LEN(OLDNAM))
C ---- LOOP UNTIL END OF FILE NAME OR ALL OF SPACE FOR EITHER
```

Jul 20 14:32 1989 cars .f Page 48

```
C       CHARACTER STRING IS FILLED
   10 CONTINUE
      IF (I .LE. LENGTH .AND. OLDNAM(I:I) .NE. ' ') THEN
          NEWNAM((12+I):(12+I)) = OLDNAM(I:I)
          I = I+1
          GOTO 10
      ENDIF
      RETURN
      END


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    TIMCHK
C
C FUNCTIONAL DESCRIPTION:       .
C
C CALLED BY:                    DATPOL
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine timchk
c
c     this subroutine checks if at least one minute has gone by
c     on the system clock since this routine was last called.
c     IF so, it fades out all tracks that are no longer in the fade time window
c

      logical click
      logical done
      character*9 curdtg
      character*9 olddtg

      character*160  trkrec (1000)
      common /trkrec/ trkrec
      integer trkndx (1000)
      common /trkndx/ trkndx
      integer tfaddx
      integer tfadtm
      common /tfadez/ tfaddx, tfadtm
      character*9 tfddtg
      common /tfddtg/ tfddtg
      integer numrcs
      common /numrcs/ numrcs
      integer tnewst
      integer toldst
      common /tarbou/ tnewst, toldst
      integer bgnpos
      integer endpos
      common /timpos/ bgnpos,endpos
      logical trackn
      common /trkdbc/ trackn

c
c      curdtg - current time from system clock
```

```
c      tfddtg - latest time that can be on the list to be displayed
c      olddtg - oldest time currently on the list being displayed
c      tfaddx - index to oldest non-faded track on the display list
c      click  - true if 1 min. has gone off clock since last check
c
c      check for a time click (one minute) gone by

       if (trackn)  print *, 'enter timchk'

c      if tfaddx is 0 then either no data on list or nothing visible

       if (tfaddx .ne. 0) then
          call chkclk(click,curdtg)
          if(click) then

c              function to compute cur. time - fade time
c              so that all tracks not in time range can
c              be set invisible.
c              tfddtg is globally used

               call fadtim(curdtg, tfddtg)
c
c              turn off all tracks that are later than lasdtg
c
               done = .false.
 100           if (done) goto 200
c                 get oldest dtg on current display list

                  olddtg(1:9) = trkrec(trkndx(tfaddx))(bgnpos:endpos)

c                 flag is true if first time is later than second

                  call cmptim(olddtg,tfddtg, done)

c                 when lasdtg is older than olddtg, we must
c                 make the track containing olddtg invisible

                  if (.not. done) then
                       if (trackn) then
                           print*,'timchk-- oldtime= ',olddtg
                           print*,'         fadtime= ',tfddtg
                           print *, '   tfaddx = ', tfaddx
                       end if

                       call makinv(tfaddx)
c
c***                    jit: Check to see if point is most recent for that track.
c***                    If it is, then delete box also.
c
                       call fadbox(tfddtg)
c
c                      check for end of circular list
c
                       if (tfaddx .eq. tnewst) then
                           done = .true.
```

Jul 20 14:32 1989 cars .f Page 50

```
                          tfaddx = 0
c
c                      check for nothing left on list, set tfaddx as flag
c
                      else
                          tfaddx = mod(tfaddx,numrcs) + 1
                      endif
                 endif
             goto 100
 200         continue
         endif
      endif

      if (trackn)  print *, 'exit timchk'

      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   TKINFO
C
C FUNCTIONAL DESCRIPTION:       .
C
C CALLED BY:                   FINDTK, TQUERY
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine tkinfo(chkndx,chkseg)

c
c     this subroutine prints info related to the track being interrogated
c     into the communications area
c
      character*160 line
      character*160 newlin
      character*7 lat
      character*8 lon

      integer button
      integer chkndx
      integer chkseg
      integer icolcm
      integer maxcol
      integer maxtxt
      integer tempseg
      integer trkcol

      integer latbeg,lonbeg,trkbeg,dtgbeg
      integer wrnbeg,pdgbeg,serbeg,repbeg
      integer fdibeg,altbeg,iffbeg,spdbeg
      integer latend,lonend,trkend,dtgend
      integer wrnend,pdgend,serend,repend
      integer fdiend,altend,iffend,spdend
```

Jul 20 14:32 1989 car: .f Page 51

```
      real qcxmn
      real qcymn
      real qcxmx
      real qcymx
      common/comwdo/qcxmn,qcymn,qcxmx,qcymx

      character*160  trkrec (1000)
      common /trkrec/ trkrec
      integer trkndx(1000)
      common /trkndx/ trkndx

      logical timout
      integer*2 time
      common /timout/ timout,time

      integer qdsdev,qpydev,qecho,qlecho
      common /device/ qdsdev,qpydev,qecho,qlecho
      logical boxon
      integer boxcur
      common /boxcur/ boxon,boxcur


      data latbeg,lonbeg,trkbeg,dtgbeg /3,10,18,22/
      data wrnbeg,pdgbeg,serbeg,repbeg /31,36,38,40/
      data fdibeg,altbeg,iffbeg,spdbeg /42,45,48,50/

      data latend,lonend,trkend,dtgend /9,17,21,30/
      data wrnend,pdgend,serend,repend /35,37,39,41/
      data fdiend,altend,iffend,spdend /44,47,49,52/
      data icolcm /16/
      data maxcol /53/
      data maxtxt /134/
      data trkcol /224/

      line = ' '
      line(1:maxtxt) = trkrec(trkndx(chkndx))(1:maxtxt)
      newlin = ' '
c
c***  add blanks to the text line between each field of data
c
      newlin(1:maxcol) = line(latbeg:latend)//' '//line(lonbeg:lonend)//'  '//
     +                   line(trkbeg:trkend)//' '//line(dtgbeg:dtgend)//' '//
     +                   line(wrnbeg:wrnend)//' '//line(pdgbeg:pdgend)//' '//
     +                   line(serbeg:serend)//' '//line(repbeg:repend)//' '//
     +                   line(fdibeg:fdiend)//' '//line(altbeg:altend)//' '//
     +                   line(iffbeg:iffend)//' '//line(spdbeg:spdend)
c
c     move to geographics area and
c     box the current plot that is being interrogated

      lat = line(latbeg:latend)
      lon = line(lonbeg:lonend)
      call gravpt
      call geowin
c
```

```
c***  boxon is set in fmain to false initially, to indicate
c***  that no box has ever been drawn around an interrogated
c***  track.  When the box is drawn for first time, get a
c***  segment# and use it every time for an interrogated plot.
c
      if (.not. boxon) then
            call getseg(boxcur)
            boxon = .true.
      endif

      call jropen(boxcur)
      call xcolor (trkcol)
      call hilplt(lat,lon)
      call jrclos
c
c***  move to communications area viewport,
c***  and put up text from track record.
c
      call comvpt
      call comwin
      call mesg(1203)
      call getseg(tempseg)

      call jropen(tempseg)
      call jmove(qcxmn + .6,qcymx - 1.3)
      call xsize (1.,1.)
      call xcolor (icolcm)
      call jlstrg(newlin(1:maxcol))
      newlin(1:80) = line(maxcol+1:maxtxt)
      call jmove(qcxmn + .6,qcymx - 2.6)
      call jlstrg(newlin(1:80))
      call jrclos
c
c***  wait for user to hit <f8> to continue
c
c***  set wait time to 360 so that data stays on screen for that long
c
      call buttn(button)
c
c***  set time back to 15 so that incoming tracking data gets checked
c***  every 15 seconds, as usual.
c
      call jpurge(boxcur)
      call jpurge(tempseg)
      call clrmsg


      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    tocaps
c
c  Functional Description:
c       this subroutine converts a character string to all caps for letters
```

Jul 20 14:32 1989 cars f Page 53

```
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                    GETCMD, LLCENT, PLTCIT, SHOWNM,
C                                CLASS, OTHCLS
c
c  Local Variables: N/A
c
c  Restrictions: N/A
c
c  Abnormal Return Conditions:  N/A
c
c  Location:      /a21/dave
c
c  Programmer        Date of Last Change      Reason for Change
c
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine tocaps (char,len)
c
c     this subroutine converts a character string to all caps for letters
c
      character*(*) char
      character*1 ch1
      character*26 small,large
      data small/'abcdefghijklmnopqrstuvwxyz'/
      data large/'ABCDEFGHIJKLMNOPQRSTUVWXYZ'/
c
c     print*,'tocaps -- enter ',char(1:len),'   ',len
      do 110 i=1,len
          ch1 = char(i:i)
          indx = index(small,ch1)
          if (indx .ne. 0) then
              char(i:i) = large(indx:indx)
          endif
110   continue
c     print*,'tocaps -- exit  ',char(1:len),'   ',len
c
      return
      end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    tolowr
c
c  Functional Description:
c      this subroutine converts a character string to all lower case
c
c  Called By:                    SETDBG
c
c  Programmer        Date of Last Change      Reason for Change
```

Jul 20 14:32 1989 cars .f Page 54

```
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine tolowr (char,len)
c
c       this subroutine converts a character string to all lower case
c
        character*(*) char
        character*1 chl
        character*26 small,large
        data small/'abcdefghijklmnopqrstuvwxyz'/
        data large/'ABCDEFGHIJKLMNOPQRSTUVWXYZ'/
c
c       print*,'tolowr -- enter ',char(1:len),'   ',len
        do 110 i=1,len
            chl = char(i:i)
            indx = index(large,chl)
            if (indx .ne. 0) then
                char(i:i) = small(indx:indx)
            endif
110   continue
c       print*,'tolowr -- exit  ',char(1:len),'   ',len
c
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      TQUERY
C
C FUNCTIONAL DESCRIPTION:         .
C
C CALLED BY:                      TRKCON
C
C PROGRAMMER:                     DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine tquery

c
c     this subroutine allows user to interrogate a visible track
c     on the screen to retrieve more info on the track.
c
      logical abort
      logical endlst
      logical found

      integer chkndx
      integer chkseg
      integer pickid
      integer lctrak
      integer segnam

      integer qfb(26)
      integer qmb(4)
```

```
Jul 20 14:32 1989  cars'  f Page 55

      common /butons/ qfb,qmb
      integer ltypov (16)
      logical ltonov (16)
      logical rankt (26, 16)
      common /maptoo/ ltypov, ltonov, rankt
      integer tkoset
      common /tkoset/ tkoset
      integer trkndx(1000)
      common /trkndx/ trkndx
      integer tfaddx
      integer tfadtm
      common /tfadez/ tfaddx, tfadtm
      integer tnewst
      integer toldst
      common /tarbou/ tnewst, toldst
      integer numrcs
      common /numrcs/ numrcs
      logical trackn
      common /trkdbc/ trackn

      data lctrak  /3/

c
c      if tracking  is on ... proceed with operations
c
       if (ltonov(lctrak)) then
c
c          ask user to pick a track for interrogation
c
           abort = .false.

           if (trackn) then
              print*,'tquery- tnewst/abort= ',tnewst,abort
           end if

 100       if (abort) goto 200
              if (tnewst .ne. 0) then
                  call mesg(1237)
                  call pick(ibuttn, segnam, pickid)
                  if (ibuttn .ne. 8 .and. ibuttn .ne. qfb(26)) then
                  .   if (trackn) then
                         print*,'in tquery-segnam/tfaddx/tnewst = ',
     +                          segnam,tfaddx,tnewst
                      end if
                      chkndx = mod(tfaddx,numrcs) - 1
                      found = .false.
                      endlst = .false.
c
c                     search list until a segment match is found
c                     or the end of the list is reached
c
 150                  if (found .or. endlst) goto 175
                          chkndx = mod(chkndx,numrcs) + 1
                          chkseg = trkndx(chkndx) + tkoset
                          if (chkseg .eq. segnam) then
                              found = .true.
```

```
Jul 20 14:32 1989  cars  .f Page 56

                          else
                              if (chkndx .eq. tnewst) then
                                   endlst = .true.
                               endif
                          endif
                      goto 150
 175                  continue
c
c                     if match is found, then print information related
c                     to that particular track in the communications area
c
                      if (found) then
                          call tkinfo(chkndx,chkseg)
                      endif
                  else
                      abort = .true.
                  endif
              else
                  abort = .true.
              endif
           goto 100
 200       continue
       endif

       return
       end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       TSTINI
C
C FUNCTIONAL DESCRIPTION:          .
C
C CALLED BY:                       INIT
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine tstini
c
c       (**Initialize variables for test of individual menus**)
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       TURNST
C
C FUNCTIONAL DESCRIPTION:          .
C
C CALLED BY:                       STATEC
C
C PROGRAMMER:                      DATE OF LAST CHANGE     REASON FOR CHANGE
c  S. Lamb                   Feb 1988                  command fix - turnst
```

```
Jul 20 14:32 1989  cars  .f Page 57

C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

       subroutine turnst
c
c      this subroutine is the 'turn' state interpreter (26)
c
       common /states/ nextst
       logical wordis,iseoc
c
       initls = nextst
c      do until nextst not = initial state
  100  continue
           call getwrd
           if (wordis('ON')) then
               nextst = 2
           else if (iseoc()) then
               nextst = 15
           else if (wordis('OFF')) then
               nextst = 25
           else
               nextst = 15
           endif
       if (nextst.eq.initls) go to 100
c
       return
       end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   TXWRIT
C
C FUNCTIONAL DESCRIPTION:      .
C
C CALLED BY:                   WRITEX
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

       subroutine txwrit(xarray,yarray,lpp,txline,lcnt)

c      this subroutine puts out textual information from a user
c      supplied input file.  The text overlays the graphics area and
c      is displayed in row order as 80 column records.


       character*80 txline(*)
       real xarray(2)
       real yarray(2)
       integer*4 boxseg
       integer*4 edgcol
       integer*4 txtseg
       integer*4 ibuttn
       integer*4 maxlen
       integer*4 lcnt
```

Jul 20 14:32 1989 cars f Page 58

```
      integer*4 lpp
      integer*4 page
      integer*4 mysegn
      integer*4 nxtpag
c      integer*4 polcol
      integer*4 qbox,qbkgrd,qmcolr
      common/scratr/qbox,qbkgrd,qmcolr
      integer*4 prvpag
      logical rflag
      common/butons/qfb,qmb
      integer qfb(26),qmb(4)

c  jit  nplane used to check for polygon fill.
      common /nplane/ nplane

      data edgcol /32/
c      data polcol /0/
      data maxlen /20/

      call geowin
      call gravpt

c     create new seg for filled polygon and
c     create new seg for text data

      call getseg(boxseg)
      call getseg(txtseg)
c      call jrclos

c     draw the rectangle to block out current
c     geographic data and move to first text position

      call jropen(boxseg)

c     this is a gold rectangle w/ background color of grey

      call xcolor(edgcol)
c      call jpidex(polcol,500)
      call jpidex(qbkgrd,500)
c  If on 4 plane node, then don't fill the polygon.
      if (nplane .ne. 4) then
         call jpintr(1)
      else
         call jpintr(0)
      endif

      call jrect(xarray(1)+.5,yarray(1)+.5,xarray(2)-.5,yarray(2)-.5)
      call jsize(1.,2.)
      call jjust(1,1)
      call jrclos

      nxtpag = qfb( 15 )
      prvpag = qfb( 16 )
      rflag = .false.
      page = 1
```

Jul 20 14:32 1989 cars .f Page 59

```
c       read each line in the file up to page limit or end of file
c       and display the text in the graphics area.

        call distxt(txtseg,txline,page,lpp,lcnt)

c       Initialize the constants 'next page' and 'previous page' to their
c       function buttn values.

 150    continue
           call mpick( ichoic, mysegn, ibuttn)

c          Check to see if one of the paging buttons has been picked.

           if ((ibuttn.eq.nxtpag).or.(ibuttn.eq.prvpag)) then

c               If a paging button has been picked but no paging can occur
c               because # of lines < lines per page, then inform user.

                if( lcnt .lt. lpp ) then
c                     "No previous/last page."
                      call mesg( 495 )
                      call paws
                      call clrmsg
                      call geowin
                      call gravpt


c               Else if 'ibuttn' = next page, then increment 'page'
c               and call 'distxt'.

                else if ( ibuttn.eq.nxtpag ) then
                     if ( page .lt. (int(lcnt / lpp)) + 1 ) then
                        page = page + 1
                        call jpurge(txtseg)
                            call redraw
                        call distxt(txtseg,txline,page,lpp,lcnt)

c                    If no more pages to scroll down, inform user.

                     else
c                       "This is the last page."
                         call mesg( 571 )
                         call paws
                         call clrmsg
                         call geowin
                         call gravpt
                     endif

c                    Else if 'ibuttn' = previous page, then decrement 'page'
c                    and call 'distxt'.

                else if ( ibuttn .eq. prvpag ) then
                     if ( page .gt. 1 ) then
                        page = page - 1
                        call jpurge(txtseg)
                            call redraw
```

```
                        call distxt(txtseg,txline,page,lpp,lcnt)

c                        If no more pages to scroll up, inform user.

                     else
c                       "This is the first page."
                        call mesg( 570 )
                        call paws
                        call clrmsg
                        call geowin
                        call gravpt
                     endif
                  endif

c                 Else, check for a system menu call.

               else
                  call check( ibuttn, mysegn, error, rflag )
                  if (rflag ) then
                     goto 180
                  endif
               endif
               goto 150
180         continue
            call jpurge(txtseg)
            call jpurge(boxseg)
                call redraw

            return
            end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      UPDTMP
C
C FUNCTIONAL DESCRIPTION:         .
C
C CALLED BY:                      BOXARE, INTSCN, LLCENT
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

            subroutine updtmp

c           substitute for CELEBRATION updtmp

            call drwmap

            return
            end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      VISCHK
C
```

```
Jul 20 14:32 1989  carr  .f Page 61

C FUNCTIONAL DESCRIPTION:         .
C
C CALLED BY:                      NO LONGER USED BY CARICATURE
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine vischk (length,vizibl,savef,newlat,newlon,longfl,
     1                   alat,alon,df,arc,itproj,icnt)

c     This subroutine divides the bearing into 10 parts of equal
c     length (i.e. if the bearing is to be drawn for 90 degrees,
c     one quarter of a great circle, then the bearing is divided
c     into segments of 9 degrees each).  It checks each of the 10
c     segments to see if any part of that segment is on the screen.
c
      real LNP,LNM,L0
      real minlat,maxlat,minlon,maxlon,length,newlat(30),newlon(30)
      real alimit(4),savef(30)
      integer icnt
      logical vizibl(30),longfl,chinv,allinv,someon
      common/constx/sazi,slat,cosazi,scazi,coslat,sinazi,cosi,
     1             sini,cosl0,cosf0,L0,lnp,lnm,f,f0
c     chinv = .true.

      do 200 i=1,icnt
         savef(i) = f
         call nextpt (longfl,alat,alon,df,arc,itproj)
         newlat(i) = alat
         newlon(i) = alon
         maxlat = alat
         maxlon = alon
         f = f + length/real(icnt)
         call nextpt (longfl,alat,alon,df,arc,itproj)
         if (maxlat .lt. alat) then
            minlat = maxlat
            maxlat = alat
         else
            minlat = alat
         endif
         if (maxlon .lt. alon) then
            minlon = maxlon
            maxlon = alon
         else
            minlon = alon
         endif

         alimit(1) = minlat
         alimit(2) = maxlat
         alimit(3) = minlon
         alimit(4) = maxlon

         chinv = .true.

         call checka(chinv,allinv,someon,alimit)
```

Jul 20 14:32 1989 cars f Page 62

```
c        print*,'After checka -- chinv,allinv,someon,alimit : ',
c     +  chinv,allinv,someon,alimit

         if (someon) then
            vizibl(i) = .true.
         else
            vizibl(i) = .false.
         endif

  200 continue

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      WORDIS
C
C FUNCTIONAL DESCRIPTION:         .
C
C CALLED BY:                      21 subroutines
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        logical function wordis (testwd)
c
c       this function compares the current word to a test word
c
        character*(*) testwd
        logical eol,eoc
        common /comnds/ lenl,indxw,lenw,eol,eoc
        character * 80 comlin
        common /comlin/ comlin
c
c       print*,'wordis -- enter ',testwd,lenw
        lent = len(testwd)
        if (lenw.gt.lent.or.lenw.le.0.or.
     +  comlin(indxw:indxw+lenw-1).ne.testwd(1:lenw)) then
            wordis = .false.
        else
            wordis = .true.
        endif
c       print*,'wordis -- exit ',wordis
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     writch

c  Functional Description:
c       this subroutine writes to ifl in character format
```

Jul 20 14:32 1989 cars f Page 63

```
c
c  Input Files/Parameters:

c  Output Files/Parameters: N/A

c  Subroutines/Functions Called:

c  Called By:                    SAVTXT, SPARAM, WSAVPR

c  Local Variables: N/A

c  Restrictions: N/A

c  Abnormal Return Conditions:  N/A

c  Location:      /a21/dave

c  Programmer          Date of Last Change       Reason for Change
c  CS Lamb             1987           system dependent code - writch

C-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine writch (ifl,charar,len,ierror)

c       this subroutine writes to ifl in character format

        character*(*) charar

        ierror = 0
C        write(ifl,*,err=199) '''',charar (1:len),''''
        write(ifl,1100,err=199) charar (1:len)
c ----- updated 7/31/87 CSL
C       USE THIS FORMAT FOR APOLLO, VAX, ...
c 1100   format(' ''', (a), '''')
C       USE THIS FORMAT FOR SUN
 1100   format("'", (a), "'")
c1100   format(a<len>)
        go to 200
  199       continue
            ierror = 2
c           call derror(30,'Problem writing parameter     ',.true.,5,ch)
  200   continue
c       print*,'writch -- charar,len,ierror : ',len,ierror

        return
        end

C+*+*+*+*+*+*+*+*+*+*+*+*+*+*+*+*+*+*+*+*+*+*+*+*+*+*+*+*+*+*+*+*+*+*+*+*+*|+*+*+*+*+
C UNIT NAME:                    WRITEX
C
C FUNCTIONAL DESCRIPTION:       .
C
C CALLED BY:                    TRKCON
C
C PROGRAMMER:                   DATE OF LAST CHANGE     REASON FOR CHANGE
```

```
Jul 20 14:32 1989  cars   f Page 64

C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine writex(xarray,yarray,lpp)

        real xarray(2)
        real yarray(2)
        integer lpp
        character*20 filen
        character*80 txline(300)
        integer maxlen
        integer lunnum
        data lunnum /18/
        data maxlen /20/

c
c       prompt for file name to be read
c
        CALL PROMPT (1208,filen,MAXLEN,lenf)
        if (lenf .le. 0) then
           goto 400
        endif
        call clrmsg
c
c       open file and set graphics viewport
c
        open(unit=lunnum,file=filen(1:lenf),err=200,status='old')
        rewind(lunnum)

        lcnt = 0
        do 100 i= 1, 300
             txline(i) = ' '
             read(lunnum,10,err=110,end=110) txline(i)
 10          format(a80)
             lcnt = lcnt + 1
 100    continue
 110    close(lunnum)

        call txwrit(xarray,yarray,lpp,txline,lcnt)
        goto 400

200     print*,'could not open file for text output'
        goto 400
300     print*,'error in reading from text output file'

400     continue
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   writin

c  Functional Description:
c       this subroutine writes to ifl in integer format (I5)
c
```

Jul 20 14:32 1989 cars f Page 65

```
c  Input Files/Parameters:

c  Output Files/Parameters: N/A

c  Subroutines/Functions Called:

c  Called By:                    SPARAM, WSAVPR

c  Local Variables: N/A

c  Restrictions: N/A

c  Abnormal Return Conditions:  N/A

c  Location:      /a21/dave

c  Programmer        Date of Last Change       Reason for Change

C-*-*-*-*-*-*-*-*-*-*-*-*-*-*-*-*-*-*-*-*-*-*-*-*-*-*-*-*-*-*-*-*-*-*-*|*-*-*-*-

        subroutine writin (ifl,iarray,len,ierror)

c       this subroutine writes to ifl in integer format (I5)

        integer iarray(*)

        ierror = 0
        write(ifl,*,err=199) (iarray(i),i=1,len)
c       write(ifl,1100,err=199) (iarray(i),i=1,len)
c1100   format(<len>i5)
        go to 200
  199       continue
            ierror = 2
            print*,'Error on writin ',len,iarray(1)
c           call derror(30,'Problem writing parameter     ',.true.,5,ch)
  200   continue
c       print*,'writin -- iarray,len,ierror : ',(iarray(i),i=1,len),len,ierror

        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    WRITIT
C
C FUNCTIONAL DESCRIPTION:       .
C
C CALLED BY:                    SAVARC, SAVCIR, SAVE
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine writit(ifl,iarray,len,ierror)

c       this routine writes a passed array to a file in I3 format
```

```
c     VARIABLES:
c       iarray- points to be written to file
c       ifl- logical unit number of the file to be accessed
c       ierror- integer flag set if error occurs during write


        integer iarray(*),ifl,ierror

c       initialize error to off
        ierror = 0

        write(ifl,1100,err=199) (iarray(i),i=1,len)
 1100   format(100i3)
        go to 200

  199   continue
          ierror = 2

 200   continue
       return
       end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      writre

c  Functional Description:
c       this subroutine writes to ifl in real format
c
c  Input Files/Parameters:

c  Output Files/Parameters: N/A

c  Subroutines/Functions Called:

c  Called By:                      SPARAM

c  Local Variables: N/A

c  Restrictions: N/A

c  Abnormal Return Conditions:  N/A

c  Location:       /a21/dave

c  Programmer         Date of Last Change       Reason for Change

C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine writre (ifl,rarray,len,ierror)

c       this subroutine writes to ifl in real format

        real rarray(*)

c       print*,'Enter writre ',len
```

Jul 20 14:32 1989 cars .f Page 67

```
        ierror = 0
c       write(ifl,*,err=199) (rarray(i),i=1,len)
        write(ifl,1100,err=199) (rarray(i),i=1,len)
 1100   format(4f12.5)
        go to 200
  199       continue
            ierror = 2
            print*,'Error on writre ',len,rarray(1)
c           call derror(30,'Problem writing parameter      ',.true.,5,ch)
  200   continue
c       print*,'writre -- rarray,len,ierror : ',(rarray(i),i=1,4),len,ierror

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    wsavpr
c
c  Functional Description:
c       write save file parameters
c
c  Input Files/Parameters:
c
c  Output Files/Parameters: N/A
c
c  Subroutines/Functions Called:
c
c  Called By:                    FMAIN
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine wsavpr (len,name)
c
c       write save file parameters
c
        character*(*) name
        character*80 savdes(20),filenm
        common /savdes/ savdes
        common /maxsav/ maxsav,limsav
        data ifl/9/,irdwr/0/
c
        filenm = name(1:len) // '.des'
        call openit (filenm,len+4,ifl,irdwr,ierror)
        if (ierror.ne.0) then
            print*,'Error on save descriptor open - using default'
```

```
            call openit ('default.des',11,ifl,irdwr,ierror)
            if (ierror.ne.0) go to 150
        endif
        call writin (ifl,maxsav,1,ierror)
        if (ierror.ne.0) go to 150
        if (maxsav.gt.0) then
            do 110 i=1,maxsav
                call writch (ifl,savdes(i),80,ierror)
                if (ierror.ne.0) go to 150
  110       continue
        endif
  150   continue
        call closit (ifl)
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     XCOLOR
C
C FUNCTIONAL DESCRIPTION:        .
C
C CALLED BY:                     34 subroutines
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine xcolor(index)
        integer index,coltab(256)
        common /coltab/ coltab
        common/oneflg/oneflg
        logical oneflg

        if(oneflg)then
                call jcolor(1)
        else
                call jcolor(coltab(index+1))
        endif
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     XPIDEX
C
C FUNCTIONAL DESCRIPTION:        .
C
C CALLED BY:                     BOXCLR, CLRBVP, CLRVPT, DMAPII, DRICON
C                                SETCOL
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-
```

Jul 20 14:32 1989 car :.f Page 69

```
        subroutine xpidex(index,inten)
        integer index,inten,coltab(256)
        common /coltab/ coltab
        call jpidex(coltab(index+1),inten)
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       XSIZE
C
C FUNCTIONAL DESCRIPTION:          .
C
C CALLED BY:                       CREATM, CRMESG, DISP5, MESGJF,
C                                  RECDIS, SAVDIS, SETFAD, TKINFO
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine xsize(x,y)
c
c       allows the system administrator to change the text size
c       of menus and messages
c
        common /txtsz/ txtsiz

        w = y * txtsiz
        z = x * txtsiz
        call jsize(z,w)
        return
        end
```

```
C+*+*+*+*+*+*+*+*+*+*+*+*+*+*+*+*+*+*+*+*+*+*+*+*+*+*+*+*+*+*+*+*+*+*|*+*+*+*+
C UNIT NAME:                  FLSPLY
C
C FUNCTIONAL DESCRIPTION:     Processes a polygon which has been catenated
C                             from WDBII file and appended with data from
C                             the polygon fill file.  Polygons intersecting
C                             a map breakline are clipped into sections.
C
C INPUT FILES/PARAMETERS:     code        - Tells how polygon was catenated.
C                             lton(16)    - WDBII line types switched on.
C                             noclip      - No conic breakline flag.
C
C GLOBAL VARIABLES:           xplp,yplp   - Catenated polygon lon,lat coords.
C                             iplp        - Ptr to last point in WDB section.
C                             aplp        - Ptr to last point in ADD section.
C
C OUTPUT FILES/PARAMETERS:    Polygon is output to the display.
C
C SUBROUTINES CALLED:         llplxy,jpoly,jpolgn,blplin,blplgn
C
C CALLED BY:                   DMAPII
C
C LOCAL VARIABLES:
C
C RESTRICTIONS:               none.
C
C ABNORMAL RETURN CONDITIONS: none.
C
C PROGRAMMER:                 DATE OF LAST CHANGE     REASON FOR CHANGE
C     Tom Wescott (NOSC)      Dec 87                  Original entry.
C
C-*-*-*-*-*-*-*-*-*-*-*-*-*-*-*-*-*-*-*-*-*-*-*-*-*-*-*-*-*-*-*-*-*-*-*|*-*-*-*-

      subroutine flsply(code,lton,noclip)

      logical lton(16), noclip
      integer code,null,concat,tpl,slp,eop,eos
      parameter (NULL   = 0)
      parameter (CONCAT = 1)
      parameter (TPL    = 2)
      parameter (SLP    = 5)
      parameter (EOP    = 6)
      parameter (EOS    = 7)

      include   'carmaxdim.inc'
c
c     Variables and Array for the Positive buffer
      integer   iplp,aplp
      real      xplp(IDIM),yplp(IDIM)
      common /bufptrp/ iplp,aplp
      common /bufaryp/ xplp,yplp
c
cccc
      if (code.eq.NULL.or.code.eq.TPL) then
c        This block of code is executed for two point lines or
c        lines which do not have line codes associated with them
```

Jul 20 15:23 1989 carv ıtl.f Page 2

```
c        (i.e. WDB files which have not been reordered using the
c             WDB_REORDER program).
c
         if (noclip) then
c           Transform the polygon.
            call llplxy(xplp,yplp,iplp,xplp,yplp,nout)
            iplp = nout
            if (iplp.gt.1) then
c              Draw the polygon outline.
               call jmove(xplp,yplp)
               call jpoly(xplp,yplp,iplp)
            endif
         else
c           Clip, transform, and draw the polygon outline.
            call blplin(xplp,yplp,iplp)
         endif
         call jupdat
c
      elseif (code.eq.SLP.or.code.eq.EOP) then
c        This block is executed for single and multiple line polygons
c
         if (noclip) then
c           Transform the polygon.
            call llplxy(xplp,yplp,iplp,xplp,yplp,nout)
            iplp = nout
            if (iplp.ge.3) then
c               Draw polygon with outline and fill.
                jedge = 0
                call jpolg2(xplp,yplp,iplp,jedge)
            endif
         else
c           Clip, transform, and draw polygon interior sections.
            call blplgn(xplp,yplp,iplp)
c           Clip, transform, and draw the polygon outline.
            call blplin(xplp,yplp,iplp)
         endif
         call jupdat
c
      elseif (code.eq.EOS) then
c        This block is executed when an End Of String code is encountered,
c        indicating fill file add points have been appended to the polyline.
c
         if (noclip) then
c           Transform the WDBII section.
            nin = iplp
            call llplxy(xplp,yplp,nin,xplp,yplp,nout)
            if (aplp.gt.iplp) then
c              Transform the appended section.
               nin = aplp - iplp
               j = iplp + 1
               k = nout + 1
               call llplxy(xplp(j),yplp(j),nin,xplp(k),yplp(k),nadd)
               aplp = nout + nadd
            endif
            iplp = nout
c
```

```
            maxplp = max0(iplp,aplp)
            if (maxplp.ge.3) then
c              Fill the appended polygon.
               jedge = 1
               call jpolg2(xplp,yplp,maxplp,jedge)
            endif
            if (lton(1) .and. iplp.ge.2) then
c              Draw outline for the WDBII section.
               call jmove(xplp,yplp)
               call jpoly(xplp,yplp,iplp)
            endif
c
         else
c           Clip, transform, and, fill the appended polygon.
            maxplp = max0(iplp,aplp)
            call blplgn(xplp,yplp,maxplp)
            if (lton(1) .and. iplp.ge.2) then
c              Clip, transform, and draw outline of the WDBII section.
               call blplin(xplp,yplp,iplp)
            endif
         endif
         call jupdat
      endif
c
      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     FLSPOI
C
C FUNCTIONAL DESCRIPTION:
c -         This routine displays the positive and negative point buffers.
c -         If negative buffer (XPLN and YPLN) are only displayed for
c -         Mercator and Equirectangular projections.
C
C CALLED BY:                     NO LONGER USED BY CARICATURE
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine flspoi(code,lton)

      INTEGER null,concat,tpl,slp,eop,eos
      PARAMETER (Null   = 0)
      PARAMETER (CONCAT = 1)
      PARAMETER (TPL    = 2)
      PARAMETER (SLP    = 5)
      PARAMETER (EOP    = 6)
      PARAMETER (EOS    = 7)

      LOGICAL lton(16)

      include   'carmaxdim.inc'
c
```

```
c     Variables and Array for the Positive buffer
      integer   iplp,aplp
      real      xplp(IDIM),yplp(IDIM)
      common /bufptrp/ iplp,aplp
      common /bufaryp/ xplp,yplp
c
c     Variables and Array for the Negative buffer
      integer   ipln,apln
      real      xpln(IDIM),ypln(IDIM)
      common /bufptrn/ ipln,apln
      common /bufaryn/ xpln,ypln

      INTEGER   code

      IF (code.EQ.null.OR.code.EQ.TPL) THEN
c
c        This block of code is executed for two point lines or
c        lines which do not have line codes associated with them
c        (i.e. WDB files which have not been reordered using the
c             WDB_REORDER program).
c
         IF (iplp.GT.1) THEN
            CALL jmove(xplp,yplp)
            CALL jpoly(xplp,yplp,iplp)
         ENDIF
         IF (ipln.GT.1) THEN
            CALL jmove(xpln,ypln)
            CALL jpoly(xpln,ypln,ipln)
         ENDIF
         CALL jupdat
      ELSEIF (code.EQ.SLP.OR.code.EQ.EOP) THEN
c
c        This block is executed for single and multiple line polygons
c

         IF (iplp.GE.3) THEN
             call jpedge(0)
             CALL jpolgn(xplp,yplp,iplp)
         ENDIF
         IF (ipln.GE.3) THEN
             call jpedge(0)
             CALL jpolgn(xpln,ypln,ipln)
         ENDIF
         CALL jupdat
      ELSEIF (code.EQ.EOS) THEN
c
c        This block is executed when an End Of String code is encountered.
c
         IF (aplp.GT.iplp.AND.aplp.GE.3) THEN
            call jpedge(1)
            CALL jpolgn(xplp,yplp,aplp)
         ENDIF
         if (lton(1) .and. iplp.GE.2) THEN
            CALL jmove(xplp,yplp)
            CALL jpoly(xplp,yplp,iplp)
         ENDIF
```

```
         CALL jupdat
         IF (apln.GT.ipln.AND.apln.GE.3) THEN
            call jpedge(1)
            CALL jpolgn(xpln,ypln,apln)
         ENDIF
         IF (lton(1) .and. ipln.GE.2) THEN
            CALL jmove(xpln,ypln)
            CALL jpoly(xpln,ypln,ipln)
         ENDIF
         CALL jupdat
      ENDIF

      RETURN
      END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: GETLND
C
C FUNCTIONAL DESCRIPTION:  GETS A LINE INDEX RECORD.
C
C INPUT FILES/PARAMETERS:
C
C        LUNLIN              INTEGER    LOGICAL UNIT NUMBER FOR WDBII LINE
C                                       INDEX FILE.
C        LBLK                INTEGER    BLOCK IN INDEX FILE WHERE LINES
C                                       ASSOCIATED WITH THIS AREA ARE STOR
C        LCATEG              INTEGER    CATEGORY OF LINES.
C        NLINES              INTEGER    NUMBER OF LINES.
C        RMINLA              REAL       MINIMUM LATITUDE.
C        RMAXLA              REAL       MAXIMUM LATITUDE.
C        RMINLO              REAL       MINIMUM LONGITUDE.
C        RMAXLO              REAL       MAXIMUM LONGITUDE.
C        LOFFS               INTEGER    POINTS TO CURRENT LINE WITHIN CURR
C                                       LINE INDEX RECORD.
C        EOF                 LOGICAL    END OF FILE FLAG.
C        ICNTGE              INTEGER    CURRENT LINE INDEX RECORD
C                                       WITHIN CURRENT BLOCK.
C
C GLOBAL VARIABLES :
C
C        IMINS               INTEGER    MINUTES IN 180 DEGREES.
C        C                   REAL       CONVERTS MINUTES TO RADIANS.
C        NLINDE              INTEGER    MAXIMUM NUMBER OF LINES IN LINE
C                                       INDEX RECORD.
C
C OUTPUT FILES/PARAMETERS:  NONE.
C
C SUBROUTINES/FUNCTIONS CALLED : NONE.
C
C CALLED BY: DMAPII.
C
C LOCAL VARIABLES: NONE.
C
C RESTRICTIONS: NONE.
C
```

Jul 20 15:23 1989 carw ıtl.f Page 6

```
C ABNORMAL RETURN CONDITIONS:   NONE.
C
C LOCATION:                     /gl
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C     DANIEL BERKICH (SAIC) NOSC                        Read both forms of
C                                                       Data base.
C
C-*-*-*-*-*-*-*-*-*-*-*-*-*-*-*-*-*-*-*-*-*-*-*-*-*-*-*-*-*-*-*-*-*-*-*|*-*-*-*-

       SUBROUTINE getlnd(lunlin,isblk,lblk,loffs,nlines,lcateg,
     +            rminla,rmaxla,rminlo,rmaxlo,eof)

      integer lunlin
      INTEGER   nlinde,lenlin,icntli
      COMMON    /lwdbii/ nlinde,lenlin,icntli
      INTEGER   isecs,imins
      REAL      c,cs
      COMMON    /c/ c,isecs,cs,imins
      INTEGER   ios
      INTEGER*2 segblk(8,32)
      common    /segblk/ segblk
      INTEGER   isblk
      INTEGER   sblk,soffs,lblk,loffs
      INTEGER   csblk,clblk,cpblk
      LOGICAL   va,eof
      common /inopen/ csblk,clblk,cpblk,va
      INTEGER*2 i2(2)
      INTEGER   i4
      EQUIVALENCE (i2,i4)
      INTEGER    two8
      PARAMETER (two8 = 2**8)
      REAL      rminla,rmaxla,rminlo,rmaxlo
      INTEGER   lcateg,nlines

      sblk = (isblk/nlinde) + 1
      soffs = mod(isblk,nlinde) + 1
      isblk = isblk + 1
      IF (csblk.NE.sblk) THEN
          csblk = sblk
          READ (lunlin,REC=sblk,IOSTAT=ios)
     +       segblk
         IF (ios.NE.0) THEN
            PRINT *,'GETSGM - Segment read error=',ios,'  Block=',sblk
            RETURN
         ENDIF
       ENDIF
 700   CONTINUE

      IF (va) THEN
c        Version A format (long form)
         i2(1)  =  segblk(1,soffs)
```

```
         i2(2)   =  segblk(2,soffs)
         lblk    =  i4
         lcateg =   segblk(3,soffs)/two8
         loffs   =  mod(segblk(3,soffs),two8)
         nlines =   segblk(4,soffs)
         rminla = (segblk(5,soffs)-imins)*c
         rmaxla = (segblk(6,soffs)-imins)*c
         rminlo = (segblk(7,soffs)-imins)*c
         rmaxlo = (segblk(8,soffs)-imins)*c
      ELSE
c        Version S format (short form)
         lblk    =  segblk(1,soffs)
         lcateg =   segblk(2,soffs)
         nlines =   segblk(3,soffs)
         rminla = (segblk(4,soffs)-imins)*c
         rmaxla = (segblk(5,soffs)-imins)*c
         rminlo = (segblk(6,soffs)-imins)*c
         rmaxlo = (segblk(7,soffs)-imins)*c
         loffs   =  segblk(8,soffs)
      ENDIF

      IF (nlines.LT.1) eof = .true.

      RETURN
      END


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       GETPLY
C
C FUNCTIONAL DESCRIPTION:          GETS A POLYLINE FROM WDBII FILE.
C
C INPUT FILES/PARAMETERS:
C
C        LUNDAT                    INTEGER     LOGICAL UNIT NUMBER FOR WDBII
C                                              DATA FILE.
C        PLAT                      REAL        LATITUDE OF POINT.
C        PLON                      REAL        LONGITUDE OF POINT.
C        IBLK                      INTEGER     CURRENT BLOCK OF DATA POINTS.
C        IOFFS                     INTEGER     CURRENT RECORD IN IBLK.
C        ERF                       INTEGER     ERROR CONDITION.
C
C GLOBAL VARIABLES :
C
C        ISECS                     INTEGER     MINUTES IN 180 DEGREES.
C        CS                        REAL        CONVERTS MINUTES TO RADIANS.
C        IRECDA                    INTEGER     RECORD INFO.
C        NDATAR                    INTEGER     NUMBER OF RECORDS IN BLOCK.
C        LENDAT                    INTEGER     NUMBER OF FIELDS IN EACH POINT REC
C        ICURPB                    INTEGER     CURRENT BLOCK IN DATA FILE WHERE P
C                                              ASSOCIATED WITH THIS AREA ARE STOR
C
C OUTPUT FILES/PARAMETERS:            NONE.
C
C SUBROUTINES/FUNCTIONS CALLED:       NONE.
C
```

Jul 20 15:23 1989 carw ıtl.f Page 8

```
C CALLED BY:                         NO LONGER USED BY CARICATURE
C
C LOCAL VARIABLES:                    NONE.
C
C RESTRICTIONS: NONE.
C
C ABNORMAL RETURN CONDITIONS:         NONE.
C
C LOCATION:
C
C PROGRAMMER:               DATE OF LAST CHANGE          REASON FOR CHANGE
C     Tom Wescott                  12/87                 Extension of getpoi.
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine getply(lundat,pblk,poffs,npoint,lats,lons,ios)

      INTEGER   nlinde,lenlin,icntli
      COMMON    /lwdbii/ nlinde,lenlin,icntli
      INTEGER   nindex,lenind
      COMMON    /iwdbii/ nindex,lenind
      INTEGER   ndatar,lendat
      COMMON    /dwdbii/ ndatar,lendat
      INTEGER   isecs,imins
      REAL      c,cs
      COMMON    /c/ c,isecs,cs,imins
      INTEGER   lundat,ios
      INTEGER   poiblk(2,64)
      common    /poiblk/ poiblk
      INTEGER   pblk,poffs
      INTEGER   csblk,clblk,cpblk
      LOGICAL   va
      common /inopen/ csblk,clblk,cpblk,va
      INTEGER*2 i2(2)
      INTEGER   i4
      EQUIVALENCE (i2,i4)
      INTEGER    two8
      PARAMETER (two8 = 2**8)

      INTEGER   npoint
c
      INTEGER   plyblk(128), coffs
      REAL      lats(*), lons(*)
      INTEGER   ncoord, k

c
      coffs = poffs*lendat - 1
      ncoord = ndatar*lendat
      do 110 k = 1, npoint
         if (cpblk.ne.pblk) then
            read (lundat,rec=pblk,iostat=ios)
     +      plyblk
            cpblk = pblk
            if (ios.ne.0) then
               write(*)' GETPLY-read error=',ios,'Block=',pblk
               RETURN
```

Jul 20 15:23 1989 carw ıtl.f Page 9

```
            endif
         endif
         lats(k) = (plyblk(coffs)-isecs)*cs
         lons(k) = (plyblk(coffs+1)-isecs)*cs
         coffs = coffs + 2
         if (coffs.gt.ncoord) then
            pblk = pblk + 1
            coffs = 1
         endif
 110  continue
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: GETPOI
C
C FUNCTIONAL DESCRIPTION:  GETS A POINT FROM WDBII FILE.
C
C INPUT FILES/PARAMETERS:
C
C        LUNDAT                INTEGER     LOGICAL UNIT NUMBER FOR WDBII
C                                          DATA FILE.
C        PLAT                  REAL        LATITUDE OF POINT.
C        PLON                  REAL        LONGITUDE OF POINT.
C        IBLK                  INTEGER     CURRENT BLOCK OF DATA POINTS.
C        IOFFS                 INTEGER     CURRENT RECORD IN IBLK.
C        ERF                   INTEGER     ERROR CONDITION.
C
C GLOBAL VARIABLES :
C
C        ISECS                 INTEGER     MINUTES IN 180 DEGREES.
C        CS                    REAL        CONVERTS MINUTES TO RADIANS.
C        IRECDA                INTEGER     RECORD INFO.
C        NDATAR                INTEGER     NUMBER OF RECORDS IN BLOCK.
C        LENDAT                INTEGER     NUMBER OF FIELDS IN EACH POINT REC
C        ICURPB                INTEGER     CURRENT BLOCK IN DATA FILE WHERE P
C                                          ASSOCIATED WITH THIS AREA ARE STOR
C
C OUTPUT FILES/PARAMETERS:  NONE.
C
C SUBROUTINES/FUNCTIONS CALLED : NONE.
C
C CALLED BY: DMAPII.
C
C LOCAL VARIABLES: NONE.
C
C RESTRICTIONS: NONE.
C
C ABNORMAL RETURN CONDITIONS:    NONE.
C
C LOCATION:                      /a21/gjf/L3REA.FTN
C
C PROGRAMMER:                    DATE OF LAST CHANGE     REASON FOR CHANGE
C
C     DAVE NATION                                        ORIGINAL CODE.
```

```
C      JERRY FENERTY                                        DOCUMENT AND MODIFY
C                                                           FOR A21 PROTOTYPE.
C      DANIEL BERKICH (SAIC) NOSC                           Read both forms of
C                                                           Data base.
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE getpoi(lundat,pblk,poffs,plat,plon,ios)

      INTEGER   nlinde,lenlin,icntli
      COMMON    /lwdbii/ nlinde,lenlin,icntli
      INTEGER   nindex,lenind
      COMMON    /iwdbii/ nindex,lenind
      INTEGER   ndatar,lendat
      COMMON    /dwdbii/ ndatar,lendat
      INTEGER   isecs,imins
      REAL      c,cs
      COMMON    /c/ c,isecs,cs,imins
      INTEGER   lundat,ios
      INTEGER   poiblk(2,64)
      common    /poiblk/ poiblk
      INTEGER   pblk,poffs
      INTEGER   csblk,clblk,cpblk
      LOGICAL   va
      common /inopen/ csblk,clblk,cpblk,va
      INTEGER*2 i2(2)
      INTEGER   i4
      EQUIVALENCE (i2,i4)
      INTEGER    two8
      PARAMETER (two8 = 2**8)
      REAL      plat,plon

      IF (cpblk.NE.pblk) THEN
         READ (lundat,REC=pblk,IOSTAT=ios)
     +      poiblk
         cpblk = pblk
         IF (ios.NE.0) THEN
            print *,'GETPOI - Point read error=',ios,'  Block=',pblk
            RETURN
         ENDIF
      ENDIF
      plat  = (poiblk(1,poffs)-isecs)*cs
      plon  = (poiblk(2,poffs)-isecs)*cs
      poffs = poffs + 1
      IF (poffs.GT.ndatar) THEN
         pblk  = pblk + 1
         poffs = 1
      ENDIF

      RETURN
      END

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: GTLIN
C
```

```
C FUNCTIONAL DESCRIPTION:  GETS A LINE.
C
C INPUT FILES/PARAMETERS:
C
C        LUNIND                INTEGER    LOGICAL UNIT NUMBER FOR WDBII
C                                         INDEX FILE.
C        IBLK                  INTEGER    CURRENT BLOCK OF DATA POINTS.
C        IRNK                  INTEGER    RANK OF LINE.
C        NPOINT                INTEGER    NUMBER OF POINTS IN LINE.
C        RMINLA                REAL       MINIMUM LATITUDE.
C        RMAXLA                REAL       MAXIMUM LATITUDE.
C        RMINLO                REAL       MINIMUM LONGITUDE.
C        RMAXLO                REAL       MAXIMUM LONGITUDE.
C        IOFFS                 INTEGER    CURRENT DATA POINT WITHIN IBLK.
C        LBLK                  INTEGER    BLOCK IN INDEX FILE WHERE LINES
C                                         ASSOCIATED WITH THIS AREA ARE STOR
C
C GLOBAL VARIABLES :
C
C        IMINS                 INTEGER    MINUTES IN 180 DEGREES.
C        C                     REAL       CONVERTS MINUTES TO RADIANS.
C        ICNTLI                INTEGER    CURRENT LINE INDEX RECORD.
C        IRECIN                INTEGER    RECORD INFO.
C        NINDEX                INTEGER    MAXIMUM NUMBER OF LINES IN RECORD.
C        LENIND                INTEGER    NUMBER OF FIELDS IN EACH LINE RECO
C        ICURLB                INTEGER    CURRENT BLOCK IN INDEX FILE WHERE
C                                         ASSOCIATED WITH THIS AREA ARE STOR
C
C OUTPUT FILES/PARAMETERS:  NONE.
C
C SUBROUTINES/FUNCTIONS CALLED : NONE.
C
C CALLED BY: DMAPII.
C
C LOCAL VARIABLES: NONE.
C
C RESTRICTIONS: NONE.
C
C ABNORMAL RETURN CONDITIONS:   NONE.
C
C LOCATION:                     /gl
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C     DANIEL BERKICH (SAIC) NOSC                        Read both forms of
C                                                       Data base.
C
C-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE gtlin(lunind,lblk,loffs,pblk,poffs,npoint,irnk,
     +           rminla,rmaxla,rminlo,rmaxlo,ios)
```

Jul 20 15:23 1989 carv ıtl.f Page 12

```
      INTEGER nindex,lenind
      COMMON /iwdbii/ nindex,lenind
      INTEGER isecs,imins
      REAL    c,cs
      COMMON /c/ c,ISECS,CS,imins
      INTEGER   lunind,ios
      INTEGER*2 linblk(8,32)
      common    /linblk/ linblk
      INTEGER   lblk,loffs,pblk,poffs
      INTEGER   csblk,clblk,cpblk
      LOGICAL   va
      common /inopen/ csblk,clblk,cpblk,va
      INTEGER*2 i2(2)
      INTEGER   i4
      EQUIVALENCE (i2,i4)
      INTEGER    two8
      logical vax
      common /vaxdbc/ vax
      PARAMETER (two8 = 2**8)
      REAL      rminla,rmaxla,rminlo,rmaxlo
      INTEGER   npoint,irnk

     IF (clblk.NE.lblk) THEN
        READ (lunind,REC=lblk,IOSTAT=ios)
     +     linblk
        clblk = lblk
        IF (ios.NE.0) THEN
           PRINT *,'GETLIN - Line read error=',ios,'  Block=',lblk
           RETURN
        ENDIF
     ENDIF
     IF (va) THEN
c       Version A format (long form)
        if (vax) then
          i2(1)  =  linblk(1,loffs)
          i2(2)  =  mod(linblk(2,loffs),two8)
          pblk   =  i4
c       ---- Convert rank to short index form ----
          irnk   =  (linblk(2,loffs)/two8)*two8 +
     +                mod(linblk(3,loffs),two8)
        else
          i2(1)  =  mod(linblk(1,loffs),two8)
          i2(2)  =  linblk(2,loffs)
          pblk   =  i4
c       ---- Convert rank to short index form ----
          irnk   =  mod(linblk(3,loffs),two8)
        endif
        poffs  =  linblk(3,loffs)/two8
        npoint =  linblk(4,loffs)
        rminla = (linblk(5,loffs)-imins)*c
        rmaxla = (linblk(6,loffs)-imins)*c
        rminlo = (linblk(7,loffs)-imins)*c
        rmaxlo = (linblk(8,loffs)-imins)*c
     ELSE
c       Version S format (short form)
        pblk   =  linblk(1,loffs)
```

Jul 20 15:23 1989 carw ıtl.f Page 13

```
         irnk   =  linblk(2,loffs)
         npoint =  linblk(3,loffs)
         rminla = (linblk(4,loffs)-imins)*c
         rmaxla = (linblk(5,loffs)-imins)*c
         rminlo = (linblk(6,loffs)-imins)*c
         rmaxlo = (linblk(7,loffs)-imins)*c
         poffs  =  linblk(8,loffs)
      ENDIF
      loffs = loffs + 1
      IF (loffs.GT.nindex) THEN
         lblk  = lblk + 1
         loffs = 1
      ENDIF

      RETURN
      END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    INTPOI
C
C FUNCTIONAL DESCRIPTION:       .
c -   Description: This routine intializes the point buffer indices.
C
C CALLED BY:                    DMAPII
C
C PROGRAMMER:                   DATE OF LAST CHANGE     REASON FOR CHANGE
C -   DAN BERKICH -SAIC-            OCTOBER 1986        POLYGON FILL
C
C-*-*-*-*-*-*-*-*-*-*-*-*-*-*-*-*-*-*-*-*-*-*-*-*-*-*-*-*-*-*-*-*-*-*-*-*|*-*-*-*-
c
        SUBROUTINE intpoi(isgood)

      include   'carmaxdim.inc'
c
c     Variables and Array for the Positive buffer
      integer   iplp,aplp
      real      xplp(IDIM),yplp(IDIM)
      common /bufptrp/ iplp,aplp
      common /bufaryp/ xplp,yplp
c
c     Variables and Array for the Negative buffer
      integer   ipln,apln
      real      xpln(IDIM),ypln(IDIM)
      common /bufptrn/ ipln,apln
      common /bufaryn/ xpln,ypln

      LOGICAL   isgood
      LOGICAL   posbuf

      REAL maxx,maxx2
      COMMON /maxx/ maxx,maxx2
      common /posbuf/posbuf
800   FORMAT(x,'Warning... Exceeded point buffer size of ',i4)

      iplp = 0
```

```
      ipln = 0
      aplp = 0
      apln = 0
      posbuf = isgood
      maxx2 = 2 * maxx

      RETURN
      END

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      MRKPOI
C
C FUNCTIONAL DESCRIPTION:          .
c -   Description: This entry is for marking the begining of the change
c -                points in the positive and negative buffers.
C
C CALLED BY:                      DMAPII
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine mrkpoi

      include   'carmaxdim.inc'
c
c     Variables and Array for the Positive buffer
      integer   iplp,aplp
      real      xplp(IDIM),yplp(IDIM)
      common /bufptrp/ iplp,aplp
      common /bufaryp/ xplp,yplp
c
c     Variables and Array for the Negative buffer
      integer   ipln,apln
      real      xpln(IDIM),ypln(IDIM)
      common /bufptrn/ ipln,apln
      common /bufaryn/ xpln,ypln

      aplp = iplp
      apln = ipln

      RETURN
      END

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      RDLINE
C
C FUNCTIONAL DESCRIPTION:          .
c -   Description: read a line index record
c -
c -     LBLK -  index to line record, obtained initially from segemnt
c -             record and incremented after each read.
c -     PBLK -  index where first point exists in the point file.
c -     PCNT -  number of points for the line
```

```
Jul 20 15:23 1989  carw  ɔtl.f Page 15

C
C CALLED BY:                        DMAPII
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      SUBROUTINE rdline(line,ppblk,pcnt
     +                ,rminlat,rminlon,rmaxlat,rmaxlon,lblkoff,ios)

      INTEGER  lunit
      PARAMETER (lunit = 68)

      INTEGER   ios
      INTEGER   lblk,ppblk,pcnt,lblkoff
      INTEGER   line,loffs
      INTEGER*2 i2(2)
      REAL      rminlat,rminlon,rmaxlat,rmaxlon
      INTEGER   i4
      EQUIVALENCE (i2,i4)

      INTEGER isecs,imins
      REAL    c,cs
      COMMON /c/ c,ISECS,CS,imins

      INTEGER   cpsblk,cplblk,cppblk
      COMMON /cpblks/ cpsblk,cplblk,cppblk,va

      INTEGER*2 clnblk(8,32)
      COMMON /clnblk/ clnblk

      INTEGER nindex,lenind
      COMMON /IWDBII/ NINDEX,LENIND

      ppblk = 0
      pcnt = 0

      IF (line.gt.0) THEN
        lblk = ((line-1)/nindex) + 1
        loffs = mod((line-1),nindex) + 1
        line = line + 1
        IF (cplblk.NE.lblk) THEN
           READ (lunit,REC=lblk,IOSTAT=ios)
     +        clnblk
           cplblk = lblk
        ENDIF
        ppblk   =  clnblk(1,loffs)
        pcnt    =  clnblk(2,loffs)
        rminlat = (clnblk(3,loffs)-imins)*c
        rminlon = (clnblk(4,loffs)-imins)*c
        rmaxlat = (clnblk(5,loffs)-imins)*c
        rmaxlon = (clnblk(6,loffs)-imins)*c
        i2(1)   =  clnblk(7,loffs)
        i2(2)   =  clnblk(8,loffs)
        lblkoff =  i4
      ENDIF
```

Jul 20 15:23 1989 carw ıtl.f Page 16

```
      RETURN
      END

C+*+*+*+*+*+*+*+*+*+*+*+*+*+*+*+*+*+*+*+*+*+*+*+*+*+*+*+*+*+*+*+*+*|*+*+*+*+
C UNIT NAME:                    RDPNT
C
C FUNCTIONAL DESCRIPTION:       .
c -   Description: read a POINT record
c -             PBLK -  Point block for read,  obtained from line
c -                     record.  Incremented after read.
c -             RLAT -  latitude
c -             RLON -  longitude
C
C CALLED BY:                    DMAPII
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*|*-*-*-*-
c
      SUBROUTINE rdpnt(point,rlat,rlon,ios)

      INTEGER   punit
      PARAMETER (punit = 67)

      INTEGER   ios
      INTEGER   point,pblk,poffs
      REAL      rlat,rlon

      INTEGER isecs,imins
      REAL    c,cs
      COMMON /c/ c,ISECS,CS,imins

      INTEGER   cpsblk,cplblk,cppblk
      COMMON /cpblks/ cpsblk,cplblk,cppblk,va

      INTEGER   cptblk(2,64)
      COMMON  /cptblk/ cptblk

      INTEGER ndatar,lendat
      COMMON /DWDBII/ NDATAR,LENDAT

      IF (point.gt.0) THEN
        pblk = ((point-1)/ndatar) + 1
        poffs = mod((point-1),ndatar) + 1
        point = point + 1
        IF (cppblk.NE.pblk) THEN
           READ (punit,REC=pblk,IOSTAT=ios)
     +        cptblk
           cppblk = pblk
        ENDIF
        rlat  = (cptblk(1,poffs)-isecs)*cs
        rlon  = (cptblk(2,poffs)-isecs)*cs
      ENDIF
```

```
      RETURN
      END

C++*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     RDSEG
C
C FUNCTIONAL DESCRIPTION:
c -   Description: read a segment record
c -     SEGMENT-index to segment record, incremented after each read.
c -     LBLK  - index where first line exists in the line file.
c -     LCODE - Code indicating whether or not to fill entire segment
C
C CALLED BY:                     DMAPII
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
      SUBROUTINE rdseg(segment,llblk,lcnt,lcode
     +                 ,rminlat,rminlon,rmaxlat,rmaxlon,ios)
c
c    start read
c
      INTEGER   sunit
      PARAMETER (sunit = 69)

      INTEGER   ios
      INTEGER   llblk,lcnt
      INTEGER*2 lcode
      INTEGER   segment,sblk,soffs
      REAL      rminlat,rminlon,rmaxlat,rmaxlon

      INTEGER isecs,imins
      REAL    c,cs
      COMMON /c/ c,ISECS,CS,imins

      INTEGER   cpsblk,cplblk,cppblk
      COMMON /cpblks/ cpsblk,cplblk,cppblk,va

      INTEGER*2 csgblk(8,32)
      COMMON /csgblk/csgblk

      INTEGER nlinde,lenlin
      COMMON /LWDBII/ NLINDE,LENLIN,icntli

      sblk = ((segment-1)/nlinde) + 1
      soffs = mod((segment-1),nlinde) + 1
      IF (cpsblk.NE.sblk) THEN
         cpsblk = sblk
         READ (sunit,REC=sblk,IOSTAT=ios)
     +      csgblk
      ENDIF

      llblk   =  csgblk(1,soffs)
      lcnt    =  csgblk(2,soffs)
```

Jul 20 15:23 1989 carw ıtl.f Page 18

```
      lcode   =  csgblk(3,soffs)
      rminlat = (csgblk(5,soffs)-imins)*c
      rminlon = (csgblk(6,soffs)-imins)*c
      rmaxlat = (csgblk(7,soffs)-imins)*c
      rmaxlon = (csgblk(8,soffs)-imins)*c

      RETURN
      END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         SAVCPT
C
C FUNCTIONAL DESCRIPTION:            .
c -        This routine is for saving points read from the change file.
c -        These are the points added to complete a polygon.
C
C CALLED BY:                         NO LONGER USED BY CARICATURE
C
C PROGRAMMER:                        DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-
c
      subroutine savcpt(xpl,ypl)

      real xpl,ypl

      include   'carmaxdim.inc'
c
c     Variables and Array for the Positive buffer
      integer   iplp,aplp
      real      xplp(IDIM),yplp(IDIM)
      common /bufptrp/ iplp,aplp
      common /bufaryp/ xplp,yplp
c
c     Variables and Array for the Negative buffer
      integer   ipln,apln
      real      xpln(IDIM),ypln(IDIM)
      common /bufptrn/ ipln,apln
      common /bufaryn/ xpln,ypln

      LOGICAL   posbuf

      REAL maxx,maxx2
      COMMON /maxx/ maxx,maxx2
      common /posbuf/posbuf

      IF (aplp.LT.IDIM) THEN
         aplp = aplp + 1
         yplp(aplp) = ypl
         IF (xpl.GE.0.OR.posbuf) THEN
            xplp(aplp) = xpl
         ELSE
            xplp(aplp) = amin1(maxx,maxx2 + xpl)
         ENDIF
         IF (.NOT.posbuf) THEN
```

```
            apln = apln + 1
            ypln(apln) = ypl
            IF (xpl.GE.0) THEN
               xpln(apln) = amax1(-maxx,-maxx2 + xpl)
            ELSE
               xpln(apln) = xpl
            ENDIF
         ENDIF
      ELSE
         PRINT 800,IDIM
      ENDIF

800   FORMAT(x,'Warning... Exceeded point buffer size of ',i4)

      RETURN
      END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        SAVPOI
C
C FUNCTIONAL DESCRIPTION:
c -   This routine is for saving points read from the WDBIIx point file.
C
C CALLED BY:                        NO LONGER USED BY CARICATURE
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-
c
      subroutine savpoi(xpl,ypl)

      real xpl,ypl

      include   'carmaxdim.inc'
c
c     Variables and Array for the Positive buffer
      integer   iplp,aplp
      real      xplp(IDIM),yplp(IDIM)
      common /bufptrp/ iplp,aplp
      common /bufaryp/ xplp,yplp
c
c     Variables and Array for the Negative buffer
      integer   ipln,apln
      real      xpln(IDIM),ypln(IDIM)
      common /bufptrn/ ipln,apln
      common /bufaryn/ xpln,ypln

      LOGICAL   posbuf

      REAL maxx,maxx2
      COMMON /maxx/ maxx,maxx2
      common /posbuf/posbuf

      IF (iplp.LT.IDIM) THEN
        iplp = iplp + 1
```

Jul 20 15:23 1989 carw ıtl.f Page 21

```
      integer   iplp,aplp
      real      xplp(IDIM),yplp(IDIM)
      common /bufptrp/ iplp,aplp
      common /bufaryp/ xplp,yplp
C
      if (iplp.gt.0) then
C        This will be an appendix, get original end point.
         i = 1
         xtmp(i) = xplp(iplp)
         ytmp(i) = yplp(iplp)
         append = .true.
      else
C        Not an appendix, This will be the entire polygon.
         i = 0
         append = .false.
      endif
C
C     Get all verticies in the add polyline.
      if (poicnt.gt.0) then
         do 110 ii = 1, poicnt
            call rdpnt(pntblk,plat,plon,ios)
            i = i + 1
            ytmp(i) = plat
            xtmp(i) = plon
C           Truncate those damn add points near the south pole.
            ytmp(i) = amax1(ytmp(i),-1.55)
 110     continue
C
C        Insure polygon closure.
         if ((ytmp(i).ne.yplp(1)).or.(xtmp(i).ne.xplp(1))) then
            i = i + 1
            if (append) then
               ytmp(i) = yplp(1)
               xtmp(i) = xplp(1)
            else
               ytmp(i) = ytmp(1)
               xtmp(i) = xtmp(1)
            endif
         endif
C
C        Great cirçlize the added section of polygon.
         istout = max0(1,iplp)
         call ll2gc(xtmp,ytmp,i,MAX,xplp(istout),yplp(istout),nout)
         aplp = (istout-1) + nout
      endif
C
      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SVECPT
C
C FUNCTIONAL DESCRIPTION:
c -       This routine is for saving points read from the change file.
c -       These are the points added to complete a polygon.
```

```
C
C CALLED BY:                    DMAPII
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine svecpt(xpl,ypl)

      real xpl,ypl

      include   'carmaxdim.inc'
c
c     Variables and Array for the Positive buffer
      integer   iplp,aplp
      real      xplp(IDIM),yplp(IDIM)
      common /bufptrp/ iplp,aplp
      common /bufaryp/ xplp,yplp

      IF (aplp.LT.IDIM) THEN
         aplp = aplp + 1
         yplp(aplp) = ypl
         xplp(aplp) = xpl
      ELSE
         PRINT 800,IDIM
      ENDIF

800   FORMAT(x,'Warning... Exceeded point buffer size of ',i4)

      RETURN
      END


C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SVEPOI
C
C FUNCTIONAL DESCRIPTION:
c -   This routine is for saving points read from the WDBIIx point file.
C
C CALLED BY:                    DMAPII
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine svepoi(xpl,ypl)

      real xpl,ypl

      include   'carmaxdim.inc'
c
c     Variables and Array for the Positive buffer
      integer   iplp,aplp
      real      xplp(IDIM),yplp(IDIM)
      common /bufptrp/ iplp,aplp
      common /bufaryp/ xplp,yplp
```

Jul 20 15:23 1989 car\ utl.f Page 23

```
      IF (iplp.LT.IDIM) THEN
        iplp = iplp + 1
        yplp(iplp) = ypl
        xplp(iplp) = xpl
      ELSE
         PRINT 800,IDIM
      ENDIF

800   FORMAT(x,'Warning... Exceeded point buffer size of ',i4)
c
      RETURN
      END
```

#?

INDEX TO SUBROUTINES

BL2LL Vol 2, Section carmapmth.f, pp 1-2
Transforms a polyline from stereographic breakline coordinates back to (longitude.latitude).

BL2XY Vol 2, Section carmapmth.f,pp 2-3
Transforms a polyline into a temporary stereographic projection where breakline clipping will be performed.

BLCHK Vol 2, Section carmapmth.f, pp 3-5
Detects intersection of conic breakline with a geographic bounding rectangle.

BLHATC Vol 2, Section carmapmth.f, pp 5-8
Draws a hatch pattern inside a polygon that might be clipped by the breakline of a map, or contain potentially singular points.

BLPLGN Vol 2, Section carmapmth.f, pp 8-11
Does an area fill (no outline) for the inside of a polygon that might require clipping by a map breakline or contain potentially singular points.

BLPLIN Vol 2, Section carmapmth.f, pp 11-13
Draws a polyline across a map area containing a conic breakline.

BLSET Vol 2, Section carmapmth.f, pp 13-16
Locates end points of conic breakline. Sets a transformation to a special stereographic projection where the breakline is straight. so that breakline clipping can easily be applied.

BLSING Vol 2, Section carmapmth.f, pp 16-19
Excludes potentially singular points from the interior of a spherical polygon.

CK4ALL Vol 2, Section carmapmth.f, pp 19-21
Checks for all of a geographic area bounding rectangle being visible in the viewport.

CK4ANY Vol 2, Section carmapmth.f, pp 21-23
Checks for intersection of a geographic area with the viewport by comparing bounding rectangles.

CLIP2L Vol 2, Section carmapmth.f, pp 23-25
Clips a polyline by a line.

CLIPLG Vol 2, Section carmapmth.f, pp 25-29
Clips a polygon by a line.

D2OUTL Vol 2, Section carmapmth.f, pp 30-34
Draw (fill) map outline.

DA2LL Vol 2, Section carmapmth.f, pp 34-35

Converts distance and asimuth from any point to latitude, longitude.

DMAPII Vol 2, Section carmapmth.f, pp 37-48
Reads World Data Bank II and draws map.

EAST1 Vol 2, Section carmapmth.f, pp 48-49
Determines the eastmost of two longitudes as viewed from the map center.

FTPRNT Vol 2, Section carmapmth.f, pp 49-51
Cross hatches the footprint (instantaneous viewing area) for an aerial platform.

JPOLG2 Vol 2, Section carmapmth.f, pp 57-60
Used to overcome limits on the number of verticies for filled polygons in some display systems.

LIMIT2 Vol 2, Section carmapmth.f, pp 60-63
Finds the viewport bounding rectangle.

LL2DA ':° Vol 2, Section carmapmth.f1 pp 63-64
Converts geographic location into distance and asimuth from any point.

LL2GC Vol 2, Section carmapmth.f, pp 64-66
Conditions a geographic polyline so that segments smoothly follow great circles.

LLPLXY Vol 2, Section carmapmth.f, pp 66-69
Converts a geographic polyline into display coordinates.

NRSY˜T Vol 2, Section carmapmth.f, pp 73-76
Solves a system of nonlinear equations by the Newton-Raphson method.

PINSPG Vol 2, Section carmapmth.f, pp 76-78
Tests a point for being inside the smaller of the two regions defined by a spherical polygon.

PXALBR Vol 2, Section carmapmth.f, pp 78-81

```
        Geographic polyline to Albers Equal Area Conic projection.

PXAZEA                     Vol 2, Section carmapmth.f,  pp 81-83
        Geographic polyline to Azimuthal Equal Area projection.

PXAZED                     Vol 2, Section carmapmth.f,  pp 83-84
        Geographic polyline to Azimuthal Equidistant projection.

PXEQRE                     Vol 2, Section carmapmth.f,  pp 84-86
        Geographic polyline to Equirectangular projection.

PXGNOM                     Vol 2, Section carmapmth.f,  pp 86-87
        Geographic polyline to Gnomonic projection.

PXKAVR                     Vol 2, Section carmapmth.f,  pp 87-89

Jan 26 10:10 1993 index.txt Page 3

        Geographic polyline to Equidistant Conic projection.

PXLAMC                     Vol 2, Section carmapmth.f,  pp 89-92
        Geographic polyline to Lambert Conformal Conic projection.

PXMERC                     Vol 2, Section carmapmth.f,  pp 92-94
        Geographic polyline to Mercator projection.

PXMILL                     Vol 2, Section carmapmth.f,  pp 94-95
        Geographic polyline to Miller projection.

PXOBLM                     Vol 2, Section carmapmth.f,  pp 95-98
        Geographic polyline to Oblique Mercator projection.

PXORTH                     Vol 2, Section carmapmth.f,  pp 101-103
        Geographic polyline to Oblique Orthographic projection.

PXPERS                     Vol 2, Section carmapmth.f,  pp 103-105
        Geographic polyline to Oblique Perspective projection.

PXPOLY                     Vol 2, Section carmapmth.f,  pp 105-107
        Geographic polyline to Polyconic projection.

PXPOST                     Vol 2, Section carmapmth.f,  pp 107-109
        Geographic polyline to Polar Stereographic projection.

PXSI-NU                    Vol 2, Section carmapmth.f,  pp 109-110
        Geographic polyline to Sinusoidal projection.

PXSTER                     Vol 2, Section carmapmth.f,  pp 110-112
```

Geographic polyline to Oblique Stereographic projection.

PXUT¯Z Vol 2, Section carmapmth.f, pp 112-114
Geographic polyline to Universal Transverse Mercator projection.

PXVDGN Vol 2, Section carmapmth.f, pp 114-116
Geographic polyline to Van Per Grinten projection.

RNGRIN Vol 2, Section carmapmth.f, pp 116-119
Draws range rings, radials about a selected point.

SPGCVX Vol 2, Section carmapmth.f, pp 119-120
Tests for convex property in spherical polygons.

SPGINT Vol 2, Section carmapmth.f, pp 120-122
Flags the intersection of two spherical polygons.

SPGRAD Vol 2, Section carmapmth.f, pp 122-123
Finds minimum bounding circle of a spherical polygon.

SPGTST Vol 2, Section carmapmth.f, pp 123-124
Spherical polygon utility.

XPAZEA Vol 2, Section carmapmth.f, pp 124-125
Display point to geographic position for Azimuthal Equal Area.

XPAZED Vol 2, Section carmapmth.f, pp 125-127
Display point to geographic position for Azimuthal Equidistant.

XPGENR Vol 2, Section carmapmth.f, pp 127-129
Generic conversion of display point to geographic coordinates. Works on any well behaved projection.

XPSTER Vol 2, Section carmapmth.f, pp 130-131
Map point to geographic position for Stereographic.

XYTOLL Vol 2, Section carmapmth.f, pp 131-132
Converts screen location to geographic coordinates.

I claim:

1. A method of displaying areal features which is represented by polygon fill of vector data for world maps and other display items by signal transformations of data representative of areal features from which polygons are extracted comprising the steps of:

feeding said data representative of areal features from which polygons are extractable to a computer;

establishing from said data representative of areal features in said computer, display geographic coordinate relationships for display and interrogation;

transforming said data representative of areal features in said computer, into a great circle polygon format for display;

selecting from said data representative of areal features in said computer, background and overlay features for display;

determining from said data representative of areal features in said computer, spatial relationships between spherical polygons for display;

processing said data representative of areal features in said computer, to provide clipping and singularity removal at map interruption lines to allow the display of curved surface features in a plane;

clipping polygons from said data representative of areal features in said computer, by lines so that portions thereof are dipslayable as separate entities;

projecting from said data representative of areal features in said computer, geographic coordinates onto a defined map display; providing transformations from display coordinates to latitude and longitude coordinates for the display thereof, said transformations being derived from said data representative of areal features in said computer; and displaying a representation based on said data representative of areal features in said computer.

2. A method according to claim 1 further includes the step of:

designating the choice of the displayed transformation of providing.

3. A method according to claim 2 in which said step of establishing geographic coordinate relationships is independent of specific projection and provides generic calculation of intersection between the map display on a screen and loxodrome bounded geographic sectors.

4. A method according to claim 3 in which said step of transforming into a great circle polygon format for display includes where individual line segments are defined as particular geographic curves no is accomplished in a projection independent manner by adding points automatically as required by any specific projection to achieve accurate depiction of curved segments.

5. A method according to claim 4 in which said step of selecting background and overlay features for display comprises the selection of areal data from a filled outline of the world and other areal features including political districts and satellite footprints.

6. A method according to claim 5 in which said step of determining spatial relationships between spherical polygons for display includes finding intersection, enclosure, longitudinal relationships for points east of a longitudinal reference point, convex property, and minimum bounding small circle.

7. A method according to claim 6 in which said processing to provide clipping and singularity removal at the map interruption lines to allow the display of curved surface features in a plane is predetermined to avoid errors and anomalous behavior in any filled areal features mapped from geographic coordinates onto a selected azimuthal, conical, and pseudocylindrical projection.

8. A method according to claim 7 in which said step of clipping polygons by lines provides for the display of portions as separate entities to allow polygons of virtually any number of vertices to be subjected to said clipping and singularity removal to automatically subdivide sections of the input polygon as required to limit the maximum number of output vertices to a count compatible with the polygon fill capacity of a particular display device interface.

9. A method according to claim 8 in which said step of projecting geographic coordinates onto a defined map display applies to any azimuthal, conic, cylindrical, and pseudocylindrical projection including Albers Equal Area Conic, Azimuthal Equidistant, Azimuthal Equal Area, Equirectangular, Gnomonic, Equidistant Conic, Lambert Conformal Conic, Mercator, Miller, Oblique Mercator, Orthographic, Equatorial Orthographic, Polar Orthographic, Perspective Polyconic, Polar Stereographic, Sinusoidal, Stereographic and Universal Transverse Mercator.

10. A method according to claim 9 in which said step of providing transformations solves the inverse by a generic method applicable to any azimuthal, conic, cylindrical and pseudocylindrical projection and requires input of a mathematical transformation defining a specific projection and some point on that specific projection.

11. A method according to claim 1 in which said step of establishing display geographic coordinate relationships is independent of specific projection and provides generic calculation of intersection between the map display on a screen and loxodrome bounded geographic sectors, said step of transforming into a great circle polygon format for display includes where individual line segments are defined as particular geographic curves and is accomplished in a projection independent manner by adding points automatically as required by any specific projection to achieve accurate depiction of curved segments, said step of selecting background and overlay features for display is from a filled outline of the world and other areal features including political districts and satellite footprints, said step of determining spatial relationships between spherical polygons for display includes finding intersection, enclosure, longitudinal relationships for points east of a longitudinal reference point, convex property, and minimum bounding small circle, said step of processing to provide clipping and singularity removal at map interruption lines to allow the display of curved surface features in a plane is predetermined to avoid errors and anomalous behavior in any filled areal features mapped from geographic coordinates onto a selected azimuthal, conical, and pseudocylindrical projection, said step of clipping polygons by lines and great circles provides for the display of portions as separate entities to allow polygons of virtually any number of vertices to be subjected to said clipping and singularity removal to automatically subdivide sections of the input polygon as required to limit the maximum number of output vertices to a count compatible with the polygon fill capacity of a particular display device interface, said step of projecting geographic coordinates onto a defined map display applies to any azimuthal, conic, cylindrical, and pseudocylindrical projection including Albers Equal Area Conic, Azimuthal Equidistant, Azimuthal Equal Area, Equirectangular, Gnomonic, Equidistant Conic, Lambert Conformal Conic, Mercator, Miller, Oblique Mercator, Orthographic, Equatorial Orthographic, Polar Orthographic, Perspective Polyconic, Polar Stereographic, Sinusoidal, Stereographic and Universal Transverse Mercator and said step of providing transformations solves the inverse by a generic method applicable to any azimuthal, conic, cylindrical and pseudocylindrical projection and requires input of a mathematical transformation defining a specific projection and some point on that specific projection.

12. A method of displaying areal features which is represented by polygon fill of vector data for world maps and other display items by signal transformations of data representative of areal features from which polygons are extracted comprising the steps of:

feeding said data representative of areal features from which polygons are extractable to a computer;

establishing from said data representative of areal features in said computer, geographic coordinate relationships for display and interrogation;

transforming said data representative of areal features in said computer, into a great circle polygon format for display;

selecting from said data representative of areal features in said computer, background and overlay features for display;

determining from said data representative of areal features in said computer, spatial relationships between spherical and loxodrome polygons for display;

processing said data representative of areal features in said computer, to provide clipping and singularity removal at map interruption lines to allow the display of curved surface features on a plane;

clipping polygons from said data representative of areal features in said computer, by lines and great circles so that portions thereof are displayable as separate entities;

projecting from said data representative of areal features in said computer, geographic coordinates onto a graphic device for the display thereof;

providing transformations from any location on a map from an input of a map location and an input of a transformation defining a specific projection that solves an inverse transformation by a generic method applicable to any azimuthal, conic, cylindrical, and pseudocylindrical projection, said transformations being derived from data mapped into a specific projection from said data representative of areal features in said computer; and displaying a representation based on said data representative of areal features in said computer.

13. A method according to claim 12 in which said step of establishing geographic coordinate relationships is independent of specific projection and provides generic calculation of intersection between the map display on a screen and loxodrome bounded geographic sectors.

14. A method according to claim 13 in which said step of transforming into a great circle polygon format for display includes where individual line segments are defined as particular geographic curves and is accomplished in a projection independent manner by adding points automatically as required by any specific projection to achieve accurate depiction of the curved segments.

15. A method according to claim 14 in which said step of selecting background and overlay features for display is from a filled outline of the world and other areal features including political districts and satellite footprints.

16. A method according to claim 15 in which said step of determining spatial relationships between spherical polygons for display includes finding intersection, enclosure, longitudinal relationships for points east of a longitudinal reference point, convex property, and minimum bounding small circle.

17. A method according to claim 16 in which said step of processing to provide clipping and singularity removal at the map interruption lines to allow the display of curved surface features in a plane is predetermined to avoid errors and anomalous behavior in any filled areal features mapped from geographic coordinates onto a selected azimuthal, conical, and pseudocylindrical projection.

18. A method according to claim 17 in which said step of clipping polygons by lines provides for the display of portions as separate entities to allow polygons of virtually any number of vertices to be subjected to said clipping and singularity removal to automatically subdivide sections of the input polygon as required to limit the maximum number of output vertices to a count compatible with the polygon fill capacity of a particular display device interface.

19. A method according to claim 18 in which said step of projecting geographic coordinates onto a defined map display applies to any azimuthal, conic, cylindrical, and pseudocylindrical projection including Albers Equal Area Conic, Azimuthal Equidistant, Azimuthal Equal Area, Equirectangular, Gnomonic, Equidistant Conic, Lambert Conformal Conic, Mercator, Miller, Oblique Mercator, Orthographic, Equatorial Orthographic, Polar Orthographic, Perspective Polyconic, Polar Stereographic, Sinusoidal, Stereographic and Universal Transverse Mercator.

20. A method according to claim 19 in which said step of providing transformations solves the inverse by a generic method appplicable to any azimuthal, conic, cylindrical and pseudocylindrical projection and requires input of a mathematical transformation defining a specific projection and some point on that specific projection.

21. A method of displaying linear features which is represented by polyline plotting of linear vector data for world maps and other display items by signal transformations of data representative of linear features from which polylines are extracted comprising the steps of:

feeding said data representative of linear features from which polylines are extractable to a computer;

establishing from said data representative of linear features in said computer, display geographic coordinate relationships;

transforming said data representative of linear features in said computer, into a great circle polyline format for display;

selecting from said data representative of linear features in said computer, background and overlay features for display;

determining from said data representative of linear features in said computer, spatial relationships between polylines and spherical polygons for display;

processing said data representative of linear features in said computer, to provide clipping and singularity removal at map interruption lines to allow the display of curved surface features in a plane;

clipping polylines from said data representative of linear features in said computer, by lines and great circles so that portions thereof are displayable as separate entities;

projecting from said data representative of linear features in said computer, geographic coordinates onto a defined map display; providing transformations from display coordinates to latitude and longitude coordinates for the display thereof, said transformations being derived from said data representative of linear features in said computer; and displaying a representation based on said data representative of areal features in said computer.

22. A method according to claim 21 further includes the step of:

designating the choice of the displayed transformation of providing.

23. A method according to claim 22 in which said step of establishing geographic coordinate relationships is independent of specific projection and provides generic calculation of intersection between the map display on a screen and loxodrome bounded geographic sectors.

24. A method according to claim 23 in which said step of transforming into a great circle polyline format for display includes where individual line segments are defined as particular geographic curves and is accomplished in a projection independent manner by adding points automatically as required by any specific projection to achieve accurate depiction of curved segments.

25. A method according to claim 24 in which said step of selecting background and overlay features for display is from linear features including the world outline, vehicle paths and range rings.

26. A method according to claim 25 in which said step of determining spatial relationships between polylines and spherical polygons for display includes finding intersection, enclosure, longitudinal relationships for points east of a longitudinal reference point and minimum bounding small circle.

27. A method according to claim 26 in which said step of processing to provide clipping and singularity removal at the map interruption lines to allow the display of curved surface features in a plane is predetermined to avoid errors and anomalous behavior in any linear features mapped from geographic coordinates onto a selected azimuthal, conical, and pseudocylindrical projection.

28. A method according to claim 27 in which said step of clipping polygons by lines provides for the display of portions as separate entities.

29. A method according to claim 28 in which said step of projecting geographic coordinates onto a defined map display applies to any azimuthal, conic, cylindrical, and pseudocylindrical projection including Albers Equal Area Conic, Azimuthal Equidistant, Azimuthal Equal Area, Equirectangular, Gnomonic, Equidistant Conic, Lambert Conformal Conic, Mercator, Miller, Oblique Mercator, Orthographic, Equatorial Orthographic, Polar Orthographic, Perspective Polyconic, Polar Stereographic, Sinusoidal, Stereographic and Universal Transverse Mercator.

30. A method according to claim 29 in which said step of providing transformations solves the inverse by a generic method applicable to any azimuthal, conic, cylindrical and pseudocylindrical projection and requires input of a mathematical transformation defining a specific projection and some point on that specific projection.

31. A method according to claim 21 in which said step of establishing is independent of specific projection and provides generic calculation of intersection between the map display on a screen and loxodrome bounded geographic sectors, said step of transforming into a great circle polyline format for display included where individual line segments are defined as particular geographic curves and is accomplished in a projection independent manner by adding points automatically as required by any specific projection to achieve accurate depiction of curved segments, said step of selecting background and overlay features for display is from linear features including the world outline, vehicle paths and range rings, said step of determining spatial relationships between polylines and spherical polygons for display includes finding intersection, enclosure, longitudinal relationships for points east of a longitudinal reference point and minimum bounding small circle, said step of processing to provide clipping and singularity removal at map interruption lines to allow the display of curved surface features in a plane is predetermined to avoid errors and anomalous behavior in any linear features mapped from geographic coordinates onto a selected azimuthal, conical, and pseudocylindrical projection, said step of clipping polylines by lines and great circles provides for the display of portions as separate entities, said step of projecting geographic coordinates onto a defined map display applies to any azimuthal, conic, cylindrical, and pseudocylindrical projection including Albers Equal Area Conic, Azimuthal Equidistant, Azimuthal Equal Area, Equirectangular, Gnomonic, Equidistant Conic, Lambert Conformal Conic, Mercator, Miller, Oblique Mercator, Orthographic, Equatorial Orthographic, Polar Orthographic, Perspective Polyconic, Polar Stereographic, Sinusoidal, Stereographic and Universal Transverse Mercator and said step of providing transformations solves the inverse by a generic method applicable to any azimuthal, conic, cylindrical and pseudocyclindrical projection and requires input of a mathematical transformation defining a specific projection and some point on that specific projection.

32. A method of displaying linear features which is represented by polyine plotting of linear vector data for world maps and other display items by signal transformations of data representative of linear features from which polylines are extracted comprising the steps of:

feeding said data representative of linear features from which polylines are extractable to a computer;

establishing from said data representative of linear features in said computer, geographic coordinate relationships for display and interrogation;

transforming said data representative of linear features in said computer, into a great circle polyline format for display;

selecting from said data representative of linear features in said computer, background and overlay features for display;

determining from said data representative of linear features in said computer, spatial relationships between polylines, spherical polygons and loxodrome polygons for display;

processing said data representative of linear features in said computer, to provide clipping and singularity removal at map interruption lines to allow the display of curved surface features on a plane;

clipping polylines from said data representative of linear features in said computer, by lines and great circles so that portions thereof are displayable as separate entities;

projecting from said data representative of linear features in said computer, geographic coordinates onto a graphic device;

providing transformations from any location on a map from an input of a map location and an input of a transformation defining a specific projection that solves an inverse transformation by a generic method applicable to any azimuthal, conic, cylindrical, and pseudocylindrical projection, said transformations being derived from data mapped into a specific projection from said data representative of linear features in said computer; and displaying a representation based on said date representative of areal features in said computer.

33. A method according to claim 32 in which said step of establishing geographic coordinate relationships is independent of specific projection and provides generic calculation of intersection between the map display on a screen and loxodrome bounded geographic sectors.

34. A method according to claim 33 in which said step of transforming into a great circle polyline format for display includes where individual line segments are defined as particular geographic curves and is accomplished in a projection independent manner by adding points automatically as required by any specific projection to achieve accurate depiction of the curved segments.

35. A method according, to claim 34 in which said step of selecting background and overlay features of display is from linear features including the world outline, vehicle paths and range rings.

36. A method according to claim 35 in which said step of determining spatial relationships between polylines, spherical polygons and loxodrome polygons for display includes finding intersection, enclosure, longitudinal relationships for points east of a longitudinal reference point and minimum bounding small circle.

37. A method according to claim 36 in which said step of processing to provide clipping and singularity removal at the map interruption lines to allow the display of curved surface features in a plane is predetermined to avoid errors and anomalous behavior in any linear features mapped from geographic coordinates onto a selected azimuthal, conical, and pseudocylindrical projection.

38. A method according to claim 37 in which said step of clipping polylines by lines and great circles provides for the display of portions as separate entities.

39. A method according to claim 38 in which said step of projecting geographic coordinates onto a defined map display applies to any azimuthal, conic, cylindrical, and pseudocylindrical projection including Albers Equal Area Conic, Azimuthal Equidistant, Azimuthal Equal Area, Equirectangular, Gnomonic, Equidistant Conic, Lambert Conformal Conic, Mercator, Miller, Oblique Mercator, Orthographic, Equatorial Orthographic, Polar Orthographic, Perspective Polyconic, Polar Stereographic, Sinusoidal, Stereographic and Universal Transverse Mercator.

40. A method according to claim 39 in which said step of providing transformations solves the inverse by a generic method applicable to any azimuthal, coinic, cylindrical and pseudocylindrical projection and relies upon input of a mathematical transformation defining a specific projection and some point on the specific projection.

41. A method of displaying areal features which is represented by polygon fill of vector data by signal transformations of data representative of areal features from which polygons are extracted comprising the steps of:

feeding the representative data to a computer;

establishing from said representative data display geographic coordinate relationships;

transforming said representative data into a great circle polygon format;

selecting from said representative data background and overlay features;

determining from said representative data spatial relationships between spherical polygons;

processing said representative data to provide clipping and singularity removal at map interruption lines to allow the display of curved surface features in a plane;

clipping polygons from said representative data by lines and great circles so that portions thereof are displayable as separate entities;

projecting from said representative data geographic coordinates onto a defined map display;

providing transformations from display coordinates to latitude and longitude coordinates for the display thereof, said transformations being derived from said representative data; and displaying a representation based on said data representative of areal features in said computer.

42. A method according to claim 41 further includes step of:

designating a choice of the displayed transformation of providing.

43. A method according to claim 41 in which said step of establishing is independent of specific projection and provides generic calculation of intersection between the map display on a screen and loxodrome bounded geographic sectors, said step of transforming into a great circle polygon format for display includes where individual line segments are defined as particular geographic curves and is accomplished in a projection independent manner by adding points automatically as required by any specific projection to achieve accurate depiction of curved segments, said step of selecting is from a filled outline of the world and other areal features including political districts and satellite footprints, said step of determining includes finding intersection, enclosure, longitudinal relationships for points east of a longitudinal reference point, convex property, and minimum bounding small circle, said step of processing to provide clipping and singularity removal at map interruption lines to allow the display of curved surface features in a plane is predetermined to avoid errors and anomalous behavior in any filled areal features mapped from geographic coordinates onto a selected azimuthal, conical, and pseudocylindrical projection, said step of clipping polygons by lines and great circles so that portions thereof are displayable as separate entities allows polygons of virtually any number of vertices to be subjected to said clipping and singularity removal to automatically subdivide sections of the input polygon as required to limit the maximum number of output vertices to a count compatible with the polygon fill capacity of a particular display device interface, said step of projecting applies to any azimuthal, conic, cylindrical, and pseudocylindrical projection including Albers Equal Area Conic, Azimuthal Equidistant, Azimuthal Equal Area, Equirectangular, Gnomonic, Equidistant Conic, Lambert Conformal Conic, Mercator, Miller, oblique Mercator, Orthographic, Equatorial Orthographic, Polar Orthographic, Perspective Polyconic, Polar Stereographic, Sinusoidal, stereographic and Universal Transverse Mercator and said step of providing transformations solves the inverse by a generic method applicable to any azimuthal, conic cylindrical and pseudocylindrical projection and requires input of a mathematical transformation defining a specific projection and some point on that specific projection.

44. A method of displaying areal features which is represented polygon fill of vector data by signal transformations of data representative of areal features from which polygons are extracted comprising the steps of:

feeding the representative data to a computer;

establishing from said representative data geographic coordinate relationships for display and interrogation;

transforming said representative data into a great circle polygon format for display;

selecting from said representative data background and overlay features for display;

determining from said representative data spatial relationships between spherical and loxodrome polygons for display;

processing said representative data to provide clipping and singularity removal at map interruption lines to allow the display of curved surface features on a plane;

clipping polygons from said representative data by lines and great circles so that portions thereof are displayable as separate entities;

projecting from said representative data geographic coordinates onto a graphic device for the display thereof;

providing transformations from any location on a map from an input of a map location and an input of a transformation defining a specific projection that solves an inverse transformation by a generic method applicable to any azimuthal, conic, cylindrical, and pseudocylindrical projection, said transformations being derived from data mapped into a specific projection from said representative data; and displaying a representation based on said data representative of areal features in said computer.

45. A method according to claim 44 in which said step of establishing is independent of specific projection and provides generic calculation of intersection between the map display on a screen and loxodrome bounded geographic sectors.

46. A method according to claim 45 in which said step of transforming into a great circle polygon format for display includes where individual line segments are defined as particular geographic curves and is accomplished in a projection independent manner by adding points automatically as required by any specific projection to achieve accurate depiction of the curved segments.

47. A method according to claim 46 in which said step of selecting is from a filled outline of the world and other areal features including political districts and satellite footprints.

48. A method according to claim 47 in which said step of determining includes finding intersection, enclosure, longitudinal relationships for points east of a longitudinal reference point, convex property, and minimum bounding small circle.

49. A method according to claim 48 in which said step of processing to provide clipping and singularity removal is predetermined to avoid errors and anomalous behavior in any filled areal features mapped from geographic coordinates onto a selected azimuthal, conical, and pseudocylindrical projection.

50. A method according to claim 49 in which said step of clipping polygons by lines provides for the display of portions as separate entities to allow polygons of virtually any number of vertices to be subjected to said clipping and singularity removal to automatically subdivide sections of the input polygon as required to limit the maximum number of output vertices to a count compatible with the polygon fill capacity of a particular display device interface.

51. A method according to claim 50 in which said step of projecting applies to any azimuthal, conic, cylindrical, and pseudocylindrical projection including Albers Equal Area Conic, Azimuthal Equidistant, Azimuthal Equal Area, Equirectangular, Gnomonic, Equidistant Conic, Lambert Conformal Conic, Mercator, Miller, Oblique Mercator, Orthographic, Equatorial Orthographic, Polar Orthographic, Perspective Polyconic, Polar Stereographick, Sinusoidal, Stereographic and Universal Transverse Mercator.

52. A method according to claim 51 in which said step of providing transformations solves the inverse by a generic method applicable to any azimuthal, conic, cylindrical and pseudocylindirical projection and relies upon input of a mathematical transformation defining a specific projection and some point on the specific projection.

53. A method of displaying linear features which is represented by polyline plotting of linear vector data by signal transformations of data representative of linear features from which polylines are extracted comprising the steps of:

feeding the representative data to a computer;

establishing from said representative data display geographic coordinate relationships;

transforming said representative data into a great circle polyline format;

selecting from said representative data background and overlay features;

determining from said representative data spatial relationships between polylines, spherical polygons and loxodrome polygons;

processing said representative data to provide clipping and singularity removal at map interruption lines to allow the display of curved surface features in a plane;

clipping polylines from said representative data by lines and great circles so that portions thereof are displayable as separate entities;

projecting from said representative data geographic coordinates onto a defined map display;

providing transformations from display coordinates to latitude and longitude coordinates for the display thereof, said transformations being derived from said data representative of areal features; and displaying a representation based on said data representative of areal features in said computer.

54. A method according to claim 53 further includes step of:

designating a choice of the displayed transformation of providing.

55. A method according to claim 53 in which said step of establishing is independent of specific projection and provides generic calculation of intersection between the map display on a screen and loxodrome bounded geographic sectors, said step of transforming into a great circle polyline format includes where individual line segments are defined as particular geographic curves and is accomplished in a projection independent manner by adding points automatically as required by any specific projection to achieve accurate depiction of curved segments, said step of selecting is from linear features including the world outline, vehicle paths and range rings, said step of determining includes finding intersection, enclosure, longitudinal relationships for points east of a longitudinal reference point and minimum bounding small circle, said step of processing to provide clipping and singularity removal is predetermined to avoid errors and anomalous behavior in any linear features mapped from geographic coordinates onto a selected azimuthal, conical, and pseudocylindrical projection, said step of clipping polylines by lines and great circles provides for the display of portions as separate entities, said step of projecting applies to any azimuthal, conic, cylindrical, and pseudocylindrical projection including Albers Equal Area Conic, Azimuthal Equidistant, Azimuthal Equal Area, Equirectangular, Gnomonic, Equidistant Conic, Lambert Conformal Conic, Mercator, Miller, Oblique Mercator, Orthographic, Equatorial Orthographic, Polar Orthographic, Perspective Polyconic, Polar Stereographic, Sinusoidal, stereographic and Universal Transverse Mercator and said step of providing transformations solves the inverse by a generic method applicable to any azimuthal, conic, cylindrical and pseudocylindrical projection and requires input of a mathematical transformation defining a specific projection and some point on that specific projection.

56. A method of displaying linear features which is represented by polyline plotting of linear vector data by signal transformations of data representative of linear features from which polylines are extracted comprising the steps of:

feeding the representative data to a computer;

establishing from said representative data geographic coordinate relationships for display and interrogation;

transforming said representative data into a great circle polyline format for display;

selecting from said representative data background and overlay features for display;

determining from said representative data spatial relationships between polylines, spherical polygons and loxodrome polygons for display;

processing said representative data to provide clipping and singularity removal at map interruption lines to allow the display of curved surface features on a plane;

clipping polylines from said representative data by lines and great circles so that portions thereof are displayable as separate entities;

projecting from said representative data geographic coordinates onto a graphic device;

providing transformations from any location on a map from an input of a map location and an input of a transformation defining a specific projection that solves an inverse transformation by a generic method applicable to any azimuthal, conic, cylindrical, and pseudocylindrical projection, said transformations being derived data mapped into a specific projection from said representative data; and displaying a representation based on said data representative of areal features in said computer.

57. A method according to claim 56 in which said step of establishing is independent of specific projection and provides generic calculation of intersection between the map display on a screen and loxodrome bounded geographic sectors.

58. A method according to claim 57 in which said step of transforming into a great polyline format for display includes where individual line segments are defined as particular geographic curves and is accomplished in a projection independent manner by adding points automatically as required by any specific projection to achieve accurate depiction of the curved segments.

59. A method according to claim 58 in which said selecting is from linear features including the world outline, vehicle paths and range rings.

60. A method according to claim 59 in which said step of determining spatial relationships is between polylines, spherical polygons and loxodrome polygons for display and includes finding intersection, enclosure, longitudinal relationships for points east of a longitudinal reference point and minimum bounding small circle.

61. A method according to claim 60 in which said step of processing to provide clipping and singularity removal at the map interruption lines to allow the display of curved surface features is in a plane and is predetermined to avoid errors and anomalous behavior in any linear features mapped from geographic coordinates onto a selected azimuthal, conical, and pseudocylindrical projection.

62. A method according to claim 61 in which said step of clipping polylines by lines and great circles is so that portions thereof are displayable as separate entities.

63. A method according to claim 62 in which said step of projecting geographic coordinates onto a defined map display applies to any azimuthal, conic, cylindrical, and pseudocylindrical projection including Albers Equal Area Conic, Azimuthal Equidistant, Azimuthal Equal Area, Equirectangular, Gnomonic, Equidistant Conic, Lambert Conformal Conic, Mercator, Miller, Oblique Mercator, Orthographic, Equatorial Orthographic, Polar Orthographic, Perspective Polyconic, Polar Stereographic, Sinusoidal, Stereographic and Universal Transverse Mercator.

64. A method according to claim 63 in which said step providing transformations solves the inverse by a generic method appplicable to any azimuthal, conic, cylindrical and pseudocylindrical projection and relies upon input of a mathematical transformation defining a specific projection, some point on the specific projection.

* * * * *

UNITED STATES PATENT AND TRADEMARK OFFICE

CERTIFICATE OF CORRECTION

PATENT NO. : 5,475,802
APPLICATION NO. : 08/243650
DATED : December 12, 1995

INVENTOR(S) : Thomas F. Wescott

It is certified that error appears in the above-identified patent and that said Letters Patent is hereby corrected as shown below:

On the cover page directly above " [21] Appl. No: 243,650", the following should be inserted:

-- [ * ] This patent is subject to a terminal disclaimer . --

Signed and Sealed this

Eleventh Day of September, 2007

JON W. DUDAS

*Director of the United States Patent and Trademark Office*